Aug. 7, 1962   F. P. BROOKS, JR., ET AL   3,048,332
PROGRAM INTERRUPT SYSTEM
Filed Dec. 9, 1957   84 Sheets-Sheet 26

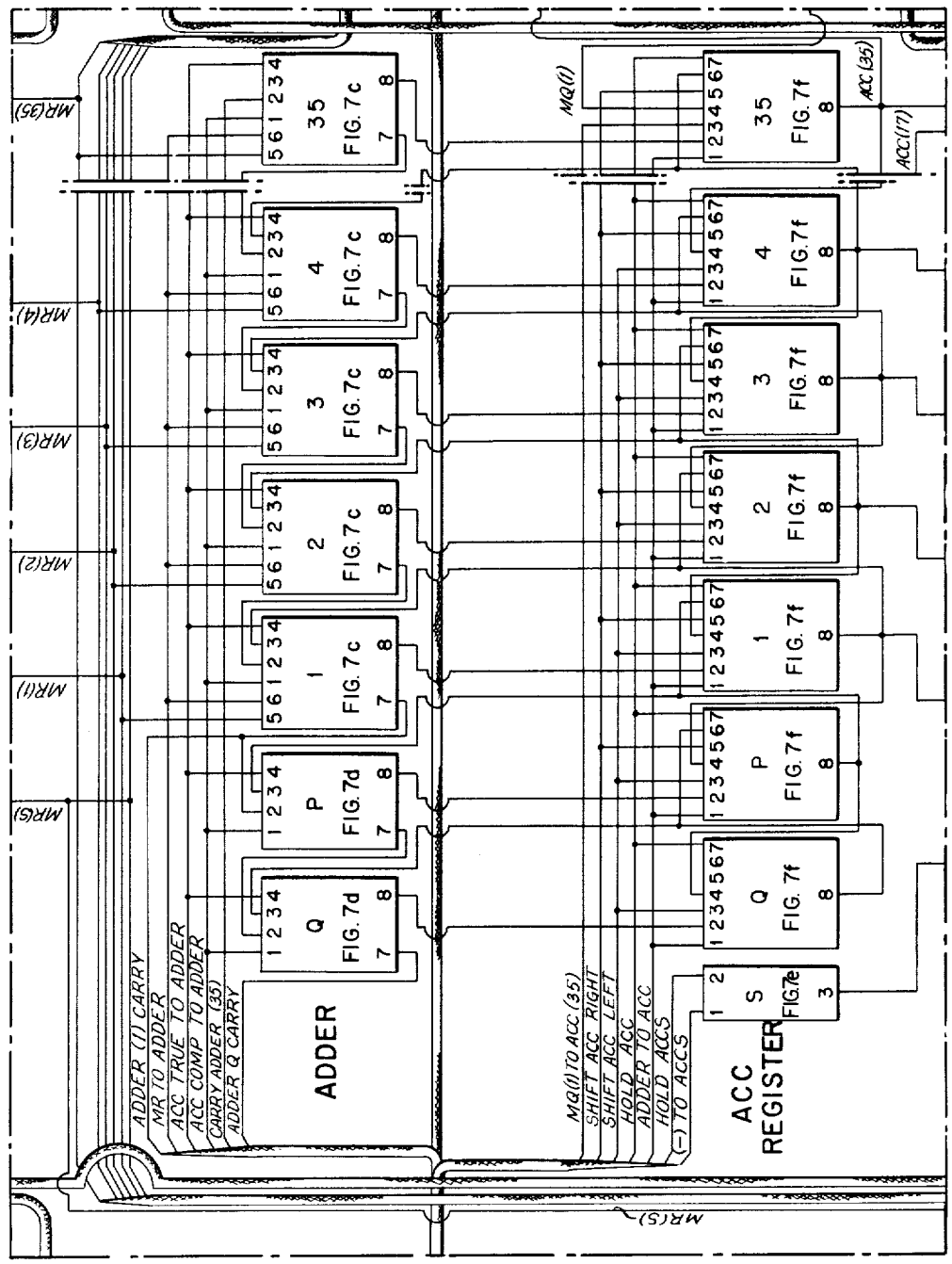

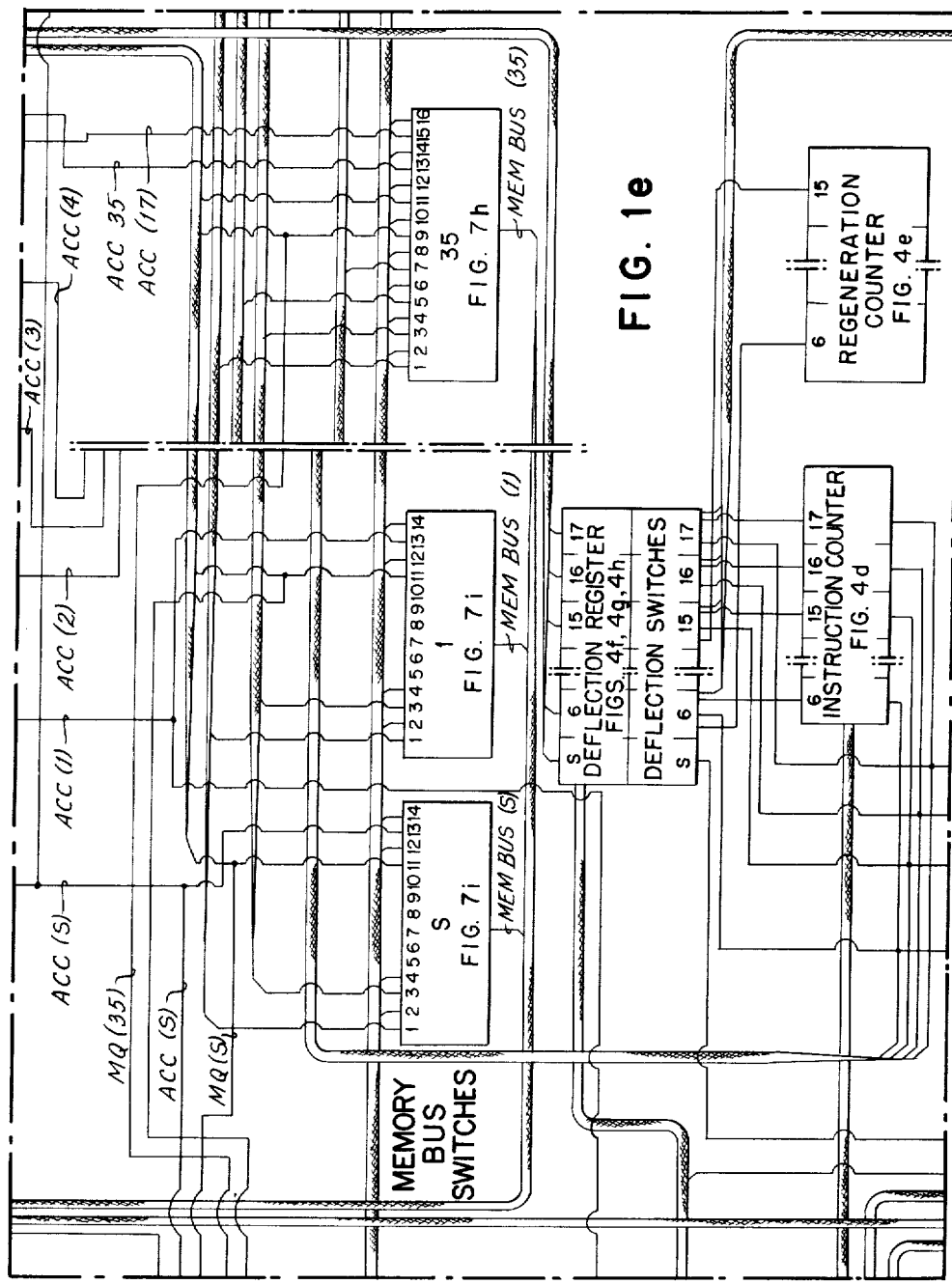

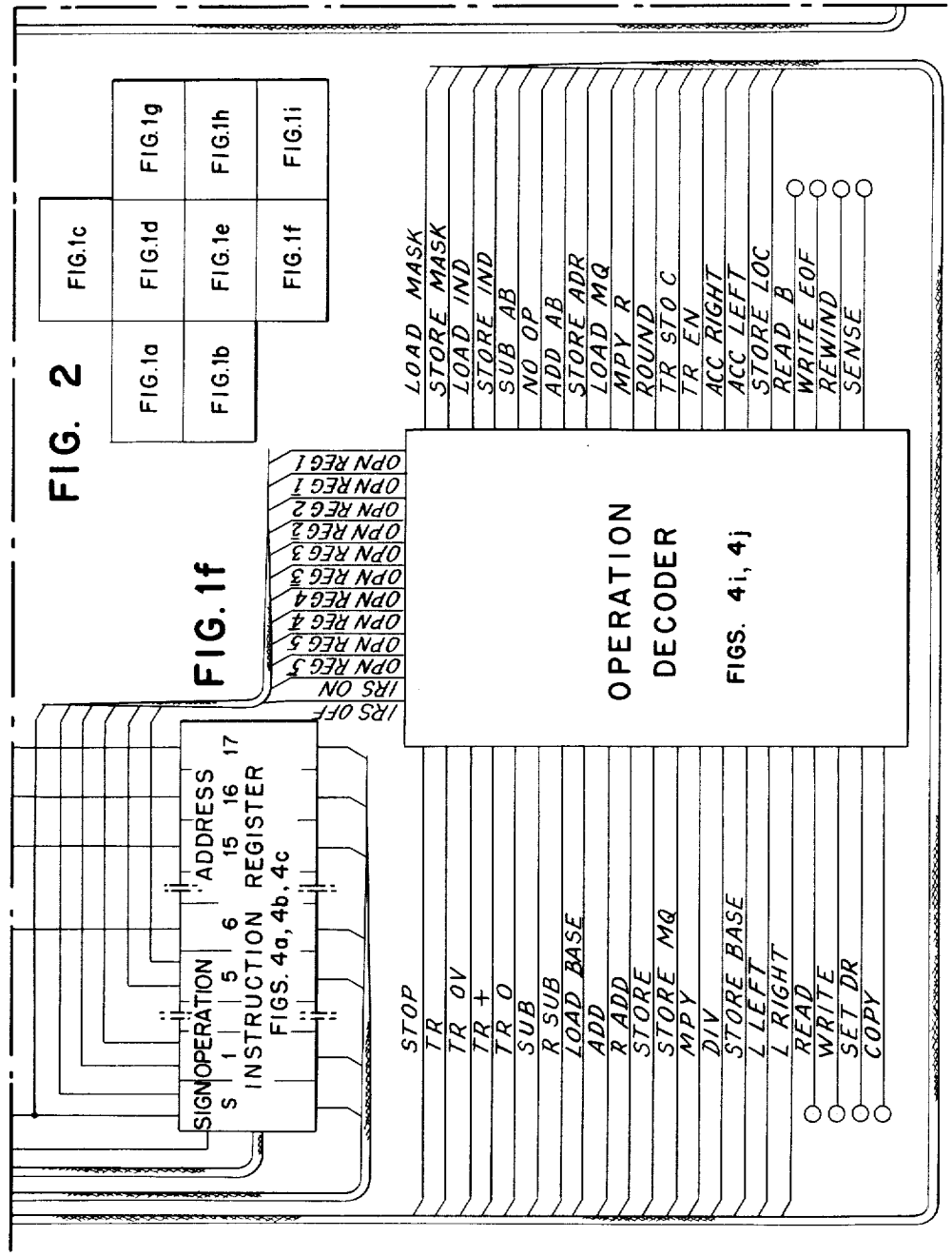

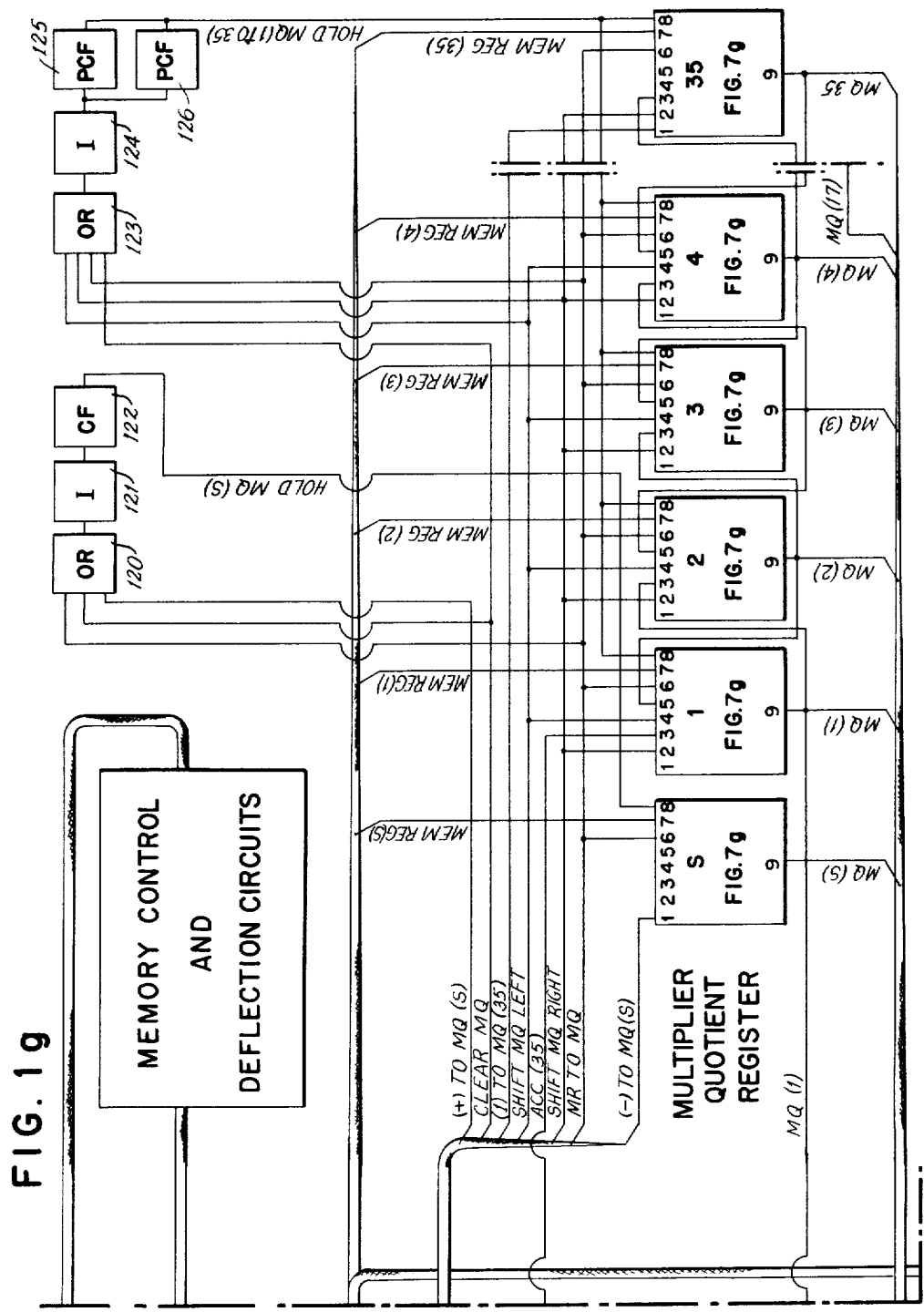

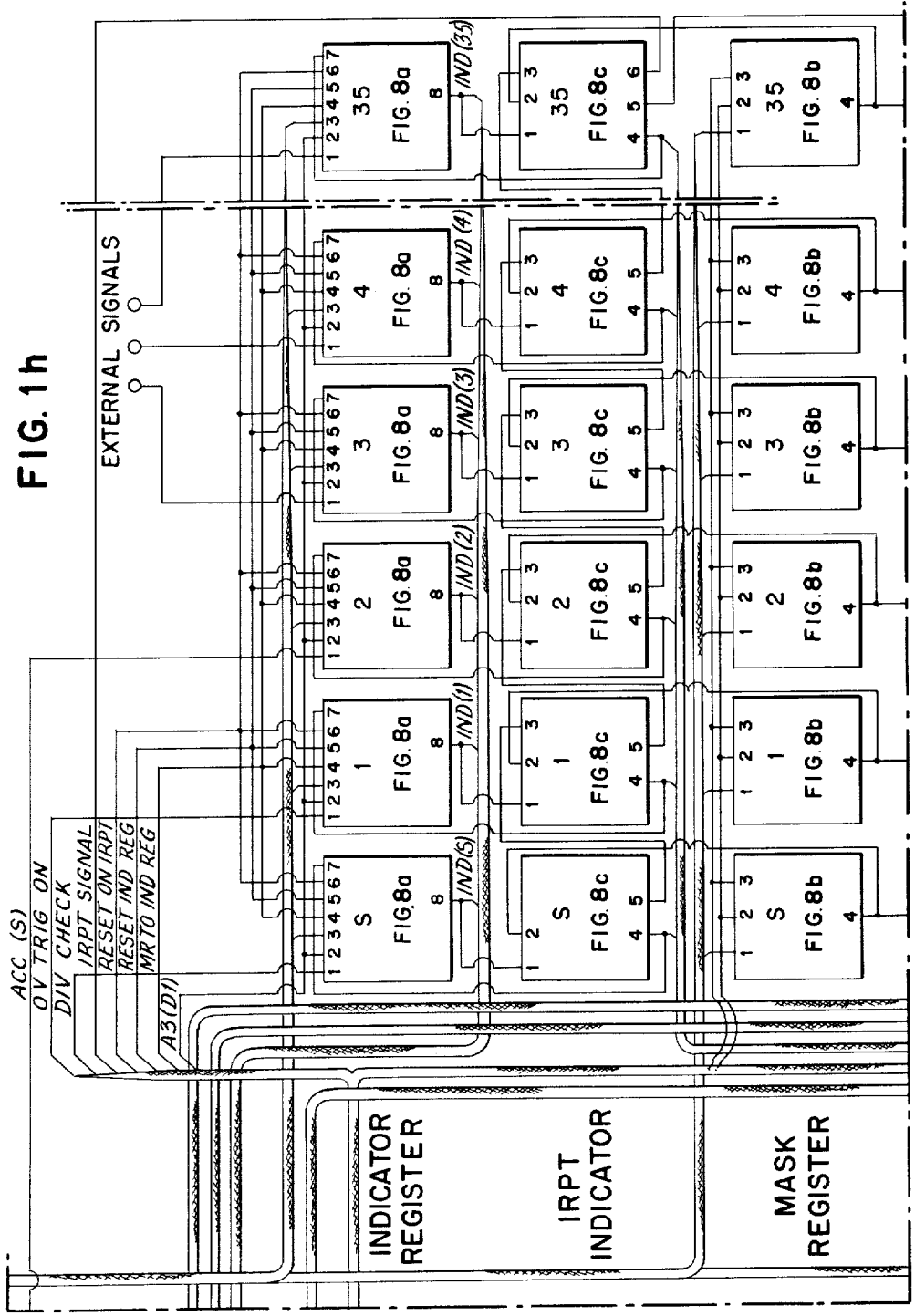

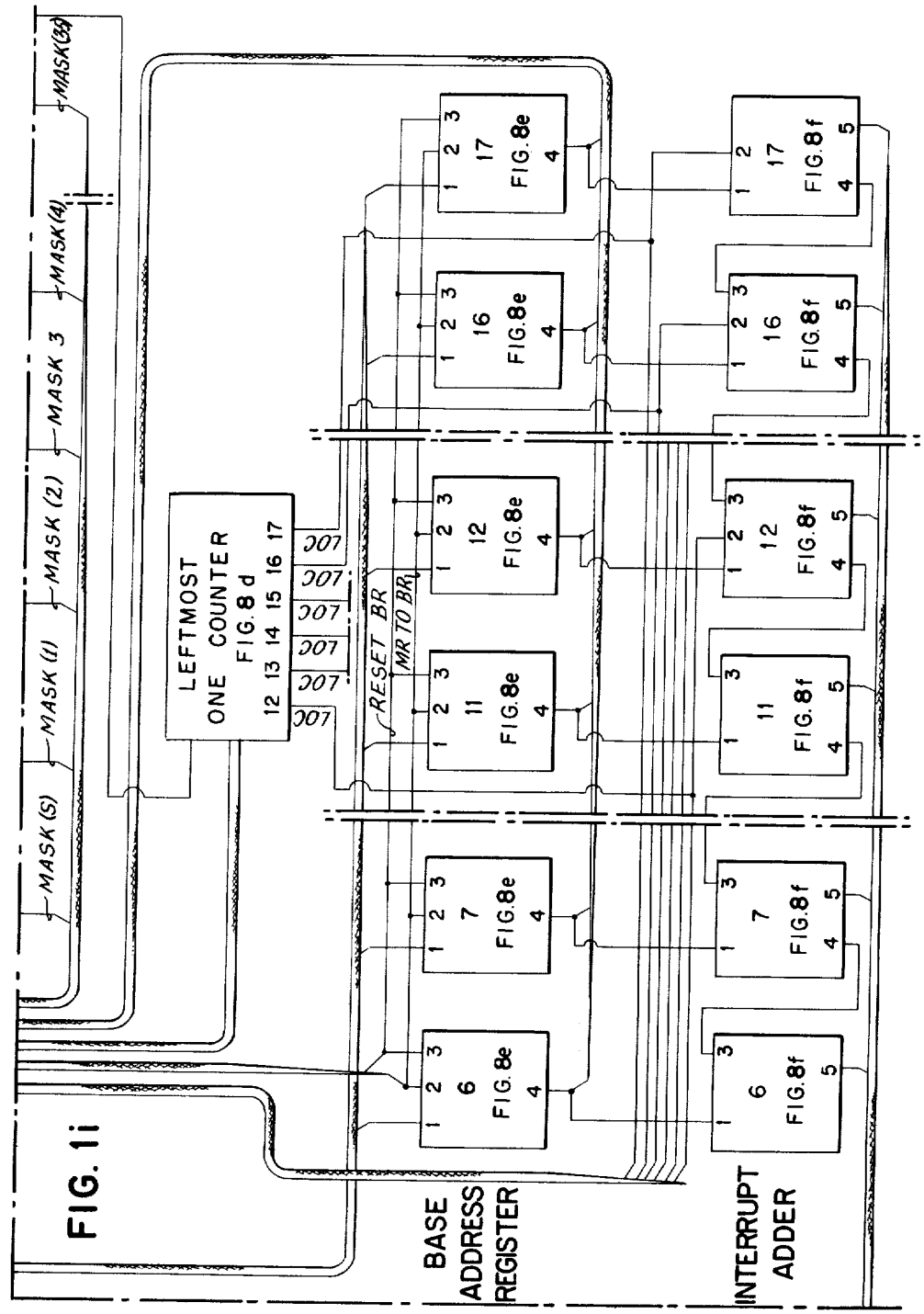

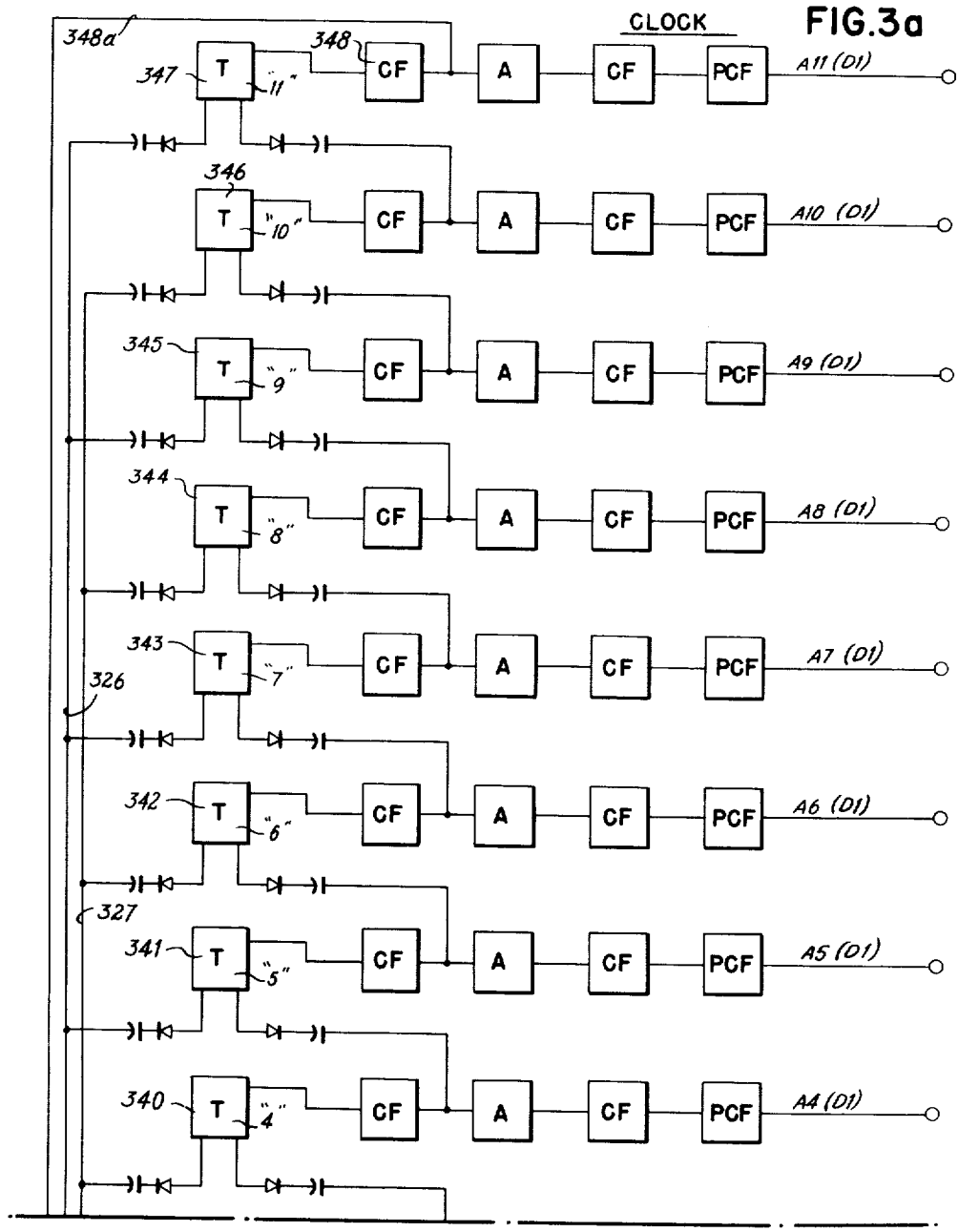

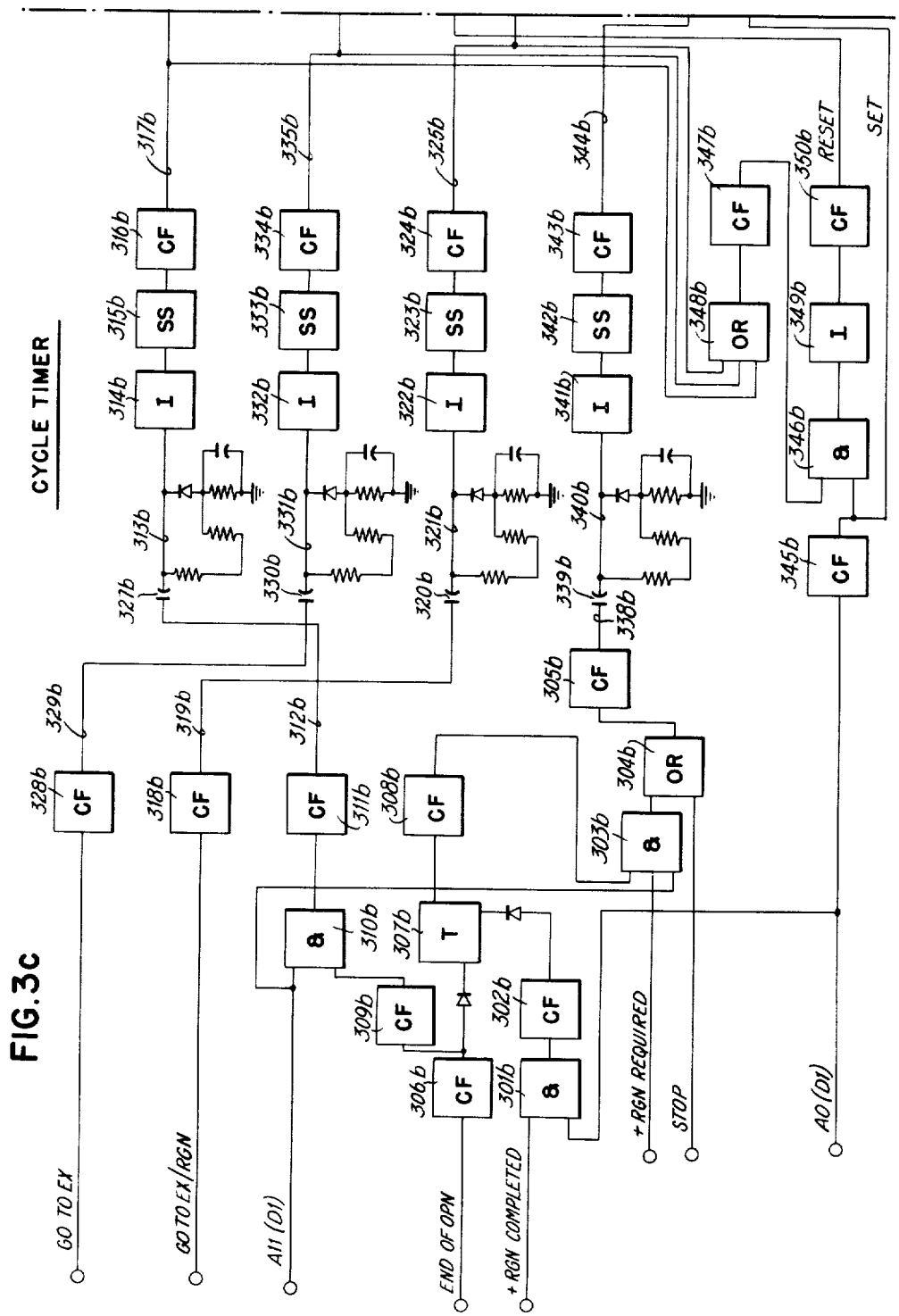

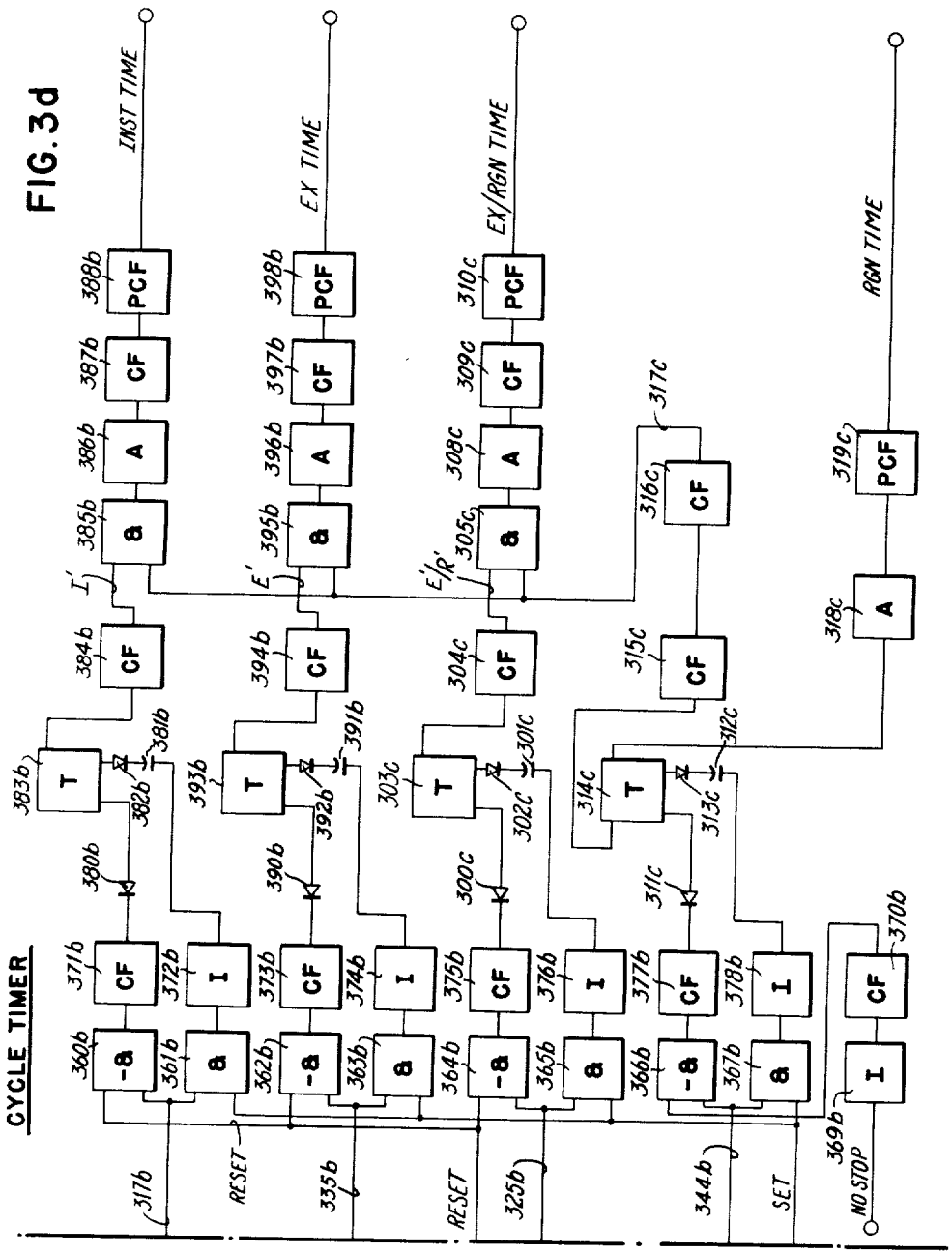

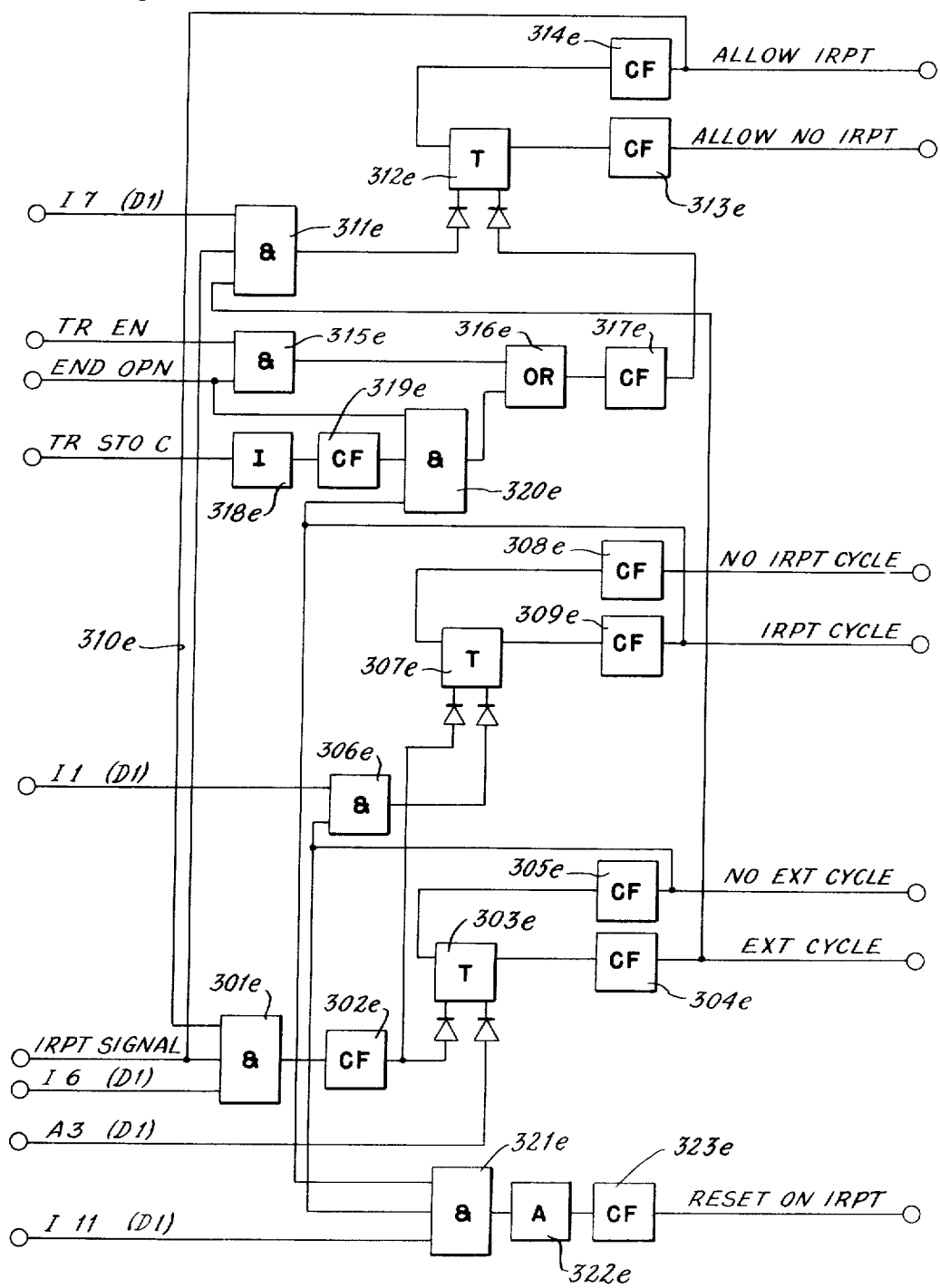

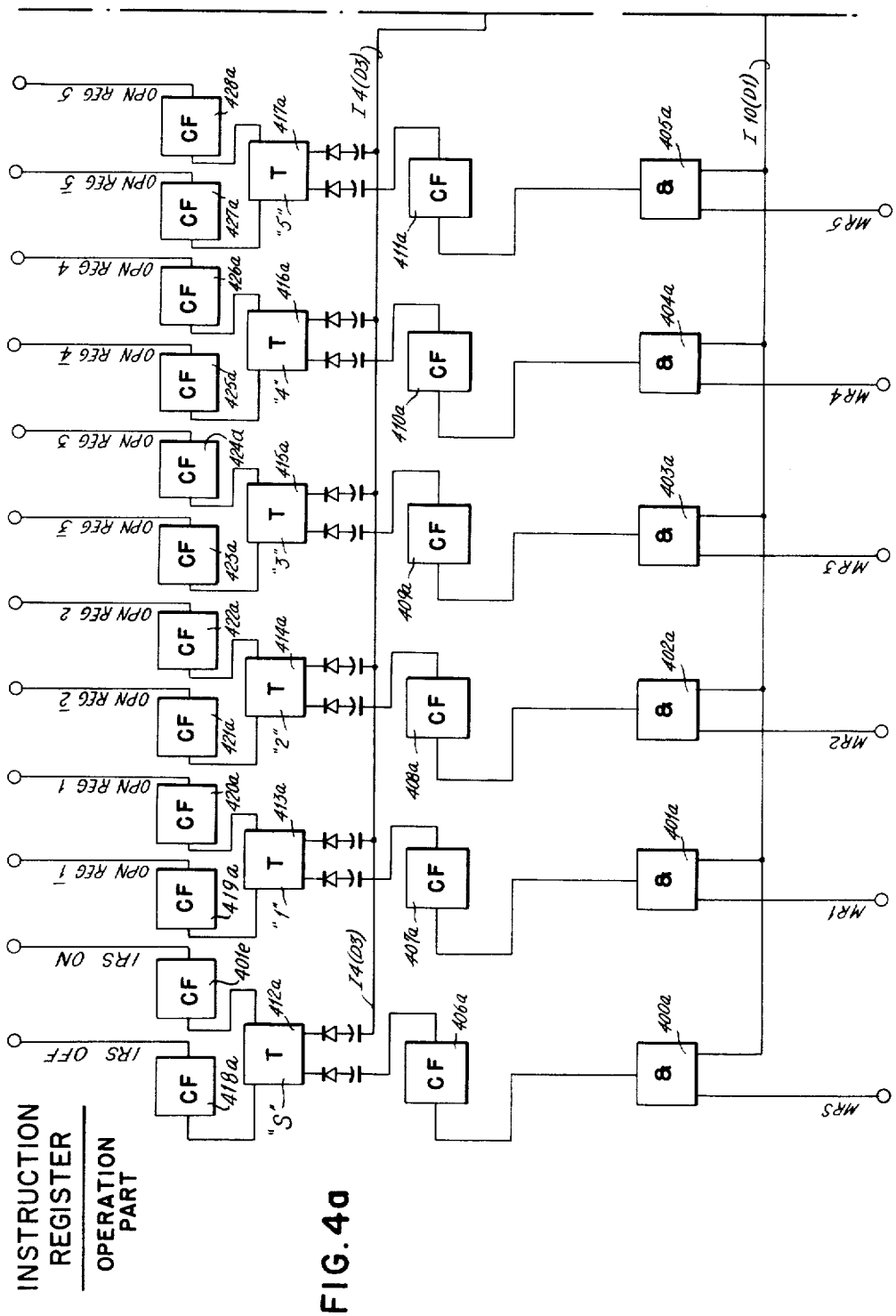

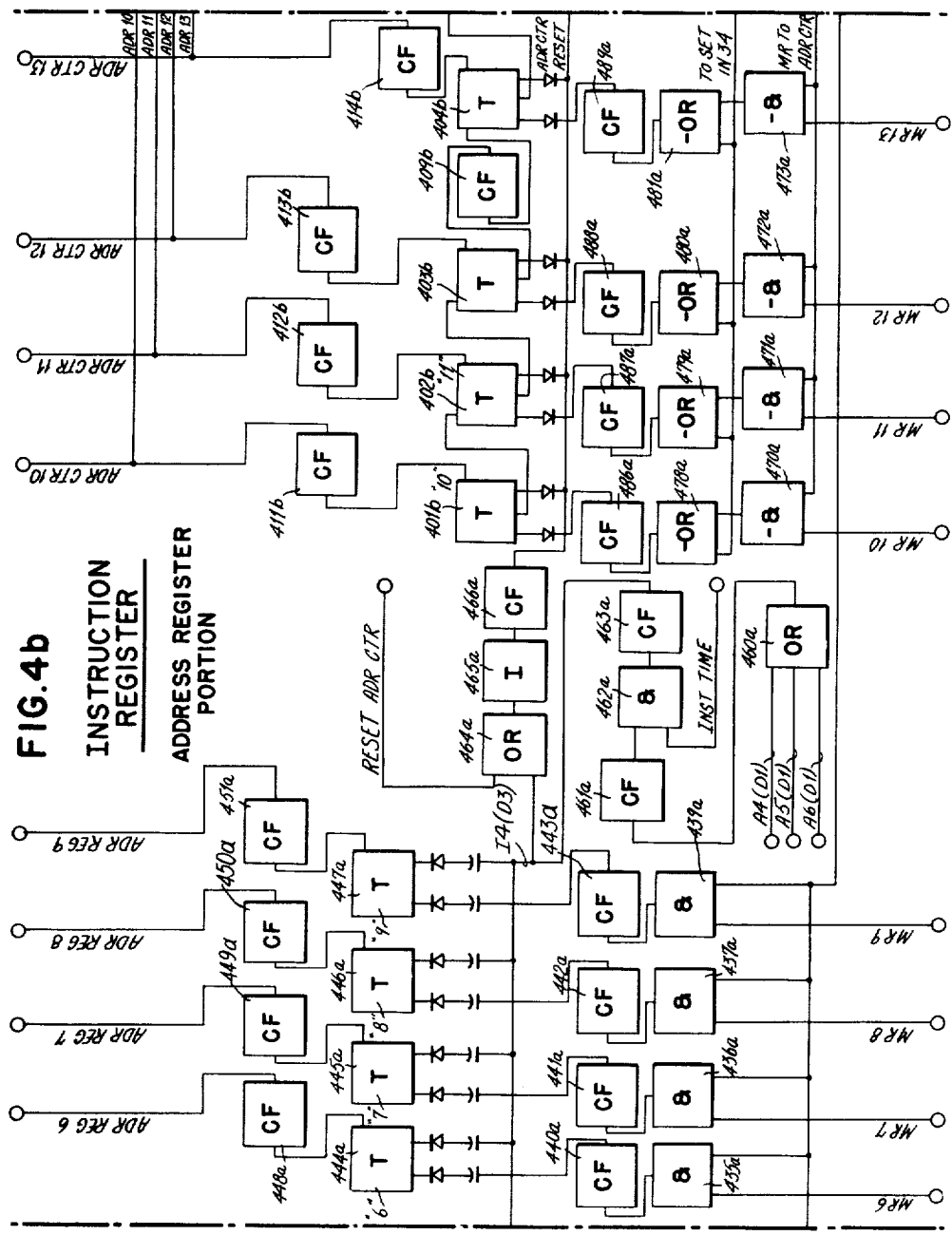

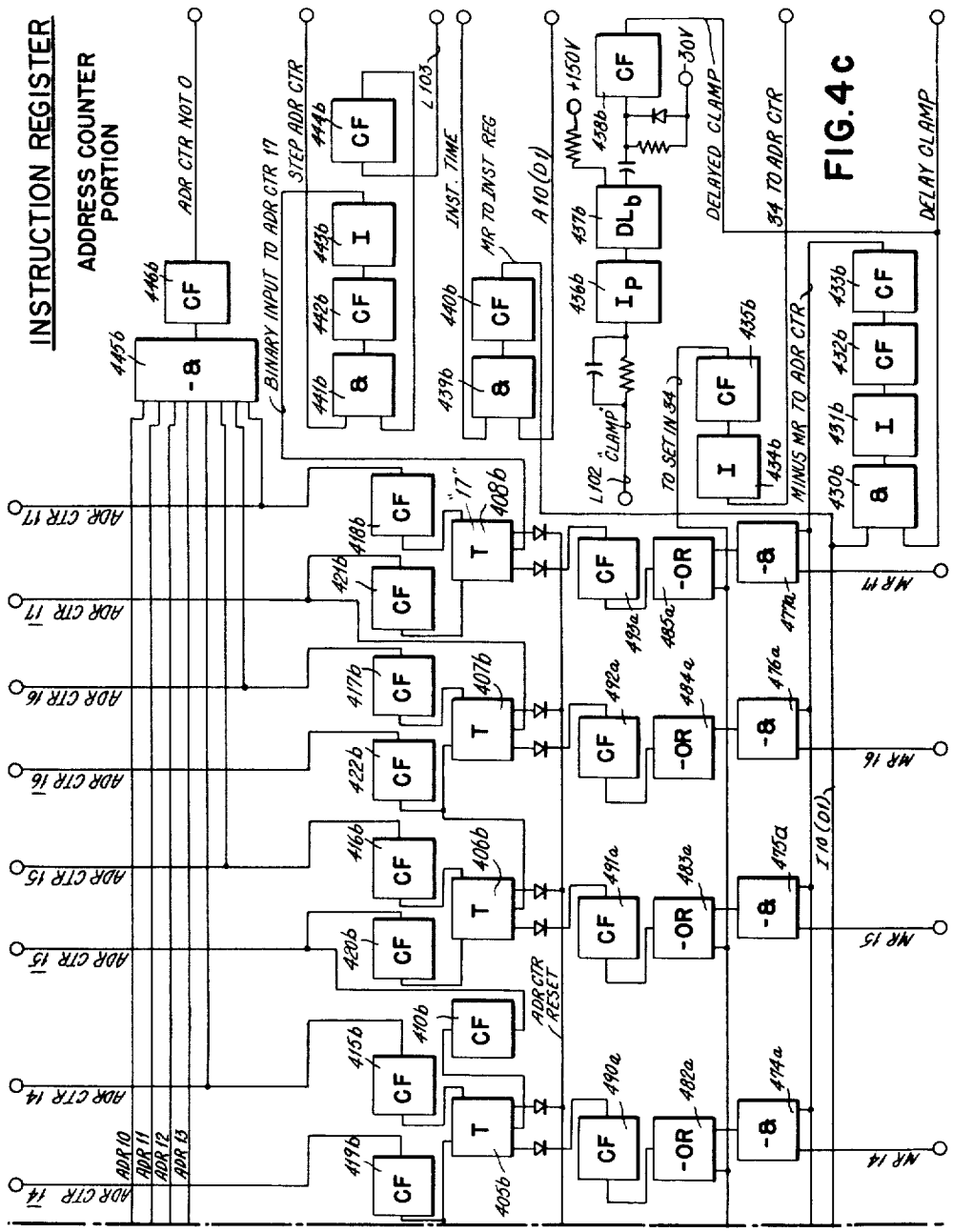

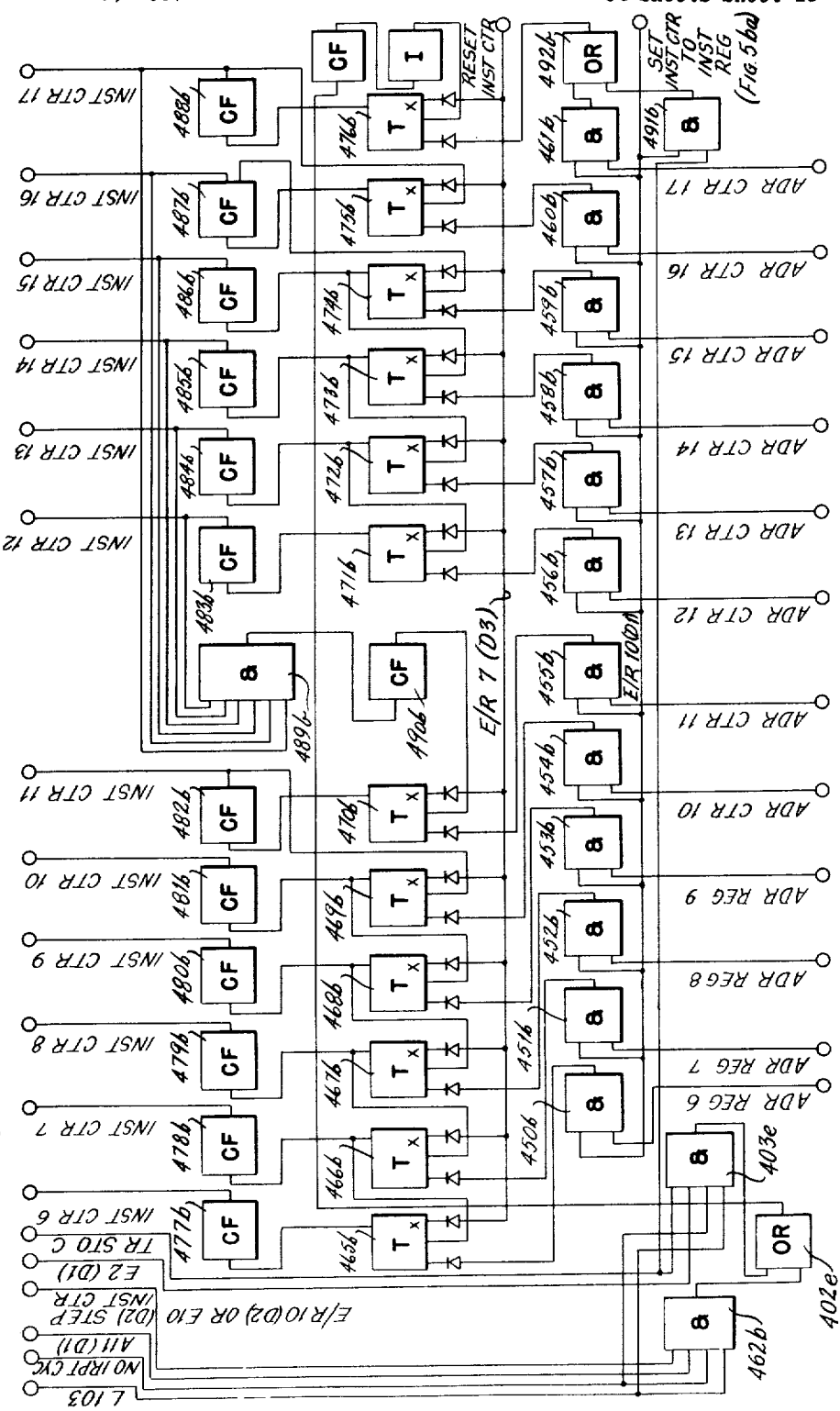

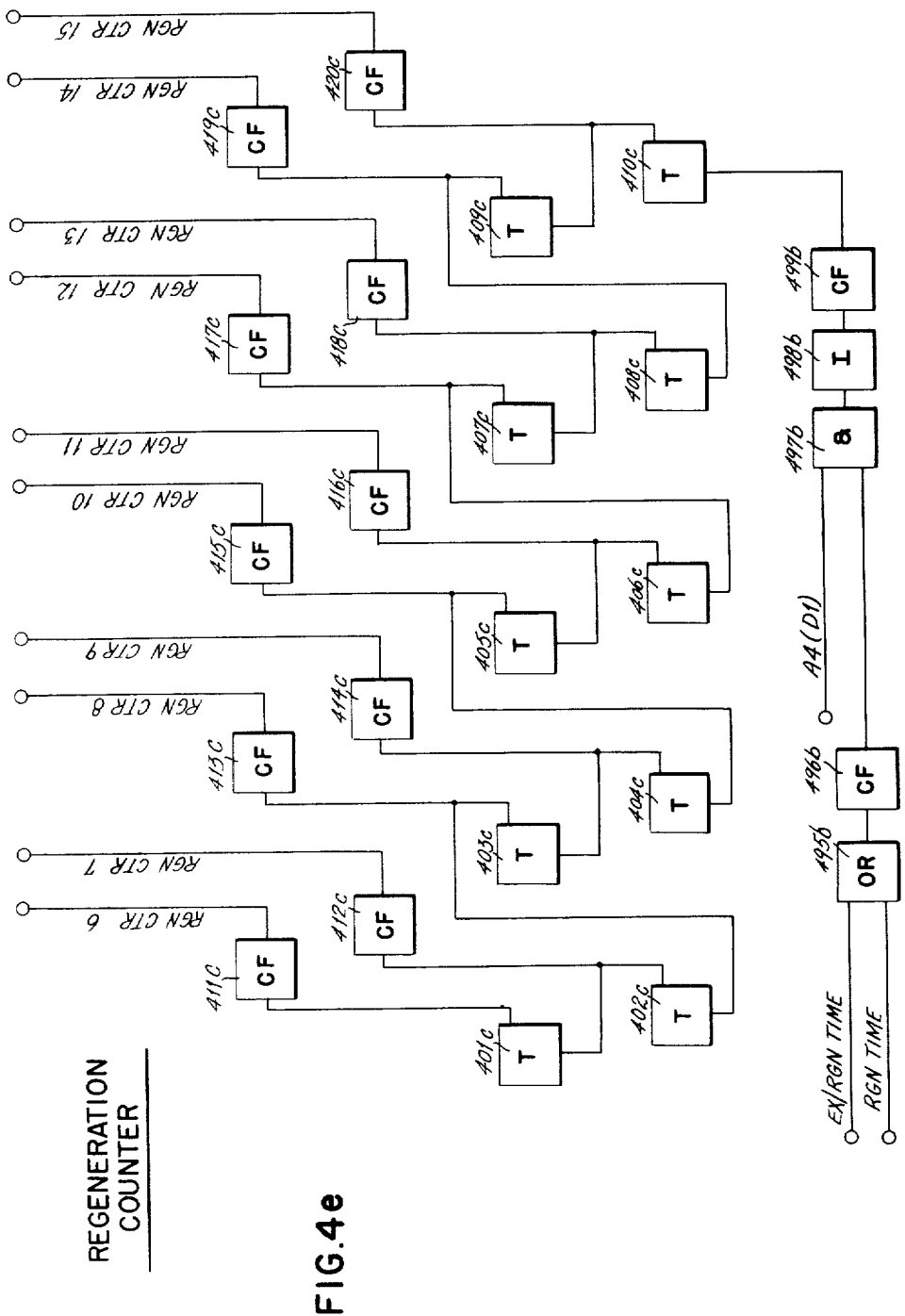

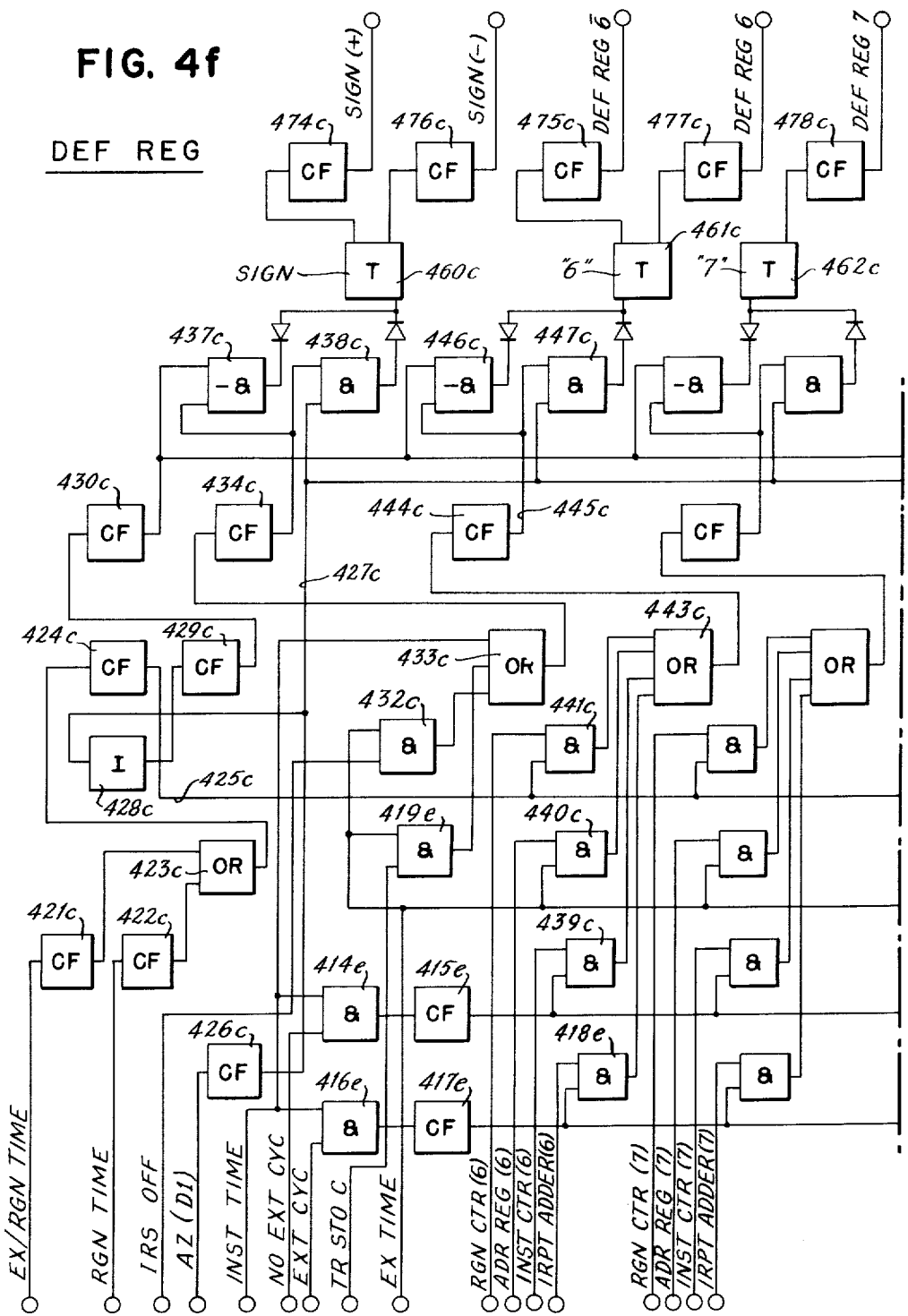

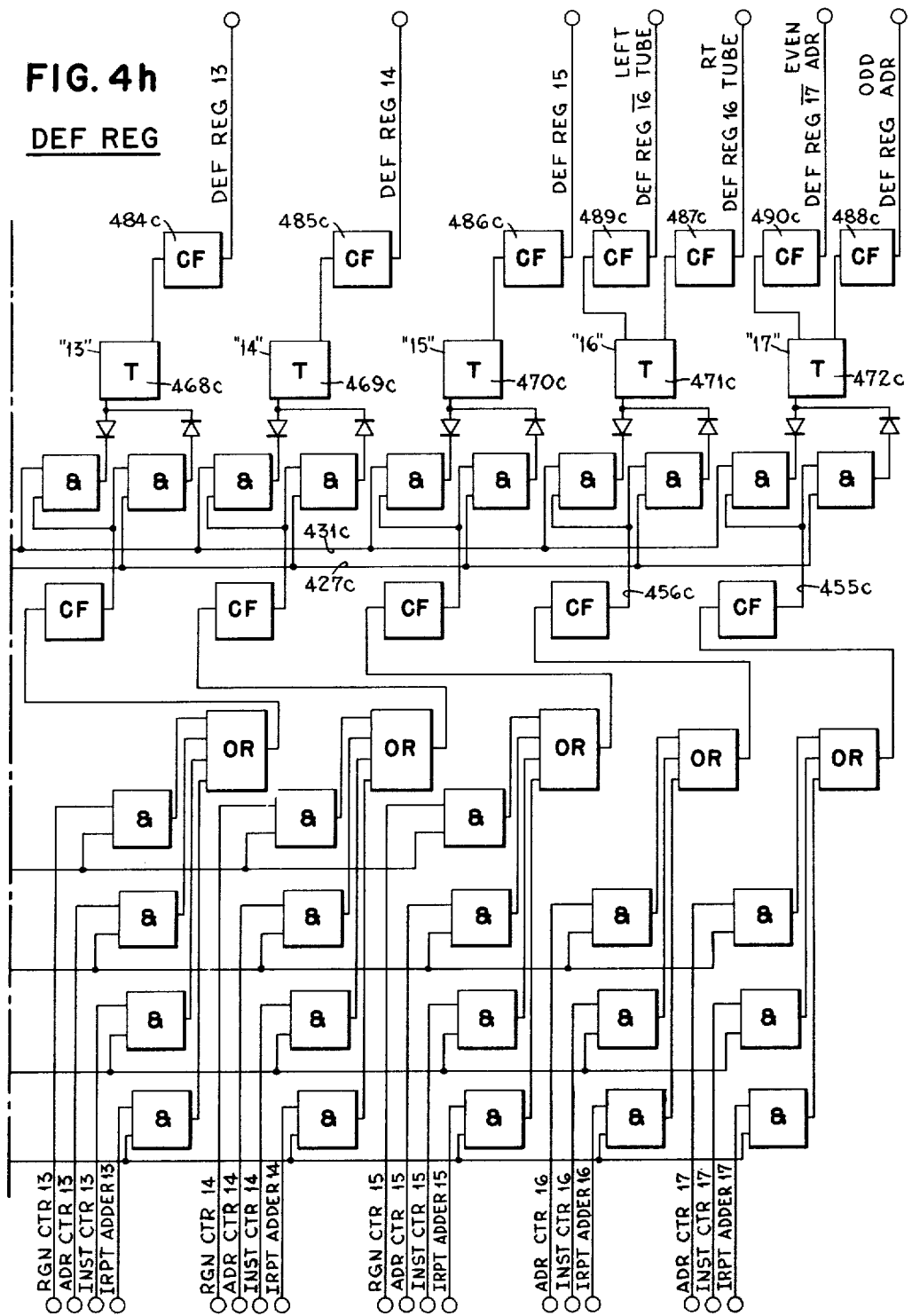

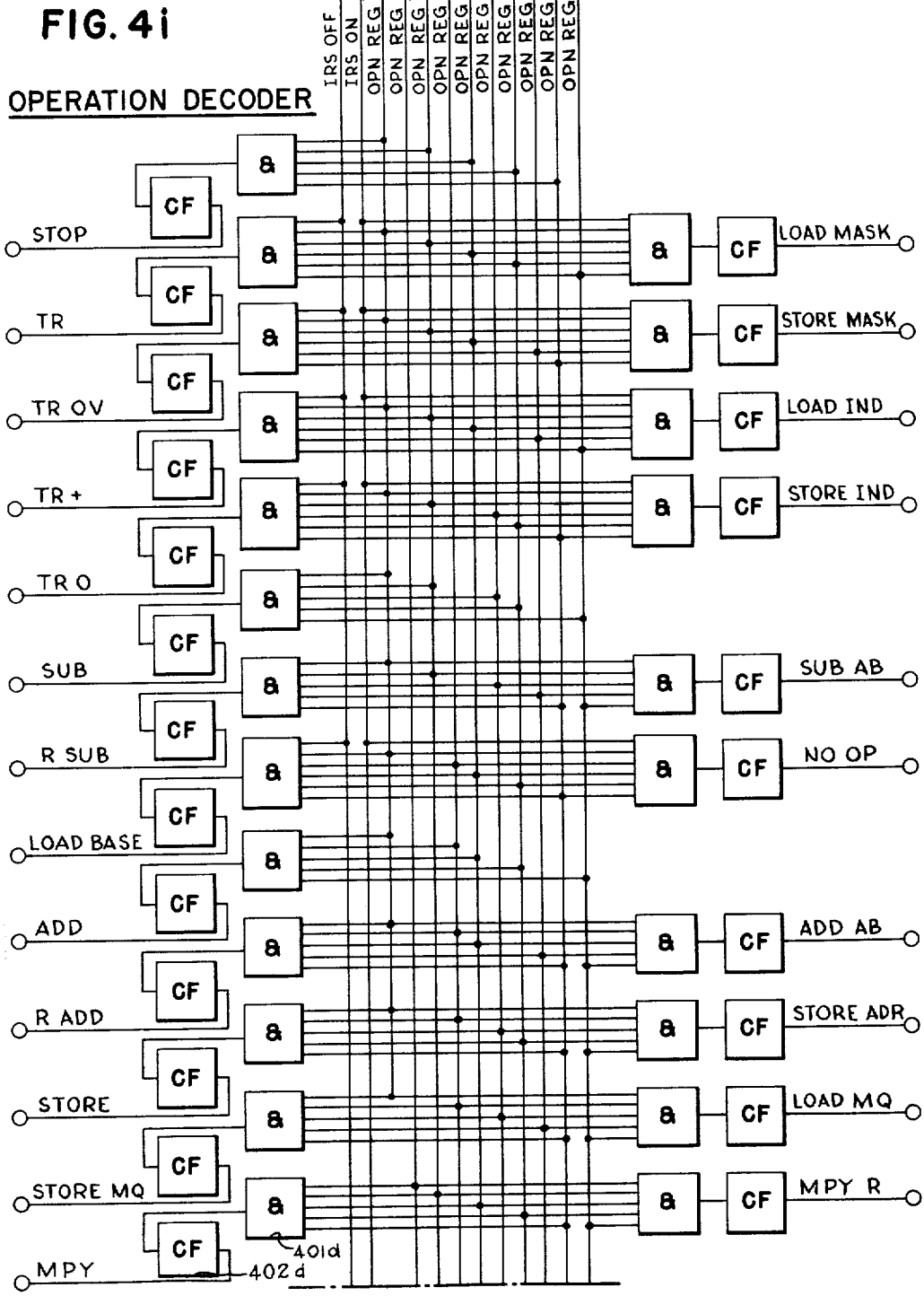

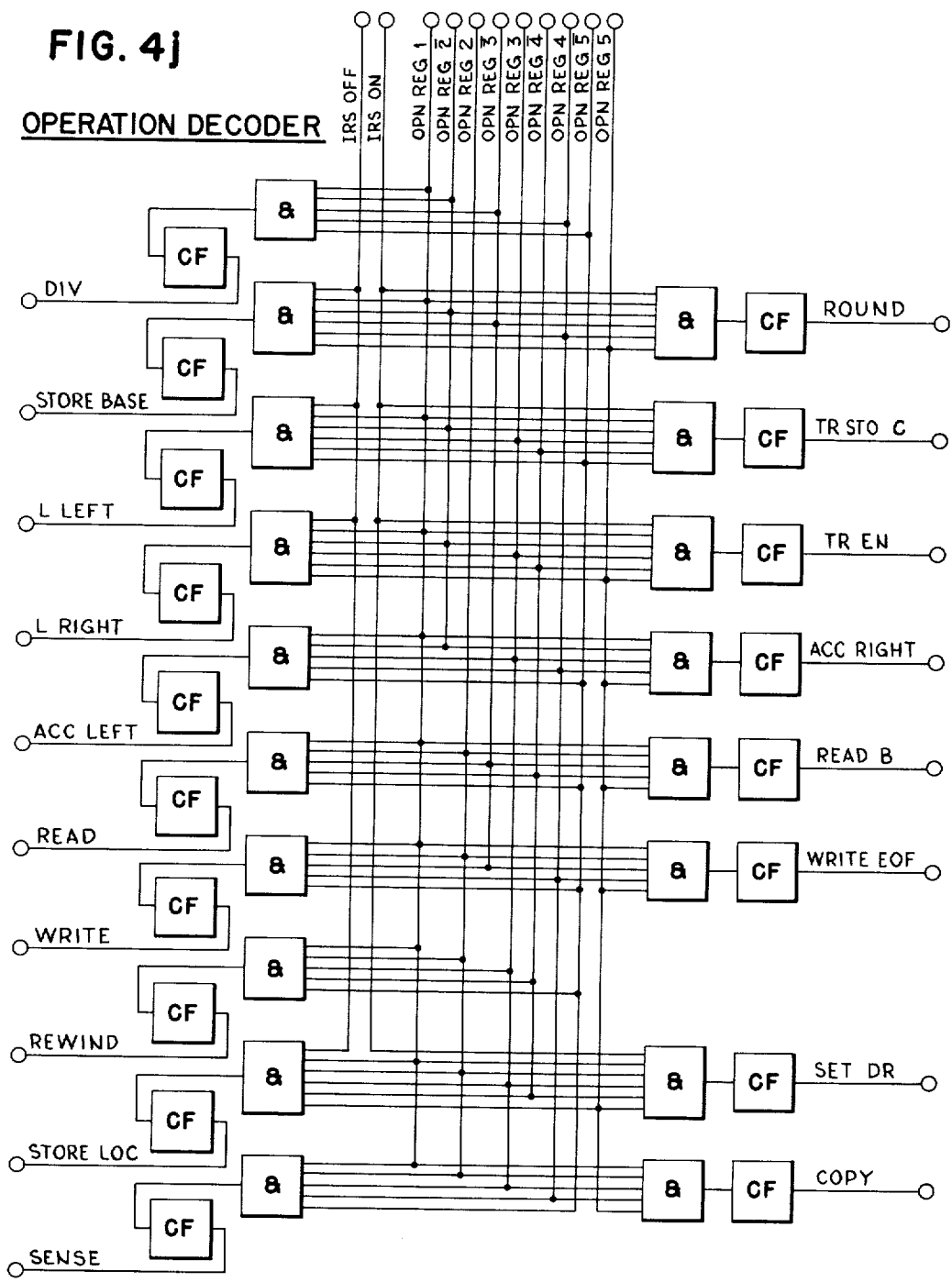

CARRY AND OVERFLOW TRIGGERS

MULT DIV TALLY COUNTER

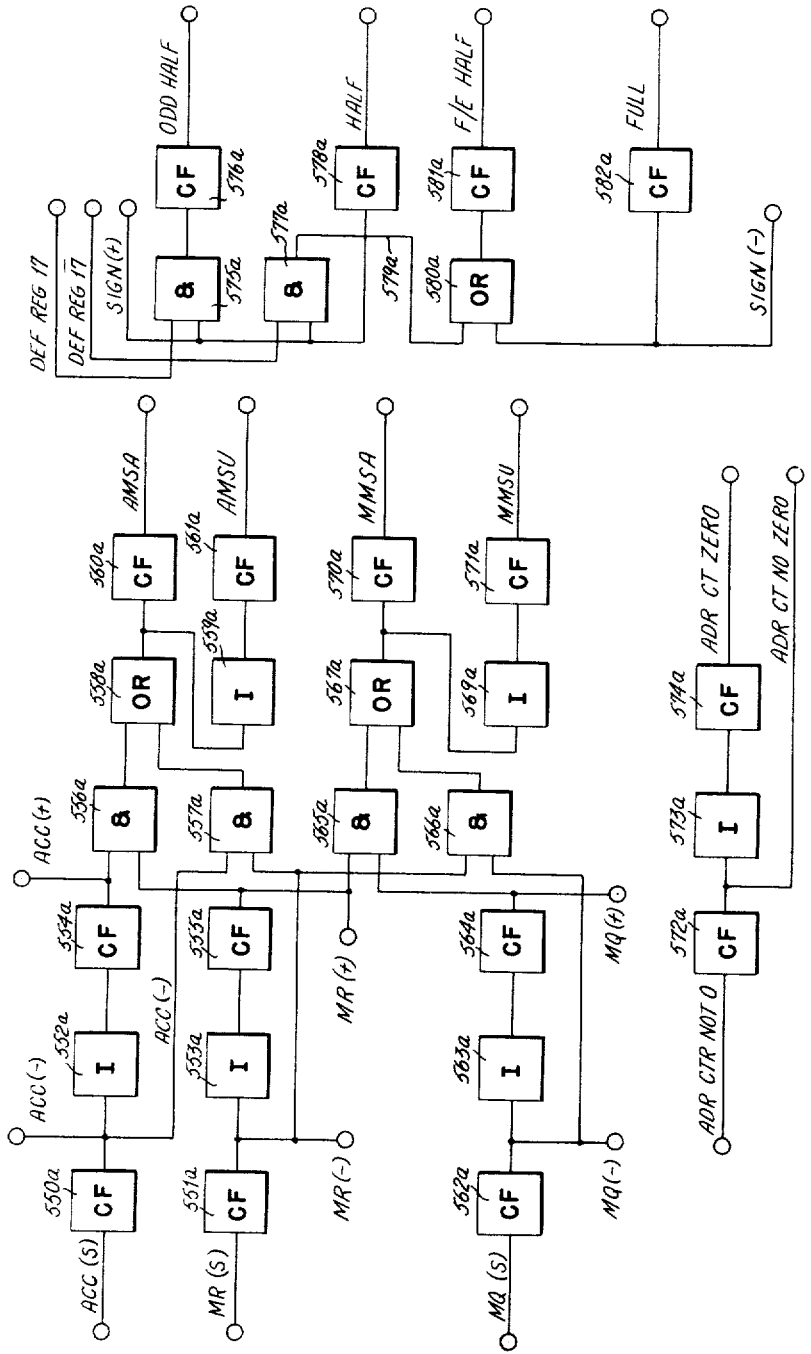

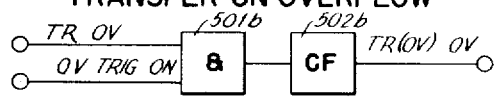
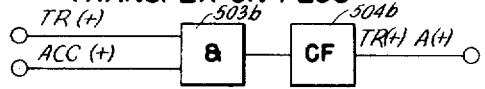
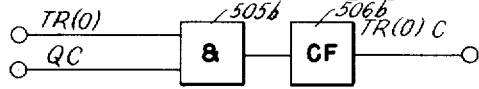
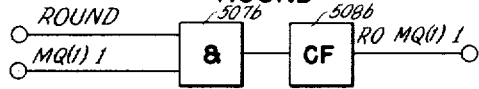
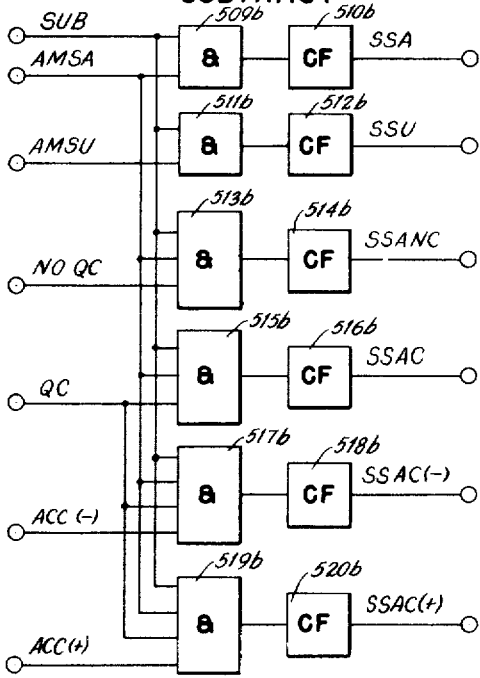
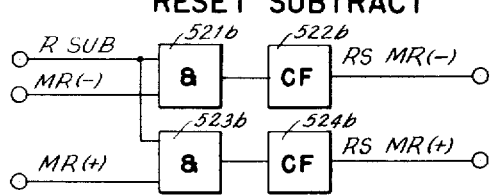
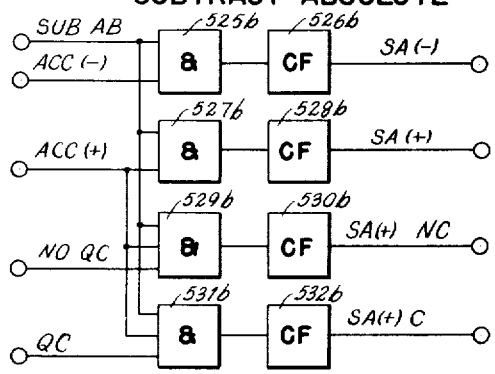
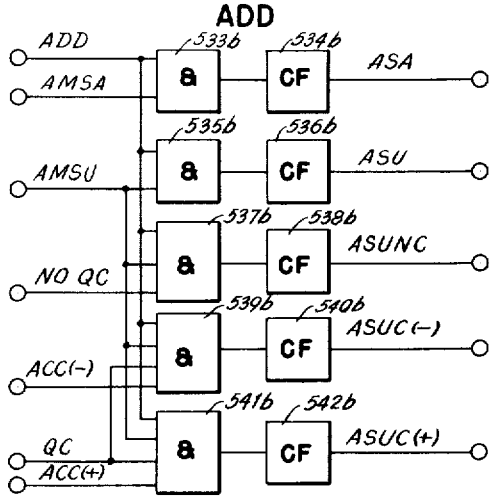

Aug. 7, 1962  F. P. BROOKS, JR., ETAL  3,048,332
PROGRAM INTERRUPT SYSTEM
Filed Dec. 9, 1957  84 Sheets-Sheet 29
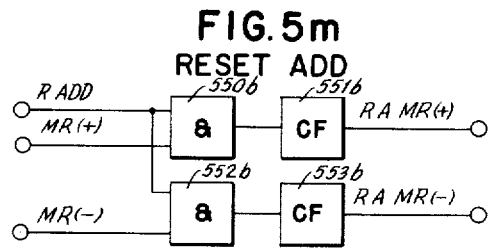
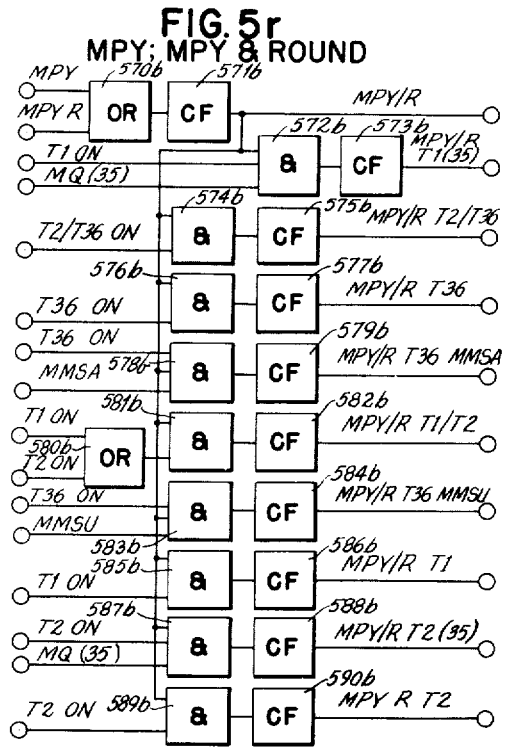
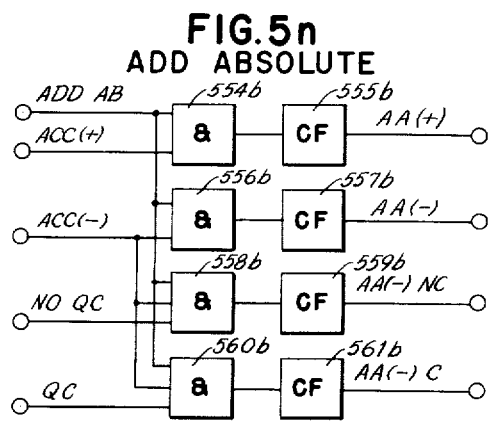
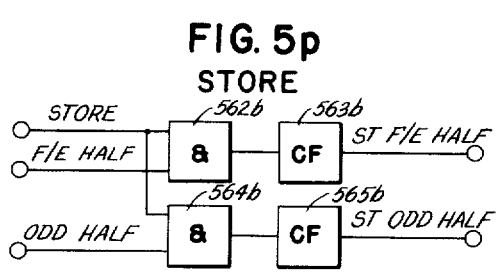
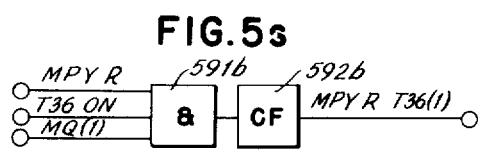
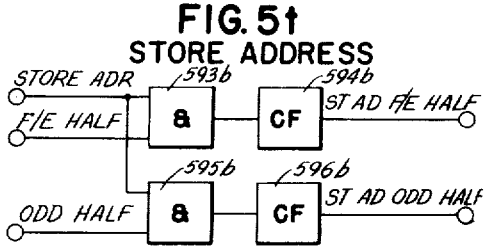
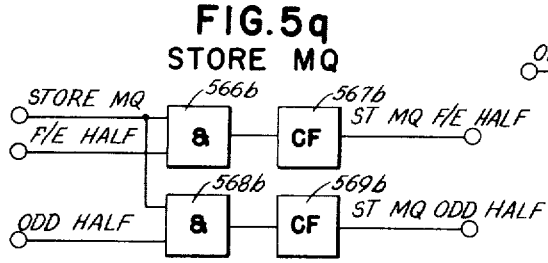

Aug. 7, 1962   F. P. BROOKS, JR., ETAL   3,048,332
PROGRAM INTERRUPT SYSTEM
Filed Dec. 9, 1957                                       84 Sheets-Sheet 30
FIG.5u
DIVIDE
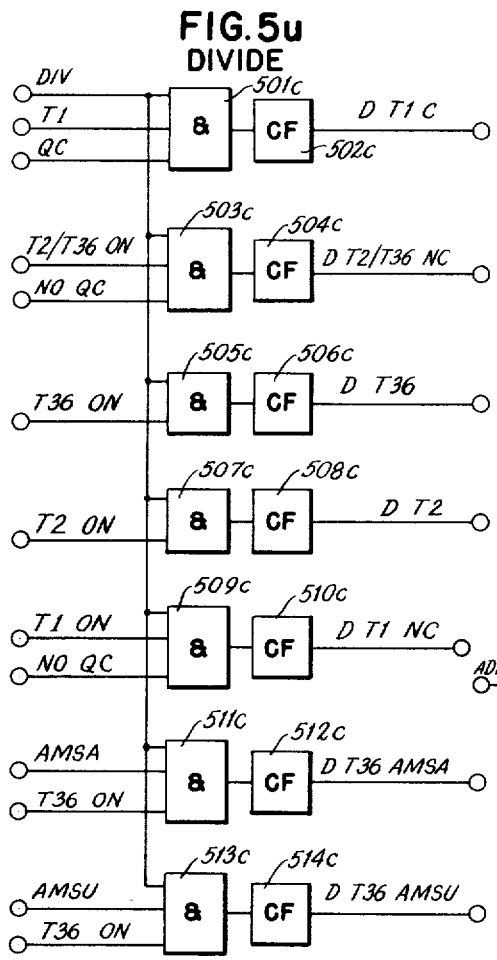
FIG.5w
LONG SHIFT LEFT
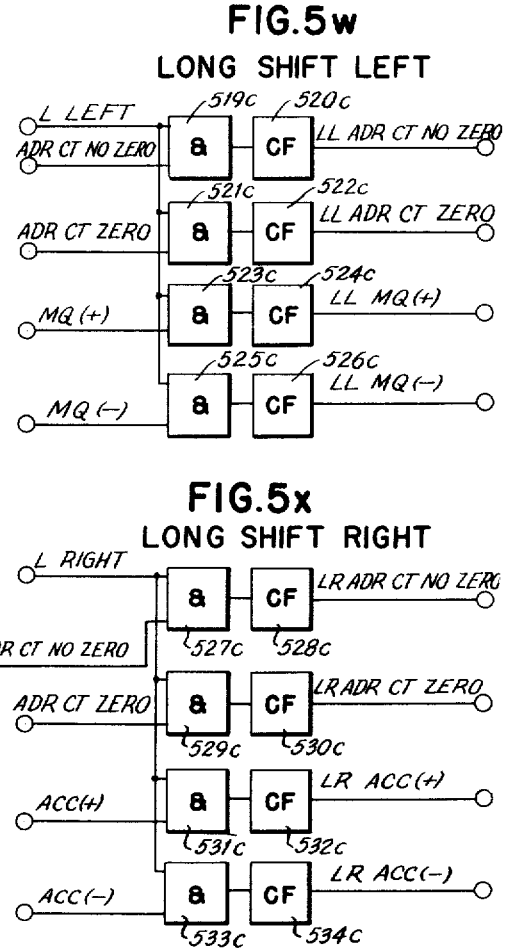
FIG.5x
LONG SHIFT RIGHT
FIG.5v
SHIFT ACC LEFT
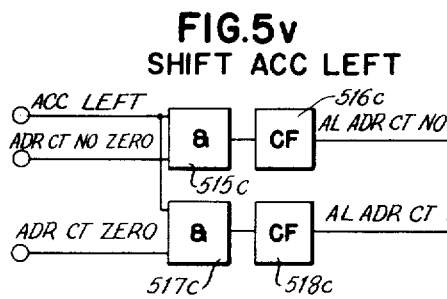
FIG.5y
SHIFT ACC RIGHT
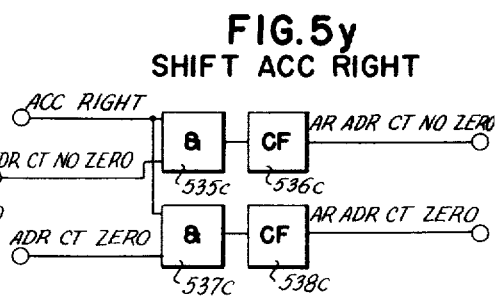

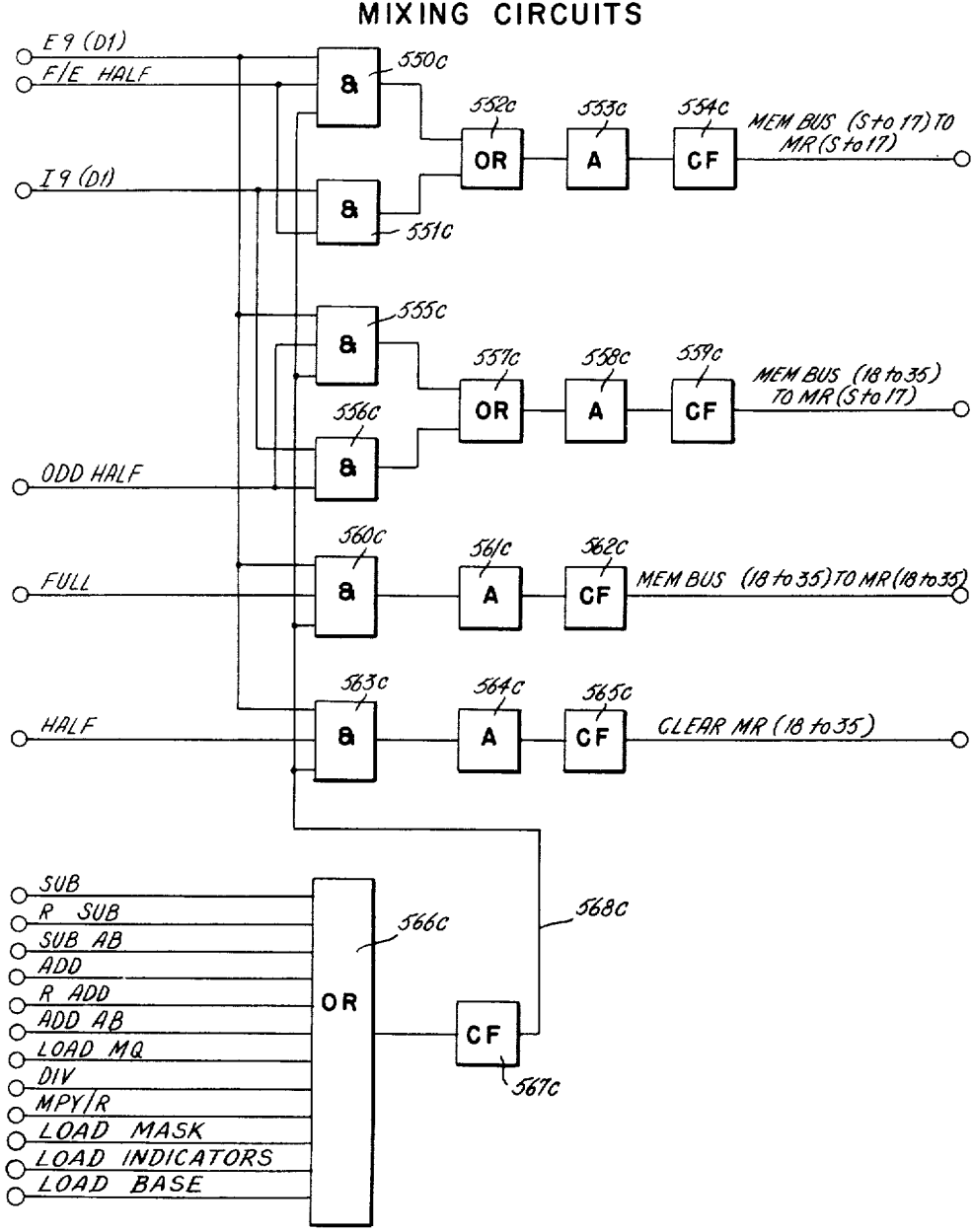
FIG. 5z  MIXING CIRCUITS

Aug. 7, 1962     F. P. BROOKS, JR., ETAL     3,048,332
PROGRAM INTERRUPT SYSTEM
Filed Dec. 9, 1957     84 Sheets-Sheet 32

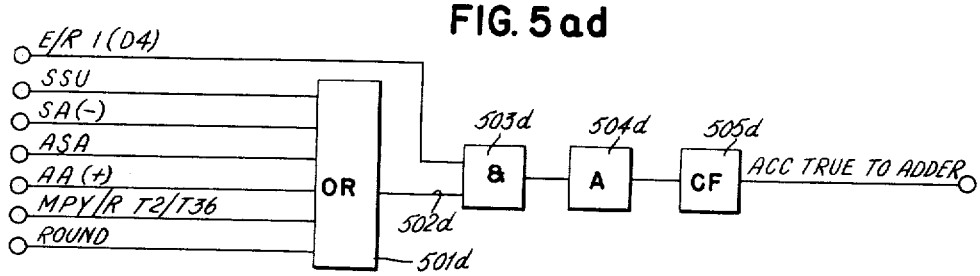
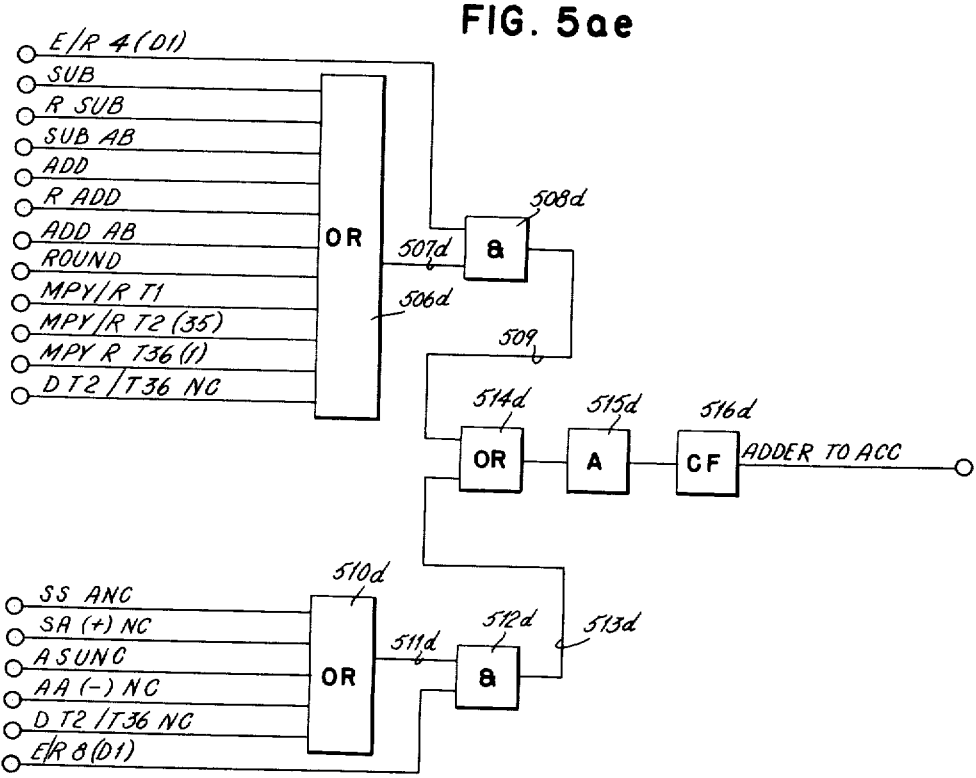

Aug. 7, 1962   F. P. BROOKS, JR., ET AL   3,048,332
PROGRAM INTERRUPT SYSTEM
Filed Dec. 9, 1957   84 Sheets-Sheet 34

FIG. 5af

Aug. 7, 1962  F. P. BROOKS, JR., ET AL  3,048,332
PROGRAM INTERRUPT SYSTEM
Filed Dec. 9, 1957  84 Sheets-Sheet 35
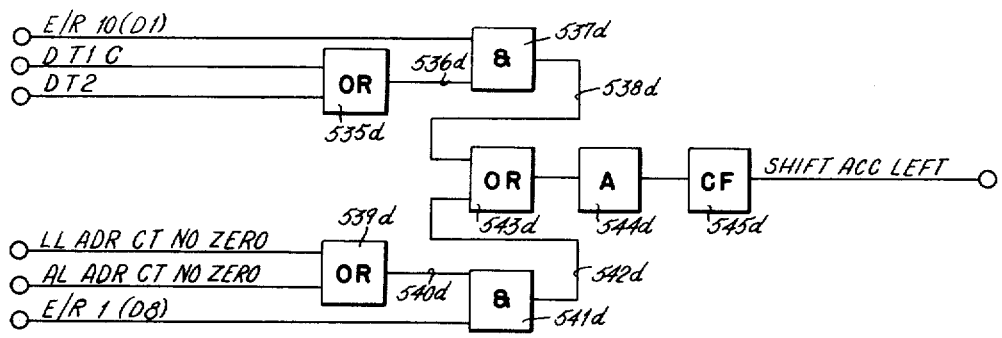
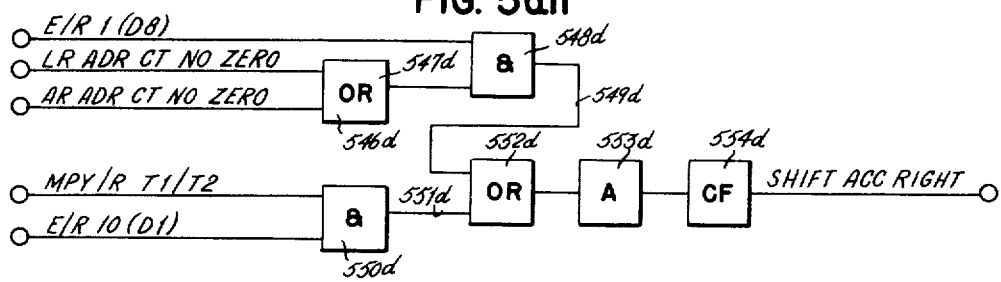
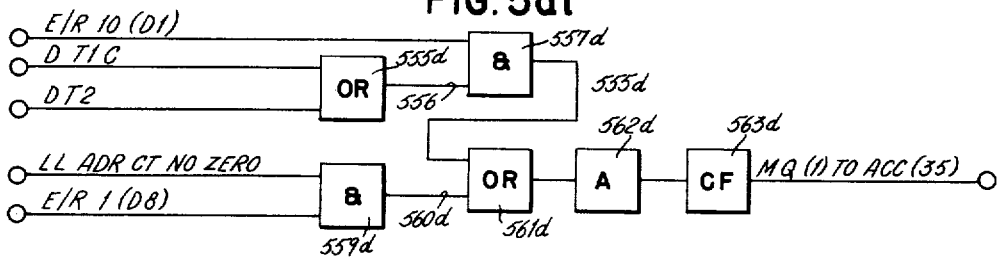
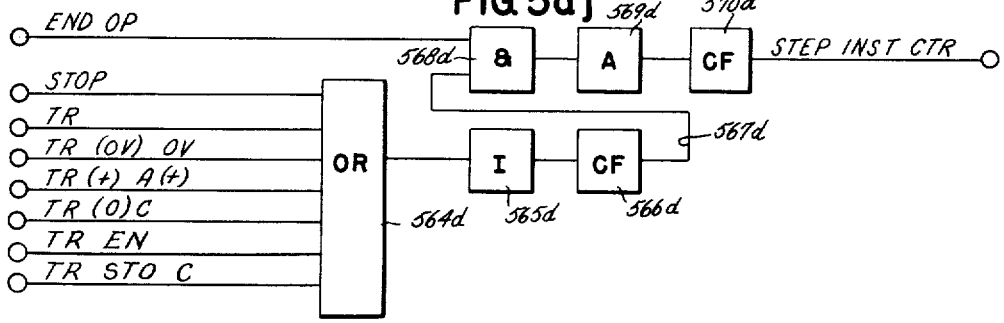

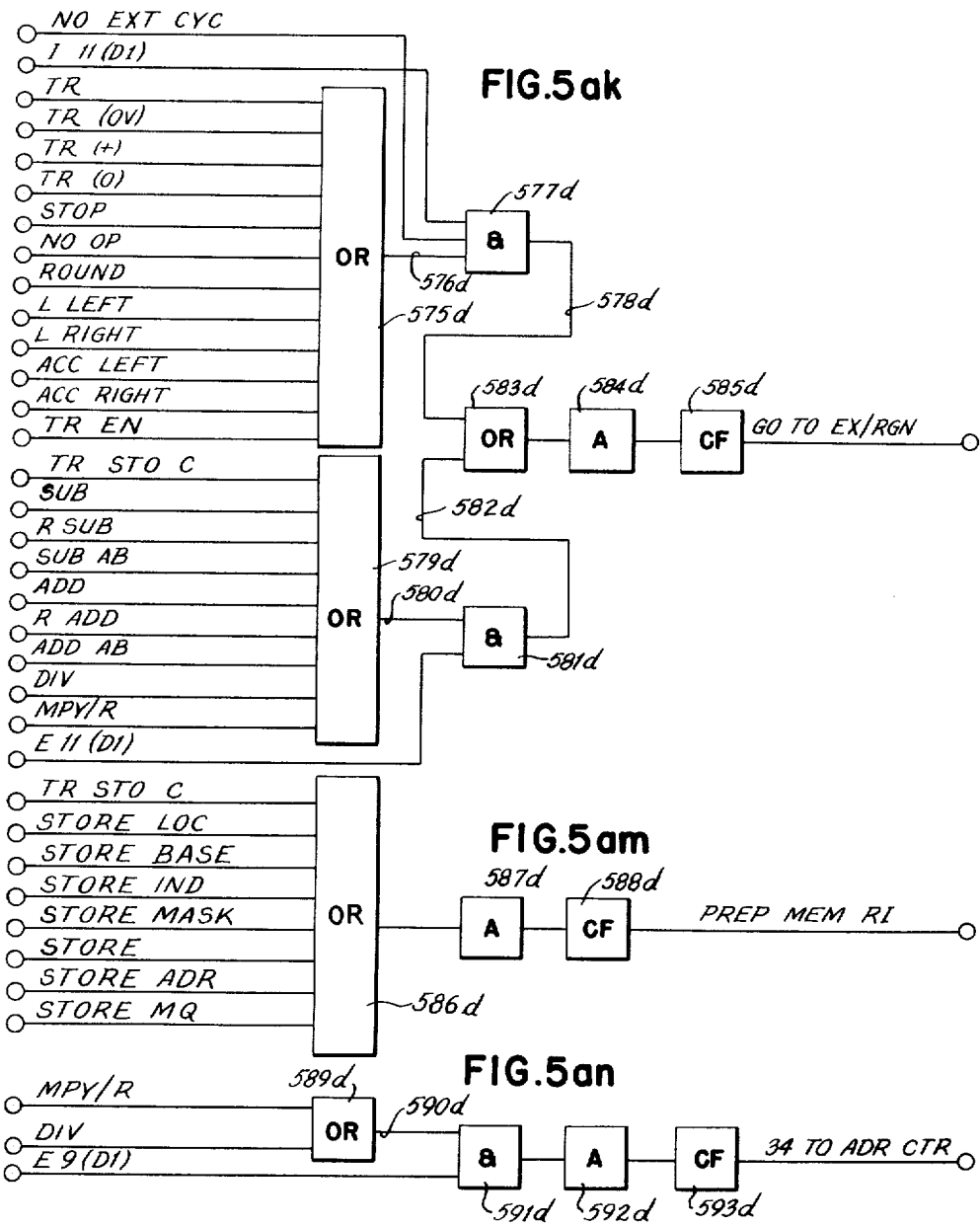

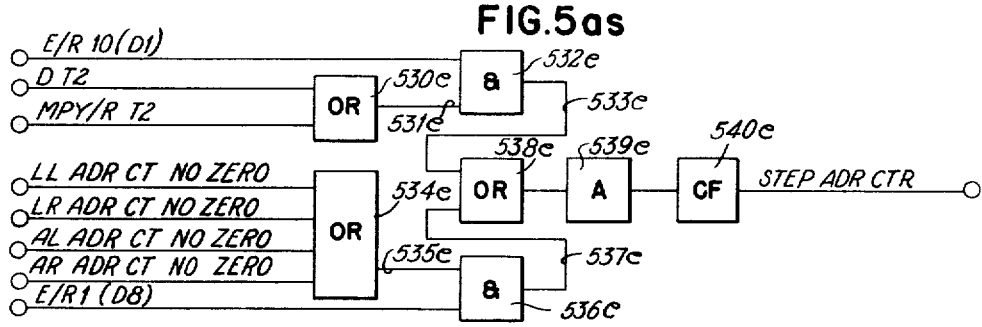
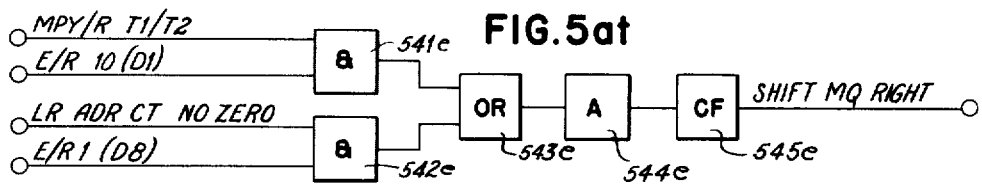
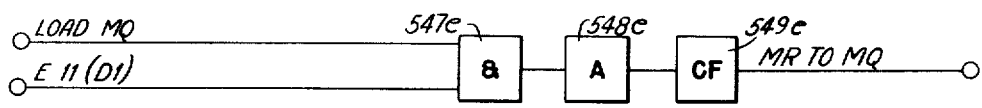
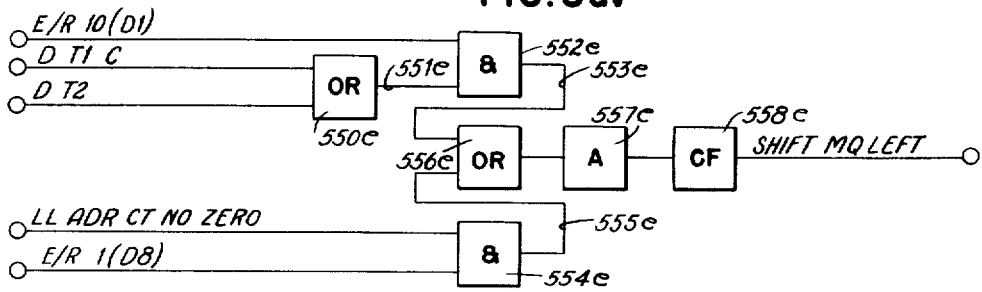
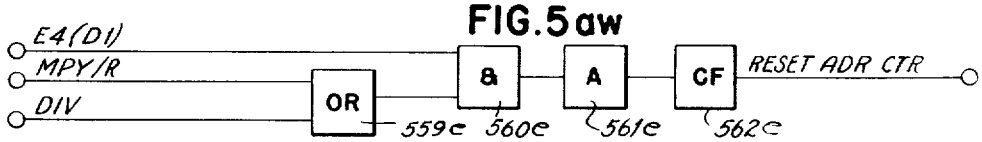

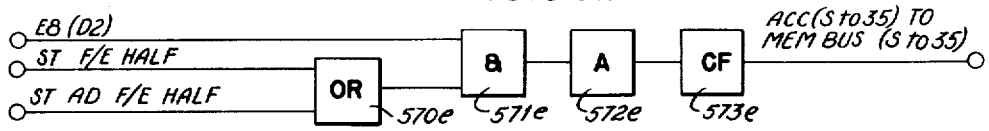
FIG.5ax
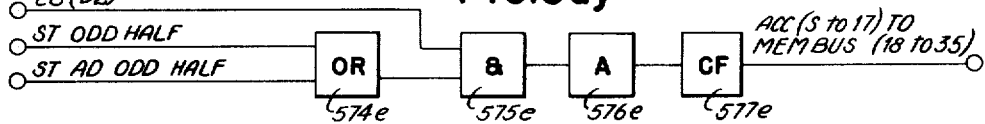
FIG.5ay
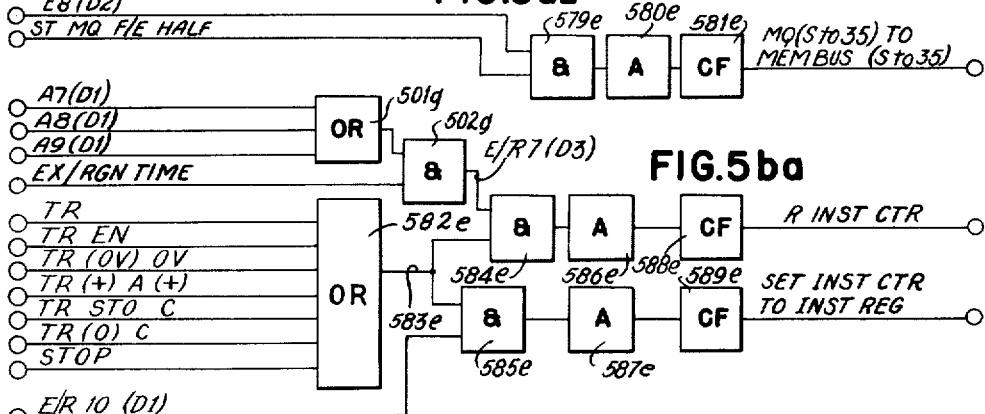
FIG.5az
FIG.5ba
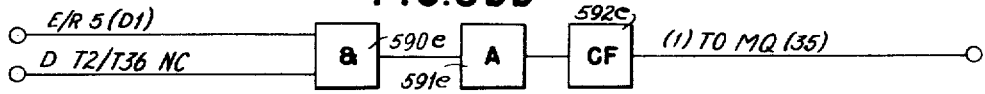
FIG.5bb
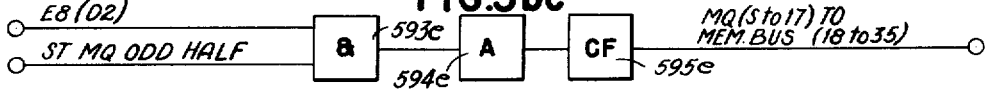
FIG.5bc
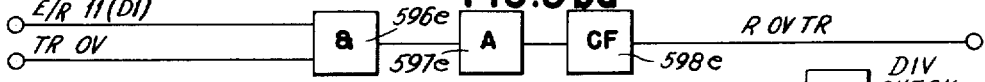
FIG.5bd
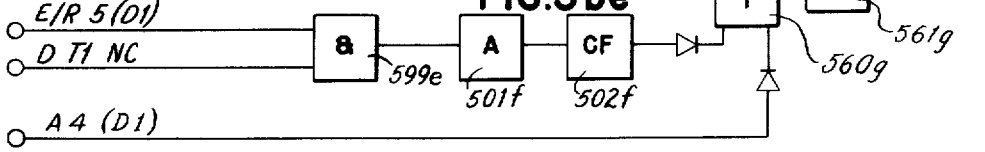
FIG.5be Aug. 7, 1962    F. P. BROOKS, JR., ETAL    3,048,332
PROGRAM INTERRUPT SYSTEM
Filed Dec. 9, 1957    84 Sheets-Sheet 42
FIG.5bt
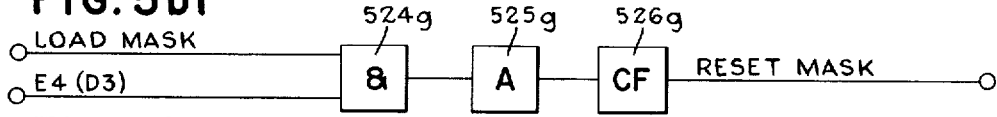
FIG.5bu
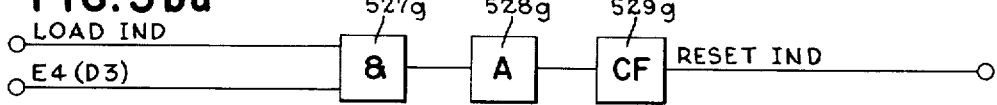
FIG.5bv
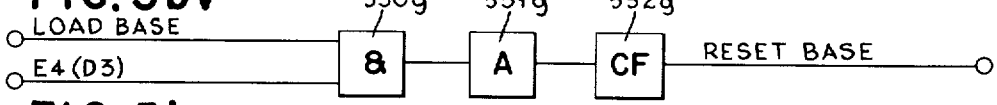
FIG.5bw
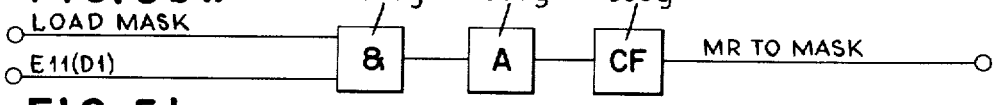
FIG.5bx
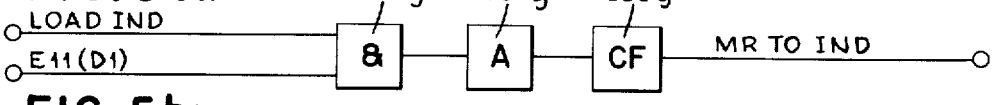
FIG.5by
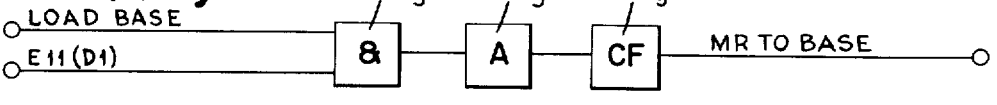
FIG.5ca STORE BASE REGISTER
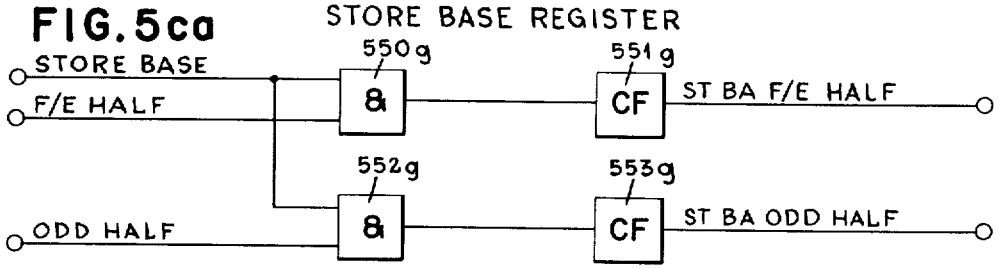
FIG.5cb STORE LEFTMOST ONE COUNTER
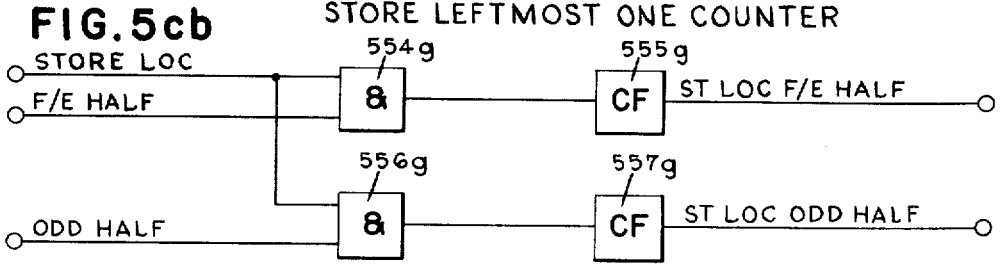

Aug. 7, 1962    F. P. BROOKS, JR., ET AL    3,048,332
PROGRAM INTERRUPT SYSTEM
Filed Dec. 9, 1957    84 Sheets-Sheet 43

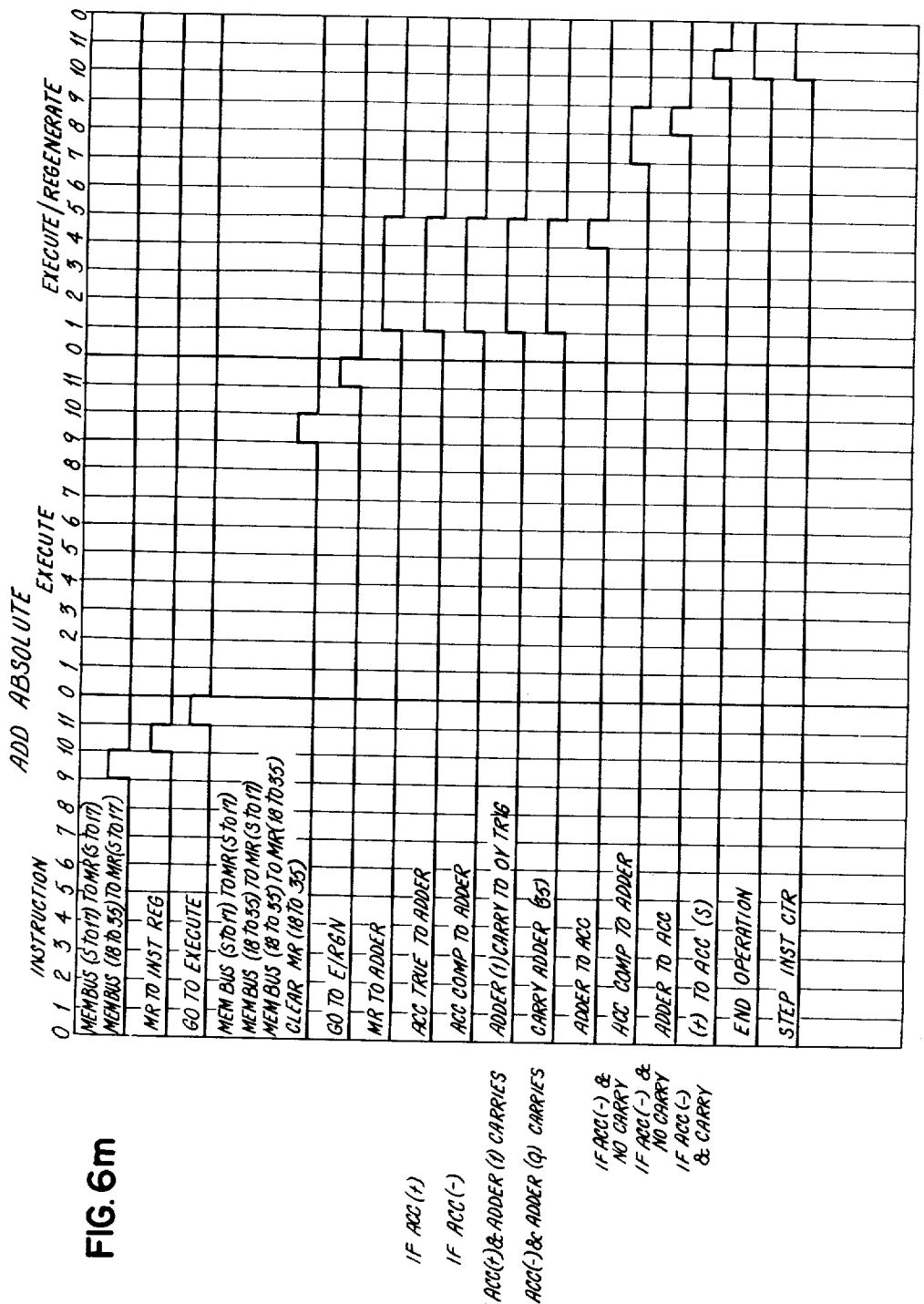

Aug. 7, 1962  F. P. BROOKS, JR., ETAL  3,048,332
PROGRAM INTERRUPT SYSTEM
Filed Dec. 9, 1957  84 Sheets-Sheet 55
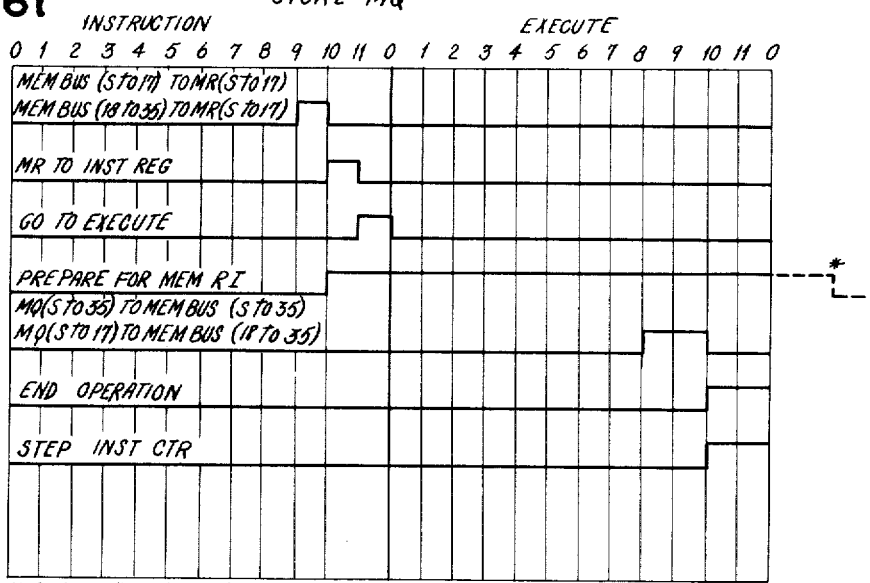
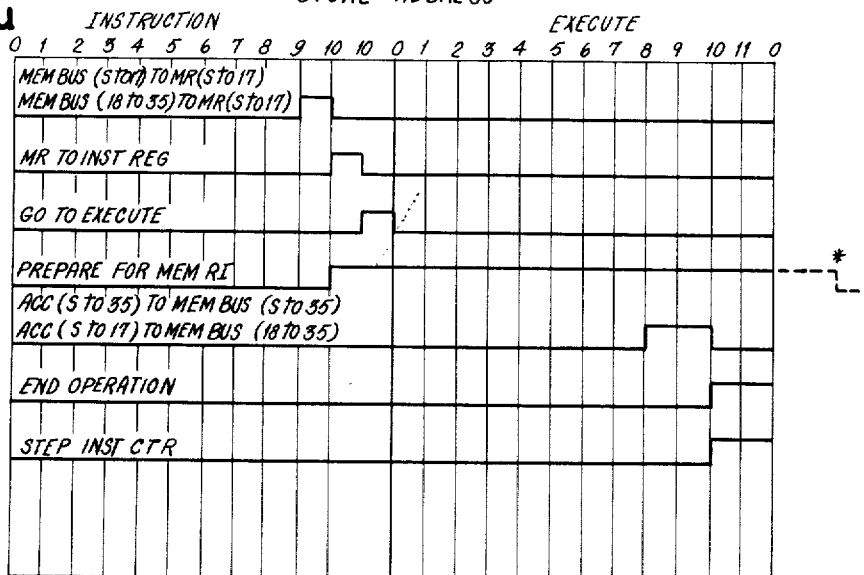

Aug. 7, 1962  F. P. BROOKS, JR., ET AL  3,048,332
PROGRAM INTERRUPT SYSTEM
Filed Dec. 9, 1957  84 Sheets-Sheet 59

FIG. 6z

MULTIPLY OR MULTIPLY & ROUND
INSTRUCTION / EXECUTE

| | Signal | Instruction 0-11, 0-11 / Execute 0-11, 0 |
|---|---|---|
| | RESET T36 | |
| | MEMBUS (S to 17) TO MR (S to 17) | |
| | MEMBUS (18 to 35) TO MR (S to 17) | |
| | MR TO INST REG | |
| | GO TO EXECUTE | |
| | TURN TE ON | |
| | RESET ADR CTR | |
| | MEMBUS (S to 17) TO MR (S to 17) | |
| | MEMBUS (18 to 35) TO MR (S to 17) | |
| | MEMBUS (18 to 35) TO MR (18 to 35) | |
| | CLEAR (18 to 35) | |
| | 34 TO ADR CTR | |
| | GO TO EX/RGN | |
| | TURN TE OFF, T1 ON | |
| IF MQ(35)=1 | MR TO ADDER | |
| | ADDER TO ACC | |
| | SHIFT ACC RIGHT | |
| | SHIFT MQ RIGHT | |
| | TURN T1 OFF, T2 ON | |
| | MR TO ADDER | |
| | ACC TRUE TO ADDER | |
| IF MQ(35)=1 | ADDER TO ACC | |
| | SHIFT ACC RIGHT | |
| | SHIFT MQ RIGHT | |
| | STEP ADR CTR | |
| | TURN T2 OFF, T36 ON | |
| | CARRY ADDER (35) | |
| IF MPY & ROUND & MQ(1)=1 | ACC TRUE TO ADDER | |
| | ADDER TO ACC | |
| IF SIGNS UNLIKE | (-) TO MQ(S) | |
| IF SIGNS UNLIKE | (-) TO ACC(S) | |
| IF SIGNS ALIKE | (+) TO MQ(S) | |
| IF SIGNS ALIKE | (+) TO ACC(S) | |
| | END OPERATION | |
| | STEP INST CTR | |

Aug. 7, 1962   F. P. BROOKS, JR., ET AL   3,048,332
PROGRAM INTERRUPT SYSTEM
Filed Dec. 9, 1957   84 Sheets-Sheet 61

FIG. 6ab

|  | DIVIDE INSTRUCTION | EXECUTE |
|---|---|---|
|  | 0 1 2 3 4 5 6 7 8 9 10 11 | 0 1 2 3 4 5 6 7 8 9 10 11 0 |
|  | RESET T36 | |
|  | MEM BUS (S TO 17) TO MR(S TO 17) | |
|  | MEM BUS (18 TO 35) TO MR(S TO 17) | |
|  | MR TO INST REG | |
|  | GO TO EXECUTE | |
|  | TURN TE ON | |
|  | RESET ADD CTR | |
|  | MEM BUS (S TO 17) TO MR (S TO 17) | |
|  | MEM BUS (18 TO 35) TO MR(S TO 17) | |
|  | MEM BUS (18 TO 35) TO MR (18 TO 35) | |
|  | CLEAR MR (18 TO 35) | |
|  | 34 TO ADD CTR | |
|  | GO TO EX/RGN | |
|  | TURN TE OFF T1 ON | |
|  | MR TO ADDER | |
|  | ACC COMP TO ADDER | |
| IF NO CARRY | TURN DIV CHECK ON | |
|  | MQ(1) TO ACC (35) | |
| IF CARRY { | SHIFT MQ LEFT | |
|  | SHIFT ACC LEFT | |
|  | TURN T1 OFF T2 ON | |
|  | MR TO ADDER | |
|  | ACC COMP TO ADDER | |
|  | ADDER TO ACC | |
|  | (1) TO MQ (35) | |
| IF NO CARRY { | ACC COMP TO ADDER | |
|  | ADDER TO ACC | |
|  | SHIFT ACC LEFT | |
|  | SHIFT MQ LEFT | |
|  | STEP ADR CTR | |
|  | MQ(1) TO ACC (35) | |
|  | TURN T2 OFF T36 ON | |
|  | MR TO ADDER | |
|  | ACC COMP TO ADDER | |
|  | ADDER TO ACC | |
|  | (1) TO MQ (35) | |
| IF NO CARRY { | ACC COMP TO ADDER | |
|  | ADDER TO ACC | |
| IF SIGNS ALIKE | (+) TO MQ (S) | |
| IF SIGNS UNLIKE | (−) TO MQ (S) | |
|  | END OPERATION | |
|  | STEP INST CTR | |

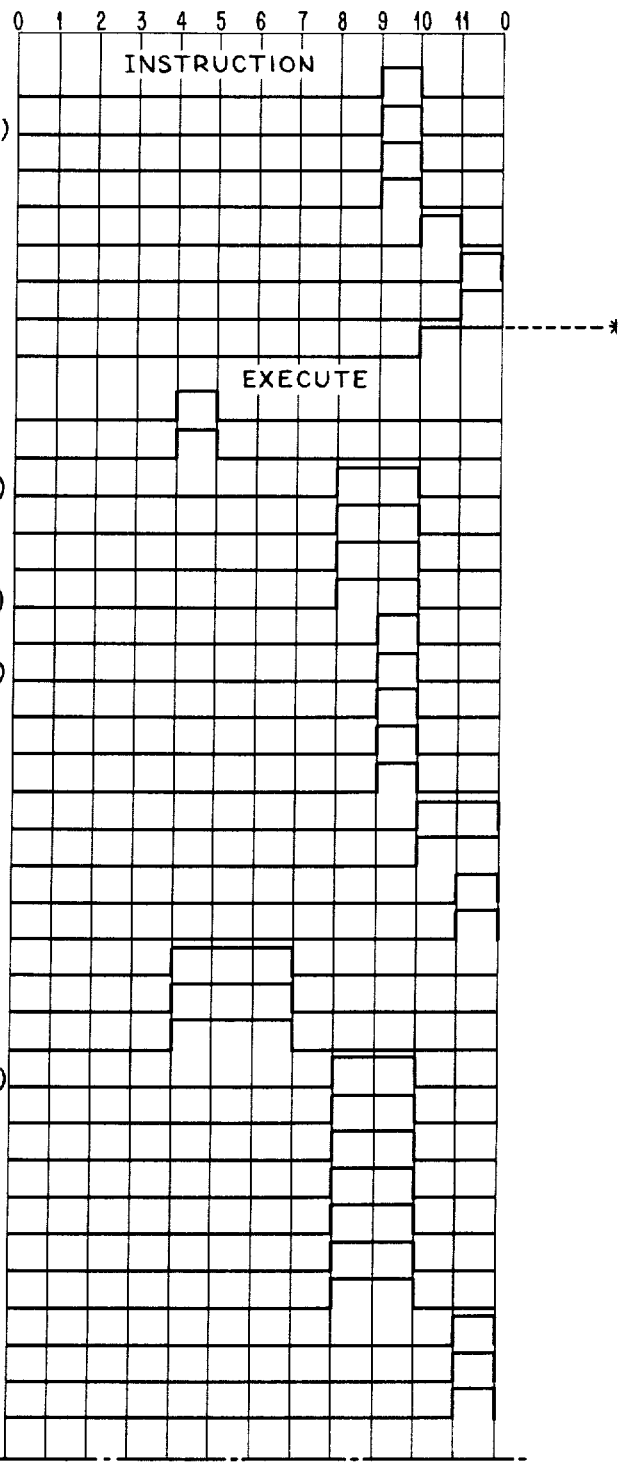

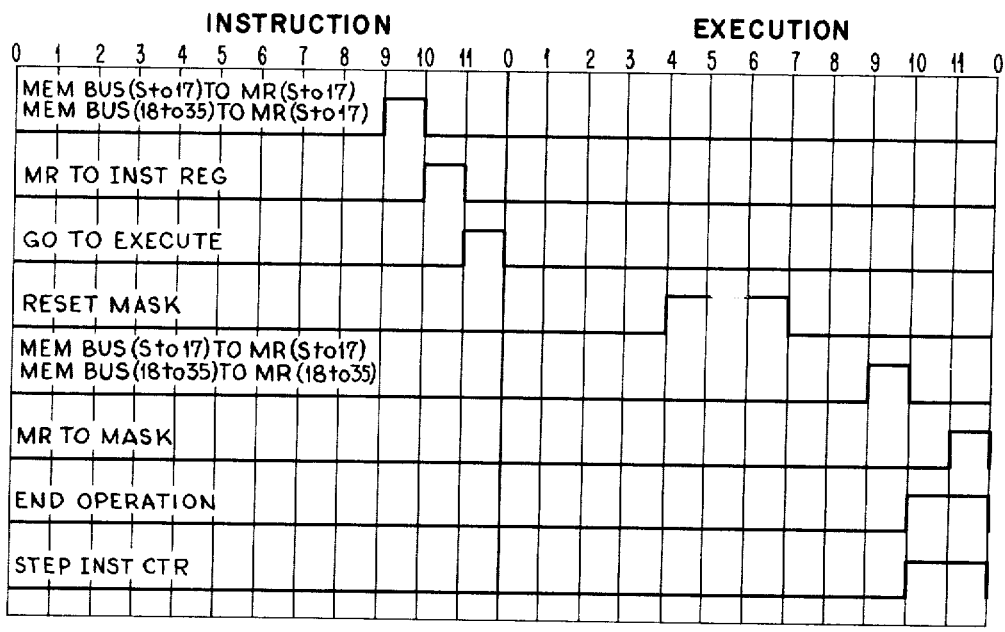
FIG. 6ag  LOAD MASK REGISTER
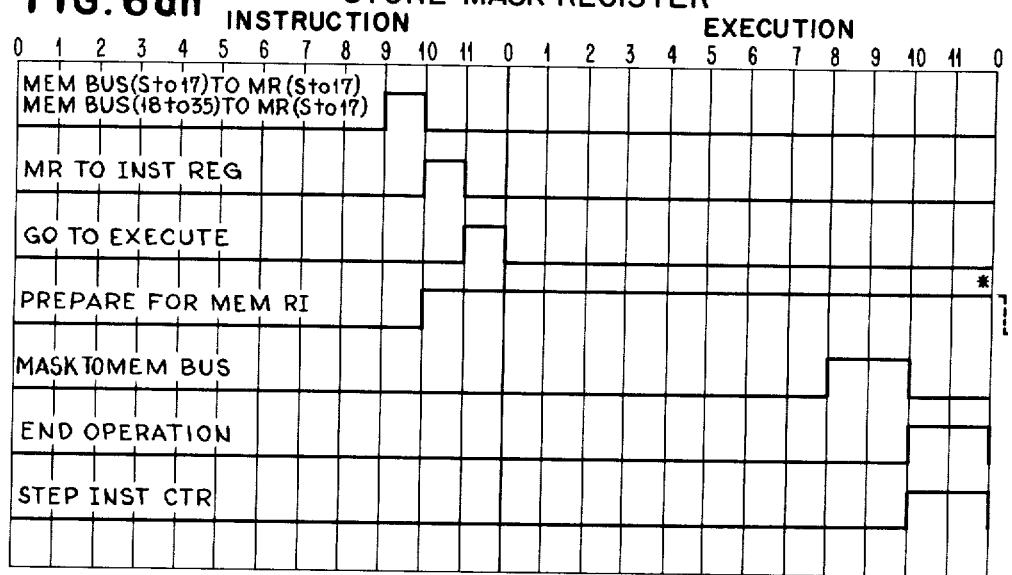
FIG. 6ah  STORE MASK REGISTER
*LINE GOES NEGATIVE WHEN NEW INSTRUCTION IS READ INTO OPERATION DECODER

FIG.6aj LOAD INDICATOR REGISTER
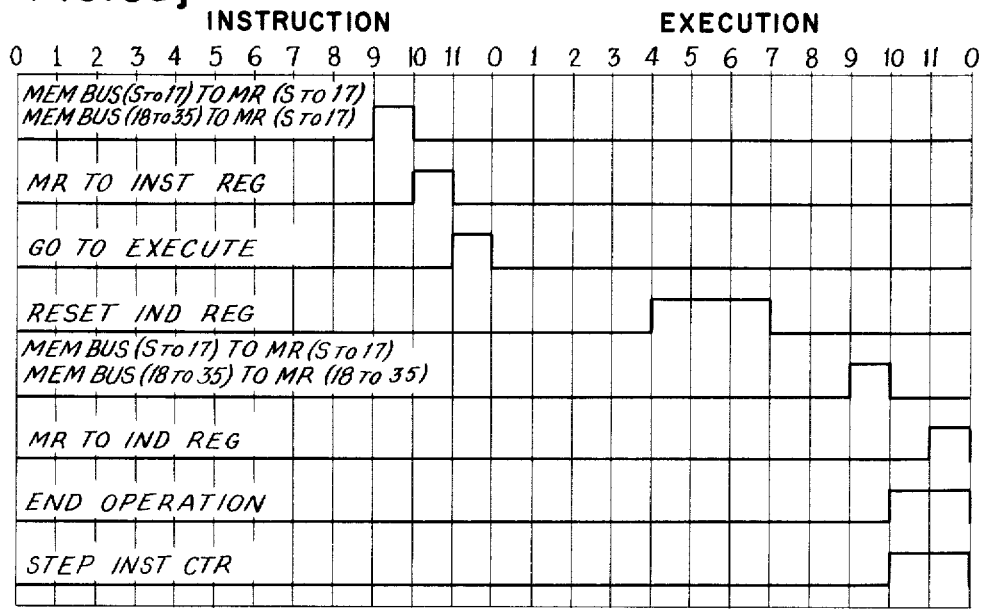
FIG.6ak STORE INDICATOR REGISTER
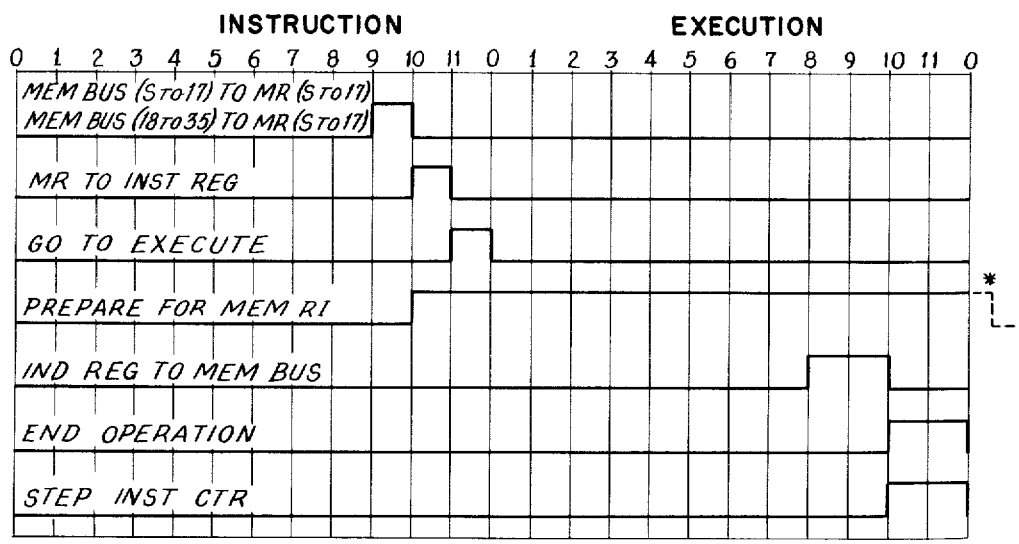
*LINE GOES NEGATIVE WHEN NEW INSTRUCTION IS READ INTO OPERATION DECODER

FIG. 6am LOAD BASE REGISTER
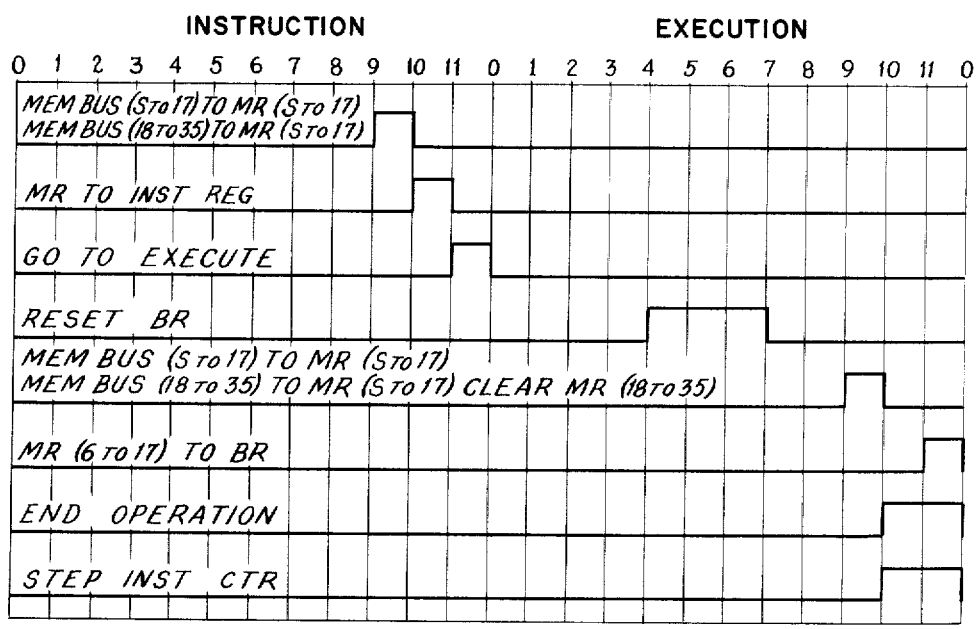
FIG. 6an STORE BASE REGISTER
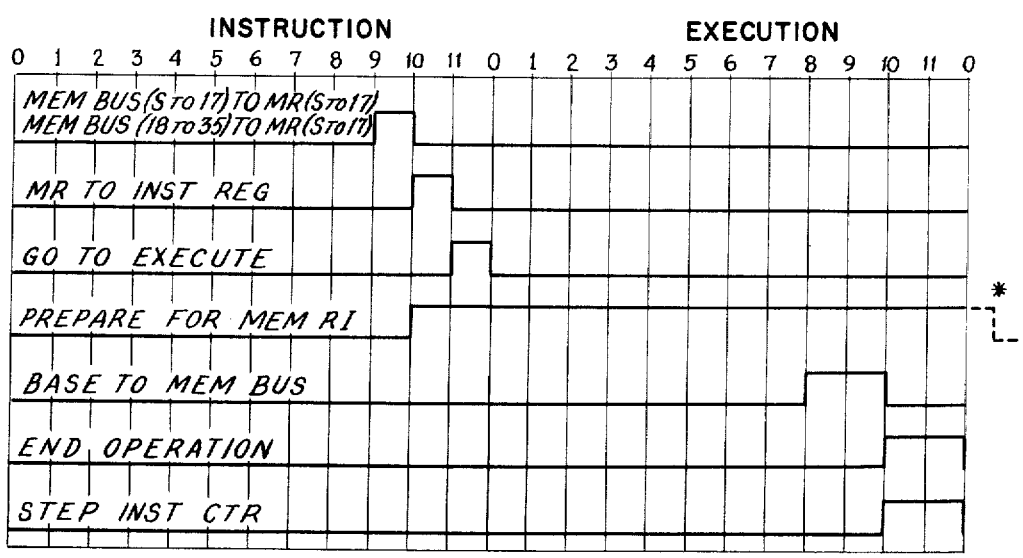
* LINE GOES NEGATIVE WHEN NEW INSTRUCTION IS READ INTO OPERATION DECODER

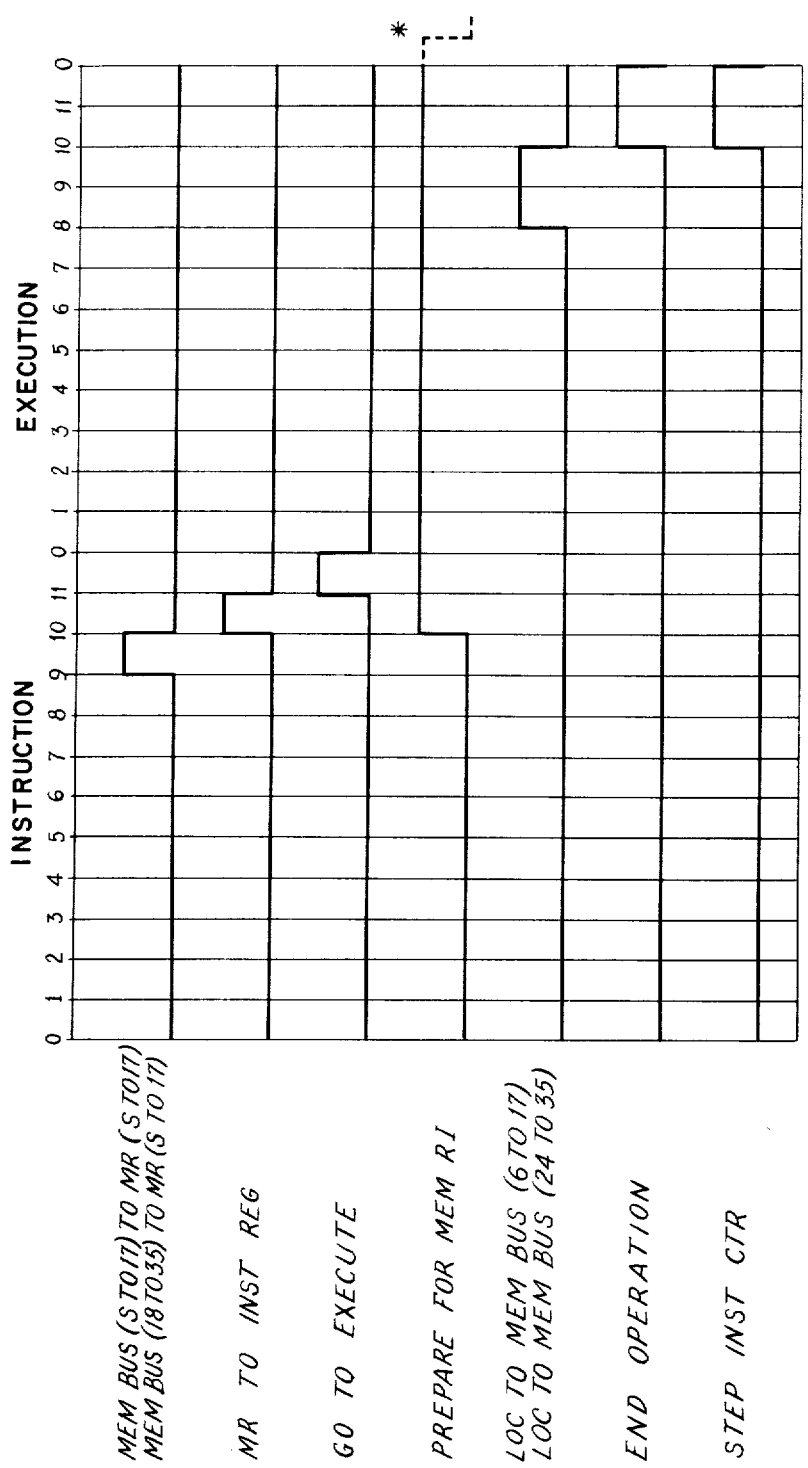

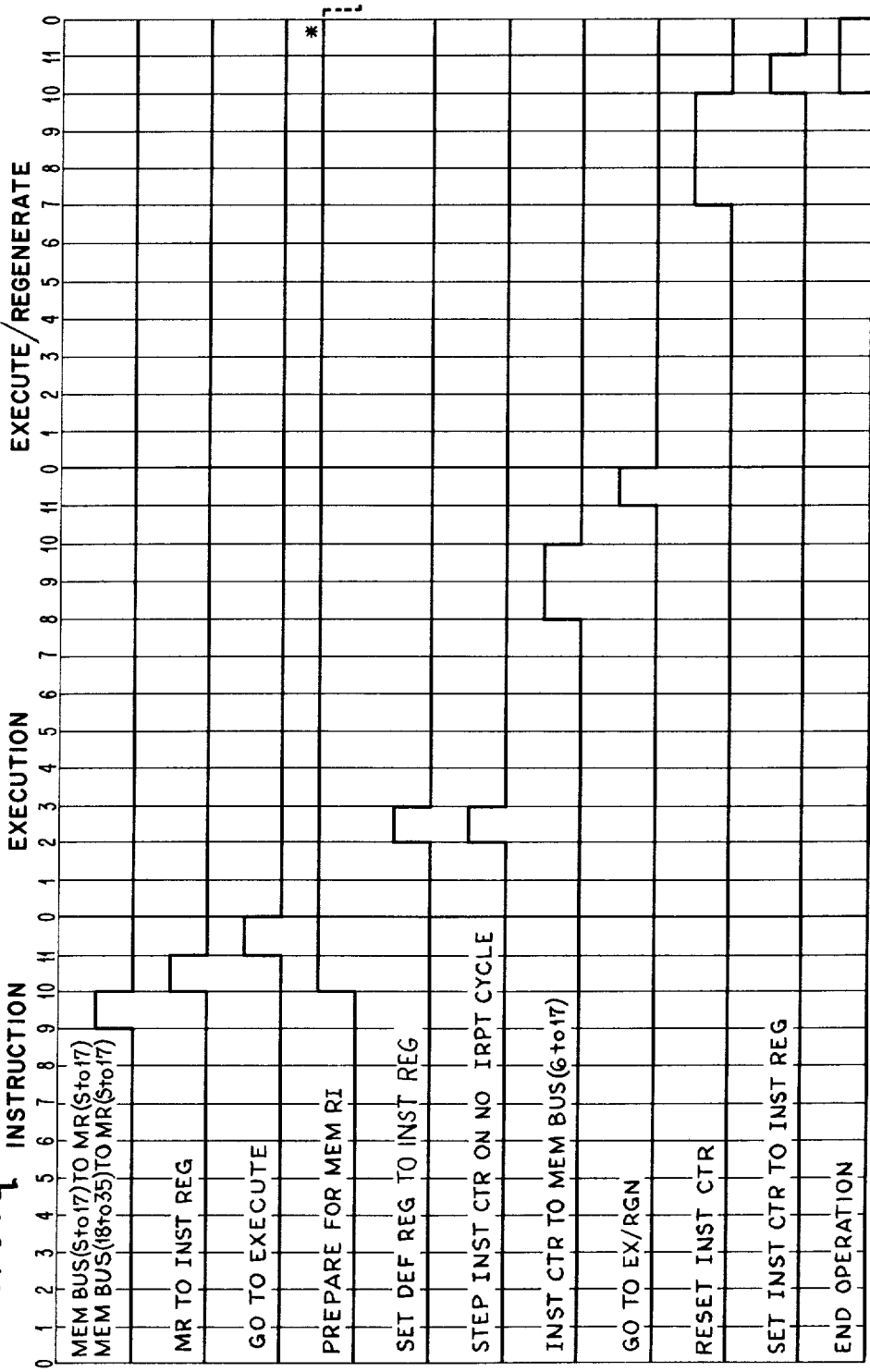

Aug. 7, 1962   F. P. BROOKS, JR., ETAL   3,048,332
PROGRAM INTERRUPT SYSTEM
Filed Dec. 9, 1957   84 Sheets-Sheet 70

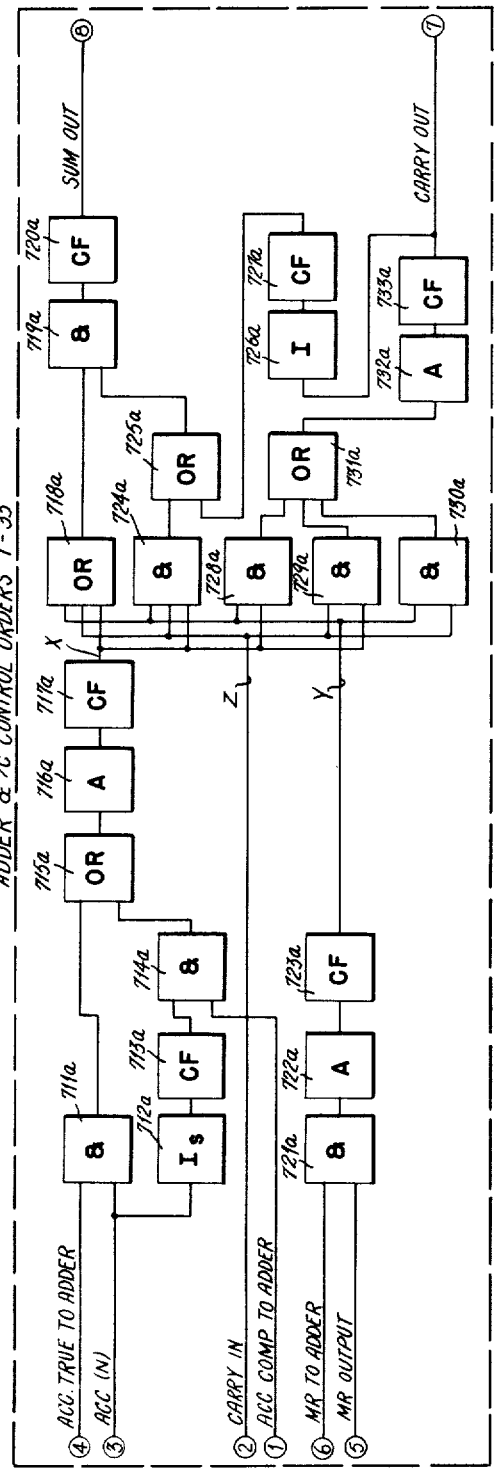
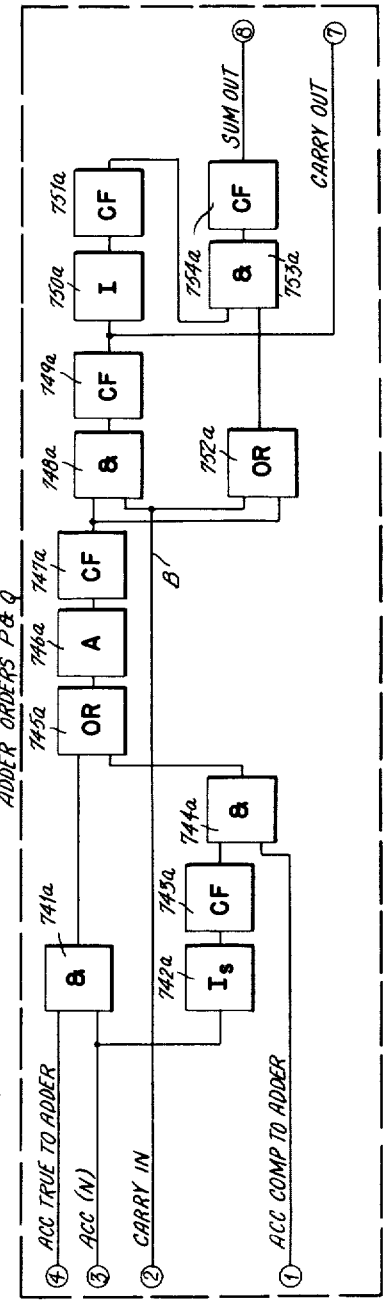
FIG.7c
FIG.7d

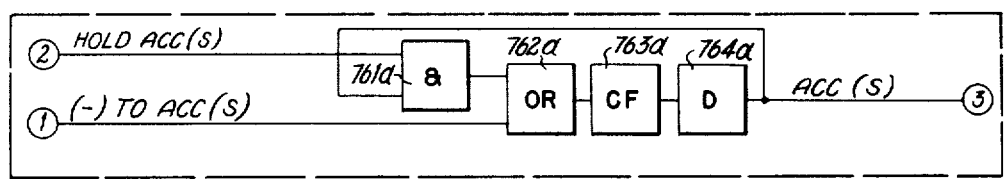
FIG. 7e ACCUMULATOR REGISTER
S ORDER
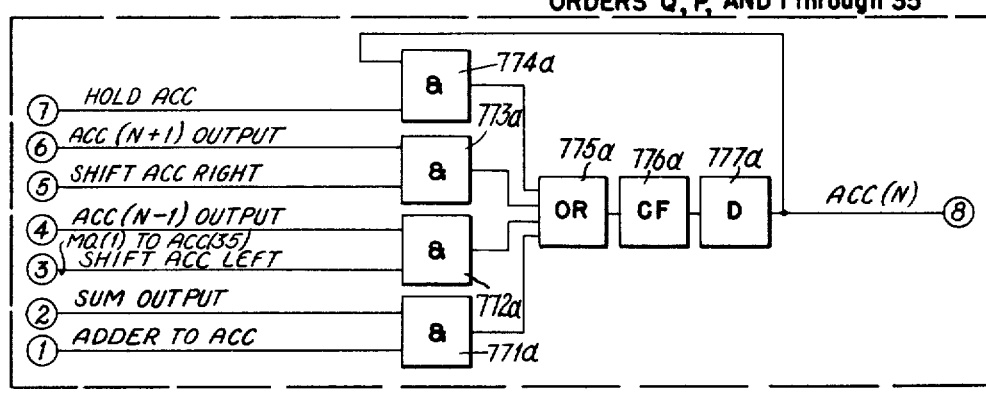
FIG. 7f ACCUMULATOR REGISTER
ORDERS Q, P, AND 1 through 35
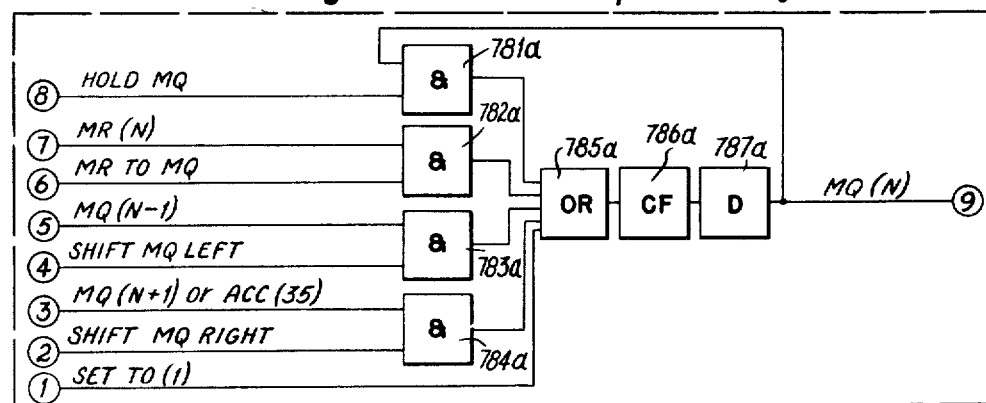
FIG. 7g MQ REGISTER
ORDERS S, AND 1 through 35

MEMORY BUS SWITCHES
ORDERS 18 through 35

MEMORY BUS SWITCHES
ORDERS S and 1 through 17

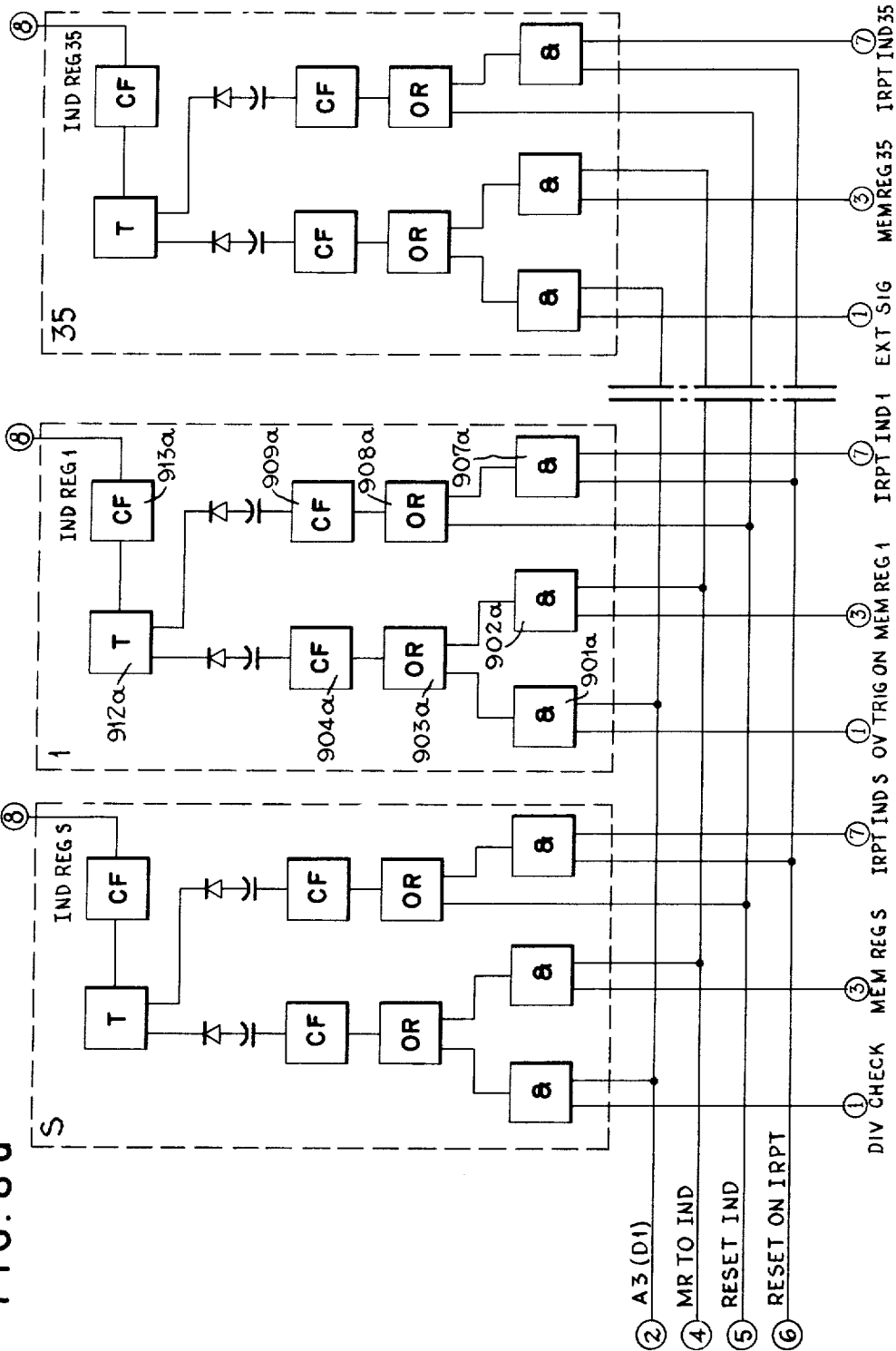

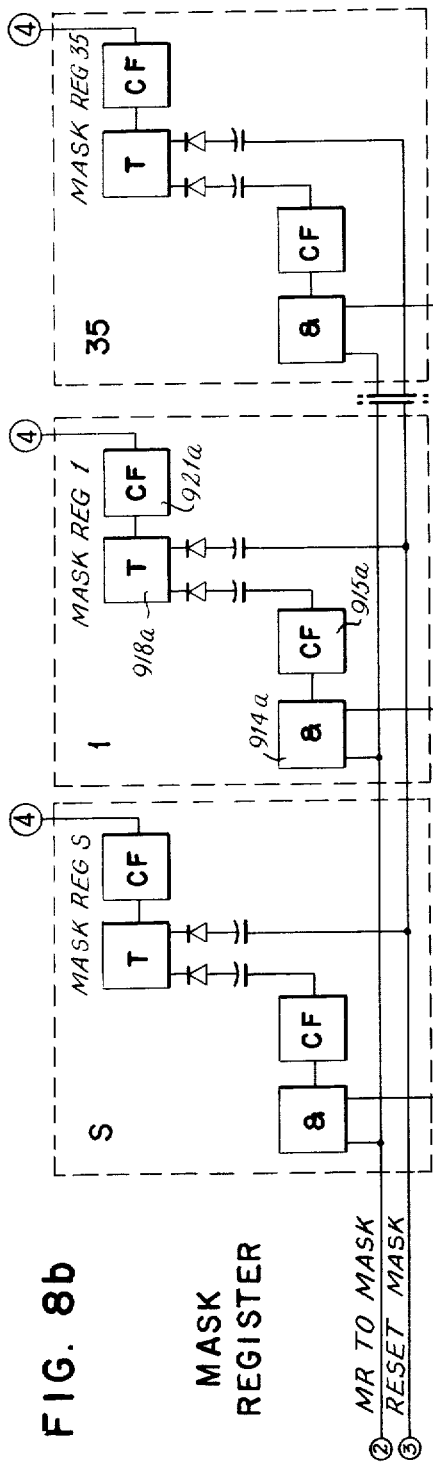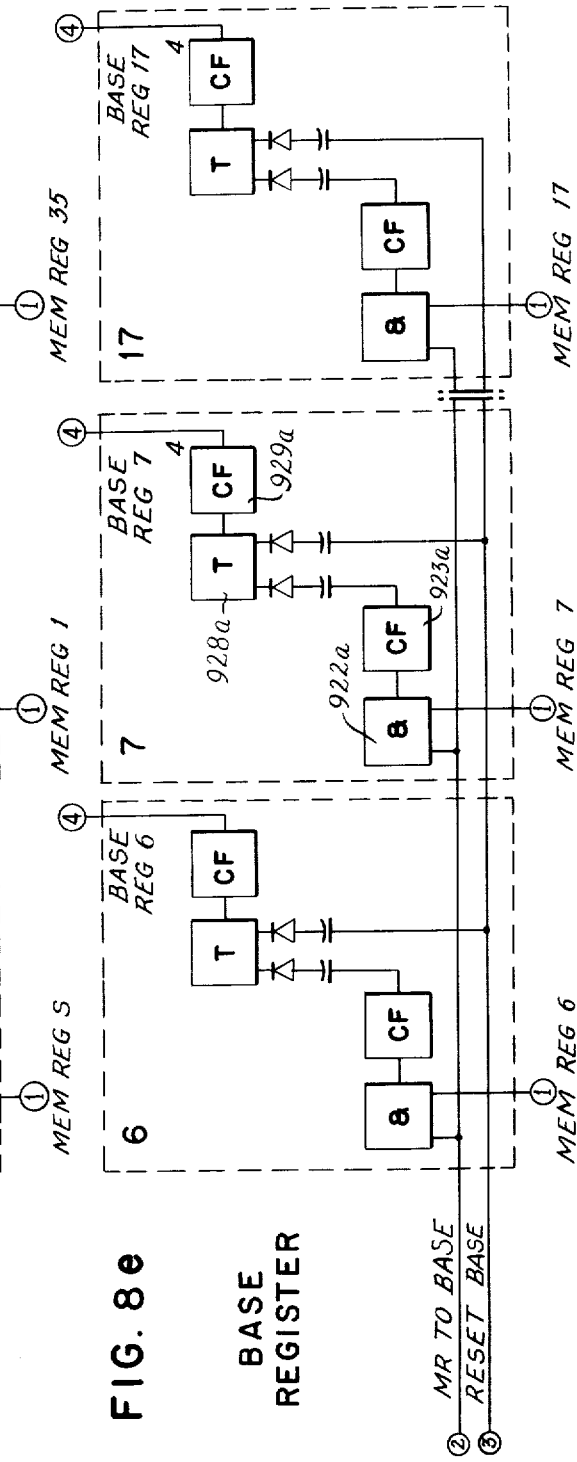
FIG. 8b
MASK REGISTER
FIG. 8e
BASE REGISTER

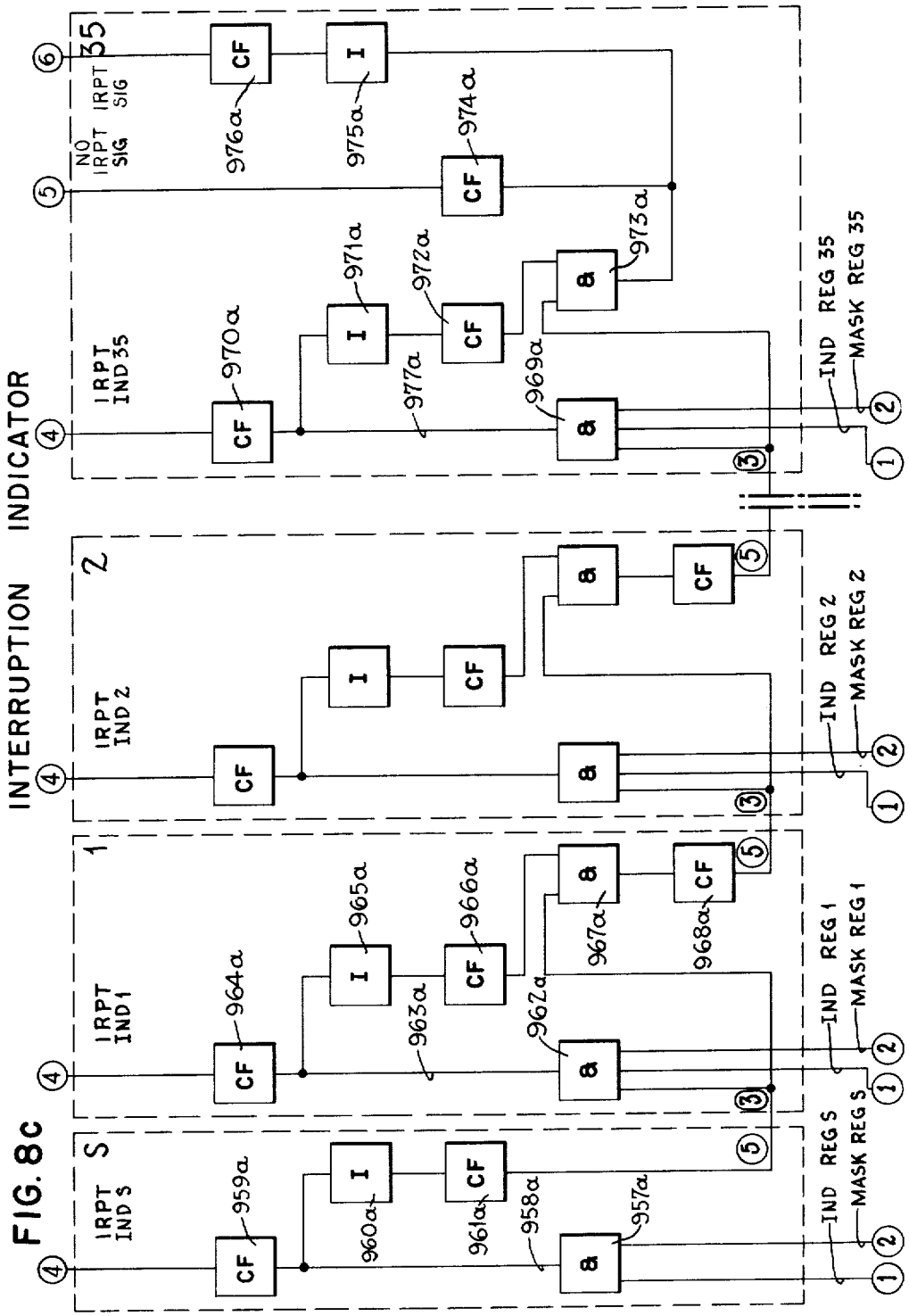

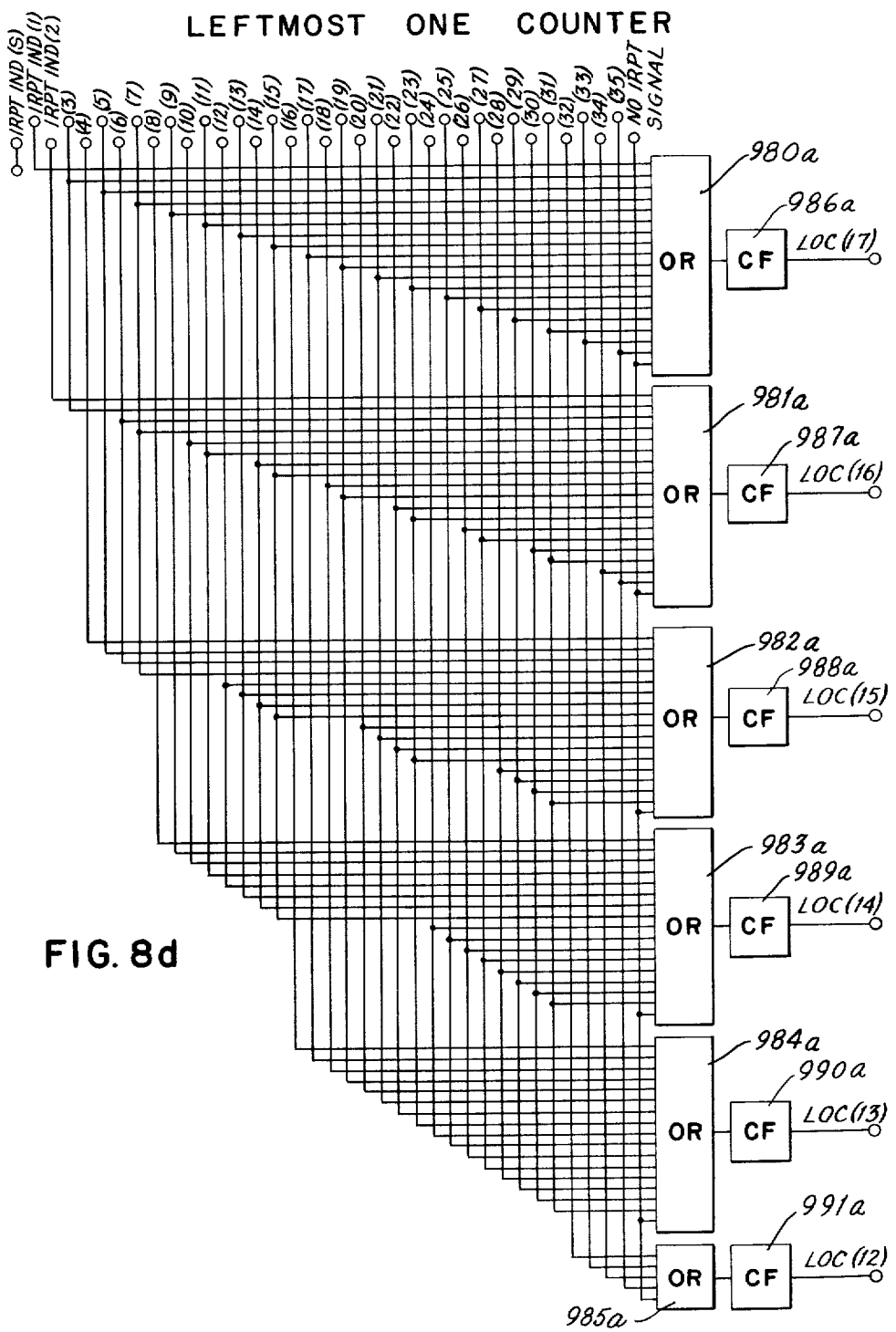

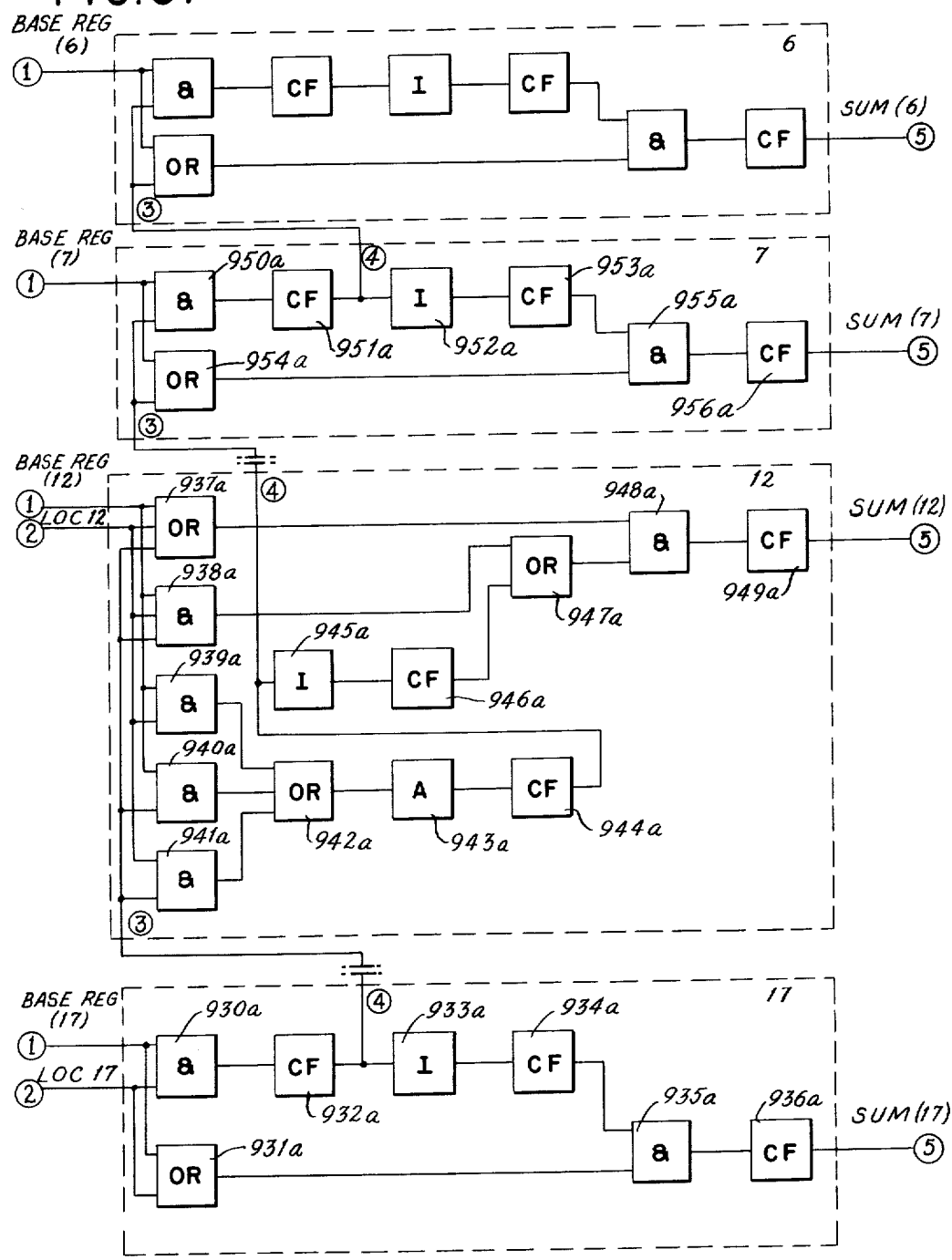
FIG. 8f INTERRUPT ADDER

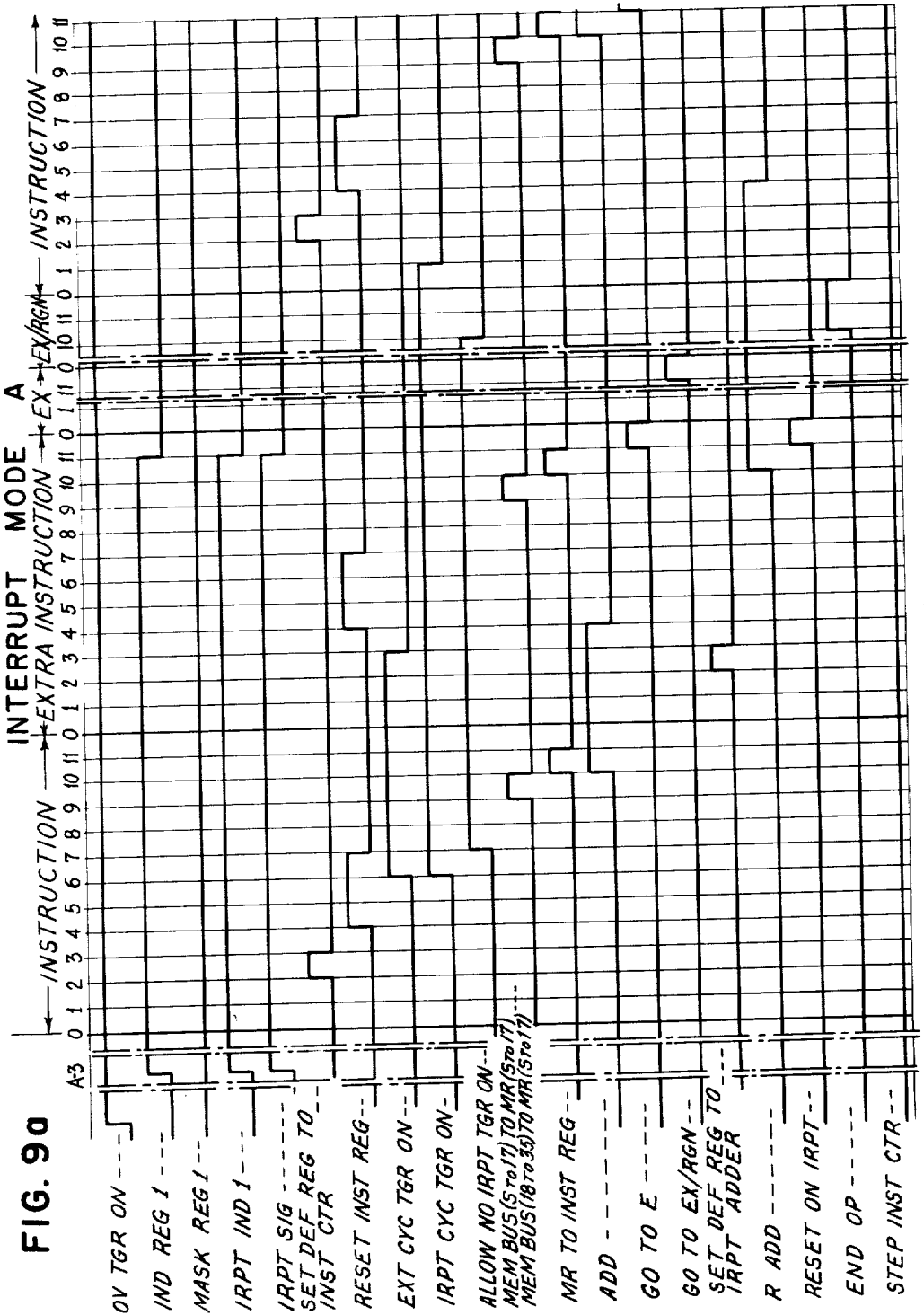

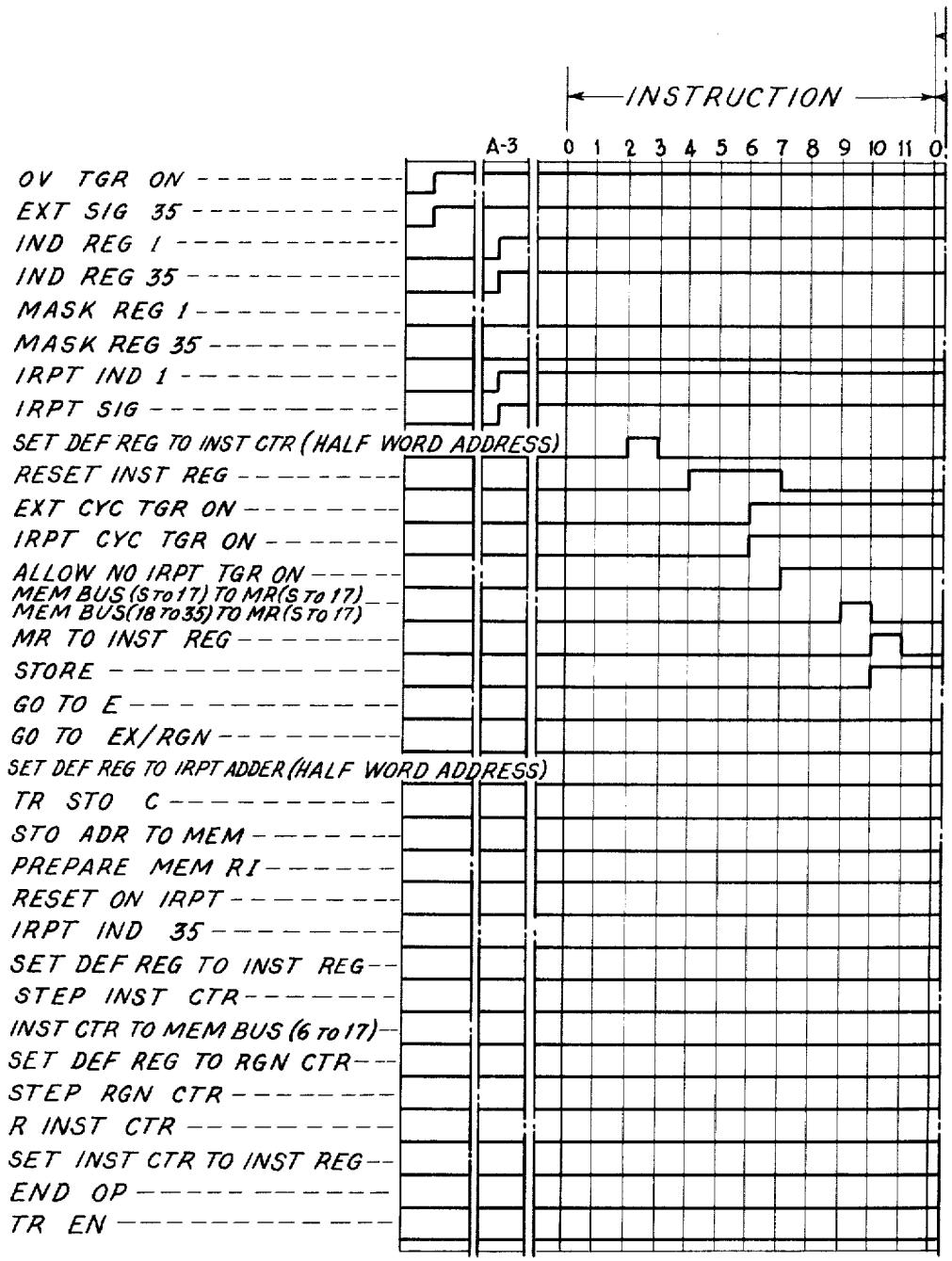
FIG. 9b  INTERRUPT MODE B

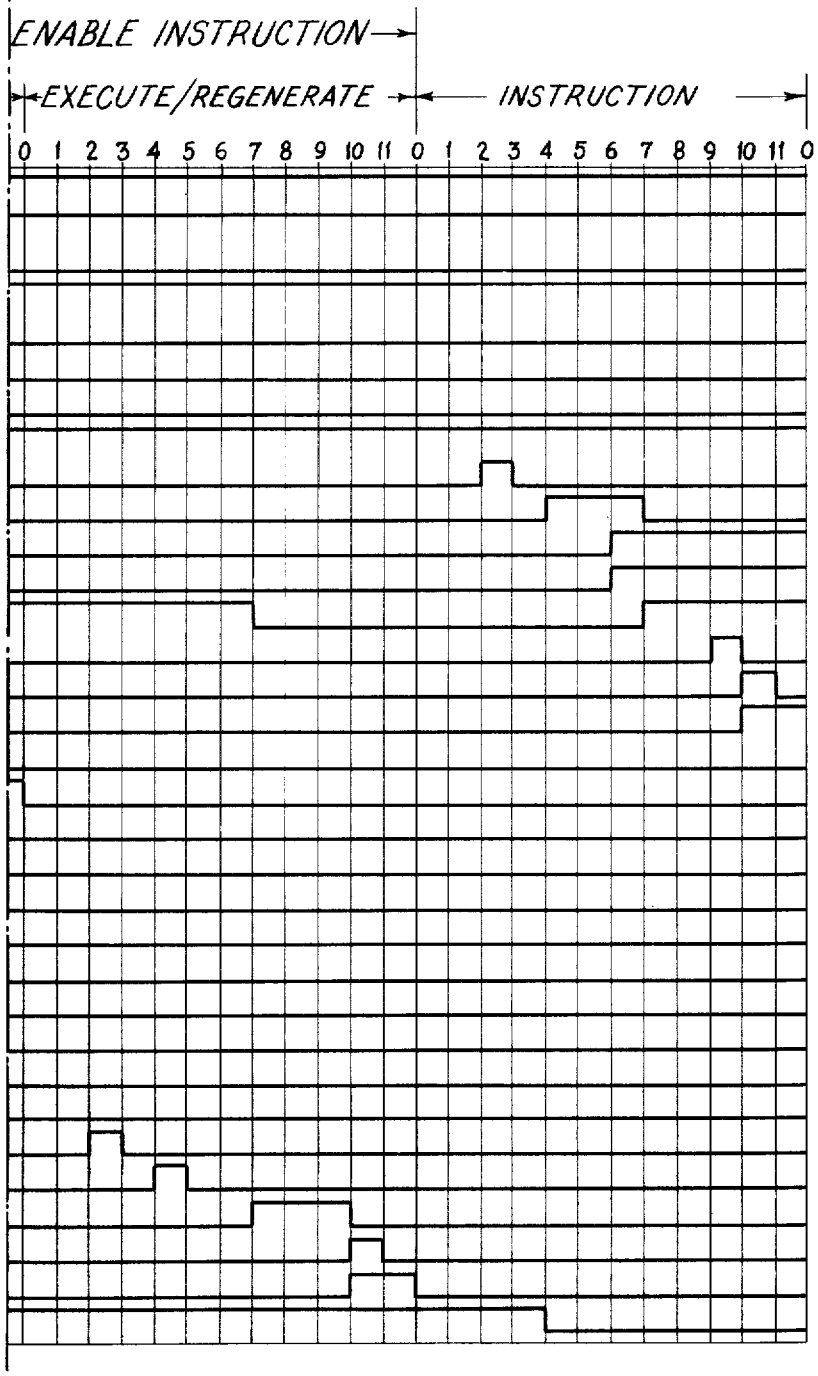

3,048,332
PROGRAM INTERRUPT SYSTEM
Frederick P. Brooks, Jr., Poughkeepsie, and Dura W. Sweeney, Salt Pointe, N.Y., assignors to International Business Machines Corporation, New York, N.Y., a corporation of New York
Filed Dec. 9, 1957, Ser. No. 701,372
41 Claims. (Cl. 235—157)

The present invention relates to a program controlled data processing machine and, more particularly, to a system for selectively interrupting the program.

At the present time, high speed electronic data processing machines consist of a Calculator or Central Processing Unit having Memory, which may be of the electrostatic type, such as cathode ray tubes, and a plurality of independent input/output units, such as magnetic tape units, magnetic drum units, punch card units, high speed printers, etc., each of which may be separately connected to the Calculator thereby providing a highly flexible data processing machine.

The data processing machine operates under control of a program which consists of a series of instructions designating the successive operations to be performed by the machine, which may be arithmetic or non-arithmetic operations. The program steps or instruction words, as well as the data words which are processed, are stored in the Memory of the machine, with each word being located at a different Address. Instruction word may consist of a Sign portion, an Operation portion designating the operation to be performed by the machine and an Address portion which generally designates where a data word is located or to be located in Memory or where an instruction word is located in Memory.

The Central Unit or Calculator may include a Memory Register, an Instruction Register, an Operation Decoder and an Instruction Counter. In the operation of the data processing machine, an instruction word, located at an Address in Memory designated by the holding of the Instruction Counter is read out of Memory and transferred via a Memory Bus to the Memory Register and from the Memory Register to the Instruction Register which has a Sign portion, an Operation portion and an Address portion corresponding to the Instruction word. The Sign and/or Operation portions of the Instruction word are decoded by the Operation Decoder which, in turn, generates an instruction signal for various control circuits which include execution timers and mixing circuits to permit the decoded instruction to be executed.

The arithmetic part of the Calculator may include an Adder having a plurality of orders including several overflow orders, an Accumulator Register having a plurality of orders including several overflow orders, equal in number to that of the Adder and a Multiplier Quotient (MQ) Register having a plurality of orders equal in number to that of the Adder with the first stage thereof being connectable to the last stage of the Accumulator Register and vice versa whereby the MQ Register and the Accumulator Register are shiftable, as a unit, any desired number of orders, to the right or to the left.

The Address portion of certain non-arithmetic instruction words, designates a location in Memory wherein a word or Address part thereof is to be stored. Consequently, in executing these instructions, a word or Address part thereof is transferred from a Register or Counter and stored in Memory at the Address designated by the Address portion in the Instruction word held in the Instruction Register. Also, the Address portion of certain other non-arithmetic instructions and all arithmetic instructions designates a location in Memory from where a word or Address part thereof is to be read out and used as an operand. Consequently, in executing these instructions, a word or Address part thereof, located in Memory at the Address designated by the Address portion of the Instruction word held in the Instruction Register, is read out of Memory and transferred via the Memory Register to the Adder or to a Register such as the Accumulator Register, the Multiplier Quotient Register, etc. At the end of these operations, an end of operation is signalled and the Instruction Counter, holding the Address of the current instruction, is stepped by one to the next sequential Address in which is stored the next sequential instruction of the program.

The Address portion of certain other non-arithmetic instructions designates the location in Memory wherein an Instruction word is stored. Consequently, in executing these instructions, the Instruction Counter is reset and the Address portion of the Instruction word held in the Instruction Register is transferred to the Instruction Counter so that the Address designated by the Instruction Counter may be other than the next sequential Address, as is normally the case. Therefore, at the end of these operations, the end of operation is signalled but the Instruction Counter is not stepped by one, as before, inasmuch as it already holds the Address for the next instruction of the program to be executed.

During the execution of the various operations performed by the the machine, certain conditions may arise which require special handling, as for example, a divide check condition may occur during a divide operation indicating that the dividend is greater in value than the divisor, an overflow condition may occur during an arithmetic operation, a negative sign may occur in the Accumulator Register, etc. Also, certain conditions may occur at arbitrary times, independently of a program, which require special handling. For example, an input/output unit, such as a magnetic tape unit, may be instructed to perform an operation such as read or write tape. Consequently, the unit disconnects itself from control by the program, which may then proceed to the next instruction, and, while the tape is being processed, data errors, the end of the record or the end of a file condition may occur at any arbitrary time.

Heretofore, separate indicators were provided for each condition that it was desired to detect and at certain points in the program a conditioned transfer instruction was executed whereby a particular indicator was tested and if the condition was detected, then, a transfer was made to a sub-routine which took corrective action in regard to the condition that was detected, at the end of which a transfer was made back to the main program. Thus, it required programming operations to monitor the various conditions occurring due to the program itself or the various asynchronously occurring conditions.

Accordingly, an object of the present invention is to automatically monitor predetermined conditions arising during the operation of a data processing machine.

Another object of the invention is to selectively monitor predetermined conditions occurring during the operation of a data processing machine.

Still another object of the invention is to simultaneously monitor a plurality of conditions occurring during the operation of a data processing machine.

A further object of the invention is to selectively permit automatic monitoring of a plurality of conditions arising during the operation of a program controlled data processing machine due to the program itself.

A still further object of the invention is to selectively permit automatic monitoring of external conditions occurring during the operation of a program controlled data processing machine which may be independent of the program.

Another object of the invention is to automatically interrupt a main program of operation of a data processing machine when a predetermined condition occurs.

A further object of the invention is to automatically interrupt the main program of operation of a data processing machine when a predetermined condition occurs only if interruption is desired.

Another object of the invention is to selectively monitor the occurrence of a predetermined condition during the operation of a program controlled data processing machine to permit an automatic interruption of the program.

A further object of the invention is to interrupt the program of a program controlled data processing machine as in the previous object and perform an interruption routine.

Another object of the invention is to perform an interruption routine as in the previous object during which a further interruption is selectively permitted.

A further object of the invention is to generate address data for an interruption routine in accordance with a predetermined condition which causes an interruption of the program of a program controlled data processing machine.

Another object of the invention is the provision of a mask to selectively permit the occurrence of a predetermined condition to cause a program of operation of a data processing machine to be automatically interrupted.

A further object of the invention is the provision of a plurality of masks as in the previous object corresponding to a plurality of conditions for which it is desired to selectively interrupt a program of operation of a data processing machine.

Another object of the invention is the provision of a plurality of masks as in the previous object which are combined into a programmable word to permit selective changing.

A further object of the invention is to selectively monitor a condition indication with a mask indication and automatically interrupt a main program of operation of a data processing machine only upon coincidence of indication.

Another object of the invention is to selectively monitor multiple occurring conditions during the operation of a program controlled data processing machine and automatically interrupt the program in accordance with a predetermined one of the multiple occuring conditions.

A further object of the invention is to selectively monitor a plurality of simultaneously or sequentially occurring conditions during the operation of a program controlled data processing machine and allowing each occurring condition to cause successive interruptions of the program in accordance with a predetermined priority.

Another object of the invention is to selectively monitor a plurality of simultaneously or sequentially occurring conditions during the operation of a program controlled data processing machine and making provision whereby only a predetermined one of the plurality of simultaneous or sequentially occurring conditions is enabled to cause an interruption of the program while the remaining conditions are disabled from causing interruptions.

A further object of the invention is to automatically interrupt the main program of operation of a data processing machine when a predetermined condition occurs and perform an operation during which further interruptions are prohibited.

Another object of the invention is to automatically interrupt the main program of operation of a data processing machine when a predetermined condition occurs and perform a sub-program of operations during which further interruptions are selectively prohibited.

A further object of the invention is the provision of a coded number representation identifying a condition occurring during the operation of a program controlled data processing machine which causes an interruption of the program.

Another object of the invention is the provision of a plurality of interruption indications each being indicative of a condition occurring during the operation of a program controlled data processing machine and being coded into a number representation identifying the condition.

A further object of the invention is the provision of a plurality of successive number representations corresponding to a plurality of conditions occurring during the operation of a program controlled data processing machine providing successive addresses for a table of interruption routines.

Another object of the invention is the provision of a base number representation identifying the beginning address for a table of interruption routines each of which may be a single operation routine or a multiple operation routine.

A further object of the invention is the provision of a base number representation as in the preceding object which is programmable to thereby permit selective changing.

Another object of the invention is the provision of a programmable base number representation whereby a plurality of base number representations correspond to a plurality of different programs with each base number representation identifying the beginning address for a table of interruption routines related to the associated program.

A further object of the invention is the provision of a condition number representation which when added to a base number representation, related to the program being performed, produces a number representation designating the address from which the next instruction is to be taken.

Another object of the invention is to automatically interrupt the main program of operation of a data processing machine when a predetermined condition occurs and perform a single operation at the end of which control is automatically returned to the main program.

A further object of the invention is to automatically interrupt the main program of operation of a data processing machine when a predetermined condition occurs and perform an interruption routine at the end of which control may be returned to the main program.

Another object of the invention is to perform an interruption routine which may be selectively interrupted to permit a different routine to be performed at the end of which control may be returned to the interruption routine.

A further object of the invention is the provision of a novel program interrupt system for a program controlled data processing machine.

In accordance with the embodiment of the invention disclosed herein an indicator register is provided having a plurality of stages corresponding in number to a plurality of conditions, both internal and external, which may occur during the operation of a program controlled data processing machine, each stage providing a binary 1 signal representation indicating the occurrence of the condition associated with that stage; a mask register is provided having a plurality of stages corresponding in number to that of the indicator register with each stage providing a binary signal representation indicating the desirability of interrupting the program, that is, a binary 0 signal indicating that no interruption is desired even if the condition associated with that stage occurs as indicated by the corresponding stage of the indicator register and a binary 1 signal indicating that interruption is desired if the condition associated with that stage occurs; an interruption indicator is provided for matching the corresponding stages of the indicator register and the mask register to produce a signal indication when there is coincidence of binary 1 signal representation in corresponding stages of the indicator register and the mask register and in the case of a plurality of simultaneously or sequentially occurring conditions to produce a signal indication of the leftmost such coincidence; a leftmost one counter is provided to code the interruption indication into an address representation indicative of the condition detected by the indicator stage; a base register is provided to produce a base address representation related to the program for identifying the beginning address of a table of interruption routines corresponding to the plurality of conditions; an interrupt adder is provided to add the condition address representation to the base address representation to produce an address representation designating the location of an interruption routine in the table of interruption routines which is next executed instead of the instruction located at the address designated by the holding of the Instruction Counter, after which, the indicator stage which detected the condition is reset permitting a new interruption indication of a succeeding coincidence of binary 1 signal representations in corresponding stages of the Indicator Register and the Mask Register to be produced; and an interruption enabling-disabling means is provided which, when an interruption indication is signalled, disables further occurring indications to cause an interruption of the program until the end of the interruption routine or until a transfer and enable operation is performed.

Hence, if the interruption routine calls for a single operation, this operation is next performed, at the end of which, the interruption enabling-disabling means is enabled to permit a new interruption of the program and the address holding of the Instruction Counter remains unchanged so that control is automatically returned to the main program at the point of interruption and the program then proceeds as if nothing had occurred unless a subsequent interruption indication is signalling to interrupt the program again. Also, if the interruption routine calls for a series of operations, then, the first operation performed in the interruption routine is a transfer and store counter operation wherein the address holding of the Instruction Counter is stored in a predetermined location after which control is transferred to a condition sub-routine, during which further interruptions are selectively disabled, and, at the end of which, a transfer and enable operation may be performed during which the stored address holding is returned to the Instruction Counter so that control is transferred back to the main program at the point of interruption and the interruption enabling-disabling means is enabled to permit further interruptions of the program.

Accordingly, another object of the invention is to provide, in a program controlled data processing machine, a novel Load Indicator operation.

A further object of the invention is to provide, in a program controlled data processing machine, a novel Store Indicator operation.

Another object of the invention is to provide, in a program controlled data processing machine, a novel Load Mask operation.

A further object of the invention is to provide, in a program controlled data processing machine, a novel Store Mask operation.

Another object of the invention is to provide, in a program controlled data processing machine, a novel Load Base operation.

A further object of the invention is to provide, in a program controlled data processing machine, a novel Store Base operation.

Another object of the invention is to provide, in a program controlled data processing machine, a novel Store Leftmost One Counter operation:

A further object of the invention is to provide, in a program controlled data processing machine, a novel Transfer and Store Counter operation.

Another object of the invention is to provide, in a program controlled data processing machine, a novel Transfer and Enable operation.

Other objects of the invention will be pointed out in the following description and claims and illustrated in the accompanying drawings, which disclose, by way of example, the principle of the invention and the best mode, which has been contemplated, of applying that principle.

In the drawings:

FIGS. 1a, 1b, 1c, 1d, 1e, 1f, 1g, 1h and 1i taken together comprise an overall block diagram of the system.

FIG. 2 illustrates how FIGS. 1a to 1i, inclusive, may be placed to form a composite block diagram.

FIGS. 3a and 3b, taken together, with FIG. 3a located above FIG. 3b, comprise a block diagram of the Clock.

FIGS. 3c and 3d, taken together with FIG. 3d located to the right of FIG. 3c, comprise a block diagram of the Cycle Timer.

FIGS. 4a, 4b and 4c, taken together, with FIG. 4b located to the right of FIG. 4a, and FIG. 4c, at the right of FIG. 4b, comprise a block diagram of the Instruction Register.

FIG. 4d is a block diagram of the Instruction Counter.

FIG. 4e is a block diagram of the Regeneration Counter.

Figure 4G:
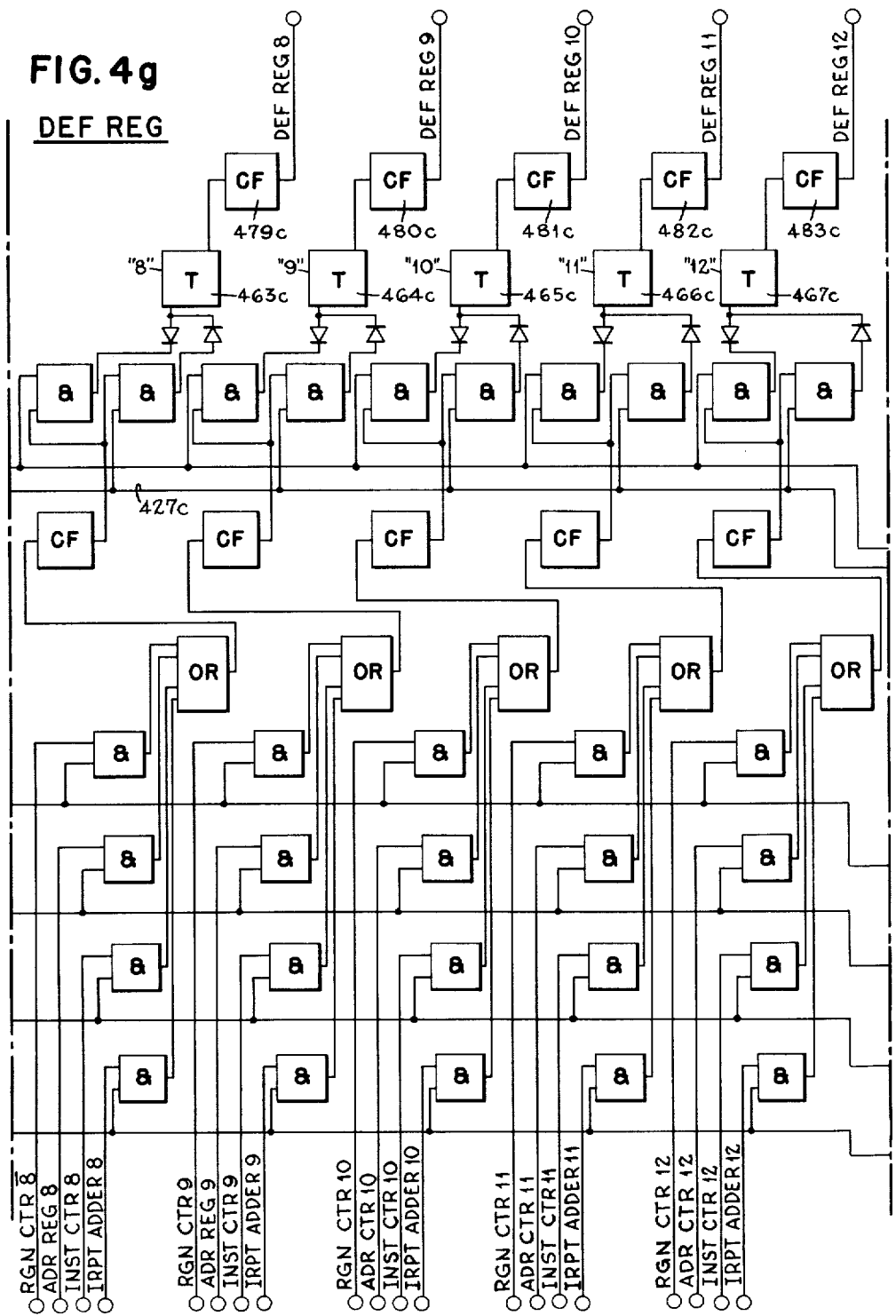

FIGS. 4f, 4g and 4h, taken together, with FIG. 4g located at the right of FIG. 4f, and FIG. 4h at the right of FIG. 4g, comprise a block diagram of the Deflection Switches and the Deflection Register.

FIGS. 4i and 4j taken together with FIG. 4j located below FIG. 4i, comprise a block diagram of the Operation Decoder.

Figure 5A:
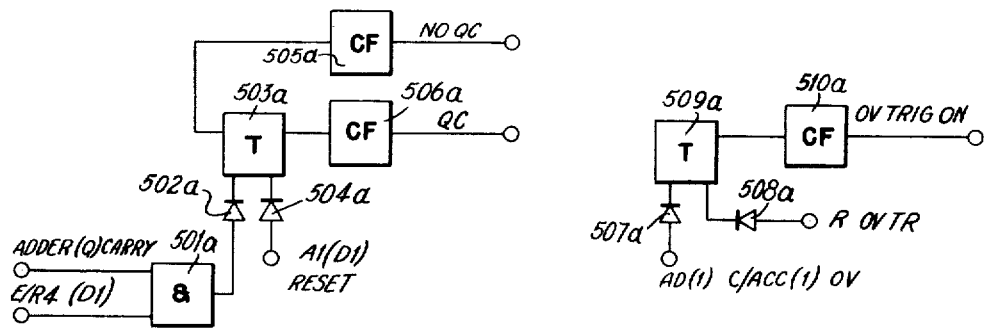

FIG. 5a is a block diagram of the Carry and Overflow trigger circuits.

Figure 5B:
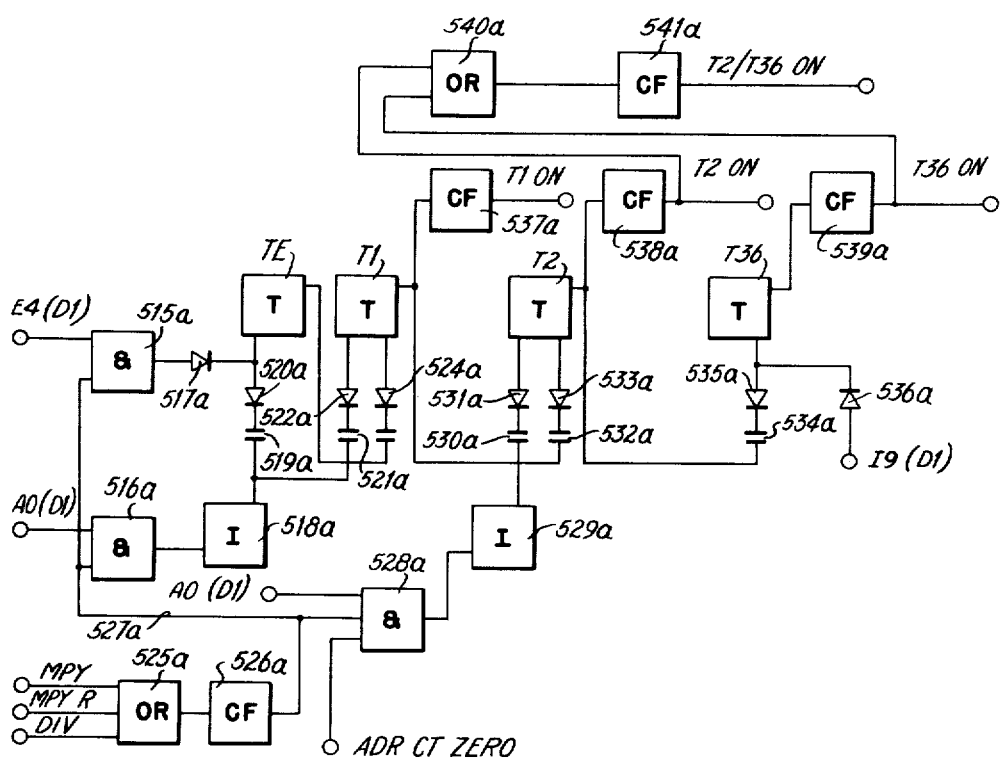
Figure 5A:
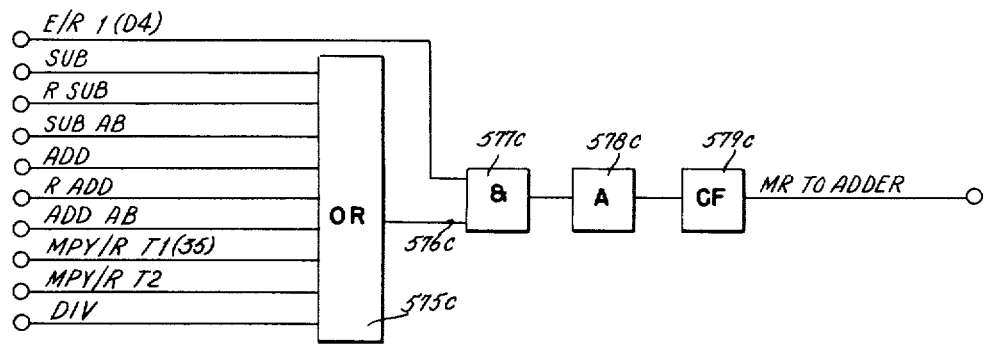
Figure 5A:
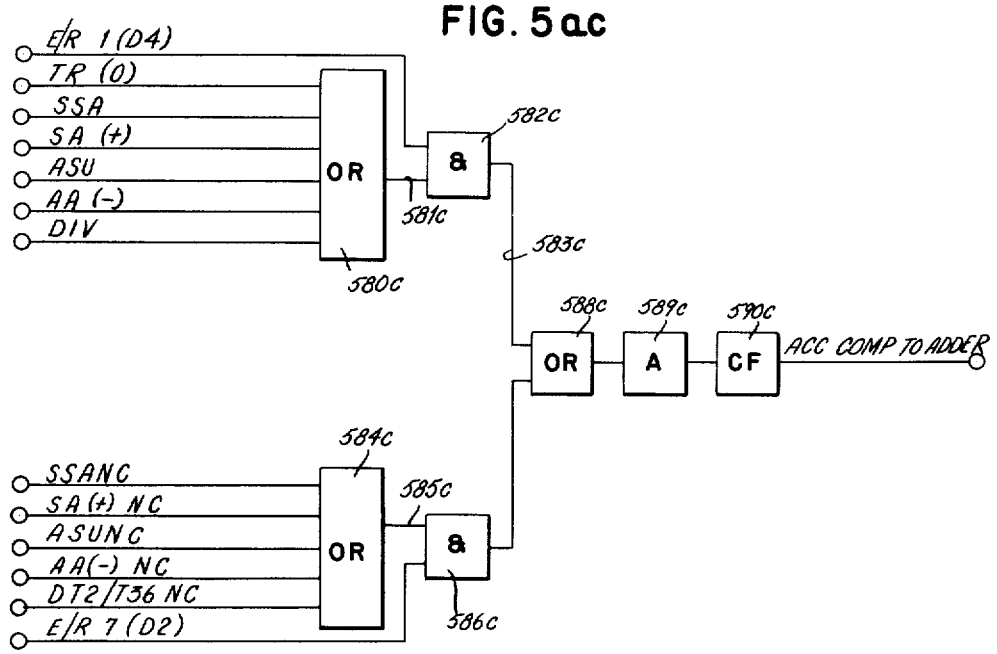
Figure 5A:
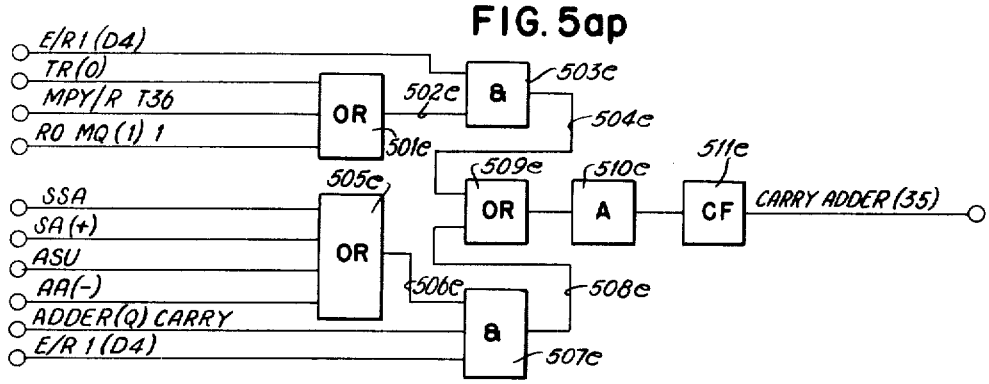
Figure 5A:
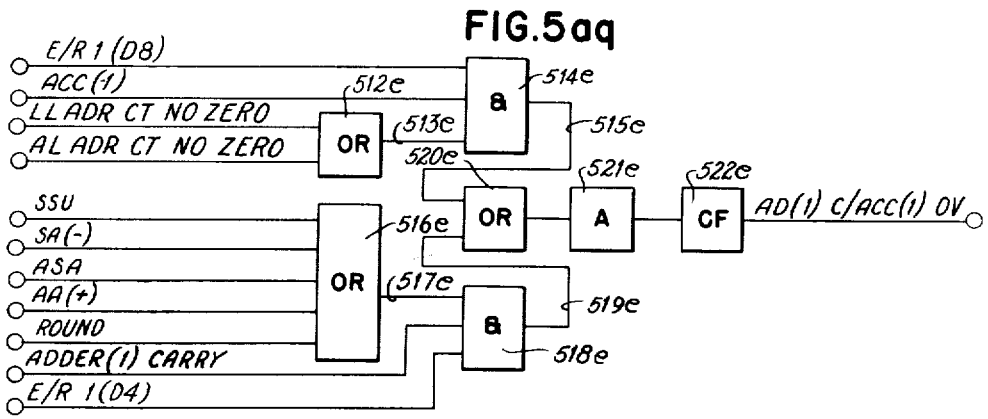
Figure 5A:
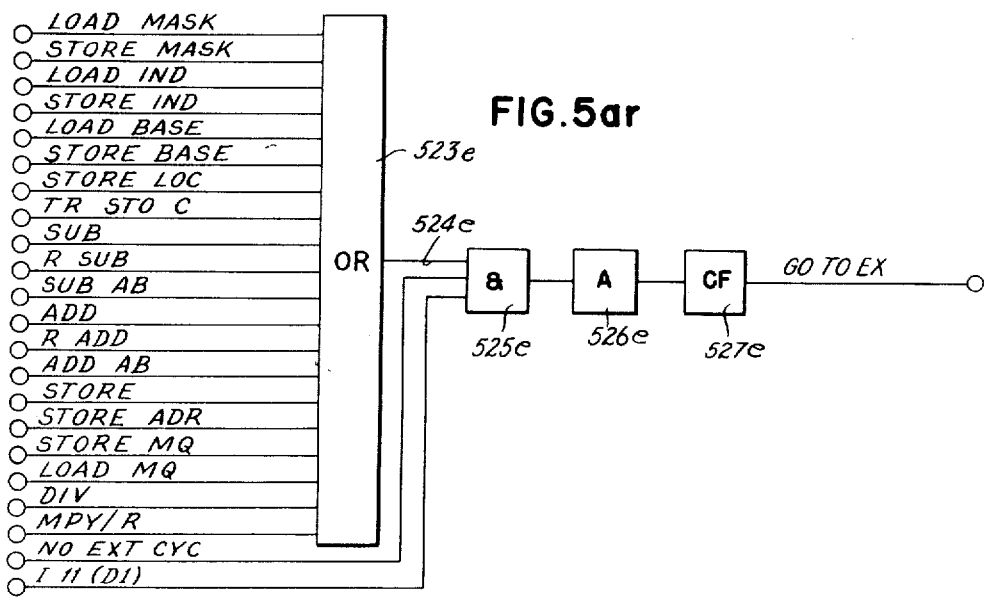
Figure 5B:
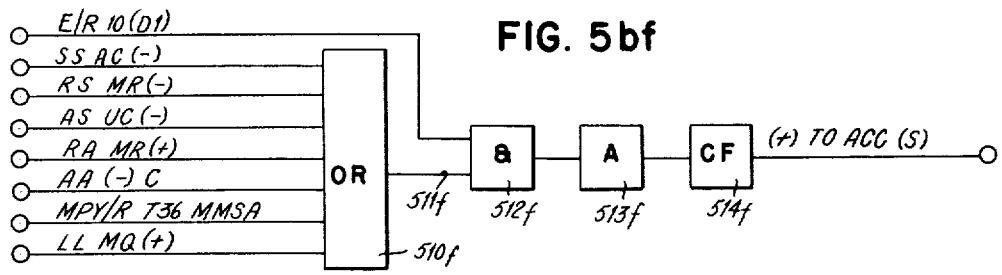
Figure 5B:
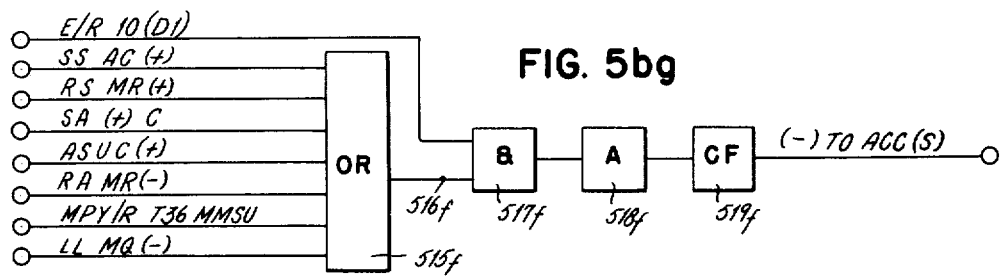
Figure 5B:
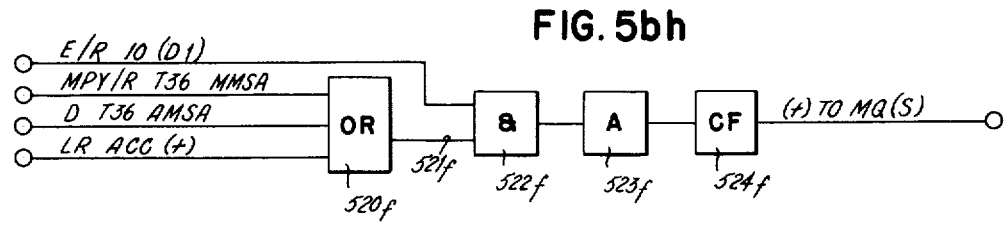
Figure 5B:
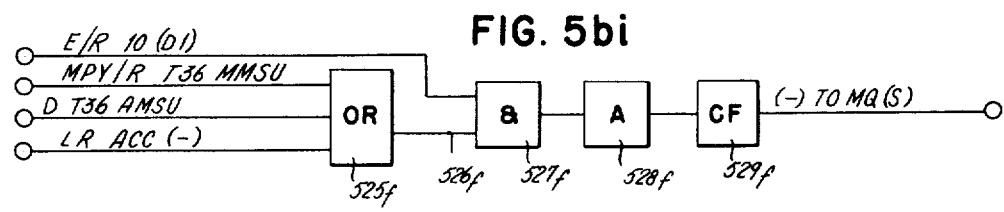
Figure 5B:
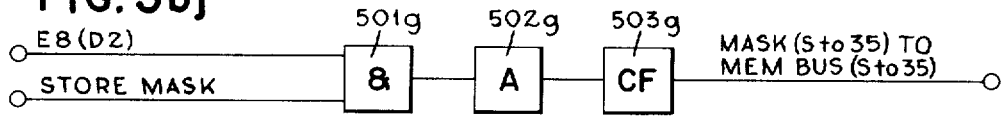
Figure 5B:
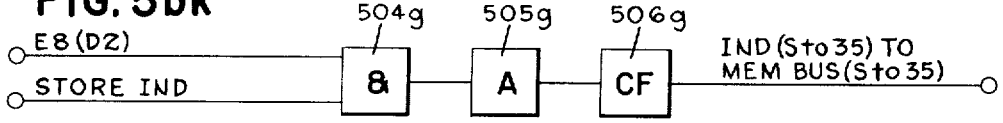
Figure 5B:
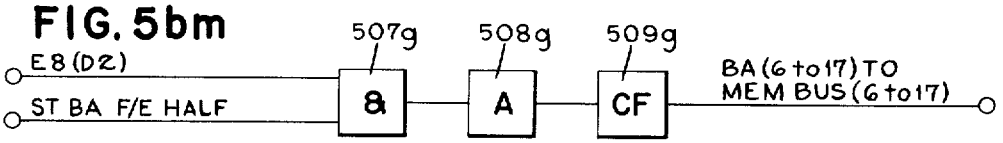
Figure 5B:
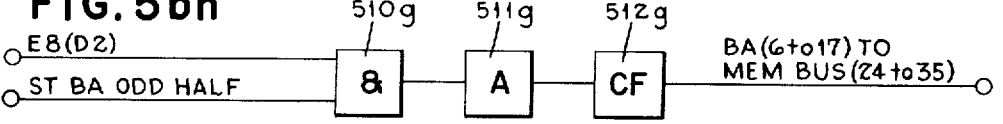
Figure 5B:
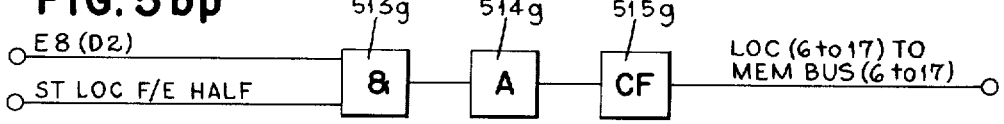
Figure 5B:
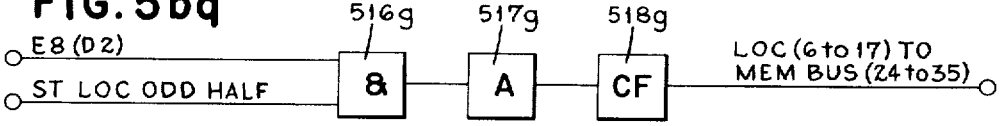
Figure 5B:
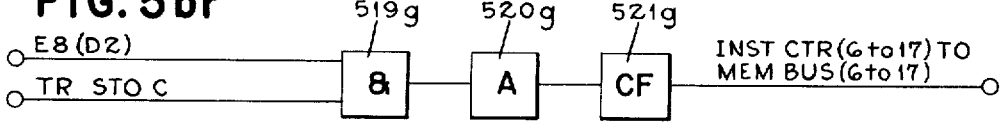
Figure 5B:
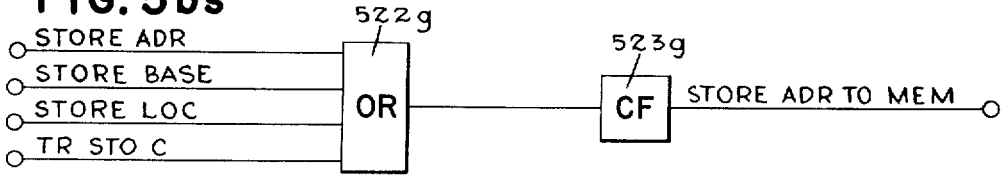

FIG. 5b is a block diagram of the Multiply Divide Tally Counter.

FIG. 5c is a block diagram of the Address, Sign and Address Counter Mixer Circuits.

FIG. 5d is a block diagram of the TRANSFER ON OVERFLOW Execution Timer.

FIG. 5e is a block diagram of the TRANSFER ON PLUS Execution Timer.

FIG. 5f is a block diagram of the TRANSFER ON ZERO Execution Timer.

FIG. 5g is a block diagram of the ROUND Execution Timer.

FIG. 5h is a block diagram of the SUBTRACT Execution Timer.

FIG. 5i is a block diagram of the RESET SUBTRACT Execution Timer.

FIG. 5j is a block diagram of the SUBTRACT ABSOLUTE Execution Timer.

FIG. 5k is a block diagram of the ADD Execution Timer.

FIG. 5m is a block diagram of the RESET ADD Execution Timer.

FIG. 5n is a block diagram of the ADD ABSOLUTE Execution Timer.

FIG. 5p is a block diagram of the STORE Execution Timer.

FIG. 5q is a block diagram of the STORE MQ Execution Timer.

FIG. 5r is a block diagram of the MULTIPLY and MULTIPLY AND ROUND Execution Timer.

FIG. 5s is a block diagram of the further circuits of the MULTIPLY AND ROUND Execution Timer.

FIG. 5t is a block diagram of the STORE ADDRESS Execution Timer.

FIG. 5u is a block diagram of the DIVIDE Execution Timer.

FIG. 5v is a block diagram of the SHIFT ACCUMULATOR LEFT Execution Timer.

FIG. 5w is a block diagram of the LONG SHIFT LEFT Execution Timer.

FIG. 5x is a block diagram of the LONG SHIFT RIGHT Execution Timer.

FIG. 5y is a block diagram of the SHIFT ACCUMULATOR RIGHT Execution Timer.

FIGS. 5z, 5ab, 5ac, 5ad, 5ae, 5af, 5ag, 5ah, 5ai, 5aj, 5ak, 5am, 5an, 5ap, 5aq, 5ar, 5as, 5at, 5au, 5av, 5aw, 5ax, 5ay, 5az, 5ba, 5bb 5bc 5bd, 5be, 5bf, 5bg, 5bh, 5bi, 5bj, 5bk, 5bm, 5bn, 5bp, 5bq, 5br, 5bs, 5bt, 5bu, 5bv, 5bw, 5bx and 5by comprise block diagrams of Mixing Circuits.

FIG. 5ca is a block diagram of the STORE BASE REGISTER Execution Timer.

FIG. 5cb is a block diagram of the STORE LEFTMOST ONE COUNTER Execution Timer.

Figure 6B:
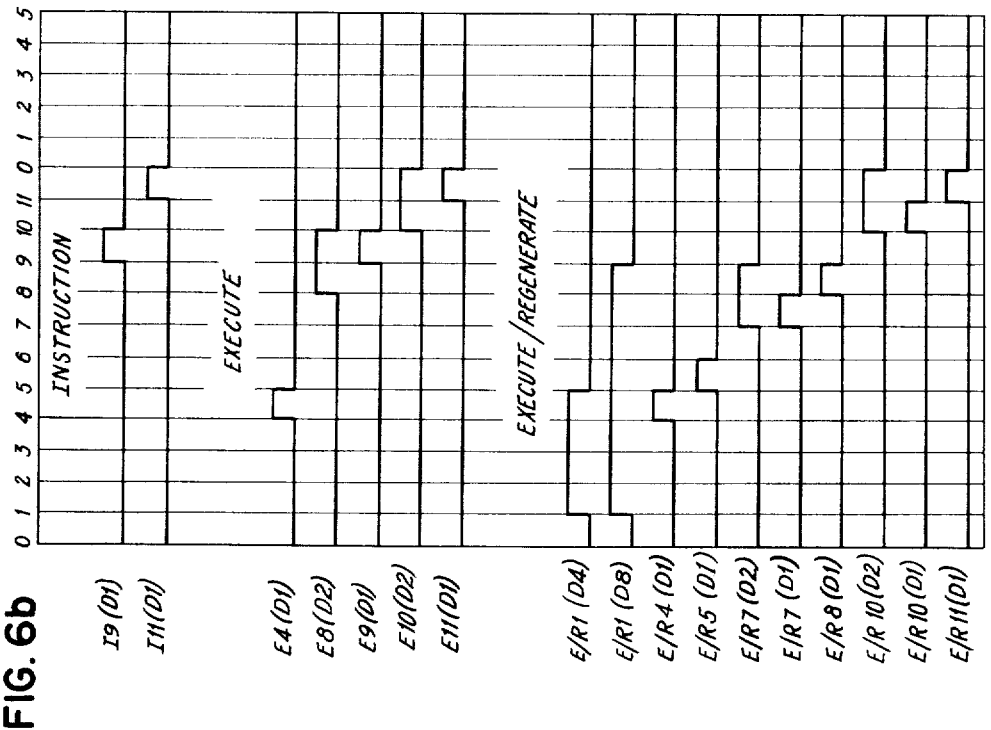
Figure 6A:
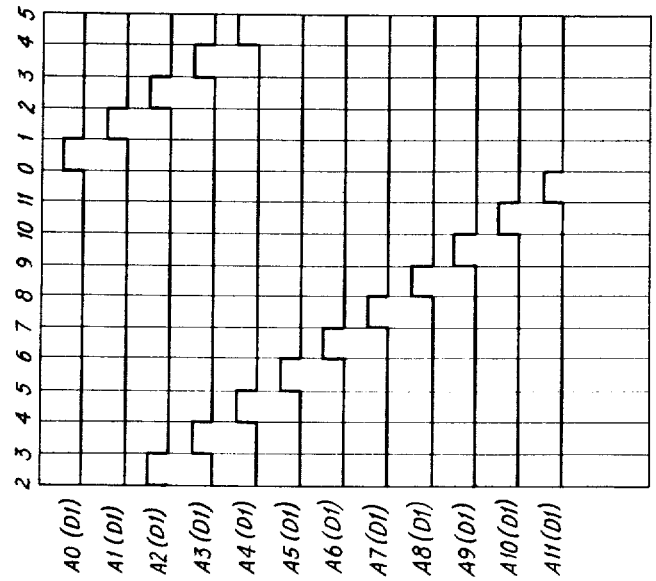

FIG. 6a comprises a Timing Diagram for certain outputs of the Clock.

FIG. 6b comprises a Timing Diagram for certain outputs of the Gate Generator.

Figure 6C:
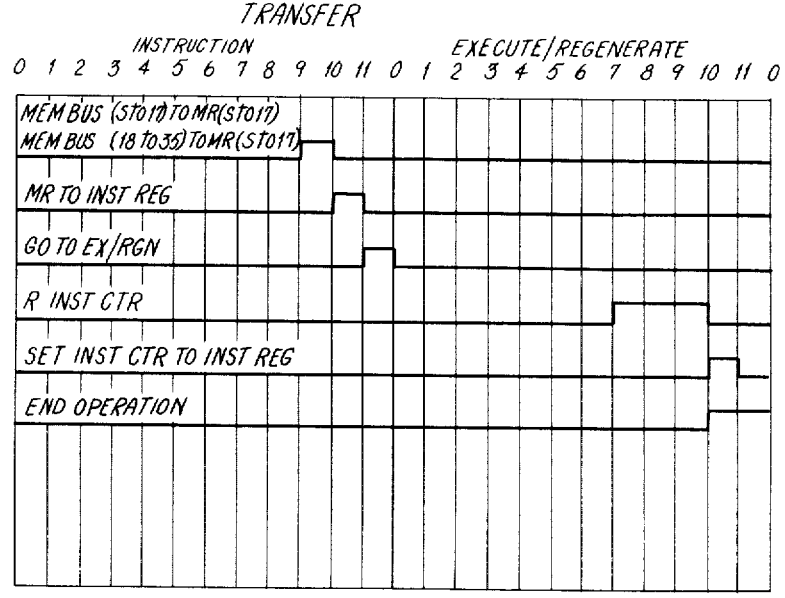

FIG. 6c comprises a Timing Diagram for a TRANSFER operation.

Figure 6D:
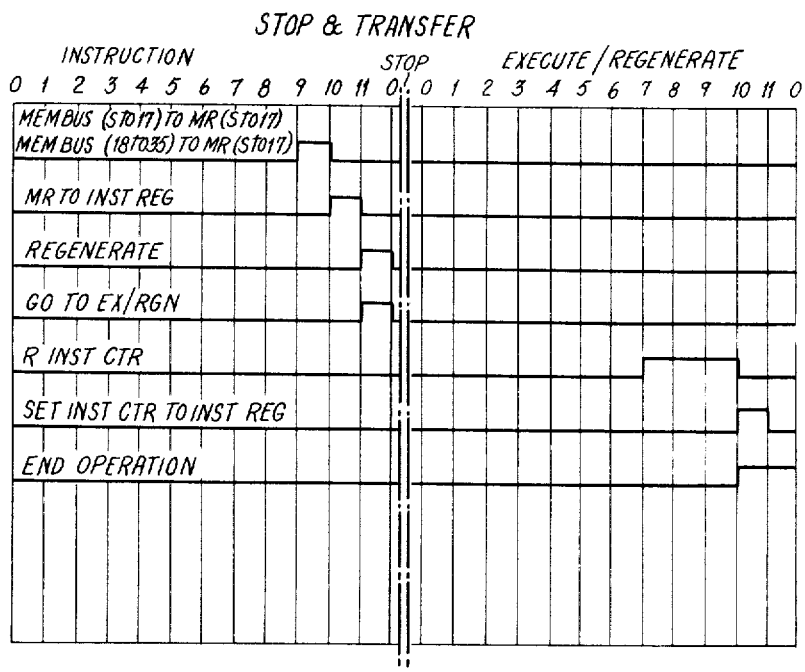

FIG. 6d comprises a Timing Diagram for a STOP AND TRANSFER operation.

Figure 6E:
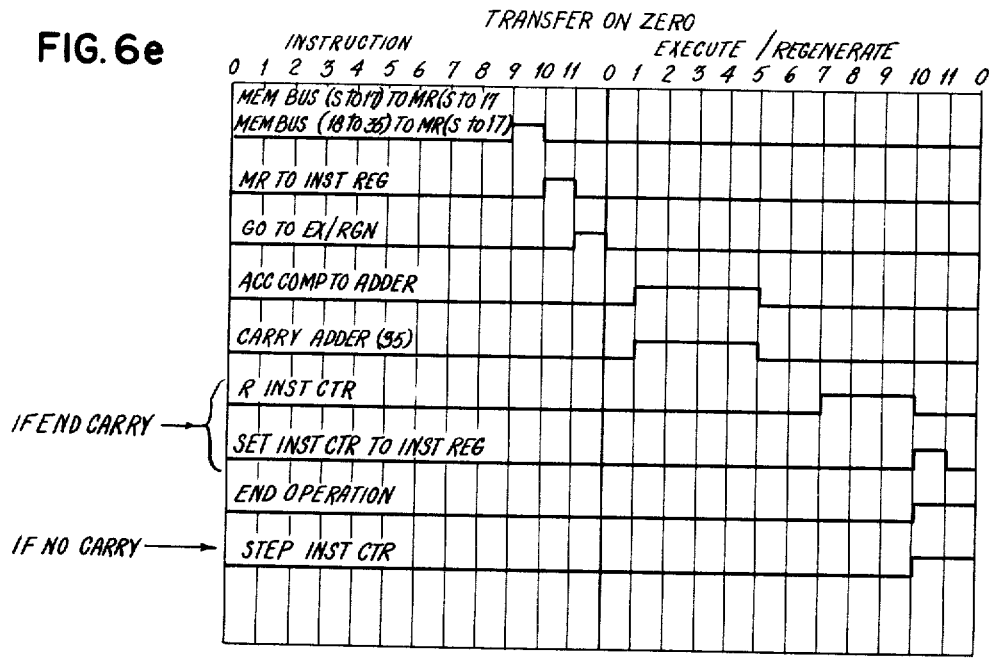

FIG. 6e comprises a Timing Diagram for a TRANSFER ON ZERO operation.

Figure 6F:
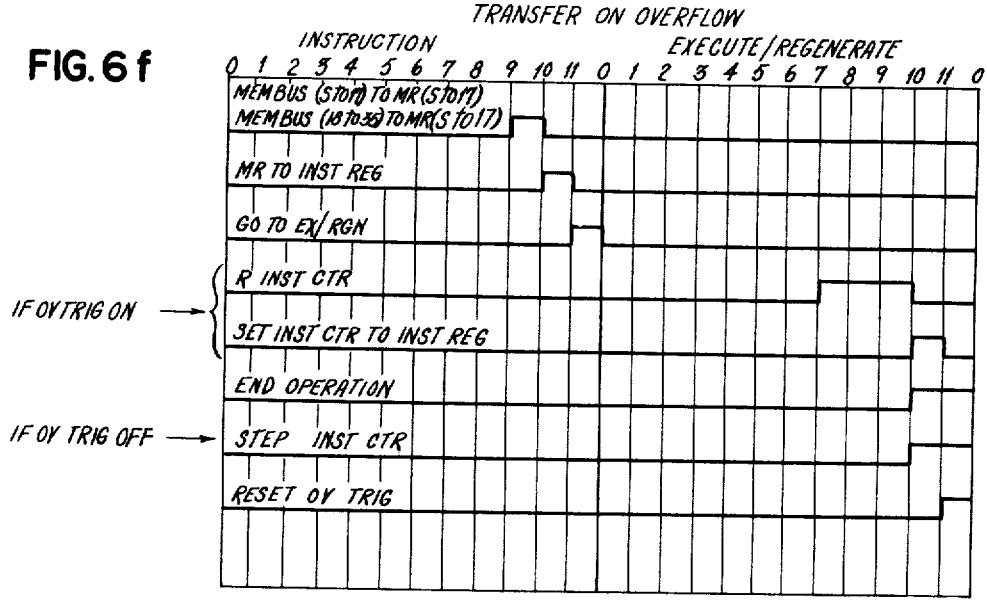

FIG. 6f comprises a Timing Diagram for a TRANSFER ON OVERFLOW operation.

Figure 6G:
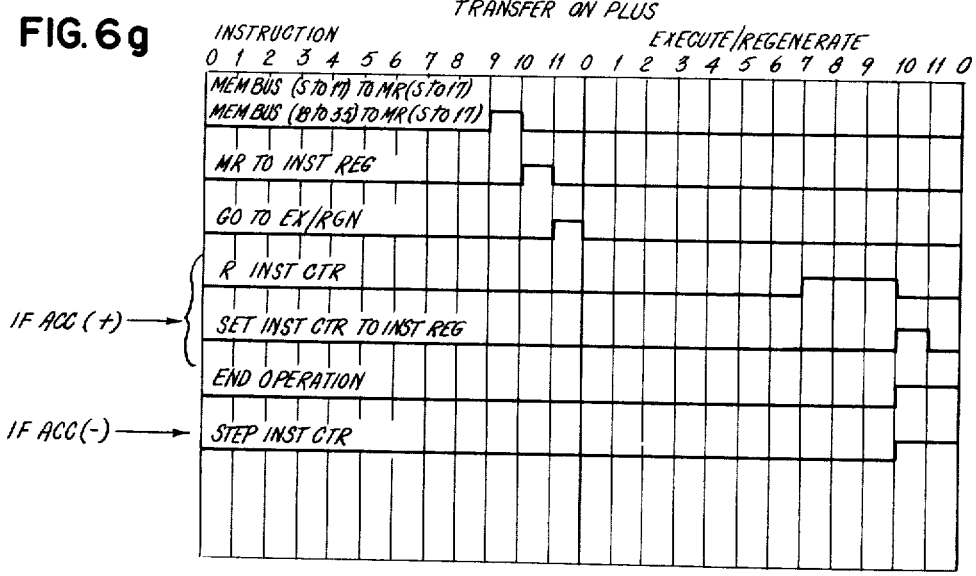

FIG. 6g comprises a Timing Diagram for a TRANSFER ON PLUS operation.

Figure 6H:
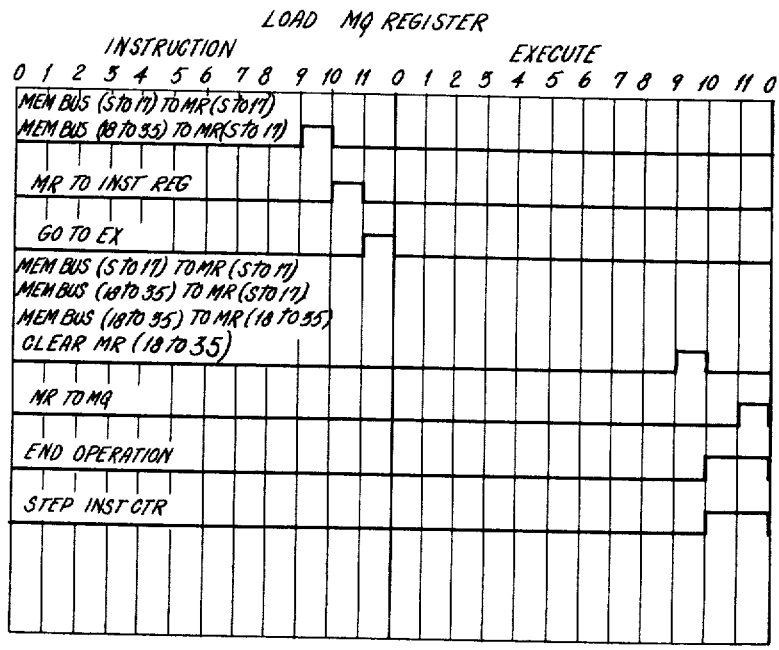

FIG. 6h comprises a Timing Diagram for a LOAD MQ REGISTER operation.

Figure 6I:
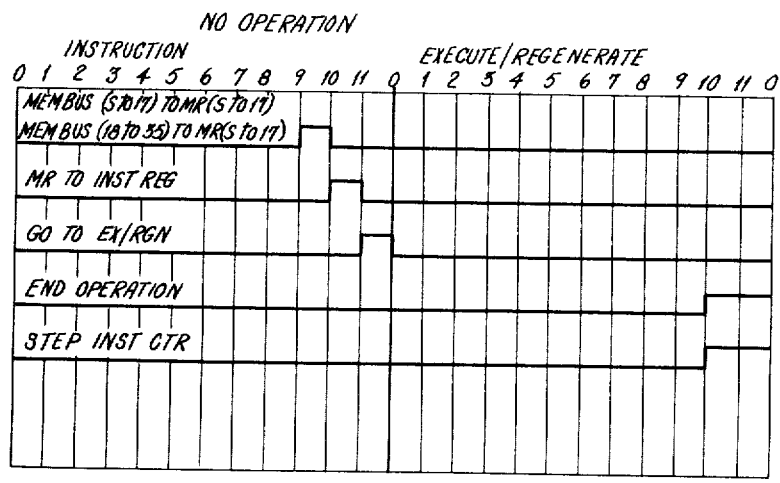

FIG. 6i comprises a Timing Diagram for a NO OPERATION.

Figure 6J:
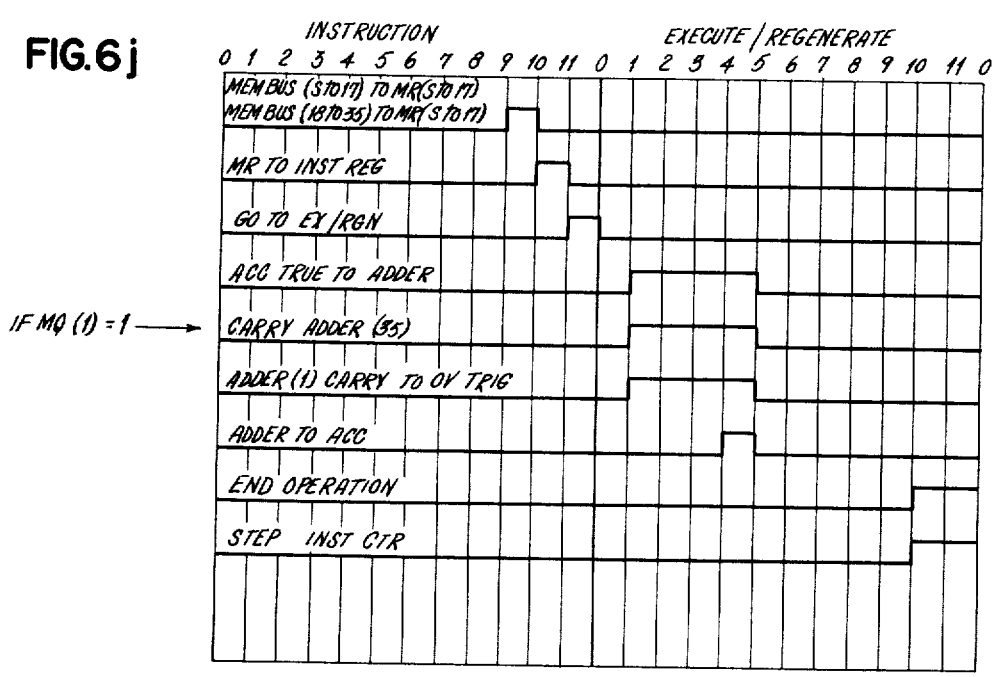

FIG. 6j comprises a Timing Diagram for a ROUND operation.

Figure 6K:
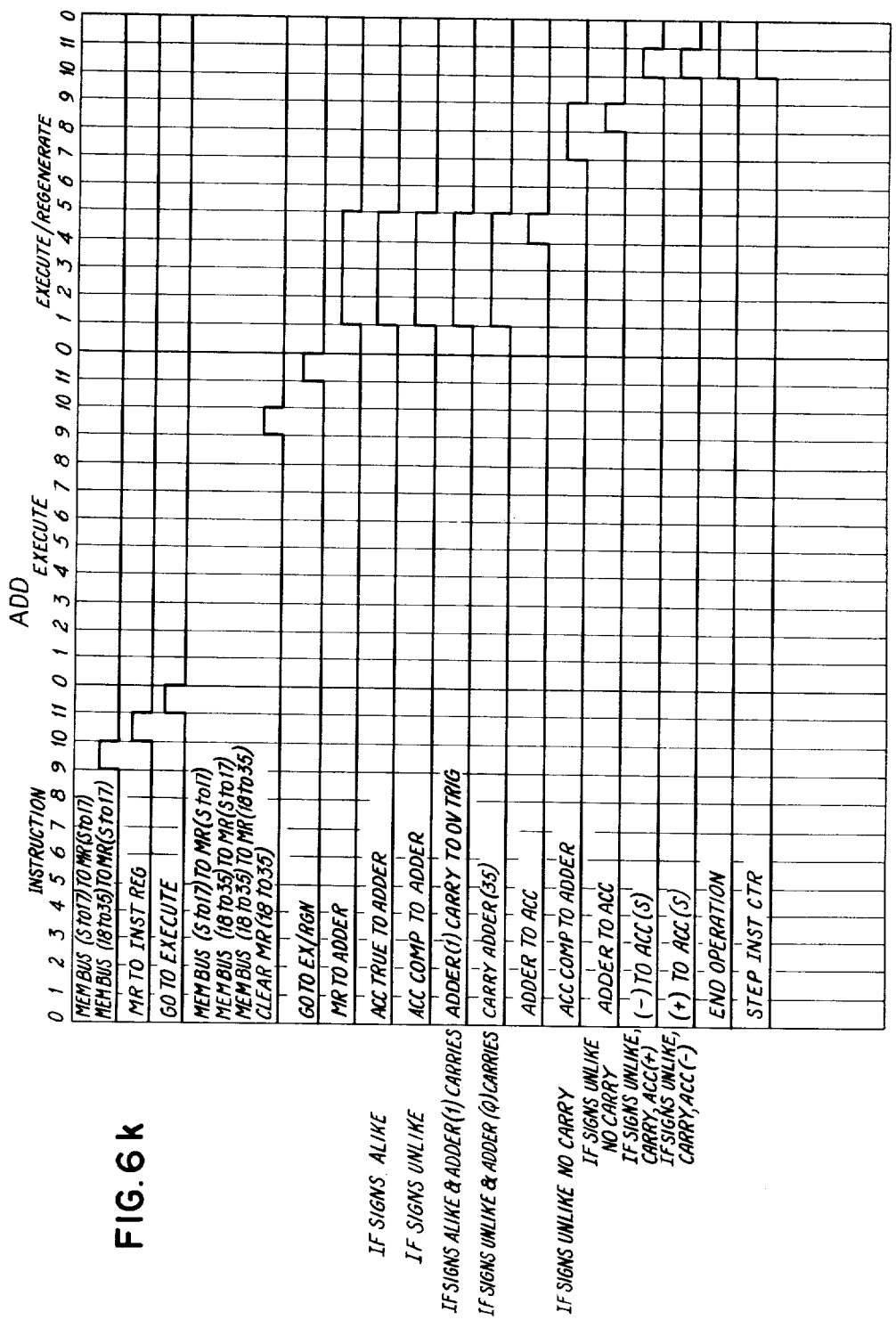

FIG. 6k comprises a Timing Diagram for an ADD operation.

FIG. 6m comprises a Timing Diagram for an ADD ABSOLUTE operation.

Figure 6N:
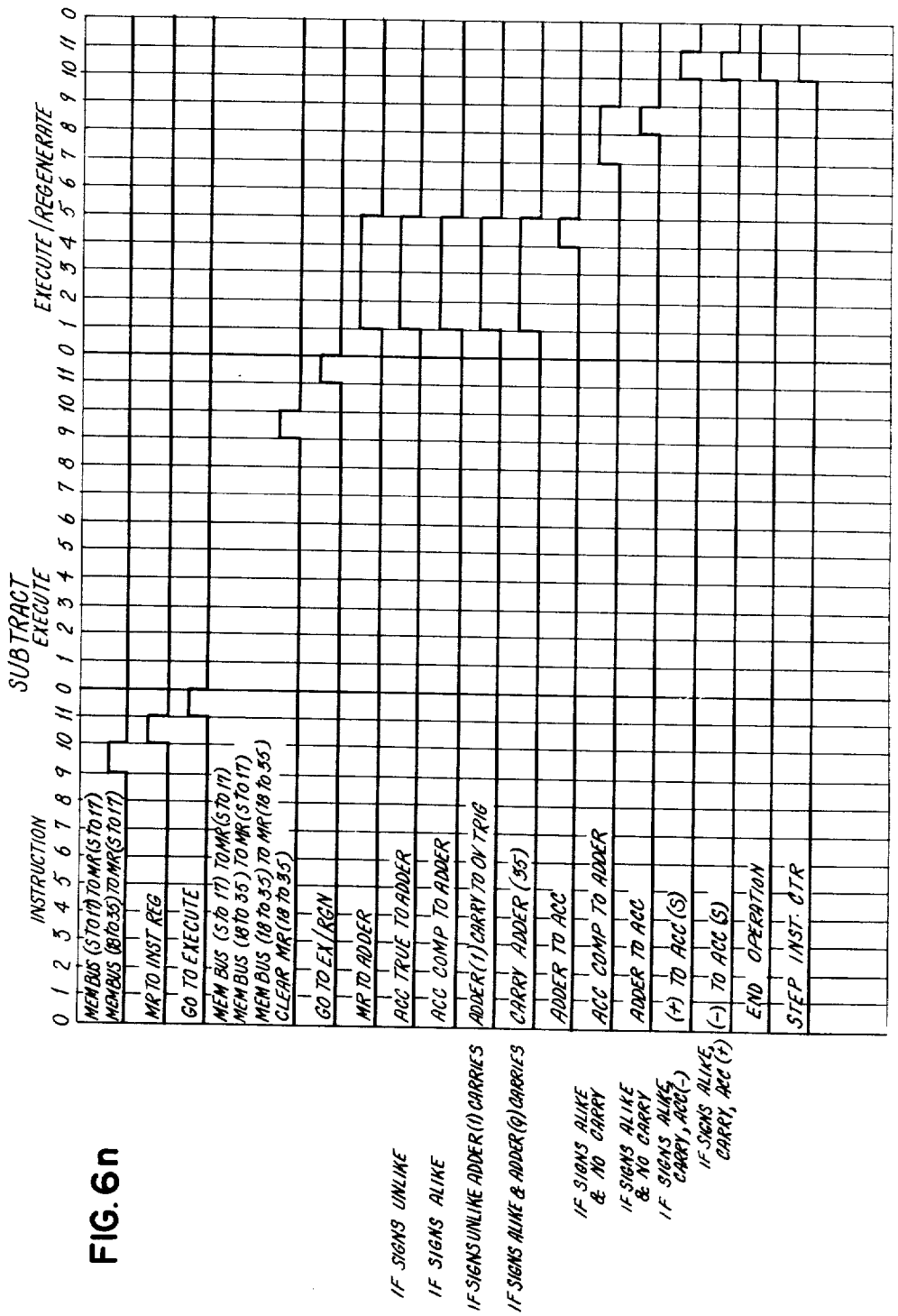

FIG. 6n is a Timing Diagram for a SUBTRACT operation.

Figure 6P:
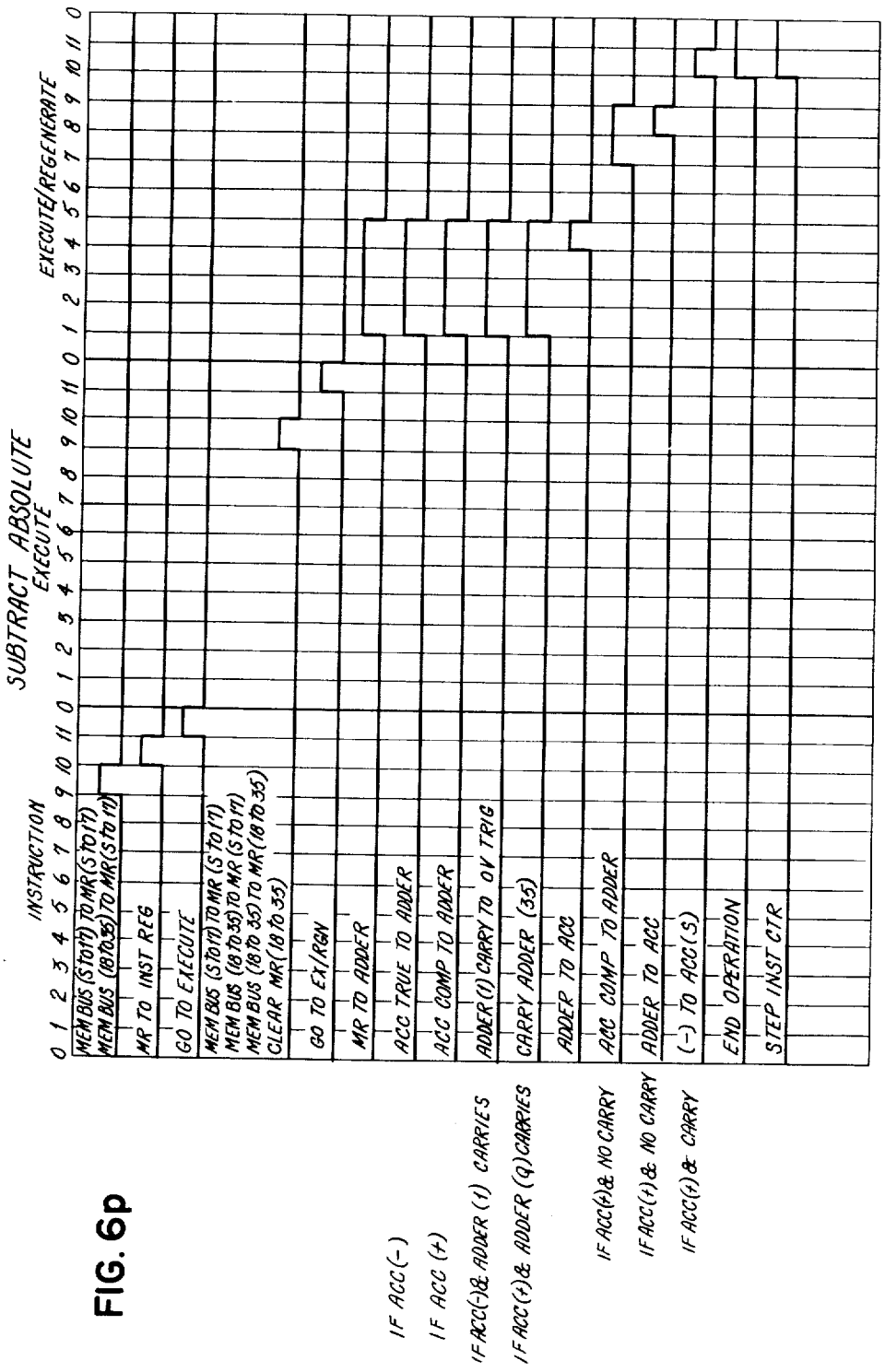

FIG. 6p comprises a Timing Diagram for a SUBTRACT ABSOLUTE operation.

Figure 6Q:
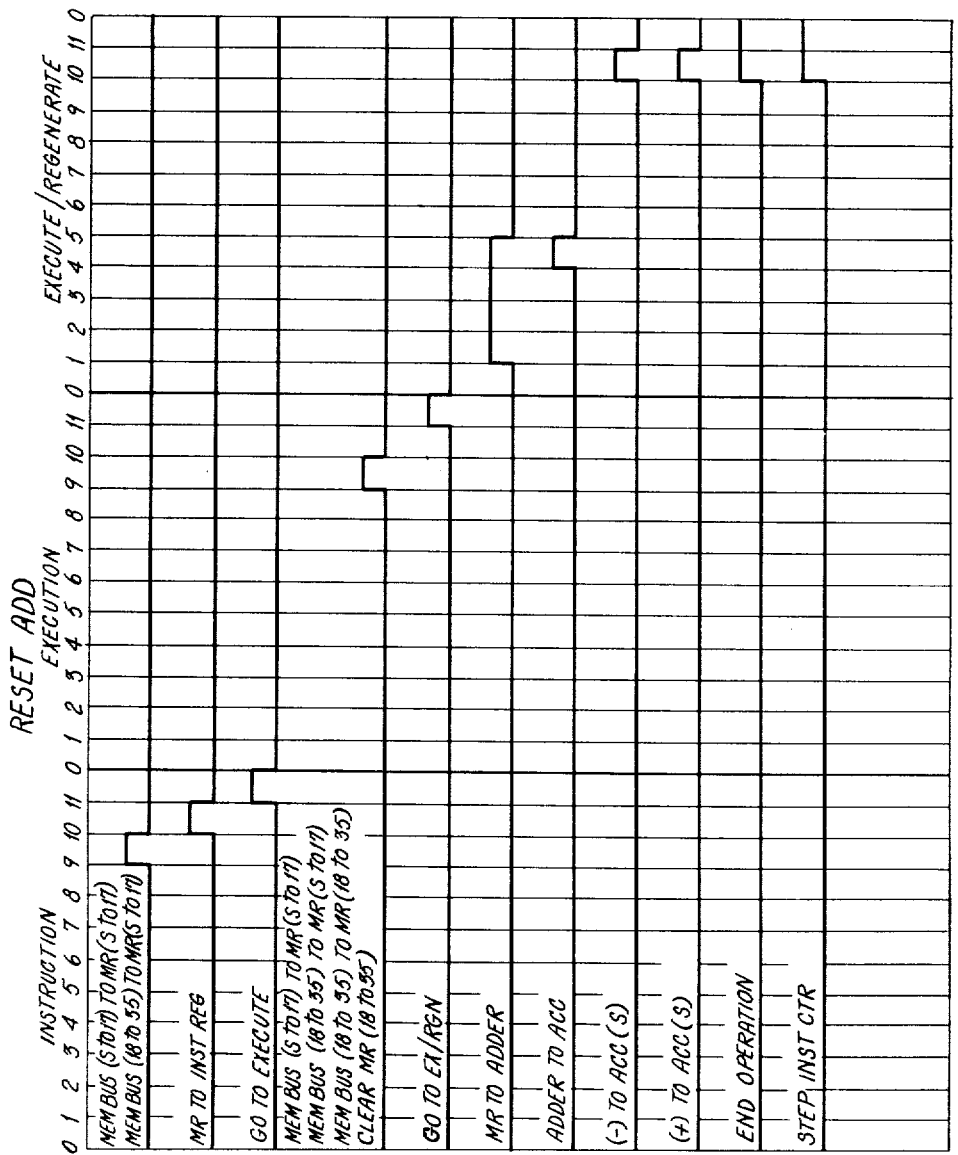

FIG. 6q comprises a Timing Diagram for a RESET ADD operation.

Figure 6R:
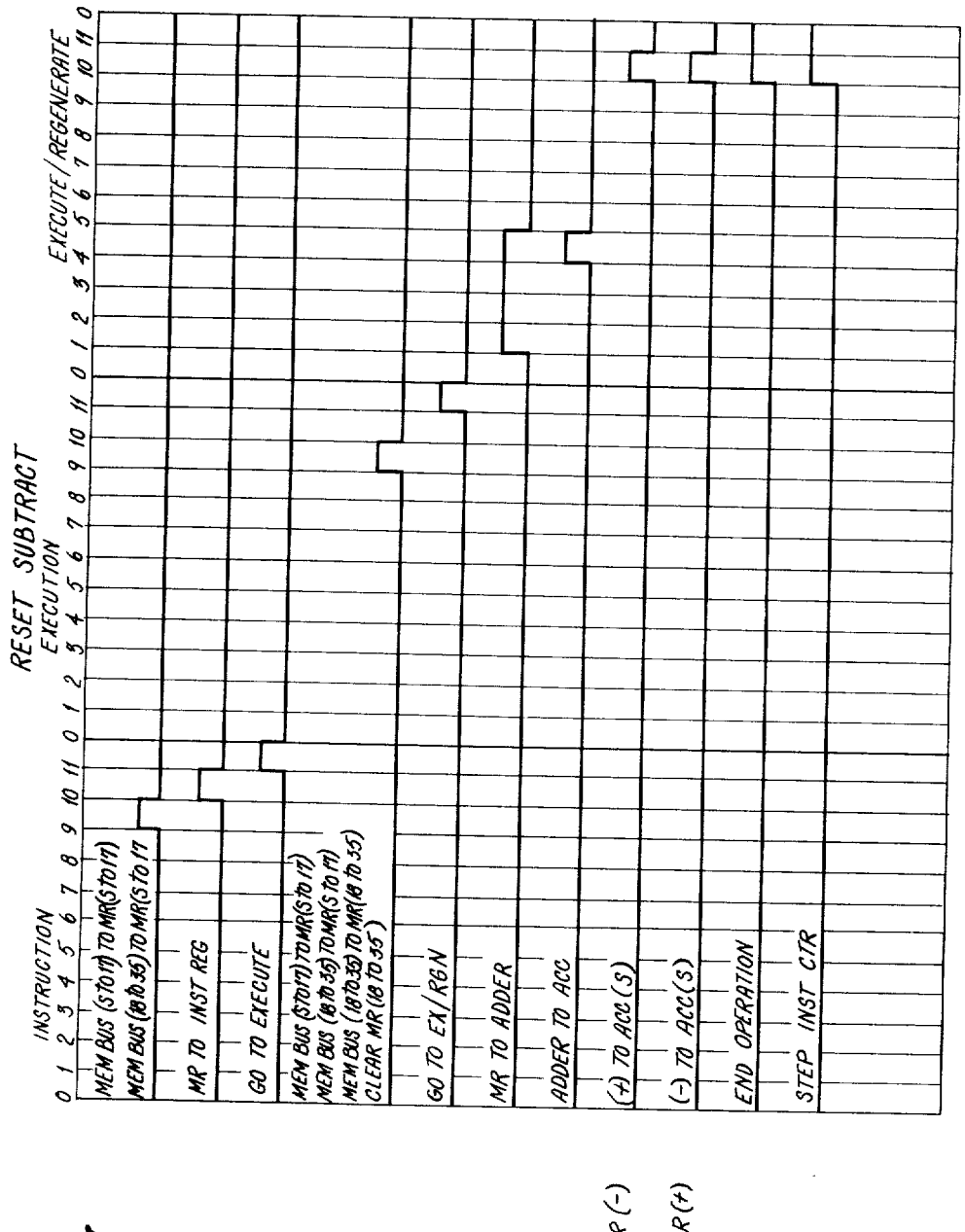

FIG. 6r comprises a Timing Diagram for a RESET SUBTRACT operation.

Figure 6S:
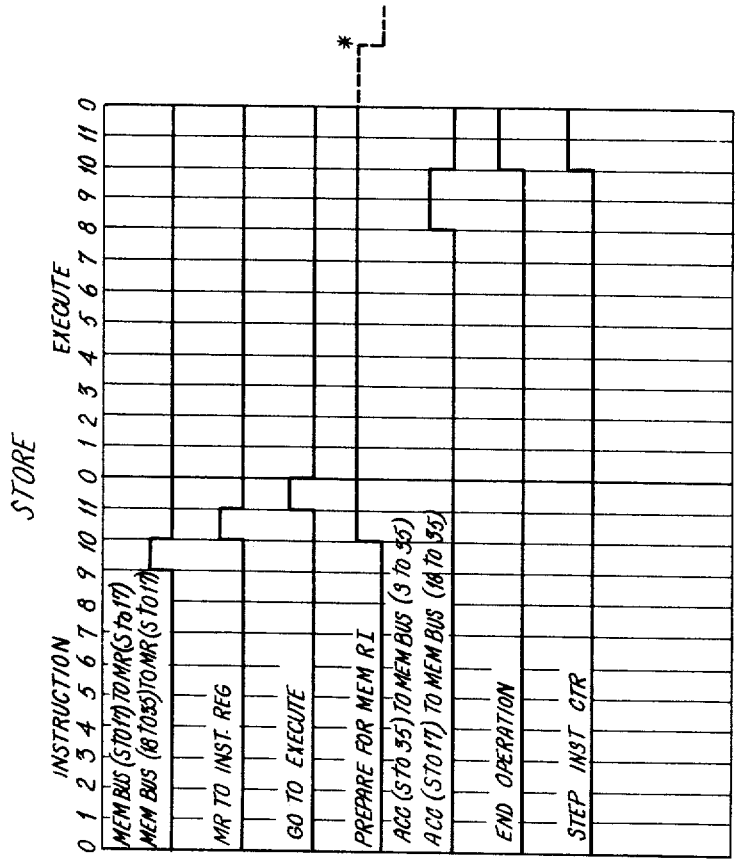

FIG. 6s comprises a Timing Diagram for a STORE operation.

FIG. 6t comprises a Timing Diagram for a STORE MQ operation.

FIG. 6u comprises a Timing Diagram for a STORE ADDRESS operation.

Figure 6V:
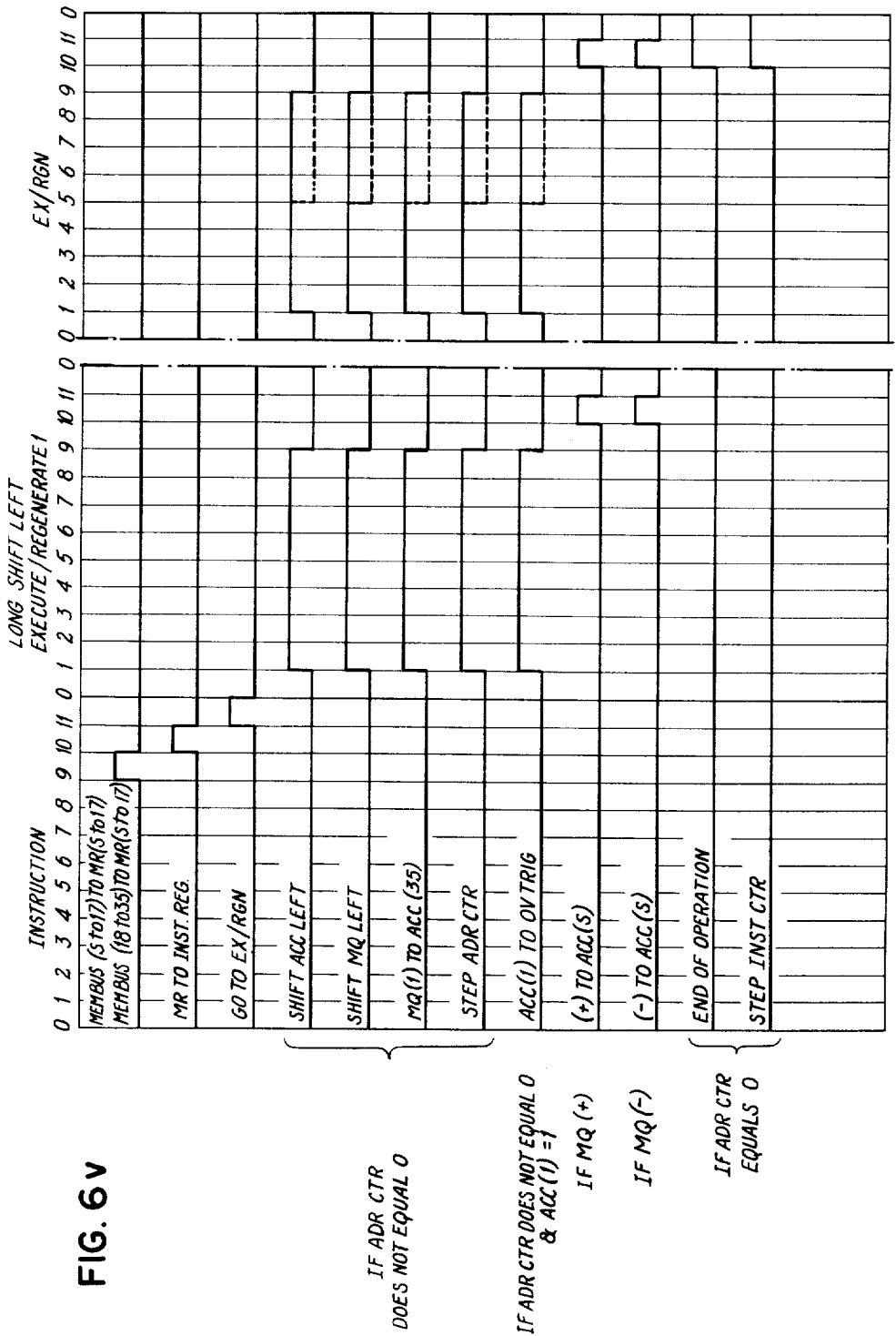

FIG. 6v comprises a Timing Diagram for LONG SHIFT LEFT operation.

Figure 6W:
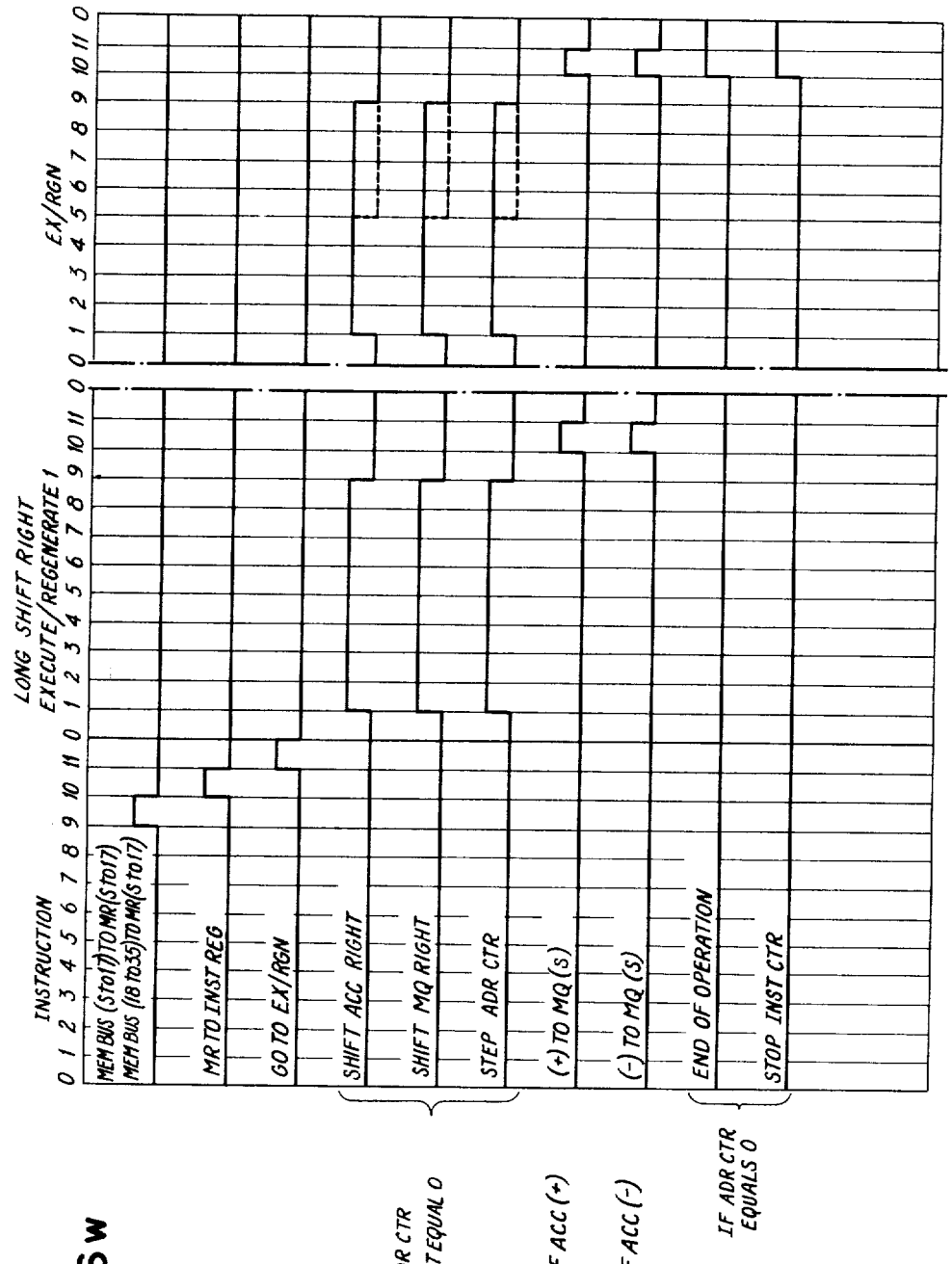

FIG. 6w comprises a Timing Diagram for a LONG SHIFT RIGHT operation.

Figure 6X:
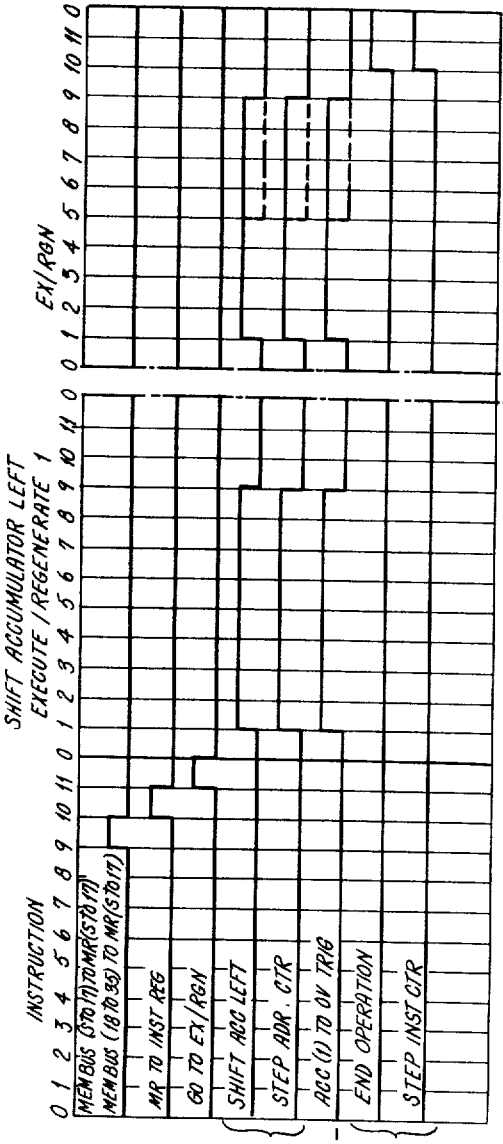

FIG. 6x comprises a Timing Diagram for a SHIFT ACCUMULATOR LEFT operation.

Figure 6Y:
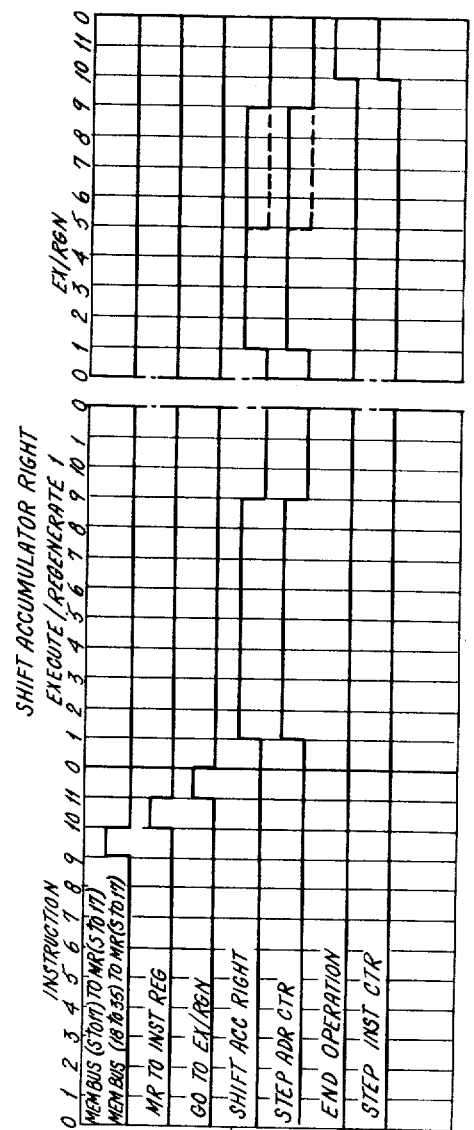
Figure 6A:
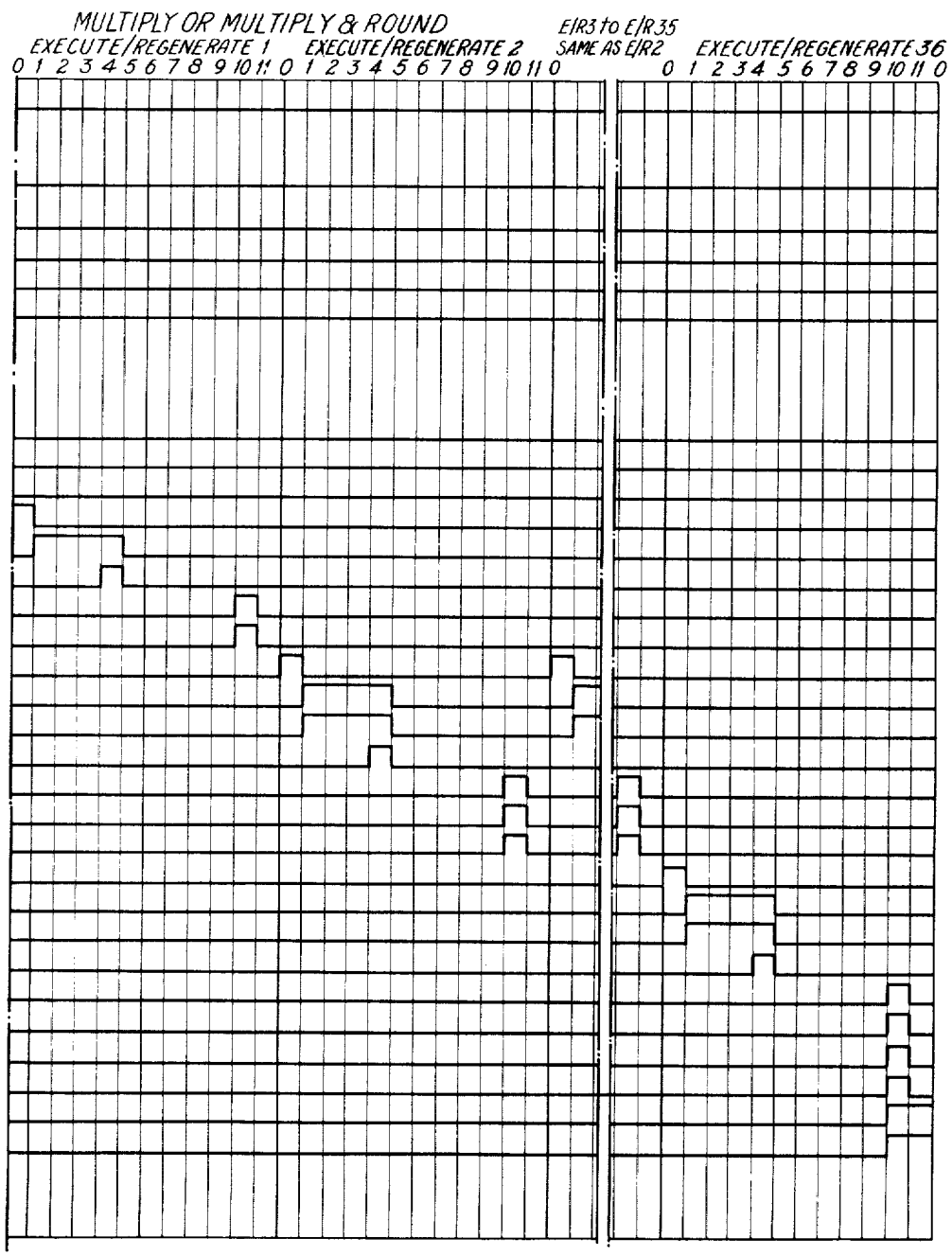
Figure 6A:
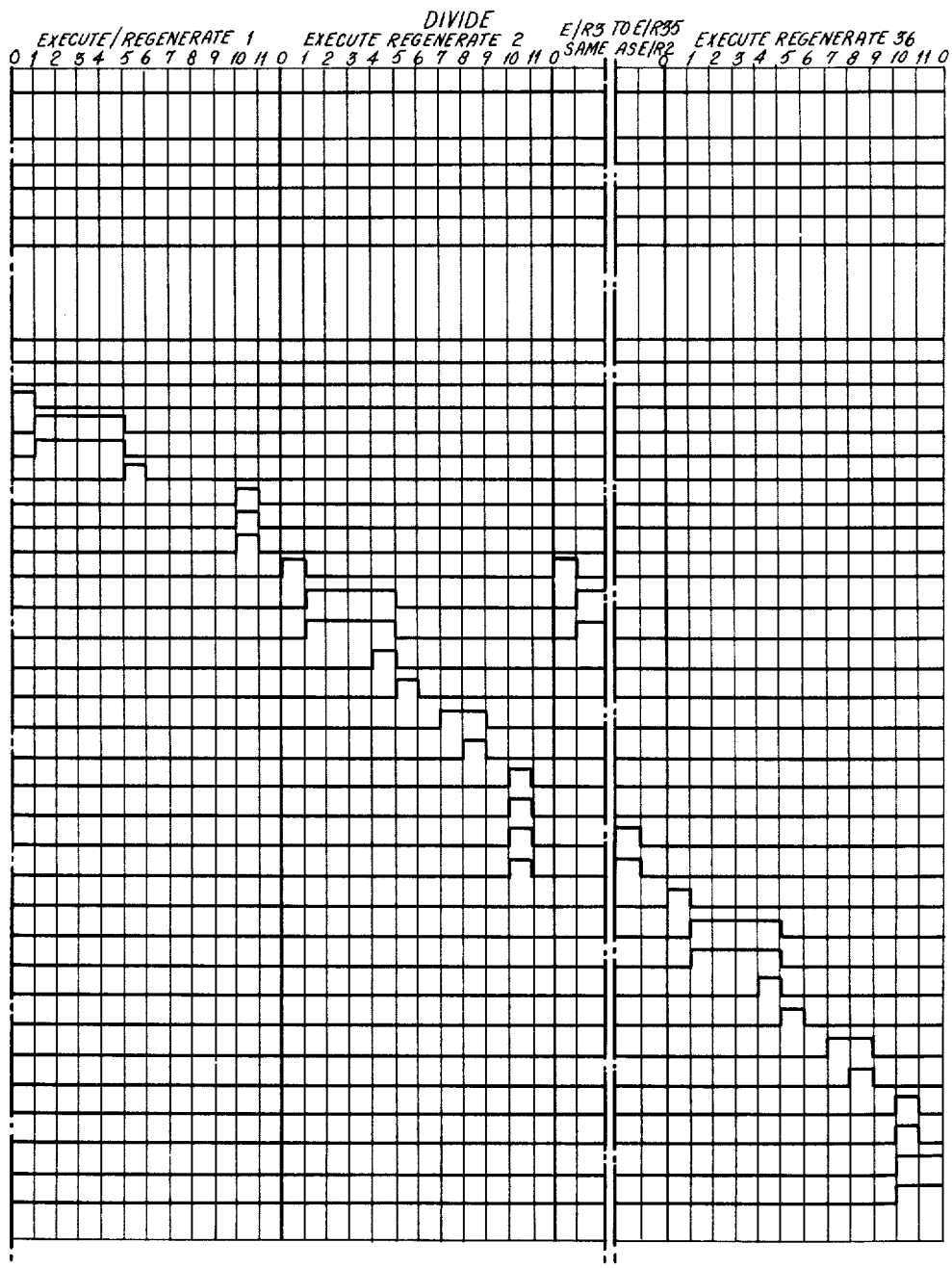
Figure 6A:
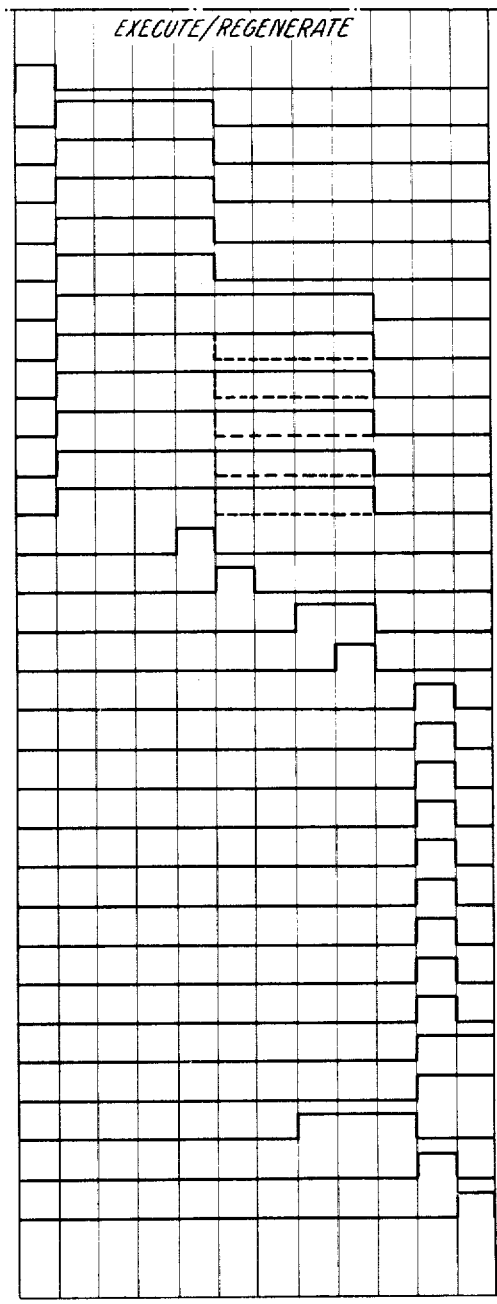

FIG. 6y comprises a Timing Diagram for a SHIFT ACCUMULATOR RIGHT operation.

FIGS. 6z and 6aa taken together, with FIG. 6aa to the right of FIG. 6z comprise a Timing Diagram for MULTIPLY or a MULTIPLY AND ROUND operation.

FIGS. 6ab and 6ac, taken together, with FIG. 6ac arranged to the right of FIG. 6ab, comprise a Timing Diagram for a DIVIDE operation.

FIGS. 6ad and 6ae, taken together with FIG. 6ad located above FIG. 6ae, comprise Timing Diagram showing all signals developed during various types of character cycles.

FIG. 6ag comprises a Timing Diagram for a LOAD MASK REGISTER operation.

FIG. 6ah comprises a Timing Diagram for a STORE MASK REGISTER operation.

FIG. 6aj comprises a Timing Diagram for a LOAD INDICATOR REGISTER operation.

FIG. 6ak comprises a Timing Diagram for a STORE INDICATOR REGISTER operation.

FIG. 6am comprises a Timing Diagram for a LOAD BASE REGISTER operation.

FIG. 6an comprises a Timing Diagram for a STORE BASE REGISTER operation.

FIG. 6ap comprises a Timing Diagram for a STORE LEFTMOST ONE COUNTER operation.

FIG. 6aq comprises a Timing Diagram for a TRANSFER AND STORE COUNTER operation.

Figure 7A:
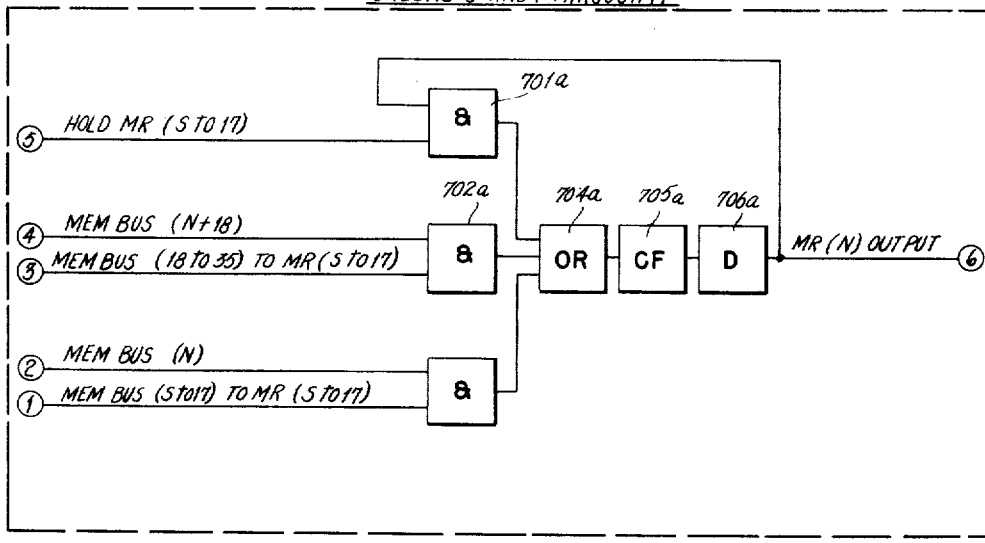

FIG. 7a is a block diagram of a Memory Register order, used in Memory Register orders S and 1 through 17.

Figure 7B:
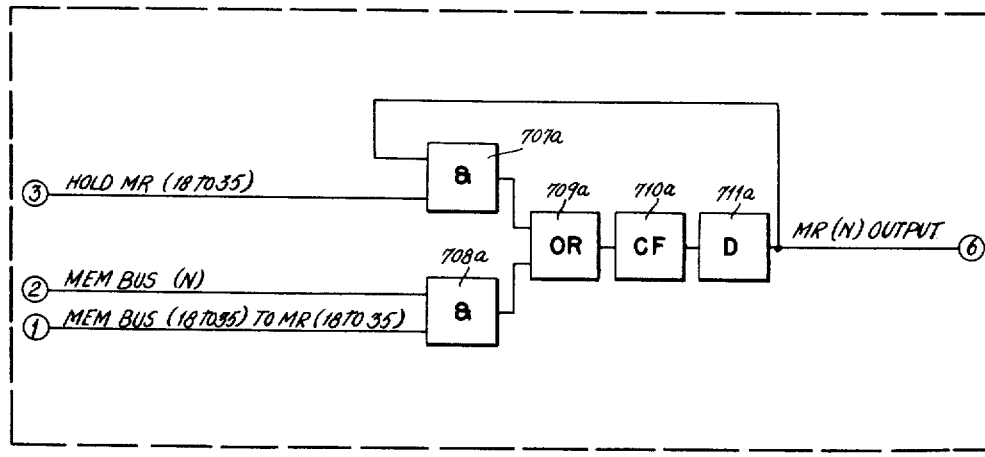

FIG. 7b is a block diagram of a Memory Register order, representing circuits used in Memory Register orders 18 through 35.

FIG. 7c comprises a full adder and true complement controls representative of the adder circuitry for Adder orders 1 through 35.

FIG. 7d comprises a block diagram of a half adder and true complement controls representative of the Adder orders P and Q.

FIG. 7e comprises a block diagram of the Sign order of the Accumulator Register.

FIG. 7f comprises a block diagram of an Accumulator Register order, representative of orders Q, P and 1 through 35.

FIG. 7g comprises a block diagram of an MQ Register order, representative of orders S and 1 through 35.

Figure 7H:
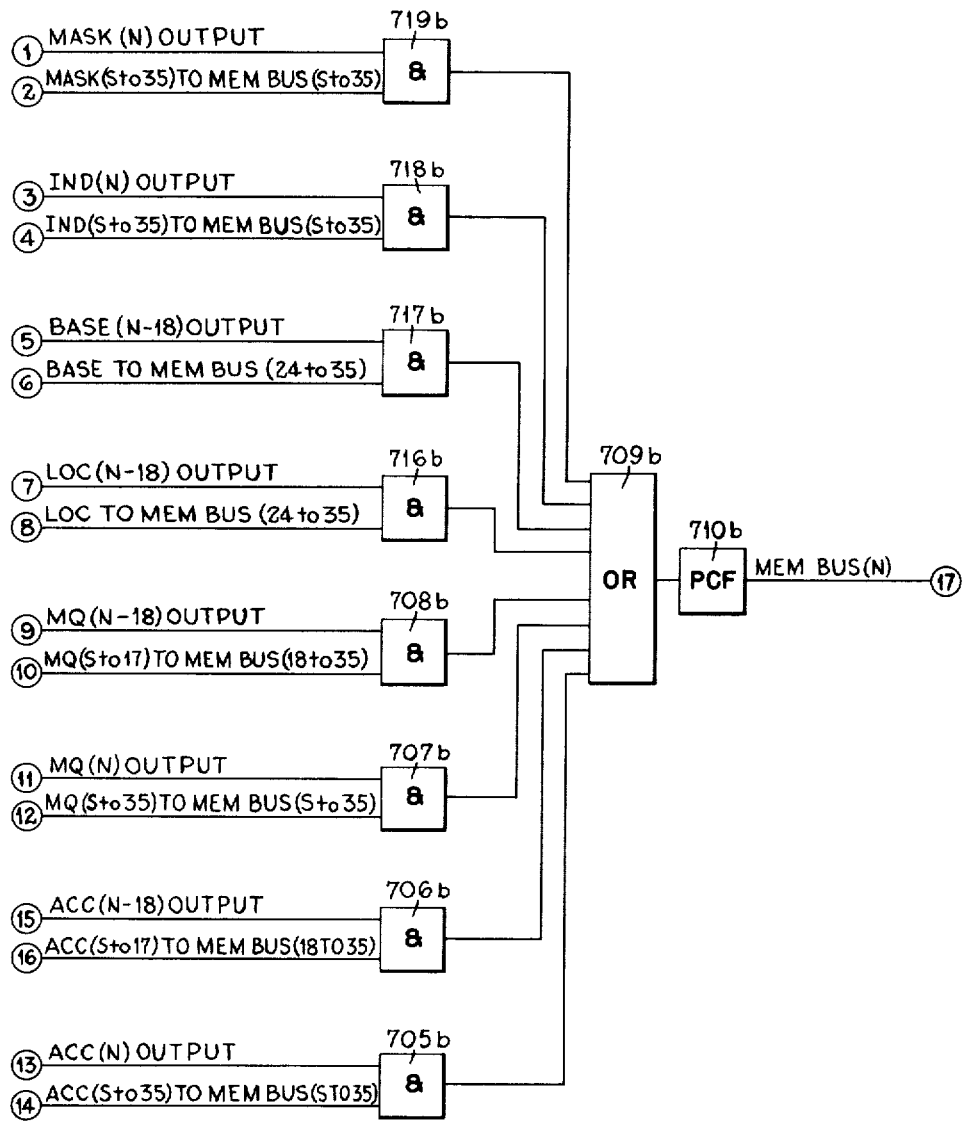
Figure 71:
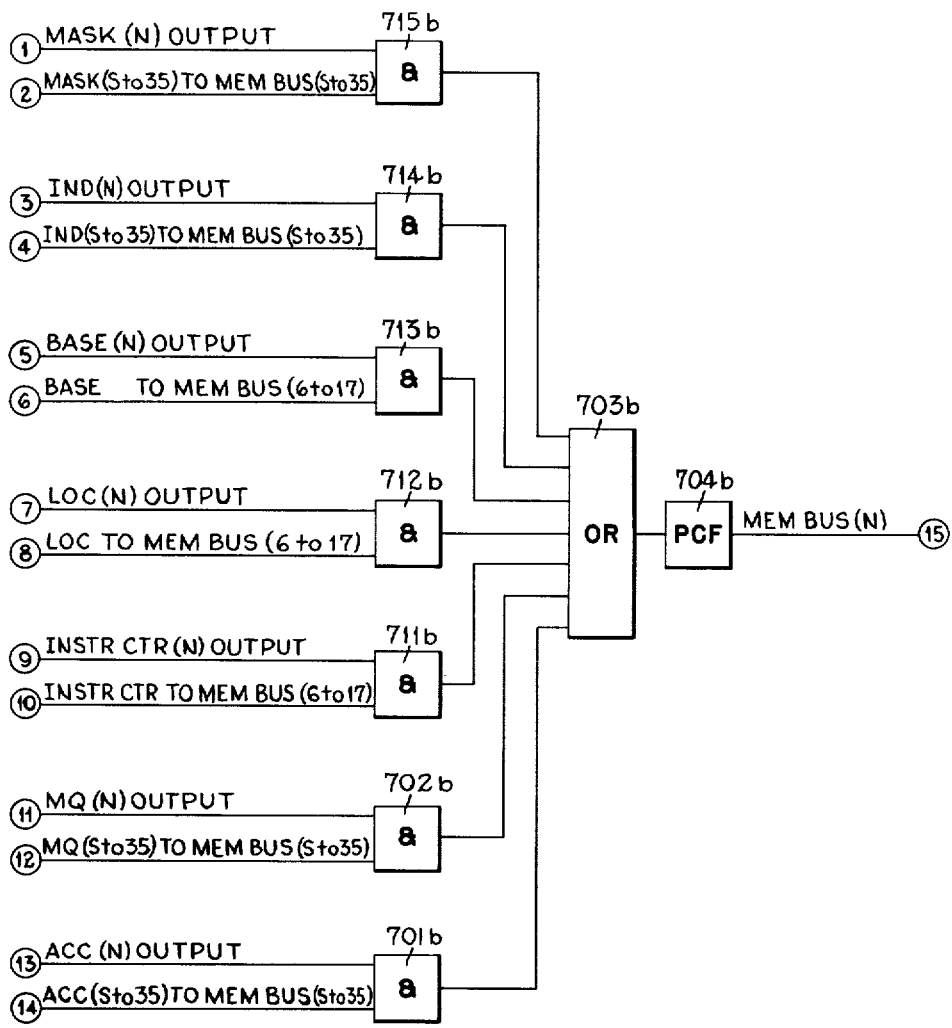

FIG. 7h comprises a block diagram of Memory Bus Switch Circuits for Memory Bus orders 18 through 35.

FIG. 7i comprises a block diagram of Memory Bus Switches, representative of orders S and 1 through 17.

FIG. 8a illustrates, in block form, the details of the INDICATOR REGISTER.

FIG. 8b illustrates, in block form, the details of the MASK REGISTER.

FIG. 8c illustrates, in block form, the details of the INTERRUPTION INDICATOR.

FIG. 8d illustrates, in block form, the details of the LEFTMOST ONE COUNTER.

FIG. 8e illustrates, in block form, the details of the BASE REGISTER.

FIG. 8f illustrates, in block form, the details of the INTERRUPT ADDER.

Figure 9C:
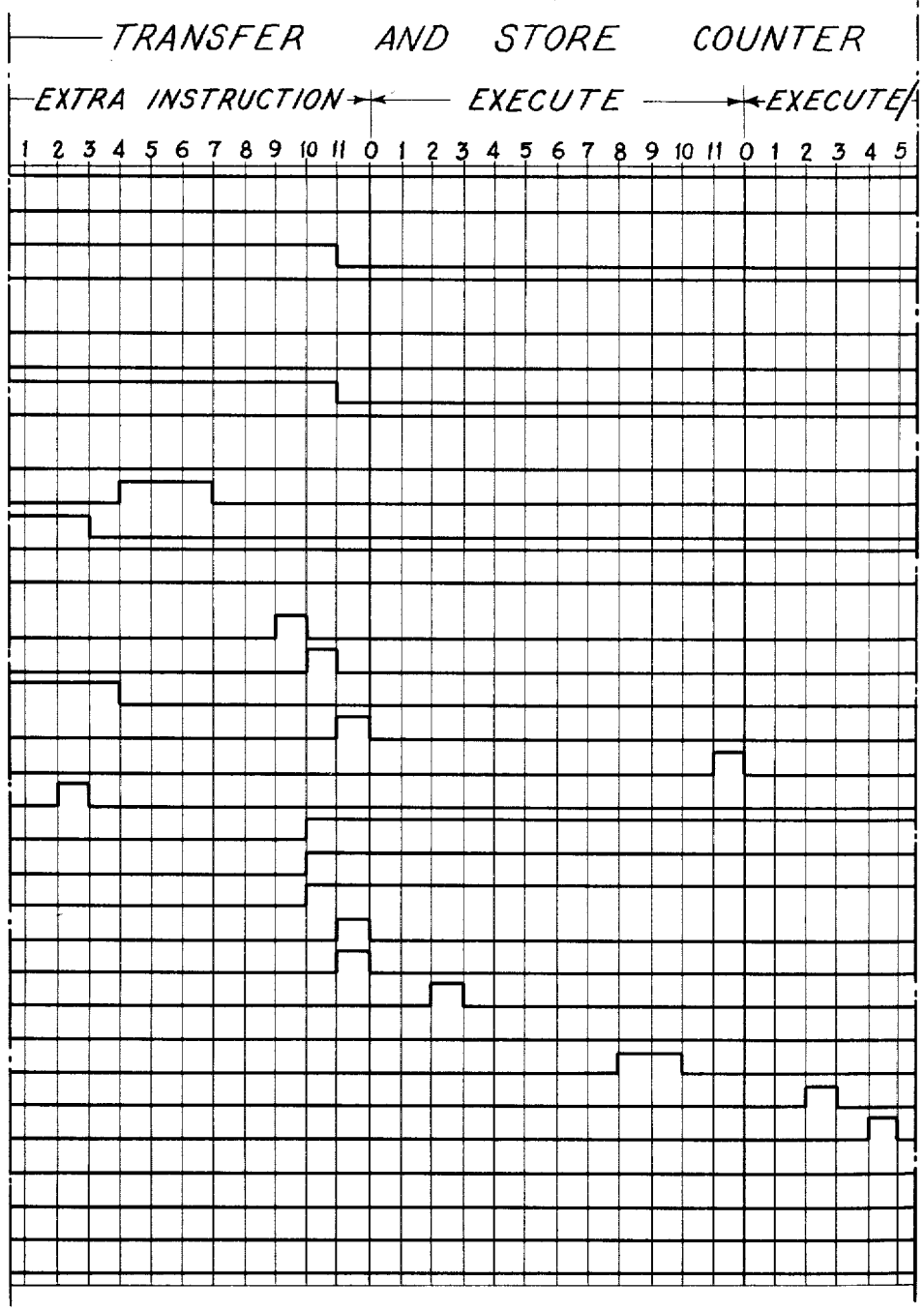
Figure 9D:
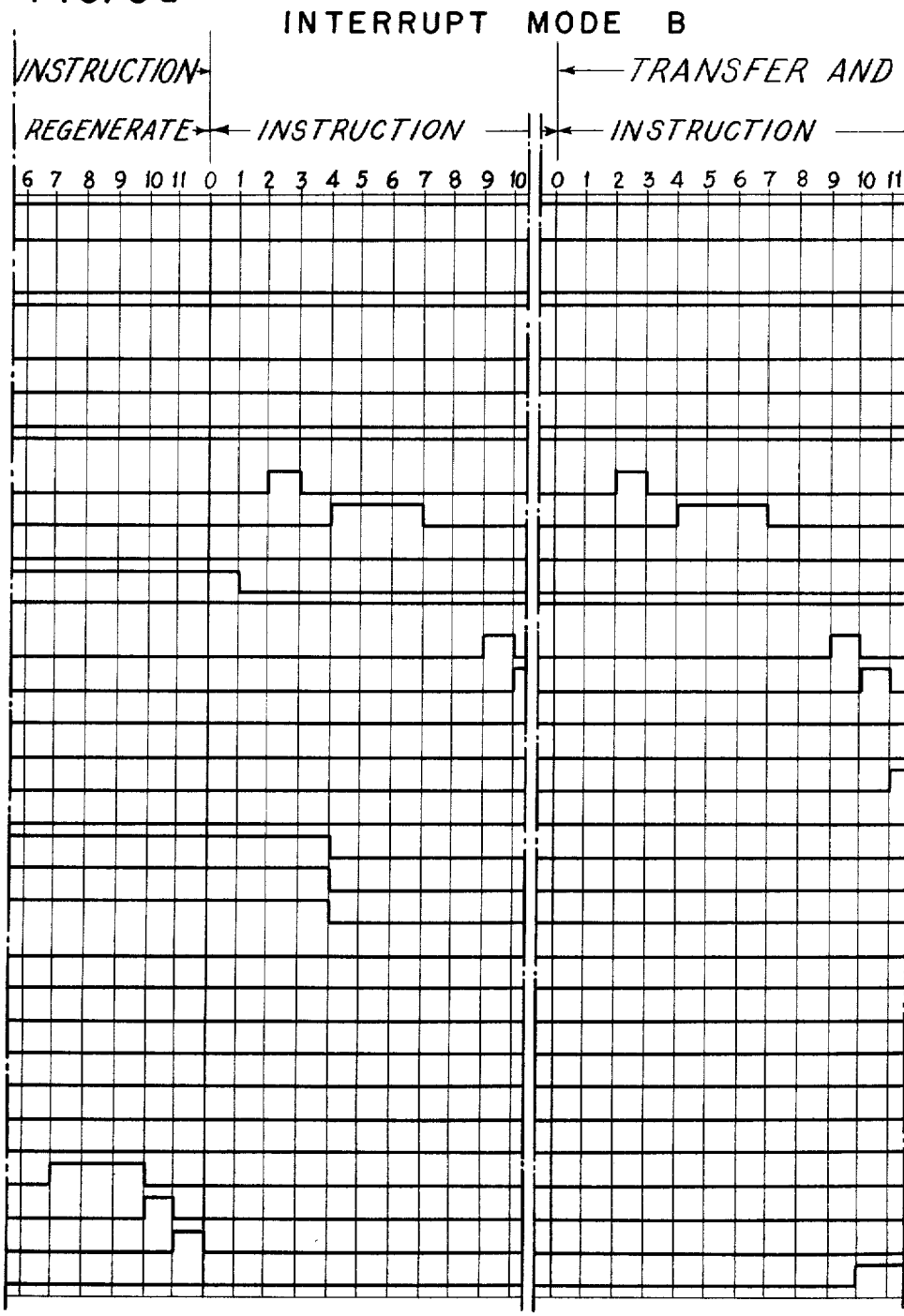

FIG. 9a is a Timing Diagram for an INTERRUPT MODE A operation.

FIGS. 9b, 9c, 9d and 9e taken together form a Timing Diagram for an INTERRUPT MODE B operation.

The specific description of the invention will be developed in reference to the topics and sub-topics noted in the following index of the subject matter of the present invention.

INDEX

| | Column No. |
|---|---|
| A Brief Outline of the Calculator | 9 |
| Instruction Repertoire of the Machine | 13 |
| Clock | 21 |
| Cycle Timer | 23 |
| Gate Generator Circuits | 27 |
| Interruption Timer | 28 |
| Instruction Register | 30 |
| Instruction Counter | 34 |
| Regeneration Counter | 39 |
| Deflection Switches and Register | 39 |
| Operation Decoder | 43 |
| Control Circuits | 44 |
|     Transfer | 46 |
|     Stop and Transfer | 48 |
|     Transfer on Zero | 50 |
|     Transfer on Overflow | 51 |
|     Transfer on Plus | 53 |
|     Load MQ | 54 |
|     No Operation | 55 |
|     Round | 56 |
|     Rules Governing Addition | 57 |
|     Add | 58 |
|     Add Absolute | 62 |
|     Subtract | 65 |
|     Subtract Absolute | 68 |

| | Column No. |
|---|---|
| Reset Add | 71 |
| Reset Subtract | 73 |
| Store | 74 |
| Store MQ | 76 |
| Store Address | 77 |
| Long Shift Left | 78 |
| Long Shift Right | 82 |
| Shift Accumulator Left | 84 |
| Shift Accumulator Right | 85 |
| Multiply/Multiply and Round | 86 |
| Divide | 94 |
| Load Mask Register | 101 |
| Store Mask Register | 103 |
| Load Indicator Register | 106 |
| Store Indicator Register | 109 |
| Load Base Register | 112 |
| Store Base Register | 115 |
| Store Leftmost One Counter | 119 |
| Transfer and Store Counter | 122 |
| Transfer and Enable | 127 |
| Arithmetic Unit (General) | 127 |
| Development of Certain Signals | 128 |
| (1) Memory Register | 129 |
| (2) Adder and True/Complement Control | 131 |
| (3) Accumulator Register | 135 |
| (4) Multiplier Quotient Register | 138 |
| (5) Memory Bus Switches | 140 |
| Interrupt Unit | 144 |
| Indicator Register | 144 |
| Mask Register | 147 |
| Interruption Indicator | 148 |
| Leftmost One Counter | 151 |
| Base Register | 152 |
| Interrupt Adder | 153 |
| Interrupt Mode A | 157 |
| Interrupt Mode B | 163 |

A BRIEF OUTLINE OF THE CALCULATOR

The Calculator, employed herein, is shown, described and claimed in the copending application of Haddad et al., Serial No. 419,642, filed March 30, 1954, now U.S. Patent 2,974,866, issued March 14, 1961, wherein words of 36 bits or half words of 18 bits are manifested or recorded in a pure binary system of notation. In such a binary notation, only two digit values exist, that is, 0 and 1, and these respective binary 0 or binary 1 digits are referred to as bits. The binary point corresponding to a decimal point in a decimal system may of course, occupy any position in the pure binary word. The digital position or orders of a binary number, reading from right to left, of the binary point, correspond in value to $2^0$, $2^1$, $2^2$, $2^3$, $2^4$, $2^5$, etc. or decimal digits 1, 2, 4, 8, 16, 32 etc., respectively. The digital position or order for a binary number reading from left to right, of the binary point, correspond in value to $2^{-1}$, $2^{-2}$, $2^{-3}$, $2^{-4}$, $2^{-5}$, etc., or the decimal or fractional values ½, ¼, ⅛, 1/16, 1/32, 1/64, respectively. The novel Calculator employed herein normally performs operations, on full words, which as stated above consists of 36 bits comprising 35 bits (binary digits) and a sign bit. However, for economy of operation, any of the full words may be split into two half words, each half word as stated above, consisting of 18 bits, comprising 17 bits and a sign bit. A binary number of a full word of 36 bits has a precision equal to that of about a 10 decimal digit number, and the half word corresponds in precision to a number of about 5 decimal digits. As described below, the calculator operates according to a stored program, this program comprising instructions each of which is a half word.

The position of the binary point is determined more or less by the programmer, and the arithmetic operations such as addition, subtraction, multiplication, division, and the like, must be performed according to definite rules. The programmer must keep track of the binary point position.

FIGS. 1a through 1i, taken together, and arranged as shown in FIG. 2, comprise an overall block diagram of an Electronic Data Processing Machine including the novel Calculator and showing, in general, the relationship of the various Units which make up this Machine. The Memory Unit as used in the machine and as illustrated by a labeled block, in FIG. 1c, comprises cathode ray tubes used as electrostatic data storage means which have a maximum capacity 2,048 full words of storage (36 bits per word.) These 2,048 full words, are stored on 36 sets, of cathode ray tubes and since any full word may be split into two half words, the total number of half words, which can be stored, is 4,096. The number of cathode ray tubes provided, is chosen at 36, since in the novel Calculator of this invention a full word is 36 bits, so that with 36 sets of cathode ray tubes, 36 bits may be read out of the Memory Unit simultaneously or 36 bits may be stored, in the Memory Unit, simultaneously, during one cycle of operation. This simultaneous operation is referred to as parallel operation. The Memory Unit, employed herein is shown, described and claimed in the copending application of Philip E. Fox et al., Serial No. 417,702, filed March 22, 1954, now Patent 2,950,465 issued August 23, 1960.

The timing of the Calculator is controlled by a Clock which comprises a twelve stage electronic trigger ring. The Clock develops 12 master timing pulses of one microsecond duration each, and a character cycle, of the Calculator, will be defined as one twelve microsecond period (one complete cycle of the Clock). The Clock is illustrated by the labeled block in FIG. 1b.

There are four general types of character cycles existing in the Machine operation. These four types of cycles are called Instruction, Execute, Execute/Regenerate, and Regenerate cycles, which are respectively abbreviated as I, E, E/R and R. The type of cycle at any certain time is controlled by a Cycle Timer, also illustrated by a labeled block in FIG. 1b.

As set forth in said above identified patent of Fox et al., the electrostatic storage which comprises Memory for the Machine may be addressed, and the information, stored in Memory, at the respective addresses, may be read out to a Memory Register. All information leaving the Memory Units, enters this Memory Register which comprises 36 Delay Units, S, and 1 through 35, inclusive, each of the type as described in said above identified patent of Fox et al., along with associated switching circuits. The Memory Register, designated hereinafter as MR, functions as a buffer storage between Memory and the Computer. The 36 Delay Units of this MR provides storage for 36 bits read from Memory and holds these bits until they are called for by the Calculator. Information is read, out of Memory into the MR, in parallel fashion, that is, 36 bits are read, simultaneously, for a full word, or 18 bits, simultaneously, for a half word. If 36 bits are read they are read into all 36 Delay Units of MR but if half words are read, they are always read into the Delay Units S, and 1 through 17 of the Mr. Information thus read into the MR may not only be transferred to the Calculator but also via a Register of the Calculator, described presently, to other Units of the Machine. The Adder (FIG. 1d) represented by labeled blocks, comprises 37 columnar orders, two of which are overflow columns P and Q. Each of the columnar orders 1 through 35 of the Adder consists of a group of circuits, as described in detail later, comprising three inputs, and two outputs.

The three inputs are (1) an output from a corresponding column of the MR; (2) an output from a corresponding column of an Accumulator Register described below; (3) a carry output from the Adder columnar order to the right.

The two outputs are (1) the sum output; (2) a carry output. The sum output is fed to a corresponding column of the Accumulator Register, while the carry output goes to the Adder column, to the left. In conjunction with means for controlling the flow of information, the Adder circuitry performs the functions of addition, subtraction, multiplication and division, all as described presently, multiplication and division consisting of a series of additions or subtractions and shifts, so that multiplication and division are also performed, in part, by the Adder circuitry. The Adder is not a register, per se, and therefore does not perform any function of storage, but merely operates, on the information as it is passed therethrough.

The Accumulator Register is used for storing the output of the Adder, and the combination, of the Adder and the Accumulator Register, may be regarded as an Accumulator. The Accumulator Register stores the results, of the operation performed, by the Adder. It consists of 38 columns, 2 of which, namely, Q and P, are for the purpose of overflow, and the other 36 comprising the 35 binary bits, of a full word, and the sign. Each of the columns of the Accumulator Register consists of a Delay Unit, similar to that used in the MR and the contents of the Accumulator Register may be shifted, either to the left or the right. The contents of the Accumulator Register, excluding the contents of the overflow columns, may be stored, in Memory, by a STORE Instruction, which is given with a Memory address. In this STORE operation, the number is stored in Memory, and the same number is left unaltered in the Accumulator Register.

The Multiplier Quotient Register, hereinafter referred to as the MQ, has two major functions. One, as its name implies, holds the Multiplier, for multiplication operations and the Quotient, in division operations. The MQ comprises 36 columns, one, of which, stores a manifestation of the sign of the number stored in the MQ, the remaining 35 columns storing manifestations of the multidigit number itself. Each column contains a Delay Unit, of the type used in the MR, along with suitable switching circuits. Words may be read, from Memory, via the MR into the MQ register by means of a LOAD, MQ Instruction, which includes a Memory address, and the contents of the MQ may be read out, and via Memory Bus Switches, be stored in Memory, by means of a STORE MQ Instruction which includes a Memory address. These memory bus switches are illustrated in FIG. 1e and are effective, as described below, to switch the contents of the accumulator register, the MQ, the indicator register, the mask register, the base address register, the leftmost one counter, or the instruction counter to the memory buses during a STORE, STORE MQ, STORE INDICATORS, STORE MASK, STORE BASE ADDRESS, STORE LEFTMOST ONE COUNTER, or TRANSFER AND STORE COUNTER instruction, respectively.

The Instruction Register (FIG. 1f) which may receive information from the MR, serves as a storage Register for an Instruction (a half word) read from Memory, during an Instruction cycle. The Instruction Register stores the coded binary bit representation, of a particular Instruction, until this Instruction is completely executed, and it is then reset, during the early part of the next Instruction cycle, before a new Instruction, is read into it, from Memory. Thus, the Instruction Register holds the complete Instruction and the Operation part of this Instruction is available to an Operation Decoder (FIG. 1f) until the particular operation is complete, while the Address portion of the Instruction is available to a Deflection Register (FIG. 1e) as described below. This Deflection Register comprises a plurality of electronic triggers, each respectively storing a binary bit representation, of the sign bit, and also of bits 6 through 17, inclusive. An Address Counter portion, of the Instruction Register, is utilized during multiply and divide operations, for the purpose of counting the number of cycles that the Machine completes, during the respective such operations. The purpose of this counter is to insure that a proper number of character cycles occurs during each of these operations.

The Instruction Counter (FIG. 1e) is a 12 stage counter, each stage comprising an electronic trigger, the Counter output being fed to the Deflection Register during each Instruction cycle. The Instruction Counter receives a pulse at the END of each Operation so that on the next Instruction cycle a succeedingly numbered address in Memory will be referred to. The Instruction Counter may, under certain conditions, also be stepped to cause a skipping of Instructions.

The Regeneration Counter (FIG. 1e) comprises ten stages each including an electronic trigger, respectively storing binary bit representation of the bits 6 through 15, inclusive. The Regeneration Counter output is fed to the Deflection Register during Execute/Regenerate and during Regenerate cycles and is stepped, one count, for each such cycle so that succeeding numbered addresses, in Memory, are addressed and regenerated, during successive Execute/Regenerate and Regenerate cycles.

The Deflection Register has 12 orders, each comprising an electronic trigger, whose outputs feed to the Memory Deflection circuits and the Memory Control circuits. This Deflection Register therefore serves as a buffer between the Instruction Register, the Instruction Counter, the Interrupt Adder and the Regeneration Counter, on one hand and the Memory Deflection circuits and the Memory Control circuits, on the other hand. The Memory Deflection and Memory Control circuits, represented by the labeled block in FIG. 1g, are identical to those described in detail in said above identified Fox et al, application and are effective to address and unblank the respective cathode ray tubes comprising Memory for both reading out of or writing in Memory.

The Operation Decoder decodes the manifestations of the "1" to "5" bit permutations which comprise the Operation part of the Instruction and the sign bit permutation to determine which one, of 41 possible Instructions, the machine will perform. The Operation Decoder comprises a diode matrix circuit which receives these permuted inputs and produces one output only, of any one of 41, thus signalling the particular kind of operation that is to be performed. The Operation Decoder, in accordance with which one of its 41 outputs is thus energized, conditions selectively various control circuits, which in turn produce the respective type of operation called for.

The information stored in Memory, is categorized into two general classes, according to the purpose for which it is used. These are Instructions and numerical information which are to be processed in accordance with the particular Instruciton. The Calculator is made to distinguish between Instructions and numerical information by the selected type of cycle, causing Reading from memory. Information readout of Memory, during an Instruction cycle, is channeled to the Instruction Register where the stored manifestations of the bits read out comprise a representation of the Instruction. Information read out during an Execute cycle is handled as numeric data. Numeric data is available, either in half words of 18 bits or in full words of 36 bits, but Instructions are always half words. The Gate Generator, illustrated in FIG. 1b, controls the basic timing of the Machine and provides signals which are used in the respective operations, as described later. The Address, Sign, and Address Counter Mixer circuits illustrated by a labeled block in FIG. 1b combine the outputs from the Sign bits, of the MR, the Accumulator Register, and the MQ, to provide signals indicating that the Signs are alike or unlike, and also passes signals from the Instruction Register indicating when the Address Counter reaches a desired count during a multiply or a divide operation and whether a full, an even half or an odd half word is addressed. Outputs from these circuits feed to the Execution Timer and to the Mixing circuits.

A "carry" trigger is utilized to supply an indication than an end carry has occurred from the "Q" position of the Adder during certain operations. An Overflow trigger is utilized to supply an indication that a carry has occurred from the Adder "1" position to the overflow position "P" during certain operations or that a binary 1 has been shifted left from the Accumulator Register 1 position to the Accumulator Register "P" position during other operations.

The Multiply Divide Tally Counter represented by a labeled block in FIG. 1b controls the type of cycle, that occurs, during multiply and divide operations, as described below. The Execution Timers via the Mixing circuits control the data processing throughout the Machine. The particular Execution Timer controlling during a particular type of operation is that Execution Timer related to the patricular operation, for example, during an ADD operation, the ADD Execution Timer takes control.

Figure 1A:
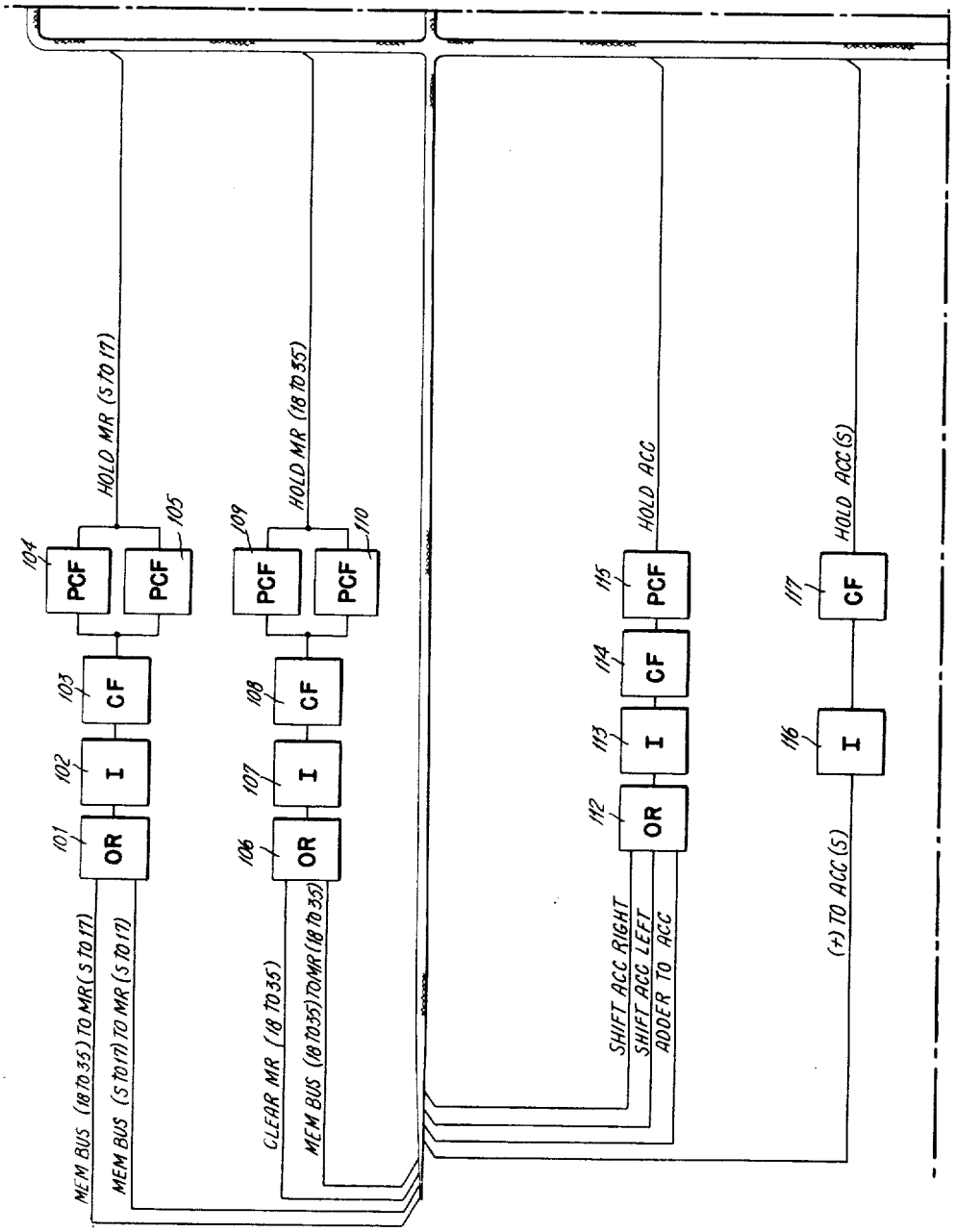
Figure 1B:
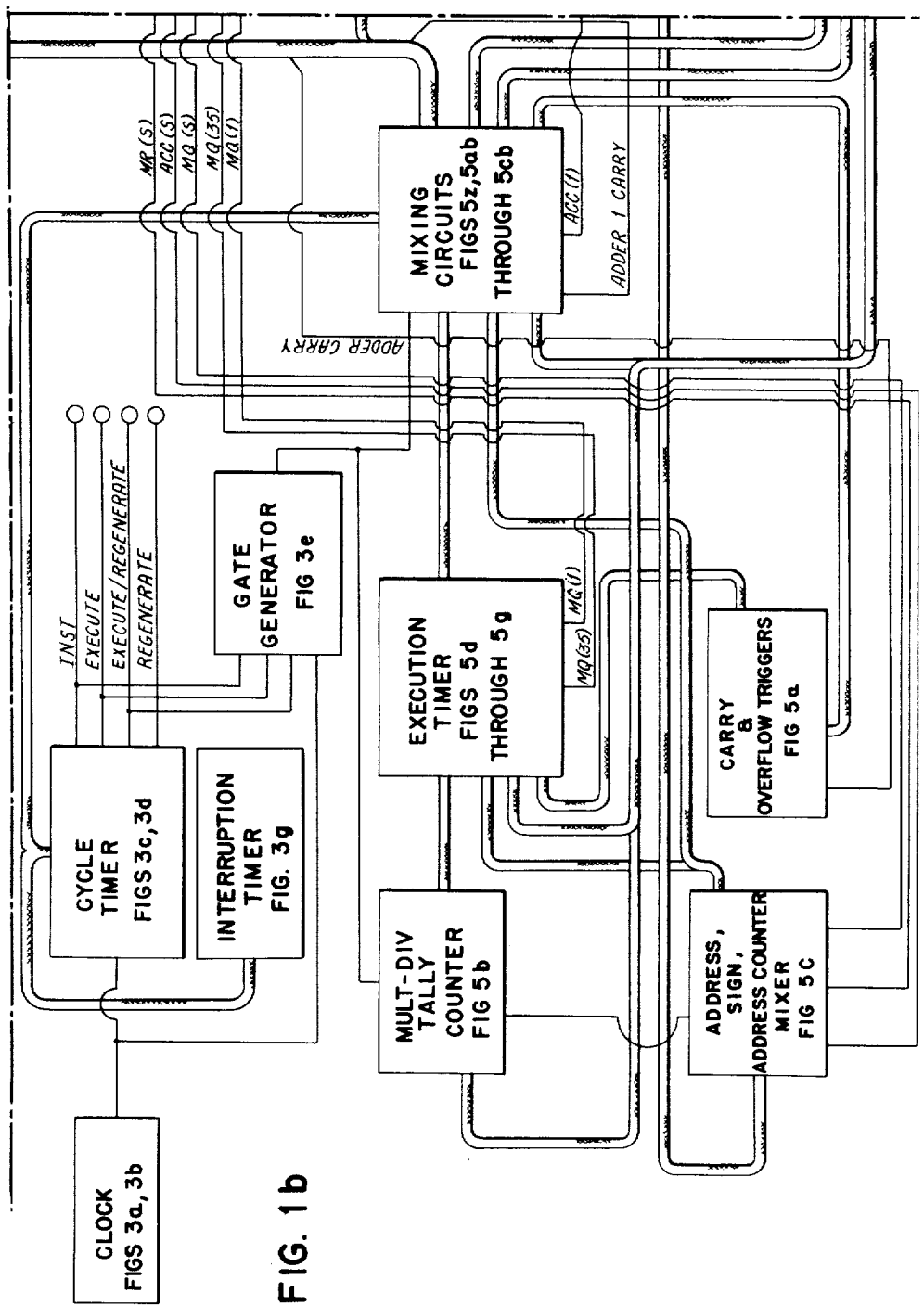

The interruption timer, represented by a labeled block in FIG. 1b, causes an extra instruction cycle when an interruption occurs and otherwise controls the operation of the computer during an interruption.

The indicator register in FIG. 1h consists of 36 electronic triggers and associated logical circuitry. It is used to hold indications of certain conditions, e.g., accumulator overflow, which can be used to initiate an interruption. The mask register in FIG. 1h also consists of 36 electronic triggers, each of which controls whether the corresponding trigger in the indicator register can be effective in causing an interruption.

The indicator and mask registers are connected by the interruption indicator, which consists of 36 orders, each of which tests the corresponding order in the registers and provides an output if they are both on, and if no other interruption indicator orders to the left of the subject order have outputs. An output from any of the orders of the interruption indicator will cause an interruption to be initiated, as described below. The outputs of the 36 orders of the interruption indicator are coded by the leftmost one counter in FIG. 1i into a six-bit representation which indicates the order of the interruption indicator whose output is on.

The base address register in FIG. 1i, consisting of 12 orders of electronic triggers and associated circuitry, is used to hold a base address which is added by the interrupt adder to the output of the leftmost one counter to form the address in memory from which an instruction is taken when an interruption occurs. The interrupt adder in FIG. 1i consists of 12 orders of logical AND and OR circuits. Its outputs are connected to the deflection register during the extra instruction cycle which occurs following an interruption.

INSTRUCTION REPERTOIRE OF THE MACHINE

In order to obtain a solution for a given problem, a Program is provided comprising a sequence of Instructions, and the respective Operations, carried out under control of these Instructions, in the sequence in which they appear, or determined by intermediate results, produce the desired solution of the problem. Both the Program and the numeric data for the problem are stored in the machine, the programmer designing the program so that the steps are carried out in the proper manner.

Before proceeding to the description of the Machine construction and operation a brief discussion of the Instruction Repertoire of the Machine will greatly aid in comprehending fully, the description which later follows. As stated above, each Instruction is stored in a coded permutation of bineary 1 and binary 0 representations, each Instruction including 5 such bits to represent, together with the sign bit, by their permutations of binary 1 and binary 0 bit conditions, each of 41 operations, which are recognized respectively by the Operation Decoder whose outputs comprise respective control circuits to carry out the particular Instruction so decoded.

One such Instruction whose 5 coded binary 1 and binary 0 bit values are 00000, comprises STOP and TRANSFER. This Instruction controls circuits which stop the Calculator as soon as this Instruction is read from Memory. When the Calculator is again started up, by the operator, the execution of this STOP and TRANSFER Instruction is completed and the Program transfers, so that the next Instruction is taken from the Memory Address, specified by the Address part, of the STOP Instruction. The Program of Instructions will then continue sequentially, from this last Address.

The Instruction TRANSFER whose binary 1 and binary 0 code representation is +00001 causes the next Instruction to be taken from that Memory Address, specified by the Address part, of this TRANSFER Instruction. The Program of Instructions then continues, Address number by Address number sequentially, from this last Address.

The instruction LOAD MASK, whose code representation is −00001, causes the contents of the mask register to be replaced by the full word stored at the memory address given in the address part of the LOAD MASK instruction.

The Instruction, TRANSFER ON AND RESET OVER FLOW abbreviated TR OV whose code representation +00010, will, if the Overflow Indicator is on as the result of a previous operation, cause the Program to transfer the Instruction, at the Memory Address, specified by the Address part of the TR OV Instruction. The Overflow Indicator is reset, upon the completion of this Instruction. If the Overflow Indicator is off and this TR OV Instruction occurs, the transfer is not executed.

The instruction STORE MASK, whose code representation is −00010, causes the contents of the mask register to be stored in memory at the full word location whose address is given in the address part of the STORE MASK instruction. The contents of the mask register are not altered by this instruction.

The Instruction TRANSFER ON PLUS abbreviated TR+ whose code representation is +00011, will if the Sign of the word in the Accumulator Register is positive cause the Program to transfer to the Instruction at the Memory Address specified by the Address part of the TR+ Instruction. If the Sign of the word in the Accumulator Register is negative, the transfer is not executed. It is to be particularly noted that a positive zero value stored in the Accumulator Register is treated as a positive word, while a negative zero value stored therein is regarded as a negative word.

The instruction LOAD INDICATORS, abbreviated LOAD IND, whose code representation is −00011, will cause the indicator register to be set equal to the contents of the full word stored in memory at the address designated by the address portion of the LOAD IND instruction.

The Instruction TRANSFER ON ZERO, abbreviated TR ZERO, whose code representation is +00100, will, if the value of the number stored in the Accumulator Register is zero, cause the Program to transfer to the Instruction, at the Memory Address, specified by the Address part of the TR ZERO Instruction. If the value of number stored in the Accumulator Register is not zero, the last transfer is not executed.

The instruction STORE INDICATORS, abbreviated STORE IND, whose code representation is −00100, causes the contents of the full word at the memory address given by the address portion of this instruction to be replaced by the contents of the indicator register. The contents of the indicator register are not altered by this instruction.

In order to clarify the description, certain of the follow-Instructions will be described by means of numerical examples. In these examples, the binary point will be arbitrarily considered as occurring in a position between the P and the "1" orders, of the Adder and of the Accumulator Register. In other words, bits 1 through 35 are to the right of the binary point, while bits P and Q are to the left of the binary point. In most of the numeric illustrations only 3 or 6 bits, that is binary digits, are illustrated, merely to limit the number of bits to be considered, the modus operandi remaining the same as it would be for a full word of 36 bits or a half word of 18 bits.

The Instruction ADD whose code representation is 01001 causes the number, in the Memory Address, specified by the Address part of the ADD Instruction to be added to the number stored in the Accumulator Register. The sum appears in this Accumulator Register, as will be seen from the description below, while the word, at the specified Memory Address, remains unchanged. The number read from Memory at the Address specified may be either a full or a half word and, if a half word is specified it is added, in alignment with the contents of the left half of the Accumulator Register (bit positions 1 through 17), but the sum, which appears in the Accumulator Register, is of course the sum of the full Accumulator contents plus the half word value. If this addition produces carries to the left of the binary point which, as stated above, lies to the left of the "1" position, the overflow portion of the sum appears in the two positions P and Q, to the left of the binary point and the Overflow Indicator is turned ON.

If an ADD operation results in a zero value in the Accumulator Register, the Sign of this zero is the same Sign that was stored in Accumulator Register prior to initiation of the ADD operation. Thus a negative zero will appear as the sum stored in the Accumulator Register if a positive number is added to a negative number, of equal magnitude, in the Accumulator Register. Various examples of this ADD Instruction are as follows:

| Number From Memory | Accumulator Register Before Operation | Accumulator Register After Operation |
|---|---|---|
| +.011 | +00.011 | +00.110 |
| +.011 | −00.011 | −00.000 |
| −.010 | −00.010 | −00.100 |
| −.010 | +00.010 | +00.000 |
| +.110 | −00.011 | +00.011 |
| −.000 | +00.000 | +00.000 |
| +.110 | +00.110 | *+01.100 |
| +.110 | +11.110 | *+00.100 |

* Overflow Indicator is turned on if it is not already on.

The Instruction RESET AND ADD, abbreviated R ADD, whose code representation is 01010, causes the contents of the Accumulator Register to be replaced by the word at the Memory Address indicated by the Address part of this R ADD Instruction. If a half word is specified, it appears in the left half of the Accumulator Register, that is in bit positions 1 to 17, inclusive, while the right half of the Accumulator Register is Reset to 0. The overflow positions of the Accumulator Register are always reset to 0, by this Instruction. Various examples of this Instruction are as follows:

| Number From Memory | Accumulator Register Before Operation | Accumulator Register After Operation |
|---|---|---|
| +.011 | anything | +00.011 |
| −.011 | anything | −00.011 |
| +.000 | anything | +.00.000 |
| −.000 | anything | −00.000 |

The Instruction ADD ABSOLUTE VALUE, abbreviated ADD AB, whose code representation is 01011 causes the absolute value (value, neglecting Sign) of the number at the Memory Address specified by the Address part, of this Instruction, to be added to the number stored in the Accumulator Register. The sum appears in the Accumulator Register, while the word at the Address specified, in Memory, remains unchanged. This Instruction is the same as the ADD Insturction, except that the number, from Memory, is treated as positive, regardless of its actual Sign. Various examples of this Instruction are as follows:

| Number From Memory | Accumulator Register Before Operation | Accumulator Register After Operation |
|---|---|---|
| +.010 | +00.011 | +00.101 |
| −.010 | +00.011 | +00.101 |
| +.010 | −00.011 | −00.001 |
| −.110 | −00.110 | −00.000 |
| −.110 | +00.110 | *+01.100 |

* Overflow Indicator is turned on if it is not already on.

The Instruction SUBTRACT, abbreviated SUB whose code representation is 00101, is the same as the ADD Instruction, except that THE Sign of the number read from the designated Memory Address is CHANGED, before this number is added to the number in the Accumulator Register. In other words, the subtraction is performed algebraically, with the result being stored in the Accumulator Register and the number, in Memory, remaining unchanged. Various examples of this Instruction are as follows:

| Number From Memory | Accumulator Register Before Operation | Accumulator Register After Operation |
|---|---|---|
| +.011 | +00.011 | +00.000 |
| +.011 | −00.011 | −00.110 |
| −.010 | −00.010 | −00.000 |
| −.010 | +00.010 | +00.100 |
| +.110 | −00.011 | *−01.001 |
| −.000 | +00.000 | +00.000 |
| +.110 | +11.110 | +11.000 |

* Overflow Indicator is turned on if it is not already on.

The Instruction RESET AND SUBTRACT, abbreviated R SUB whose code representation is 00110, causes the number, at the specified Memory Address, to be placed in the previously Reset Accumulator Register, except that the Sign of the number from Memory is changed. This Instruction is equivalent to Resetting the Accumulator Register and then performing the operation of subtract. Various examples of this are as follows:

| Number From Memory | Accumulator Register Before Operation | Accumulator Register After Operation |
|---|---|---|
| +.011 | anything | −00.011 |
| −.011 | anything | +00.011 |
| +.000 | anything | −00.000 |
| −.000 | anything | +00.000 |

The Instruction SUBTRACT ABSOLUTE VALUE, abbreviated SUB AV, whose code representation is 00111, causes an operation similar to the ADD Instruction, except that the number read from the specified Memory Address is treated as negative regardless of its actual Sign. Various examples of this Instruction are as follows:

| Number From Memory | Accumulator Register Before Operation | Accumulator Register After Operation |
|---|---|---|
| +.010 | +00.011 | +00.001 |
| −.010 | +00.011 | +00.001 |
| +.010 | −00.011 | −00.101 |
| −.110 | −00.100 | *−01.100 |
| +.110 | +00.110 | +00.000 |

* Overflow Indicator is turned on if it is not already on.

The Instruction NO OPERATION, abbreviated NO OP, causes nothing to happen. The result of this Instruction is to progress the Program to the next Instruction. The Address of this Instruction may have any value being without significance since this Instruction causes nothing to happen. This Instruction, however, finds utility where it is desired to, in effect, delete an Instruction from a Program. In such an event, the substitution by the Programmer of a NO OPERATION Instruction for some other Instruction allows the machine to proceed without requiring the substitution of another Instruction, in place of the deleted Instruction.

The instruction LOAD BASE REGISTER, abbreviated LOAD BASE, whose code representation is +01000, causes the contents of the address portion of the half word at the memory address given by the address portion of this instruction to replace the contents of the base address register.

The Instruction STORE whose code representation is 01100 causes the word, in the Accumulator Register to be stored in Memory at the Address specified by the Address part, of the STORE Instruction. The contents of the Accumulator Register are not changed by this operation, but the word, which was originally stored at the Address in Memory, is lost by this operation. The bits, in the overflow positions of the Accumulator Register that is bits P and Q, are not included, in the STORE operation. When a full word Address is specified, by the Address part of the STORE Instruction, the Sign and the 35 bits, to the right of the binary point, that is, bits 1 through 35 of the Accumulator Register, are stored at the specified Address in Memory. When a half word Address is specified, by the Address part of the Instruction, the Sign and bits 1 to 17, inclusive only, of the Accumulator Register are stored in the half word Address specified in Memory.

The Instruction STORE ADDRESS abbreviated STORE A whose code representation is 01101 causes 12 bits at the extreme right of the half word, in the specified Memory Address, to be replaced by the 12 bits of the "6" through "17" bits of the Accumulator Register of a right half word or the 12 bits of the "24" through "35" bits of a right half word.

The remaining 5 bits of the half word (representing the operational portion of the Instruction in this half word) stored in Memory at the specified Address and its Sign are left unchanged. The contents of the Accumulator Register are not changed by this operation. It should be particularly noted that this Instruction is used, with half word Addresses, only.

An example of this Instruction STORE ADDRESS is as follows:
Accumulator Register—

+00.00 111 000 111 000 111 000 111 000 111 000 111

Selected Memory Address Before—

.01 010 101 010 101 010

Selected Memory Address After—

.01 010 000 111 000 111

(The underlined portion indicates those bit positions affected.)

The Instruction STORE NUMBER FROM MQ, abbreviated STORE MQ whose code representation is 01110, causes the number in the MQ to be stored, at the Memory Address specified by the Address part of the Instruction. The contents of the MQ are not changed by this operation, but the number, which was originally stored at the specified Memory Address, is lost. When a full word Address is specified in the STORE MQ instruction, the entire content of the MQ are stored at the Memory Address specified. When a half word Address is given, the left hand 18 bits (the Sign and bits 1 through 17) in the MQ are stored at the half word Memory Address.

The Instruction LOAD MQ Register, abbreviated LOAD MQ whose code representation is 01111, causes the number in the MQ to be replaced by the number from the Memory Address specified by the Address part, of the Instruction. This instruction may be used with either full of half word Addresses. If a half word is specified, it is entered into the left half of the MQ (bit positions, S, and 1 through 17) and the right half of the MQ is reset to zero. Various examples of this Instruction are as follows:

| Word From Memory | MQ Register Before Operation | MQ Register After Operation |
|---|---|---|
| +.011 | anything | +.011 |
| −.011 | anything | −.011 |
| −.000 | anything | −.000 |

The Instruction MULTIPLY, abbreviated MPY whose code representation is 10000, causes the Accumulator Register to be reset to 0 and the number, at the Memory Address specified by the Address part of the MULTIPLY Instruction (the multiplicand), is multiplied by the number in the MQ (the multiplier). The more significant 35 bits, of the product, appear in the Accumulator Register, the less significant 35 bits appear in the MQ. The Signs, of both the Accumulator Register and of the MQ are set to the Sign of the product, according to the algebraic Sign rules. When a negative number is multiplied by a positive number and either part, or the whole of the product, is zero, this zero is given a negative Sign.

The multiplicand from the specified Memory Address may be either a full or a half word. If a half word is specified, the MULTIPLY Instruction operates as though it were a full word, with 18 zeros on the right. The MQ is always treated as if it contained a full word, even though a half word has just been placed in it. Thus, if a half word has been put into the MQ and a MULTIPLY Instruction is given, with a half word Address, the product would have 34 significant bits and would appear in bit positions 1 through 34 inclusive, of the Accumulator Register. The remaining bit position 35, of the Accumulator Register and the entire MQ, would then contain zeros. In the following examples, the Accumulator Register and the MQ are illustrated with maximum contents of five bit positions only to the right of the binary point, instead of the actual 35 positions. Full words, from Memory, are represented as 5 bits and a Sign, half words are represented as 2 bits and a Sign.

| Number From Memory | MQ Before MPY | Accumulator Register After MPY | MQ After MPY |
|---|---|---|---|
| −.00 | −.00 001 | +00.10 010 | +.11 000 |
| +.10 001 | −.11 001 | −00.01 101 | −.01 001 |
| −.11 100 | +.10 010 | −00.01 111 | −.11 000 |
| +.11 101 | +.10 010 | +00.10 000 | +.01 010 |
| −.11 | −.11 000 | +00.10 010 | +.00 000 |
| +.00 001 | −.00 110 | −00.00 000 | −.00 110 |
| −.00 000 | +.10 101 | −00.00 000 | −.00 000 |
| +.01 000 | +.10 000 | +00.00 100 | +.00 000 |

The Instruction ROUND, whose code representation is −10011, carries out an operation which, if the most significant bit (in position 1) of the MQ contains a binary 1, the value of the number in the Accumulator Register is increased by a value equal to $2^{-35}$.

When the Instruction given is a ROUND Instruction the number, in the Address portion, has no significance, thus any values may be used in that portion. Various examples of the ROUND Instructions are as follows; recalling that with the 5 bit capacity illustrated the 5th bit assumes the identity of the least significant bit which corresponds in operation to the 35th bit of the Accumulator Register.

| Accumulator Register Before Round | MQ Before Round | Accumulator Register After ROUND | MQ After ROUND |
|---|---|---|---|
| +00.01 100 | +.10 000 | +00.01 101 | +.10 000 |
| +00.01 100 | +.01 000 | +00.01 100 | +.01 000 |
| +00.01 111 | −.10 000 | *+01.00 000 | −.10 000 |
| −00.10 011 | +.10 000 | −00.10 100 | +.10 000 |

* Overflow indicator goes on if it is not already on.

The instruction STORE BASE REGISTER, abbreviated STORE BASE, whose code representation is +10011, causes the contents of the address portion of the half word at the memory address given by the address portion of this instruction to be replaced by the contents of the base address register. The remainder of the half word in memory remains unchanged. The contents of the base address register are not altered by this instruction.

The Instruction MULTIPLY and ROUND abbreviated MPY R, whose code representation is 10001, carries out a regular multiply operation which is followed by a round operation. Various examples of MULTIPLY AND ROUND operations are as follows:

| Number From Memory | MQ Before MPY R | Accumulator Register After MPYR | MQ After MPY R |
|---|---|---|---|
| −.11 | −.11 001 | +00.10 011 | +.11 000 |
| +.10 001 | −.11 001 | −00.01 101 | −.01 001 |
| −.11 100 | +.10 010 | −00.10 000 | −.11 000 |
| +.11 101 | +.10 010 | +00.10 000 | +.01 010 |

The Instruction DIVIDE, abbreviated DIV whose code representation is 10010, performs the basic operation of dividing a 70 bit dividend by a 35 bit divisor to produce a 35 bit quotient and a 35 bit remainder. Before the divide operation is performed, the more significant 35 bits of the dividend are placed in the Accumulator Register and the less significant 35 bits of the dividend are placed in the MQ. Then, as the DIVIDE Instruction is given, its Address specifies the Memory Address of the divisor which is read out of Memory to the Memory Register. Upon completion of the divide operation, the quotient appears in the MQ and the remainder appears in the Accumulator Register as will be obvious from the detailed description of the divide operation given later. The sign of the dividend is stored in the Sign position of the Accumulator Register. When the DIVIDE Instruction is given, the Sign of the MQ is ignored. The less significant 35 bits of the dividend which are stored in the MQ are considered as increasing the magnitude of the more significant half of the dividend (that is the 35 bits stored in the Accumulator Register). As a result of the divide operation, the Sign of the quotient stored in the MQ is that given by the algebraic Sign rule. The Sign of the remainder remains the same as that of the original dividend; the DIVIDE Instruction may be given with either full or half word Addresses. Half word divisors are considered as if they were full words, with the 17 significant bits in the positions immediately to the right of the binary point, and the remaining 18 bit positions (to the right) containing zeros. If the dividend is equal to or greater than the divisor, so that the absolute value of the quotient is 1 or greater (assuming we are working in fractional values), the calculator signals a DIV CK error. In the following examples of a divide operation, the Memory Address, the Accumulator Register, and the MQ, are illustrated as if they had a capacity of only 5 bits, to the right of the binary point, instead of the actual 35 bits.

| Number from Memory (divisor) | Dividend | | ACC REG. after DIV (remainder) | MQ after DIV (quotient) |
|---|---|---|---|---|
| | ACC REG before DIV | MQ before DIV | | |
| −.10 110 | +00.01 101 | +.01 010 | +00.01 000 | −.10 011 |
| −.10 110 | +00.01 101 | −.01 010 | +00.01 000 | −.10 011 |
| −.01 100 | −00.00 110 | −.11 011 | −00.00 011 | +.10 010 |
| +.11 101 | +00.10 010 | −.00 100 | +00.00 000 | +.10 100 |
| +.11 100 | −00.00 000 | +.11 001 | −00.11 001 | −.00 000 |
| +.00 000 | +00.01 100 | +.00 000 | (¹) | (¹) |
| +.01 000 | −00.01 010 | −.01 011 | (¹) | (¹) |

¹ Calculator stops; DIV CHECK.

The Instruction LONG SHIFT LEFT, abbreviated L LEFT whose code representation is +10100, causes the contents of the Accumulator Register and of the MQ to be shifted to the left, by a number of spaces, specified by the Address part of the Instruction. The bits, which are shifted to the left, come from the MQ register and appear at the right side of the Accumulator Register. When the L LEFT Instruction is given, the Sign of the Accumulator Register is changed, if necessary, to conform to the Sign of the MQ. The Sign of the MQ is not affected by this operation. The Overflow Indicator is turned on if any bits are shifted to the left; that is any binary 1 bits are shifted to the left of the binary point in the Accumulator Register. The number of places shifted cannot exceed 255, but of course, this number is almost without significance, since a shift of 70 will produce all zeros in the Accumulator Register and in the MQ. The Sign of this Instruction has no significance. The following examples of L LEFT assume that the Accumulator Register has a 9 bit capacity and the MQ a 7 bit capacity.

| Instruction [1] | Original contents of— | | Final contents of— | |
|---|---|---|---|---|
| | Accumulator Reg. | MQ | ACC. REG. | MQ |
| L LEFT 0003 | +00.001011 | +.010010 | +01.011010 | [2] +.010000 |
| L LEFT 0003 | +00.001011 | −.010010 | −01.011010 | [2] −.010000 |
| L LEFT 0000 | +00.001011 | −.010010 | −00.001011 | −.010010 |
| L LEFT 0080 | −00.001011 | +.010010 | +00.000000 | [2] +.000000 |

[1] Address is given in the decimal equivalent of the binary number.
[2] Overflow Indicator is turned on if it is not already on.

The instruction TRANSFER AND STORE COUNTER, abbreviated TR STO C, whose code representation is −10100, causes the contents of the address portion of the half word at the memory address given by the address portion of this instruction to be replaced by the contents of the instruction counter, which at this time contains the address of the next sequential instruction. The remainder of the half word at the memory address given by the address portion of this instruction remains unchanged. The contents of the instruction counter are then replaced by the address portion of the TR STO C instruction advanced by one so that the next instruction to be executed is taken from the address in memory following that in which the contents of the instruction counter was stored.

The instruction LONG SHIFT RIGHT, abbreviated L RIGHT whose code representation is +10101, causes the contents of the Accumulator Register and the MQ to be shifted, to the right, by the number of places specified by the Address part of the instruction. Bits which are shifted to the right out of the Accumulator Register are shifted into the left most positions (exclusive of sign) of the MQ. When a L RIGHT instruction is given the sign of the MQ is changed, if necessary, to conform to the sign of the Accumulator Register. The sign of the Accumulator Register and the Overflow Indicator are not affected by this operation. Again the number of places of shift which can take place cannot exceed 255. If a shift of more than 70 places is required the sign of this instruction has no significance. The following examples of the Instruction L Right are given with an assumed capacity of 9 bits for the Accumulator Register and 7 bits for the MQ.

| Instruction [1] | Original contents of— | | Final contents of— | |
|---|---|---|---|---|
| | ACC. REG. | MQ | ACC. REG. | MQ |
| L RIGHT 0003 | +00.001011 | +.010010 | +00.000001 | +.011010 |
| L RIGHT 0003 | +00.001011 | −.010010 | +00.000001 | +.011010 |
| L RIGHT 0000 | +00.001011 | −010010 | +00.001011 | +.010010 |
| L RIGHT 0001 | −11.001011 | +.010010 | −01.100101 | −.101001 |
| L RIGHT 0080 | −11.001011 | +.010010 | −00.000000 | −.000000 |

[1] Address given is the decimal equivalent of the binary number.

The instruction TRANSFER AND ENABLE, abbreviated TR EN, whose code representation is −10101, causes the contents of the instruction counter to be replaced by the address portion of this instruction, so that the next instruction to be executed is taken from that address in memory. It also causes the interrupt trigger to be reset, so that further interruptions can occur, as described below.

The Instruction SHIFT ACCUMULATOR LEFT, abbreviated A LEFT whose code representation is 10110, causes the contents of the Accumulator Register to be shifted to the left, by the number of places specified by the Address part of the Instruction. The emptied places, to the right, in the Accumulator Register are filled with zeros, and the Sign of the number, in the Accumulator Register is not changed. The last two bits shifted past the binary point, appear in the overflow positions of the Accumulator Register, and any bits shifted beyond these overflow positions are discarded. As the bits are shifted, past the binary point, they are sampled and if a binary 1 is so shifted, the Overflow Indicator is turned on. This condition may be detected by a subsequent TRANSFER ON OVERFLOW Instruction. Again, the number of places called for by such a shift cannot exceed 255. The Sign of this Instruction has no significance. The following examples of LEFT instruction assume that the Accumulator Register has a capacity of 9 bits.

| Instruction [1] | ACC REG before operation | ACC REG after operation | Overflow indicator before | Overflow indicator after |
|---|---|---|---|---|
| A LEFT 0001 | −00.010110 | −00.010110 | OFF | OFF |
| A LEFT 0003 | +00.001011 | +01.011000 | OFF | ON |
| A LEFT 0003 | +00.001011 | +01.011000 | ON | ON |
| A LEFT 0001 | +00.001011 | +00.010110 | ON | ON |
| A LEFT 0006 | −00.001011 | −11.000000 | OFF | ON |
| A LEFT 0037 | +00.001011 | +00.000000 | OFF | ON |
| A LEFT 0000 | +00.001011 | +00.001011 | OFF | OFF |

[1] The address part of the Instruction is given, in the decimal equivalent of the binary number Addresses; all other columns contain binary numbers.

The Instruction SHIFT ACCUMULATOR RIGHT, abbreviated A RIGHT whose code representation is 10,111, causes the contents of the Accumulator Register to be shifted to the right by a number of places specified by the Address part of the Instruction. The empty places, to the left in the Accumulator Register, are filled with zeros, and the bits which are shifted, beyond position 35 of the Accumulator Register, are lost. The two overflow positions, to the left of the imaginary binary point, are included in this shift operation. The Sign of the Accumulator Register is not altered, nor is the Overflow Indicator affected by this operation. Again, the number of places which may be shifted cannot exceed 255, and the Sign given with this Instruction if of no significance. The following examples of a SHIFT Instructions assume that the Accumulator Register has a capacity of 9 bits (instead of the actual 38).

| Instruction * | Accumulator Register Before Operation | Accumulator Register After Operation |
|---|---|---|
| A RIGHT 0003 | +11.001011 | +00.011001 |
| A RIGHT 0003 | −00.001011 | −00.000001 |
| A RIGHT 0037 | +00.001011 | +00.000000 |
| A RIGHT 0037 | −00.001011 | −00.000000 |
| A RIGHT 0000 | +00.001011 | +00.001011 |

* The Address part of the Instruction is shown in the decimal equivalent of the binary number Address; all other numbers are in binary form.

The instruction STORE LEFTMOST ONE COUNTER, abbreviated STORE LOC whose code representation is +11101, causes the contents of the right six bits of the address portion of the half word at the memory address designated by the address portion of this instruction to be replaced by the six-bit identification of the interrupting condition generated at the output of the leftmost one counter as described above. The left six bits of the address portion of the half word in memory are set to zeros. The remainder of the half word remains unchanged.

CLOCK

Figure 3B:
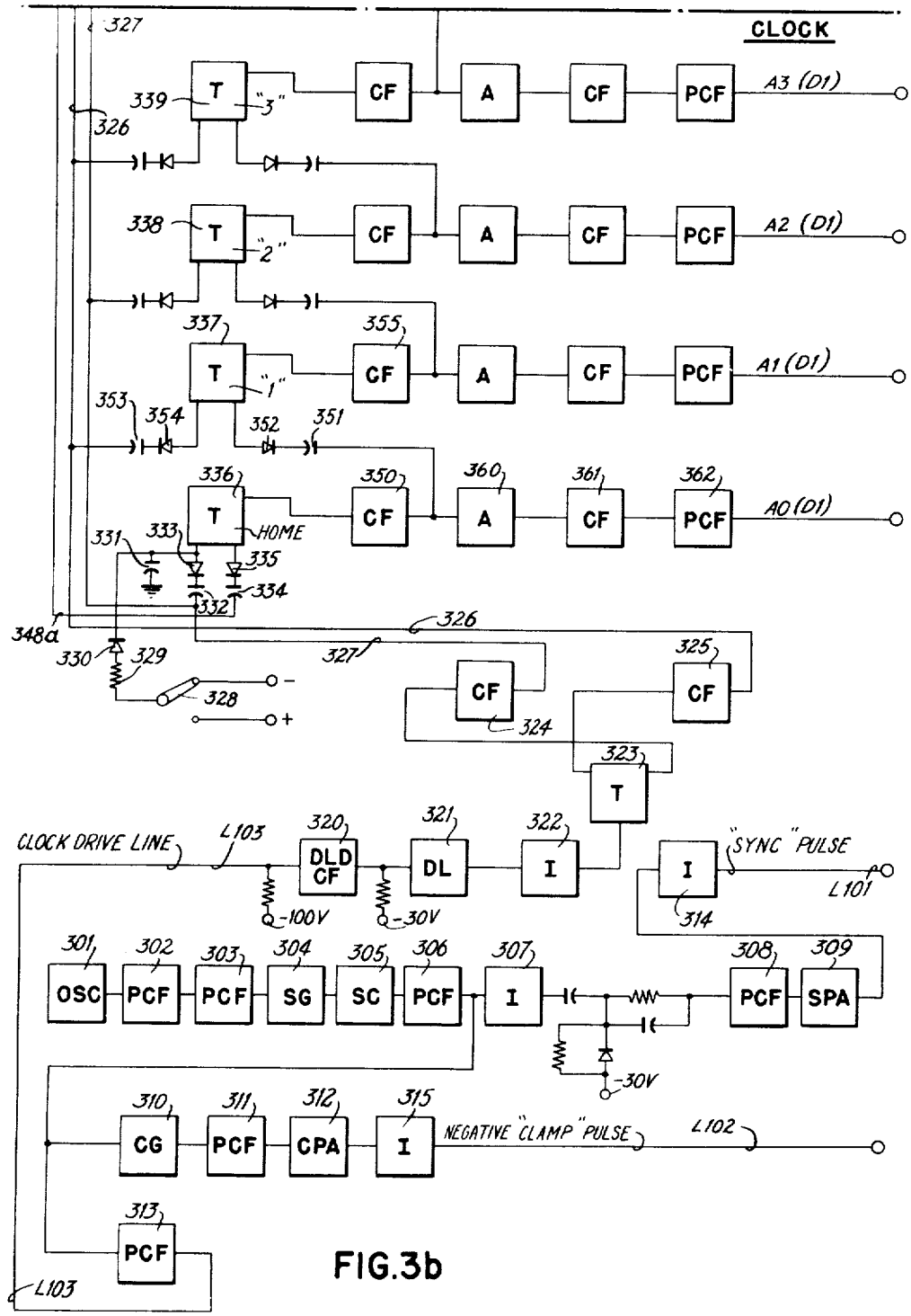
FIG. 3e is a block diagram of Gate Generator circuits.
FIG. 3f is a block diagram of the Interruption Timer.

FIGS. 3a and 3b illustrate, in block diagram form, the Clock and the primary drive circuits which provide signals for the Clock and for the Delay Units. These circuits comprise an oscillator 301 (FIG. 3b) which oscillates at a frequency of one megacycle having an output which feeds via power cathode followers 302 and 303 to a signal generator 304. The signal generator 304 and a sync clamp circuit 305 shape the signals produced and feed them to a power cathode follower 306 whose output feeds to three branch circuits. One of these passes via an inverter 307, a power cathode follower 308, a sync power amplifier 309 and an inverter 314 to the line L101.

The output of the cathode follower 306 also feeds to a clamp generator 310 whose output passes via a power cathode follower 311, a clamp power amplifier 312 and an inverter 315 feeding to line L102.

The output of the cathode follower 306 also passes via a power cathode follower 313 to the Clock Drive Line L103.

Signals on the lines L101 and L102 are used in the operation of the Delay Unit D, described above, which requires the use of two special signals; the one on line L101, comprising a "sync" pulse and the one on line L102 comprising a negative "clamp" pulse. The synchronizing pulse on line L101 is a positive pulse having a duration of about 0.3 of a microsecond and the "clamp" pulse is a negative pulse having a duration of about 0.2 microsecond. Both pulses occur at the one megacycle rate of the oscillator 301. These two pulses are in phase with one another, which is necessary for proper operation of the Delay Unit.

The signals on the Clock Drive Line L103 are passed through the delay line drive cathode follower 320 and the delay line 321, whereby adjustments can be made, to allow for line delays, etc. in order that those registers, which include the Delay Units D as their storage elements, are operated in absolute synchronism with the Clock. The outputs of delay line 321 feed via an inverter 322 to the binary input of a trigger 323 which is shifted, alternately, on and off by successive signals on the Clock Drive Line L103. The output from the left plate of the trigger 323 passes, via a cathode follower 325, to a line 326, while the output from the right plate passes via a cathode follower 324 to a line 327. The Clock, per se, comprises a series of electronic triggers 336 through 347 (FIGS. 3b and 3a). It should be noted that the left grid of each of the even numbered triggers receives pulses from the line 327 while the left grids of the odd numbered triggers receive their signals from the line 326. With switch 328 in its downward position (FIG. 3b) a positive potential, as indicated, is applied via a resistor 329, a diode 330 and one side of a condenser 331, whose other side is grounded, as shown, to turn on the trigger 336. Trigger 336 remains on, as long as the switch 328 is in its downward position.

The Clock is reset by resetting trigger 336 on, either when the Machine is first started or after it has been operating. If trigger 336 is "held" on, as it is when switch 328 is moved to its downward position, then if any other stage of the Clock is on, the on condition is stepped, as presently described, until trigger 336 is reached. Since it is already on, the reset condition of the Clock is reached; namely, trigger 336 is on and all other triggers are off.

Assume that the trigger 336 is reset on, and all other triggers are off and that switch 328 is shifted upward to thus apply a negative potential so that trigger 336 is no longer clamped on. As the next negative signal occurs on line 327 it is passed via a condenser 332 and a diode 333 to turn off the trigger 336. The trigger 336, in going off, emits a negative signal via a cathode follower 350, a condenser 351 and a diode 352 to the next trigger 337. This negative going signal is effective to shift the trigger 337 on. Thus, the signal on line 327 has been effective to shift the on condition of trigger 336 to trigger 337. Trigger 337 remains on until a negative signal occurs on line 326. This negative signal on line 326 is passed via a condenser 353 and a diode 354 to turn the trigger 337 off. Trigger 337 in going off emits a positive output, via a cathode follower 355 which is applied via a condenser and a diode to turn on the trigger 338. Thus, as Clock Drive Pulses occur on line L103, the on condition of the first trigger 336 of the Clock is stepped to the succeeding trigger, etc. This process continues until the last trigger 347 (FIG. 3a) of the chain is turned on, and upon a subsequent occurrence of a negative signal, on line 326, trigger 327 is turned off, and emits a negative signal from its right hand plate via a cathode follower 348, line 348a, a condenser 334, and a diode 335, to the right hand input of the first trigger 336, to turn it on. This entire cycle of operation may be then repeated. Thus, a ring, comprised of cascaded triggers 336 through 347, has one stage only, on at any one time, and this on condition, is stepped along at a one megacycle rate, the entire cycle being repeated every 12 microseconds. The first trigger 336 is regarded as the zero or "home" stage of the Clock, trigger 337 as the "1" stage, trigger 338 as the "2" stage, etc. and trigger 347 as the "11" stage. The outputs of these triggers are fed through circuits identical to that of the "home" trigger 336, which will now be described.

Referring to this zero or "home" stage trigger 336, its output, as stated above, passes through the cathode follower 350 to turn on the next trigger 337. The output of the cathode follower 350 is also passed via an amplifier 360, a cathode follower 361 and a power cathode follower 362 to line AO (D1). In a similar manner, the outputs of triggers 337 through 347, respectively, are passed through identical circuits to lines A1 (D1), A2 (D1), A3 (D1), A4 (D1), A5 (D1), A6 (D1), A7 (D1), A8 (D1), A9 (D1), A10 (D1) and A11 (D1), respectively. A plot of the signals occurring on these lines is shown on the Timing Diagram of FIG. 6a. These signals occur during all character cycles, whether the Machine is in instruction time, Execute time, Execute/Regenerate time or Regenerate time. The signals on these lines, occurring during all cycles, may be referred to as follows: The signal on line A2 (D1), for example, may be referred to as a positive pulse "A" signifying that the pulse occurs during ALL cycles, "2" signifying it occurs during the "2" time of the Clock cycle, and (D1.0) signifying that the pulse has a duration of one microsecond. These positive signals may be passed through inverters (not shown) when a negative signal is required.

CYCLE TIMER

Referring now to FIGS. 3c and 3d which illustrate the circuits of the Cycle Timer, this Timer determines the type of Character cycle that the Machine is to perform, that it, whether it shall be an Instruction (1) Cycle, an Execute (E) Cycle, an Execute-Regenerate (E/R) Cycle or a Regenerate (R) Cycle. This Cycle Timer has four output lines (FIG. 3d) labeled INST TIME, EX TIME, EX/RGN TIME and RGN TIME. One, and only one, of these outputs is positive at any one time, and each stays positive for a minimum duration of one Clock cycle, that is, 12 microseconds. The circuits shown may also be regarded as having sub-outputs, labeled I', E' and E'/R'. The latter outputs do not actually affect the Machine operation except that the Cycle Timer outputs are cocked or primed, so that, as required Regeneration cycle ends, the Machine will then proceed to an I, an E, or an E/R type of cycle depending upon which one of these three sub-output lines is positive.

Control circuits, described below, are caused to emit signals, signaling Go to Execute, Go to Execute/Regenerate or End of Operation. A Go to Execution signal is a pulse of one microsecond duration which occurs at approximately 11 time of the Clock cycle, and causes the line GO TO EX (FIG. 3c) to go positive. This pulse passes via a cathode follower 328b, line 329b, condenser 330c, and a line 331b to an inverter 332b. This pulse is shaped so that the output of the inverter 332b is a negative pulse, which trips the single-shot multivibrator 333b, which emits a 3 microsecond positive signal, which, of course, will be positive from 11 time of the Clock cycle to 2 time of the following Clock cycle. This signal passes through a cathode follower 334b and via line 335b to a negative AND circuit 362b and AND circuit 363b (FIG. 3d) and also to an OR circuit 348b (FIG. 3c). This signal feeding through the OR circuit 348b and a cathode follower 374b conditions an AND circuit 346b so that a positive AO (D1) signal passes, via the cathode follower 345b, through this conditioned AND circuit 346b and via an inverter 349b and a cathode follower 350b to a line RESET, while the output of the cathode follower 345b is also fed to the line SET. Thus, under the assumed conditions, the line SET has a positive pulse of one microsecond duration occurring at "0" time of the Clock cycle, and the line RESET has a negative pulse at the same time. The negative signal on line RESET (FIGS. 3c and 3d) is fed to negative AND circuits 360b, 362b and 364b, while the positive signal on the line SET, is fed (FIGS. 3c and 3d) to the positive AND circuits 361b, 363b 365b and 367b. Under the conditions assumed above, the AND circuits 362b and 363b are conditioned by a positive signal via line 335b and, therefore, the negative signal on line RESET is blocked from passing through the negative AND circuit 362b. However, the positive AND circuit 363b is conditioned by the positive signal on line 335b, which thus allows the positive signal on the line SET to pass therethrough to an inverter 374b, a condenser 391b and a diode 392b, to turn on the trigger 393b, which emits a positive signal via a cathode follower 394b to the line E' (a positive signal on the line E' signifying that the Machine is in an E' condition, this being an internal condition of the Timer as previously mentioned). The positive signal on the line E' conditions one input of an AND circuit 395b, the other input to this AND circuit 395b being positive, unless, as described below, the Machine is in regeneration. Assuming that the Machine is not in regeneration, then the output of the AND circuit 395b is positive and feeds via an amplifier 396b, a cathode follower 397b and a power cathode follower 398b, to drive the line EX TIME positive. Such a positive signal on the line EX TIME signifies that the Machine is in an Execute type of character cycle. Assume for purposes of explanation, that the Machine was in Instruction time when the Go To Execute signal was received. Under such conditions, a trigger 383b (FIG. 3d) would have been on. At this time, the signal on the line 317b is negative and is fed to the negative AND circuit 360b and to the AND circuit 361b. The negative signal on the line RESET then passes through the negative AND circuit 360b, a cathode follower 371b and a diode 380b, to turn off the trigger 383b. Thus, at the time that the trigger 393b is turned on by the positive signal on the line SET, the trigger 383b is turned off by the negative signal on the line RESET.

If the machine had been in an Execute/Regenerate type of Cycle, then the trigger 303c would have been on, and would have been Reset by the coincidence of negative signals feeding to the negative AND circuit 364b via lines 325b and RESET, the output of this negative AND circuit 364b, passing via a cathode follower 375b and a diode 300c to turn the trigger 303c off.

If, instead of the "Go to Execution" signal, the control circuits had emitted a "Go To Execute/Regenerate" signal, then a positive signal would occur on line GO TO EX RGN (FIG. 3c) at 11 time of the Clock cycle, and pass via a cathode follower 318b, line 319b, the condenser 320b, line 321b and the inverter 322b to trip the single-shot multivibrator 323b, which, when tripped, emits a 3 microsecond positive signal via a cathode follower 324b and line 325b to the negative AND circuit 364b, the AND circuit 365b (FIG. 3d) and the OR circuit 348b (FIG. 3c). Since the signal is fed to this OR circuit 348b positive and negative signals occur on lines SET and RE- SET, respectively, as described above. Thus, as the positive signal, on the line 325b, conditions the AND circuit 365b, the positive signal occurring on the line SET passes through this conditioned AND circuit 365b, an inverter 376b, a condenser 301c and a diode 302c to turn the trigger 303c on which trigger emits a positive signal, via a cathode follower 304c, to the line E'/R', the latter line being positive, when the internal condition of the Cycle Timer is that of an Executive/Regenerate cycle. At the same time, if trigger 383b or trigger 393b is on, each is turned off; trigger 383b being turned off through a coincidence of negative signals on lies 317b and RESET feeding via the negative AND circuit 360b, a cathode follower 371b, and a diode 380b, or trigger 393b is being turned off by the coincidence of negative signals on lines 335b and RESET, feeding to the negative AND circuit 362b, whose output passes through a cathode follower 373b and a diode 390b to the trigger 393b. A positive signal on the line E'/R' conditions one input of the AND circuit 305c, the other input to that AND circuit being also positive, provided the Machine is not in regeneration time. Therefore, assuming that the Machine is not in regeneration time, the output of the AND circuit 305c is positive and passes via an amplifier 308c, a cathode follower 309c and a power cathode follower 310c to drive the line EX/RGN TIME positive. When this line is positive, the Machine is in an Execute/Regenerate type of cycle.

Now assume that the control circuits emit an End of Operation signal. This signal drives the line END OF OPN (FIG. 3c) positive, for two microseconds, at 10 time of the Clock cycle. This 2 microsecond signal passes through a cathode follower 306b to turn on a trigger 307b, and also passes via a cathode follower 309b to condition one input, of an AND circuit 310b which, when conditioned, passes the A11 (D1) signal; the output of this AND circuit being fed via a cathode follower 311b to a line 312b, and thence via a condenser 327b, line 313b and an inverter 314b to trip the single-shot multivibrator 315b, whose 3 microsecond positive output passes through a cathode follower 316b and line 317b to the negative AND circuit 360b (FIG. 3d) the AND circuit 361b and to the OR circuit 348b (FIG. 3c). As the signal is fed to this OR circuit 348b, a positive signal occurs on line SET, while a negative signal occurs on line RESET, at "0" time of the Clock cycle. The positive signal, on the line SET, passes through the conditioned AND circuit 316b and via an inverter 372b, a condenser 381b and a diode 382b to turn on the trigger 383b. At the same time, the negative signal on line RESET passes via the negative AND circuit 362b to turn off the trigger 393b, or via the negative AND circuit 364b to turn off the trigger 303c. The output of the trigger circuit 383b, positive when on, passes through a cathode follower 384b, to drive the line I' positive. The positive signal, on the line I', conditions the AND circuit 385b, and assuming that the Machine is not in regeneration, the output of the AND circuit 385b is then positive, and passes through an amplifier 386b, a cathode follower 387b and a power cathode follower 388b, to drive the line INST TIME positive; the latter line thus being positive when the Machine is in an Instruction time. Thus, it has been shown that the Machine may be sent to Instruction time, Execution time or Execute/Regenerate time, by appropriate signals provided that the Machine is not in regeneration, and in the event that the Machine is in regeneration as the Cycle Timer is set to one of the above mentioned operations, then the Machine is regarded as having an internal operation, which is signified by positive signals on lines I', E', or E'/R'. It should be noted, that when the End of Operation is signalled, the Machine enters an Instruction time, provided it is not in regeneration or enters the Cycle Timer "internal" operation Instruction time, which is signified by a positive signal on line I'. It should also be noted that the triggers 383b, 393b and 303c are turned on or off, as the case may be, at "2" time of the Clock cycle.

As described above, the trigger 307b (FIG. 3c) is turned on at 11 time of the Clock cycle when an End of Operation is signalled. The output of this trigger 307b passes through a cathode follower 308b to condition one input of an AND circuit 303b. Assuming for the present that regeneration of Memory is required, at the time the End of Operation is signalled, then the second input to this AND circuit 303b, specifically the line RGN REQUIRED, is positive, and the A11 (D1) signal is passed via the AND circuit 303b, an OR circuit 304b, a cathode follower 305b, line 338b, a condenser 339b and line 340b to an inverter 341b. The output of this inverter 341b trips a single-shot multivibrator 342b, which emits a positive signal, via a cathode follower 343b and line 344b, to the negative AND circuit 366b and to the AND circuit 367b. Thus, if regeneration is required as an End of Operation is signalled, a 3 microsecond positive signal occurs on line 344b. This 3 microsecond positive signal conditions the AND circuit 367b so that the positive signal, occurring on the line SET, as explained above, passes through this AND circuit 367b, an inverter 378b, a condenser 312c, and a diode 313c, to turn ON a trigger 314c, whose right plate emits a positive signal, via an amplifier 318c and a power cathode follower 319c, to drive the line RGN TIME positive, which signifies that the Machine is in regeneration. Trigger 314c, when on, also emits a negative signal from its left plate, via cathode followers 315c and 316c to a line 317c which, when negative, blocks passage of ANY signals, through the AND circuits 385b, 395b or 305c. Thus, although the Cycle Timer may have an "internal" operation of I' time, E' time or E'/R' time, as signified by positive signals on the lines I', E', E'/R', the external cycle is a Regenerate cycle due to the fact that the outputs of the AND circuits 385b, 395b and 305c remain negative as long as Regeneration is required. The Machine is also sent into Regeneration, if for any reason the Machine is stopped, as a positive signal occurs at 11 time of every character cycle on the line STOP (FIG. 3c) provided the machine is stopped. This signal, on the line STOP, feeds to the OR circuit 304b, described above, and the output of this OR circuit 304b going positive, as just described, causes the trigger 314c (FIG. 3d) to be turned on.

Thus it is seen that as long as regeneration is required, positive signals occur on line 344b, from 11 time of a Clock cycle to 2 time of the following Clock cycle for every character cycle, until such time as regeneration is no longer required. Circuits which determine how much regeneration is required are described in the above identified application of Fox et al.

Assuming that regeneration is no longer required, as long as the machine is not in a Stop condition, a one microsecond positive signal occurs, at 0 Clock time, on the line NO STOP (FIG. 3d) and passes through an inverter 369b and a cathode follower 370b, to one input of the negative AND circuit 366b. The negative AND circuit 366b is conditioned, at that time, as the line 344b is negative. Upon coincidence of the negative inputs, the output of the negative AND circuit 366b is negative, and, therefore, passes via a cathode follower 377b and a diode 311c to turn off the trigger 314c. Trigger 314c, going off through the circuits described above, causes the line RGN TIME, to go negative, which signifies that the machine is not in regeneration time, and also via the cathode followers 315c and 316c causes line 317c to go positive, so that the internal cycle of I', E' or E'/R' will, as the case may be, will cause the Machine to go into an Instruction time, an Execute Time or an Execute/Regenerate time. As regeneration is completed, the line RGN COMPLETED (FIG. 3c) conditions one input of an AND circuit 391b (FIG. 3c) so that, as a one microsecond signal occurs, on line AO (D1) at 0 time of the Clock cycle, it is passed through this AND circuit 301b and a cathode follower 302b, to turn off the trigger 307b. Trigger 307b going off via the cathode follower 308b removes a conditioning potential from the AND circuit 303b, so that thereafter, as regeneration is again required, it does not take effect until an End of Operation occurs to turn on trigger 307b.

GATE GENERATOR CIRCUITS

Figure 3E:
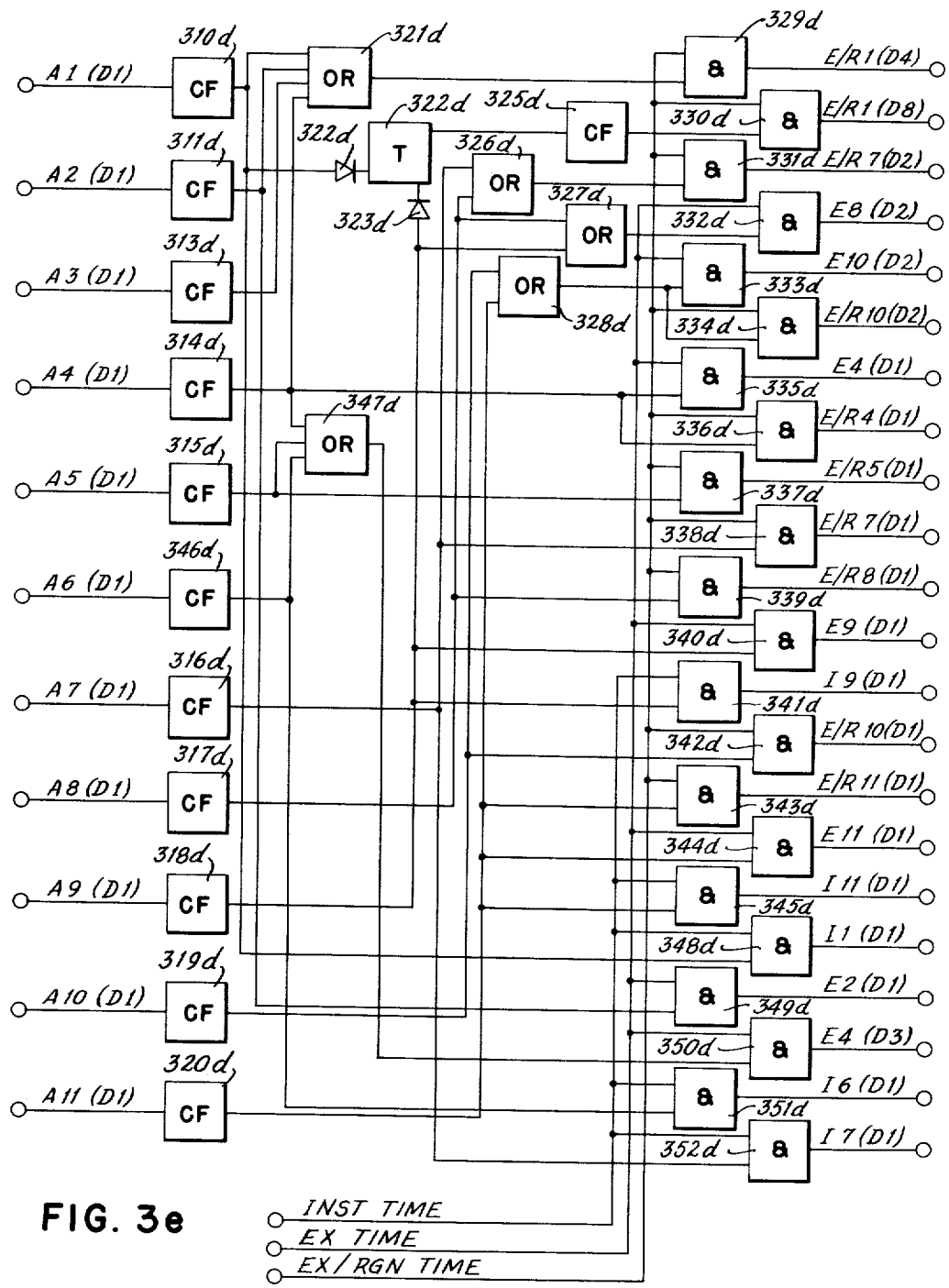

Refer now to FIG. 3e which shows the Gate Generator circuits. These circuits mix Clock pulses and output singals from the Cycle Timer, to provide required gates and signals. The signals from the Clock are present on lines A1 (D1), A2 (D1), A3 (D1), A4 (D1), A5 (D1), A7 (D1), A8 (D1), A9 (D1), A10 (D1) and A11 and A11 (D1). Outputs from the Cycle Timer are via lines INST TIME, EX TIME and EX/RGN TIME. Signals on the lines A1 (D1), A2 (D1), A3 (D1) and A4 (D1) feed through the cathode followers 310d through 314d, respectively, to the OR circuit 321d are positive for a period beginning at "1" time of the Clock cycle and continuing until the termination of the fourth time pulse or at the beginning of "5" time of the Clock cycle, namely a period of four microseconds. The output of the OR circuit 321d positive from "1" time of the Clock cycle, for a period of four microseconds, conditions one input of the AND circuit 329d. The other input to this AND circuit 329d is via line EX/RGN TIME. Upon a coincidence of these two positive inputs to the AND circuit 329d, its output emits a positive signal to the line E/R1 (D4). Hence the signal on this line is a signal of 4 microseconds duration, occurring at "1" time of the Clock cycles, during Execute/Regenerate times.

The A1 (D1) Clock signal feeds via the cathode follower 310d and a diode 322d to turn on the trigger 324d. This trigger 324d remains on until an A9 (D1) signal passes through the cathode follower 318d and the diode 323d to turn the trigger 324d off. This trigger thus is on from "1" time of the Clock cycle until "9" time of the same Clock cycle. The output from the trigger 324d passes via a cathode follower 325d to the AND circuit 330d. This signal passes through the AND circuit 330d, provided a positive signal is present on the line EX/RGN time. Assuming the latter line is positive, the output of the AND circuit 330d then will go positive, for an eight microsecond period, starting at "1" time of the Clock cycle. The output of the AND circuit 330d appears on the line E/R1 (D3) so that the signal on this line of 8 microseconds duration occurs at "1" time of every Execute/Regenerate cycle.

The OR circuit 326d is conditioned by a positive signal on the line A7 (D1) feeding via a cathode follower 316d and also by a positive signal on the line A8 (D1) feeding via a cathode follower 317d. Hence the output of the cathode follower 362d has a positive output for 2 microseconds, starting at "7" time of every Clock cycle. This output is fed to an AND circuit 331d which is also conditioned by a positive signal on line EX/RGN time. Assuming that the AND circuit 331d is conditioned positive, the output of the OR circuit 326d passes through this conditioned AND circuit to the line E/R7 (D2) so that this line is positive, for 2 microseconds, beginning at "7" time of every Execute/Regenerate cycle.

The OR circuit 327d is conditioned by a positive signal on the line A8 (D1) feeding via a cathode follower 317d and a positive signal on the line A9 (D1) feeding via a cathode follower 318d. The output of this OR circuit 327d then is positive for a 2 mcirosecond period, beginning at "8" time of every character cycle, and passes through an AND circuit 332d, provided a positive signal is present on the line EX time. The output of the AND circuit 332d is available on line E8 (D2), this line thus being positive for 2 microseconds beginning at "8" time of every Execute character cycle.

The OR circuit 328d is conditioned by a positive signal on the line A10 (D1) feeding via a cathode follower 319d, and a positive signal on the line A11 (D1) feeding via a cathode follower 320d. The output of this OR circuit 328d thus is positive, for 2 microseconds, starting at "10" time of every Clock cycle. This output is fed to the AND circuits 333d and 334d. It passes through the AND circuit 333d, provided the machine is in Execute time, as signified by a positive signal on line EX time to the line E10 (D2) or through the AND circuit 334d, provided the line EX RGN time is positive, to the line E/R10 (D2). The positive signal on line A4 (D1) conditions the AND circuits 335d and 336d via the cathode follower 314d. The AND circuit 335d is also conditioned by a positive signal on the line EX time so that it is positive, for one microsecond starting at "4" time, of every Execute cycle. The remaining outputs of this Gate Generator are developed by coincidence of similar timed pulses and conditioning potentials and will now be deemed obvious, the signal on the line INST TIME conditioning AND circuits 341d and 345d, whereby, by coincidence of timed pulses with the conditioning potential, the signals on lines I9 (D1) and I11 (D1) are produced. Each of the outputs of the respective AND circuits of FIG. 3e indicate by their labeling the type of cycle (Instruction time, Execute time or Execute/Regenerate time) the particular time in the Clock cycle and the duration in microseconds. These "gate" pulses are employed in the Execution Timers and Mixing Circuits described below and are illustrated in the Timing Diagram of FIG. 6b.

INTERRUPTION TIMER

Refer now to FIG. 3f which shows the interruption timer circuits. These are used to generate certain signals, when an interruption occurs, to control the circuits which cause a special instruction to be taken from the memory address specified by the base address register and leftmost one counter.

As described below, when an interrupting condition is detected by combining the outputs of the indicator and mask registers, a positive signal appears on the IRPT SIGNAL line. This conditions one input of the AND circuit 301e. Assuming that interruptions have not been disabled by a previous interruption, the ALLOW IRPT line 310e will be positive, conditioning the second input of AND circuit 301e. Then at "6" time of the first instruction cycle following the appearance of the interruption signal, a one microsecond signal on line I6 (D1), generated as described above, will condition the third input of AND circuit 301e. The output of the AND circuit 301e passes through the cathode follower 302e to turn on trigger 303e, which indicates that an extra instruction cycle is to be taken.

When trigger 303e is on, a positive signal passes through cathode follower 304e to make the EXT CYCLE line positive, indicating that an extra instruction cycle is required. During the first instruction cycle, the next instruction in normal sequence is placed in the instruction register, but it is not executed, because if the EXT CYCLE line is positive the NO EXT CYCLE line is negative to inhibit the "Go to Execute" and "Go to Execute/Regenerate" signals, as described below, which must occur before instruction time can end, as described above in connection with the cycle time. During the second instruction cycle, the special instruction is taken from memory and placed in the instruction register. When trigger 303e is off, a positive signal passes through cathode follower 305e to make the NO EXT CYCLE line positive, indicating that no extra instruction cycle is required.

The output of cathode follower 302e also turns on trigger 307e, which is on when a special interruption instruction is being executed. When trigger 307e is on, a positive signal passes through cathode follower 309e to the IRPT CYCLE line. When trigger 307e is off, a positive signal passes through cathode follower 308e to the NO IRPT CYCLE line.

When an interruption occurs, the signal on the IRPT SIGNAL line also conditions one input of AND circuit 311e. A second input to this AND circuit is conditioned at "6" time of the first instruction cycle when trigger 303e is turned on. Following this, at "7" time of the first instruction cycle, a signal occurs for one microsecond on the I7 (D1) line, which is generated as described above. This conditions the third input to AND circuit 311e, causing an output which turns on trigger 312e. When this trigger is on, further interruptions are not allowed. When it is turned off further interruptions are enabled. When trigger 312e is on, a positive signal passes through cathode follower 313e to the ALLOW NO IRPT line, indicating that no further interruptions are to be allowed. When trigger 312e is off, a positive signal passes through cathode follower 314e to the ALLOW IRPT line, indicating that further interruptions are to be allowed. This line is one of the inputs to AND circuit 301e, so that when trigger 312e is on, this line is negative, and the AND circuit 301e is deconditioned, and no signals can pass through it to initiate interruptions.

The extra cycle trigger 303e is turned off at "3" time of every character cycle by a signal on the A3 (D1) line, which is generated as described above. Thus, this trigger is turned on at "6" time of the first instruction cycle, causes a second instruction cycle to start, and is then turned off at "3" time of this second instruction cycle, thereby allowing the "Go to Execute" and "Go to Execute/Regenerate" signals to pass normally and allow these types of cycles to occur as described above.

The special instruction called for by the interruption is then executed. Since the extra cycle trigger will then be off, a positive signal will occur on the NO EXT CYCLE line, conditioning one input of AND circuit 306e. When the special instruction is completed an "End of Operation" is signalled, causing the cycle timer to start an instruction cycle. At "1" time of this instruction cycle, a one microsecond signal occurs on line I1 (D1). This conditions the other input of AND circuit 306e, and the output of the AND circuit turns off trigger 307e, indicating that the special instruction has been completed. This trigger was not turned off at "1" time of the extra instruction cycle which obtained the special instruction from memory because the extra cycle trigger was on at that time.

Trigger 312e, which indicates that no interruptions are to be allowed, may be turned off in either of two ways. When the instruction register contains a TRANSFER AND ENABLE instruction, the TR EN line is positive, as described below. This conditions one input of AND circuit 315e. When that instruction is completed, the END OPN line is made positive at "10" time of an E/R cycle. This conditions the other input of AND circuit 315e. The output passes through OR circuit 316e and cathode follower 317e to turn off trigger 312e.

If the special instruction called for by the interruption is anything but a TRANSFER AND STORE COUNTER operation, it is desired to enable further interruptions. Thus, if such an instruction is in the instruction register, the TR STO C line will be negative, as described below. This causes a positive signal at the output of inverter 318e, which passes through cathode follower 319e, to condition one input of AND circuit 320e. A second input of this AND circuit is conditioned by the IRPT CYCLE line, which is positive when the instruction being executed is a special interruption instruction. At the completion of this instruction, a positive signal appears on the END OPN line, conditioning the third input to the AND circuit 320e. The output of the AND circuit 320e passes through OR circuit 316e and cathode follower 317e to turn off trigger 312e.

If the special instruction called for by the interruption is a TRANSFER AND STORE COUNTER instruction, then, the TR STO C line will be positive, as described below. This causes a negative signal at the output of the inverter 318e, which passes through the cathode follower 319e to decondition the AND circuit 320e. Consequently, at the end of this operation, a positive signal appearing on the END OPN line is blocked from passing through the AND circuit 320 to turn off the ALLOW NO IRPT trigger 312e. At 11 time of the next instruction the IRPT cycle trigger 307e is turned off causing a negative signal to be applied via the IRPT CYCLE line to decondition the AND circuit 320e. Now, the only instruction which will permit the ALLOW NO IRPT trigger 312e to be turned off and enable the AND circuit 301e to allow further interruptions is the TRANSFER AND ENABLE instruction, which, as explained above, causes a positive signal to be produced on the TR EN line and in combination with a positive signal on the END OPN line at the end of operation turns off the ALLOW NO IRPT trigger 312e.

In order to reset the indicator which caused the interruption, a signal is required at the end of the second instruction cycle. Thus a positive signal on the IRPT CYCLE line is used to condition one input of AND circuit 321e. A second input to AND circuit 321e is conditioned by a positive signal on the NO EXT CYCLE line. A one microsecond pulse occurring at "11" time of an instruction cycle, generated as described above, appearing on the I11 (D1) line can then pass through the AND circuit 321e and via an amplifier 322e and cathode follower 323e to the RESET ON IRPT line. The pulse on this line is then used, as described below in connection with the indicator register, to reset the indicator which caused the interruption.

INSTRUCTION REGISTER

The Instruction Register (FIGS. 4a, 4b, 4c) comprises 18 trigger circuits which normally receive information from the Memory Register during Instruction cycles, as indicated by the cabling between the Memory Register and the Instruction Register (FIGS. 1c, 1d, 1e, 1f). The Instruction Register is functionally sub-divided as follows: One trigger 412a (FIG. 4a) is provided for storing the manifestation of the Sign bit. Triggers 413a through 417a comprise the Operation portion of the Instruction Register and store the representations of the bits 1 through 5, the permutations of on and off conditions of these triggers together with on and off condition of the sign trigger 412a indicating the respective operations desired. Triggers 444a through 447a (FIG. 4b) comprise the Address Register part of the Address portion of the Instruction Register and store the representations of the bits 6 through 9. The Address portion comprises in addition to this Address Register portion, the Address Counter portion comprising triggers 401b through 408b (FIGS. 4b and 4c) for storing the representations of the bits 10 through 17.

The outputs of the Instruction Register control the operation of the Machine, during Execution time. It is during Execution time that the contents of the Operation and sign portion of the Instruction Register, that is the on and off permutations of the triggers storing the respective indications of bits S and 1 through 5, control the Operation Decoder (FIG. 1f) selectively, so that its respective outputs indicate the respective operations indicated by the particular on and off permutations, these operations being for example, ADD, SUBTRACT, MULTIPLY, DIVIDE, etc. The remainder of the Instruction Register picks the Address, in Memory, from which the data is to be obtained which is employed in the operation as determined by the Operation part of the Instruction Register.

The Address Counter, per se, of the Address portion of the Instruction Register is not only used to control the deflection of the cathode ray beams, to select the desired Address in Memory, but is also used during such operations as MULTIPLY and DIVIDE to insure that a correct number of character cycles have occurred.

Referring to the center section of FIG. 4b, signals on lines A4 (D1), A5 (D1) and A6 (D1) are fed to an OR circuit 460a whose output passes via a cathode follower 461a, to condition one input of an AND circuit 462a. The other input to this AND circuit 462a is positive, during Instruction time, since the line INST time is rendered positive by the circuits of the Cycle Timer (FIGS. 3c and 3d) when the Machine is in Instruction time. The output of the AND circuit 462a passes via a cathode follower 463a to the line I4 (D3) which feeds to the triggers 412a through 417a (FIG. 4a) and 444a through 447a (FIG. 4b) and to an OR circuit 464a (FIG. 4b). As will now be understood from the definition of the labeling, given above, the signal on line I4 (D3) is a signal of three microseconds duration occurring at 4 time of every Instruction cycle and is effective, during each Instruction time, to turn off the triggers 412a through 417a (FIG. 4a) which comprise the Operation part of the Instruction Register and to turn off the triggers 444a through 447a (FIG. 4b), which comprise the Address Register portion of the Instruction Register. This I4 (D3) signal passes through said OR circuit 464a, via an inverter 465a and a cathode follower 466a to the line ADR CTR RESET, this latter line going positive, at I4 time, for a period of three microseconds. This line feeds to the triggers 401b through 408b (FIGS. 4b and 4c) which comprise the Address Counter, this negative I4 (D3) signal on line ADR CTR RESET turning these triggers on. Thus, shortly after I4 time of each Instruction cycle, the triggers 412a through 417a of the Operation part of the Instructoin Register and 444a through 447a of the Address Register portion are reset off, while triggers 401b through 408b of the Address Counter are reset on. Thus the Operation portion triggers and the Address Register triggers contain binary 0's, while the Address Counter triggers contain binary 1's. The signals on lines MRS (bottom of FIG. 4a) and MR1 through MR17 (bottom of FIGS. 4a, 4b and 4c) represent the outputs of the Memory Register bits S and 1 through 17, respectively, and the respective lines are positive if the respective bit representations stored in the Memory Register represent binary 1's. Conversely, if the respective bit representations stored in the Memory Register represent binary 0's, these lines are relatively negative. The line MRS (FIG. 4a), if positive, conditions one input of an AND circuit 400a, that is, it conditions this AND circuit provided the Delay Unit storing the Sign bit in the Memory Register is storing a manifestation of a binary 1, which binary 1 is selected, to indicate a negative Sign. The lines MR1 through MR5, when positive and thus representative of binary 1's, condition one input of the respective AND circuits 401a through 405a while the lines MR6 through MR9 (FIG. 4b) condition one input of respective AND circuits 435a through 439a. The lines MR10 through MR17 (FIGS. 4b and 4c) when negative condition one input of respective "negative" AND circuits 470a through 477a. It should be noted that these negative AND circuits 470a through 477a are conditioned when the manifestations of the bits 10 through 17, stored in the Memory Register, represent binary 0's.

During Instruction time, a positive signal on the line INST TIME (FIG. 4c) conditions one input of an AND circuit 439b so that the positive A10 (D1) signal is gated through this AND circuit and a cathode follower 440b, to provide an I10 (D1) signal (a one microsecond duration signal, occurring at 10 time, of an Instruction cycle) on the line MEM REG TO INST REG. This I10 (D1) signal is fed to the Sign and Operation portion AND circuits 400a through 405a (FIG. 4a) and to the Address Register portion AND circuits 435a through 439a (FIG. 4b) and will pass through the particular AND circuits, selectively conditioned by positive outputs on the lines MRS and MR1 through MR9, and the outputs of these selectively conditioned AND circuit pass via cathode followers 406a through 411a and 440a through 443a respectively, to selectively turn on corresponding ones only of the triggers 412a through 417a, and 444a through 447a. Thus, the setting of the Memory Register Delay Units storing manifestations of the binary 1 or binary 0 characteristics of bits 1 through 9 is transferred bodily to the Operation triggers (bits 1 through 5) of the Instruction Register, and to the triggers of the Address Register (bits 6 through 9) of the Instruction Register. Simultaneously, the signal I10 (D1) feeds to the Sign AND circuit 400a (FIG. 4a) and, provided that the Sign of the word stored in the Memory Register is negative, under which conditions the line MRS is positive, this signal I10 (D1) passes through the conditioned AND circuit 400a and via a cathode follower 406a to turn on, the Sign trigger 412a.

The negative "clamp" signal on line L102 (see FIG. 3a), which feeds to the various Delay Units D throughout the machine, for example, to the Delay Units comprising the storage elements, per se, of the Memory Register, is passed through an inverter 436b (FIG. 4c), a delay line 437b of the type as described above, and a cathode follower 438b, to a line DELAYED CLAMP, which conditions one input of an AND circuit 430b. The other input to this AND circuit 430b is the positive I10 (D1) signal on the line MEM REG TO INST REG. The output of this AND circuit 430b passes via an inverter 431b and cathode followers 432b and 433b to the line MR TO ADR CTR, which goes negative when the Memory Register is to be gated to the Instruction Register. This negative signal on line MR TO ADR CTR feeds to the negative AND circuits 470a through 477a, and passes through those particular negative AND circuits, which are selectively conditioned by negative signals, signifying that a binary 0 representation exists in selected ones of the lines MR10 through MR17. Thus, these signals pass selectively through the negative AND circuits 470a through 477a and via negative OR circuits 478a through 485a and cathode followers 486a through 493a to turn off selected ones of the triggers 401b through 408b, respectively. Thus, if a binary 0 is stored in a particular bit storage element of the Memory Register (that is in certain ones of the storage elements of bits 10 through 17) the respective trigger of the Address Counter (bits 10 through 17) is pulled off. For example, if the Memory Register 10 bit is a binary 0, then the line MR10 (FIG. 4b) feeding to the negative AND circuit 470a is negative. The negative signal on line MR to ADR CTR is then passed through this conditioned negative AND circuit 470a, the negative OR circuit 478a and the cathode follower 486a to turn off the trigger 401b, indicative of the "10" bit stored in the 10 bit storage element of the Memory Register.

Thus, during an instruction cycle, the instruction Register is set to the holding of the Memory Register or in other words the Memory Register is "dumped" into the Instruction Register.

The Address Counter sub-portion of the Instruction Register comprising triggers 401b through 408b (FIGS. 4b and 4c) is connected to count "DOWNWARD," which is the reason that each trigger of this counter is reset on, with each trigger signifying that a binary 1 is stored. As each trigger is so reset on in the manner as described above, those triggers, which change from an off to an on condition emit negative, "short duration" carry pulses, from their left plate to the binary input of the succeeding order. Therefore, when these triggers 401b through 408b are reset on, as described above, by the negative I4 (D3) signal, this signal, of three microseconds duration, exists long enough so that the "short duration" carry pulses, from one order trigger to a succeeding order trigger, are dissipated, the triggers being thus clamped on by the longer duration three microsecond signal. Subsequently, as the Memory Register is dumped into the Instruction Register, certain stages are selectively flipped off to indicate binary 0's, but no carry pulse is generated when a trigger is flipped off, since the left plate goes from a negative to a positive potential, and such a positive signal from one trigger to the binary input of a succeeding trigger has no effect. There is no connection from the right plates of these to succeeding triggers of the Address Counter. During certain Instructions involving Shifting the Memory Register thus dumps into the Instruction Register the operational part, calling for an operation involving a Shift, into the Address Register part, anything desired while into the Address Counter is dumped an indication of the amount of Shift desired.

During certain Execute cycles, for example, during Multiply or Divide operations, an E4 (D1) signal on the line RESET ADR CTR (FIG. 4b) feeds via an OR circuit 464a, an inverter 465a and a cathode follower 466a to the line ADR CTR RESET. The negative signal, thus developed on this line ADR CTR RESET, is effective to turn triggers 401b through 408b (FIGS. 4b and 4c) on. Thereafter an E9 (D1) signal on line 34 to ADR CTR (FIG. 4c) passes via an inverter to 434b and a cathode follower 435b to a line TO SET IN 34. The negative signal thus emitted to this line TO SET IN 34 passes via the negative OR circuits 478a (FIG. 4b) 479a, 481a, 482a, 483a and 485a, and via cathode followers 486a, 487a, 489a, 490a, 491a and 493a, to triggers 401b, 402b, 404b, 405b, 406b and 408b respectively, to set said triggers off. Thus triggers 401b, 402b, 404b, 405b, 406b and 408b are off while triggers 403b and 407b are on. When acting as a binary counter, trigger 408b is regarded as the "1" stage, trigger 407b is the "2" stage, trigger 406b is the "4" stage, trigger 405b is the "8" stage, trigger 404b is the "16" stage, trigger 403b is the "32" stage, trigger 402b is the "64" stage and trigger 401b is the "128" stage. As the Counter counts downward, if stages 403b and 407b are on and all other stages off, a count of 34 is required to step the counter to zero. If all stages are reset ON, a count of 255 is required to step the counter to zero.

The Address Counter is "stepped" by inputs to the "1" input trigger 408b of the Counter as the line STEP ADR CTR (at the right in FIG. 4c) is rendered positive by the control circuits to condition one input of an AND circuit 441b. As Clock pulses occur on a line L103, these pulses are passed via a cathode follower 444b to the other input of this AND circuit 441b whose output is fed via a cathode follower 442b and an inverter 443b to the binary input of the trigger 408b of the Address Counter. As the pulses on line L103 occur at all times and at a one megacycle rate, a pulse is emitted from the inverter 443b and the counter is stepped one count for each microsecond that the line STEP ADR CTR is positive. This trigger 408b, when pulsed, shifts alternately to on and off conditions as successive pulses occur on the line L103. As it shifts from an off to an on condition, a negative signal is emitted from the left plate and passes via a cathode follower 421b to the binary input of the adjacent trigger 407b which thus assumes on and off conditions alternately as it received these negative signals from trigger 408b. Trigger 407b, in turn, emits a negative signal directly to the binary input of its adjacent trigger 406b, when it goes from an off to an on condition. In like manner, the trigger 406b on going from off to on emits negative signals via cathode followers 420b and 410b to its adjacent trigger 405b; trigger 405b emits negative signals directly to the binary input of its adjacent trigger 404b; trigger 404b emits negative signals via a cathode follower 409b to the binary input of its adjacent trigger 403b; trigger 403b emits negative signals directly to the binary input of its adjacent trigger 402b and the trigger 402b emits negative signals directly to the binary input of the trigger 401b.

It should be noted that the left plate output of the Sign trigger 412a (FIG. 4a) is fed via a cathode follower 418a to a line IRS off (Instruction Register Sign off) which is positive when the trigger 412a is off. The right plate output of the Sign trigger 412a is fed via a cathode follower 401e to a line IRS on, which is positive when the trigger 412 is on. The left and right plates of triggers 412a through 417a (FIG. 4a) emit signals via cathode followers 418a through 428a, respectively, and the outputs of these cathode followers feed, via lines IRS ON, IRS OFF, OPN REG $\bar{1}$, OPN REG 1, OPN REG $\bar{2}$, OPN REG 2, OPN REG $\bar{3}$, OPN REG 3, OPN REG $\bar{4}$, OPN REG 4, OPN REG $\bar{5}$, and OPN REG 5, respectively, to the Operation Decoder. The notation of OPN REG $\bar{5}$, for example, signifies that the line is positive when the 5 bit of the Operation portion of the Instruction Register contains a binary 0, the short horizontal line above the 5 ($\bar{5}$) indicating that when this line is positive, no binary 1 is contained in that bit of storage. A positive signal on line OPN REG 5, however, indicates that there is a binary 1 stored in that particular bit of storage. The Operation Decoder, (described below) decodes the permutations represented by the joint on and off conditions of the triggers storing the Sign bit and bits 1 through 5, to determine which type of operation the Machine is to perform.

The output of triggers 444a through 447a (FIG. 4b) pass via cathode followers 448a, through 451a, respectively, to the lines ADR REG 6 through ADR REG 9, respectively, the latter lines being positive when the trigger conditions indicate the presence of binary 1's. The outputs from the right plates of the triggers 401b through 408b (FIGS. 4b and 4c) of the Address Counter are passed via cathode followers 411b through 418b, respectively, to lines ADR CTR 10 through ADR CTR 17, respectively, while on the other hand the output from the left plate of the trigger 405b is passed via a cathode follower 419b to line ADR CTR $\overline{14}$; the output from the left plate of the trigger 406b is passed via a cathode follower 429b to line ADR CTR $\overline{15}$; the output from the left plate of trigger 407b is passed via a cathode follower 421b to line ADR CTR $\overline{16}$; and the output from the left plate of trigger 408b is passed via a cathode follower 422b to line ADR CTR $\overline{17}$. The lines ADR CTR 10 through ADR CTR 17 feed to the negative AND circuit 445b (FIG. 4c). These lines ADR CTR 10 through ADR CTR 17 are negative, when the triggers 401b through 408b respectively are off. When all these triggers are off, the holding of the Address Counter is zero. If one or more of the lines ADR CTR 10 through ADR CTR 17 is positive, the output of the AND circuit 445b is positive and via the cathode follower 446b drives line "ADR CTR NOT 0" positive. Hence this line is positive, when the Address Counter is not set to indicate zero. If all triggers 401b through 408b are off, the counter is at zero, the lines ADR CTR 10 through ADR CTR 17 are negative, all inputs to the negative AND circuit 445b are negative and its output via the cathode follower 446b drives the line "ADR CTR NOT 0" negative. The outputs on the lines ADR REG 6 through ADR REG 9 (FIG. 4b) and on the lines ADR CTR 10 through ADR CTR 17 (FIGS. 4b and 4c) are fed via the Deflection Switches (see FIG. 1e) to the Deflection Register, described below, and to the Instruction Counter (FIGS. 1e and 4d).

INSTRUCTION COUNTER

This Instruction Counter controls the selection of addresses in memory during instruction time. Referring to FIG. 4d, this Instruction Counter comprises trigger circuits 465b through 476b, operable individually to on and off conditions, to set and Address in the Counter and operable in cascade thereafter to step the Counter. Each of the triggers 465b through 476b is connected, respectively, to one of the group of cathode followers 477b through 488b feeding, respectively, to the lines INST CTR 6 through INST CTR 17. The cathode followers 483b through 488b have the respective output lines INST CTR 12 through INST CTR 17 which are all connected to the inputs of an AND circuit 489b.

The outputs of the triggers 472b through 476b not only feed to the cathode followers 484b through 488b but also feed to the binary input of the next trigger. Likewise, triggers 466b through 470b feed to the binary inputs of their respective next triggers. These latter connections are rendered operative only when a particular trigger shifts from an on to an off condition, to thereby emit a negative signal, from its right plate to the binary input of a next trigger, to shift the latter from one condition to the other. For example, as trigger 476b, goes from on to off, a negative output is emitted from its right plate and fed via the cathode follower 488b to the binary input of the next trigger 475b. The trigger 475b is thereby shifted to an on condition, if it happened to be off, or to an off condition if it happened to be on. Thus, it is seen that triggers 476b through 471b and triggers 470b through 465b are connected in cascade. Instructions are normally taken from sequential addresses of Memory. This sequential addressing of Memory is accomplished by stepping the Instruction Counter by one at the end of each operation. An exception to this is the transfer type of Instructions which inhibit the stepping of the Instruction Counter and instead clear the Instruction Counter and cause the Address portion of the transfer type of instruction to be transferred from the Instruction Register to the Instruction Counter so that the next Instruction is taken from the Address so designated.

Stepping of the Instruction Counter is normally accomplished in the following manner. At "10" time of either an Execute cycle or an Execute/Regenerate cycle a positive pulse is applied to the END OP line, as per FIG. 5a, for a period of 2 microseconds. This positive pulse on the END OP line is passed to the STEP INST CTR line, as per FIG. 5aj, so long as the Instruction being executed is not a transfer type of Instruction. Hence, the E10 (D2) pulse or the E/R10 (D2) pulse on the STEP INST CTR line conditions one input of an AND circuit 462b. Assuming that machine is not in an Interrupt cycle, a positive signal is applied via the NO IRPT CYC line as a second input to the AND circuit 462b. A third input to the AND circuit 462b is the postive clock pulse on the A11 (D1) line and when these three inputs are postive the next positive pulse occurring on line L103 is passed by the AND circuit 462b and the OR circuit 402e and the cathode follower 463b to the inverter 464b where it is inverted to a negative pulse and applied to the binary input of the "1" cascaded trigger 476b. This negative signal steps the Instruction Counter by one so that the next Instruction read from Memory is from the next sequential Address in Memory designated by the number now in the Instruction Counter.

These negative input signals to the Counter cause trigger 476b to shift on and off alternately, and when it shifts off, it produces a negative pulse which, as described above, is applied to the binary input of the next trigger 475b, to thereby shift it from one condition to the other, all in a now well-known manner. Successive pulses, applied to trigger 476b, will cause the triggers 475b through 471b to shift and assume different permutations of on and off conditions, each permutation selectively and exclusively representative of the number of pulses applied to the input trigger 476b of the Instruction Counter. When all the triggers 476b through 471b are on, all the outputs from their right hand plates are relatively positive, and these signals are fed, via the cathode followers 488b through 483b, to the lines INST CTR 17 through INST CTR 12, respectively. The positive signals on these lines are also all fed to the AND circuit 489b. Since now, all the inputs of the AND circuit 489b are relatively positive, its output is positive and is applied via a cathode follower 490b, to the binary input of the trigger 470f. Since this signal is positive, it can not flip the trigger 470f which is of the type which is responsive to negative pulses only, as described above. However, as the next Counter input pulse arrives and is applied to the input trigger 476b, the latter shifts off and thus removes a relatively positive potential from one input of the AND circuit 489b, so that the output of the AND circuit 489b goes relatively negative, which is fed via the cathode follower 490b to flip trigger 470b. Thus, it is seen that with the triggers 471b through 476b all on, a subsequent pulse, applied to the Counter input trigger 476b, does not have to ripple through each of the triggers 475b through 471b, in order to flip the trigger 470b but instead, immediately upon the shifting of this counter input trigger 476b, a pulse is effective via the AND circuit 489b and the cathode follower 490b, to flip the trigger 470b.

Triggers 470b through 465b are cascade-connected, in a manner similar to triggers 476b through 471b. Thus, various permutations of on or off conditions are indicated by the signals on all the output lines of the Instruction Counter, INST CTR 6 through INST CTR 17. Normally, the Instruction Counter is stepped, one step, as just explained above, upon the completion of each Operation (as described presently), so that succeeding Instructions stored in Memory are read from succeedingly numbered Address positions in Memory. However, it is at times desired to break out of the normal sequence of a program and to transfer to another part of the program. Under these conditions, the fact that a transfer type of Instruction is being executed inhibits, as per FIG. 5aj, the positive pulse on the END OP line from passing to the STEP INST CTR line. Consequently, the AND circuit 462b is blocked from passing a pulse on to step the Instruction Counter and instead the line RESET INST CTR is driven positive, for three microseconds, specifically, at "7" time, of an Execute/Regenerate cycle. This positive signal on the line RESET INST CTR is applied to the right grids, of all the triggers 465b through 476b, to shift them all off. At the same time, signals on the lines ADR REG 6 through ADR REG 9 (FIGS. 4b and 4d) and ADR CTR 10 through ADR CTR 17 (FIGS. 4b, 4c and 4d) are representative of the holding of the Address Register portion of the Instruction Register and of its Address Counter portion, respectively, and these inputs are fed (FIGS. 1e and 4d) to one input of AND circuits 450b through 461b, respectively. The particular bit representation of the Address Register or of the Address Counter representing binary 1's, will, as explained above, cause the respective lines containing these binary 1's only to be positive. Thus, with one input of the AND circuits 450b through 461b selectively conditioned, the occurrence of an E/R10 (D1) on the line SET INST CTR TO INST REG permits signals to be passed through those respective AND circuits 450b through 461b only, which are conditioned by binary 1 representations to the respective triggers 465b through 476b, pulling the triggers respectively and selectively to an on condition. Thus, it is seen that the holding of the Address Register and of the Address Counter may be shifted or "dumped" into the Instruction Counter. After such an operation, the next Instruction will, of course, be read, from the particular Address dumped into the Instruction Counter and succeeding Instructions will be read, from succeeding Addresses, beginning at this now "dumped-in" Address as the stepping signals are applied to the line STEP INST CTR.

When a TRANSFER AND STORE COUNTER Instruction is called for as a regular Instruction of a program and not as an extra Instruction due to an interruption, then it is necessary to step the Instruction Counter at "2" time of the execute cycle so that the number standing in the Instruction Counter will be the Address for the next sequential Instruction of the program. At the same time, the Address portion of the Instruction Register is transferred to the Deflection Register so that at "8" time of the execute cycle, the contents of the Address portion of the half word at the Memory Address designated by the Deflection Register is replaced by the contents of the Instruction Counter, which, at this time, contains the Address of the next sequential Instruction of the program. Hence, it should be apparent that this operation causes the Address of the next sequential Instruction of the program to be stored at the Address designated by the Address portion of the TRANSFER AND STORE COUNTER Instruction.

Thus, one input of the AND circuit 403e is conditioned by the positive signal on the TR STO C line. Also, since this is not an interrupt cycle, a positive signal is applied via the NO IRPT CYC line as a second input to the AND circuit 403e. A third input of this AND circuit is conditioned by an E2 (D1) pulse, and when these three inputs are positive the next occurring positive pulse on the L103 line passes via the AND circuit 403e and via the OR circuit 402e and the cathode follower 463b to the inverter 464b where it is inverted to a negative pulse and applied to the binary input of the "1" cascaded trigger 476b thereby stepping the Instruction Counter by one. Now, since the Address for the next sequential Instruction has been stored in Memory, a transfer may be made to a predetermined location in Memory for the next Instruction to be executed.

The transfer is accomplished in the following manner. At "7" time of the Execute/Regenerate cycle, the positive pulse on the RESET INST CTR line is applied to turn off all of the triggers 465b to 476b of the Instruction Counter in preparation for receiving the Address of this next Instruction. At "10" time of the Execute/Regenerate cycle, a positive pulse is applied to the SET INST CTR TO INST REG line, as per FIG. 5ba, causing the contents of the Address portion of the Instruction Register to now be transferred to the triggers 465b to 476b of the Instruction Counter.

It should be noted that the Address portion of a TRANSFER AND STORE COUNTER Instruction is always an even number so that the least significant bit of the Address will always be a zero bit. Therefore, when the Address portion of the TRANSFER AND STORE COUNTER Instruction is transferred to the Instruction Counter, the AND circuit 461b is blocked from passing the positive pulse on the SET INST CTR TO INST REG line to the trigger 476b. However, at the same time, the AND circuit 489b is conditioned by the positive signal on the TR STO C line so that the positive pulse on the SET INST CTR TO INST REG line passes therethrough and via the OR circuit 490b to turn on the trigger 476b and thereby effectively advance the Address setting of the Instruction Counter by one. As an example, let it be assumed that the Address for the TRANSFER AND STORE COUNTER Instruction is Address 0017 and that the Address portion of the TRANSFER AND STORE COUNTER Instruction is Address 0198. Consequently, at "2" time of the execute cycle the Address setting of the Instruction Counter is stepped by one, that is, it is changed from 0017 to 0018 the Address for the next sequential Instruction. At the same time the contents of the Address portion of the Instruction Register, namely, Address 0198 is transferred from the Instruction Register to the Deflection Register so that at "8" time of the execute cycle the contents of the Address portion of the half word at Address 0198 is replaced by the contents of the Instruction Counter, namely, 0018. At "7" time of the Execute/Regenerate cycle, the Instruction Counter is cleared and at "10" time of the Execute/Regenerate cycle the Address 0198 is transferred from the Instruction Register to the Instruction Counter and the least significant binary bit is changed from a zero bit to a one bit so that the Address now setting in the Instruction Counter is Address 0199, the Address of the next Instruction to be executed.

When a TRANSFER AND STORE COUNTER Instruction is called for as an extra Instruction due to an interruption, then the Interrupted Instruction is completed before switching to the interrupt sub routine. At the end of the Interrupted Instruction, the Instruction Counter is stepped by one if the Interrupted Instruction is other than a transfer type of Instruction or the Instruction Counter is set with the Address portion of the Instruction Register if the Interrupted Instruction is a transfer type of Instruction. In any event, the Instruction Counter now contains the Address of the next sequential Instruction of the program and, consequently, it is not necessary to step the Instruction Counter at "2" time of the Execute cycle. Therefore, a negative signal is applied via the NO IRPT CYC line to effectively decondition the AND circuit 403e to prevent the stepping of the Instruction Counter. However, at "2" time the Address portion of the Instruction Register is transferred to the Deflection Register so that at "8" time of the Execute cycle, the contents of the Address portion of the half word at the Memory Address designated by the Deflection Register is replaced by the contents of the Instruction Counter, which, at this time, contains the Address of the next sequential Instruction of the main program.

At the "7" time of the Execute/Regenerate cycle, the Instruction Counter is cleared, in a manner as previously described, in preparation for receiving the Address of the next Instruction to be executed. At "10" of the Execute/Regenerate cycle, the Address portion of the Instruction Register is now transferred to the Instruction Counter and by means previously described the least significant bit of the Address portion of the TRANSFER AND STORE COUNTER Instruction is changed from a zero bit to a one bit so that the Address portion of the TRANSFER AND STORE COUNTER Instruction is effectively stepped by one and now stands in the Instruction Counter as the Address for the next Instruction to be executed.

As an example, let it be assumed that the Instruction being interrupted is from Address 0016 of Memory which Address is now standing in the Instruction Counter. At the end of this Instruction, the Instruction Counter is stepped by one to the number 0017 if the interrupted instruction is one other than the transfer type of Instruction or if it is a transfer type of Instruction the Address portion of the Instruction is transferred from the Instruction Register to the Instruction Counter. In any event, the Instruction Counter now stands with the setting of the next Instruction to be executed. Let it be assumed that the Instruction Counter is set with the next sequential Instruction of the program, namely, Address 0017. Consequently, during the next Instruction time, the Instruction at Address 0017 is read out of Memory and effectively stored in the Instruction Register but execution thereof is inhibited in view of the fact that an interrupt cycle has been signalled causing an extra Instruction cycle which prevents the production of the GO TO EX signal or the GO TO EX/RGN signal, as per FIGS. 5ar and 5ak. During the extra Instruction cycle the Address designated by the Interrupt Adder, for example, Address 0120, is transferred to the Deflection Register causing the TRANSFER AND STORE COUNTER Instruction which is stored at that Address to be effectively transferred to the Instruction Register. At "2" time of the execute cycle, the Address portion of the Instruction Register, for example, Address 0198 is transferred to the Deflection Register so that at "8" time of the execute cycle the contents of the Address portion of the half word at Address 0198 is replaced by the contents of the Instruction Counter, namely, Address 0017. Hence, the Address of the next sequential instruction of the program is stored in Memory and transfer may now be made to the Interrupt sub-routine. Consequently, at "7" time of the Execute/Regenerate cycle the Instruction Counter is cleared in a manner as previously described, in preparation for receiving the address of the next instruction to be executed. At "10" time of the Execute/Regenerate cycle, the Address portion of the Instruction Register, namely, Address 0198 is now transferred to the Instruction Counter and, by means previously described, the least significant bit is changed from a 0 to a one so that the Address setting of the Instruction Counter is effectively stepped by one to Address 0199 which is the address of the next instruction to be executed. It should be noted that with this arrangement there is no carry from the least significant bit to the next significant bit and no ripple carry problem is involved.

REGENERATION COUNTER

The Regeneration Counter is illustrated in FIG. 4e and comprises trigger circuits 401c through 410c. This Regeneration Counter is never reset to any particular number, that is to any pre-chosen permutations of on or off conditions. It may assume any happenstance permutation but thereafter it is stepped sequentially through all successive on and off permutations, to thus assume in one complete series of operations. Address indications representative of each and every Address on each cathode ray tube of Memory and repeated operations merely repeat the methodical sequential selection of each and every such Address on each cathode ray tube, in Memory, so that a systematic interrogation of the complete raster on the cathode ray tubes is provided, for regeneration purposes. As described below, the Deflection Register (see FIG. 1e) is controlled by the Regeneration Counter, during all Regenerate cycles AND during all Execute/Regenerate cycles.

The Regeneration Counter (FIG. 4e) is stepped, one step, during each and every Execute/Regenerate or Regenerate cycle, so that successively numbered Addresses are systematically regenerated. The Regeneration Counter is thus stepped, one step, under control of a positive signal, on the line EX/RGN TIME (during Execute/Regenerate) or by a positive signal on the line RGN TIME (during Regenerate time) feeding to an OR circuit 495b. The output of this OR circuit passes via a cathode follower 496b, to condition one input of an AND circuit 497b. The other input to this AND circuit is an A4 (D1) Clock pulse, which is gated through this conditioned AND circuit during every Regenerate or Execute/Regenerate cycle and via an inverter 498b and a cathode follower 499b is applied to the binary input of the Regeneration Counter input trigger 410c, thereby stepping the counter, one step, as will now be described. The triggers 410c through 401c are cascade-connected, in the order of descending reference numbers, so that as one trigger goes from on to off, it emits a negative signal, to the succeeding lower reference numbered trigger, to shift it from one condition to the other. The outputs of the triggers 401c through 410c are passed via respective cathode followers 411c through 420c, to respective lines RGN CTR 6 through RGN CTR 15. As described in said above identified application of Fox et al., the effect of the "6" bit storage is rendered ineffective during all cycles involving Regeneration.

DEFLECTION SWITCHES AND REGISTER

The Deflection Switches and the Deflection Register (FIG. 1e) are illustrated in more detail in block form, in FIGS. 4f, 4g and 4h, taken collectively, side by side in that order. This Deflection Register is set to the holding of the address portion of the Instruction Register, during execute time, but is set to the holding of the Instruction Counter or the Interrupt Adder, during Instruction time, and alternatively, is set, to the holding of the Regeneration Counter, during either Execute/Regenerate or Regenerate time.

The Deflection Register (FIGS. 4f, 4g and 4h) comprises triggers 460c through 472c, which represent respectively, the Sign bit, and bits 6 through 17, of the particular word addressing memory. Manifestations of bits, 6 through 15, are received by the Deflection Switches from the Regeneration Counter (see also FIG. 1e) also from the Address portion of the Instruction Register, also from the Interrupt Adder, and also from the Instruction Counter. The circuits for storing a representation of any one bit are all similar to each other so that the description of one, given below, will suffice for all.

The circuits for the respective bits 16 and 17, of the Deflection Switches, receive inputs from the Address portion of the Instruction Register, from the interrupt adder, and from the Instruction Counter, and one such circuit will be described in detail presently, as well as the Sign bit representing circuit.

As described below, the Addressing of a full or of a half word, in Memory, depends upon whether the Sign, of a particular Address is positive or negative. The Sign is not used for Addressing, during Regeneration cycles of any type, but only during Instruction and Execution cycles.

During Instruction time, the information, stored in the Instruction Counter, is to be dumped into the Deflection Register and since each Instruction comprises a half word only, circuits are provided and are so operative that the Sign bit representation during Instruction time, is always that of a positive Sign, or in other words, the Sign trigger, is set off.

During Execute time, the Sign may be positive or negative, to respectively cause operation on a full or on a half word. Thus, the holding of the Sign bit storage element of the Instruction Register is "dumped" into the Sign trigger of the Deflection Register, during Execute time.

Referring specifically to FIG. 4f, an AND circuit 432c is conditioned, during Execute time, by a positive signal on the line EX TIME, so that the signal, on the line IRS OFF, which is the output line of the Instruction Register Sign trigger (see FIGS. 1e and 4a) and is positive when the sign trigger is off, to thus indicate a positive sign, is also applied to this AND circuit 432c and is passed through to an OR circuit 433c and a cathode follower 434c to a line 435c, which feeds to both a negative AND circuit 437c and to a plus AND circuit 438c. Thus, the signal on line 435c is positive, during Execute time, provided that the Sign trigger of the Instruction Register is off (to represent a positive sign) or is negative when the Sign trigger of the Instruction Register is on (to represent a negative Sign). Thus, if the Sign is positive, the plus AND circuit 438c, is conditioned, while if the Sign is negative, the negative AND circuit 437c, is conditioned. An A2 (D1) signal, (lower left portion FIG. 4f) is passed via a cathode follower 426c to a line 427c connected to this plus AND circuit 438c, so that a positive one microsecond signal, occurring at 2 time of all character cycles is thus applied to this AND circuit, to several other AND circuits, and also, via an inverter 428c (FIG. 4f) and cathode followers 429c and 430c to a line 431c feeding to the negative AND circuit 437c. Thus, the signals on line 431c are negative at the same time that the signals are positive on line 427c. This negative signal on line 431c fed to the negative AND circuit 437c passes therethrough, provided the latter is conditioned by a negative signal on the line 435c, and turns on the trigger 460c. This trigger is the Sign trigger of the Deflection Register and when on indicates a negative Sign. If, however, the signal on line 435c is positive, which is an indication that the Instruction Register Sign trigger is off, then this line conditions one input of the plus AND circuit 438c, so that the positive one microsecond A2 (D1) signal, on line 427c is passed through this AND circuit 438c, to turn off the Sign trigger 460c. Thus, it is seen that, during Execution time, the holding of the Instruction Register Sign trigger is "dumped" into the Sign trigger 460c of the Deflection Register.

During Instruction time, since only half words are Addressed in Memory, the Sign trigger 460c must be turned off. This is produced by a positive signal on the line INST TIME, which feeds via the OR circuit 433c and the cathode follower 434c, to cause line 435c to go positive, to condition the plus AND circuit 438c, whereby the one microsecond A2 (D1) positive signal on line 427c passes through this AND circuit to turn off the Sign trigger 460c. Thus, the Sign trigger 460c, is turned off during every Instruction cycle. It is also necessary to turn off the sign trigger 460c during execute time of Transfer and Store Counter instructions. When the instruction register contains such an instruction, a positive signal appears on the TR STO C line, which conditions one input of AND circuit 419e. During execute time, the other input of AND circuit 419e is conditioned by a positive signal on the EX TIME line. The output of AND circuit 419e passes through OR circuit 433c and cathode follower 434c to make line 435c positive, which causes the sign trigger 460c to be turned off, as described just above. During Execute/Regenerate or Regenerate cycles, the holding of the Sign trigger 460c is immaterial, since only full words are addressed as described in said above identified application of Fox et al.

As stated above, the circuitry for each of the bits "6" through "15" is identical, so that a description of the "6" bit circuits with suffice for all.

A positive signal is maintained on the NO EXT CYC line to condition the AND circuit 414e so that when the Cycle Timer steps to Instruction time a positive signal is applied via the INST TIME line to the now conditioned AND circuit 414e and passes therethrough and via the cathode follower 415e to one input of each of several AND circuits, for example, the AND circuit 439c which is a part of the "6" bit circuitry. During Instruction time, one input of AND circuit 416e is conditioned by a positive signal on the INST TIME line. If an extra Instruction cycle is called for during Instruction time a positive signal is applied via the EXT CYC line to the now conditioned AND circuit 416e and passes therethrough and via the cathode follower 417e to condition one input of each of several AND circuits, for example, the AND circuit 418e, which is a part of the "6" bit circuitry. When the Cycle Timer steps to execution time, a positive signal is applied via the EX TIME line to condition one input of each of several AND circuits, for example, AND circuit 440c which is a part of the "6" bit circuitry. When the Cycle Timer steps to the execute/regenerate time, a positive signal is applied via the EX/RGN TIME line to a cathode follower 421c, but during regenerate time, a positive signal is applied via a RGN TIME line to a cathode follower 422c. The outputs of both of these cathode followers 421c and 422c, which are positive when their inputs are positive, pass via an OR circuit 423c and a cathode follower 424c to line 425c. Thus, this line 425c is positive during all regenerate or execute/regenerate cycles. The positive signal on the line 425c conditions one input of several AND circuits, for example, the AND 441c, which is part of the "6" bit circuitry. These AND circuits 418e, 439c, 440c and 441c receive inputs, respectively, from the "6" bit of the Interrupt Adder, the "6" bit of the Address portion of the Instruction Register and the "6" bit of the Regeneration Counter. Thus, during a normal instruction cycle or the first instruction cycle of the two occurring when an interruption is made, while the AND circuit 439c is conditioned, the holding of the "6" bit, of the Instruction Counter, via line INST CTR 6, is passed through this AND circuit 439c an OR circuit 443c and a cathode follower 444c, to line 445c. During Instruction time line 445c is positive, provided a binary 1 is contained in the Instruction Counter "6" bit, but is negative if a binary 0 is contained in that particular bit. If the signal on line 445c is negative, signifying a binary 0, then the negative AND circuit 446c is conditioned, but if the signal on 445c is positive, the plus AND circuit 447c is conditioned. If the negative AND circuit 446c is conditioned, the one microsecond negative A2 (D1) signal, on line 431c passes through, to turn off the trigger 461c, to thereby represent a binary 0. If, however, the AND circuit 447c is conditioned, the postitive one microsecond A2 (D1) signal on line 427c passes through this AND circuit 447c to turn on the trigger 461c to thereby represent a binary 1. Thus, the holding of the Instruction Counter "6" bit, is "dumped" into the "6" bit trigger 461c of the Deflection Register during normal instruction cycles. In a similar manner the output of the "6" order of the interrupt adder, feeding via line IRPT ADDER (6) to the AND circuit 418e, which is conditioned during an extra instruction cycle following an interruption, is passed through to an OR circuit 443c and via the circuitry, just described above, to cause the trigger 461c to be set on or off as the conditions require. Thus, during the extra instruction cycle, the output of the interrupt adder "6" bit is dumped into the "6" bit trigger 461c. In a similar manner, the holding of the Address portion of the Instruction Register "6" bit feeding via line ADR REG 6 to the AND circuit 440c, which is conditioned during Execute time, is passed through to an OR circuit 443c and via the circuitry, just described above, to cause the trigger 461c to be set, on or off, as the conditions require. Thus, during Execute time, the holding of the Instruction Register "6" bit is dumped into the "6" bit trigger 461c. The holding of the Regeneration Counter "6" bit is fed via line RGN CTR 6 to the AND circuit 441c, which is conditioned, as described above, during all Renegerate or all Execute/Regenerate cycles, by a positive signal on line 425c. The output of this AND circuit 441c is passed via the OR circuit 443c, as just described, to gate signals, to set the trigger 461c, to an on or off condition as required. Thus, it is seen that the holdings of the Regeneration Counter "6" bit, the Instruction Register "6" bit, the Instruction Counter "6" bit or the interrupt adder "6" bit, respectively, are dumped into the "6" bit trigger 461c of the Deflection Register during a Regenerate cycle, an Execute cycle, a normal instruction cycle, or an extra instruction cycle. Identical circuitry serves to "dump" the holding of the bits "7" through "15" respectively, of the Regeneration Counter, the Instruction Register, the instruction counter, and the interrupt adder, into corresponding bit storing triggers, of the Deflection Register.

Referring now to FIG. 4h, it will be noted that the triggers 471c and 472c for bits "16" and "17," respectively, of the Deflection Register, do not receive inputs, from the Regeneration Counter, since, as explained above, the Regeneration Counter stores representations of bits 6 through 15 only. During a normal instruction cycle, extra instruction cycle, or execute cycle, the "16" and "17" bits are set to the holdings of the instruction counter, interrupt adder, or instruction register as described above for the "6" bit. During a regenerate or execute/regenerate cycle lines 455c and 456c are negative, since there is no coincidence of positive signals at the corresponding AND circuits. Thus, triggers 471c and 472c are turned off, representing a binary zero. During Regeneration, howevr, all tubes are unblanked, as described in said above identified application of Fox et al.

The output from the right plates of the triggers 460c through 472c of the Deflection Register representing the Sign and bits 6 through 17, respectively, are passed through respective cathode followers 476c through 488c to the respective lines SIGN (—) and DEF REG 6 through DEF REG 17. Other outputs of the Deflection Register are from the left plate of the Sign trigger 460c via a cathode follower 474c, to the SIGN (+); from the left plate of the "6" bit trigger 461c via a cathode follower 475c to a line $\overline{\text{DEF REG 6}}$, from the left plate of the "16" bit trigger 471c via a cathode follower 489c to a line $\overline{\text{DEF REG 16}}$ (positive when the Deflection Register 16 bit contains a binary 0), and from the left plate of the "17" bit trigger 472c via a cathode follower 490c to a line $\overline{\text{DEF REG 17}}$.

OPERATION DECODER

Details of the Operation Decoder are shown in FIGS. 4i and 4j. The Operation Decoder receives twelve inputs derived from the manifestations of the sign and the 1 to 5 bits, inclusive, comprising the Operation portion of the Instruction Register (see also FIG. 4a) and converts the permutations of the binary 1 and binary 0 holdings of these 6 bits into forty-one separate outputs, only one of which is positive at any one time. These twelve inputs to the Operation Decoder are lines IRS ON, OPN REG 1 through OPN REG 5, IRS OFF, and OPN REG $\bar{1}$ through OPN REG $\bar{5}$. These lines are positive, as stated above, when the respective bits contain binary 1's in the case of lines IRS ON and OPN REG 1 through OPN REG 5, or binary 0's in the case of the lines IRS OFF and OPN REG $\bar{1}$ through OPN REG $\bar{5}$. Different combinations of these lines feed to the 41 AND circuits of FIGS. 4i and 4j, each AND circuit having 5 or 6 inputs, depending upon whether the sign is part of the operation code, so that when all inputs to a particular AND circuit are positive, its output is positive and thereby energizes a single selected line to thus produce the particular operation indicated by the decoded permutation by rendering certain control circuits of the machine effective. For example, the AND circuit 401d receives inputs from lines OPN REG 1, OPN REG $\bar{2}$, OPN REG $\bar{3}$, OPN REG $\bar{4}$, and OPN REG $\bar{5}$. Thus, if the particular permutation of binary 1 and binary 0 bit values of the 1 through 5 bits of the Instruction Register are 10000, all five inputs to this AND circuit 401d are positive and its positive output feeds via a cathode follower 402d to drive line MPY positive. Thus, it is seen that if the permutation of binary 1 and binary 0 values of bits 1 through 5 of the Instruction Register is 10000, the operation called for by the machine is MULTIPLY. All forty-one outputs of the Operation Decoder are shown, and they are respectively driven positive by identical AND circuits and cathode followers, so that no further description is deemed necessary, it being obvious that the inputs to the respective AND circuits comprise different combination of the above twelve input lines, so that forty-one different outputs are available, each of which calls for a particular operation. In some cases the sign bit is necessary to define the operation, in others it is not. These outputs as listed on the left side of the FIGS. 4i and 4j, reading from top to bottom, are STOP, TR (Transfer), TR OV (Transfer on Overflow), TR+ (Transfer on plus), TR0 (Transfer on Zero), SUB (Subtract), R SUB (Reset and Subtract), LOAD BASE (Load Base Address Register), ADD, R ADD (Reset and Add), STORE, STORE MQ (Store Multiplier-Quotient), MPY (Multiply), DIV (Divide), STORE BASE (Store Base Address Register), L LEFT (Long Shift Left), L RIGHT (Long Shift Right), ACC LEFT (Accumulator Shift Left), READ WRITE, REWIND, STORE LOC (Store Leftmost One Counter) and SENSE. The outputs of the right side of the Operation Decoder listed to the right proceeding from the top to the bottom in FIGS. 4i and 4j are: LOAD MASK (Load Mask Register), STORE MASK (Store Mask Register), LOAD IND (Load Indicator Register), STORE IND (Store Indicator Register), SUB AB (Subtract Absolute value), NO OP (No Operation), ADD AB (Add Absolute Value) STORE ADR (Store Address), LOAD MQ, (Load MQ meaning to Read Out of Memory into the MQ Register to thus load it), MPY R (Multiply and Round), ROUND, TR STO CO (Transfer and Store Instruction Counter), TR EN (Transfer and Enable), A RIGHT (Shift Accumulator Right, pertaining to the shifting of the Accumulator Register, alone to the right), READ B (Read Backwards), WRITE EOF (Write End of File), SET DR (Set Drum) and COPY.

It is apparent, of course, that most of these Instructions pertain to arithmetic operations, which include manipulation of information through the Adder, Accumulator Registor and Multiplier Quotient Register. It should also be apparent that certain of these operations pertain to Input/Output Units (not shown) for example, such Instructions as READ, WRITE, REWIND, SENSE, READ BACKWARDS, WRITE END OF FILE, SET DRUM and COPY. These Instructions pertain to an Input/Output device such as shown and described in detail for example, in the copending application of Bartelt et al., Serial No. 401,648, filed December 31, 1953. Such an Input/Output device comprises a part of the Electronic Data Processing Machine of which the novel Calculator, comprising the present invention, is a part and may be used to supply data to, or receive data from, the Multiplier Quotient Register.

CONTROL CIRCUITS

Referring again to FIG. 1b of the composite diagram, it should be noted that certain circuits are represented by blocks labeled Multiply, Divide, Tally Counter; Address, Sign and Address Counter Mixer circuits; Carry and Overflow Triggers, Execution Timers, and Mixing Circuits. It is the function of these circuits to develop certain timed pulses which will control the operation of the arithmetic unit per se. The circuitry of these blocks will now be described and the development of the various pulses on the timing Diagrams given. Later, the Arithmetic Unit, per se, will be described in detail and still later Timing Diagram signals are again referred to, as the various operations performed by the machine are fully described.

Refer now to FIG. 5a which shows the circuitry for the Carry and Overflow triggers. If in the operation of the Arithmetic Unit, a carry output is emitted from the Q position of the Adder which is an end carry, the line ADDER (Q) goes positive and conditions one input of the AND circuit 501a. While this AND circuit is conditioned, an E/R4 (D1) signal passes through the AND circuit and the diode 502a to turn on the trigger 503a. Trigger 503a when on emits a positive signal via the cathode follower 506a to the line QC (this line when positive indicating that there has been a carry from the Q position). The trigger 503a when off represents a condition of no carry and at that time emits a positive output via the cathode follower 505a to the line NO QC. The trigger 503a is reset to an off condition, every character cycle by an A1 (D1) signal feeding via the diode 504a.

The trigger 509a is the Overflow trigger. This trigger may be turned on by a positive signal on the line AD (1) C/ACC (1) OV, which signifies that there has been a carry from the Adder 1 position or that a binary "1" has been shifted from the Accumulator Register 1 position to the overflow positions Q or P. This positive signal feeds through the diode 507a to turn the trigger 509a on. Trigger 509a when on emits a positive signal via cathode follower 510a to the line OV TRIG ON. The trigger 509a is reset off, when a positive signal occurs on the line R OV TR (signifying reset over flow trigger) which feeds through the diode 508a.

Refer now to FIG. 5c, which shows the circuits for indicating the particular type of address called for; that is full, even half or odd half words, the Signs of the Accumulator Register, the Memory Register and the MQ Register; and signals for indicating whether or not the Address Counter is at a count of zero. A positive output from the Accumulator Register Sign position via line ACC (S) signifies that the Sign is negative. The signal on the line ACC (S) feeds via a cathode follower 550a to the line ACC (−) which is positive when the Accumulator Register contains a negative sign. The signal on the line ACC (−) feeds via a inverter 552a and a cathode follower 554a to the line ACC (+), which line is positive when the Accumulator Register Sign is positive.

Similar circuits are used for giving indications of the

Memory Register Sign and the MQ Register Sign. A signal on the line MR (S) passes via a cathode follower 551a to the line MR (—), which is positive when the Memory Register Sign is negative. A signal on the latter line passes via an inverter 553a and a cathode follower 555a to the line MR (+). It follows that line MR (+) is positive when the Memory Register Sign is positive.

The MQ Register sign position emits an output via the line MQ (S), which is positive when the Sign of the MQ Register is negative. The signal on this line MQ (S) feeds via a cathode follower 562a to line MQ (—), which is positive when the MQ Register Sign is negative. The signal on the line MQ (—) feeds via an inverter 563a and a cathode follower 564a to the line MQ (+), which is positive when the MQ Register Sign is positive.

If both the Accumulator Register and the Memory Register signs are positive, lines ACC (+) and MR (+) are positive and feed to the AND circuit 566a which emits a positive signal to an OR circuit 558a. If however, both the Accumulator Register and the Memory Register Signs are negative, the AND circuit 557a is conditioned by positive signals on lines ACC (—) and MR (—) and emits a positive output to the OR circuit 558a. Therefore, the output of the OR circuit 558a is positive when both the Accumulator Register and Memory Register Signs are alike, this signal passing via a cathode follower 560a to the line AMSA, which line is positive when both the Accumlator Register and the Memory Register Signs are alike. The output of the OR circuit 558a is negative, unless the signs are alike, and this signal is passed via an inverter 559a and the cathode follower 561a to the line AMSU. It follows that this line AMSU is positive when the Accumulator Register and the Memory Register Signs are unlike. A comparison is also made of the Memory Register and the MQ Register signs. If the Memory Register Sign is positive and the MQ Register Sign is positive, both inputs to the AND circuit 565a are positive, the output of which feeds to the OR circuit 567a. Likewise, if the Memory Register Sign is negative and the MQ Register Sign is negative, both inputs to the AND circuit 566a via lines MR (—) and MQ (—) are positive, and its positive output feeds to the OR circuit 567a. It follows then that the output of the OR circuit 567a is positive when both the Memory Register Sign and the MQ Register Sign are positive or if the Memory Register Sign and the MQ Register Sign are positive. The output of this OR circuit 567a feeds via a cathode follower 570a to the line MMSA. It follows that the latter line is positive when the Memory Register Sign and MQ Register Sign are alike. The output of the OR circuit 567a also passes via an inverter 569a and a cathode follower 571a to a line MMSU, which is positive when the Memory Register and the MQ Register Signs are unlike.

The line ADR CTR NOT 0, which is positive when the Address Counter has not reached the count of zero, feeds via the cathode follower 572a to line ADR CT NO ZERO. It follows that the latter line is also positive when the Address Counter has not reached a count of zero. The signal on this line ADR CT NO ZERO is also fed via an inverter 573a and a cathode follower 574a to a line ADR CT ZERO. The line ADR CT ZERO is positive when the Address Counter has reached the count of zero.

As explained above, when an address is given for read out or read into Memory, if the Sign of the address is negative, a full word is addressed, but if the sign is positive a half word is addressed. Whether the half word addressed is an odd half word or an even half word is dependent upon the condition of the Deflection Register 17 bit.

Referring to the circuits in the right portion of the FIG. 5c, if the Sign of the address is negative, the line SIGN (—) is positive and feeds via a cathode follower 582a to the line FULL and also via the OR circuit 580a and a cathode follower 581a to a line F/E HALF. The lines FULL and F/E HALF are positive when a full word is addressed. If the Sign of the address is positive, then the line SIGN (+) is positive to condition one input of each AND circuit 575a and 577a and also feed via a cathode follower 578a to line HALF. The line HALF is positive when a half word is addressed. The AND circuit 575a receives a second input via line DEF REG 17, which is positive, as explained above, when the Deflection Register 17 bit contains a binary 1. The output of the AND circuit 575a feeds via a cathode follower 576a to a line ODD HALF, which is positive when a half word is addressed and the address is odd as determined by the Deflection Register 17 bit containing a binary 1. The second input to the AND circuit 577a is via line DEF REG 17 which is positive when the Deflection Register 17 bit contains a binary 0. Both inputs to the AND circuit 577a are positive when a half word is addressed and the address is even. Therefore the output of the AND circuit 577a is positive when an even half word is addressed and passes via line 579a, the OR circuit 580a and the cathode follower 581a and to line F/E HALF. It follows then that line F/E HALF is positive when a full word or even half word is addressed. The output signals shown in FIG. 5c are utilized in the Execution Timer and Mixing Circuits, as described below.

Refer now to FIGS. 5ak and 5ar which show the circuits for developing the GO TO EX/RGN and GO TO EX signals. During the first Instruction cycle following an interruption, the EXT CYCLE trigger 303e, in FIG. 3f, is turned on causing a negative signal to be produced on the NO EXT CYC line. This negative signal is effective to decondition both AND circuits 577d and 525e and thereby block production of the GO TO EX/RGN and GO TO EX signals which are necessary for terminating the Instruction Cycle of the Cycle Timer. Consequently, at the end of the first Instruction cycle after an interruption occurs, the Cycle Timer does not step to an execute or execute/regenerate cycle but instead a second Instruction cycle is performed. During this second Instruction cycle, the Instruction at the Address designated by the Interrupt Adder is read out of Memory and via the Memory Register is stored in the Instruction Register. Also, during the second Instruction cycle, the EXT CYCLE trigger 303e is reset causing a positive signal to be applied to the NO EXT CYC line which at the end of the cycle permits either the GO TO EX/RGN or GO TO EX signal to be produced allowing the new Instruction to be executed.

*Transfer*

Refer now to FIG. 6c which shows the Timing Diagram for a Transfer operation. The function of the Transfer Instruction is to enable the machine to deviate from the normal operation of executing Instructions at sequentially numbered Address locations. Thus, the Transfer Instruction allows the machine to transfer and perform the instruction at the Address designated by the Address part of the Instruction. Consequently, at the end of execution of the Transfer Instruction, that is, at the end of Operation the normal stepping of the Instruction Counter is suppressed and instead the Instruction Counter is set with the Address portion of the Transfer Instruction held by the Instruction Register.

Thus, during Instruction time a half word Instruction is read out of Memory, via Memory Buses S and 1 through 17 if it is an even half word or via Memory Buses 18 through 35 if it is an odd half word to the Memory Register positions S and 1 through 17. The signal which gates the half word Instruction read from Memory via the Memory Buses to the Memory Register, occurs at I9 (D1) time. Thereafter, at I10 (D1) time, the half word Instruction in the Memory Register is shifted to the Instruction Register which is comprised of a Sign trigger, an Operation Register, an Address Register and an Address Counter. These two signals, at I9 (D1) and I10 (D1) times, for gating a half word Instruction from Memory Buses to the Memory Register and from the Memory Register to the Instruction Register, occur during every Instruction cycle. The Operation Decoder then decodes the sign and operation part of the Instruction and determines that the operation is a Transfer operation. Consequently, at "11" time of the Instruction Cycle a GO TO EX/RGN signal is emitted causing the cycle Timer to go into Execute/Regenerate time. This signal occurs whenever the particular Instruction read from Memory requires an Execute/Regenerate cycle as does a Transfer Instruction.

At "7" time, of the Execute/Regenerate cycle, the Instruction Counter is reset, as described above, as line RESET INST CTR goes positive for three microseconds. Thereafter, at "10" time of the Execute/Regenerate cycle, a one microsecond signal occurs on the SET INST CTR TO INST REG line which causes the holding of the Address Register and Address Counter portions of the Instruction Register to be transferred to the Instruction Counter, as described above, so that the next Instruction will be read from this Address now standing in the Instruction Counter. At 10 time of the Execute/Regenerate cycle, an End of Operation signal is also produced; this particular signal being an E/R10 (D2) pulse. This End of Operation pulse feeds to the Cycle Timer described above to cause the machine to go into either Regenerate time or into the next Instruction time. The End of Operation pulse is normally used to generate a signal to step the Instruction Counter one count, however, during a Transfer operation, this stepping of the Instruction Counter by one count is suppressed inasmuch as the Address for the next Instruction is already standing in the Instruction Counter.

Refer now to FIG. 5z and in particular to AND circuits 551c and 556c. If the Instruction addressed by the Instruction Counter is stored at an even half word address, then the line F/E HALF conditions one input of the AND circuit 551c. The I9 (D1) signal is passed through the conditioned AND circuit 551c and via an OR circuit 552c, an amplifier 553c and a cathode follower 554c to drive the MEM BUS (S to 17) to MR (S to 17) positive. A positive signal on the latter line will, as described below, connect Memory Buses S and 1 through 17 to Memory Register positions S and 1 through 17. If, however, the particular Instruction addressed by the Instruction Counter via the Deflection Register is stored at an odd half word address, the AND circuit 556c is conditioned by a positive signal on the line ODD HALF. The I9 (D1) signal then is passed via the conditioned AND circuit 556c and via an OR circuit 557c, an amplifier 558c and a cathode follower 559c to drive the line MEM BUS (18 to 35) to MR, (S to 17) positive. A positive signal on the latter line, will, as described below, connect Memory Buses 18 through 35, to the Memory Register positions, S and 1 through 17 respectively.

The setting of the Instruction Register to the holding of the Memory Register occurs at I10 (D1) time during every Instruction cycle, and is independent of the type operation called for by the Instruction. The development of this signal was described above, during the explanation of the circuits of the Instruction Register.

The GO TO EX/RGN signal occurring at I11 (D1) time, as required in a Transfer operation, is developed by the circuits shown on FIG. 5ak. When the operation is Transfer, the output of the Operation Decoder (FIGS. 4i and 4j) described above, drives the line TR feeding to the OR circuit 575d positive. The positive output of the OR circuit 575d, via line 576d, and the positive signal on the NO EXT CYC line, if no interruption has occurred, condition the AND circuit 577d and an I11 (D1) signal passes via the conditioned AND circuit, line 578d, an OR circuit 583d, an amplifier 584d, and a cathode follower 585d, to the line GO TO EX/RGN. This GO TO EX/RGN signal is fed to the Cycle Timer (FIGS. 3c and 3d) described above, to cause the machine to go into an Execute/Regenerate cycle.

The signal to reset the Instruction Counter is developed by the circuitry of FIG. 5ba where if the operation is Transfer, the output of the Operation Decoder, as explained above, drives the line TR positive. This positive signal on the line TR, via an OR circuit, 582e and 583e, conditions one input of an AND circuit 584e.

During Execute/Regenerate cycles, the line EX/RGN time is positive to condition one input of an AND circuit 502g. While the AND circuit 502g is conditioned, positive signals on lines A7 (D1), A8 (D1) and A9 (D1) pass via an OR circuit 501g and the AND circuit 502g to line E/R7 (D3). It follows that the signal on the latter line is a three microsecond positive signal occurring at 7 time of every Execute/Regenerate cycle. Since AND circuit 584e is conditioned, the E/R7 (D3) signal is passed therethrough and via an amplifier 586e and a cathode follower 588e to the line R INST CTR. The output of the OR circuit 582e, via line 583e, also conditions an AND circuit 585e so that an E/R10 (D1) signal passes via the AND circuit 585e, an amplifier 587e and a cathode follower 589e to the line SET INST CTR TO INST REG. A positive signal on the latter line, as explained above, causes the Instruction Counter to be set to the holding of the Address Register and Address Counter portion of the Instruction Register.

Referring to FIG. 5af, the End of Operation signal is developed as the line TR is positive and via an OR circuit 520d and line 521d conditions an AND circuit 522d. As the AND circuit 522d is conditioned, an E/R10 (D2) signal passes through the AND circuit 522d and via line 523d, an OR circuit 528d, an amplifier 529d, a cathode follower 530d to a line END OP. This End of Operation signals feeds to the Cycle Timer (FIGS. 3c and 3d) described above, and also feeds to an AND circuit 568d of FIG. 5aj. Normally, the End of Operation signal passes via the AND circuit 568d, an amplifier 569d and a cathode follower 570d to drive the line STEP INST CTR and thereby cause the Instruction Counter (FIG. 4d) to be stepped one count. However, on certain operations, one of which is Transfer, the Instruction Counter is not stepped. Thus, a positive signal on the line TR feeds via an OR circuit 564d, an inverter 565d and a cathode follower 566d to cause line 567d to go negative and thereby remove a conditioning potential from the AND circuit 568d. Therefore, on Transfer operations the STEP INST CTR signal is suppressed to prohibit stepping of the Instruction Counter.

*Stop and Transfer*

Refer now to FIG. 6d, which shows a timing Diagram for the Stop and Transfer operation. The function of the Stop and Transfer Instruction is similar to that of a Transfer Instruction except that the machine stops at the end of Instruction time and is sent into Regenerate cycles until such time as it is re-started. When the machine is re-started, the stop condition is removed and the machine proceeds to an Execute/Regenerate cycle to Transfer to the address designated by the Instruction. Thus, during Instruction time, an I9 (D1) signal is developed for gating a half words Instruction from Memory Buses S and 1 to 17 if an even half word is designated or from Memory Buses 18 to 35 if an odd half word is designated, to the Memory Register positions S and 1 to 17. An I10 (D1) signal is developed for setting the Instruction Register to the holding of the Memory Register. The circuits for developing the I9 (D1) and I10 (D1) signals are the same as those described above, during an explanation of the Transfer operation. Since these I9 (D1) and I10 (D1) signals are developed by the exact same circuits during Instruction time of all operations to avoid repetition of explanation of the same circuitry, during a description of various other operations, it will be understood that these Timing signals are developed.

At I11 (D1) time, under control of a Stop and Transfer

49 instruction, a Regenerate signal will occur and also a GO TO EX/RGN signal is emitted. The significance of these two separate signals which are produced at I11 (D1) time is as follows: The Stop and Transfer operation causes the machine to stop and therefore the machine is sent into regeneration in order to preserve the information stored in Memory. At 11 time a signal is emitted during every Character Cycle that the machine is in a Stop Condition, and as described above, in the explanation of the Cycle Timer (FIGS. 3c and 3d), this signal causes the machine to go into regeneration and remain in regeneration until the stop condition is removed. The GO TO EX/RGN signal is also fed to the Cycle Timer, but the regeneration always predominates externally. The output of the E/R trigger 303c (FIG. 3d) of the Cycle Timer is suppressed. Therefore, the machine is actually in an E'/R' time internally and stays in that time until the Regeneration trigger 314c of the Cycle Timer is reset, as described above. Therefore, the machine completes the Instruction cycle and effectively stops. The machine remains stopped and in regeneration until a start button (not shown) is energized to remove the stop condition. At this time, the regenerate trigger of the Cycle Timer is turned off, and the machine goes into Execute/Regenerate cycles since the Execute/Regenerate trigger of the Cycle Timer is on.

The regenerate signal, occurring at 11 time of the cycle, is generated as a Master Stop trigger (not shown) is shifted to an on condition to thereby condition an AND circuit which passes an A11 (D1) pulse to produce the one microsecond 11 time signal while the machine is stopped. The GO TO EX/RGN signal is developed by circuits of FIG. 5ak during a Stop and Transfer Instruction, as the line STOP goes positive and via an OR circuit 575d and line 576d in combination with the positive signal on the NO EXT CYC line, if no interruption has occurred, condition an AND circuit 577d. The AND circuit 577d being conditioned passes an A11 (D1) signal, via line 578d, an OR circuit 583d, an amplifier 584d, a cathode follower 585d to the line GO TO EX/RGN. However, as stated above, the regenerate condition predominates, until the Master Stop trigger is turned off whereby the machine proceeds into an Execute/Regenerate cycle.

Referring to FIG. 5ba, the positive signal present on the line STOP feeds via an OR circuit 582e and line 583e to condition AND circuit 584e and 585e. The AND circuit 585e while conditioned, passes an E/R7 (D3) signal via an amplifier 586e and a cathode follower 588e to the line R INST CTR and thereby causes a resetting of the Instruction Counter (FIG. 4d). Thereafter, an E/R10 (D1) signal is passed through the conditioned AND circuit 585e and via an amplifier 587e and a cathode follower 589e to the SET INST CTR TO INST REG line. The signal on the latter line causes the Instruction Counter, as explained above, to be set to the holding of the Address part of the Instruction Register.

The End of Operation signal is developed by the circuits shown in FIG. 5af as the STOP line goes positive, and via an OR circuit 520d and line 521d conditions an AND circuit 522d. The E/R10 (D2) signal is passed via the conditioned AND circuit 522d, line 523d, OR circuit 528d, amplifier 529d and a cathode follower 530d to the END OP line. The End of Operation signal feeding to the Cycle Timer sends the machine into Regeneration or into an Instruction cycle, if regeneration is not required. The End of Operation signal also feeds to the AND circuit 568d of FIG. 5aj, but is prevented from passing through this AND circuit in order to allow stepping of the Instruction Counter as a positive signal on line STOP feeds via an OR circuit 564d, an amplifier 565d, and a cathode follower 566d, to cause the line 567d to go negative. Therefore, it is seen that as Master Stop trigger is turned off, during a stop operation, the machine will enter an Execute/Regenerate cycle to develop signals for resetting the Instruction Counter, for setting Instruction Counter to the holding of the Instruction Register and for ending the operation.

50

*Transfer on Zero*

Refer now to FIG. 6e which shows the Timing Diagram for a Transfer on Zero operation. During Instruction time, the signal for gating the even or odd word Instruction from Memory, via the Memory Buses to the Memory Register occurs at I9 (D1) time, and the signal for dumping the holding of the Memory Register into the Instruction Register occurs at I10 (D1) time, both being generated as described above. The Operation Decoder then decodes the sign and operation part of the Instruction and determines that the operation is a Transfer On Zero operation. Consequently, at "11" time of the Instruction cycle a GO TO EX/RGN signal is emitted causing the cycle timer to go into Execute/Regenerate time. The GO TO EX/RGN signal is developed by the circuits of FIG. 5k as line TR (0) goes positive and via the OR circuit 575d and line 576d in combination with the positive signal on the NO EXT CYC line, if no interruption has occurred, conditions the AND circuit 577d. The conditioned AND circuit 577d passes an I11 (D1) signal via line 578d, the OR circuit 583d, the amplifier 584d, and the cathode follower 585d to drive the line GO TO EX/RGN. As the machine enters the Execute/Regenerate cycle, and reaches "1" time of the cycle, an E/R1 (D4) signal is emitted, to pass the holding of the Accumulator Register in complement form into the Adder and to add a carry into the Adder position 35. If at this time, the Accumulator Register contains a quantity of zero, each position is represented as holding a binary 1. If then a carry of binary 1 is added into this quantity carries are propogated and an End of Carry occurs from the Adder position Q. If this End Carry results, it is an indication that the Accumulator Register has a holding of zero. Conversely, if an End Carry does not occur from the Adder position Q it is an indication that the Accumulator Register had contained something other than zero. If an End Carry occurs, the Transfer is to be effected. Therefore, if an End Carry occurs, an E/R7 (D3) signal is produced to reset the Instruction Counter, and an E/R10 (D1) signal is produced to set the Instruction Counter to the holding of the Instruction Register. If no End Carry occurs, these signals are not developed and no Transfer takes place, but instead the Instruction Counter is stepped by an E/R10 (D2) pulse. In either event, that is, whether there is Transfer or not, an End of Operation signal is developed at E/R10 (D2) time.

These signals are developed as follows: Referring to the FIG. 5ac, a positive signal on the line TR0 feeds via an OR circuit 580c and line 581c to condition an AND circuit 582c. The AND circuit 582c, when conditioned, allows the E/R1 (D4) signal to pass via line 583c, an OR circuit 588c, an amplifier 589c, and cathode follower 590c, to the line ACC COMP TO ADDER. This signal, as described below, will cause the complement of the value in the Accumulator Register to be fed into the Adder positions Q, P and 1 through 35.

Referring to FIG. 5ap, the positive signal on the line TR (0) feeds via an OR circuit 501e and line 502e to condition the AND circuit 502e. The E/R1 (D4) signal then passes via the conditioned AND circuit 503e, line 504e, an OR circuit 509e, an amplifier 510e and a cathode follower 511e, to the line CARRY ADDER (35). The signal on the latter line coincident with a signal for causing a complement of the value in the Accumulator Register to be passed to the Adder adds a carry to the 35th position of the value.

Refer now to FIG. 5f, which is the execution Timer for a Transfer on Zero operation. If the operation is Transfer on Zero and an End Carry occurs from the "Q" position of the Adder, then lines TR (0) and QC feeding to an AND circuit 505b are positive. Upon coincidence of two positive inputs, the output of the AND circuit 505b via the cathode follower 506b drives line TR (0) C positive, thereby signalling that the operation is Transfer on Zero and an End Carry did occur. A positive signal on the latter line feeds to the OR circuit 582e of FIG. 5ba, whose output via line 583e conditions the AND circuits 584e and 585e. An E/R7 (D3) signal passes through the conditioned AND circuit 584e and via the amplifier 586e and the cathode follower 588e to the line R INST CTR. Thereafter E/R10 (D1) signal passes via the conditioned AND circuit 585e, the amplifier 587e and the cathode follower 589e to the line SET INST CTR TO INST REG. It should be noted, however, that the latter two signals are emitted only upon the condition that an End Carry occurred due to the arithmetic operation of complementing the Accumulator Register and adding 1 to the least significant, i.e., the 35th position. The latter two signals upon being generated are effective, as mentioned above, to reset the Instruction Counter and then to set the Instruction Counter to the holding of the Address portion of the Instruction Register.

Referring now to FIG. 5af, during a Transfer on Zero operation, the line TR (0) is positive and via an OR circuit 520d and line 521d conditions an AND circuit 522d. The AND circuit 522d, being conditioned passes an E/R10 (D2) signal via line 523d, an OR circuit 528d, an amplifier 529d and a cathode follower 530d to the line END OP and thereby signal End of Operation. This End of Operation signal feeds to the AND circuit 568b of FIG. 5aj to develop a Step Instruction Counter signal, unless of course, an END Carry had resulted to cause a Transfer. In the latter event, the line TR (0) C is positive to signify the operation is Transfer on Zero and an End Carry had occurred. The positive signal on the TR (0) C line, via an OR circuit 564d an inverter 565d and a cathode follower 566d, causes line 567d to go negative and thereby block the End of Operation signal from passing through the AND circuit 568d to develop a signal for stepping the Instruction Counter. As indicated on the Timing Diagram, FIG. 6e, and, as explained above, the signal for stepping the Instruction Counter is conditional upon no End Carry. Therefore, it is seen that signals are developed during a Transfer on Zero operation to gate a half word Instruction from Memory via the Memory Buses to the Memory Register. The half word Instruction then held by the Memory Register is dumped into the Instruction Register and an Execute/Regenerate cycle is called for and entered. During the Execute/Regenerate cycle, the complement of the value of the Accumulator Register is passed through the Adder and a one is added to the adder position 35. As a result of this operation, if the value in the Accumulator Register was zero, an End Carry results. If an End Carry results, a Transfer is effected by resetting the Instruction Counter and then setting the Instruction Counter to the holding of the Instruction Register. Thereafter, an End of Operation is signalled. If the Transfer was not effected, due to the fact that the value in the Accumulator Register was not zero, the Instruction Counter is stepped one count and the next Instruction is taken from the Address standing in the Instruction Counter which is the next sequential Address in memory.

*Transfer on Overflow*

Refer now to FIG. 6f, which shows a Timing Diagram for a Transfer on Overflow operation. This Instruction is similar to a regular Transfer Instruction except that the transfer is conditioned upon the Overflow trigger being on. The Overflow trigger may be turned on by a variety of conditions, one, for example, being when the 1 order of the Accumulator Register contains a binary 1 and a shift left Instruction occurs. Thus, during Instruction time, signals are developed to gate a half word Instruction from Memory via the Memory Buses to the Memory Register and thereafter from the Memory Register to the Instruction Register. Following this, a GO TO EX/RGN signal is emitted to send the machine into an Execute/Regenerate cycle. If, and only if, the Overflow trigger is on an E/R7 (D1) signal is produced causing the Instruction Counter to be reset. Thereafter, an E/R10 (D1) signal is emitted to cause the Instruction Counter to be set to the holding of the Instruction Register. However, if the Overflow trigger had been off, a Transfer is not desired, and, therefore, the program proceeds by stepping the Instruction Counter by one to the next sequential Address. An End of Operation signal is emitted at E/R10 (D2) time whether or not a Transfer is effected. While the End of Operation signal is being emitted, an E/R11 (D1) signal is generated on line R OV TR to cause the Overflow trigger to be reset off if it had been turned on.

The I9 (D1) and I10 (D1) signals for gating a half word Instruction from the Memory Buses to the Memory Register, and from the Memory Register to the Instruction Register, are developed by the circuits described above. The GO TO EX/RGN signal is developed by the circuits of FIG. 5ak as a positive signal on the line TR (OV) feeds via the OR circuit 575b, and line 576d in combination with the positive signal on the NO EXT CYC line, if no interruption has occurred, to condition the AND circuit 577d. An I11 (D1) signal passes via the conditioned AND circuit 578d, the OR circuit 583d, the amplifier 584d and the cathode follower 585e to the line GO TO EX/RGN.

As mentioned above, the signals for resetting the Instruction Counter, and for setting the latter to the holding of the Instruction Register to effect a Transfer, are dependent upon whether or not an overflow had occurred. Referring to FIG. 5d, if the operation is Transfer on Overflow, the line TR OV is positive and conditions one input of the AND circuit 501b. If the Overflow trigger is on, signifying an overflow has occurred (see FIG. 5a), the line OV TRIG ON is positive, and therefore, with both inputs positive, the output of the AND circuit 501b, via the cathode follower 502b, causes the line TR (OV) OV to go positive. The signal on the latter line, when positive, feeds through the OR circuit 582e, of FIG. 5ba, and via line 583e to condition the AND circuit 584e and 585e. The AND circuit 584e being conditioned, passes an E/R7 (D3) signal via the amplifier 586e, and the cathode follower 588e, to the line R INST CTR. Thereafter, an E/R10 (D1) passes through the conditioned AND circuit 585e, the amplifier 587e and the cathode follower 589e to the line SET INST CTR TO INST REG. The E/R7 (D3) and E/R10 (D1) signals are gated only if an Overflow has occurred and are effective to cause a Transfer.

During the Transfer on Overflow operation, an End of Operation signal is generated as the line TR OV is positive and feeds to the OR circuit 520d of FIG. 5af. The output of the OR circuit 520d via line 521d conditions the AND circuit 522d. The conditioned AND circuit 522d, passes an E/R10 (D2) signal via line 523d, the OR circuit 528d, the amplifier 529d, and the cathode follower 530d to the line END OP. This End of Operation signal, of course, feeds the Cycle Timer and causes the machine to go either into regeneration or into the next Instruction cycle. The End of Operation signal also feeds to the AND circuit 568d and unless an overflow condition exists, this signal passes via AND circuit 568d, the amplifier 569d, and the cathode follower 570d to develop a signal on the line STEP INST CHT. However, if the Overflow condition did exist the line TR (OV) OV is positive and via the OR circuit 564d, the inverter 565d and the cathode follower 566d drives line 567d negative. While line 567d is negative the End of Operation signal is prevented from passing through the AND circuit 568d.

During a Transfer on Overflow operation, the line TR OV is positive and conditions an AND circuit 596e of FIG. 5bd. An E/R11 (D1) signal passes through the conditioned AND circuit 596d, an amplifier 597d and a cathode follower 598d to the line R OV TR. This E/R11 (D1) signal on line R OV TR causes a resetting of the Overflow Trigger provided, of course, the Overflow Trigger was on. If the Overflow trigger was off, this signal was still emited, but, the overflow trigger merely remains off (See FIG. 5a).

Thus, signals are developed during a Transfer of Overflow operation to gate a half word Instruction from the Memory Buses into the Memory Register and from the Memory Register into the Instruction Register. The machine is then sent into an Execute/Regenerate cycle and during this cycle, if an overflow has occurred, the Transfer is effected by resetting the Instruction Counter, and then setting the Instruction Counter to the holding of the Instruction Register. An End of Operation is then signalled, and the Overflow trigger is reset. However, if the Overflow trigger was not on, the transfer is not effected but the Instruction Counter is stepped one Count.

*Transfer on Plus*

Refer now to FIG. 6g, which shows the Timing Diagram for a Transfer on Plus operation. This Instruction is also similar to a regular Transfer Instruction except that the transfer is conditional upon the Accumulator Register sign being plus. If the Accumulator Register sign is positive, a transfer is effected, but if the Accumulator Register sign is negative, the Instruction Counter is stepped by one as in its normal operation. Thus, during Instruction time, the I9 (D1) and I10 (D1) signals occur, for gating a half word Instruction from Memory Buses to the Memory Register and for dumping the holding of the Memory Register into the Instruction Register, respectively. Following this, an I11 (D1) signal is emitted to send the machine into an Execute/Regenerate cycle. During this Execute-Regenerate cycle, if the Accumulator Register Sign is positive, the Instruction Counter is reset by an E/R7 (D3) pulse and later an E/R10 (D1) pulse causes the Instruction Counter to be set to the holding of the Address portion of the Instruction Register. However, if the Accumulator Register sign is negative, the Transfer is not effected, but a signal is emitted to step the Instruction Counter. The End of Operation pulse is generated in either event, that is, if the Accumulator Register sign is positive or negative. The signals for gating a half word Instruction to the Memory Register, occuring at line I9 (D1) time, and for gating the half word Instruction from the Memory Register to the Instruction Register, occurring at I10 (D1) time, are generated by the circuits described above.

Referring to FIG. 5ak, if the operation is Transfer on Plus, the positive signal on line TR (+) passes via an OR circuit 575d and line 576d in combination with the positive signal on the NO EXT CYC line, if no interruption has occurred, to condition an AND circuit 577d. Therefore, the I11 (D1) signal passes via the conditioned AND circuit 579d, line 578d, the OR circuit 583d, the amplifier 584d and the cathode follower 585d to the GO TO EX/RGN line.

Referring to Transfer on Plus Execution Timer of FIG. 5e, if the operation is Transfer on Plus, the line TR (+) is positive to condition the AND circuit 503b. If the Sign of the Accumulator Register is positive the line ACC (+) is positive (see FIG. 5c). If both inputs to the AND circuit 503b are positive, its output feeds via the cathode follower 504b to drive the line TR (+) A (+) positive; a positive signal on the latter line indicating that the operation is Transfer on Plus, and that the Accumulator Register Sign is positive. A positive signal on the line TR (+) A (+) passes via the OR circuit 582e of FIG. 5ba, and the line 583e to condition the AND circuits 584e and 585e. Since the AND circuit 584e is conditioned, an E/R7 (D3) signal is passed therethrough and via the amplifier 586e, and a cathode follower 588e to the line R INST CTR. Thereafter, the E/R10 (D1) signal passes via the conditioned AND circuit 585e, the amplifier 587e and the cathode follower 589e to the line SET INST CTR TO INST REG. The resetting of the Instruction Counter and thereafter setting it to the holding of the Address portion of the Instruction Register causes a Transfer operation, and as indicated, this transfer is conditioned upon the Sign of the Accumulator Register being positive. The End of Operation signal is developed by the circuits of FIG. 5af, during a Transfer on Plus operation, as the line TR (+) goes positive and via the OR circuit 520d and line 521d conditions the AND circuit 522d, an E/R10 (D2) signal is passed through the conditioned AND circuit 522d and via line 523d the OR circuit 528d, the amplifier 529d and the cathode follower 530d to the line END OP. The signal on the latter line feeds to the cycle timer as described above, to send the machine into either Regeneration or to the next Instruction cycle and also to the AND circuit 568d of FIG. 5aj. The End of Operation signal passes through AND circuit 568d, provided the Accumulator Register Sign is negative, and via the amplifier 569d and the cathode follower 570d to the line STEP INST CTR. However, if the Accumulator Register Sign has been positive and the Transfer effected, the line TR (+) A (+) is positive and via the OR circuit 564d, an inverter 565d and a cathode follower 566d causes line 567d to go negative and remove conditioning from the AND circuit 568d and thereby prevent the End of Operation signal from passing through to generate a signal to allow the Instruction Counter to be stepped. Thus, it is seen that signals are generated during a Transfer on Plus operation, to gate a half word Instruction, calling for a Transfer on Plus operation, from the Memory Buses into the Memory Register and then from the Memory Register into Instruction Register. At "11" time of Instruction cycle a signal is emitted to send the machine into an Execute/Regenerate cycle. At "7" time of the Execute/Regenerate cycle, provided the Accumulator Register Sign is positive, the Instruction Counter is reset and at "10" time the Instruction Counter is set to the holding of the Instruction Register. At "10" time of the cycle, the End of Operation signal is also emitted and if the Accumulator Register Sign was negative, the Instruction Counter is stepped one count.

*Load MQ*

Refer now to FIG. 6h which is the Timing Diagram for the LOAD MQ REGISTER operation. At I9 (D1) time, the signal is emitted to gate a half word Instruction from the Memory Buses to the Memory Register. Thereafter, at I10 (D1) time, the signal is emitted to gate the half word Instruction from the Memory Register to the Instruction Register and at I11 (D1) time, a GO TO EX Signal is emitted to send the machine into an Execution cyle. As explained in the application of Fox et al., during an Execute cycle, Memory is either read into or out of. In this instance it is read out of and at E9 (D1) time, a signal is emitted to gate the word at the selected address, into the Memory Register. Thereafter at E11 (D1) time, a signal is emitted to gate the information in the Memory Register into the MQ Register. At E10 time, a two microsecond signal is emitted to indicate an End of Operation and step the Instruction Counter.

The signal for gating a half word Instruction from Memory Buses to the Memory Register and for gating the holding of the Memory Register into the Instruction Register, are generated by the circuits described above. The Operation Decoder then decodes the operation part of the Instruction and determines that the operation is a LOAD MQ operation. Consequently, at "11" time of the Instruction cycle a GO TO EX signal is emitted causing the cycle timer to go into Execute time. The GO TO EX signal is generated by the circuits of FIG. 5ar, during a Load MQ operation as the line LOAD MQ goes positive and via or OR circuit 523e and line 524e in combination with the positive signal on the NO EXT CYC line, if no interruption has occurred, condition the AND circuit 525e. The AND circuit 525e, while conditioned, passes the I11 (D1) signal via an amplifier 526e and a cathode follower 527e to the line GO TO EX. This signal feeds to the Cycle Timer, described above, to send the machine to an Execute cycle. It should be remembered that during this Execute cycle, information is read from Memory. The Load MQ instruction may address a full word, an even half word or an odd half word and thus a full or half word may be read into the Memory Register. In any event, during a Load MQ register operation, the line LOAD MQ is positive and feeds to one input of an OR circuit 566c of FIG. 5z. The output of the OR circuit 556c via a cathode follower 567c drives the line 568c positive. The line 568c while positive conditions AND circuits 550c, 555c, 560c and 563c. Assuming that a full word is addressed as part of the Load MQ Instruction, a second input to the AND circuit 550c is positive, as the line F/E HALF (signifying a full or even half address word) goes positive. Since two inputs to the AND circuits 550c are conditioned positive, an E9 (D1) signal passes via this conditioned AND circuit, an OR circuit 552c, an amplifier 553c, and a cathode follower 554c to the line MEM BUS (S TO 17) TO MR (S TO 17). The signal on the latter line is effective to gate information from Memory Buses S and 1 to 17 to the Memory Register positions S and 1 to 17. At the same time, a second input of the AND circuit 560c is conditioned by a positive signal on the line FULL (signifying a full word address). Therefore, while the two inputs are conditioned positive, the AND circuit 550c passes the E9 (D1) signal via an amplifier 561c and a cathode follower 562c to the line MEM BUS (18 to 35) TO MR (18 to 35). A positive signal on the latter line gates information from the Memory Buses 18 through 35 to the Memory Register positions 18 through 35. Thus, by the combination of positive signals on lines MEM BUS (S TO 17) TO MR (S TO 17) and MEM BUS (18 to 35) TO MR (18 to 35) a full word read from Memory to the Memory Buses S and 1 to 35 inclusive is gated to the Memory Register positions S and 1 to 35 respectively.

If a half word address is selected, it is necessary to clear the right half of the Memory Register, that is positions 18 through 35. Therefore, as a half word address is selected a signal on line HALF conditions a second input of the AND circuit 563c. The conditioned AND circuit 563c passes an E9 (D1) signal via an amplifier 564c and a cathode follower 565c to the line CLEAR MR (18 to 35). The latter line going positive clears or erases, as explained below, the holdings of Memory Register positions 18 to 35. If this CLEAR MR (18 to 35) signals were not given, the Memory Register positions 18 to 35 would retain the data previously stored in those positions.

If the half word selected is stored at an even half word address, the signals which condition the AND circuit 550c, as described above, are present, since the line F/E HALF is positive, when full or even half words are addressed, and an E9 (D1) signal will occur on line MEM BUS (S to 17) TO MR (S to 17). However, if the selected half word is stored at an odd address, then a second input to the AND circuit 555c via the line ODD HALF is positive. An E9 (D1) signal then passes through the conditioned AND circuit 555c and via the OR circuit 557c, the amplifier 558c and the cathode follower 559c to the line MEM BUS (18 to 35) TO MR (S to 17). As the latter line goes positive, information being read out of Memory from Memory positions 18 to 35 to the Memory Buses 18 to 35 is gated to the Memory Register positions S and 1 to 17. This signal on line MEM BUS (18 to 35) TO MR (S to 17) in combination with the signal on line CLEAR MR (18 to 35) is effective to store a half word read from an odd half word address in Memory into Memory Register positions S and 1 to 17, while Memory Register positions 18 to 35 are all reset to represent zeros.

During a Load MQ operation, the line LOAD MQ is positive and conditions one input to the AND circuit 547e, of FIG. 5au, to thereby gate an E11 (D1) signal via that AND circuit, an amplifier 548e and a cathode follower 549e to the line MR TO MQ. A positive signal on the latter line, as explained below, gates the holding of the Memory Register into the MQ Register. The End of Operation signal ending a Load MQ operation is developed as the line LOAD MQ is positive and feeds via an OR circuit 524d, of FIG. 5af, and line 525d to condition one input of an AND circuit 526d. While AND circuit 526d is conditioned, the E10 (D2) signal passes through this conditioned AND circuit via line 527d, the OR circuit 528d, the amplifier 529d and the cathode follower 530d to the line END OP, and thereby signal an End of Operation. This signal on the line END OP, passes through the normally conditioned AND circuit 568d, of FIG. 5aj, and via the amplifier 569d and the cathode follower 570d to the line STEP INST CTR and thereby causes the Instruction Counter to be stepped one count.

*No Operation*

Refer to FIG. 6i, which is the Timing Diagram for a No operation. During the Instruction cycle preceding the operation, a half word Instruction selecting No operation Instruction is read out from Memory to the Memory Buses and is gated into the Memory Register by a I9 (D1) signal. Thereafter, at I0 time of the cycle, the Instruction is gated from the Memory Register into the Instruction Register and at I1 time of the cycle, a signal is emitted to send the machine into an Executive/Regenerate cycle. During this Executive/Regenerate cycle nothing takes place until at E/R 10 (D2) time an End of Operation signal is emitted and also a signal to allow stepping of the Instruction Counter. The signals ocurring at I9 (D1) time and I10 (D1) time, for gating information from Memory Buses to the Memory Register and from the Memory Register to the Instruction Register, are generated by the circuits described above. The GO TO EX/RGN signal is generated during No operation, as the line NO OP goes positive and via the OR circuit 575d, of FIG. 5ak, drives the 576d positive. Line 576d, when positive in combination with the positive signal on the NO EXT CYC line, if no interruption has occurred, conditions the AND circuit 577d and therefore an I11 (D1) signal is passed via the line 578d, the OR circuit 583d, the amplifier 584d and the cathode follower 585d to the line GO TO EX/RGN.

Referring to FIG. 5af, the positive signal on line NO OP also passes via the OR circuit 520d and line 521d to condition the AND circuit 522d. The conditioned AND circuit 522d passes the E/R 10 (D2) signal via line 523d, the OR circuit 528d, the amplifier 529d and the cathode follower 530d to the line END OP, thereby developing an End of Operation signal. A positive signal on the line END OP passes through the normally condition AND circuit 568d, of FIG. 5aj, and via the amplifier 569d and the cathode follower 570d to the line STEP INST CTR and thereby causes the Instruction Counter to be stepped one count.

*Round*

Refer now to FIG. 6j which is the Timing Diagram for a Roun operation. During Instruction time, an I9 (D1) signal gates the half word Instruction from the Memory Buses to the Memory Register. Thereafter, an I10 (D1) signal dumps the Instruction from the Memory Register into the Instruction Register, and an I11 (D1) signal sends the machine into an Executive/Regencrate cycle.

During the Executive/Regenerate cycle, an E/R1 (D4) signal is emitted to gate the value held by the Accumulator Register in true form to the Adder, and to connect the carry output from the 1 position of the Adder to the Overflow trigger so that latter is turned on if an overflow occurs. At the same time, provided the MQ register (1) position contains a binary 1, a carry is fed to the Adder position 35. An E/R4 (D1) signal is emitted to gate the output signals of the Adder into the Accumulator Register and E/R10 (D2) signals are emitted to indicate an End of Operation and also to Step the Instruction Counter.

The I9 (D1) and I10 (D1) signals which gate the half word Instruction from the Memory Buses to the Memory Register and from the Memory Register into the Instruction Register are generated by the circuits described above. Referring to FIG. 5ak, the GO TO EX/RGN signal is generated during a Round operation as the line ROUND goes positive and via the OR circuit 585d and line 576d in combination with the positive signal on the NO EXT CYC line, if no interruption has occurred, conditions the AND circuit 577d. The conditioned AND circuit 577d passes the I11 (D1) signal via line 578d, the OR circuit 583d, the amplifier 584d and the cathode follower 585d to the line GO TO EX/RGN.

Referring to FIG. 5ad, the line Round, which is positive during a Round operation, feeds via an OR circuit 501d and line 502d to condition the AND circuit 503d. The AND circuit 503d, being conditioned, passes the E/R1 (D4) via an amplifier 504d and a cathode follower 505d to the line ACC TRUE TO ADDER, and thereby cause the gating of the value in the Accumulator Register in true form to the Adder.

Referring to the Execution Timer of a Round operation FIG. 5g, an AND circuit 507d is conditioned by a positive signal on the line ROUND. If the MQ Register 1 position contains a binary 1, the line QM (1) is positive, and therefore, the output of the AND circuit 507b is positive, and via cathode follower 508b causes the line RO MQ (1) 1 to go positive. As the latter line goes positive, it feeds via an OR circuit 501e, of FIG. 5ap, to cause line 502e to go positive. Line 502e, when positive, conditions the AND circuit 503e to pass an E/R1 (D4) signal, via line 504e, an OR circuit 509e, an amplifier 510e and a cathode follower 511e to the line CARRY ADDER (35). A signal on the latter line, as explained below, causes a carry to be added into the adder position 35. It should be noted that this signal is generated only if the MQ Register 1 position contains a binary 1.

Referring to FIG. 5aq during the Round operation, the line ROUND going positive, passes via an OR circuit 516e and line 517e to condition one input of an AND circuit 518e. The second input to the AND circuit 518e is conditioned by a positive signal on the line ADDER (1) CARRY, which indicates a carry output from the Adder 1 order. Thus, when two inputs to the AND circuit 518e are conditioned, the E/R1 (D4) signal passes via the conditioned AND circuit 518e, the line 515e, an OR circuit 520e, an amplifier 521e and a cathode follower 522e to the line AD (1) C/ACC (1) OV. A positive signal on the latter line as explained above (see FIG. 5a) will cause the overflow trigger to be turned on. Thus, if the carry added to the Adder 35 order propagates so that a carry is emitted from the Adder 1 order, during a Round Operation, the Overflow trigger is turned on to indicate an Overflow has occurred.

The Adder outputs are gated to the Accumulator Register as a positive signal on the line ROUND passes via an OR circuit 506d, of FIG. 5ae, and line 507d to condition an AND circuit 508d. The AND circuit 508d while conditioned passes the E/R (D1) signal via line 509d, an OR circuit 514d, an amplifier 515d, and a cathode follower 516d to the line ADDER TO ACC.

The End of Operation signal is generated as a positive signal on line ROUND, feeds via an OR circuit 520d, FIG. 5af, and line 521d to condition the AND circuit 522d. While the AND circuit 522 is conditioned, an E/R10 (D2) signal passes via line 523d, an OR circuit 528d, an amplifier 529d, and a cathode follower 530d, to the line END OP. A positive signal on the line END OP. A positive signal on the line END OP passes through the normally conditioned AND circuit 568d of FIG. 5aj, and via the amplifier 569d and the cathode follower 570d to the line STEP INST CTR and thereby causes Instruction Counter to be stepped.

*Rules Governing Addition*

Before proceeding to a discussion of the ADD Timing Diagram, illustrated on FIG. 6k, a few of the rules for binary addition, as performed by this machine, will now be stated. During an ADD operation, the factors are added algebraically, so that if the Signs are unlike, the value stored in the Accumulator Register is complemented to a 1's complement and is added, in the Adder, to the true value of the number stored in the Memory Register. By such an addition of a complement number to a true number, subtraction is actually performed.

If, in this ADD operation, the Signs are unlike, and the 1's complement of the value stored in the Accumulator Register is added, in the Adder, to the true value of the number stored in the Memory Register, and an End Carry is produced, an "elusive 1" must be added in order that a correct result be obtained.

Thus the following rules for ADD may be stated:

*Rule 1.*—If the Accumulator Register and the Memory Register Signs are alike, add the Accumulator Register value, in True form, to the Memory Register True value.

*Rule 2.*—If the Accumulator Register and Memory Register Signs are unlike, add the 1's Complement of the Accumulator Register value, to the Memory Register True value.

*Rule 3.*—If the Accumulator Register and the Memory Register Signs are alike, the Accumulator Register Sign is left unchanged.

*Rule 4.*—If the Accumulator Register and the Memory Register Signs are unlike and a. If no End Carry results, it is an indication, that the value in the accumulator Register was the larger, and the sum, now in the Accumulator Register, is in complement form. Therefore, it is necessary to recomplement the present Accumulator Register factor and leave the Sign of the Accumulator Register unchanged.

b. If there is an End Carry, it is an indication that the value in the Memory Register was the larger, so that the sum, now in the Accumulator Register, is in True form, but an "elusive 1" must be added to the result and the Sign, of the Accumulator Register, must be changed.

*Add*

Refer now to FIG. 6k, which shows the Timing Diagram for an add operation. During Instruction time, an I9 (D1) signal gates a half word Instruction from the Memory Buses to the Memory Register; at I10 (D1) time, the Instruction, is gated from the Memory Register to the Instruction Register. The Operation Decoder determining that the operation is add causes, at I11 (D1) time, a GO TO EX signal to be emitted to send the machine into an Execution cycle. During the Execution cycle, an E9 (D1) signal gates either a full or a half word read from Memory via the Memory Buses into the Memory Register and at E11 (D1) time a GO TO EX/RGN signal sends the machine into an Execute/Regenerate cycle.

During the Execute/Regenerate cycle, an E/R1 (D4) pulse gates the holding of the Memory Register to the adder, and if the signs of the Memory Register and the Accumulator Register are alike, an E/R1 (D4) signal gates the holding of the Accumulator Register in true form to the Adder. However, if the Memory Register and Accumulator Register signs are unlike, the holding of the Accumulator Register is passed in complement form to the Adder. If the signs are alike, and as the addition takes place, a carry is emitted from the adder 1 order, this adder 1 carry is connected to the Overflow trigger circuit setting the trigger to an on condition (see FIG. 5a). If the signs are unlike and a carry is emitted from the Adder (Q) position under Rule 4b, an elusive one E/R1 (D4) carry signal is fed to the Adder 35 order. After allowing 3 microseconds, for propagation of carries, an E/R4 (D1) signal connects the Adder output to the Accumulator Register, thereby storing the sum of this first addition in the Accumulator Register. If the signs of the Accumultaor Register and the Memory Register are unlike and no End Carry resulted from the first addition, it is indicated by the End Carry trigger 503a (FIG. 5a) being off, then, under Rule 4a above the result in the Accumulator Register is in complement form. Therefore, it is necessary to recomplement the number so that the final value stored in the Accumulator Register is in true form. To produce this recomplement, an E/R7 (D2) signal is emitted to pass the holding of the Accumulator Register in complement form to the Adder, and an E/R8 (D1) signal gates the output of the Adder to the Accumulator Register.

At E/R10 (D1) time, the Accumulator Register Sign order is set positive or negative, as required by the algebraic rules of addition. Thus, if the signs of the Accumulator Register and the Memory Register are unlike and an End Carry resulted, the sign of the Accumulator Register is changed, as indicated by Rule 4b, above. Therefore, if the sign of the Accumulator Register is positive, a negative Sign must be stored in the Accumulator Register sign order, by a 1 microsecond signal, occurring at E/R10 time, labeled, as shown in FIG. 6k "(−) TO ACC (S)" whereby the sign is changed above by injecting a binary 1 directly into the sign order, a binary 1 indicating a Minus Sign. If the Accumulator Register sign is negative, under the same conditions, the signal emitted at E/R10 (D1) time, is labeled "(+) TO ACC (S)" as illustrated in FIG. 6k, which renders the line HOLD ACC (S) of FIG. 7e minus to thereby insert a binary 0, in the sign order of the Accumulator Register, which binary 0 is indicative of a positive sign.

Thus, it is seen that if the signs are unlike and if an End Carry did result, the Accumulator Register Sign is changed. At E/R10 (D2) time, the End of Operation signal is given, and the Instruction Counter is stepped one count.

The I9 (D1) and I10 (D1) signals for gating a half word Instruction from Memory Buses to the Memory Register, and from the Memory Register to the Instruction Register, are generated by the circuits described above (see FIG. 5z). Referring to FIG. 5ar, the GO TO EX signal is caused during an ADD operation, as the line ADD goes positive, and via the OR circuit 523e and line 524e in combination with the positive signal on the NO EXT CYC line, if no interruption has occurred, conditions the AND circuit 525e. While the AND circuit 525e is conditioned, the I11 (D1) signal passes through the AND circuit 525e and via the amplifier 526e and the cathode follower 527e to the line GO TO EX.

During the Execute cycle, a full or half word is gated from the Memory Buses to the Memory Register as the signal on line ADD goes positive, and via the OR circuit 566c of FIG. 5z, the cathode follower 567c, and line 568c to condition the AND circuits 550c, 555c, 560c and 563c. As described above, these AND circuits 550c, 555c, 560c and 563c are further conditioned by signals, dependent upon whether the selected address is a full word, an even half word or an odd half word. Thus, as described above, information is gated from the Memory Buses to the Memory Register and is caused by a combination of positive E9 (D1) signals on lines MEM BUS (S to 17) TO MR (S to 17), MEM BUS (18 to 35) to MR (S to 17), MEM BUS (18 to 35) TO MR (18 to 35) and CLEAR MR (18 to 35).

The E11 (D1) signal for sending the machine into an Execute/Regenerate cycle is developed as the line ADD goes positive, and via the OR circuit 579d, of FIG. 5ak, drives the line 580d positive to condition the AND circuit 581d. The AND circuit 581d, while conditioned, passes the E11 (D1) signal via line 582d, the OR circuit 583d, the amplifier 584d and a cathode follower 585d to the line GO TO EX RGN. Thus, it is seen that an Instruction calling for an add operation can be read out of Memory. The machines goes into an Execute cycle for the purpose of reading out the factor to be added algebraically to the value in the Accumulator Register. After the value is read out of Memory to the Memory Register, the machine goes into an Execute/Regenerate cycle, for the purpose of completing the actual addition.

Referring to FIG. 5k, which is the Add Execution Timer, a positive signal on the line ADD conditions one input of the AND circuits 533b, 535b, 537b, 539b and 541b. The second input to the AND circuit 533b is via line AMSA, which is positive, as described above, when the Accumulator Register and Memory Register Signs are alike. The output of the AND circuit 533b, passing via the cathode follower 534b to line ASA, is positive when the operation is Add, and the signs (Memory Register and Accumulator Register Signs) are alike. The AND circuit 535b receives its second signal via line AMSU, which as described above, is positive when the Accumulator Register and the Memory Register signs are unlike. Therefore, the output of the AND circuit 535b feeding via the cathode follower 536b to line ASU is positive, when the operation is ADD and the signs are unlike. The AND circuit 537b receives an input via the line AMSU and receives a third input via line NO QC which is positive when there was no End Carry, that is, a carry to the Q order of the adder. Thus, the output of the AND circuit 537b passes via the cathode follower 538b to line ASUNC which is positive when the operation is ADD, the signs are unlike and there has been no End Carry. The AND circuit 539b receives signals via line ADD, line AMSU, line QC (which indicates there has been an End Carry from the Q order) and from line ACC (−), which indicates that the Accumulator Register Sign is negative. The output of the AND circuit 539b, passing via a cathode follower 540b to line ASUC (−) is positive, when the operation is ADD, the signs are unlike, there has been an End Carry and the Accumulator Register Sign is negative. The AND circuit 541b receives inputs via lines ADD, AMSU, QC and ACC (+). The output of the AND circuit 541b feeding via the cathode follower 542b to line ASUC (+) is positive when the operation is ADD, the signs are unlike, an End Carry has occurred and Accumulator Register Sign is positive. The outputs of this Execution Timer are referred to as the description of the development of signals for the ADD operation proceeds.

During the operation Add, the positive signal on the line ADD passes via the OR circuit 575c, of FIG. 5ab, and line 576c to condition the AND circuit 577c. The AND circuit 577c, while conditioned, passes an E/R1 (D4) signal through the amplifier 578c and the cathode follower 579c to the line MR TO ADDER, the signal on the latter line thereby gating information from the Memory Register to the Adder.

Referring to FIG. 5ad, a positive signal on the line ASA, which signifies the operation is Add and the signs are alike, passes via an OR circuit 501d and line 502d to condition the AND circuit 503d. The AND circuit 503d, while conditioned, passes an E/R1 (D4) signal through the amplifier 504d and the cathode follower 505d to the line ACC TRUE TO ADDER, thereby gating the holding of the Accumulator Register in true form to the Adder.

Referring to FIG. 5ac, the signal on line ASU, which is positive when the operation is ADD and the signs are unlike, passes via an OR circuit 580c and line 581c to condition the AND circuit 582c. The AND circuit 582c, while conditioned, passes an E/R1 (D4) signal via line 583c, an OR circuit 588c, an amplifier 589c and a cathode follower 590c to the line ACC COMP TO ADDER. A positive signal on the latter line will transfer the holding of the Accumulator Register to the Adder in complement form.

Referring to FIG. 5aq, if the operation is Add and the signs are alike, the signal line ASA is positive and via an OR circuit 516e and line 517e conditions one input of the AND circuit 518e. A second input to the AND circuit 518e is via line ADDER (1) CARRY, which is positive only when there is a carry output from the Adder 1 order. The third input to the AND circuit 513e is an E/R1 (D4) signal which is passed when the other inputs to the AND circuit are positive, via a line 519e, an OR circuit 520e, an amplifier 521e and a cathode follower 522e to the line ADD (1) C/ACC 1 (OV), and thereby causes the Overflow trigger to be turned on. It should be noted, however, that the Overflow trigger is turned on only if the signs are alike and there has been a carry from the adder 1 position.

If the operation is Add and the signs are unlike, then the signal on line ASU, described above, is positive, and via an OR circuit 505e, of FIG. 5ap, and line 506e conditions one input of an AND circuit 507e. If during the Add operation, an End Carry is emitted from the Q order of the Adder, the line ADDER (Q) CARRY goes positive, and conditions a second input of the AND circuit 507e. While two inputs to the AND circuit 507e are conditioned positive, an E/R1 (D4) signal passes via the AND circuit 507e, line 508e, an OR circuit 509e, an amplifier 510e and a cathode follower 511e to the line CARRY ADDER (35), and thereby causes a carry to be emitted to the Adder 35 order.

Referring to FIG. 5ae, if the operation is Add, the line ADD is positive and via the OR circuit 506d and line 507d conditions the AND circuit 508d. The AND circuit 508d, while conditioned, passes an E/R4 (D1) signal via line 509d, the OR circuit 514d, the amplifier 515d, and the cathode follower 516d to the line Adder TO ACC, to connect the ADDER outputs to the Accumulator Register. When the output of the Add Execution Timer is a positive signal on the line ASUNC, it signifies the operation is Add, the signs are unlike and no End Carry occurred, and, therefore, the sum now present in the Accumulator Register is in complement form (this is known by mathematical analysis). It is necessary to recomplement this sum, since it is a rule of the machine to store values in true form. Therefore, referring to FIG. 5ac, the positive signal on the line ASUNC passes via an OR circuit 584c and line 585c to condition one input of the AND circuit 586c. The AND circuit 586c, while conditioned, passes an E/R7 (D2) signal via line 587c, the OR circuit 588c, the amplifier 589c, and the cathode follower 590c to the line ACC COMP TO ADDER and is effective to transfer the complement of the Accumulator Register into the Adder. The output of the Adder will, of course, be the original sum in true form and the positive signal on line ASUNC passes via an OR circuit 510d, of FIG. 5ae, and line 511d to condition the AND circuit 512d. The AND circuit 512d, while conditioned, passes an E/R8 (D1) signal via line 513d, the OR circuit 514d, the amplifier 515d and the cathode follower 516d, to the line ADDER TO ACC, thereby gating the sum from the Adder in true form into the Accumulator Register. This results in storing the sum in true form in the Accumulator Register. If the operation is Add, the signs of the Memory Register and Accumulator Register are unlike, and an End Carry occurred during the addition and the Accumulator Register Sign is negative, as explained above, the line ASUC (—) is positive. A positive signal on the line ASUC(—) passes via an OR circuit 510f of FIG. 5bf, and line 511f to condition an AND circuit 512f. The AND circuit 512f, while conditioned, passes an E/R10 (D1) signal, via an amplifier 513f and a cathode follower 514f to the line (+) TO ACC (S) to thereby set the Accumulator Register Sign positive. However, if the operation is Add, the Signs of the Memory Register and the Accumulator Register were unlike, an no End Carry occurred during the addition, and the Accumulator Register Sign was positive, a positive signal exists on the line ASUC (+). A positive signal on line ASUC (+) passes via an OR circuit 515f, of FIG. 5bg, and line 516f to condition an AND circuit 517f. The AND circuit 517f, while conditioned, passes an E/R10 (D1) signal via an amplifier 518f and a cathode follower 519f to the line (—) TO ACC (S). A positive signal on the latter line is effective, as explained below, to put a minus sign representation in the Accumulator Register Sign position.

A positive signal on the line ADD also feeds via an OR circuit 520d, of FIG. 5af, and line 521d to condition the AND circuit 522d. The AND circuit 522d, while conditioned, passes an E/R10 (D2) signal via line 523d, the OR circuit 528d, the amplifier 529d and the cathode follower 530d to the line END OP and thereby signal an End of Operation. The signal on line END OP passes through the normally conditioned AND circuit 568d of FIG. 5ak, and via the amplifier 569d and the cathode follower 570d to the line STEP INST CTR to cause the instruction counter to be stepped.

Add Absolute

Refer now to FIG. 6m, which shows the Timing Diagram for an Add Absolute operation. The function of the Add Absolute Instruction is the same as the Add Instruction except that the number in the Memory Register is treated as positive regardless of its actual sign. During the Instruction and Execute cycles, signals generated are identical in time for those described for the Add operation. Proceeding to the Execute/Regenerate cycle, an E/R1 (D4) signal gates information from the Memory Register to the Adder, and if the Accumulator Register Sign is positive, the holding of the Accumulator Register in true form is gated in true form to the Adder by the E/R1 (D4) signal. However, if the Accumulator Register Sign is negative, the complement of the Accumulator Register is gated to the Adder also by E/R1 (D4) signal.

If the Accumulator Register Sign is positive and a carry is emitted from the adder 1 order, it is an indication of an overflow and the Adder 1 carry is connected to the Overflow trigger by an E/R1 (D4) signal to turn the latter on. If, however, the Accumulator Register Sign is negative, and a carry output occurs from the Adder Q order, an elusive one carry is added to the Adder 35 order by an E/R1 (D4) signal. At "4" time of the Execute/Regenerate cycle, an E/R4 (D1) signal gates the output of the Adder to the Accumulator Register. Unless the Accumulator Register Sign is negative and no End carry resulted, the value gated to the Accumulator Register is in true form. However, if the Accumulator Register Sign were negative and no End carry resulted, it is an indication that the Adder output gated to the Accumulator Register is in complement form. Therefore, an E/R7 (D2) signal is emitted to again pass information from the Accumulator Register in complement form into the Adder and thereafter an E/R8 (D1) signal gates the output of the Adder into the Accumulator Register to thereby effect a recomplementing operation. This recomplementing and gating of the Adder output to the Accumulator Register results in storing information in the Accumulator Register in true form. If the Accumulator Register is negative, and an End carry resulted, a positive sign representation is stored in the Accumulator Register Sign order by an E/R10 (D1) signal. Finally, an End of Operation signal and a signal for stepping the Instruction Counter are emitted at E/R10 (D2) time.

The I9 (D1) and I10 (D1) signals for gating a half word Instruction from the Memory Buses to the Memory Register and from the Memory Register to the Instruction Register are developed by the circuits of FIG. 5z described above. The GO TO EX signal is developed during an Add Absolute operation, as the line ADD AB goes positive and feeds via an OR circuit 523e, of FIG. 5ar, and line 524e in combination with the positive signal on the NO EXT CYC line, if no interruption has occurred, to condition the AND circuit 525e. The AND circuit 525e, while conditioned, passes an I11 (D1) signal via the amplifier 526e and the cathode follower 527e to the GO TO EX line.

A positive signal on the line ADD AB also feeds via the

OR circuit 566e, of FIG. 5z, and via the cathode follower 567c and line 568c to condition the AND circuits 550c, 555c, 560c and 563c. Other inputs to these AND circuits to gate an E9 (D1) signal are dependent upon whether the address of the Instruction is called for a full word, an odd half word or even half word. As described above, either a full word, an odd half word or even half word may be read from Memory to the Memory Buses and thus be gated to the Memory Register. As described above, the gating of a full or half word is caused by the combination of positive signals, as required, on lines MEM BUS (S to 17) TO MR (S to 17), MEM BUS (18 to 35) to MR (S to 17), MEM BUS (18 to 35) to MR (18 to 35) and CLEAR MR (18 to 35). The GO TO EX/RGN signal is developed as a positive signal on the line ADD AB passes via the OR circuit 579d, of FIG. 5ak, and line 580d to condition the AND circuit 581d. The AND circuit 581d, while conditioned, passes an E11 (D1) signal via line 582d, the OR circuit 583d, the amplifier 584d and the cathode follower 585d to the line GO TO EX/RGN.

Refer now to FIG. 5n, which is the Execution Timer for an Add Absolute operation. A positive signal on the line ADD AB conditions the AND circuits 554b, 556b, 558b and 560b. The AND circuit 554b also receives an input via line ACC (+), which is positive when the Accumulator Register Sign is positive. The output of the AND circuit 554b passes via the cathode follower 555b to the line AA (+), and is positive when the operation is Add Absolute and the Accumulator Register Sign is positive. The AND circuit 556b also receives a signal via the line ACC (—), which is positive when the Accumulator Register sign is negative. Therefore, the output of the AND circuit 556b passes via the cathode follower 557b to the line AA (—) and is positive when the operation is Add Absolute and the Accumulator Register sign is negative. The AND circuit 558b, besides the signal on the lines ADD AB and ACC (—), also receives a signal via line NO QC, which is positive when the no End Carry has occurred from the Adder Q order. The output of the AND circuit 558b passes via the cathode follower 559b to the line AA (—) NC, which is positive when the operation is Add Absolute, the Accumulator Register Sign is negative and no End carry has occurred. The AND circuit 560b receives signals via lines ADD AB, ACC (—) and QC, the latter being positive when an End carry has occurred from the Adder to Q order. The output of the AND circuit 560b passes via the cathode follower 561b to line AA (—) C, which is positive when the operation is Add Absolute, the Accumulator Register sign is negative and an End carry has occurred.

Proceeding to an explanation of the development of signals occurring the Execute/Regenerate portion of the Add Absolute operation, refer to FIG. 5ab. A positive signal on the line ADD AB passes via the OR circuit 575c and the line 576c to condition the AND circuit 577c. The AND circuit 577c, while conditioned, passes the E/R1 (D4) signal via the amplifier 578c and the cathode follower 579c to the line MR TO ADDER. A positive signal on the latter line gates information from the Memory Register to the Adder. If the Accumulator sign is positive, then the holding of the Accumulator Register is gated to the Adder in true form as the signal on line AA (+), which is positive when the operation is Add Absolute and the Accumulator Register Sign is positive, passes via the OR circuit 501d, of FIG. 5ad, and line 502d to condition the AND circuit 503d. While the AND circuit 503d is conditioned, an E/R1 (D4) signal is passed via the amplifier 504d and the cathode follower 505d to the line ACC TRUE TO ADDER. However, if the Accumulator Register sign is negative, then the complement of the Accumulator Register is gated to the Adder. A positive signal on the line AA (—), which is positive when the operation is Add Absolute and the Accumulator Register sign is negative is passed through the OR circuit 580c, of FIG. 5ac, and line 581c to condition the AND circuit 582c. The AND circuit 582c, while conditioned, passes the E/R1 (D4) signal via line 583c, the OR circuit 588c, the amplifier 589c and the cathode follower 590c to the line ACC COMP TO ADDER. Thus, it is seen that one value is read from the Memory Register to the Adder, while a second value is read, in either true or complement form, from the Accumulator Register to the Adder.

Referring now to FIG. 5aq, a positive signal on the line AA (+), which is positive when the operation is at Add Absolute and the Accumulator Register sign is positive, passes via the OR circuit 516d and line 517e to condition the AND circuit 518e. A second input to the AND circuit 518e is via line ADDER (1) CARRY, which is positive when a carry is emitted from the Adder 1 order. While this AND circuit 518e is conditioned, an E/R1 (D4) signal is passed via line 519e, the OR circuit 520e, the amplifier 521e and the cathode follower 522e to the line AD (1) C/ACC (1) OV. A positive signal on the latter line, as described above, will cause the Overflow trigger (FIG. 5a) to be turned on, signifying that an Overflow has occurred. However, if the Accumulator Register sign is negative, and an End carry has resulted from the Q order, then a signal on the line AA (—), which is positive when the operation is Add Absolute and the Accumulator Register Sign is negative, passes via the OR circuit 505e, of FIG. 5ap, and the line 506e to condition the AND circuit 507e. The second input to the AND circuit 507e is conditioned when the line ADDER (Q) CARRY is positive to signify a carry from the Adder Q order. While the AND circuit 507e is conditioned, the E/R1 (D4) signal is passed via line 508e, the OR circuit 509e, the amplifier 510e and the cathode follower 511e to the line CARRY ADDER (35) to cause a carry to be added to the adder 35 order.

The Adder output is connected to the Accumulator Register as the signal on line ADD AB passes via the OR circuit 506d, of FIG. 5ae, and line 507d to condition the AND circuit 508d. The AND circuit 508d, being conditioned, passes the E/R4 (D1) signal via line 509d, the OR circuit 514d, the amplifier 515d and the cathode follower 516d to the line ADDER TO ACC. Upon termination of the latter signal, a sum should exist in the Accumulator Register. However, if the Accumulator Register Sign is negative, and no End carry has resulted, it is an indication that the sum in the Accumulator Register is in complement form, and, therefore, it is necessary to recomplement the value. This is accomplished as a signal on the line AA (—) NC, which is positive when the operation is Add Absolute, the Accumulator Register sign is negative and no End carry resulted, feeds to the OR circuit 584c, of FIG. 5ac, and via line 585c to condition the AND circuit 586c. The AND circuit 586c, while conditioned, passes E/R7 (D2) signal via line 587c, the OR circuit 588c, the amplifier 589c, and the cathode follower 590c to the line ACC COMP TO ADDER thereby causing the complement of the value in the Accumulator Register to be fed to the Adder. The positive signal on the line AA (—) NC also feeds via the OR circuit 510d, of FIG. 5ae, and line 511d to condition the AND circuit 512d. The E/R8 (D1) signal passes via the conditioned AND circuit 512d, line 513d, the OR circuit 514d, the amplifier 515d and the cathode follower 516d to the line ADDER TO ACC. The positive signals on lines ACC COMP TO ADDER and ADDER TO ACC results in the recomplementing operation so that the sum now in the Accumulator Register is in true form. If the operation is Add Absolute, if an End carry occurred during the addition and the Accumulator Register Sign is negative, then the signal on line AA (—) C is positive and feeds via the OR circuit 510f, of FIG. 5bf, and line 511f to condition the AND circuit 512f. The AND circuit 512f, being conditioned, passes an E/R10 (D1) signal via amplifier 513f and the cathode follower 514f to the line (+)

TO ACC (S), to cause a positive sign representation to be set into the Accumulator Register sign order.

A positive signal on line ADD AB feeds via the OR circuit 520*d*, of FIG. 5*af*, and line 521*d* to condition the AND circuit 522*d*. While the AND circuit 522*d* is conditioned, an E/R10 (D2) signal is passed via the line 523*d*, the OR circuit 528*d*, the amplifier 520*d* and the cathode follower 530*d* to the line END OP, and thereby signal an End of Operation. The signal on line END OP is passed through the normally conditioned AND circuit 568*d*, of FIG. 5*aj*, and via the amplifier 569*d* and the cathode follower 570*d* to the line STEP INST CTR, and thereby causes a stepping of the Instruction Counter.

*Subtract*

Refer now to FIG. 6*n*, which shows the Timing Diagram for a Subtract operation. A Subtract operation is quite similar to the Add operation, described above, except that certain rules, for handling the information depending upon the signs of the factors being subtracted, govern the operation. The Subtract Instruction directs the machine to subtract the number read out of Memory to the Memory Register, from the value stored in the Accumulator Register. This Subtract operation proceeds according to the following rules:

*Rule 1.*—If the Accumulator Register and the Memory Register Signs are alike, the value, in the Memory Register, is added to the 1's complement of the value, in the Accumulator Register.

*Rule 2.*—If the Accumulator Register and Memory Register Signs are unlike, the True value of the value, in the Accumulator Register, is added to the value stored in the Memory Register.

*Rule 3.*—If the Signs of the Memory Register and the Accumulator Register are unlike, the Accumulator sign is not changed.

*Rule 4.*—If the Memory Register and the Accumulator Register Signs are alike, and

*a.* If No End Carry results, the result, stored in the Accumulator Register, is in complement form, and therefore, must be recomplemented, and the Sign of the Accumulator Register is left unchanged.

*b.* If there is an End Carry, an "elusive 1" must be added to the Adder 35 order, and the Sign of the Accumulator Register is changed.

Refer now to the FIG. 6*n*, which illustrates the Timing Diagram for a Subtract operation. During I9 (D1) of Instruction time, as indicated by the labeling, a half word Instruction is gated from the Memory Bus to the Memory Register, and at I10 (D1) time, this half word Instruction is gated, from the Memory Register to the Instruction Register. The Operation Decoder, then being energized, and indicating that a Subtract operation is to take place, causes, at I11 (D1) time a GO TO EXECUTE signal to be emitted to send the machine into an Execution Cycle. The signals developed to effect a subtract operation, are identical to those described above, for an add operation, except that the signals are developed under different conditions. No purpose would be served in repeating a description of each of the signals on this diagram. Such explanation was given during the Add operation, described above.

The usual I9 (D1) and I10 (D1) signals are developed as described above (see FIG. 5*z*). The GO TO EX signal is developed as the signal on line SUB is positive and feeds via the OR circuit 523*e* of FIG. 5*ar*, and the line 524*e* in combination with the positive signal on the EXT CYC line, if no interruption has occurred, to condition the AND circuit 525*e*. The AND circuit 525*e*, while conditioned, passes an I11 (D1) signal through the amplifier 526*e* and the cathode follower 527*e* to the line GO TO EX, thereby sending the machine into an Execute cycle. During the Execute cycle, a positive signal on line SUB feeds via the OR circuit 566*c*, of FIG. 5*b*, and the cathode follower 567*c* to line 558*c* and thereby conditions the AND circuits 550*c*, 555*c*, 560, and 563*c*. A full word, even half word or odd half word is read from Memory to the Memory Buses and is gated into the Memory Register, depending upon the particular address selected by the Subtract Instruction. The gating of a full or half word into the Memory Register is controlled by a combination of signals on the four output lines of FIG. 5*z*, as described above. The signal on the line SUB, when positive, also passes via the OR circuit 579*d*, of FIG. 5*ak*, and the line 580*d* to condition the AND circuit 581*d*. The AND circuit 581*d*, being conditioned, passes an E11 (D1) signal via the line 582*d*, the OR circuit 583*d*, the amplifier 584*d*, and the cathode follower 585*d* to the line GO TO EX/RGN, and thereby sends the machine into an Execute/Regenerate cycle.

Refer now to FIG. 5*h*, which is the Subtract Execution Timer. A positive signal on the line SUB conditions one input of each of the AND circuits 509*b*, 511*b*, 513*b*, 515*b*, 517*b*, and 519*b*. The AND circuit 509*b* is also conditioned by a signal on the line AMSA, which is positive when the Accumulator Register and the Memory Register signs are alike. Therefore, the output of the AND circuit 509*b* passes via the cathode follower 510*b* to the line SSA, which is positive when the operation is Subtract and the signs are alike. The AND circuit 511*b* also receives an input via line AMSU, which is positive when the Accumulator Register and Memory Register signs are unlike. Therefore, the output of the AND circuit 511*b* passes via the cathode follower 512*b* to the line SSU, which is positive when the operation is Subtract and the signs are unlike. The AND circuit 513*b* besides signals on lines ADD and AMSA also receives a signal via the line NO QC, which is positive when no End carry occurs from the Q position of the Adder. Therefore, the output of the AND circuit 513*b* passes via the cathode follower 514*b* to the line SSANC, which is positive when the operation is Subtract, the signs are alike and no End carry has occurred. The AND circuit 515*b* is similar to the AND circuit 513*b* except that it receives a third input via line QC, which is positive when an End carry has occurred in the Q order of the Adder. The output of the AND circuit 515*b* passes via the cathode follower 516*b* to line SSAC and is positive when the operation is Subtract, the signs are alike and an End carry has occurred. The AND circuit 517*h* receives the same three inputs as the AND circuit 515*b* and also a signal via the line ACC (−), which is positive when the Accumulator Sign is negative. Therefore, the output of the AND circuit 517*b* passes via the cathode follower 518*b* to line SSAC (−) and is positive when the operation is Subtract, the signs are alike, an End carry has occurred and the Accumulator Register is negative. The AND circuit 519*b* also receives the same signals as the AND circuit 515*b* and further receives a signal via the line ACC (+). Therefore, the output of the AND circuit 519*b* passes via the cathode follower 520*b* to the line SSAC (+) and is positive when the operation is Subtract, the signs are alike, an End carry has occurred, and the Accumulator Register Sign is positive.

The signal for gating the holding of the Memory Register to the Adder is developed by the circuits of FIG. 5*ab*. During the Subtract operation, the signal on line SUB is positive, and feeds via the OR circuit 575*c*, the line 576*c* to condition the AND circuit 577*c*. The AND circuit 577*c*, while conditioned, passes the E/R1 (D4) signal via the amplifier 578*c* and the cathode follower 579*c* to the line MR TO ADDER.

Refer now to FIG. 5*ad*, wherein a positive signal on the line SSU which, as described above, is positive when the operation is Subtract and the signs are unlike, passes via the OR circuit 501*d* and line 502*d* to condition the AND circuit 503*d*. The AND circuit 503*d*, while conditioned, passes an E/R1 (D4) signal via the amplifier 504*d* and the cathode follower 505*d* to the line ACC TRUE TO ADDER and thereby gates the holding of the Accumulator Register in true form to the Adder. However, if the Instruction is Subtract and the signs are alike, a positive output from the Subtract Execution Timer via line SSA passes via the OR circuit 580c of FIG. 5ac and the line 581c to condition the AND circuit 582c. The AND circuit 582c, while conditioned, passes the E/R1 (D4) signal via line 583c, the OR circuit 588c, the amplifier 589c and the cathode follower 590c to the line ACC COMP TO ADDER and thereby is effective, as described below, to transfer the complement of the Accumulator Register to the Adder.

Referring to FIG. 5ae, if the operation is Subtract, the line SUB is positive and feeds via the OR circuit 506d and the line 507d to condition the AND circuit 508d. The AND circuit 508d while condition, passes an E/R1 (D4) signal via line 509d, the OR circuit 514d, the amplifier 515d and the cathode follower 516d to the line ADDER TO ACC. A positive signal on the latter line connects Adder outputs to the Accumulator Register. Note that this operation takes place regardless of signs or the values in the Memory Register and in the Accumulator Register.

If the signs are unlike and a carry is emitted by the Adder 1 order, the adder 1 carry signal is fed to the Overflow trigger turning the latter on. This is accomplished as the signal on line SSU, which is positive when the operation is Subtract and the signs are unlike, feeds via the OR circuit 516e, of FIG. 5aq, and line 517e to condition one input of the AND circuit 518e. The second input to the AND circuit 518e is via line ADDER (1) CARRY, which is positive when a carry is emitted from the Adder 1 order. While the AND circuit 518e is conditioned, the E/R1 (D4) signal is passed through the conditioned AND circuit and via line 519e, the OR circuit 520e, the amplifier 521e and the cathode follower 522d to the line AD (1) C/ACC (1) OV to thereby cause the overflow trigger to be turned on (see FIG. 5a).

As indicated on the Timing Diagram, if the signs are alike and an End carry is emitted from the Adder Q order, then an elusive one carry is added to the Adder 35 order. This is brought about during the Subtract operation as a positive signal on the line SSA, which is positive when the operation is Subtract and the signs are alike, feeds via the OR circuit 505e, of FIG. 5ap, and the line 506e to condition one input of the AND circuit 507e. A second input to the AND circuit 507e is via line ADDER (Q) CARRY which is positive when an End carry is emitted from the Adder Q order. While the AND circuit 507e is condition, an E/R1 (D4) signal passes via the conditioned AND circuit and the line 508e, the OR circuit 509e, the amplifier 510e and the cathode follower 511e to the line CARRY ADDER (35), to thus effectively add a carry (elusive one) to the Adder 35 order. The sum output of the Adder must be gated to the Accumulator Register, and this is accomplished during a Subtract operation, as the line SUB goes positive, and feeds via the OR circuit 506d of FIG. 5ae and the line 507d to condition the AND circuit 508d. The AND circuit 508d being conditioned passes the E/R4 (D1) signal via line 509d, the OR circuit 514d, the amplifier 515d, and the cathode follower 516d to the line ADDER TO ACC, which is effective to gate the output of the Adder to the Accumulator Register.

If the signs were alike and no End carry occurred, it may be determined by methematical analysis, that the sum which was gated to the Accumulator Register is in complement form, and, therefore, it is necessary to re-complement that value so that a true value will be stored in Accumulator Register. This is accomplished as a positive signal on the line SSANC, which is positive when the operation is Subtract, the signs are alike and no End carry occurred, feeds via the OR circuit 584c of FIG. 5ac and line 585c to condition one input of the AND circuit 586c. The AND circuit 586c, while conditioned, passes an E/R7 (D2) signal via line 587, the OR circuit 588c, the amplifier 589c, and the cathode follower 590c to the line ACC COMP TO ADDER. Thus, a complement of the holding of the Accumulator Register is fed to the Adder. The output of the Adder, which will be a complement of the value stored in the Accumulator Register, is gated to the Accumulator Register as the positive signal on the line SSANC also passes via the OR circuit 510d, of FIG. 5ae, and line 511d to condition the AND circuit 512d. The AND circuit 512d, while condition, passes E/R8 (D1) signal via line 513d, the OR circuit 514d, the amplifier 515d, and the cathode follower 516d to the line ADDER TO ACC. Thus a true value is stored in the Accumulator Register.

Referring to FIG. 5bf, if during a Subtract operation the signs are alike, an End carry occurred and the Accumulator Register Sign is negative, then the line SSAC (−) is positive and feeds via the OR circuit, 510f of FIG. 5bf, and line 511f to condition the AND circuit 512f. The AND circuit 512f, while condition, passes an E/R10 (D1) signal via the amplifier 513f and the cathode follower 514f to the line (+) TO ACC (S) to thereby put a positive sign representation in the Accumulator Register Sign order. However, if the operation is Subtract, the signs are alike, and an End carry occurred and the Accumulator Register Sign is positive, then the signal on line SS AC (+) is positive and passes via the OR circuit 515f, of FIG. 5bg, and line 516f to condition the AND circuit 517f. The AND circuit 517f, while conditioned, passes the E/R10 (D1) signal via the amplifier 518f and the cathode follower 519f to the line (−) TO ACC (S) and thereby causes a negative sign representation to be stored in the Accumulator Sign order.

Refer now to FIG. 5af, wherein the line SUB, when positive, feeds via the OR circuit 520d and line 521d to condition the AND circuit 522d. The AND circuit 522d, while conditioned, passes the E/R10 (D2) signal via line 523d, the OR circuit 528d, the amplifier 529d and the cathode follower 530d to the line END OP to thereby signal an End of Operation. The signal on line END OP is passed via the normally conditioned AND circuit 568d, of FIG. 5aj, and via the amplifier 569d and the cathode follower 570d to the line STEP INST CTR to thereby cause the Instruction Counter (FIG. 4d) to be stepped.

*Subtract Absolute*

Refer now to FIG. 6p, which shows the Timing Diagram for a Subtract Absolute operation. The function of the Subtract Absolute Instruction is the same as an Add Instruction except that the number in the Memory Register, which has been read from Memory, is treated as a negative quantity regardless of its actual sign. The signals developed during the Instruction and Execute cycles are the same as described above, during the Add operation. Therefore, in a Subtract Absolute operation, there are only two possibilities of sign combinations, as distinguished from the four possibilities of a Subtract operation. In the Subtract Absolute operation, the value in the Memory Register, which is the subtrahend, is regarded as positive. The minuend, in the Accumulator Register, may be positive or negative. At 1 time of the Execute/Regenerate cycle, an E/R1 (D4) signal is emitted to gate holding of the Memory Register, to the Adder, and if the Accumulator Register Sign is negative, an identically timed signal gates the value from Accumulator Register in true form to the Adder. However, if the Accumulator Register Sign is positive, an E/R1 (D4) signal is emitted to gate the information from the Accumulator Register in complement form to the Adder. Further, if the Accumulator Register Sign is negative, and the Adder 1 order emits a carry signal, this carry signal is gated to the Overflow trigger turning the latter on; but if the Accumulator Register Sign is positive and the Adder Q order emits an end carry, a carry (elusive one) is added to the Adder 35 order. At four time of the Execute/Regenerate cycle, an E/R4 (D1) signal is emitted for gating the output of the Adder to the Accumulator Register. If upon completion of this subtraction, the Accumulator Register Sign is positive and no End carry occurred, it is an indication that a complement value is stored in the Accumulator Register.

If the value now stored in accumulator storage is in complement form, it is necessary to recomplement the information so that the true value will be stored in the Accumulator Register. Thus, if the Accumulator Register Sign is positive, and no End carry occurred at 7 time of the Execute/Regenerate cycle, and E/R7 (D2) signal gates the information from the Accumulator Register in complement form to the Adder, and thereafter an E/R8 (D1) signal gates the output of the Adder to the Accumulator Register. These latter two signals then are effective to cause a recomplementing of the information held by the Accumulator Register. If, as a result of the Subtraction, an End carry occurred and if the sign of the Accumulator Register is positive, then a negative representation is stored in the Accumulator Register Sign order by an E/R10 (D1) signal, otherwise, the Accumulator Register Sign is left undisturbed. The operation is complete at that time so an End of Operation signal is emitted at E/R10 (D2) time, which signal is also utilized to develop a signal to step the Instruction Counter.

The signals occurring at I9 (D1) and I10 (D1) times, for gating a half word Instruction from the Memory Buses to the Memory Register, and from the Memory Register to the Instruction Register are emitted by the circuits of FIG. 5z, described above. The GO TO EX signal is developed as the line SUB AB goes positive, and feeds via the OR circuit 523e of FIG. 5ar and line 524e in combination with a positive signal on the NO EXT CYC line, if no interruption has occurred, to condition the AND circuit 525e. The AND circuit 525e, being conditioned, passes an I11 (D1) signal through the amplifier 526e and the cathode follower 527e to the line GO TO EX. The signal on the line SUB AB, when positive, also passes via the OR circuit 566c of FIG. 5z and the cathode follower 567c and line 568c to condition the AND circuits 550c, 555c, 560c and 563c. Outputs of these circuits, shown on FIG. 5z, is dependent upon whether a full, an even or an odd half word is addressed. As described above, the outputs of these circuits determine whether a full word, an even half word or an odd half word is read from Memory to the Memory Register at E9 (D1) time.

Referring to FIG. 5ak, the line SUB AS, going positive, feeds via the OR circuit 879d and line 580d to condition the AND circuit 581d. The AND circuit 581d, while conditioned, passes the E11 (D1) signal via line 582d, the OR circuit 583d, the amplifier 584d and the cathode follower 585d to the line GO TO EX/RGN, thereby sending the machine into an Execute/Regenerate cycle.

Refer now to FIG. 5j, which shows the Subtract Absolute Execution Timer. A positive signal on the line SUB AB conditions the AND circuits 525b, 529b, and 531b. A second input to the AND circuit 525b is via line ACC (−), which is positive when the Accumulator Register Sign is negative. Therefore, the output of the AND circuit 525b passes via the cathode follower 526b to the line SA (−) and is positive when the operation is Subtract Absolute and the Accumulator Register sign is negative. The AND circuit 527b receives a second input via line ACC (+), which is positive when the Accumulator Register sign is positive. Therefore, the output of the AND circuit 527b passes via the cathode follower 528b to the line SA (+) and is positive when the operation is Subtract Absolute and the Accumulator Register sign is positive.

The AND circuit 529b receives the same inputs as the AND circuit 527b and further an input via line NO QC, which is positive when no End carry has occurred from the Q order of the Adder. The output of the AND circuit 529b passes via the cathode follower 530b to line SA (+) NC, which is positive when the operation is Subtract Absolute, the Accumulator Register Sign is positive and no End carry has occurred. The AND circuit 531b receives the same inputs as the AND circuit 527b and further a signal via the line QC, which is positive when an End carry has occurred from the Q position of the Adder. The output of the And circuit 531b passes via the cathode follower 532b to the line SA (+) C and is positive when the operation is Subtract Absolute, the Accumulator Register Sign is positive and an End carry has occurred.

Refer now to FIG. 5ab, wherein a positive signal on the line SUB AS passes via the OR circuit 575c and line 576c to condition the AND circuit 577c. The AND circuit 577c, while conditioned, passes the E/R1 (D4) signal via the amplifier 578c and the cathode follower 579c to the line MR TO ADDER, thereby gating the holding of the Memory Register to the Adder. If the operation is Subtract Absolute and the Accumulator Register sign is negative, the line SA (−) is positive, as explained above, and feeds via the OR circuit 501d, of FIG. 5ad, and line 502d to condition the AND circuit 503d. The AND circuit 503d, being conditioned, passes the E/R1 (D4) signal via the amplifier 504d and the cathode follower 505d to the line ACC TRUE TO ADDER, to thereby gate information from the Accumulator Register in true form to the Adder. If, however, the Instruction is Subtract Absolute and the Accumulator Register Sign is positive, then the signal on line SA (+) is positive, as explained above, and feeds via the OR circuit 580c, of FIG. 5ac, and line 581c to condition the AND circuit 582c. The AND circuit 582c, being conditioned, passes the E/R1 (D4) signal via line 583c, the OR circuit 588c, the amplifier 589c and the cathode follower 590c to the line ACC COMP TO ADDER to gate the holding of the Accumulator Register in complement form to the Adder. If the Accumulator Register sign is negative, and the Adder 1 order emits a carry signal during the Subtraction, then the Adder 1 carry signal is fed to the Overflow trigger to turn the latter on. This is caused by the action of a positive signal on the line SA (−), which is positive when the operation is Subtract Absolute and the Accumulator Register sign is negative, feeding via the OR circuit 516e of FIG. 5aq, and line 517e to condition one input of the AND circuit 518e. The second input to the AND circuit 518e is via the line ADDER (1) CARRY which is positive when the Adder 1 order emits a carry. While the AND circuit 518e is conditioned, an E/R1 (D4) signal is passed via line 519e, the OR circuit 520e, the amplifier 521e, and the cathode follower 522e, to the line ADDER (1) C/ACC (1) OV to thereby turn on the overflow trigger (FIG. 5a). If the Accumulator Register sign is positive and the Adder Q order emits an End carry, then the line SA (+), which is positive when the operation is Subtract Absolute and the Accumulator Register sign is positive, feeds via the OR circuit 505e, of FIG. 5ap, and line 506e to condition the AND circuit 507e. The second input to the AND circuit 507e is conditioned by a positive signal on the line ADDER (Q) CARRY which is positive when an End carry is emitted by the Q order of the Adder. While the AND circuit 507e is conditioned, an E/R1 (D4) signal is passed via line 508e, the OR circuit 509e, the amplifier 510e and the cathode follower 511e to the line CARRY ADDER (35), to thereby add a carry (elusive one) to the Adder 35 order.

The output of the Adder is gated to the Accumulator Register as the line SUB AS goes positive and feeds via the OR circuit 506d, of FIG. 5ae, and line 507e to condition the AND circuit 508d. The AND circuit 508d, being conditioned, passes the E/R4 (D1) signal via line 509d, the OR circuit 514d, the amplifier 515d, and the cathode follower 516d to the line ADDER TO ACC.

If at this time, it is determined that the Accumulator

Register Sign is positive, and no End carry resulted, then the word stored in Accumulator Register is in complement form and must be recomplemented. Referring to FIG. 5ac, as the signal on line SA (+) NC goes positive, it is an indication that the operation is Subtract Absolute, that the Accumulator Register Sign is positive and that no End carry has occurred, and this signal feeds via the OR circuit 584c and line 585c to condition the AND circuit 586c. The AND circuit 586c, being conditioned, passes the E/R7 (D2) signal via line 587c, the OR circuit 588c, the amplifier 589c, and the cathode follower 590c to the line ACC COMP TO ADDER, to gate the word in the Accumulator Register to the Adder in complement form. The signal on the line SA (+) NC also passes via the OR circuit 510d circuit, of FIG. 5ad, and line 511d to condition the AND circuit 512d. The AND circuit 512d, while conditioned, passes the E/R8 (D1) signal via line 513d, the OR circuit 514d, the amplifier 515d and the cathode follower 516d to the line ADDER TO ACC, thereby gates the output of the Adder into the Accumulator Register. These signals are effective to recomplement the value stored in the Accumulator Register as a result of the subtraction.

If the Accumulator Register Sign is positive and an End carry occurred during the subtraction, then the signal on line SA (+) C is positive, as explained above, and via the OR circuit 515f of FIG. 5bg, and line 516f conditions the AND circuit 517f. The AND circuit 517f, while conditioned, passes the E/R10 (D1) signal via the amplifier 518f and the cathode follower 519f to the line (—) TO ACC (S), to thereby set the negative sign representation in the Accumulator Register sign position.

The positive signal line SUB AB also feeds via the OR circuit 520d, of FIG. 5af, and line 521d to condition the AND circuit 522d. The AND circuit 522d, while conditioned, passes the E/R10 (D2) signal via line 523d, the OR circuit 528d, the amplifier 529d and the cathode follower 530d to the line END OP and thereby signal an End of Operation. The signal on line END OP passes via the normally conditioned AND circuit 568d, of FIG. 5aj, and via the amplifier 569d, and the cathode follower 570d to the line STEP INST CTR to thereby cause a stepping of the Instruction Counter.

*Reset Add*

Refer now to FIG. 6q, which is the Timing Diagram for a Reset Add operation. The function of the Reset Add Instruction is to read a full or half word out of Memory into the Memory Register and transfer it to the Accumulator Register replacing the value formerly stored in the Accumulator Register. During Instruction time, the I9 (D1) and I10 (D1) signals for gating a half word Instruction from the Memory Buses to the Memory Register and from the Memory Registery to the Instruction Register and the I11 (D1) signal for sending the machine into an Execute cycle are emitted. During the Execute cycle, the full or half word is read out of Memory to the Memory Buses and gated to the Memory Register by a E9 (D1) signal. An E11 (D1) signal is also emitted to send the machine into an Execute/Regenerate cycle. During the Execute/Regenerate cycle, an E/R1 (D4) signal is emitted gating the holding of the Memory Register to the Adder and thereafter, an E/R4 (D1) signal is emitted to gate the output of the Adder into the Accumulator Register. Inasmuch as the holding of the Accumulator Register is not gated to the Adder effectively this operation resets the Accumulator Register and transfers the contents of the Memory Register to the Accumulator Register. At E/R10 (D1) time, a signal is emitted to set the Accumulator Register Sign to agree with the Memory Register Sign. Thus, if the Memory Register Sign is negative, a negative sign representation is placed in the Accumulator Register sign order while if the Memory Register sign is positive, a positive sign representation is placed in the Accumulator Register sign order. An End of Operation signal is emitted at E/R10 (D2) time, and a like signal is emitted to step the Instruction Counter.

The I9 (D1) and I10 (D1) signals are developed, as described above, by the circuits of FIG. 5z. GO TO EX signal is developed as the line R ADD is positive and feeds via the OR circuit 523e, of FIG. 5ar, and line 524e in combination with the positive signal on the NO EXT CYC line, if no interruption has occurred, to condition the AND circuit 525e. The AND circuit 525e, while conditioned, passes an I11 (D1) signal via the amplifier 526e and the cathode follower 527e to the line GO TO EX.

During the Execute cycle signals for gating information from the Memory Buses to the Memory Register, and where necessary, for clearing a portion of the Memory Register, are generated as the line R ADD goes positive and feeds via the OR circuit 566c, of FIG. 5z, and via the cathode follower 567c and line 568c to condition the AND circuits 550c, 555c, 560c and 563c. These AND circuits are also conditioned by signals indicating whether the address of the Instruction selects a full word, an even half word, or an odd half word. The output lines, of FIG. 5z, as described above, in combination with Memory determine whether a full, an even half, or an odd half word is gated from the Memory Buses to the Memory Register.

Referring to FIG. 5ak, a positive signal on the line R ADD passes via the OR circuit 579d and line 580d to condition the AND circuit 581d. The AND circuit 581d, while conditioned, passes an E11 (D1) signal via line 582d, the OR circuit 583d, the amplifier 584d, and the cathode follower 585d to the line GO TO EX/RGN, and thereby sends the machine into an Execute/Regenerate cycle.

At "1" time of the Execute/Regenerate cycle, an E/R1 (D4) signal is emitted to gate the holding of the Memory Register to the Adder. Referring to FIG. 5ab, this signal is developed as the line R ADD goes positive and via the OR circuit 575c and line 576c conditions the AND circuit 577c. The AND circuit 577c, being conditioned, passes the E/R1 (D4) signal via the amplifier 578c and the cathode follower 579c to the line MR TO ADDER. At this time, the holding of the Accumulator Register is not gated to the Adder. Therefore, the output from the Adder will be merely the word read out of Memory into the Memory Register. The output of the Adder is gated to the Accumulator Register as the signal on line R ADD is positive and feeds via the OR circuit 506d, of FIG. 5ae, and via line 507d to condition the AND circuit 508d. The AND circuit 508d, being conditioned, passes the E/R4 (D1) signal via line 509d, the OR circuit 514d, the amplifier 515d and the cathode follower 516d to the line ADDER TO ACC.

Refer now to FIG. 5m which is the Reset Add Execution Timer. A positive signal on the line R ADD conditions one input of both AND circuits 550b and 552b. The AND circuit 552b also receives a signal via line MR (+), which is positive when the Memory Register Sign is positive. Therefore, the output of the AND circuit 550d passes via the cathode follower 551d to the line RA MR (+) and is positive when the operation is Reset Add, and the Memory Register sign is positive. The AND circuit 552d receives second input via line MR (—), which is positive when the Memory Register sign is negative. Therefore, the output of the AND circuit 552b, feeding via the cathode follower 553b to the line RA MR (—) is positive when the operation is Reset Add and the Memory Register sign is negative.

The signals developed and described thus far for a Reset Add operation, have been effective merely to store any new information in the Accumulator Register. More specifically, these signals have gated the information read out of Memory into the Accumulator Register replacing whatever was formerly stored in the Accumulator Register with the exception of the Sign order.

Refer now to FIG. 5bf, wherein if the line RA MR (+), which is positive as explained above, when the operation is Reset Add and the Memory Register Sign is positive, feeds via the OR circuit 510f and the line 511f to condition the AND circuit 512f. The AND circuit 512f, being conditioned passes the E/R10 (D1) signal via the amplifier 513f and the cathode follower 514f to the line (+) TO ACC (S) to thereby store a positive sign representation in the Accumulator Register sign order. However, if the output of the Reset Add Execution Timer drove the line RA MR (−) positive, which is an indication that the operation is Reset Add, and the Memory Register sign is negative, this positive signal passes through the OR circuit 515f of FIG. 5bg, and via line 516f to condition the AND circuit 517f. The AND circuit 517f, being conditioned, passes the E/R10 (D1) signal via the AND circuit 518f and the cathode follower 519f to the line (−) TO ACC (S) to thereby store a negative sign representation in the Accumulator Register sign position.

Referring to FIG. 5af, the line R ADD, being positive, feeds via the OR circuit 520d and line 521d to condition the AND circuit 522d. The AND circuit 522d, while conditioned, passes the E/R10 (D2) signal via line 523d, the OR circuit 528d, the amplifier 529d, and the cathode follower 530d to the line END OP, to thereby signal an End of Operation. The signal on line END OP is passed through the normally conditioned AND circuit 568d, of FIG. 5aj, and via the amplifier 569b and the cathode follower 570b to the line STEP INST CTR to thereby generate a signal for stepping the Instruction Counter.

*Reset Subtract*

The Reset Subtract operation, whose Timing Diagram is shown on FIG. 6r, is identical to the Reset Add operation, except that if the Memory Register sign is negative, the Accumulator Register sign is made positive but if the Memory Register sign is positive, the Accumulator Register sign is negative.

The I9 (D1) and I10 (D1) signals for gating an Instruction from Memory via the Memory Buses to the Memory Register and for gating this Instruction from the Memory Register to the Instruction Register are developed by circuits of FIG. 5z, described above. The GO TO EX signal is developed by a positive signal on the line R SUB feeding via the OR circuit 523e, of FIG. 5ar, and line 524e in combination with the positive signal on the NO EXT CYC line, if no interruption has occurred, to condition the AND circuit 525e. The AND circuit 525e, being conditioned, passes the I11 (D1) signal via the amplifier 526e and the cathode follower 527e to the line GO TO EX, thereby sending the machine into an Execute cycle.

Referring to FIG. 5z, a positive signal on the line R SUB feeding via the OR circuit 566c, the cathode follower 567c and line 568c conditions the AND circuits 550c, 555c, 560c, and 563c. The gating of an E9 (D1) signal through these AND circuits is dependent upon whether a full, an even half or an odd half word is selected by the Instruction. The E9 (D1) output signals, of FIG. 5z, are effective as described above to gate a full, an even half or an odd half word from the Memory Buses to the Memory Register. The machine is then sent into an Execute/Regenerate cycle, as the line R SUB goes positive, and via the OR circuit 579d of FIG. 5ak, and line 580d conditions the AND circuit 581d. The AND circuit 581d, being conditioned, passes an E11 (D1) signal via line 582d, the OR circuit 583d, the amplifier 584d and the cathode follower 585d to the line GO TO EX/RGN.

Refer now to FIG. 5i, which is the Execution Timer for a Reset Subtract operation. The line R SUB, when positive, conditions one input of each of the AND circuits 521b and 523b. The AND circuit 521b also receives a signal via line MR (−), which is positive when the Memory Register sign is negative. Therefore, the output of the AND circuit 521b feeds via the cathode follower 522b to the line RS MR (−) and is positive, when the operation is Reset Subtract and the Memory Register sign is negative. The AND circuit 523b also receives a signal via line MR (=), which is positive when the Memory Register sign is positive. Therefore, the output of the AND circuit 523b passes via the cathode follower 524b to the line RS MR (+), which is positive when the operation is Reset Subtract, and the Memory Register sign is positive.

Referring to FIG. 5ah, a positive signal on the line R SUB feeds via the OR circuit 575c and line 576c to condition the AND circuit 577c. The AND circuit 577c, being conditioned, passes the E/R0 (D4) pulse via the amplifier 578c and the cathode follower 579c to the line MR TO ADDER, to thereby gate information from the Memory Register to the Adder. It should be noted that no information is gated from the Accumulator Register to the Adder at this time. Therefore, the output of the Adder is the word read out of Memory to the Memory Register during the Execute cycle. This output of the Adder is gated to the Accumulator Register, as the line R SUB goes positive, and via the OR circuit 506d, of FIG. 5ae, and line 507d conditions the AND circuit 508d. The AND circuit 508d, being conditioned, passes the E/R4 (D1) signal via line 509d, the OR circuit 514d, the amplifier 515d and the cathode follower 516d to the line ADDER TO ACC. At this point, the numerical information read out of Memory is now in the Accumulator Register. The sign position of the Accumulator Register is taken care of as follows:

Referring to FIG. 5bf, if the operation is Reset Subtract and the Memory Register sign is negative, the line RS MR (−) is positive, as explained above, and via the OR circuit 510f and line 511f conditions the AND circuit 512f. The AND circuit 512f, while conditioned, passes the E/R10 (D1) signal via the amplifier 513f and the cathode follower 514f to the line (+) TO ACC (S), to thereby place a positive sign representation in the Accumulator Register sign order. However, if the output of the Reset Subtract Execution Timer drives line RS MR (+) positive, which signifies, as explained above, that the operation is Reset Subtract and the Memory Register sign is positive, then the positive signal passes through the OR circuit 515f, of FIG. 5bg, and via line 516f to condition the AND circuit 517f. The AND circuit 517f, while conditioned, passes the E/R10 (D1) signal via the amplifier 518f and the cathode follower 519f to the line (−) TO ACC (S) to thereby set a negative sign representation in the Accumulator Register sign order.

The End of Operation signal is developed as the line R SUB goes positive and passes through the OR circuit 520d, of FIG. 5af, and line 521d to condition the AND circuit 522d. The AND circuit 522d, being conditioned, passes the E/R10 (D2) signal via line 523d, the OR circuit 528d, the amplifier 529d, and the cathode follower 530d to the line END OP. The two microsecond End of Operation signal, on line END OP, also passes through the normally conditioned AND circuit 568d of FIG. 5aj and via the amplifier 569d and the cathode follower 570d to the line STEP INST CTR to thereby step the Instruction Counter (FIG. 4d).

*Store*

Refer now to FIG. 6s, which is the Timing Diagram for a Store operation. The function of the Store Instruction is to store the contents of the Accumulator Register in Memory. A full word in the Accumulator Register may be stored in a full word Address in Memory or the more significant half word in the Accumulator Register including the Sign bit may be stored in either an even or an odd half word Address in Memory. The contents of the Accumulator Register will remain therein, unaltered, after the execution of the Store Instruction. An I9 (D1) signal is generated for gating the half word instruction from Memory Buses to the Memory Register, and, thereafter, an I10 (D1) signal is generated, as described above, for gating the Instruction from the Memory Register into the Instruction Register. Thereafter, a GO TO EX signal is emitted to send the machine into an Execution cycle. At approximately I10 time, as the Operation Decorder receives signals representing the Operation portion of the Instruction, that is, bits 1 through 5 from Instruction Register and thereby causes its output line STORE to go positive, a PREPARE FOR MEM RI (prepare for Memory read in) signal is generated. This signal stays positive until another Instruction is read into the Operation Decorder. When the Memory is prepared for read in, and the machine enters an Execution cycle, a full word, an even half word or an odd half word is gated from the Accumulator Register to the Memory Buses and thus is stored in Memory. An E8 (D2) signal is utilized to gate the output of the Accumulator Register to the Memory Buses. At E10 (D2) time, an End of Operation signal is emitted and a like signal is emitted to step the Instruction Counter.

If the Store Instruction selects a full word address, orders S and 1 through 35 of the Accumulator Register are fed through Memory Bus Switch circuits to the Memory Buses S and 1 through 35 and bits S and 1 through 35 are stored in Memory. However, if the address is for an even half word, the Accumulator Register orders S and 1 through 35 are gated via the Memory Bus Switch circuits to the Memory Buses S and 1 through 35, but, as described in the application of Fox et al., only the Memory units, addressed and receiving signals via Memory Buses S and 1 through 17, are unblanked to store informaion. In effect, only information bits from orders S and 1 through 17 of Accumulator Register are stored in Memory. If the Store Instruction selects an odd half word, the holding of the Accumulator Register orders S and 1 through 17 are transferred by the Memory Bus Switch circuits to Memory Buses 18 through 35, and are stored in Memory Units 18 through 35, as described in the application of Fox et al. referred to above.

The I9 (D1) and I10 (D1) signals for gating a half word Instruction from Memory Buses to the Memory Register for gating this Instruction from the Memory Register to the Instruction Register are developed by the circuits of FIG. 5z, described above. A GO TO EX signal is emitted to send the machine into an Execution cycle, as the line STORE goes positive and via the OR circuit 523e, of FIG. 5ar, and line 524e in combination with the positive signal on the NO EXT CYC line, if no interruption has occurred, conditions the AND circuit 525e. The AND circuit 525e, while conditioned, passes an I11 (D1) signal via the amplifier 526e and the cathode follower 527e to the line GO TO EX. Referring to FIG. 5am, as the signal on line STORE goes positive, which occurs at approximately 10 time of the Instruction cycle, it passes via an OR circuit 586d, an amplifier 587d and a cathode follower 588d to the line PREP MEM RI. As described in the application of Fox et al., the signal on the latter line prepares the Memory for read-in.

Refer now to FIG. 5p, which is the Store Execution Timer. A positive signal on the line STORE conditions one input of each of the AND circuits 562b and 564b. The AND circuit 564b also receives a signal via line F/E HALF, which is positive when a full or even half word is addressed. Therefore, the output of the AND circuit 562b passes via the cathode follower 563b to the line ST F/E HALF and is positive when the Instruction is Store and when a full or even half word is addressed. The AND circuit 564b receives a second input via the line ODD HALF, which is positive when an odd half word is addressed. Therefore, the output of the AND circuit 564b passes via the cathode follower 565b to the line ST ODD HALF and is positive when the operation is Store and an odd half word is addressed.

Refer now to FIG. 5ax, wherein if the operation is Store and a full or even half word address is selected, the line ST F/E HALF feeds via an OR circuit 570e to condition an AND circuit 571e. The AND circuit 571e, while conditioned, passes the E8 (D2) signal via an amplifier 572e and a cathode follower 573e to the line ACC (S to 35) TO MEM bus (S to 35). This signal is effective to connect outputs to the Accumulator Register S and 1 through 35 orders to the Memory Buses S and 1 through 35, respectively. However, if the operation were Store and an odd half word address is selected, the line ST ODD HALF feeds via an OR circuit 574e, of FIG. 5ay, to condition an AND circuit 575e. The AND circuit 575e, while conditioned, passes the E8 (D2) signal via an amplifier 576e and a cathode follower 577e to the line ACC (S to 17) TO MEM Bus (18 to 35). A positive signal on the latter line causes outputs of the Accumulator Register S and 1 through 17 orders to be gated to the Memory Buses 18 through 35, and this information is stored in Memory Units 18 through 35, as described in the application of Fox et al.

The End of Operation signal is generated as line STORE goes positive and feeds via the OR circuit 524d, of FIG. 5af, via line 525d to condition the AND circuit 526d. The AND circuit 526d, while conditioned, passes the E10 (D2) signal via line 527d, the OR circuit 528d, the amplifier 529d and the cathode follower 530d to the line END OP. The End of Operation signal of two microseconds duration on line END OP also passes through the normally conditioned AND circuit 568d of FIG. 5aj and via the amplifier 569d and the cathode follower 570d to the line STEP INST CTR.

*Store MQ*

Refer now to FIG. 6t, which is the Timing Diagram for a Store MQ Instruction. The function of the Store MQ Instruction is similar to that just described above except that information is gated from the MQ Register rather from the Accumulator Register to the Memory Buses.

The I9 (D1) and I10 (D1) signals for gating a half word Instruction from the Memory Buses to the Memory Register and for gating the Instruction from the Memory Register to the Instruction Register are generated by the circuits of FIG. 5z, described above. The GO TO EX signal is developed as a positive signal occurs on the line STORE MQ and feeds via the OR circuit 523e, of FIG. 5ar, and via line 524e in combination with the positive signal on NO EXT CYC line, if no interruption has occurred, to condition the AND circuit 525e. The AND circuit 525e, while conditioned, passes the I11 (D1) signal via the amplifier 526e and the cathode follower 527e to the line GO TO EX. A PREPARE MEM RI signal is developed by the circuits on FIG. 5am. As the signal on line STORE MQ goes positive, at approximately 10 time of the Instruction cycle as the output of the Operation Decoder changes, it passes via the OR circuit 586d, the amplifier 587d and the cathode follower 588d to the line PREP MEM RI.

Refer now to FIG. 5q, which is the Execution Timer for a Store MQ operation. The line STORE MQ going positive conditions one input of each of the AND circuits 566b and 568b. The AND circuit 566b also receives a signal via line F/E HALF, which is positive when a full or an even half word address is selected. Therefore, the output of the AND circuit 566e passes via the cathode follower 567b to the line ST MQ F/E HALF and is positive when the operation is Store MQ and a full or even half word address is selected. The AND circuit 568b receives a second input via line ODD HALF, which is positive when an odd half word address is selected. The output of the AND circuit 568b passes via the cathode follower 569b to the line ST MQ ODD HALF and is positive when the operation is Store MQ and an odd half word address is selected.

Referring to FIG. 5az, if the operation is Store MQ and a full or even half word address is selected, the line ST MQ F/E HALF is positive and conditions and AND circuit 579e. The AND circuit 579e, while conditioned, passes the E8 (D2) signal via an amplifier 580e and a cathode follower 581e to the line MQ (S to 35) TO MEM BUS (S to 35). A positive signal on the latter line is effective to gate information from the MQ Register S to 35 orders to the Memory Buses S to 35, respectively. If, however, the operation is Store MQ, and an odd half word address is selected, the line ST MQ ODD HALF is positive and conditions an AND circuit 593e of FIG. 5bc. The AND circuit 593e, while conditioned, passes the E8 (D2) signal via an amplifier 594e and a cathode follower 595e to the line MQ (S to 17) to MEM BUS (18 to 35), a positive signal on the latter line is effective to gate information from the MQ register S to 17 orders to the Memory Buses 18 to 35, respectively.

Referring to FIG. 5af, an End of Operation signal is developed as the signal on line STORE MQ goes positive, and feeds via the OR circuit 524d and line 525d to condition the AND circuit 526d. The AND circuit 526d, being conditioned, passes the E10 (D2) signal via line 527d, the OR circuit 528d, the amplifier 529d and the cathode follower 530d to the line END OP. The two microsecond End of Operation signal on line END OP is passed through the normally conditioned AND circuit 568d, of FIG. 5aj, and via the amplifier 569d and the cathode follower 570d to the line STEP INST CTR.

Store Address

Refer now to FIG. 6u, which shows the Timing Diagram for a Store Address operation. The function of a Store Address is to transfer the holding of the Accumulator Register orders 6 through 17 to Memory Units 6 through 17 if an even half word address is selected, but if an odd half word address is selected, Accumulator Register orders 6 through 17 are stored in Memory Units 24 through 35, respectively. A half word address is always selected with a Store Address Instruction, and the effect is to change the address portion of a selected stored Instruction. The Timing Diagram for a Store Address operation is identical to the Timing Diagram for the Store operation, described above. The Store Address operation differs from a Store operation in that during a Store Address operation only Memory Units 6 through 17 are unblanked for an even half word address, or positions 24 through 35 for an odd half word address. The unblanking of these Memory Units is shown and described in the application of Fox et al. mentioned above. If a full word address should be given with a Store Address Instruction, the operation then performed, as described in the application of Fox et al., is Extract.

During the Instruction cycle during which a Store Address Instruction is read from Memory, the I9 (D1) and I10 (D1) signals for gating the half word Instruction from the Memory Buses to the Memory Register, and for gating the half word Instruction from the Memory Register to the Instruction Register are developed by the circuits of FIG. 5z described above. The GO TO EX signal, to send the machine into an Execute cycle, is developed as the line STORE ADR is positive and feeds via the OR circuit 523e, of FIG. 5ar, and line 524e in combination with the positive signal on the NO EXT CYC line, if no interruption has occurred, to condition the AND circuit 525e. The AND circuit 525e, while conditioned, passes the I11 (D1) signal via the amplifier 526e and the cathode follower 527e to the line GO TO EX.

During a Store Address operation, the signal preparing Memory for read in is also developed. As the signal on line STORE ADR goes positive, at approximately 10 time of the Instruction cycle, it passes via the OR circuit 586d of FIG. 5am, and via the AND circuit 587b and the cathode follower 588d to the line PREP MEM RI. This signal, as described above, stays positive, until another Instruction is read from Memory.

Refer now to FIG. 5t, which is the Execution Timer for a Store Address operation. The line STORE ADR, going positive, conditions one input of the AND circuits 593b and 595b. The AND circuit 593b, receives a second input via line F/E HALF, which is positive, when a full or even half word addresses is selected. However, it should be noted that during the Store Address operation, as explained above, only half word addresses are selected, so that the line F/E HALF is positive during a Store Address operation when an even half word address is selected. Therefore, the output of the AND circuit 593b feeds via the cathode follower 594b to the line ST AD F/E HALF and is positive when the operation is Store Address and an even half word address is selected. The AND circuit 595b receives a second input via line ODD HALF, which is positive when an odd half word address is selected. Therefore, the output of the AND circuit 595b feeds via the cathode follower 596b to the line ST AD ODD HALF and is positive when the operation is Store Address and an odd half word address is selected.

If the operation is Store Address and an even half word address is selected the line ST AD F/E HALF is positive and via the OR circuit 570e, of FIG. 5ax, to condition the AND circuit 571e. The AND circuit 571e, while conditioned, passes the E8 (D2) signal via the amplifier 572e and the cathode follower 573e to the line ACC (S to 35) to MEM BUS (18 to 35). A positive signal on the latter line, as described below, gates the Accumulator Register outputs for orders S through 35, to Memory Buses S through 35, but only orders 6 through 17 are stored in Memory, as those are the only positions in Memory unblanked. If during a Store Address operation, an odd half word address is selected, the line ST AD ODD HALF is positive, and via the OR circuit 574e, of FIG. 5ay, conditions the AND circuit 575e. The AND circuit 575e, while conditioned, passes the E8 (D2) signal via the amplifier 576e and the cathode follower 577e to the line ACC (S to 17) to MEM BUS (18 to 35). A positive signal on the latter line is effective, as explained below, to gate Accumulator Register outputs for orders S through 17 to the Memory Buses 18 through 35. Although information is thereby gated to Memory Buses 18 through 35, only the information on Memory Buses 24 to 35 is stored in Memory because only Memory units 24 through 35 are unblanked, as explained in the application of Fox et al., during a Store Address operation as an odd half word address is selected. The End of Operation signal is developed by the circuits of FIG. 5af. During a Store Address operation, the line ST ADR is positive, and feeds via the OR circuit 524d and the line 525d to condition the AND circuit 526d. The AND circuit 526d, while conditioned, passes the E10 (D2) signal via line 527d, the OR circuit 528d, the amplifier 529d, and the cathode follower 530d to the line END OP. The two microsecond End of Operation signal on line END OP passes through the normally conditioned AND circuit 568d, of FIG. 5aj, and via the amplifier 569d and the cathode follower 570d to the line STEP INST CTR, thereby causing the Instruction counter to be stepped.

Long Shift Left

Refer now to FIG. 6v, which shows the Timing Diagram for a Long Shift Left operation. The function of the Long Shift Left Instruction is to shift the contents of the Accumulator Register and the MQ register, jointly, as one Register, any desired number of places to the left from 0 to 255. Neither the sign bit of the Accumulator or MQ Registers is shifted.

Thus, during Instruction time, an Instruction calling for a Long Shift Left operation is read out of Memory to the Memory Buses and is gated to the Memory Register by an I9 (D1) pulse and from the Memory Register to the Instruction Register by an I10 (D1) pulse. The address portion of this Instruction is indicative of the number of shifts required and as the Instruction is gated to the Instruction Register, the address Counter portion of the Instruction Register is set to the number of shifts required. An I11 (D1), GO TO EX/RGN signal is emitted to send the machine into an Execute/Regenerate cycle. As mentioned above, the maximum number of shifts during the operation is 255, which is the maximum number of counts which may be counted by the Address Counter. As explained below, a shift of eight positions is possible during one Execute/Regenerate cycle, therefore, the maximum number of Execute/Regenerate cycles, in any one Long Shift Left operation is 32 or 255 divided by eight. As noted on the Timing Diagram of FIG. 6v, during Execute/Regenerate cycles, E/R1 (D8) signals are emitted to shift the Accumulator Register left, to shift the MQ Register left to connect the MQ 1 order to the Accumulator Register 35 order and also to step the Address Counter. These four signals are emitted as long as the Address Counter does not equal zero. The signals on the lines SHIFT ACC LEFT, SHIFT MQ LEFT and MQ (1) TO ACC (35), are effective to shift the Accumulator Register and the MQ Register, connected together as one register, one position to the left for each microsecond that the signals on the respective lines are positive. At the same time, the signal on the line STEP ADR CTR is effective to gate Sync pulses to the Address Counter. The Address Counter is stepped downward a count of 1, every microsecond and therefore counts at the rate of eight counts per Execute/Regenerate cycle, until the number of shifts called for by the address portion of the Instruction has taken place. As the Address Counter reaches zero, the signals on lines SHIFT ACC LEFT, SHIFT MQ LEFT, MQ (1) TO ACC (35) and STEP ADR CTR go negative and thereby stop the shift operation and also stop the stepping of the address Counter. At the same time, the shifts are taking place as long as the Address Counter does not equal zero and as the Accumulator Register 1 order contains a binary 1, the Accumulator Register 1 order is connected to the Overflow trigger to turn the latter on. Thus, whenever the Accumulator Register 1 order contains a binary 1, and this binary 1 is shifted to the left to the overflow orders P and Q, the overflow trigger is turned on to indicate an overflow has occurred. If the Address Counter reaches zero, midway through an Execute/Regenerate cycle, signals for effecting the shift, for stepping of the Address Counter and for connecting the Accumulator Register 1 order to the overflow trigger, go negative.

Assuming the Address Counter is stepped to zero during the fifth microsecond of an Execute/Regenerate cycle, as it would for a shift of say 12, 20, 28, etc., the signals on lines SHIFT ACC LEFT, SHIFT MQ LEFT, MQ (1) TO ACC (35) and STEP ADR CTR go negative as indicated by the dotted portion on the Timing Diagram of the last Execute/Regenerate cycle. During every Execute/Regenerate cycle on the Long Shift Left operation, the Accumulator Register sign order is set to agree with the MQ Register sign order. Thus, if the Accumulator Register sign order is positive, an E/R10 (D1) signal on line (+) TO ACC (S) is emitted to place a positive sign in the representation in the Accumulator Register sign order, but if the MQ Register sign is negative an E/R10 (D1) signal on line (—) to ACC (S) is emitted to set a negative sign representation in the Accumulator Register sign position. Of course, once the Accumulator Register sign is set positive or negative, as the case may be, during the first Execute/Regenerate cycle, thereafter the emission of the E/R10 (D1) signals has no effect. It should also be noted that if the Instruction called for Long Shift Left of 0 positions the result is that the Accumulator Register Sign is made to agree with MQ Register Sign, the shift then being of 0 positions. After the shift of the required number of positions has taken place, the machine is in or enters Execute/Regenerate cycle. During this last Execute/Regenerate cycle an End of Operation signal and a signal for stepping the Instruction Counter are emitted.

The I9 (D1) and I10 (D1) signals for gating a half word Instruction from the Memory Buses to the Memory Register and from the Memory Register into the Instruction Register, are generated by the circuits of FIG. 5z, described above. The signal occurring on I11 (D1) time, for sending the machine into an Execute/Regenerate cycle, is developed as the line L LEFT, which is an output of the Operation Decoder, goes positive and via the OR circuit 575d, of FIG. 5ak, and line 576d in combination with the positive signal on the NO EXT CYC line, if no interruption has occurred, conditions the AND circuit 577d. The AND circuit 577d, being conditioned, passes an I11 (D1) signal, via line 578d, the OR circuit 583d, the amplifier 584d, and the cathode follower 585d, to the line GO TO EX/RGN. The machine going into Execute/Regenerate cycles will remain in Execute/Regenerate cycles, until a signal is emitted to send the machine into another type of cycle, and no such signal is emitted until the End of Operation signal occurs, as the operation is completed.

Refer now to FIG. 5w, which is the Execution Timer for a Long Shift Left operation. The positive signal on the line L LEFT conditions one input of each AND circuit 519d, 521c, 523c and 525c. The AND circuit 519c, receives a second input via line ADR CT NO ZERO, which is positive when the Address Counter is not at zero, thereby indicating that the Address Counter has not counted the desired number of counts. The outputs of the AND circuit 519c feeds via the OR circuit 520c to the line LL ADR CT NO ZERO and is positive when the operation is Long Shift Left and the Address Counter has not counted to zero. The AND circuit 521c receives a second input from the line ADR CT ZERO, which is positive when the Address Counter has counted to zero. The output of the AND circuit 521c passes via the cathode follower 522c to the line LL ADR CT ZERO and is positive, when the operation is Long Shift Left and the Address Counter has counted to zero. The AND circuit 523c receives a second input via line MQ (+), which is positive when the MQ Register sign is positive. The output of the AND circuit 523c passes via the cathode follower 524c to the line LL MQ (+) and is positive when the operation is Long Shift Left and the MQ Register Sign is positive. The AND circut 525c receives a second input via line MQ (—), which is positive when the MQ Register Sign is negative. Therefore, the output of the AND circuit 525c passes via the cathode follower 526c to the line LL MQ (—) and is positive when the operation is Long Shift Left and the MQ Register Sign is negative.

Referring to FIG. 5ag, and assuming the operation is Long Shift Left and the Address Counter has not counted to zero, then a positive signal on the line LL ADR CT NO ZERO passes via an OR circuit 539d and line 540d to condition an AND circuit 541d. The AND circuit 541d, while conditioned passes an E/R1 (D8) signal via line 542c, an OR circuit 543c, an amplifier 544d and a cathode follower 545d to the line SHIFT ACC LEFT. Therefore, as long as the Address Counter does not go to zero, during a Long Shift Left operation, an eight microsecond signal occurs on the line SHIFT ACC LEFT during each Execute/Regenerate cycle. However, if mid-way through the Execute/Regenerate cycle, the Address Counter should go to zero, the conditioning potential is removed from the AND circuit 541d as the line LL ADR CT NO ZERO goes negative, and the signal on the line SHIFT ACC LEFT would also go negative.

The signal on the line SHIFT MQ LEFT is developed in the similar manner by the circuits of FIG. 5av. Assuming the operation is Long Shift Left and the Address Counter is not at zero, the positive signal on the line LL ADR CT NO ZERO conditions one input of an AND circuit 554e. The AND circuit 554e, while conditioned, passes the E/R1(D8) signal, via a line 555e, an OR circuit 556e, an amplifier 557e and a cathode follower 558e to the line SHIFT MQ LEFT. The signal on the latter line is an eight microsecond signal occurring during each Execute/Regenerate cycle, until the Address Counter goes to zero. If the address counter goes to zero, between one time and nine time of the Execute/Regenerate cycle, the signal on the line SHIFT MQ LEFT goes negative at the same time.

Referring to FIG. 5ai, a positive signal on the line LL ADR CT NO ZERO, conditions one input of an AND circuit 559d. The AND circuit 559d, while conditioned, passes the E/R1 (D8) signal via the line 560d, an OR circuit 561d, an amplifier 562d and a cathode follower 563d to the line MQ (1) TO ACC (35). A positive signal on this latter line is effective, as explained below, to connect the MQ Register 1 order to the Accumulator Register 35 order, so that as both the Accumulator Register and the MQ Register are shifted to the left they operate as one register.

Referring to FIG. 5as, a positive signal on the line LL ADR CT NO ZERO feeds via the OR circuit 534e and 535e to condition the AND circuit 536e. The AND circuit 536e, while conditioned, passes the E/R1 (D8) signal via line 537e, an OR circuit 538e, an amplifier 539e and a cathode follower 540e to the line STEP ADR CTR. A positive signal on the latter line, as explained above, gates the Sync pulses to the Address Counter (FIG. 4c), so that during each microsecond the line STEP ADR CTR is positive, the Address Counter is stepped one count. It should also be noted that the signal on the line STEP ADR CTR goes negative as the Address Counter counts to zero.

The line LL ADR CT NO ZERO, when positive, also passes via an OR circuit 512e, of FIG. 5aq, and line 513e to condition an AND circuit 514e. The second input to the AND circuit 514e is via line ACC (1), which is positive when the Accumulator Register 1 order contains a binary 1. The AND circuit 514e, while conditioned, passes an E/R1 (D8) signal via line 515e, the OR circuit 520e, the amplifier 521e and the cathode follower 522e to the line AD (+) C/ACC (1) OV. The latter line going positive turns on the overflow trigger (FIG. 5a), described above. This means that if the Accumulator Register is being shifted to the left, and a binary 1 occurs in the Accumulator Register 1 order, that binary 1 is shifted to the overflow positions P and Q. This overflow is effectively noted as the Overflow trigger is turned on.

Refer now to FIG. 5bf, and assuming that the operation is Long Shift Left and the MQ Register Sign is positive, the positive signal on line LL MQ (+) feeds via the OR circuit 510f and line 511f to condition the AND circuit 512f. The AND circuit 512f, while conditioned, passes E/R10 (D1) signal via the amplifier 513f and the cathode follower 514f to the line (+) TO ACC (S). The signal on the latter line is effective to store a positive sign representation in the Accumulator Register Sign position. As mentioned above, this E/R10 (D1) signal occurs on line (+) TO ACC (S) during each Execute/Regenerate cycle of a Long Shift Left operation, but is effective only during the first Execute/Regenerate cycle of the operation.

If, however, during a Long Shift Left operation, the MQ Register Sign is negative, a positive signal on line LL MQ (−) feeds via the OR circuit 515f, of FIG. 5bg, and line 516f to condition the AND circuit 517f. The AND circuit 517f while conditioned passes an E/R10 (D1) signal via the amplifier 518f and the cathode follower 519f to the line (−) TO ACC (S) to thereby set a negative sign representation in the Accumulator Register sign order.

As mentioned above, the End of Operation signal, during a Long Shift Left operation, is not developed until the Address Counter reaches zero. Referring to FIG. 5af, the line LL ADR CT ZERO, which is positive during a LONG SHIFT LEFT operation when the Address Counter is at zero, feeds via the AND circuit 520d and line 521d to condition the AND circuit 522d. The AND circuit 522d, while conditioned, passes the E/R-0 (D2) signal via line 523d, the OR circuit 528d, the amplifier 529d, and the cathode follower 530d to the line END OP. This two microsecond End of Operation signal on line END OP besides feeding to the Cycle Timer, also feeds via the normally conditioned AND circuit 568d, of FIG. 5aj, and via the amplifier 569d and the cathode follower 570d to the line STEP INST CTR. Thus, it is seen signals are developed during a Long Shift Left operation so that the Accumulator Register and the MQ Register are connected together as one register and are shifted to the left a maximum of eight positions during each Execute/Regenerate cycle. If a binary 1 is shifted to the left beyond the Accumulator Register 1 order, the Overflow trigger is turned On. The Accumulator Register Sign is set to the holding of the MQ Register Sign, and after shifting the required number of positions (a maximum of 255 positions and a maximum of eight positions per Execute/Regenerate cycle), an End of Operation signal and an STEP INST CTR are emitted.

Long Shift Right

Refer now to FIG. 6w, which is the Timing Diagram for a Long Shift Right operation. The function of the Long Shift Right Instruction is similar to the Long Shift Left Instruction except that the shifting of the Accumulator and MQ Registers is jointly to the right rather than to the left and no signals are required to be gated to the Overflow trigger since the binary 1's will be shifting in a direction away from the Overflow position and also during a Long Shift Right operation, the Accumulator Register sign is transferred to the MQ sign order.

Thus, during Instruction time, the signals developed are identical to those described in the Long Shift Left, just explained. The machine goes into Execute/Regenerate cycles and during each Execute/Regenerate cycle, as long as the Address Counter does not go to zero, the E/R (D8) signal are developed for shifting the Accumulator Register to the right, for shifting the MQ Register to the right (which signal is also effective to connect the 35 order of the Accumulator Register to the MQ Register 1 order), and for stepping the Address Counter. These signals will be developed for as many Execute/Regenerate cycles as are required until the Address Counter goes to zero. During a Long Shift Right operation, the MQ Register sign order is set to the holding of the Accumulator Register sign order. Therefore, if the Accumulator Register sign is positive, a E/R10 (D1) signal on line (+) TO MQ (S) occurs, to set the Accumulator Register Sign order to represent a positive sign. If, however, the Accumulator Register sign is negative, an E/R10 (D1) signal is emitted on line (−) TO MQ (S) to set a negative sign representation in the Accumulator Register Sign order. These signals are developed during all Execute/Regenerate cycles until the number of required shifts has been completed and as the Address Counter goes to zero, these positive signals are terminated. During the last Execute/Regenerate cycle, which is the Execute/Regenerate cycle during which, or before which, the Address Counter goes to zero, an End of Operation and a Step Instruction Counter signals are emitted.

The I9 (D1) and the I10 (D1) signals, for gating a half word Instruction from the Memory Buses into the Memory Register and from the Memory Register to the Instruction Register, are developed by the circuits of FIG. 5z, described above. A GO TO EX/RGN signal is developed by the circuits on FIG. 5ak, as the line L RIGHT goes positive and via the OR circuit 575d and the line 576d in combination with the positive signal on the NO EXT CYC line, if no interruption has occurred, conditions the AND circuit 577d. The AND circuit 577d, while conditioned, passes the I11 (D1) signal via line 578d, the OR circuit 583d, the amplifier 584d and the cathode follower 585d to the line GO TO EX RGN.

Refer now to FIG. 5x, which is the Execution Timer for a Long Shift Right operation. The line L RIGHT going positive, conditions one input of each AND circuit 527c, 529c, 531c and 533c. The AND circuit 527c receives a second input via line ADR CT NO ZERO, which is positive when the Address Counter has not counted to zero. The output of the AND circuit 527c feeds via the cathode follower 528c to the line LR ADR CT NO ZERO and is positive, when the operation is Long Shift Right and the Address Counter has not counted to zero. The AND circuit 529c receives a second input via line ADR CT ZERO, which is positive when the Address Counter has counted to zero. The output of the AND circuit 529c passes via the cathode follower 530c to line LR ADR CT ZERO and is positive when the operation is Long Shift Right and the Address Counter has counted to zero. The AND circuit 531c receives a second input via the line ACC (+) which is positive when the Accumulator Register Sign is positive. The output of the AND circuit 531c passes via the cathode follower 532c to the line LR ACC (+) and is positive when the operation is Long Shift Right and the Accumulator Register sign is positive. The AND circuit 533c receives its second input via line ACC (−), which is positive when the Accumulator Regster sign is negative. The output of the AND circuit 533c passes via the cathode follower 534c to line LR ACC (−) and is positive when the operation is Long Shift Right and the Accumulator Register sign is negative.

Referring to FIG. 5ah, and assuming that the operation is Long Shift Right and the Address Counter has not counted to zero, the line LR ADR CT NO ZERO is positive and via an OR circuit 546d and line 547d conditions an AND circuit 548d. The AND circuit 548d, being conditioned, passes the E/R (D8) signal via line 549d, an OR circuit 552d, an amplifier 553d, and a cathode follower 554d to the line SHIFT ACC RIGHT. The signal on the latter line will remain positive, for eight microseconds unless the Address Counter goes to zero, which would remove the conditioning potential from the AND circuit 548d and therefore, cause the line SHIFT ACC RIGHT to go negative. It should be noted that as long as the machine remains in a Long Shift Right operation, and as long as the Address Counter does not go to zero, the machine remains in an Execute/Regenerate cycles, and an E/R1 (D8) signal is gated to the line SHIFT ACC RIGHT.

Referring to FIG. 5ag, a positive signal on the line LR ADR CT NO ZERO conditions the AND circuit 542e. The AND circuit 542e while conditioned, passes the E/R1 (D8) signal via an OR circuit 543e, an amplifier 544e and a cathode follower 545e, to the line SHIFT MQ RIGHT. A positive signal on the latter line is effective to shift the MQ Register to the right, one position for each microsecond that the line is positive, and also for connecting the Accumulator Register 35 order to the MQ Register 1 order. The signal on the latter line occurs during each Execute/Regenerate cycle, and is eight microseconds in duration, until the Address Counter counts to zero.

Referring to FIG. 5as, a positive signal on the line LR ADR CT NO ZERO passes via the OR circuit 534e and line 535e to condition the AND circuit 536e. The AND circuit 536e, when conditioned, passes the E/R1 (D8) signal via line 537e, the OR circuit 538e, the amplifier 539e and the cathode follower 540e to the line STEP ADR CTR and thereby cause a stepping on the Address Counter (see FIG. 4c), one count, for each microsecond the line STEP ADR CTR is positive. This line STEP ADR CTR remains positive, until the Address Counter reaches a count of zero, at which time the line LR ADR CTR NO ZERO goes negative, and thereby removes the conditioning potential from the AND circuit 536e. Until the Address Counter reaches zero, however, the eight microseconds signals occur during each Execute/Regenerate cycle until the Adress Counter does count to zero.

Referring to FIG. 5bh, if the operation is Long Shift Right and the Accumulator Register sign is positive, the line LR ACC (+) is positive and via an OR circuit 520f and line 521f conditions an AND circuit 522f. The AND circuit 522f, while conditioned passes an E/R10 (D1) signal via an amplifier 523f and a cathode follower 524f to the line (+) TO MQ (S) to thereby set a positive sign representation into the MQ Register sign order. However, if the operation is Long Shift Right and the Accumulator Register sign is negative, the line LR ACC (−) is positive and feeds via an OR Circuit 525f, of FIG. 5bi and line 526f to condition the AND circuit 527f. The AND circuit 527f, while conditioned, passes the E/R10 (D1) signal via amplifier 528f, and a cathode follower 529f to the line (−) TO MQ (S) to thereby set a negative sign representation into the MQ Register sign order. The End of Operation signal and the STEP INST CTR signal are developed only during the last Execute/Regenerate cycle when the Address Counter has stepped to zero. The End of Operation signal is developed by the circuits of FIG. 5af. The line LT ADR CT ZERO which is positive when the operation is Long Shift Right and the Address Counter has counted to zero, feeds via the OR circuit 520d and line 521d to condition the AND circuit 522d. The AND circuit 522d, while conditioned, passes the E/R10 (D2) signal via line 523d, the OR circuit 528d, the amplifier 529d, and the cathode follower 530d to the line END OP. This two microsecond End of Operation signal, besides feeding to the Cycle Timer, is also passed through the normally conditioned AND circuit 568d, of FIG. 5aj, and via the amplifier 569d and the cathode follower 570d to the line STEP INST CTR.

Shift Accumulator Left

Refer now to FIG. 6x, which is the Timing Diagram for an Shift Accumulator Left operation. The function of the Shift Accumulator Left Instruction is to shift the holding of the Accumulator Register to the left any desired number of places from 0 to 255. However, the sign bit in the Accumulator Register is not shifted in the execution of this Instruction.

Thus, during Instruction time, the I9, (D1) signal and I10 (D1) signals for gating a half word Instruction from the Memory Buses to the Memory Register and from the Memory Register to the Instruction Register, are developed by the circuits of FIG. 5z, described above.

The signal for sending the machine into an Execute/Regenerate cycle is developed by the circuits of FIG. 5ak. During Shift Accumulator Left operation, the ACC LEFT goes positive and feeds via the OR circuit 575g and line 576e in combination with a positive signal on the NO EXT CYC line, if no interruption has occurred, to condition the AND circuit 577d. The AND circuit 577d, while conditioned, passes the I11 (D1) signal, via line 578d, the OR circuit 583d, the amplifier 584d, and the cathode follower 585d to the line GO TO EX/RGN.

Refer now to FIG. 5v, which is the Execution Timer for an Shift Accumulator Left operation. The line ACC LEFT, which is an output of the Operation Decoder goes positive and conditions one input of each AND circuit 515c and 517c. The AND circuit 515c, receives a second input via line ADR CT NO ZERO, which is positive when the Address Counter has not counted to zero. The output of the AND circuit 515c, feeds via the cathode follower 560c to the line AL ADR CT NO ZERO and is positive when the operation is Shift Accumulator Left while the Address Counter has not counted to zero. The AND circuit 517c receives a second input via line ADR CT ZERO, which is positive when the Address Counter has counted to zero. The output of the AND circuit 517c passes via the cathode follower 518c to the line AL ADR CT ZERO and is positive when the operation is Shift Accumulator Left and the Address Counter has counted to zero.

During the Execute/Regenerate cycles, while the operation is Shift Accumulator Left and the Address Counter has not counted to zero, the line AL ADR CT NO ZERO goes positive and via the OR circuit 539d and the line 540d conditions the AND circuit 541d. The AND circuit 541d, while conditioned, passes the E/R1 (D8) signal via line 542d, the OR circuit 543d, the amplifier 544d, and the cathode follower 545d to the line SHIFT ACC LEFT. Each microsecond that the latter line is positive causes, as explained below, the Accumulator Register to shift one position to the left. The line SHIFT ACC LEFT goes positive, for eight microseconds during each Execute/Regenerate cycle, until the Address Counter counts to zero. The line AL ADR CT NO ZERO, while positive, also feeds via the OR circuit 534e, of FIG. 5as, and line 535e to condition the AND circuit 536e. The AND circuit 536e, while conditioned, passes the E/R1 (D8) signal via line 537e, the OR circuit 538e, the amplifier 539e and the cathode follower 540e, to the line STEP ADR CTR. Each microsecond the latter line is positive it gates a Sync pulse to the Address Counter to step that counter one count.

The line AL ADR CT NO ZERO, while positive, also feeds via the OR circuit 512e, of FIG. 5aq, and via line 513e conditions one input of the AND circuit 514e. The AND circuit 514e, also receives a signal via line ACC (1), which is positive when the Accumulator Register 1 order contains a binary 1. While the AND circuit 514e is conditioned, it passes an E/R1 (D8) signal via line 515e, the OR circuit 520e, the amplifier 521e and the cathode follower 522e to the line AD (1) C/AAC (1) OV, and thereby causes the overflow trigger to be turned on. It should be noted that the overflow trigger is turned on in this instance, only if a binary 1 is shifted from the Accumulator Register 1 order to the overflow orders P and Q. The End of Operation signal is developed by the circuits of FIG. 5af, during the Execute/Regenerate cycle that the Address Counter has counted to zero. As the line AL ADR CT ZERO goes positive, it feeds via the OR circuit 520d and line 521d to condition the AND circuit 522d. The AND circuit 522d, being conditioned, passes the E/R10 (D2) signal via line 523d, the OR circuit 528d, the amplifier 529d and the cathode follower 530d to the line END OP. This two microsecond End of Operation signal on line END OP is also passed through the normally conditioned AND circuit 568d of FIG. 5aj, and via the amplifier 569d, and the cathode follower 570d, to the line STEP INST CTR.

*Shift Accumulator Right*

Refer now to FIG. 6y, which is the Timing Diagram for a Shift Accumulator Right operation. The signals represented on this Timing Diagram are identical to those described in FIG. 6w, for the Long Shift Right operation, except that no signals are emitted to shift the MQ register, nor are any signals emitted for setting the MQ Register sign positions. No signals are required for the control of the MQ Register, since the Shift Accumulator Right operation involves shifting of the Accumulator Register only.

The I9 (D1) and I10 (D1) signals for gating the half word Instruction from the Memory Buses to the Memory Register and for gating the Instruction from the Memory Register to the Instruction Register are developed by the circuits of FIG. 5z, described above.

The GO TO EX/RGN signal, which sends the machine into Execute/Regenerate cycles, is developed by the circuits of FIG. 5ak. As the line ACC RIGHT which is an output of the Operation Decoder goes positive, it feeds via the OR circuit 575d and line 576d in combination with a positive signal on the NO EXT CYC line, if no interruption has occurred, to condition the AND circuit 557d. The AND circuit 577d, being conditioned, passes the I11 (D1) signal via line 578d, the OR circuit 583d, the amplifier 584d and the cathode follower 585d to the line GO TO EX/RGN.

Refer now to FIG. 5y, which is the Execution Timer for a Shift Accumulator Right. The positive signal on the line ACC RIGHT conditions one input of each AND circuit 535c and 537c. The second input to the AND circuit 537c is via line ADR CT NO ZERO, which is positive when the Address Counter has not counted to zero. Therefore, the output of the AND circuit 535c, feeding via the cathode follower 536c, to the line AR ADR CT NO ZERO is positive, when the operation is Shift Accumulator Right and the Address Counter has not counted to zero. The AND circuit 537c receives a second input via line ADR CT ZERO, which is positive when the Address Counter has counted to zero. Therefore, the output of the AND circuit 537c, passes via the cathode follower 538c, to line AR ADR CT ZERO and is positive when the operation is a Shift Accumulator Right and the Address Counter has counted to zero.

Referring to FIG. 5ah, if the operation is Shift Accumulator Right and the Address Counter has not counted to zero, the line AR ADR CT NO ZERO is positive and feeds via the OR circuit 546d and the line 547d to condition the AND circuit 548d. The AND circuit 548d, while conditioned, passes an E/R1 (D8) signal via line 549d, the OR circuit 552d, the amplifier 553d, the cathode follower 554d, to the line SHIFT ACC RIGHT. The signal on the latter line then is an eight microsecond signal during each Execute/Regenerate cycle, until the Address Counter counts to zero. At the same time a positive signal on the line AR ADR CT NO ZERO passes via the OR circuit 534e, of FIG. 5as, and line 535e to condition the AND circuit 536e. The AND circuit 536e, while conditioned, passes the E/R1 (D8) signal via line 537e, the OR circuit 538e, the amplifier 539e and the cathode follower 540e to the line STEP ADR CTR. The signal on the latter line is also an eight microsecond signal occurring at one time of each Execute/Regenerate cycle, until the Address Counter counts to zero. Of course, as the Address Counter counts to zero, the signal on the line STEP ADR CTR goes negative, as the conditioning potential is removed from the AND circuit 536e.

As indicated on the Timing Diagram (FIG. 6y) the End of Operation signal and the STEP INST CTR signal are emitted only during the last Execute/Regenerate cycle. Referring to FIG. 5af, if the line AR ADR CT ZERO is positive, it signifies that the operation is Shift Accumulator Right and the Address Counter has counted to zero. The signal on the latter line passes via the OR circuit 520d and line 521d to condition the AND circuit 522d. The AND circuit 522d, while conditioned, passes the E/R10 (D2) signal via line 523d, the OR circuit 528d, the amplifier 529d and the cathode follower 530d to the line END OP. This two microsecond End of Operation signal on line END OP is fed to the Cycle Timer and is also passed through the normally conditioned AND circuit 568d, of FIG. 5aj, and via the amplifier 569d and the cathode follower 570d to the line STEP INST CTR.

*Multiply/Multiply and Round*

Referring now to the composite of FIGS. 6z and 6aa, which shows the Timing Diagram for a Multiply or a Multiply and Round operation. The explanation of the Multiply and the Multiply and Round operations have been combined, since the operations are identical with the exception that during a Multiply and Round operation, a binary 1 may be added to the 35th order of the Accumulator Register to Round off the most significant 35 orders of the product. As mentioned above, before entering a Multiply operation, the MQ Register should be loaded with the Multiplier by a prior Instruction, such as, a Load MQ Instruction or a Long Shift Right Instruction.

The procedure for Multiply is to inspect the least significant order of the MQ, that is, the 35th order during E/R cycles, and, if a binary 1 is contained therein, the multiplicand, entered in the Memory Register, as described presently, is added to the contents of the Accumulator Register, and thereafter, the Accumulator Register and the MQ are jointly shifted, one order to the right. If, however, the MQ order 35 contains a binary 0, the multiplicand is not added to the contents of the Accumulator Register, but the Accumulator Register and the MQ are jointly shifted one order to the right. This procedure is repeated 35 times, that is, once for each order of the MQ and, as the partial product is formed in the Accumulator Register, it is continually shifted into the MQ, thus taking over those orders in which the multiplier was previously stored, while the successive bits of the multiplier are shifted to and through the MQ order 35, in connection with which circuits are provided to determine whether the holding of the MQ 35 order is a binary 1 or a binary 0. The execution of the Multiply and the Multiply and Round Instructions each requires 36 Execute/Regenerate cycles. The functions performed during the Execute/Regenerate #1 cycle and the Execute/Regenerate #36 cycle are identical to those performed during the Execute/Regenerate #2 through Execute/Regenerate #35 cycles. For this reason, the Multiply Divide Tally Counter (FIG. 5b) is employed to distinguish between the different ones of Execute/Regenerate cycles. Thus, the trigger TE of the Multiply Divide Tally Counter is on during an Execute cycle, the trigger T1 is on during Execute/Regenerate #1 cycle, trigger T2 is on during Execute/Regenerate #2 through Execute/Regenerate #35 cycles, and trigger T36 is on during Execute/Regenerate #36 cycle. The counting of the 34 Execute/Regenerate cycles which take place during the time trigger T2 is on is accomplished by the Address Counter. A count of 34 is entered in the Address Counter during the Execute cycle, and during each Execute/Regenerate cycle, the Address Counter is stepped down, one count, and since, as stated above, it is a "count down" counter, the Address Counter will reach zero after 34 Execute/Regenerate cycles have been completed.

During the Instruction cycle, as usual, the half word Instruction, which in this case is a Multiply or a Multiply and Round Instruction is read out of Memory and is gated from the Memory Buses to the Memory Register by an I9 (D1) signal. An I10 (D1) signal gates the Instruction from the Memory Register to the Instruction Register, and an I11 (D1) signal GO TO EX is emitted to send the machine into an Execute cycle. Also during this Instruction cycle, and for that matter during all Instruction cycles, an I9 (D1) signal is emitted to reset a trigger T36 of the Multiply Divide Tally Counter, FIG. 5b, which is explained below.

During the Execute cycle, a signal is emitted at E4 (D1) time for turning a trigger TE on (trigger TE also being a trigger of the Multiply Divide Tally Counter) and also for resetting the Address Counter, as described above. An E8 (D1) signal is emitted for gating a full or half word Multiplicand from the Memory Buses to the Memory Register, and a signal, occurring at the same time, sets the Address Counter to a count of thirty-four. Thereafter, a GO TO EX/RGN signal is emitted at E11 (D1) time.

At "0" time of the Execute/Regenerate 1 cycle, an E/R0 (D1) signal is emitted to turn the trigger TE, of the Multiply Divide Tally Counter, off, and the trigger T1, of the same counter, to an on condition. An E/R1 (D4) signal is emitted to connect the Memory Register to the Adder, provided the 35th order of the MQ Register contains a binary 1. Note, however, the Accumulator Register is not connected to the Adder at this time so that the output of the Adder will be the multiplicand only. An E/R4 (D1) signal is emitted to connect the output of the Adder to the Accumulator Register. If the MQ Register 35 order contained a binary 0, then no information would have been gated to the Adder, and as the Adder output is gated to the Accumulator Register, all orders of the Accumulator Register are reset to zero. However, if the MQ Register 35 order contains a binary 1, thence since the holding of the Memory Register is gated to the Adder, as the Adder output is connected to the Accumulator Register, the multiplicand which is present at in the Memory Register is gated to the Adder and is also gated to the Accumulator Register to replace the word, if any, formerly stored in the Accumulator Register. E/R10 (D1) signals are emitted during this first Execute/Regenerate cycle for shifting the Accumulator Register and the MQ Register, as one register, one order to the right. Since these signals are but one microsecond in duration both the Accumulator Register and the MQ Register, are shifted one order to the right and since signals are applied to both registers, to shift them to the right, the registers are connected together as one register, with the 35th order of the Accumulator Register being connected to the 1 order of the MQ register. The machine then proceeds to another Execute/Regenerate cycle, it being an Execute/Regenerate 2 type of cycle.

At 0 time of the Execute/Regenerate 2 cycle, an E/R0 (D1) signal is emitted to turn trigger T1 of the Multiply Divide Tally Counter off and to turn trigger T2 of the same Tally Counter on. The Memory Register is connected to the Adder, by an E/R1 (D4) signal and the holding of the Accumulator Register, which may contain zeros or the Multiplicand is gated in true form to the Adder. The effect of the operation thus far is that the multiplicand factor is added to the multiplicand value shifted one order to the right. If the MQ Register 35 order contains a binary 1, the Adder is connected to the Accumulator at four time of the cycle as an E/R4 (D1) signal occurs. If, however, the MQ Register 35 order contains a binary 0, the output of the Adder is not connected to the Accumulator Register. In either event, however, whether or not the Adder is connected to the Accumulator Register, an E/R10 (D1) signal is emitted to shift both the Accumulator Register and the MQ Register, acting as one register, one order to the right. An E/R10 (D1) signal is also emitted for stepping the Address Counter, which results in stepping the Address Counter down one count. The Execute/Regenerate 2 cycle is repeated for thirty-three additional cycles, therefore, the Execute/Regenerate 3 through Execute/Regenerate 35 cycles are identical to the cycle represented for Execute/Regenerate 2. After thirty-four identical cycles, the Address Counter will have been stepped to zero, since as stated above, a thirty-four was set into the Address Counter and it was stepped one count, during each of the thirty-four cycles. As the Execute/Regenerate 36 cycle is entered, an E/R0 (D1) signal is emitted to turn the trigger T2, of the Multiply Divide Tally Counter off and T36 of the same counter on. Then, at 1 time of the cycle, the holding of the Accumulator Register is connected to the Adder in true form and a carry signal is fed to the 35th order of the Adder. This addition of one to the holding of the Accumulator Register, which holds the 35 most significant positions of the product, is a Round operation. If the operation is Multiply and Round and the MQ Register 1 order contains a binary 1, which order is the most significant order of the MQ Register, the output of the Adder is gated to the Accumulator Register by an E/R4 (D1) signal. In a Multiply operation, or in an Multiply and Round operation, where the 1 order of the MQ Register contains a binary 0, during the Execute/Regenerate 36 cycle this E/R4 (D1) signal is blocked from gating the Adder output to the Accumulator Register so that the Accumulator Register retains its last partial product which is the full product. Under either of the latter conditions, the final result is the result at the completion of the Execute/Regenerate 35 cycle, and at that time the Accumulator Register contains the 35 most significant orders of the product. Thereafter E/R10 (D-) signals are emitted to set the Accumulator Register Sign and the MQ Register Sign to appropriate positive or negative representations, according to the algebraic rules of multiplication; that is, if the Memory Register and MQ Register signs are unlike, both the MQ Register sign and the Accumulator Register sign are set to a negative sign representation but if the signs are alike, both the Accumulator Register Sign and the MQ Register Sign are set to positive sign indications.

An End of Operation is signalled, during the Execute/Regenerate 36 cycle by an E/R10 (D2) signal and the same signal is utilized to step the Instruction Counter.

Before discussing the circuits developing the signals represented on the Timing Diagram, the Multiply Divide Tally Counter shown on FIG. 5b, should be described. This Tally Counter is not a counter in the strict sense but consists of four triggers TE, T1, T2 and T36. Each trigger should be in an off condition as the machine enters a Multiply, a Multiply and Round or a Divide operation. During a Multiply, a Multiply and Round or a Divide operation, one of the inputs via lines MPY, MPY R or DIV to the OR circuit 525a is positive. The outputs of the OR circuit 525a then positive passes via the cathode follower 526a and the line 527a to condition one input of each AND circuit 515a, 516a and 528a. Lines MPY, MPR R, and DIV, which are outputs of the Operation Decoder, do not go to positive until approximately 10 time of the Instruction cycle. Therefore, the A0 (D1) signals cannot possibly pass via the AND circuits 516a and 528a during Instruction cycles. However, as the machine enters an Execute cycle, of a Multiply, a Multiply and Round or a Divide operation an A0 (D1) signal passes via the AND circuit 516a, an inverted 518a, a condenser 519a and a diode 520a to the trigger TE and via a condenser 521a and a diode 522a to the trigger T1. Since both triggers TE and T1 are off, this A0 (D1) signal is without effect. Likewise, the A0 (D1) signal, if it should be gated through the AND circuit 528a and an inverter 529a to the trigger T2 has no effect on the trigger T2 since it is off. During the Execute cycle, however, an E4 (D1) signal is gated through the conditioned AND circuit 515a and via the diode 517a to turn the trigger TE on. The trigger TE remains on, until the following character cycle which is the Execute/Regenerate 1 cycle. At "0" time of that cycle an A0 (D1) signal passes via the AND circuit 516a the inverter 518a, the condenser 519a and the diode 520a to turn off the trigger TE. It follows trigger TE is on from "4" time of the Execute cycle until "0" time of the Execute/Regenerate 1 cycle. The same signal which turns off the trigger TE has no effect on the trigger T1, since at that time, trigger T1 is off. However, as the trigger TE goes off, a signal is emitted from its right plate, via a condenser 523d and a diode 524a to turn on trigger T1. The trigger T1 remains on until the next character cycle, at which time the A0 (D1) signal passes via the AND circuit 516a, the inverter 518a, the condenser 521a and the diode 522a, to turn trigger T1 off. It follows Trigger T1 has been on during the Execute/Regenerate 1 cycle. The right plate output of the trigger T1, positive while the trigger is on, is passed via the cathode follower 537a to the line T1 ON. As the trigger T1 is turned off, the output at its right plate going negative, passes via a condenser 532a and a diode 533a to the trigger T2, turning the latter on. Trigger T2, while on, emits a positive output from its right plate via the cathode follower 538a to the line T2 ON. As mentioned above, a count of 34 was set into the Address Counter during the Execute cycle, therefore, as the trigger T2 goes on, it remains on, until a sufficient number of cycles have occurred for the Address Counter to count to zero, this being 34 cycles. Thus, the trigger T2 is on, from the beginning of Execute/Regenerate 2 cycle until the Address Counter counts to zero, upon the completion of the Execute/Regenerate 35 cycle. Therefore, as the machine enters an Execute/Regenerate 36 cycle, the AND circuit 528a is conditioned by a positive signal on the line 527a and also by a positive signal on the line ADR CT ZERO. While the AND circuit 528a is conditioned, an A0 (D1) signal is passed via an inverter 529a, a condenser 530a and a diode 531a to turn off trigger T2. Trigger T2 going off emits a negative signal via the condenser 534a and the diode 535a to turn trigger T36 on. Trigger T36 while on, emits a positive signal via the cathode follower 539a to the line T36 ON. Trigger T36 will remain on, until the next Instruction cycle, when an I9 (D1) signal is passed via the diode 536a to turn the trigger T36 off. The line T2 ON, when positive, feeds via the OR circuit 540a and the cathode follower 541a to the line T2/T36 ON. Likewise, when the line T36 ON is positive, it feeds via the same OR circuit 540a and the cathode follower 541a to the line T2/T36 ON. Thus, the signal on the line T2/T36 is positive when either trigger T2 or T36 is on.

Refer now to FIG. 5r, which shows the Execution Timer for Multiply and Multiply and Round operations. When the operation is Multiply, the line MPY, which is an output of the Operation Decoder, is positive and feeds to the OR circuit 570b. If the operation is Multiply and Round, the line MPY R which is also an output of the Operation Decoder, is positive and also feeds to the OR circuit 570b. The output of the OR circuit 570b passes via the cathode follower 571b to the line MPY/R which is positive during either a Multiply or a Multiply and Round operation. The signal on the line MPY/R conditions one input of each AND circuit 572b, 574b, 576b, 578b, 581b, 583b, 587b and 589b. Other inputs to the AND circuits 572b are via lines T1 ON, which is positive when the trigger T1 of the Tally counter is on, and line MQ (35), which is positive when the MQ Register 35 order contains a binary 1. The output of the AND circuit 572b feeds via the cathode follower 573b to the line MPY/R T1 (35) and is positive when the operation is Multiply or Multiply and Round, while the T1 trigger is on and the MQ Register 35 order contains a binary 1. Since the trigger T1 is on, only during the Execute/Regenerate 1 cycle then the signal on the latter line is positive only during the Execute/Regenerate 1 cycle. The second input to the AND circuit 574b is via line T2/T36 ON, which indicates that the trigger T2 or the trigger T36 of the Multiply Divide Tally Counter is on (also indicating that the machine is in a Executive/Regenerate 2 through Execute/Regenerate 36 cycle). The output of the AND circuit 574b passes via the cathode follower 575b to the line MPY/R T2/T36 and is positive when the operation is Multiply or Multiply and Round, and the trigger T2 or the trigger T36 is on. The AND circuit 576b receives a second input via line T36 ON which is positive when trigger T36 of the Multiply Divide Tally Counter is on. The output of the AND circuit 576b feeds via the cathode follower 577b to the line MPY/R T36 and is positive when the operation is Multiply or Multiply and Round and the trigger T36 is on. The AND circuit 578b receives the same inputs as the AND circuit 576b and further an input via line MMSA, which is positive when the Memory Register and the MQ Register signs are alike. The output of the AND circuit 578b feeds via the cathode follower 579b to the line MPY/R T36 MMSA which is positive when the operation is Multiply or Multiply and Round trigger T36 is on and the Memory Register and the MQ Register signs are alike. The AND circuit 581b receives a second input conditioned positive by a positive signal on the line T1 ON, which is positive when the trigger T1 is on, or a positive signal on the line T2 ON, or a positive signal on the line T2 ON, feeding via the OR circuit 580b. The output of the AND circuit 581b passes via the cathode follower 582b to the line MPY/R T1/T2 and is positive when the operation is Multiply or Multiply and Round and the trigger T1 or the trigger T2 is on. The AND circuit 583b receives signals, besides the signal on the line MPY/R, via lines T36 ON, which is positive when the trigger T36 is on and via line MMSU, which is positive when the Memory Register and the MQ Register signs are unlike. The output of the AND circuit 583*b* feeds via the cathode follower 584*b* to line MPY/R T36 MMSU and is positive when the operation is Multiply or Multiply and Round, trigger T36 is on, and the Memory Register and the MQ Register signs are unlike.

The second input to the AND circuit 585*b* is via line T1 ON. Therefore, the output of the AND circuit 585*b* feeding via the cathode follower 586*b* to the line MPY/R T1 is positive, when the operation is Multiply or Multiply and Round and the trigger T1 is on. The AND circuit 587*b* also receives signals via line T2 ON, and line MQ (35), the latter line being positive when the MQ Register 35 order contains a binary 1. The output of the AND circuit 587*b* feeds via a cathode follower 588*b* to the line MPY/R T2 (35) and is positive when the operation is Multiply or Multiply and Round, the trigger T2 is on and the MQ Register 35 order contains a binary 1. The AND circuit 589*b* receives a second input via line T2 ON. Therefore, the output of the AND circuit 589*b*, feeding via the cathode follower 590*b* to the line MPY/R T2 is positive when the operation is Multiply or Multiply and Round and the trigger T2 is on.

Referring to FIG. 5*s*, the lines MPY R, which is positive when the operation is Multiply and Round, T36 ON, which is positive when the trigger T36 is on and MQ (1), which is positive when the MQ Register 1 order contains a binary 1, feeds via the AND circuit 591*b* and the cathode follower 592*b* to the line MPY/R T36 (1). It follows that the latter line is positive if the operation is Multiply and Round, the trigger T36 is on, and the MQ Register 1 order contains a binary 1.

Refer again to the Timing Diagram of FIGS. 6*z* and 6*aa*. The I9 (D1) and I10 (D1) pulses for gating a half word Instruction from the Memory Buses to the Memory Register and from the Memory Register to the Instruction Register are developed by the circuits of FIG. 5*z*, described above. At I9 time a one microsecond signal is effective to reset trigger T36 off (FIG. 5*b*) if it should be on. The GO TO EX signal is generated as the line MPY/R, which is positive during a Multiply or a Multiply and Round operation, feeds via the OR circuit 523*e*, of FIG. 5*ar*, and via line 524*e* in combination with a positive signal on the NO EXT CYC line, if no interruption has occurred, to conditioned, an I11 (D1) signal is passed via the amplifier 526*e* and the cathode follower 527*e* to the line GO TO EX.

During the Execute cycle, an E4 (D1) signal is emitted (see FIG. 5*b*) to turn trigger TE of the Multiply Divide Tally Counter on. A positive signal on the line MPY/R feeds via an OR circuit 599*e*, of FIG. 5*aw*, to condition an AND circuit 560*e*. As the AND circuit 560*e* is conditioned, an E4 (D1) signal is passed via an amplifier 561*e* and a cathode follower 562*e* to the line RESET ADR CTR. A signal on the latter line is effective, as described above, to reset the Address Counter (FIGS. 4*b* and 4*c*) so that all orders contain binary 1's.

Referring to FIG. 5*z*, a positive signal on the line MPY/R, passes via the OR circuit 566*c* and the cathode follower 567*e* and line 568*e* to condition the AND circuit 550*c*, 555, 560*c* and 563*c*. An E9 (D1) signal is gated through one or more of these AND circuits, depending upon whether a full or a half word is addressed. As described above, the E9 (D1) signals are effective to gate the full or half word as the case may be from the Memory Buses to the Memory Register. At the same time, a positive signal on the line MPY/R feeds via an OR circuit 589*d*, of FIG. 5*ar*, and line 590*d* to condition an AND circuit 591*d*. The AND circuit 591*d*, while conditioned, passes the E9 (D1) signal via an amplifier 592*d* and a cathode follower 593*d* to the line 34 TO ADR CTR and thereby, as explained above, set a count of 34 to the Address Counter. The machine is then sent into Execute/Regenerate cycles, as a positive signal on the line MPY/R feeds via the OR circuit 579*d* of FIG. 5*ak*, and line 580*d* to condition the AND circuit 581*d*. The AND circuit 581*d*, while conditioned, passes an E11 (D1) signal via line 582*d*, the OR circuit 583*d*, the amplifier 584*d*, and the cathode follower 585*d* to the line GO TO EX/RGN. As the machine enters first Execute/Regenerate cycle, which is Execute/Regenerate 1 cycle, an A0 (D1) signal is effective to turn off the trigger TE and to turn on the trigger T1 (see FIG. 5*b*). During the Execute/Regenerate 1 cycle, provided the MQ Register 35 order contains a binary 1, the Memory Register is connected to the Adder. A positive signal on the line MPY/R T1 (D35), which, as explained above, is positive during a Multiply or Multiply and Round operation when trigger T1 is ON, to indicate the machine is in the Execute/Regenerate 1 cycle, and when the MQ Register 35 order contains a binary 1, feeds via the OR circuit 575*c*, of FIG. 5*ab*, and line 576 to condition the AND circuit 577*c*. The AND circuit 577*c*, while conditioned, passes the E/R1 (D4) signal via an amplifier 578*c* and a cathode follower 579*c* to the line MR TO ADDER. Also during the Execute/Regenerate 1 cycle, a signal is emitted for connecting the Adder to the Accumulator Register as the line MPY/R T1, which is positive when the operation is Multiply or Multiply and Round, and trigger T1 is ON, passes via the OR circuit 506*d*, of FIG. 5*ae*, and line 507*d* to condition the AND circuit 508*d*. The AND circuit 508*d*, while conditioned, passes the E/R4 (D1) signal via line 509*d*, the OR circuit 514*d*, the amplifier 515*d*, and the cathode follower 516*d*, to the line ADDER TO ACC. The combination of the latter two signals, as mentioned above, means that if a binary 1 is present in the MQ Register 35 order, the Multiplicand will be set in to the Accumulator Register. If a binary 1 were not stored in the MQ Register 35 order, the Memory Register would not be connected to the Adder, and, as the Adder is connected to the Accumulator Register, the Accumulator Register is reset to a holding of zero value.

Now refer to FIG. 5*ah*, wherein a positive signal on the line MPY/R T1/T2, which is positive when the operation is Multiply or Multiply and Round and the trigger T1 or the trigger T2 is on, signifying respectively, that the machine is in an Execute/Regenerate 1 cycle, or in one of the cycles Execute/Regenerate 2 through Execute/Regenerate 35, conditions the AND circuit 550*e*. The AND circuit 550*e*, while conditioned, passes the E/R10 (D1) signal via line 551*d*, an OR circuit 552*d*, an amplifier 553*d* and a cathode follower 554*d* to the line SHIFT ACC RIGHT, thereby causing the Accumulator Register to shift one position to the right. At the same time, the positive signal on the line MPY/R T1/T2 conditions an AND circuit 541*e*, of FIG. 5*at*. The AND circuit 541*e*, while conditioned, passes the E/R10 (D1) signal through the OR circuit 543*e*, the amplifier 544*e*, and the cathode follower 545*e* to the line SHIFT MQ RIGHT.

The machine remains in Execute/Regenerate cycles and proceeds to Execute/Regenerate 2 cycle at 0 time of this cycle, an A0 (D1) signal, fed to the Multiply Divide Tally Counter, turns off the trigger T1 and thereby turns on the trigger T2 (see FIG. 5*b*). The Execute/Regenerate cycles, Execute/Regenerate 2 through the Execute/Regenerate 35, are identical in operation, and as long as the trigger T2 of the Multiply Divide Tally Counter remains on, the machine is in this type of Execute/Regenerate cycle. During the Execute/Regenerate 2 cycle, an E/R1 (D4) signal is emitted for connecting the Memory Register to the Adder as the line MPY/R T2 goes positive and via the OR circuit 575*c*, of FIG. 5*ab*, and line 576*c* conditions the AND circuit 577*c*. The AND circuit 577*c*, while conditioned, passes the E/R1 (D4) signal via an amplifier 578*c* and a cathode follower 579*c* to the line MR TO ADDER. At the same time, a positive signal on the line MPY/R T2/T36 is also positive and feeds via the OR circuit 501d, of FIG. 5ad, and line 502d to condition the AND circuit 503d. The AND circuit 503d while conditioned, passes the E/R1 (D4) signal via the amplifier 504d, and the cathode follower 505d, to the line AAC TRUE TO ADDER and thereby gates the holding of the Accumulator Register in true form to the Adder. Next, if the MQ Register 35 order contains a binary 1, an E/R4 (D1) signal is emitted to connect the output of the Adder to the Accumulator Register, as the signal on line MPY/R T2 (35), which, as explained above, is positive if the operation is Multiply or Multiply and Round; and the trigger T2 if on (signifying that the machine is in an E/R 2 through E/R 35 cycle) passes via the OR circuit 506d, of FIG. 5ae, and line 507d to condition the AND circuit 508d. The AND circuit 508d, while conditioned, passes the E/R4 (D1) signal via line 509d, the OR circuit 514d, the amplifier 515d and the cathode follower 516d to the line ADDER TO ACC.

A positive signal on the line MPY/R T1/T2 conditions the AND cricuit 550d, of FIG. 5ah. The AND circuit 550d, while conditioned, passes the E/R10 (D1) signal via line 551d, the OR circuit 552d, the amplifier 553d, and the cathode follower 554d, to the line SHIFT ACC RIGHT. At the same time, the positive signal on the line MPY/R T1/T2 conditions an AND circuit 541e, of FIG. 5at. The AND circuit 541e, while conditioned, passes the E/R10 (D1) signal via the OR circuit 543e, the amplifier 544e and the cathode follower 545e to the line SHIFT MQ RIGHT. A signal is also emitted at the same time for stepping the Address Counter as a signal on line MPY/R T2, which is positive when the operation is Multiply or Multiply and Round and the trigger T2 is on, passes via the OR circuit 530e, of FIG. 5as, and line 531e to condition the AND circuit 532e. The AND circuit 532e, while conditioned, passes the E/R10 (D1) signal via line 533e, the OR circuit 538e, the amplifier 539e and the cathode follower 540e to the line STEP ADR CTR.

The signals just described were developed during all the Execute/Regenerate cycles up to Execute/Regenerate 35 cycle. During the Execute/Regenerate 35 cycle, the Address Counter is stepped to zero, having counted down a total of 34 counts. The machine then enters the Execute/Regenerate 36 cycle. At 0 time of the Execute/Regenerate 36 cycle, a one microsecond signal is gated to turn off the trigger T2 of the Multiply Divide Tally Counter and thereby to turn on Trigger T36. This one microsecond signal is gated as the Address Counter goes to zero (see FIG. 5b).

During the Execute/Regenerate 36 cycle, a carry is added to the Adder 35 order, as the signal on line MPY/R T36 which is positive when the operation is Multiply or Multiply and Round and the machine is in the Execute/Regenerate 36 cycle feeds via an OR circuit 501e, of FIG. 5ap, and via line 502e to condition the AND circuit 503e. The AND circuit 503e while conditioned passes the E/R1 (D4) signal via line 504e, the OR circuit 509e, the amplifier 510e, and the cathode follower 511e, to the line CARRY ADDER (35). At the same time, the line MPY/R T2/T36 is positive, and via the OR circuit 501d, of FIG. 5ad, and line 502d conditions the AND circuit 503d. The AND circuit 503d, while conditioned, passes the E/R1 (D4) signal via the amplifier 504d and the cathode follwer 505d to the line ACC TRUE TO ADDER. Thus, the holding of the Accumulator Register in true form is gated to the adder while a carry is added to the Adder 35 order. Then if the operation is Multiply and Round and the MQ Register 1 order contains a binary 1, the Adder output is connected to the Accumulator Register. This is caused by a positive signal on the line MPY/R T36 (1) which is positive when the operation is Multiply and Round, the trigger T36 is on and a binary 1 is contained in the MQ Register 1 order feeding via the OR circuit 506d, of FIG. 5ae, and line 507d, to condition the AND circuit 508d. The AND circuit 508d, being conditioned, passes the E/R4 (D1) signal via line 509d, the OR circuit 514d, the amplifier 515d, and the cathode follower 516d to the line ADDER TO ACC.

During the Execute/Regenerate 36 cycle, the Accumulator Register sign order and the MQ Register Sign order are set to represent positive or negative signs in accordance with the rules of algebraic multiplication. If the signs of the Multiplicand and the Multiplier were unlike, as originally stored in the Memory Register and the MQ Register, then as the machine enters the Execute/Regenerate 36 cycle, a line MPY/R T36 MMSU is positive, and feeds via the OR circuit 525f, of FIG. 5bi, and line 526f to condition the AND circuit 527f. The AND circuit 527f, while conditioned, passes the E/R10 (D1) signal via the amplifier 528f and the cathode follower 529f to the line (−) to MQ (S) and thereby sets a negative sign representation the Accumulator Register sign order. At the same time, the positive signal on the line MPY/R T36 MMSU feeds via the OR circuit 515f, of FIG. 5bg, and line 516f to condition the AND circuit 517f. The AND circuit 517f, while conditioned, passes the E/R10 (D1) signal via the amplifier 518f and the cathode follower 519f to the line (−) TO ACC (S) to thereby set a negative sign representation in the Accumulator Register sign order.

If the Multiplier and Multiplicand signs were alike, then positive signs are set in the MQ Register sign order and the Accumulator Register sign order. A positive signal on the line MPY/R T36 MMSA, which is positive when the operation is Multiply or Multiply and Round, the T36 trigger is on, and the Memory Register and MQ Register signs are alike, feeds via the OR circuit 520f, of FIG. 5bh, and line 521f to condition the AND circuit 522f. The AND circuit 522f, while conditioned, passes the E/R10 (D1) signal via the amplifier 523f and the cathode follower 524f to the line (+) TO MQ (S) to thereby set a positive sign representation in the MQ Register sign order. At the same time, the positive signal line MPY/R T36 MMSA feeds via the OR circuit 510f, of FIG. 5bf, and line 511f to condition the AND circuit 512f. The AND circuit 512f, being conditioned, passes the E/R10 (D1) signal via an amplifier 513f and the cathode follower 514f to the line (+) TO ACC (S) to thereby store a positive sign representation in the Accumulator Register sign position.

The End of Operation signal is generated during the Execute/Regenerate 36 cycle as the line MYP/R T36 feeds via the OR circuit 520d, of FIG. 5af, and line 521d to condition the AND circuit 522d. The AND circuit 522d, while conditioned, passes the E/R10 (D2) signal, via line 523d, the OR circuit 528d, the amplifier 529d, and the cathode follower 530d to the line END OP. The End of Operation signal on line END OP passes via the normally conditioned AND circuit 568d, of FIG. 5aj, and via the amplifier 569d and the cathode follower 570d to the line STEP INST CTR. The circuits for generating signals used during a Multiply or a Multiply and Round operation, have now been described.

Divide

Refer now to the composite of FIGS. 6ab and 6ac which show the Timing Diagram for a Divide operation. The Instruction Divide means to divide the contents (the dividend) of the combined Accumulator Register and MQ by the number which is stored in Memory (the divisor) at the Address specified by the Divide Instruction. The divisor is read out of Memory to the Memory Register and, upon completion of the Divide operation, the quotient is stored in the MQ, and the remainder is stored in the Accumulator Register. After an initial test to ascertain if the divisor is greater than the dividend, each subsequent steps of the Divide operation consists of a "conditional subtraction" and a shift of the dividend relative to the divisor. The subtraction is "allowed to be completed" only if the partial remainder is larger than the divisor, that is, subtraction is allowed to be completed only if the divisor will "go" into that portion of the partial remainder which is being interrogated. Upon completion of the subtraction, or if the subtraction is not allowed to be completed, the shift of the partial remainder relative to the divisor takes place. The quotient, as each bit of the quotient is determined, is stored in the 35 bit order of the MQ and, as the dividend (partial remainder) is shifted, one order to the left, this bit of the quotient is also shifted one order to the left, and, as the quotient is built up, bit by bit, upon completion of the operation, the full quotient is stored, as stated above, in the MQ.

During Instruction time an I9 (D1) signal is emitted which resets the trigger T36 of the Multiply Divide Tally Counter, and at the same time a half word Instruction read out of Memory to the Memory Buses is gated to the Memory Register. An I10 (D1) signal is emitted for gating the half word Instruction from the Memory Register to the Instruction Register and an I11 (D1) signal is emitted sending the machine into an Execute cycle. During the Execute cycle, an ER (D1) signal is emitted to turn on the trigger TE of the Multiply Divide Tally Counter, and an E4 (D1) signal is also emitted to reset the Address Counter. An E9 (D1) signal is emitted as a full or half word read out of Memory to the Memory Buses to gate the word to the Memory Register and an E9 (D1) signal is emitted to set a count of 34 into the Address Counter. An E11 (D1) signal is emitted to send the machine into Execute/Regenerate cycles.

At 0 time of the Executive/Regenerate 1 cycle, an A0 (D1) signal is gated to turn off the trigger TE of the Multiply Divide Tally Counter, and thereby to turn on the trigger T1. The triggers of the Multiply Divide Tally Counter as explained above, determine which Execute/Regenerate cycle, or Execute cycle that the machine is in during Multiply, Multiply and Round and Divide operations. During the Execute/Regenerate cycle the holding of the Memory Register is connected to the Adder and the holding of the Accumulator Register is connected to the Adder but in complement form. This, in effect, subtracts the holding of the Memory Register, or the Divisor, from the most significant positions of the Dividend, which is stored in the Accumulator Register. If no End carry results from the subtraction, it is an indication that the quotient would be greater than 1 (remember the binary point is to the left of the 1 order); therefore, an E/R5 (D1) signal is used to turn on a divide check indicator. However, if a carry does result from the subtraction, it is an indication that the Divide operation can be performed, and therefore one microsecond signals are emitted to connect the MQ Register 1 order to the Accumulator Register 35 order and to shift the MQ Register and the Accumulator Register as one register one position to the left. The machine then proceeds into Execute/Regenerate 2 cycle and at 0 time of the cycle, an A0 (D1) signal is gated by the circuits of the Multiply Divide Tally Counter to turn off the trigger T1 and thereby turn on the trigger T2. During the Execute/Regenerate 2 cycle, the Memory Register is connected to the Adder and the complement of the value in the Accumulator Register is fed to the Adder, to thereby subtract the Divisor from the partial dividend. If no End carry results from this subtraction, the Adder is connected to the Accumulator Register by an E/R4 (D1) signal and a binary 1 is stored in the MQ Register 35 order by an E/R5 (D1) signal. As a result of connecting the output of the Adder to the Accumulator Register, the holding of the Accumulator Register is in complement form. Therefore, in order to recomplement, an E/R7 (D2) signal is emitted to gate the holding of the Accumulator Register in complement form to the Adder and then an E/R8 (D1) signal connects the output of the Adder to the Accumulator Register. If an End carry had resulted from the subtraction, then the output from the Adder would not have been gated to the Accumulator Register, the Accumulator Register would have retained the information held at the start of the cycle and no binary 1 would have been stored in the MQ Register 35 order. Since no binary 1 is stored in the MQ Register 35 order effectively a binary 0 is stored in that order.

Later in the cycle, E/R10 (D1) signals are emitted to connect the MQ Register 1 order to the Accumulator Register 35 order to shift the MQ Register to the left and to shift the Accumulator Register to the left, thereby shifting both the Accumulator Register and the MQ Register, as one register, one position to the left. At the same time an E/R10 (D1) signal is emitted to step the Address Counter one count. The signals generated during Execute/Regenerate 3 through Execute/Regenerate 35 cycles are identical to those generated during the Execute/Regenerate 2 cycle. During the Execute/Regenerate 35 cycle as the Address Counter is stepped, it has been stepped 34 counts, and as it counts downward it is at zero. As the Address Counter reaches zero, the machine enters the Execute/Regenerate 36 cycle and an A0 (D1) signal is passed through circuits of the Multiply Divide Tally Counter to turn off the trigger T2 and thereby turn on the trigger T36. During this last Execute/Regenerate cycle, E/R1 (D4) signals are emitted to connect Memory Register to the Adder and to pass the holding of the Accumulator Register in complement form to the Adder. If no End carry results from this subtraction, then the output from the Adder is gated to the Accumulator Register by an E/R4 (D1) pulse, a binary 1 is stored in the MQ Register 35 order by an E/R5 (D1) signal and mathematically, it is known that the sum now in the Accumulator Register is in complement form. Therefore, in order to recomplement the sum, the holding of the Accumulator Register is passed to the Adder in complement form by an E/R (D2) signal and the output of the Adder is gated to the Accumulator Register by an E/R8 (D1) signal. Of course, if an End carry had resulted, the output of the Adder would not have been gated to the Accumulator Register and no binary 1 would be stored in the MQ Register 35 order. At this point the sign of the MQ Register, which contains the quotient, is set according to the algebraic rules of division, that is, if the Divisor and Dividend signs are alike, a positive sign representation is stored in the MQ Register sign order but if the signs of the Divisor and Dividend are unlike, a negative sign representation is stored in the MQ Register sign order by an E/R10 (D1) signal. During the Execute/Regenerate 36 cycle, an End of Operation is signalled by an E/R10 (D2) pulse and a similar signal is emitted for stepping the Instruction Counter.

The signals represented on the Timing Diagram of FIGS. 6ab and 6ac are generated as follows:

The resetting of the Trigger T36 of the Multiply Divide Tally Counter is by an I9 (D1) signal (see FIG. 5b). The I9 (D1) and I10 (D1) signals for gating a half word Instruction from the Memory Buses to the Memory Register and from the Memory Register to the Instruction Register are developed by the circuits of FIG. 5z, described above. The GO TO EX signal is developed as the line DIV, which is an output of the Operation Decoder, goes positive and feeds via the OR circuit 523e of FIG. 5ar, and line 524e in combination with a positive signal on the NO EXT CYC line, if no interruption has occurred, to condition the AND circuit 525e. The AND circuit 525e, while conditioned, passes the I11 (D1) signal via the amplifier 526e and the cathode follower 527e to the line GO TO EX. While the machine is in the Execute cycle, an E4 (D1) signal is passed via the AND circuit 515a (see FIG. 5b) to turn trigger TE on. At the same time, a positive signal on the line DIV passes via the OR circuit 559e, of FIG. 5aw, to condition the AND circuit 560e. The AND circuit 560e, while conditioned, passes the E4 (D1) signal via an amplifier 561e and a cathode follower 562e to the line RESET ADR CTR.

Referring to FIG. 5z, a positive signal on the line DIV passes via the OR circuit 566e, the cathode follower 567e and line 568e to condition the AND circuits 550c, 555c, 560c, and 563c. An E9 (D1) signal is gated through these AND circuits but the gating is dependent upon whether a full word, an even half word, or an odd half word is addressed. As described above, the circuits shown on FIG. 5z, which pass the E9 (D1) signal causes either a full or a half word to be gated from the Memory Buses to the Memory Register. At the same time, a positive signal on the line DIV passes via the OR circuit 589d, of FIG. 5an, and line 590d to condition the AND circuit 591d. The AND circuit 591d, while conditioned, passes the E9 (D1) signal via the amplifier 592d, and the cathode follower 593d to the line 34 TO ADR CTR. A GO TO EX/RGN signal is emitted to send the machine into an Execute/Regenerate cycle, as a positive signal occurs on the line DIV and passes via the OR circuit 579d, of FIG. 5ak, and line 580d to condition the AND circuit 581d. The AND circuit 581d, while conditioned, passes the E11 (D1) signal via line 582d, the OR circuit 583d, the amplifier 584d and the cathode follower 585d to the line GO TO EX/RGN.

At 0 time of the Execute/Regenerate cycle, and A0 (D1)signal is gated through to the AND circuit 516a (FIG. 5b), to turn off trigger TE and thereby turn on trigger T1.

Refer now to the Divide Execution Timer shown in FIG. 5u. A positive signal on the line DIV conditions one input of each AND circuit 501c, 503c, 505c, 507c, 509c, 511c and 513c. The AND circuit 501c also receives signals via line T1, which is positive when the trigger T1 is on, and line QC, which is positive when an End carry has occurred from the Adder Q order. The output of the AND circuit 501c feeds via the cathode follower 502c to the line D T1 C and is positive when the operation is Divide, the trigger T1 is on, and an End carry has occurred. The AND circuit 503c, besides the signal on the line DIV, also receives signals via lines T2/T36 ON, which is positive when the Machine is in Execute/Regenerate 2 through Execute/Regenerate 36 cycles, and a signal via a line NO QC, which is positive when no End carry has occurred from the Adder Q order. The output of the AND circuit 503c passes via the cathode follower 504c to the line D T2/T36 NC, and is positive when the operation is Divide, when the machine is in an Execute/Regenate 2 through Execute/Regenerate 36 cycle, and there is no End carry from the Adder Q order. A second input to the AND circuit 505c is via line T36 ON. Therefore, the output of the AND circuit 505c passes via the cathode follower 506c to the line D T36 and is positive when the operation is Divide and the trigger T36 is on (during an Execute/Regenerate 36). The AND circuit 507c receives a second input via line T2 on, which is positive when trigger T2 is ON. The output of the AND circuit 507c passes via the cathode follower 508c to the line D T2 and is positive when the operation is Divide and the trigger T2 is on. The AND circuit 509c receives inputs via lines T1 on, which is ON during the Execute/Regenerate 1 cycle, and line NOQC, which is positive when no End carry has occurred. The output of the AND circuit 509c passes via cathode follower 510c to the line D T1 NC and is positive when the operation is Divide, the trigger T1 is on and no End carry has occurred. The AND circuit 511c receives inputs via line AMSA, which is positive when the Accumulator Register and the Memory Register Signs are alike and via line T36 ON, which is positive when the machine is in an Execute/Regenerate 36 cycle. The output of the AND circuit 511c passes via the cathode follower 512c to the line D T36 AMSA and is positive when the operation is Divide, the trigger 36 is on and the Accumulator Register and the Memory Register Signs are alike. The AND circuit 513c receives signals via line AMSU, which is positive when the Accumulator Register and the Memory Register Signs are unlike, and via line T36 ON, which is positive when the machine is in an Execute/Regenerate 36 cycle. The output of the AND circuit 513c passes via the cathode follower 514c to the line D T36 AMSU and is positive when the operation is Divide, the trigger T36 is on and the Memory Register Signs are unlike.

Referring again to the Timing Diagram, during the Execute/Regenerate cycle, as well as during other Execute/Regenerate cycles of the Divide operation, the Memory Register is connected to the Adder, and the holding of the Accumulator Register in complement form is gated to the Adder by E/R1 (D4) signals. Referring to FIG. 5ab, a positive signal on the line DIV passes via the OR circuit 575c and line 576c to condition the AND circuit 577c. The AND circuit 577c, being conditioned, passes the E/R1 (D4) signal via the amplifier 578c and the cathode follower 579c to the line MR TO ADDER. At the same time, the positive signal on the line DIV passes via the OR circuit 580c of FIG. 5ac, and line 581c to condition the AND circuit 582c. The AND circuit 582c, while conditioned, passes the E/R (D4) signal via line 583c the OR circuit 588c, the amplifier 589c and the cathode follower 590c to line ACC COMP TO ADDER. Thus, during each Execute/Regenerate cycle of the Divide operation, these signals occur to effect a subtraction of the Divisor from the Dividend or partial Dividend.

If during the Execute/Regenerate cycle no End carry occurs, from the subtraction, it is an indication, as mentioned above, that the quotient will be equal to or greater than one, and that will in effect exceed the capacity of the machine since under the assumed conditions, the machine is operating on a fractional basis, that is, the binary point is regarded as being to the left of the one order. The signal for turning on the divide check indicator is generated as the signal line D T1 NC is positive, when the operation is Divide, the machine is in the Execute/Regenerate 1 cycle and no End carry has occurred to condition the AND circuit 599e of FIG. 5be. The AND circuit 599e, while conditioned, passes the E/R5 (D1) signal via an amplifier 501f and a cathode follower 502f to turn on the divide check trigger 560g in FIG. 5be.

The positive signal from the righthand plate of the divide check trigger 560g passes via a cathode follower 561g to the DIV CHECK line. The positive signal on the DIV CHECK line passes via the OR circuit 520d, illustrated in FIG. 5af, and the line 521d to condition the AND circuit 522d. The conditioned AND circuit 522d allows an E/R10 (D2) pulse to pass via line 523d, an OR circuit 528d, an amplifier 529d, and a cathode follower 530d to the END OP line, thus ending the operation and stepping the instruction counter, as described below. The positive signal on the DIV CHECK line also causes the S order of the indicator register to be turned on, as described below. The divide check trigger 560g is reset by an A4 (D1) pulse occurring in the following character cycle. The output from the Adder is not connected to the Accumulator Register during the Execute/Regenerate 1 cycle. However, if no carry resulted from the subtraction, then E/R10 (D1) signals are emitted for shifting the Accumulator Register and the MQ Register, acting as one register, one position to the left. The signals are generated as follows:

Referring to FIG. 5ai, a positive signal on the line D T1 C, which is positive during a Divide operation, when the T1 trigger is on and if an End carry had occurred, passes via the OR circuit 555d and line 556d to condition an AND circuit 557d. The AND circuit 557c, being conditioned, passes an E/R10 (D1) signal via line 558d, the OR circuit 561d, the amplifier 562d and the cathode follower 563d to the line MQ (1) to ACC (35) to thereby connect the MQ Register 1 order to the Accumulator Register 35 order. Referring to FIG. 5av, a positive signal on the line D T1 C feeds via the OR circuit 550e and line 551e to condition the AND circuit 552e. The AND circuit 552e, being conditioned, passes the E/R10 (D1) signal via line 553e, the OR circuit 556e, the amplifier 557e and the cathode follower 558e to the line SHIFT MQ LEFT. Referring to FIG. 5ag, a positive signal on the line D T1 C also passes via the OR circuit 535d and line 536d to condition the AND circuit 537d. The AND circuit 537d, while conditioned, passes the E/R10 (D1) signal via line 538d, the OR circuit 543d, the amplifier 544d, and the cathode follower 545d to the line SHIFT ACC LEFT.

As the machine enters an Execute/Regenerate 2 cycle, an A0 (D1) signal is gated to turn off the trigger T1 of the Multiply Divide Tally Counter, and thereby turn on the trigger T2 (see FIG. 5b). As described above, E/R1 (D4) signals are emitted each Execute/Regenerate cycle, for connecting the Memory Register to the Adder, and also for gating the holding of the Accumulator Register in complement form to the Adder.

Referring to FIG. 5ae, a positive signal on the line D T2/T36 NC, which is positive when the operation is Divide, trigger T2 or trigger T36 is on and no End carry occurs as a result of the subtraction of the Divisor from the partial Dividend, passes via the OR circuit 506d and line 507d to condition the AND circuit 508d. The AND circuit 508d, being conditioned, passes the E/R4 (D1) signal via line 509d, the OR circuit 514d, the amplifier 515d and the cathode follower 516d to the line ADDER TO ACC. At the same time, the positive signal on the line D T2/T36 NC conditions an AND circuit 590e of FIG. 5bb. The AND circuit 590e, being conditioned, passes the E/R5 (D1) signal via an amplifier 591e and a cathode follower 592e to the line (1) TO MQ (35); a signal on the latter line placing a binary 1 in the MQ Register 35 order.

Referring to FIG. 5ac, a positive signal on the line D T2/T36 NC also passes via the OR circuit 584c and line 585c to condition the AND circuit 586c. The AND circuit 586c, being conditioned, passes the E/R7 (D2) signal, via line 587c, the OR circuit 588c, the amplifier 589c, and the cathode follower 590c to the line ACC COMP TO ADDER. Thus, the holding of the Accumulator Register is passed in complement form to the Adder. Also, the output of the Adder during these conditions is gated to the Accumulator Register to thereby complete the recomplementing, as the line D T2/T36 NC, being positive, feeds via the OR circuit 510d of FIG. 5ae, to condition the AND circuit 512d. The AND circuit 512d, being conditioned, passes the E/R8 (D1) signal via line 513d, the OR circuit 514d, the amplifier 515d and the cathode follower 516d to the line ADDER TO ACC. During the Execute/Regenerate 2 cycle, at 10 time of the cycle, an E/R10 (D1) signal is emitted connecting the MQ Register 1 order to the Accumulator Register 35 order for shifting the MQ Register to the left and the Accumulator Register to the left one order, and also for stepping the Address Counter. These signals are developed as a positive signal occurs on the line D T2, which feeds via an OR circuit 555d, of FIG. 5ae, and line 556d to condition the AND circuit 557d. The AND circuit 557d, being conditioned, passes the E/R10 (D1) signal via line 558d, the OR circuit 561d, the amplifier 562d and the cathode follower 563d to the line MQ (1) TO ACC (35). A positive signal on the line D T2 also passes via the OR circuit 535d, of FIG. 5ag, and line 536d to condition the AND circuit 537d. The AND circuit 537d, being conditioned, passes the E/R10 (D1) signal via line 538d, the OR circuit 543d, the amplifier 544d and the cathode follower 545d to the line SHIFT ACC LEFT. The positive signal on the line D T2 will also pass via the OR circuit 530e, of FIG. 5as, and line 531e, to condition the AND circuit 532e. The AND circuit 532e, being conditioned, passes the E/R10 (D1) signal via line 533e, the OR circuit 538e, the amplifier 539e and the cathode follower 540e to the line STEP ADR CTR. These signals generated during the Execute/Regenerate 2 cycle, with the exception of the signal for turning the trigger T1 off and the trigger T2 on, also occur during cycles Execute/Regenerate 3 through Execute/Regenerate 35. During the Execute/Regenerate 35 cycle, the Address Counter on being stepped one count reaches a count of zero, and as the Machine enters the Execute/Regenerate 36 cycle, an A0 (D1) signal is gated to turn off the trigger T2 of the Multiply Divide Tally Counter, and the trigger T36 on (see FIG. 5b). During this Execute/Regenerate 36 cycle, as during all Execute/Regenerate cycles, of the Divide operation, as explained above, the Memory Register is connected to the Adder, and the complement of the holding of the Accumulator Register is connected to the Adder, both by E/R1 (D4) signals. If an End carry results from this subtraction, the machine merely proceeds to set the MQ Register Sign in accordance with the algebraic rules of division. However, if no carry results, the output from the Adder is transferred to the Accumulator Register, a binary 1 is stored in the MQ Register 35 order and further, since the number gated to the Accumulator Register from the Adder is in complement form, the number in the Accumulator Register is recomplemented by again passing the holding of Accumulator Register to the Adder in form. Therefore, as a positive signal occurs on the line D T2/T36 NC, which is positive when the operation is Divide, the trigger T2 or the trigger T36 is on (the latter being effective during an Execute/Regenerate 36 cycle) and no End carry has resulted, and passes via the OR circuit 584c of FIG. 5ac, and line 585c to condition the AND circuit 586c. The AND circuit 586c, being conditioned, passes the E/R7 (D2) signal via line 587c, the OR circuit 588c, the amplifier 589c and the cathode follower 590c to the line ACC COMP TO ADDER. A positive signal on line D T2/T36 NC also passes via the OR circuit 510d, of FIG. 5ae, and line 511d to condition the AND circuit 512d. The AND circuit 512d, being conditioned, passes an E/R8 (D1) signal via line 513d, the OR circuit 514d, the amplifier 515d and the cathode follower 516d to line ADDER TO ACC. A positive signal on the line D T2/T36 NC also conditions the AND circuit 590e, of FIG. 5bb. The latter AND circuit, being conditioned, passes the E/R5 (D1) signal via an amplifier 591e and a cathode follower 592e to the line (1) TO MQ (35).

If the Accumulator Register and Memory Register signs are alike, line D T36 AMSA is positive and via the OR circuit 520f, of FIG. 5bh, and line 521f conditions the AND circuit 522f. The AND circuit 522f, being conditioned, passes the E/R10 (D1) signal via the amplifier 523f and the cathode follower 524f to the line (+) TO MQ (S) to thereby set the MQ Register sign order to represent a positive sign. However, if the Accumulator Register and the Memory Register signs are unlike, during the Execute/Regenerate 36 cycle, the line D T36 AMSU is positive and feeds via the OR circuit 525f, of FIG. 5bi, and line 526f to condition the AND circuit 527f. The AND circuit 527f, being conditioned, passes an E/R10 (D1) signal via the amplifier 528f and the cathode follower 529f, to the line (−) TO MQ (S), to thereby set a negative sign representation in the Accumulator Register sign order. The End of Operation signal is also emitted, during the Execute/Regenerate 36 cycle, as the line D T36 is positive and feeds via the OR circuit 520d, of FIG. 5af, and line 521d to condition the AND circuit 522d. The AND circuit 522d, being conditioned, passes the E/R10 (D2) signal via line 523d, the OR circuit 528d, the amplifier 529d and the cathode follower 530d to the line END OP. The two microsecond End of Operation signal on line END OP is also passed via normally conditioned AND circuit 563d, of FIG. 5aj, and via the amplifier 569d and the cathode follower 570d to the line STEP INST CTR.

Thus, all signals required for the completion of a Divide operation have been described. Before proceeding to the description of the Memory Register, the Adder, the Accumulator Register and the MQ Register, it should be noted that all signals developed during an Instruction Execute or Execute/Regenerate cycles are shown on FIGS. 6*ad* and 6*ae*.

*Load Mask Register*

Refer now to FIG. 6*ag*, which is the Timing Diagram for a Load Mask Register operation. The function of the Load Mask Instruction is similar to that of the Load MQ Instruction, described above, except that only full words are addressed and the Mask Register must be reset before a new Mask word may be set therein.

Since an Instruction comprises only a half word, then, at the "2" index point of Instruction time, an A2 (D1) signal causes the sign trigger of the Deflection Register to be turned off so that the sign bit representation indicates that only a half word in Memory is to be addressed and also gates the Address setting of the Instruction Counter to the Deflection Register to thereby Address the Memory position in which the Load Mask half word Instruction is stored. At the "4" index point of Instruction time, an I4 (D3) signal is effective to reset the Instruction Register in preparation for receiving the Load Mask half word Instructoin. At the "9" index point of Instruction time, the sign bit representation and 17th bit representation in the Deflection Register in combination with an I9 (D1) signal gates the Load Mask half word Instruction from Memory via Memory Buses S to 17, if the half word Instruction is from an even Address, or, via Memory Buses 18 to 35, if the half word Instruction is from an odd Address, to the Memory Register units S to 17. At the "10" index point of Instruction time, an I10 (D1) signal gates the Load Mask half word Instruction from the Memory Register to the Instruction Register. The Operation Decoder then decodes the sign and operation part of the Load Mask Instruction and generates a Load Mask signal. At the "11" index point of Instruction time, an I11 (D1) signal is effective in combination with the Load Mask signal in the control circuits to generate a GO TO EX signal which is applied to the Cycle Timer where it is mixed with various clock pulses so that, at the next "0" index point, the Cycle Timer steps to Execute time.

At the "2" index point of Execute time, an A2 (D1) signal is effective to transfer the sign and address portion of the Load Mask half word Instruction from the Instruction Register to the Deflection Register to thereby Address the Memory position in which a Mask full word is stored. At the "4" index point of Execute time, an E4 (D3) signal is effective in the control circuits to generate a reset Mask signal which resets the Mask Register in preparation for loading the new Mask full word therein. At the "9" index point of Execute time, the sign bit representation of the Deflection Register, designating a full word, in combination with the Load Mask signal and an E9 (D1) signal gates the Mask full word from Memory, at the Address designated by the Address portion of the Load Mask Instruction, via the Memory Buses S to 35 to the Memory Register units S to 35. At the "10" index point of Execute time, an E10 (D2) signal is effective in combination with the Load Mask signal in the control circuits to generate an END OP signal. The END OP signal is effective in the control circuits to generate a STEP INST CTR signal to condition the Instruction Counter to be stepped. At the "11" index point of Execute time, an A11 (D1) signal in combination with an L103 pulse is effective to step the Instruction Counter by one so that the next instruction read from Memory will be read from the next sequentially numbered Address. At the same time, an E11 (D1) signal is effective in the control circuits to generate a MR TO Mask signal causing the Mask full word in the Memory Register to be gated to and loaded in the Mask Register. At the next "0" index point, the END OP signal in combination with various clock pulses is effective to cause the Cycle Timer to proceed into either Instruction time, for the next sequentially numbered instruction designated by the Instruction Counter, or, to Regenerate time.

Referring to FIGS. 4*f* to 4*h*, at the "0" index point of Instruction time, the sign trigger of the Deflection Register is conditioned to be turned off so that the sign bit representation will indicate that only a half word in Memory is to be addressed while the remaining triggers of the Deflection Register are conditioned to receive the Address setting of the Instruction Counter, which is the Address in Memory in which the Load Mask half word Instruction is stored. These operations are effected, at the "2" index point of Instruction time, by an A2 (D1) signal, in a manner as described above in connection with the Deflection Register.

Referring to FIGS. 4*a* to 4*c*, at the "4" index point of Instruction time, an I4 (D3) signal is effective to reset the Instruction Register, in a manner as described above in connection with the Instruction Register, in preparation for receiving the Load Mask half word instruction.

Referring to FIGS. 5*c* and 5*z*, at the "9" index point of Instruction time, the sign bit representation and the 17th bit representation in the Deflection Register in combination with an I9 (D1) signal gates the half word instruction, in a manner as described above, from Memory via the Memory Buses S to 17, if the half word instruction is from an even Address, or, via the Memory Buses 18 to 35, if the half word instruction is from an odd Address, to the Memory Register units S to 17.

There will now be repeated, in greater detail, the operation briefly set forth above:

Referring again to FIGS. 4*a* to 4*c*, at the "10" index point of Instruction time, an I10 (D1) signal gates the Load Mask half word instruction from the Memory Register to the Instruction Register. The Operation Decoder of FIG. 4*i* then decodes the sign and operation part of the Instruction and produces a positive signal on the LOAD MASK line.

Referring to FIG. 5*ar*, at the "11" index point of Instruction time, the positive signal on the LOAD MASK line is applied via an OR circuit 523*e* and line 524*e* to one input of the AND circuit 525*e*. A positive signal on the NO EXT CYC line, if no interruption has occurred, is applied to condition the AND circuit 525*e* which, when conditioned, passes the positive signal on the I11 (D1) line and via amplifier 526*e* and cathode follower 527*e* to the GO TO EX line. The positive signal on the GO TO EX line is applied to the Cycle Timer where it is mixed with various clock pulses, in a manner as described above, so that, at the next "0" index point, the Cycle Timer steps to Execute time.

Referring to FIGS. 4*f* to 4*h*, at the "0" index point of Execute time, the sign trigger of the Deflection Register is conditioned to be turned on so that the sign bit representation will indicate that a full word in Memory is to be addressed while the remaining triggers of the Deflection Register are conditioned to receive the Address setting of the Instruction Register, which is the Address portion of the Load Mask half word instruction, and designates the Address in Memory in which the Mask full word is stored. These operations are effective, at the "2" index point of Execute time, by an A2 (D1) signal, in a manner as previously described above in connection with the Deflection Register.

Referring to FIG. 5*bt*, the positive signal on the LOAD MASK line is applied to condition the AND circuit 524*g* which, while conditioned, passes a positive signal on the E4 (D3) line and via an amplifier 525*g* and a cathode follower 526*g* to the RESET MASK line. The positive signal on the RESET MASK line, in FIG. 8*b*, is applied to turn OFF all of the triggers 918 of the Mask Register.

Referring to FIG. 5*c*, since the sign trigger of the Deflection Register has been turned on, the SIGN (—) line has a positive signal applied thereto which passes via the cathode follower 582*e* to the full line and via the OR circuit 580a and the cathode follower 581a to the F/E HALF line.

Referring now to FIG. 5z, at the "9" index point of Execute time, the positive signal on the LOAD MASK line is applied via the OR circuit 566c, the cathode follower 567c and line 568c to one input of each of the AND circuits 550c, 555c, 560c and 563c. Since a full word is addressed, in accordance with the Load Mask Instruction, the positive signal on the F/E HALF (signifying a full or even half address word) line is applied to condition the AND circuit 550c which, while conditioned, passes a positive signal on the E9 (D1) line and via an OR circuit 552c, an amplifier 553c and a cathode follower 554c to the MEM BUS (S to 17) TO MR (S to 17) line. The signal on the latter line is effective to gate half of the Mask word from Memory via the Memory Buses S and 1 to 17 to the Memory Register units S and 1 to 17. At the same time, the positive signal on the FULL (signifying a full address) line is applied to condition the AND circuit 560c which, while conditioned, passes the positive signal on the E9 (D1) line via an amplifier 561c and a cathode follower 562c to the MEM BUS (18 to 35) TO MR (18 to 35) line. A positive signal on the latter line gates the remaining half of the Mask word from Memory via the Memory Buses 18 through 35 to the Memory Register units 18 through 35. Thus, by the combination of positive signals on the MEM BUS (S to 17) TO MR (S to 17) and MEM BUS (18 to 35) TO MR (18 to 35) lines, a new Mask full word read from Memory to the Memory Buses, S and 1 to 35, inclusive, is gated to the Memory Register positions S and 1 to 35, respectively.

Referring now to FIG. 5af, at the "10" index point of Execute time, the positive signal on the LOAD MASK line is applied via an OR circuit 524d and line 525d to condition the AND circuit 526d which, while conditioned, passes a positive signal on the E10 (D2) line and via line 527b, the OR circuit 528b, the amplifier 529b and the cathode follower 530b to the END OP line. The positive signal on the END OP line passes through the normally conditioned AND circuit 568d of FIG. 5aj and via the amplifier 569d and the cathode follower 570d to the STEP INST CTR line. Referring to the Instruction Counter of FIG. 4d, the positive signal on the STEP INST CTR line in combination with the positive signal on the NO IRPT CYC line, if no interruption has occurred, is applied to the AND circuit 462b so that, at the "11" index point of Execute time, the positive signal on the A11 (D1) line conditions the AND circuit 462b to pass a positive pulse on the L103 line to step the Instruction Counter by one, in a manner as previously described, so that the next instruction will be read from the next sequentially numbered Address location in Memory. The positive signal on the END OP line is applied to condition the Cycle Timer of FIGS. 3c and 3d to proceed to either Instruction time or Regenerate time.

At the same time, referring to FIG. 5bw, the positive signal on the LOAD MASK line is applied to condition the AND circuit 533g which, while conditioned, passes a positive signal on the E11 (D1) line and amplifier 534g and cathode follower 535g to the MR TO MASK line. A positive signal on the latter line, as explained below, causes the new Mask full word holding of the Memory Register to be gated to and loaded in the Mask Register. At the next "1" index point, the positive signal on the END OP line in combination with various clock pulses is effective to cause the Cycle Timer to proceed to either Instruction time, for the next sequentially numbered instruction designated by the Instruction Counter, or, to Regenerate time, in a manner as previously described in connection with the Cycle Timer.

*Store Mask Register*

Refer now to FIG. 6ah, which is the Timing Diagram for a Store Mask Register operation. The function of the Store Mask Instruction is similar to that described above for a Store operation except that corresponding orders of the Mask Register rather than the Accumulator Register are gated via the Memory Buses to Memory and that only full words are stored in Memory.

Since an Instruction comprises only a half word, then, at the "2" index point of Instruction time, an A2 (D1) signal causes the sign trigger of the Deflection Register to be turned off so that the sign bit representation indicates that only a half word in Memory is to be addressed and also gates the Address setting of the Instruction Counter to the Deflection Register to thereby Address the Memory position in which the Store Mask half word Instruction is stored. At the "4" index point of Instruction time, an I4 (D3) signal is effective to reset the Instruction Register in preparation for receiving the Store Mask half word Instruction. At the "9" index point of Instruction time, the sign bit representation and 17th bit representation in the Deflection Register in combination with an I9 (D1) signal gates the Store Mask half word Instruction from Memory via Memory Buses S to 17, if the half word Instruction is from an even address, or, via Memory Buses 18 to 35, if the half word Instruction is from an odd Address, to the Memory Register units S to 17. At the "10" index point of Instruction time, an I10 (D1) signal gates the Store Mask half word Instruction from the Memory Register to the Instruction Register. The Operation Decoder then decodes the sign and operation part of the Store Mask Instruction and generates a Store Mask signal which is effective to produce a PREPARE FOR MEM RI (prepare for Memory read in) signal which stays positive until another Instruction is read into the Instruction Register and is decoded. At the "11" index point of Instruction time, an I11 (D1) signal is effective in combination with the Store Mask signal in the control circuits to generate the GO TO EX signal which is applied to the Cycle Timer where it is mixed with various clock pulses so that, at the next "0" index point, the Cycle Timer steps to Execute time.

At the "2" index point of Execute time, an A2 (D1) signal is effective to transfer the sign and address portion of the Store Mask half word from the Instruction Register to the Deflection Register to thereby address the Memory position in which the Mask full word, presently stored in the Mask Register, is to be stored. At the "8" index point of Execute time, an E8 (D2) signal is effective, in combination with the Store Mask signal in the control circuits, to generate a MASK (S to 35) TO MEM BUS (S to 35) signal which causes the Mask full word to be transferred from the Mask Register via the Memory Bus Switches to the Memory Bus. The Mask full word on the Memory Bus is stored at the Address designated by the setting of the Deflection Register, which is the Address designated by the Address portion of the Store Mask Instruction. At the "10" index point of Execute time, an E10 (D2) signal is effective, in combination with the Store Mask signal, in the control circuits to generate a END OP signal. The END OP signal is effective in the control circuits to generate a STEP INST CTR signal to condition the Instruction Counter to be stepped. At the "11" index point of Execute time, an A11 (D1) signal in combination with an L103 pulse is effective to step the Instruction Counter by one so that the next instruction read from Memory will be read from the next sequentially numbered Address. At the next "0" index point, the END OP signal in combination with various clock pulses is effective to cause the Cycle Timer to proceed to either Instruction time, for the next sequentially numbered instruction designated by the Instruction Counter, or, to Regenerate time.

There will now be repeated, in greater detail, the operation set forth briefly above:

Referring to FIGS. 4f to 4h, at the "0" index point of Instruction time, the sign trigger of the Deflection Register is conditioned to be turned off so that the sign bit representation will indicate that only a half word in Memory is to be addressed while the remaining triggers of the Deflection Register are conditioned to receive the Address setting of the Instruction Counter, which is the address in Memory in which the Store Mask half word instruction is stored. These operations are effected, at the "2" index point of Instruction time, by an A2 (D1) signal, in a manner as described above in connection with the Deflection Register.

Referring to FIGS. 4a to 4c, at the "4" index point of Instruction time, an I4 (D3) signal is effective to reset the Instruction Register, in a manner as described above in connection with the Instruction Register, in preparation for receiving the Store Mask half word instruction.

Referring to FIGS. 5c and 5z, at the "9" index point of Instruction time, the sign bit representation and the 17th bit representation in the Deflection Register in combination with an I9 (D1) signal gates the half word instruction, in a manner as described above, from Memory via the Memory Buses S to 17, if the half word instruction is from an even Address, or, via the Memory Buses 18 to 35, if the half word instruction is from an odd Address, to the Memory Register units S to 17.

Referring again to FIGS. 4a to 4c, at the "10" index point of Instruction time, an I10 (D1) signal gates the Store Mask half word instruction from the Memory Register to the Instruction Register. The Operation Decoder of FIG. 4i then decodes the sign and operation part of the instruction and produces a positive signal on the STORE MASK line. Referring to FIG. 5am, the positive signal on the STORE MASK line passes via an OR circuit 586d, an amplifier 587d and a cathode follower 588d to the PREP MEM RI line. As described in the application of Fox et al., the signal on the latter line prepares the Memory for read in.

Referring to FIG. 5ar, at the "11" index point of Instruction time, the positive signal on the LOAD MASK line is applied via an OR circuit 523e and line 524e to one input of the AND circuit 525e. A positive signal on the NO EXT CYC line, if no interruption has occurred, is applied to condition the AND circuit 525e which, when conditioned, passes the positive signal on the I11 (D1) line and via amplifier 526e and cathode follower 527e to the GO TO EX line. The positive signal on the GO TO EX line is applied to the Cycle Timer where it is mixed with various clock pulses, in a manner as described above, so that, at the next "0" index point, the Cycle Timer steps to Execute time.

Referring again to FIGS. 4f to 4h, at the "0" index point of Execute time, the sign trigger of the Deflection Register is conditioned to be turned on so that the sign bit representation will indicate that a full word in Memory is to be addressed while the remaining triggers of the Deflection Register are conditioned to receive the Address setting of the Instruction Register, which is the Address portion of the Store Mask half word instruction, and designates the Address in Memory in which the Mask full word is to be stored. These operations are effective, at the "2" index point of Execute time, by an A2 (D1) signal in a manner as previously described above in connection with the Deflection Register.

Referring to FIG. 5bj, at the "8" index point of Execute time, a positive signal on the STORE MASK line is applied to condition an AND circuit 501g which, while conditioned, passes a positive signal on the E8 (D2) line and via the amplifier 502g and the cathode follower 503g to the MASK (S to 35) TO MEM BUS (S to 35) line. This signal is effective to connect the outputs of the Mask Register units S to 35 to the Memory Buses S to 35, respectively, via the Memory Bus Switching, as explained below. The Mask full word is stored in Memory, as described in the application of Fox et al., at the full word Address designated by the Deflection Register, which is the Address designated by the Address portion of the Store Mask Instruction.

Referring to FIG. 5af, at the "10" index point of Execute time, the positive signal on the STORE MASK line is applied via an OR circuit 524d and line 525d to condition the AND circuit 526d which, while conditioned, passes a positive signal on the A10 (D2) line and via line 527d, the OR circuit 528d, the amplifier 529d and the cathode follower 530d to the END OP line. The positive signal on the END OP line passes through the normally conditioned AND circuit 568b of FIG. 5aj and via the amplifier 569d and the cathode follower 570d to the STEP INST CTR line. Referring to the Instruction Counter of FIG. 4d, the positive signal on the STEP INST CTR line in combination with the positive signal on the NO IRPT CYC line, if no interruption has occurred, is applied to the AND circuit 462b so that, at the "11" index point of Execute time, a positive signal on the A11 (D1) line conditions the AND circuit 462b to pass a positive pulse on the L103 line to step the Instruction Counter by one, in a manner as previously described, so that the next Instruction will be read from the next sequentially numbered Address location in Memory. A positive signal on the END OP line is applied to condition the Cycle Timer of FIGS. 3c and 3d to proceed to either Instruction time or Regenerate time. At the next "1" index point, the positive signal on the ENDOP line in combination with various clock pulses is effective to cause the Cycle Timer to proceed to either Instruction time, for the next sequentially numbered instruction designated by the Instruction Counter, or, to Regenerate time, in a manner as previously described in connection with the Cycle timer.

It should be apparent that the Store Mask Instruction permits a Mask word, which is presently stored in the Mask Register, to be transferred to and stored in Memory. Also, it should be apparent that the Load Mask Instruction permits a new Mask word stored in Memory to be transferred to the Mask Register. Thus, with these Instructions, a Mask word may be stored in Memory and then tested or operated upon, after which, the same or a new Mask word may be loaded back in the Mask Register. Also, allowing the present Mask word to be replaced by a new Mask word permits the order of priority of the interrupting conditions to be changed.

*Load Indicator Register*

Refer now to FIG. 6aj, which is the Timing Diagram for a Load Indicator Register operation. The function of the Load Ind Instruction is similar to that of the Load MQ Instruction, described above, except that only full words are addressed and the Indicator Register must be reset before a new Indicator word may be set therein.

Since an Instruction comprises only a half word, then, at the "2" index point of Instruction time, an A2 (D1) signal causes the sign trigger of the Deflection Register to be turned off so that the sign bit representation indicates that only a half word in Memory is to be addressed and also gates the Address setting of the Instruction Counter to the Deflection Register to thereby address the Memory position in which the Load Ind half word instruction is stored. At the "4" index point of Instruction time, an I4 (D3) signal is effective to reset the Instruction Register in preparation for receiving the Load Ind half word instruction. At the "9" index point of Instruction time, the sign bit representation and 17th bit representation in the Deflection Register in combination with an I9 (D1) signal gates the Load Ind half word instruction from Memory via Memory Buses S to 17, if the half word instruction is from an even Address, or, via Memory Busses 18 to 35, if the half word instruction is from an odd Address, to the Memory Register units S to 17. At the "10" index point of Instruction time, an I10 (D1) signal gates the Load Ind half word instruction from the Memory Register to the Instruction Register. The Operation Decoder then decodes the sign and operation part of the Load Ind Instruction and generates a LOAD IND signal. At the "11" index point of Instruction time, an I11 ((D1) signal is effective in combination with the LOAD IND signal in the control circuits to generate a GO TO EX signal which is applied to the Cycle Timer where it is mixed with various clock pulses so that, at the next "0" index point, the Cycle Timer steps to Execute time.

At the "2" index point of Execute time, an A2 (D1) signal is effective to transfer the sign and address portion of the Load Ind half word instruction from the Instruction Register to the Deflection Register to thereby address the Memory position in which an Indicator full word is stored. At the "4" index point of Execute time, an E4 (D3) signal is effective in the control circuits to generate a RESET IND signal which resets the Indicator Register in preparation for loading the new Indicator full word therein. At the "9" index point of Execute time, the sign bit representation of the Deflection Register designating a full word, in combination with the LOAD IND signal and an E9 (D1) signal gates the Indicator full word from Memory, at the Address designated by the Address portion of the Load Ind Instruction, via the Memory Buses S to 35 to the Memory Register units S to 35. At the "10" index point of Execute time, an E10 (D2) signal is effective in combination with the LOAD IND signal in the control circuits to generate a END OP signal. The END OP signal is effective in the control circuits to generate a STEP INST CTR signal to condition the Instruction Counter to be stepped. At the "11" index point of Execute time, an A11 (D1) signal in combination with an L103 pulse is effective to step the Instruction Counter by one so that the next instruction read from Memory will be read from the next sequentially numbered Address. At the same time, an E11 (D1) signal is effective in the control circuits to generate a MR TO IND signal causing the indicator full word in the Memory Register to be gated to and loaded in the Indicator Register. At the next "0" index point the END OP signal in combination with various clock pulses is effective to cause the Cycle Timer to proceed into either Instruction time, for the next sequentially numbered instruction designated by the Instruction Counter, or, to Regenerate time.

There will now be repeated, in greater detail, the operation briefly set forth above:

Referring to FIG. 4f to 4h, at the "0" index point of Instruction time, the sign trigger of the Deflection Register is conditioned to be turned off so that the sign bit representation will indicate that only a half word in Memory is to be addressed while the remaining triggers of the Deflection Register are conditioned to receive the Address setting of the Instruction Counter, which is the Address in Memory in which the Load Ind half word Instruction is stored. These operations are effected, at the "2" index point of Instruction time, by an A2 (D1) signal, in a manner as described above in connection with the Deflection Register.

Referring to FIGS. 4a to 4c, at the "4" index point of Instruction time, an I4 (D3) signal is effective to reset the Instruction Register, in a manner as described above in connection with the Instruction Register, in preparation for receiving the Load Ind half word instruction.

Referring to FIGS. 5c and 5z, at the "9" index point of Instruction time, the sign bit representation and the 17th bit representation in the Deflection Register in combination with an I9 (D1) signal gates the half word instruction, in a manner as described above, from Memory via the Memory Buses S to 17, if the half word instruction is from an even Address, or, via the Memory Buses 18 to 35, if the half word instruction is from an odd Address, to the Memory Register units S to 17.

Referring again to FIGS. 4a to 4c, at the "10" index point of Instruction time, an I10 (D1) signal gates the Load Ind half word instruction from the Memory Register to the Instruction Register. The Operation Decoder of FIG. 4i then decodes the sign and operation part of the Instruction and produces a positive signal on the LOAD IND line.

Referring to FIG. 5ar, at the "11" index point of Instruction time, the positive signal on the LOAD IND line is applied via an OR circuit 523e and line 524e to one input of the AND circuit 525e. A positive signal on the NO EXT CYC line, if no interruption has occurred, is applied to condition the AND circuit 525e which, when conditioned, passes the positive signal on the I11 (D1) line and via amplifier 526e and cathode follower 527e to the GO TO EX line. The positive signal on the GO TO EX line is applied to the Cycle Timer where it is mixed with various clock pulses, in a manner as described above, so that, at the next "0" index point, the Cycle Timer steps to Execute time.

Referring to FIGS. 4f to 4h, at the "0" index point of Execute time, the sign trigger of the Deflection Register is conditioned to be turned on so that the sign bit representation will indicate that a full word in Memory is to be addressed and while the remaining triggers of the Deflection Register are conditioned to receive the Address setting of the Instruction Register, which is the Address portion of the Load Ind half word Instruction, and designates the Address in Memory in which the Indicator full word is stored. These operations are effective, at the "2" index point of Execute time, by an A2 (D1) signal, in a manner as previously described above in connection with the Deflection Register.

Referring to FIG. 5bu, the positive signal on the LOAD IND line is applied to condition the AND circuit 527g which, while conditioned, passes a positive signal on the E4 (D3) line and via an amplifier 528g and a cathode follower 529g to the RESET IND line. The positive signal on the RESET IND line, in FIG. 9a is applied to turn off all of the triggers 912 of the Indicator Register.

Referring to FIG. 5c, since the sign trigger of the Deflection Register has been turned on, the SIGN (—) line has a positive signal applied thereto which passes via the cathode follower 582e to the FULL line and via the OR circuit 580a and the cathode follower 581a to the F/E HALF line.

Referring now to FIG. 5z, at the "9" index point of Execute time, the positive signal on the LOAD IND line is applied via the OR circuit 566c, the cathode follower 567c and line 568c to one input of each of the AND circuits 550c, 555c and 560c and 563c. Since a full word is addressed, in accordance with the Load Ind Instruction, the positive signal on the F/E HALF (signifying a full or even half address word) line is applied to condition the AND circuit 550c which, while conditioned, passes a positive signal on the E9 (D1) line and via an OR circuit 552c, an amplifier 553c and a cathode follower 554c to the MEM BUS (S to 17) TO MR (S to 17) line. The signal on the latter line is effective to gate half of the Indicator word from Memory via the Memory Buses S and 1 to 17 to the Memory Register units S and 1 to 17. At the same time, the positive signal on the FULL (signifying a full address) line is applied to condition the AND circuit 560c which, while conditioned, passes the positive signal on the E9 (D1) line via an amplifier 561c and a cathode follower 562c to the MEM BUS (18 to 35) TO MR (18 to 35) line. A positive signal on the latter line gates the remaining half of the Indicator word from Memory via the Memory Buses 18 through 35 to the Memory Register units 18 through 35. Thus, by the combination of positive signals on the MEM BUS (S to 17) TO MR (S to 17) and MEM BUS (18 to 35) TO MR (18 to 35) lines, a new Indicator full word read from Memory to the Memory Buses S and 1 to 35, inclusive, is gated to the Memory Register positions S and 1 to 35, respectively.

Referring now to FIG. 5af, at the "10" index point of Execute time, the positive signal on the LOAD IND line is applied via an OR circuit 524d and line 525d to condition the AND circuit 526d which, while conditioned, passes a positive signal on the E10 (D2) line and via line 527b, the OR circuit 528b, the amplifier 529b and the cathode follower 530b to the END OP line. The positive signal on the END OP line passes through the normally conditioned AND circuit 568d of FIG. 5aj and via the amplifier 569d and the cathode follower 570d to the STEP INST CTR line. Referring to the Instruction Counter of FIG. 4d, the positive signal on the STEP INST CTR line in combination with the positive signal on the NO IRPT CYC line, if no interruption has occurred, are applied to the AND circuit 462b so that, at the "11" index point of Execute time, the positive signal on the A11 (D1) line conditions the AND circuit 462b to pass a positive pulse on the L103 line to step the Instruction Counter by one, in a manner as previously described, so that the next instruction will be read from the next sequentially numbered Address location in Memory. The positive signal on the END OP line is applied to condition the Cycle Timer of FIGS. 3c and 3d to proceed to either Instruction time or Regenerate time.

At the same time, referring to FIG. 5bx, the positive signal on the LOAD IND line is applied to condition the AND circuit 536g which, while conditioned, passes a positive signal on the E11 (D1) line and amplifier 537g and cathode follower 538g to the MR TO IND line. A positive signal on the latter line, as explained below, causes the new Indicator full word holding of the Memory Register to be gated to and loaded in the Indicator Register. At the next "1" index point, the positive signal on the END OP line in combination with various clock pulses is effective to cause the Cycle Timer to proceed to either Instruction time, for the next sequentially numbered Instruction designated by the Instruction Counter, or, to Regenerate time, in a manner as previously described in connection with the Cycle Timer.

*Store Indicator Register*

Refer now to FIG. 6ak, which is the Timing Diagram for a Store Indicator Register operation. The function of the Store Ind Instruction is similar to that described above for a Store operation except that corresponding orders of the Indicator Register rather than the Accumulator Register are gated via the Memory Buses to Memory and that only full words are stored in Memory.

Since an Instruction comprises only a half word, then, at the "2" index point of Instruction time, an A2 (D1) signal causes the sign trigger of the Deflection Register to be turned off so that the sign bit representation indicates that only a half word in Memory is to be addressed and also gates the Address setting of he Instruction Counter to the Deflection Register to thereby address the Memory position in which the Store Ind half word instruction is stored. At the "4" index point of Instruction time, an I4 (D3) signal is effective to reset the Instruction Register in preparation for receiving the Store Ind half word Instruction. At the "9" index point of Instruction time, the sign bit representation and 17th bit representation in the Deflection Register in combination with an I9 (D1) signal, gates the Store Ind half word Instruction from Memory via Memory Buses S to 17, if the half word Instruction is from an even Address, or, via Memory Buses 18 to 35, if the half word Instruction is from an odd Address, to the Memory Register units S to 17. At the "10" index point of Instruction time, an I10 (D1) signal gates the Store Ind half word Instruction from the Memory Register to the Instruction Register. The Operation Decoder then decodes the sign and operation part of the Store Ind Instruction and generates a STORE IND signal which is effective to produce a PREPARE FOR MEM RI (prepare for Memory read in) signal which stays positive until another Instruction is read into the Instruction Register and is decoded. At the "11" index point of Instruction time, an I11 (D1) signal is effective in combination with the STORE IND signal in the control circuits to generate the GO TO EX signal which is applied to the Cycle Timer where it is mixed with various clock pulses so that, at the next "0" index point, the Cycle Timer steps to Execute time.

At the "2" index point of Execute time, an A2 (D1) signal is effective to transfer the sign and Address portion of the Store Ind half word from the Instruction Register to the Deflection Register to thereby address the Memory position in which the Indicator full word, presently stored in the Indicator Register, is to be stored. At the "8" index point of Execute time, an E8 (D2) signal is effective, in combination with the STORE IND signal, in the control circuits to generate a IND (S to 35) TO MEM BUS (S to 35) signal which causes the Indicator full word to be transferred from the Indicator Register via the Memory Bus Switches to the Memory Bus. The Indicator full word on the Memory Bus is stored at the Address designated by the setting of the Deflection Register, which is the Address designated by the Address portion of the Store Ind Instruction. At the "10" index point of Execute time, an E10 (D2) signal is effective, in combination with the STORE IND signal, in the control circuits to generate an END OP signal. The END OP signal is effective in the control circuits to generate a STEP INST CTR signal to condition the Instruction Counter to be stepped. At the "11" index point of Execute time, an A11 (D1) signal in combination with an L103 pulse is effective to step the Instruction Counter by one so that the next instruction read from Memory will be read from the next sequentially numbered Addresss. At the next "0" index point, the END OP signal in combination with various clock pulses is effective to cause the Cycle Timer to proceed to either Instruction time, for the next sequentially numbered instruction designated by the Instruction Counter, or, to Regenerate time.

There will now be repeated, in greater detail, the operation set forth briefly above:

Referring to FIGS. 4f to 4h, at the "0" index point of Instruction time, the sign trigger of the Deflection Register is conditioned to be turned off so that the sign bit representation will indicate that only a half word in Memory is to be addressed while the remaining triggers of the Deflection Register are conditioned to receive the Address setting of the Instruction Counter, which is the Address in Memory in which the Store Ind half word instruction is stored. These operations are effected, at the "2" index point of Instruction time, by an A2 (D1) signal, in a manner as described above in connection with the Deflection Register.

Referring to FIGS. 4a to 4c, at the "4" index point of Instruction time, an I4 (D3) signal is effective to reset the Instruction Register, in a manner as described above in connection with the Instruction Register, in preparation for receiving the Store Ind half word instruction.

Referring to FIGS. 5c and 5z, at the "9" index point of Instruction time, the sign bit representation and the 17th bit representation in the Deflection Register in combination with an I9 (D1) signal gates the half word Instruction, in a manner as described above, from Memory via the Memory Buses S to 17, if the half word instruction is from an even Address, or, via the Memory Buses 18 to 35, if the half word instruction is from an odd Address, to the Memory Register units S to 17.

Referring again to FIGS. 4a to 4c, at the "10" index point of Instruction time, an I10 (D1) signal gates the Store Ind half word instruction from the Memory Register to the Instruction Register. The Operation Decoder of FIG. 4i then decodes the sign and operation part of the instruction and produces a positive signal on the STORE IND line. Referring to FIG. 5am, the positive signal on the STORE IND line passes via an OR circuit 586d, an amplifier 587d and a cathode follower 588d to the PREP MEM RI line. As described in the application of Fox et al., the signal on the latter line prepares the Memory for read in.

Referring to FIG. 5ar, at the "11" index point of Instruction time, the positive signal on the LOAD IND line is applied via an OR circuit 523e and line 524e to one input of the AND circuit 525e. A positive signal on the NO EXT CYC line, if no interruption has occurred, is applied to condition the AND circuit 525e which, when conditioned, passes the positive signal on the I11 (D1) line and via amplifier 526e and cathode follower 527e to the GO TO EX line. The positive signal on the GO TO EX line is applied to the Cycle Timer where it is mixed with various clock pulses, in a manner as described above, so that, at the next "0" index point, the Cycle Timer steps to Execute time.

Referring again to FIGS. 4f to 4h, at the "0" index point of Execute time, the sign trigger of the Deflection Register is conditioned to be turned on so that the sign bit representation will indicate that a full word in Memory is to be addressed while the remaining triggers of the Deflection Register are conditioned to receive the Address setting of the Instruction Register, which is the Address portion of the Store Ind half word instruction, and designates the Address in Memory in which the Indicator full word is to be stored. These operations are effective, at the "2" index point of Execute time, by an A2 (D1) signal in a manner as previously described above in connection with the Deflection Register.

Referring to FIG. 5bk at the "8" index point of Execute time, a positive signal on the STORE IND line is applied to condition an AND circuit 504g which, while conditioned, passes a positive signal on the E8 (D2) line and via the amplifier 505g and the cathode follower 506g to the IND (S to 35) TO MEM BUS (S to 35) line. This signal is effective to connect the outputs of the Indicator Register units S to 35 to the Memory Buses S to 35, respectively, via the Memory Bus Switching, as explained below. The Indicator full word is stored in Memory, as described in the application of Fox et al., at the full word Address designated by the Deflection Register, which is the Address designated by the Address portion of the Store Ind Instruction.

Referring to FIG. 5af, at the "10" index point of Execute time, the positive signal on the STORE IND line is applied via an OR circuit 524d and line 525d to condition the AND circuit 526d which, while conditioned passes a positive signal on the A10 (D2) line and via line 527d, the OR circuit 528d, the amplifier 529d and the cathode follower 530d to the END OP line. The positive signal on the END OP line passes through the normally conditioned AND circuit 568b of FIG. 5aj and via the amplifier 569d and the cathode follower 570d to the STEP INST CTR line. Referring to the Instruction Counter of FIG. 4d, the positive signal on the STEP INST CTR line in combination with the positive signal on the NO IRPT CYC line, if no interruption has occurred, is applied to the AND circuit 462b so that, at the "11" index point of Execute time, a positive signal on the A11 (D1) line conditions the AND circuit 462b to pass a positive pulse on the L103 line to step the Instruction Counter by one, in a manner as previously described, so that the next instruction will be read from the next sequentially numbered Address location in Memory. A positive signal on the END OP line is applied to condition the Cycle Timer of FIGS. 3c and 3d to proceed to either Instruction time or Regenerate time. At the next "1" index point, the positive signal on the END OP line in combination with various clock pulses is effective to cause the Cycle Timer to proceed to either Instruction time, for the next sequentially numbered instruction designated by the Instruction Counter, or, to Regenerate time, in a manner as previously described in connection with the Cycle Timer.

It should be apparent that the Store Indicator Instruction permits an Indicator word, which is presently stored in the Indicator Register, to be transferred to and stored in Memory. Also, it should be apparent, that the Load Indicator Instruction permits a new Indicator word stored in Memory to be transferred to the Indicator Register. With the combination of these two Instructions, the Program Interrupt System may be used in a multi-programming operation wherein several programs are stored in Memory with one running until it finds some need to delay, at which time, it may be interrupted so that a second program can start running. Thus, with the Store Indicator Instruction, the Indicator word associated with the first program may be stored in Memory and, with the Load Indicator Instruction, a new Indicator word associated with the second program may be read out of Memory and stored in the Indicator Register. Likewise, if an interruption occurs causing the program to transfer to an interrupt sub-routine, provision is made to allow the interrupt sub-routine to be interrupted. Hence, with the combination of the Store Ind and Load Ind Instructions, the Indicator word which caused the original interruption may be replaced by a new Indicator word permitting the interrupt sub-routine to be interrupted.

*Load Base Register*

Refer now to FIG. 6am, which is the Timing Diagram for a Load Base Register operation. The function of the Load Base Instruction is similar to that of the Load MQ Instruction, described above, except that only half words are addressed and the Base Register must be reset before the Address portion of a new Base word may be set therein.

Since an Instruction comprises only a half word, then, at the "2" index point of Instruction time, an A2 (D1) signal causes the sign trigger of the Deflection Register to be turned off so that the sign bit representation indicates that only a half word in Memory is to be addressed and also gates the address setting of the Instruction Counter to the Deflection Register to thereby address the Memory position in which the Load Base half word Instruction is stored. At the "4" index point of Instruction time, an I4 (D3) time signal is effective to reset the Instruction Register in preparation for receiving the Load Base half word Instruction. At the "9" index point of Instruction time, the sign bit representation and 17th bit representation in the Deflection Register in combination with an I9 (D1) signal gates the Load Base half word Instruction from Memory via Memory Buses S to 17, if the half word instruction is from an even Address, or, via Memory Buses 18 to 35, if the half word instruction is from an odd Address, to the Memory Register units S to 17. At the "10" index point of Instruction time, and I10 (D1) signal gates the Load Base half word Instruction from the Memory Register to the Instruction Register. The Operation Decoder then decodes the sign and operation part of the Load Base Instruction and generates a LOAD BASE signal. At the "11" index point of Instruction time, an I11 (D1) signal is effective in combination with the LOAD BASE signal in the control circuits to generate a GO TO EX signal which is applied to the Cycle Timer where it is mixed with various clock pulses so that, at the next "0" index point, the Cycle Timer steps to Execute time.

At the "2" index point of the Execute time, an A2 (D1) signal is effective to transfer the sign and address portion of the Load Base half word instruction from the Instruction Register to the Deflection Register to thereby address the Memory position in which a Base half word is stored. At the "4" index point of Execute time, an E4 (D3) signal is effective in the control circuits to generate a RESET BASE signal which resets the Base Register in preparation for loading the Address portion of the new Base half word therein. At the "9" index point of Execute time, the sign bit representation of the Deflection Register designating a half word, in combination with the LOAD BASE signal and an E9 (D1) signal gates the Base half word from Memory, at the Address designated by the Address portion of the Load Base Instruction, via the Memory Buses S to 17, if the half word is from an even Address, or, via Memory Buses 18 to 35, if the half word is from an odd Address to the Memory Register units S to 17. At the same time, the above combination of signals produces a CLEAR MR (18 to 35) signal causing the Memory Register positions 18 to 35 to be cleared inasmuch as the Base half word is being stored in the Memory Register positions S to 17. At the "10" index point of Execute time, an E10 (D2) signal is effective in combination with the LOAD BASE signal in the control circuits to generate an END OP signal. The END OP signal is effective in the control circuits to generate a STEP INST CTR signal to condition the Instruction Counter to be stepped. At the "11" index point of Execute time, an A11 (D1) signal in combination with an L103 pulse is effective to step the Instruction Counter by one so that the next instruction read from Memory will be read from the next sequentially numbered Address. At the same time, an E11 (D1) signal is effective in the control circuits to generate a MR TO BASE signal causing the Address portion of the Base half word in the Memory Register positions 6 to 17 to be gated to and loaded in the Base Register. At the next "0" index point, the END OP signal in combination with various clock pulses is effective to cause the Cycle Timer to proceed to either Instruction time, for the next sequentially numbered instruction designated by the Instruction Counter, or, to Regenerate time.

There will now be repeated, in greater detail, the operation set forth briefly above.

Referring to FIGS. 4f to 4h, at the "0" index point of Instruction time, the sign trigger of the Deflection Register is conditioned to be turned off so that the sign bit representation will indicate that only a half word in Memory is to be addressed while the remaining triggers of the Deflection Register are conditioned to receive the Address setting of the Instruction Counter, which is the Address in Memory in which the Load Base half word Instruction is stored. These operations are effected, at the "2" index point of Instruction time, by an A2 (D1) signal, in a manner as described above in connection with the Deflection Register.

Referring to FIGS. 4a to 4c, at the "4" index point of Instruction time, an I4 (D3) signal is effective to reset the Instruction Register, in a manner as described above in connection with the Instruction Register, in preparation for receiving the Load Base half word instruction.

Referring to FIGS. 5c and 5z, at the "9" index point of Instruction time, the sign bit representation and the 17th bit representation in the Deflection Register in combination with an I9 (D1) signal half word instruction, in a manner as described above, from Memory via the Memory Buses S to 17, if the half word instruction is from an even Address, or, via the Memory Buses 18 to 35, if the half word instruction is from an odd Address, to the Memory Register units S to 17.

Referring again to FIGS. 4a to 4c, at the "10" index point of Instruction time, an I10 (D1) signal gates the Load Base half word instruction from the Memory Register to the Instruction Register. The Operation Decoder of FIG. 4i then decodes the sign and operation part of the Instruction and produces a positive signal on the LOAD BASE line.

Referring to FIG. 5ar, at the "11" index point of Instruction time, the positive signal on the LOAD BASE line is applied via an OR circuit 523e and line 524e to one input of the AND circuit 525e. A positive signal on the NO EXT CYC line, if no interruption has occurred, is applied to condition the AND circuit 525e which, when conditioned, passes the positive signal on the I11 (D1) line and via amplifier 526e and cathode follower 527e to the GO TO EX line. The positive signal on the GO TO EX line is applied to the Cycle Timer where it is mixed with various clock pulses, in a manner as described above, so that, at the next "0" index point, the Cycle Timer steps to Execute time.

Referring to FIGS. 4f to 4h, at the "0" index point of Execute time, the sign trigger of the Deflection Register is conditioned to be turned off so that the sign bit representation will indicate that a half word in Memory is to be addressed while the remaining triggers of the Deflection Register are conditioned to receive the Address setting of the Instruction Register, which is the Address portion of the Load Base half word Instruction, and designates the Address in Memory in which the Base half word is stored. These operations are effective, at the "2" index point of Execute time, by an A2 (D1) signal, in a manner as previously described above in connection with the Deflection Register.

Referring to FIG. 5bv, the positive signal on the LOAD BASE line is applied to condition the AND circuit 530g which, while conditioned, passes a positive signal on the E4 (D3) line and via an amplifier 531g and a cathode follower 532g to the RESET BASE line. The positive signal on the RESET BASE line, in FIG. 9e, is applied to turn off all of the triggers 928 of the Base Register.

Referring to FIG. 5c, since the sign trigger of the Deflection Register has been turned off the SIGN (+) line has a positive signal applied thereto which passes via the cathode follower 578a to the HALF line and to condition each of the AND circuits 575a and 577a. If a positive signal is maintained on the DEF REG 17 line, it passes via the conditioned AND circuit 575a and the cathode follower 576a to the ODD HALF line. However, if a positive signal is maintained on the DEF REG 17̄ line, it passes via the conditioned AND circuit 577a, the OR circuit 580a and the cathode follower 581a to the F/E HALF line.

Referring now to FIG. 5z, at the "9" index point of Execute time, the positive signal on the LOAD BASE line is applied via the OR circuit 566c, the cathode follower 567c and line 568c to one input of each of the AND circuits 550c, 555c, 560c and 563c. Since only a half word is addressed, in accordance with the Load Base Instruction, it is necessary to clear the right half of the Memory Register, that is, positions 18 through 35. Consequently, a positive signal on the HALF line is applied to condition the AND circuit 563c which, while conditioned, passes an E9 (D1) signal via an amplifier 564c and a cathode follower 565c to the CLEAR MR (18 to 35) line. The latter line in going positive clears, as explained below, the holdings of the Memory Register positions 18 to 35. If the half word is stored at an even Address, a positive signal is applied via the F/E HALF line to condition the AND circuit 550c which, while conditioned, passes an E9 (D1) signal via an OR circuit 552c, amplifier 553c and cathode follower 554c to the MEM BUS (S to 17) TO MR (S to 17) line. However, if the half word is stored at an odd Address, a positive signal is applied via the ODD HALF line to condition the AND circuit 555c which, while conditioned, passes an E9 (D1) signal via an OR circuit 557c, an amplifier 558c and a cathode follower 559c to the MEM BUS (18 to 35) TO MR (S to 17) line. The signal on the MEM BUS (S to 17) TO MR (S to 17) line is effective to gate a half word read from an even Address in Memory to the Memory Register positions S to 17 whereas the signal on the MEM BUS (18 to 35) TO MR (S to 17) line in combination with the signal on the CLEAR MR (18 to 35) line is effective to store a half word read from an odd Address in Memory to the Memory Register positions S to 17 while the Memory Register positions 18 to 35 are all reset to represent zeros.

Referring now to FIG. 5af, the positive signal on the LOAD BASE line is applied via an OR circuit 524d and line 525d to condition the AND circuit 526d. The AND circuit 526d, while conditioned, passes an E10 (D2) signal and via line 527b, the OR circuit 528b, the amplifier 529b and the cathode follower 530b to the END OP line. The positive signal on the END OP line passes through the normally conditioned AND circuit 568d of FIG. 5aj and via the amplifier 569d and the cathode follower 570d to the STEP INST CTR line. Referring to the Instruction Counter of FIG. 4d, the positive signal on the STEP INST CTR line in combination with the positive signal on the NO IRPT CYC line, if no interruption has occurred, are applied to the AND circuit 462b so that, at the "11" index point of Execute time, the positive signal on the A11 (D1) line conditions the AND circuit 462b to pass a positive pulse on the L103 line to step the Instruction Counter by one, in a manner as previously described, so that the next instruction will be read from the next sequentially numbered Address location in Memory. The positive signal on the END OP line is applied to condition the Cycle Timer of FIGS. 3c and 3d to proceed to either Instruction time or Regenerate time.

At the same time, referring to FIG. 5by, the positive signal on the LOAD BASE line is applied to condition the AND circuit 539g which, while conditioned, passes a positive signal on the E11 (D1) line and amplifier 540g and cathode follower 541g to the MR TO BASE line. A positive signal on the latter line, as explained below, causes the Address portion of the Base half word holding of the Memory Register, that is, positions 6 to 17, to be gated to and loaded in the Base Register. At the next "1" index point, the positive signal on the END OP line in combination with various clock pulses is effective to cause the Cycle Timer to proceed to either Instruction time, for the next sequentially numbered Instruction designated by the Instruction Counter, or, to Regenerate time, in a manner as previously described in connection with the Cycle Timer.

*Store Base Register*

Refer now to FIG. 6ah, which is the Timing Diagram for a Store Base Register operation. The function of the Store Base Instruction is similar to that described above for a Store operation except that corresponding orders of the Base Register rather than the Accumulator Register are gated via the Memory Buses to Memory and that the Address portion only of the Base half word stored in Memory is replaced with a new Base Address.

Since an Instruction comprises only a half word, then, at the "2" index point of Instruction time, an A2 (D1) signal causes the sign trigger of the Deflection Register to be turned off so that the sign bit representation indicates that only a half word in Memory is to be addressed and also gates the Address setting of the Instruction Counter to the Deflection Register to thereby address the Memory position in which the Store Base half word Instruction is stored. At the "4" index point of Instruction time, an I4 (D3) signal is effective to reset the Instruction Register in preparation for receiving the Store Base half word Instruction. At the "9" index point of Instruction time, the sign bit representation and 17th bit representation in the Deflection Register in combination with an I9 (D1) signal gates the Store Base half word Instruction from Memory via Memory Buses S to 17, if the half word instruction is from an even Address, or, via Memory Buses 18 to 35, if the half word instruction is from an odd Address, to the Memory Register units S to 17. At the "10" index point of Instruction time, an I10 (D1) singal gates the Store Base half word instruction from the Memory Register to the Instruction Register. The Operation Decoder then decodes the sign and operation part of the Store Base Instruction and generates a STORE BASE signal which is effective to produce a PREPARE FOR MEM RI (prepare for Memory read in) signal which stays positive until another Instruction is read into the Instruction Register and is decoded. The STORE BASE signal is also effective to produce a STORE ADR TO MEM signal which is effective to cause the unblanking of Memory positions 6 to 17 of an even Address or Memory positions 25 to 25 of an odd Address. The unblanking of these Memory positions is shown and described in the above identified Fox et al. application. At the "11" index point of Instruction time, an I11 (D1) signal is effective in combination with the STORE BASE signal in the control circuits to generate the GO TO EX signal which is applied to the Cycle Timer where it is mixed with various clock pulses so that, at the next "0" index point, the Cycle Timer steps to Execute time.

At the "2" index point of Execute time, an A2 (D1) signal is effective to transfer the sign and address portion of the Store Base half word from the Instruction Register to the Deflection Register to thereby address the Memory position in which the Address portion of the Base half word, presently stored in the Base Register, is to be stored. The sign bit representation and 17th bit representation in the Deflection Register in combination with the STORE BASE signal produces a ST BA F/E HALF signal if the Address of the Base half word is an even Address or a ST BA ODD HALF signal if the Address of the Base half word is an odd Address. At the "8" index point of Execute time, an E8 (D2) signal is effective, in combination with either the ST BA F/E HALF signal or the ST BA ODD HALF signal, in the control circuits to generate either a BA (6 to 17) TO MEM BUS (6 to 17) signal or a BA (6 to 17) TO MEM BUS (24 to 35) signal causes the outputs of the Base Register to be transferred via the Memory Bus Switches to the Memory Bus positions 6 to 17 for an even Address or Memory Bus positions 24 to 35 for an odd Address thereby changing the Address portion of the Base half word located at the Address designated by the setting of the Deflection Register, which is the Address designated by the Address portion of the Store Base Instruction. At the "10" index point of Execute time, an E10 (D2) signal is effective, in combination with the STORE BASE signal, in the control circuits to generate an END OP signal. The END OP signal is effective in the control circuits to generate a STEP INST CTR signal to condition the Instruction Counter to be stepped. At the "11" index point of Execute time, an A11 (D1) signal in combination with an L103 pulse is effective to step the Instruction Counter by one so that the next instruction read from Memory will be read from the next sequentially numbered Address. At the next "0" index point, the END OP signal in combination with various clock pulses is effective to cause the Cycle Timer to proceed to either Instruction time, for the next sequentially numbered instruction designated by the Instruction Counter, or, to Regenerate time.

There will now be repeated, in greater detail, the operation set forth briefly above:

Referring to FIGS. 4f to 4h, at the "0" index point of Instruction time, the sign trigger of the Deflection Register is conditioned to be turned off so that the sign bit representation will indicate that only a half word in Memory is to be addressed while the remaining triggers of the Deflection Register are conditioned to receive the Address setting of the Instruction Counter, which is the Address in Memory in which the Store Base half word instruction is stored. These operations are effected, at the "2" index point of Instruction time, by an A2 (D1) signal, in a manner as described above in connection with the Deflection Register.

Referring to FIGS. 4a to 4c, at the "4" index point of Instruction time, an I4 (D3) signal is effective to reset the Instruction Register, in a manner as described above in connection with the Instruction Register, in preparation for receiving the Store Base half word instruction.

Referring to FIGS. 5c and 5z, at the "9" index point of Instruction time, the sign bit representation and the 17th bit representation in the Deflection Register in combination with an I9 (D1) signal gates the half word instruction, in a manner as described above, from Memory via the Memory Buses S to 17, if the half word instruction is from an even Address, or, via the Memory Buses 18 to 35, if the half word instruction is from an odd Address, to the Memory Register units S to 17.

Referring again to FIGS. 4a to 4c, at the "10" index point of Instruction time, an I10 (D1) signal gates the Store Base half word instruction from the Memory Register to the Instruction Register. The Operation Decoder of FIG. 4j then decodes the sign and operation part of the instruction and produces a positive signal on the STORE BASE line. Referring to FIG. 5am, the positive signal on the STORE BASE line passes via an OR circuit 586d, an amplifier 587d and a cathode follower 588d to the PREP MEM RI line. As described in the application of Fox et al., the signal on the latter line prepares the memory for read in. Referring to FIG. 5bs, the positive signal on the STORE BASE line passes via an OR circuit 522g and cathode follower 523g to the STORE ADR TO MEM line. The positive signal on this line is effective to cause the unblanking of only Memory positions 6 to 17 or 24 to 35 for even or odd half word Addresses, respectively, as explained in the application of Fox et al.

Referring to FIG. 5ar, at the "11" index point of Instruction time, the positive signal on the LOAD MASK line is applied via an OR circuit 523e and line 524e to one input of the AND circuit 525e. A positive signal on the NO EXT CYC line, if no interruption has occurred, is applied to condition the AND circuit 525e which, when conditioned, passes the positive signal on the I11 (D1) line and via amplifier 526e and cathode follower 527e to the GO TO EX line. The positive signal on the GO TO EX line is applied to the Cycle Timer where it is mixed with various clock pulses, in a manner as described above, so that, at the next "0" index point, the Cycle Timer steps to Execute time.

Referring again to FIGS. 4f to 4h, at the "0" index point of Execute time, the sign trigger of the Deflection Register is conditioned to be turned off so that the sign bit representation will indicate that a half word in Memory is to be addressed while the remaining triggers of the Deflection Register are conditioned to receive the Address setting of the Instruction Register, which is the Address portion of the Store Base half word instruction, and designates the Address of the Base half word in Memory in which the Address portions is to be changed. These operations are effective, at the "2" index point of Execute time, by an A2 (D1) signal in a manner as previously described above in connection with the Deflection Register.

Referring to FIG. 5c, since the sign trigger of the Deflection Register has been turned off, the SIGN (+) line has a positive signal applied thereto which passes via the cathode follower 578a to the HALF line. The positive signal on the SIGN (+) line is also applied to condition the AND circuit 575a and 575a. If the 17th bit trigger of the Deflection Register is on, indicating an odd Address, a positive signal is applied via the DEF REG 17 line and the now conditioned AND circuit 575a and the cathode follower 576a to the ODD HALF line. However, if the 17th bit trigger of the Deflection Register is off, indicating an even Address, a positive signal is applied via the DEF REG $\overline{17}$ line and the now conditioned AND circuit 577a, and OR circuit 580a and a cathode follower 581a to the F/E HALF line. Referring now to FIG. 5ca, the positive signal on the STORE BASE line is applied to condition the AND circuits 550g and 552g. If an even Address is designated, a positive signal is applied via the F/E HALF line and the now conditioned AND circuit 550g and the cathode follower 551g to the ST BA F/E HALF line. However, if an odd Address is designated, a positive signal is applied via the ODD HALF line and the now conditioned AND circuit 552g and the cathode follower 553g to the ST BA ODD HALF line.

Referring to FIGS. 5bm and 5bn, at the "8" index point of Execute time, a positive signal on the ST BA F/E HALF line, if an even Address has been designated, is applied to condition an AND circuit 507g which, while conditioned, passes a positive signal on the E8 (D2) line and via the amplifier 508g and the cathode follower 509g to the BA (6 to 17) TO MEM BUS (6 to 17) line. This signal is effective to connect the outputs of the Base Register via the Memory Bus Switches to the Memory Bus positions 6 to 17 causing the Address portion of the Base half word at the even Address designated by the setting of the Deflection Register, which is the even Address designated by the Address portion of the Store Base Instruction, to be changed. At the same time, a positive signal on the ST BA ODD HALF line, if an odd Address has been designated, is applied to condition the AND circuit 510g which, while conditioned, applies a positive signal on the E8 (D2) line and via amplifier 511g and the cathode follower 512g to the BA (6 to 17) TO MEM BUS (24 to 35) line. This signal is effective to connect the outputs of the Base Register via the Memory Bus Switches to the Memory Bus positions 24 to 35 thereby causing the Address portion of the Base half word at the odd Address designated by the setting of the Deflection Register, which is the odd Address designated by the Address portion of the Store Base Instruction, to be changed.

Referring to FIG. 5af, at the "10" index point of Execute time, the positive signal on the STORE BASE line is applied via an OR circuit 524d and line 525d to condition the AND circuit 526d which, while conditioned passes a positive signal on the A10 (D2) line and via line 527d, the OR circuit 528d, the amplifier 529d and the cathode follower 530d to the END OP line. The positive signal on the END OP line passes through the normally conditioned AND circuit 568b of FIG. 5aj and via the amplifier 569d and the cathode follower 570d to the STEP INST CTR line. Referring to the Instruction Counter of FIG. 4d, the positive signal on the STEP INST CTR line in combination with the positive signal on the NO IRPT CYC line, if no interruption has occurred, is applied to the AND circuit 462b so that, at the "11" index point of Execute time, a positive signal on the A11 (D1) line conditions the AND circuit 462b to pass a positive pulse on the L103 line to step the Instruction Counter by one, in a manner as previously described, so that the next Instruction will be read from the next sequentially numbered Address location in Memory. A positive signal on the END OP line is applied to condition the Cycle Timer of FIGS. 3c and 3d to proceed to either Instruction time or Regenerate time. At the next "1" index point, the positive signal on the END OP line in combination with various clock pulses is effective to cause the Cycle Timer to proceed to either Instruction time, for the next sequentially numbered instruction Counter, or, to Regenerate time, in a manner as previously described in connection with the Cycle Timer.

It should be apparent that the Store Base Instruction permits the Address portion of a Base half word, which is located in Memory at the Address designated by the STORE BASE Instruction, to be changed to the Base Address which is presently stored in the Base Register. Also, it should be apparent that the Load Base Instruction permits the Base Address, which is presently stored in the Base Register, to be changed to the Address portion of the Base half word which is located at the Address designated by the Load Base Instruction. The Base Address is the beginning Address of a table of condition sub-routines. If the Base Address was a fixed number, then, the table would have to be changed each time a new program was being processed. This becomes increasingly inconvenient in multi-programmed machines in which different condition sub-routines may be actuated by an interruption condition. However, with the present invention, several tables may be stored in Memory, each associated with a different program, and selected by changing the Base Address in a manner as described above.

Store Leftmost One Counter

Refer now to FIG. 6ap, which is the Timing Diagram for a Store Leftmost One Counter operation. The function of the Store Loc Instruction is similar to that described above for a Store operation except that corresponding orders of the Leftmost One Counter rather than the Accumulator Register are gated via the Memory Buses to Memory and that the Address portion only of the Leftmost one half word stored in Memory is replaced with a new Loc Address.

Since an Instruction comprises only a half word, then, at the "2" index point of Instruction time, an A2 (D1) signal causes the sign trigger of the Deflection Register to be turned off so that the sign bit representation indicates that only a half word in Memory is to be addressed and also gates the Address setting of the Instruction Counter to the Deflection Register to thereby address the Memory position in which the Store Loc half word Instruction is stored. At the "4" index point of Instruction time, an I4 (D3) signal is effective to reset the Instruction Register in preparation for receiving the Store Loc half word Instruction. At the "9" index point of Instruction time, the sign bit representation and 17th bit representation in the Deflection Register in combination with an I9 (D1) signal gates the Store Loc half word Instruction from Memory via Memory Buses S to 17, if the half word Instruction is from an even Address, or, via Memory Buses 18 to 35, if the half word Instruction is from an odd Address, to the Memory Register units S to 17. At the "10" index point of Instruction time, an I10 (D1) signal gates the Store Loc half word Instruction from the Memory Register to the Instruction Register. The Operation Decoder then decodes the sign and operation part of the Store Loc Instruction and generates a STORE LOC signal which is effective to produce a PREPARE FOR MEM RI (prepare for Memory read in) signal which stays positive until another Instruction is read into the Instruction Register and is decoded. The STORE LOC signal is also effective to produce a STORE ADR TO MEM signal which is effective to cause the unblanking of Memory positions 6 to 17 of an even Address or Memory positions 24 to 35 of an odd Address. The unblanking of these Memory positions is shown and described in the above identified Fox et al. application. At the "11" index point of Instruction time, an I11 (D1) signal is effective in combination with the STORE LOC signal in the control circuits to generate the GO TO EX signal which is applied to the Cycle Timer where it is mixed with various clock pulses so that, at the next "0" index point, the Cycle Timer steps to Execute time.

At the "2" index point of Execute time, an A2 (D1) signal is effective to transfer the sign and Address portion of the Store Loc half word from the Instruction Register to the Deflection Register to thereby address the Memory position in which the Address portion of the Leftmost One half word, presently stored in the Leftmost One Counter, is to be stored. The sign bit representation and 17th bit representation in the Deflection Register in combination with the STORE LOC signal produces a ST LOC F/E HALF signal if the Address of the Leftmost One half word is an even Address or a ST LOC ODD HALF signal if the Address of the Leftmost One half word is an odd Address. At the "8" index point of Execute time, and E8 (D2) signal is effective, in combination with either the ST LOC F/E HALF signal or the ST LOC ODD HALF signals, in the control circuits either a LOC (6 to 17) TO MEM BUS (6 to 17) signal or a BA (6 to 17) TO MEM BUS (24 to 35) signal, to cause the outputs of the Leftmost One Counter to be transferred via the Memory Bus Switches to the Memory Bus positions 12 to 17 for an even Address or Memory Bus positions 30 to 35 for an odd Address. It should be noted that the Leftmost One Counter only has positions 12 to 17. Consequently, when the above transfer is made nothing is transferred via Memory Bus positions 6 to 11 or 24 to 29 or, in other words 0's are stored in these positions of the Leftmost One half word in Memory. Thus, the above transfer changes the Address portion of the Leftmost One half word located at the Address designated by the setting of the Deflection Register, which is the Address designated by the Address portion of the Store Loc Instruction. At the "10" index point of Execute time, an E10 (D2) signal is effective, in combination with the STORE LOC signal, in the control circuits to generate an END OP signal. The END OP signal is effective in the control circuits to generate a STEP INST CTR signal to condition the Instruction Counter to be stepped. At the "11" index point of Execute time, an A11 (D1) signal in combination with an L103 pulse is effective to step the Instruction Counter by one so that the next instruction read from Memory will be read from the next sequentially numbered Address. At the next "0" index point, the END OP signal in combination with various clock pulses is effective to cause the Cycle Timer to proceed to either Instruction time, for the next sequentially numbered instruction designated by the Instruction Counter, or, to Regenerate time.

There will now be repeated, in greater detail, the operation set forth briefly above:

Referring to FIGS. 4f to 4h, at the "0" index point of Instruction time, the sign trigger of the Deflection Register is conditioned to be turned off so that the sign bit representation will indicate that only a half word in Memory is to be addressed while the remaining triggers of the Deflection Register are conditioned to receive the Address setting of the Instruction Counter, which is the Address in Memory in which the Store Loc half word Instruction is stored. These operations are effected, at the "2" index point of Instruction time, by an A2 (D1) signal, in a manner as described above in connection with the Deflection Register.

Referring to FIGS. 4a to 4c, at the "4" index point of Instruction time, an I4 (D3) signal is effective to reset the Instruction Register, in a manner as described above in connection with the Instruction Register, in preparation for receiving the Store Loc half word instruction.

Referring to FIGS. 5c and 5z, at the "9" index point of Instruction time, the sign bit representation and the 17th bit representation in the Deflection Register in combination with an I9 (D1) signal gates the half word instruction, in a manner as described above, from Memory via the Memory Buses S to 17, if the half word instruction is from an even Address, or, via the Memory Buses 18 to 35. If the half word instruction is from an odd Address, to the Memory Register units S to 17.

Referring again to FIGS. 4a to 4c, at the "10" index point of Instruction time, an I10 (D1) signal gates the Store Loc half word instruction from the Memory Register to the Instruction Register. The Operation Decoder of FIG. 4j then decodes the sign and operation part of the instruction and produces a positive signal on the STORE LOC line. Referring to FIG. 5am, the positive signal on the STORE LOC line passes via an OR circuit 586d, an amplifier 587d and a cathode follower 588d to the PREP MEM RI line. As described in the application of Fox et al., the signal on the latter line prepares the memory for read in. Referring to FIG. 5bs, the positive signal on the STORE LOC line passes via an OR circuit 522g and cathode follower 523g to the STORE ADR TO MEM line. The positive signal on this line is effective to cause the unblanking of only Memory positions 6 to 17 or 24 to 35 for even or odd half word Addresses, respectively, as explained in the application of Fox et al.

Referring to FIG. 5ar, at the "11" index point of Instruction time, the positive signal on the LOAD MASK line is applied via an OR circuit 523e and line 524e to one input of the AND circuit 525e. A positive signal on the NO EXT CYC line, if no interruption has occurred, is applied to condition the AND circuit 525e which, when conditioned, passes the positive signal on the I11 (D1) line and via amplifier 526e and cathode follower 527e to the GO TO EX line. The positive signal on the GO TO EX line is applied to the Cycle Timer where it is mixed with various clock pulse, in a manner as described above, so that, at the next "0" index point, the Cycle Timer steps to Execute time.

Referring again to FIGS. 4f to 4h, at the "0" index point of Execute time, the sign trigger of the Deflection Register is conditioned to be turned off so that the sign bit representation will indicate that a half word in Memory is to be addressed while the remaining triggers of the Deflection Register are conditioned to receive the Address setting of the Instruction Register, which is the Address portion of the Store Loc half word instruction, and designates the Address of the Leftmost One half word in Memory in which the Address portion is to be changed. These operations are effective, at the "2" index point of Execute time, by an A2 (D1) signal in a manner as previously described above in connection with the Deflection Register.

Referring to FIG. 5c, since the sign trigger of the Deflection Register has been turned off, the SIGN (+) line has a positive signal applied thereto which passes via the cathode follower 578a to the HALF line. The positive signal on the SIGN (+) line is also applied to condition the AND circuits 575a and 577a. If the 17th bit trigger of the Deflection Register is on, indicating an odd Address, a positive signal is applied via the DEF REG 17 line and the now conditioned AND circuit 575a and the cathode follower 576a to the ODD HALF line. However, if the 17th bit trigger of the Deflection Register is off, indicating an even Address, a positive signal is applied via the DEF REG 17 line and the now conditioned AND circuit 577a, and OR circuit 580a and a cathode follower 581a to the F/E HALF line. Referring now to FIG. 5cb, the positive signal on the STORE LOC line is applied to condition the AND circuits 554g and 556g. If an even Address is designated, a positive signal is applied via the F/E HALF line and the now conditioned AND circuit 554g and the cathode follower 55g to the ST LOC F/E HALF line. However, if an odd Address is designated, a positive signal is applied via the ODD HALF line and the now conditioned AND circuit 556g and the cathode follower 557g to the ST LOC ODD HALF line.

Referring to FIGS. 5bp and bq, at the "8" index point of Execute time, a positive signal on the ST LOC F/E HALF line, if an even Address has been designated, is applied to condition an AND circuit 513g which, while conditioned, passes a positive signal on the E8 (D2) line and via the amplifier 514g and the cathode follower 515g to the LOC (6 to 17) TO MEM BUS (6 to 17) line. This signal is effective to connect the outputs of the Leftmost One Counter via the Memory Bus Switches to the Memory Bus positions 12 to 17. Since the Leftmost One Counter has only positions 12 to 17, then, 0's are effectively transferred via Memory Bus positions 6 to 11 thereby causing, in combination with the signals on Memory Bus positions 12 to 17, the Address portion of the Leftmost One half word at the even Address designated by the setting of the Deflection Register, which is the even Address designated by the Address portion of the Store Loc Instruction, to be changed. At the same time, a positive signal on the ST LOC ODD HALF line, if an odd Address has been designated, is applied to condition the AND circuit 516g which, while conditioned, applies a positive signal on the E8 (D2) line and via amplifier 517g and the cathode follower 518g to the LOC (6 to 17) TO MEM BUS (24 to 35) line. This signal is effective to connect the outputs of the Leftmost One Counter via the Memory Bus Switches to the Memory Bus positions 30 to 35. Since the Leftmost One Counter has only positions 12 to 17, then, 0's are effectively transferred via Memory Bus positions 24 to 29 thereby causing, in combination with the signals on Memory Bus positions 30 to 35 the Address portion of the Leftmost One half word at the odd Address designated by the setting of the Deflection Register, which is the odd Address designated by the Address portion of the Store Loc Instruction, to be changed.

Referring to FIG. 5af, at the "10" index point of Execute time, the positive signal on the STORE LOC line is applied via an OR circuit 524d and line 525d to condition the AND circuit 526d which, while conditioned passes a positive signal on the A10 (D2) line and via line 527d, the OR circuit 528d, the amplifier 529d and the cathode follower 530d to the END OP line. The positive signal on the END OP line passes through the normally conditioned AND circuit 568b of FIG. 5aj and via the amplifier 569d and the cathode follower 570d to the STEP INST CTR line. Referring to the Instruction Counter of FIG. 4d, the positive signal on the STEP INST CTR line in combination with the positive signal on the NO IRPT CYC line, if no interruption has occurred, is applied to the AND circuit 462b so that, at the "11" index point of Execute time, a positive signal on the A11 (D1) line conditions the AND circuit 462b to pass a positive pulse on the L103 line to step the Instruction Counter by one, in a manner as previously described, so that the next instruction will be read from the next sequentially numbered Address location in Memory. A positive signal on the END OP line is applied to condition the Cycle Timer of FIGS. 3c and 3d to proceed to either Instruction time or Regenerate time. At the next "1" index point, the positive signal on the END OP line in combination with various clock pulses is effective to cause the Cycle Timer to proceed to either Instruction time, for the next sequentially numbered instruction designated by the Instruction Counter, or, to Regenerate time, in a manner as previously described in connection with the Cycle Timer.

It should be apparent that the Store Loc Instruction permits the Address portion of a Leftmost One half word, which is located in Memory at the Address designated by the Store Loc Instruction, to be changed to the setting of Leftmost One Counter. With this Instruction, two related conditions may be used to initiate a particular sub-routine as will be explained below in connection with the Leftmost One Counter.

*Transfer and Store Counter*

Refer now to FIGS. 6aq, which is the Timing Diagram for a Transfer and Store Counter operation, which is not executed as an extra instruction due to a program interrupt, which will be described below in connection with the Interrupt Mode. The function of the TR STO C Instruction, which is not executed as an extra Instruction due to a program interrupt, is to step the Instruction Counter by one so that it holds the Address for the next sequential instruction and then replaces the Address portion of the half word (which will be a Transfer instruction half word), located at the Address designated by the Address portion of the TR STO C Instruction with the new Address now stored in the Instruction Counter, after which, the next instruction is taken from the Address designated by the Address portion of the TR STO C Instruction plus one. For example, let it be assumed that the Instruction Counter holds the Address 0017, at which the TR STO C Instruction half word is stored and that the Address portion of the TR STO C Instruction designates the Address 0198. Consequently, in executing the TR STO C Instruction, the Instruction Counter is stepped one to the next sequentially numbered Address, namely, Address 0018. Then, the Address portion of the half word located at the Address designated by the Address portion of the TR STO C Instruction, namely, Address 0198, is replaced by the new Address now stored in the Instruction Counter, namely, Address 0018, after which, the next Instruction is taken from the Address designated by the Address portion TR STO C Instruction plus one, namely, Address 0199. In order to get back to the main program, a Transfer Instruction is provided at the end of the sub-routine, the Address portion of which designates the Address of the Instruction (Transfer Instruction) whose Address portion contains the next sequential Address of the main program. Thus, continuing with the example, let it be assumed that the sub-routine starting at Address 0199 continues until a Transfer Instruction is reached at Address 0208, the Address portion of which designates the 0198, which is the location of the instruction whose Address portion contains the Address 0018, which is the next sequential Address of the main program. Consequently, Execution of the Transfer Instruction, at Address 0208, causes the next instruction to be taken from Address 0198 and then, Execution of the Transfer Instruction at Address 0198 causes the next instruction to be taken from Address 0018, which is the Address designated by the Address portion of the Transfer Instruction at Address 0198, and which is the Address of the next sequential instruction of the main program.

Since an Instruction comprises only half words, then, at the "2" index point of Instruction time, an A2 (D1) signal causes the sign trigger of the Deflection Register to be turned off so that the sign bit representation indicates that only a half word in Memory is to be addressed and also gates the Address setting of the Instruction Counter to the Deflection Register to thereby Address the Memory position in which the TR STO C half word Instruction is stored. At the "4" index point of Instruction time, an I4 (D3) signal is effective to reset the Instruction Register in preparation for receiving the TR STO C half word instruction. At the "9" index point of Instruction time, the sign bit representation and 17th bit representation in the Deflection Register in combination with an I9 (D1) signal gates the TR STO C half word Instruction from Memory via Memory Buses S to 17, if the half word instruction is from an even Address, or, via Memory Buses 18 to 35, if the half word instruction is from an odd Address, to the Memory Register units S to 17. At the "10" index point of Instruction time, an I10 (D1) signal gates the TR STO C half word instruction from the Memory Register to the Instruction Register. The Operation Decoder then decodes the sign and operation part of the TR STO C Instruction and generates a TR STO C signal which is effective to produce a PREPARE FOR MEM RI (prepare for Memory read in) signal which stays positive until another instruction is read into the Instruction Register and is decoded. The TR STO C signal is also effective to produce a STORE ADR TO MEM signal which is effective to cause the unblanking of Memory positions 6 to 17. The unblanking of these Memory positions is shown and described in the above identified Fox et al. application. At the "11" index point of Instruction time, an I11 (D1) signal is effective in combination with the TR STO C signal, in the control circuits, to generate a GO TO EX signal which is applied to the Cycle Timer where it is mixed with various clock pulses so that, at the next "0" index point, the Cycle Timer steps to Execute time.

At the "2" index point of Execute time, an A2 (D1) signal causes the sign trigger of the Deflection Register to be turned off so that the sign bit representation indicates that only a half word in Memory is to be addressed and also gates the Address portion of the TR STO C half word instruction from the Instruction Register to the Deflection Register to thereby address the Memory position in which the Address setting of the Instruction Counter is to be stored. At the same time, referring to the Instruction Counter of FIG. 4d, the TR STO C signal in combination with the NO IRPT CYC signal, since no interruption has occurred, and E2 (D1) signal and an L103 pulse is effective to step the Instruction Counter by one so that the Instruction Counter is now set to the Address of the next sequential instruction. At the "8" index point of Execute time an E8 (D2) signal is effective in combination with the TR STO C signal, in the control circuits, to generate an INST CTR (6 to 17) TO MEM BUS (6 to 17) signal which causes the Address setting of the Instruction Counter to be transferred via the Memory Bus Switches to the Memory Bus positions 6 to 17 to effectively change the Address portion of the half word located at the Address designated by the setting of the Deflection Register, which is the Address designated by the Address portion of the TR STO C Instruction. At the "11" index point of Execute time, an E11 (D1) signal is effective in combination with the TR STO C signal, in the control circuits, to generate a GO TO EX/RGN signal which applied to the Cycle Timer where it is mixed with various clock pulses so that, at the next "0" index point, the Cycle Timer steps to Execute/Regenerate time.

At the "2" index point of Execute/Regenerate time, an A2 (D1) signal gates the Address setting of the Regeneration Counter to the Deflection Register to thereby address the Memory position of the word to be regenerated. Following this at the "4" index point of Execute/Regenerate time, an A4 (D1) signal is effective to step the Regeneration Counter by one to the next sequential Address of the next sequential word to be regenerated. At the "7" index point of Execute/Regenerate time, a combination of A7 (D1), A8 (D1) and A9 (D1) signals are effective, in the control circuits, to generate an R INST CTR signal which resets the Instruction Counter of FIG. 4d in preparation for receiving the Address from which the next instruction is to be taken. At the "10" index point of Execute/Regenerate time, an E/R10 (D1) signal is effective in combination with the TR STO C signal, in the control circuits, to generate a SET INST CTR TO INST REG signal which causes the Address portion of the TR STO C instruction to be transferred from the Instruction Register to the Instruction Counter. The Address portion of a TR STO C Instruction is always an even number so that the least significant bit of the Address, which is in bit position 17, is always a 0. However, the SET INST CTR TO INST REG signal in combination with the TR STO C signal causes the least significant bit of the Address to be changed from 0 to 1 thereby effectively stepping the count of the Instruction Counter by one so that the Address of the next instruction read from Memory, designated by the Instruction Counter, is effectively the Address portion of the TR STO C Instruction plus one. At the same time, an E/R10 (D2) signal is effective in combination with the TR STO C signal, in the control circuits, to generate an END OP signal. The END OP signal, which is normally effective, in the control circuits, to generate a STEP INST CTR signal, is now blocked from generating this signal due to the fact that this is a Transfer operation and the Address for the next Instruction is already in the Instruction Counter. At the next "0" index point, the END OP signal, in combination with various clock pulses, is effective to cause the Cycle Timer to proceed to either Instruction time, for the next Instruction located at the Address designated by the Instruction Counter, or, to Regenerate time.

There will now be repeated, in greater detail, the operation set forth briefly above:

Referring to FIGS. 4f to 4h, at the "0" index point of Instruction time, the sign trigger of the Deflection Register is conditioned to be turned off so that the sign representation will indicate that only a half word in Memory is to be addressed while the remaining triggers of the Deflection Register are conditioned to receive the Address setting of the Instruction Counter, which is the Address in Memory in which the TR STO C half word instruction is stored. These operations are effective, at the "2" index point of Instruction time, by an A2 (D1) signal, in the manner as described above in connection with the Deflection Register.

Referring to FIGS. 4a to 4c, at the "4" index point of Instruction time, an I4 (D3) signal is effective to reset the Instruction Register, in the manner as described above in connection with the Instruction Register, in preparation for receiving the TR STO C half word Instruction.

Referring to FIGS. 5c and 5z, at the "9" index point of Instruction time, the sign bit representation and the 17th bit representation in the Deflection Register in combination with an I9 (D1) signal gates the half word Instruction, in a manner as described above, from Memory via the Memory Buses S to 17, if the half word Instruction is from an even Address, or, via the Memory Buses 18 to 35, if the half word Instruction is from an odd Address, to the Memory Register units S to 17.

Referring again to FIGS. 4a to 4c, at the "10" index point of Instruction time, and I10 (D1) signal gates the TR STO C half word Instruction from the Memory Register to the Instruction Register. The Operation Decoder of FIG. 4j then decodes the sign and operation part of the Instruction and produces a positive signal on the TR STO C line. Referring to FIG. 5am, the positive signal on the TR STO C line passes via an OR circuit 586d, an amplifier 587d and a cathode follower 588d to the PREP MEM RI line. As described in the application of Fox et al., the signal on the latter line prepares the Memory for read in. Referring to FIG. 5bs, the positive signal on the TR STO C line also passes via an OR circuit 522g and a cathode follower 523g to the STORE ADR TO MEM line. A positive signal on this line is effective to cause the unblanking of only Memory positions 6 to 17 or 24 to 35 for even or odd half word Addresses, respectively, as explained in the application of Fox et al.

Referring to FIG. 5ar, at the "11" index point of Instruction time, the positive signal on the TR STO C line is applied via an OR circuit 523e and line 524e to one input of the AND circuit 525e and a positive signal on the NO EXT CYC line, since no interruption has occurred, is applied to condition the AND circuit 525e which, when conditioned, passes the positive signal on the I11 (D1) line and via amplifier 526e and cathode follower 527e to the GO TO EX line. A positive signal on the GO TO EX line is applied to the Cycle Timer where it is mixed with various clock pulses, in a manner as described above, so that at the next "0" index point, the Cycle Timer steps to Execute time.

Referring again to FIGS. 4f to 4h, at the "0" index point of Execute time, a positive signal on the TR STO C line is applied to condition the AND circuit 419e which, while conditioned, passes a positive signal on the EX TIME line and via the OR circuit 433c and the cathode follower 434c to condition the AND circuit 438c so that, at the "2" index point of Execute time, the positive signal on the A2 (D1) line passes via the cathode follower 426c and the now conditioned AND circuit 438c to turn off the sign trigger 460c of the Deflection Register so that the sign bit representation will indicate that a half word in Memory is to be addressed. At the same time, namely, the "0" index point of Execute time, the remaining triggers of the Deflection Register are conditioned to receive the Address setting of the Instruction Register, which is the Address portion of the TR STO C half word Instruction, and designates the Address of the half word in Memory in which the Address portion is to be changed. This operation is effective, at the "2" index point of Execute time, by the A2 (D1) signal, in a manner as previously described above in connection with Deflection Register.

Referring to the Instruction Counter of FIG. 4d, the positive signal on the TR STO C line in combination with the positive signal on the NO IRPT CYC line, since no interruption has occurred, are applied to the AND circuit 403e so that, at the "2" index point of Execute time, the positive signal on the E2 (D1) line conditions the AND circuit 403e to pass the positive pulse on the L103 line to step the Instruction Counter by one, in a manner as previously described, so that the Instruction Counter is now set to the Address of the next sequential Instruction.

The Address portion of a TR STO C Instruction always designates a half word at an even Address. Consequently, referring to FIG. 5br, at the "8" index point of Execute time, a positive signal on the TR STO C line is applied to condition an AND circuit 519g which, while conditioned, passes a positive signal on the E8 (D2) line and via the amplifier 520g and the cathode follower 521g to the INST CTR (6 to 17) to MEM BUS (6 to 17) line. This signal is effective to connect the outputs of the Instruction Counter via the Memory Bus Switches to the Memory Bus positions 6 to 17 causing the Address portion of the half word at the even Address designated by the setting of the Deflection Register, which is the even Address designated by the Address portion of the TR STO C Instruction, to be changed.

Referring to FIG. 5ak, at the "11" index point of Execute time, a positive signal on the TR STO C line is applied via an OR circuit 579d and line 580d to condition the AND circuit 581d which, while conditioned, passes a positive signal on the E11 (D1) line and via OR circuit 583d, amplifier 584d and the cathode follower 585d to the GO TO EX/RGN line. The positive signal on the GO TO EX/RGN line is applied to the Cycle Timer, where it is mixed with various clock pulses, in a manner as described above, so that, at the next "0" index point, the Cycle Timer is stepped to Execute/Regenerate time.

Referring to FIGS. 4f to 4h, at the "0" index point of Execute/Regenerate time, the 6 to 15 position triggers of the Deflection Register are conditioned to receive the Address setting of the Regeneration Counter, which is the Address in Memory of a word to be regenerated. This operation is effective, at the "2" index point of Execute/Regenerate time, by an A2 (D1) signal, in a manner as described above in connection with the Deflection Register. The holding of the sign trigger 460c of the Deflection Register is immaterial since only full words are addressed to be regenerated, as described in said above identified application of Fox et al.

Referring to FIG. 4e, at the "4" index point of Execute/Regenerate time, an A4 (D1) signal is effective to step the Regeneration Counter, in a manner as described above in connection with the Regeneration Counter, in preparation for regenerating the next sequential word.

Referring to FIG. 5ba, at the "7" index point of Execute/Regenerate time, a positive signal on the TR STO C line is applied via OR circuit 582e and line 583e to condition the AND circuit 584e. At the same time, a positive signal on the EX/RGN TIME line is applied to condition the AND circuit 502g which, while conditioned, passes a series of signals on the A7 (D1), A8 (D1) and A9 (D1) lines and via the OR circuit 501g and the now conditioned AND circuit 502g, line E/R7 (D3) and the now conditioned AND circuit 584e, the amplifier 586e and the cathode follower 588e to the R INST CTR line. Referring to FIG. 4d, the positive signal on the R INST CTR line is effective to reset the Instruction Counter, in a manner as described above, in preparation for receiving the Address from which the next instruction is to be taken.

Referring again to FIG. 5ba, at the "10" index point of Execute/Regenerate time, the positive signal on line 583e conditions the AND circuit 585e which, while conditioned, passes a positive signal on the E/R10 (D1) line and via amplifier 587e and cathode follower 589e to the SET INST CTR TO INST REG line. Referring to FIG. 4d, the positive signal on the SET INST CTR TO INST REG line causes the Address portion of the TR STO C Instruction to be transferred from the Instruction Register to the Instruction Counter. Since the Address portion of a TR STO C Instruction is always an even number, the least significant bit of the Address, which is in bit position 17, maintains a negative signal on the ADR CTR 17 line to decondition the AND circuit 461*b* so that when a positive signal is applied to the SET INST CTR TO INST REG line it is blocked from passing therethrough to turn on the 17th bit trigger 476*b*. However, a positive signal on the TR STO C line is applied to condition the AND circuit 491*b* so that when the positive signal is applied to the SET INST CTR TO INST REG line it passes therethrough and via the OR circuit 492*b* to turn on the trigger 476*b* thereby effectively stepping the count by one. It should be noted that a carry ripple occurs in the Instruction Counter only when a particular trigger is turned off. However, since the trigger 476*b* is turned on to advance the count by one no ripple occurs and no delay is necessary to take into account carry ripple time. Thus, the Address of the next instruction read from Memory, designated by the Instruction Counter, is effectively the Address portion of the TR STO C Instruction plus one.

Referring now to FIG. 5*af*, at the "10" index point Execute/Regenerate time, a positive signal on the TR STO C line is applied via an OR circuit 520*d* and line 521*d* to condition the AND circuit 522*d* which, while conditioned, passes a positive signal on the E/R10 (D2) line and via line 523*d*, the OR circuit 528*d*, the amplifier 529*d* and the cathode follower 530*d* to the END OP line. Referring to FIG. 5*aj*, a positive signal on the TR STO C line is applied via the OR circuit 564*d* to the inverter 565*d* where it is inverted to a negative signal and applied via the cathode follower 566*d* and line 567*d* to decondition the AND circuit 568*d* so that the positive signal on the END OP line is blocked from passing therethrough to the STEP INST CTR line to initiate the stepping of the Instruction Counter inasmuch as the Address for the next Instruction is already in the Instruction Counter. The positive signal on the END OP line is applied to condition the Cycle Timer of FIGS. 3*c* and 3*e* so that, at the next "0" index point, the Cycle Timer proceeds to either Instruction time, for the next sequential Instruction located at the Address designated by the Instruction Counter, or, to regenerate time, in a manner as previously described in connection with the Cycle Timer.

*Transfer and Enable*

The function of the Transfer and Enable Instruction is similar to the Transfer Instruction, described above, in that, the next instruction is not taken from the next sequentially numbered Address, but rather from the Address designated by the Address portion of the Instruction and that the Allow No Interrupt trigger 312*e* of the Interruption Timer of FIG. 3*f* is reset to allow further interruptions to occur. The details of the Execution of a Transfer and Enable Instruction are described below in the description of the Interrupt mode.

ARITHMETIC UNIT GENERAL

In the control circuit, described above, Timing Charts and signals represented thereon, for each operation, are developed up to the point when this developed signal would feed to the Arithmetic Unit, per se. By the Arithmetic Unit, per se, is meant the following devices, which will later be separately described:

(1) The Memory Register.
(2) The Adder including the True/Complement control.
(3) The Accumulator Register.
(4) The Multiplier Quotient Register, and
(5) The Memory Bus Switches.

The relative location of each of these devices is illustrated by the composite formed of FIGS. 1*a* through 1*i*, assembled together in FIG. 2.

Briefly, the Memory Register, hereinafter referred to as the MR, contains 36 orders namely, S, and 1 through 35, of which the S order, and orders 1–4 and 35 are individually illustrated in FIG. 1*c*; the dash-dot lines, indicating the omitted orders, 5 through 34. The "S" order and orders 1 through 17, an exemplary one of which is illustrated in FIG. 7*a*, are similar to one another, while orders 18 to 35, an exemplary one of which is illustrated in FIG. 7*b*, are also similar to one another.

The Adder comprises orders Q, P and 1 through 35, the broken away section of FIG. 1*d*, indicating the omitted orders 5 through 34. Orders Q and P are similar to one another and an exemplary one is illustrated in FIG. 7*d*, while orders 1 through 35 are similar to one another and an exemplary one is illustrated in FIG. 7*c*.

The Accumulator Register (FIG. 1*d*) comprises orders S, Q, P and 1 through 35, the broken away section in FIG. 1*d* indicating the omitted orders 5 through 34. The S order is illustrated in FIG. 7*e*, while an exemplary one, of the orders Q, P and 1 through 35 which are similar to one another, is illustrated in FIG. 7*f*.

The Multiplier Quotient Register (FIG. 1*g*) hereinafter referred to as the MQ comprises orders S, and 1 through 35, the broken away section in FIG. 1*g* indicating the omitted orders 5 through 34, each of the orders S, and 1 through 35 being similar and an exemplary one being illustrated in FIG. 7*g*.

The Memory Bus Switches (FIG. 1*e*) comprise orders S, and 1 through 35, the broken away section in FIG. 1*e* indicating the omitted orders 2 through 34, the S order and orders 1 through 17, being similar, and an exemplary one being illustrated in FIG. 7*i*. Orders 18 through 35 are also similar and an exemplary one is illustrated in FIG. 7*h*.

Development of Certain Signals

Before proceeding to a detailed description of each of the circuits which comprise the Memory Register, the Adder, the Accumulator Register, the MQ and the Memory Bus Switches, reference will be had to FIG. 1*a* which illustrates how hold signals are developed for preserving information in the Delay Units of the Memory Register and the Accumulator Register. If either one of the lines MEM BUS (S to 17) TO MR (S to 17) or MEM BUS (18 to 35) TO MR (S to 17) is positive, it acts via an OR circuit 101, an inverter 102, a cathode follower 103, and parallel connected power cathode followers 104 and 105 to render the line HOLD MR (S to 17) negative, so that whenever either the line MEM BUS (18 to 35) TO MR (S to 17) or the line MEM BUS (S to 17) TO MR (S to 17) goes positive, the line HOLD MR (S to 17) goes negative. If both inputs to the OR circuit 101 are negative, then the line HOLD MR (S to 17) remains positive. When either line CLEAR MR (18 to 35) or MEM BUS (18 to 35) TO MR (18 to 35) connected to an OR circuit 106 is positive, the output of this OR circuit acts via an inverter 107, a cathode follower 108 and parallel connected power cathode followers 109 and 110 to drive the line HOLD MR (18 to 35) negative. If both the inputs to this OR circuit 106 are negative, the signal on the line HOLD MR (18 to 35) remains positive.

If either one of the respective inputs comprising line SHIFT ACC RIGHT, line SHIFT ACC LEFT or line ADDER TO ACC, goes positive, each of which feeds to an OR circuit 112, its output via an inverter 113, a cathode follower 114 and a power cathode follower 115, drives the line HOLD ACC negative. If all of these lines SHIFT ACC RIGHT, SHIFT ACC LEFT, or ADDER TO ACC are negative, the signal on the line HOLD ACC remains positive.

If input line (+) TO ACC (S) goes positive, which feeds to an inverter 116, its output via a cathode follower 117 drives the line HOLD ACC (S) negative. If the signal on the line (+) TO ACC (S) is negative, the signal on the line HOLD ACC (S) remains positive.

Referring now to FIG. 1g of the composite, a positive signal on any one of the input lines (+) TO MQ (S) CLEAR MQ or MR TO MQ, feeding to an OR circuit 120, produces an output which, via an inverter 121 and a cathode follower 122, drives the line HOLD MQ (S) negative. If any one of these lines (+) TO MQ (S), CLEAR MQ or MR TO MQ is negative, the line HOLD MQ (S) remains positive.

The OR circuit 123 (FIG. 1g) receives inputs via lines CLEAR MQ, SHIFT MQ LEFT, SHIFT MQ RIGHT and MR TO MQ, so that is output, via an inverter 124 and the parallel connected power cathode followers 125 and 126, render the line HOLD MQ (1 to 35) negative, when any one of these inputs to the OR circuit 123 goes positive. Otherwise the signal on the line HOLD MQ (1 to 35) remains positive.

*(1) Memory Register*

Figure 1C:
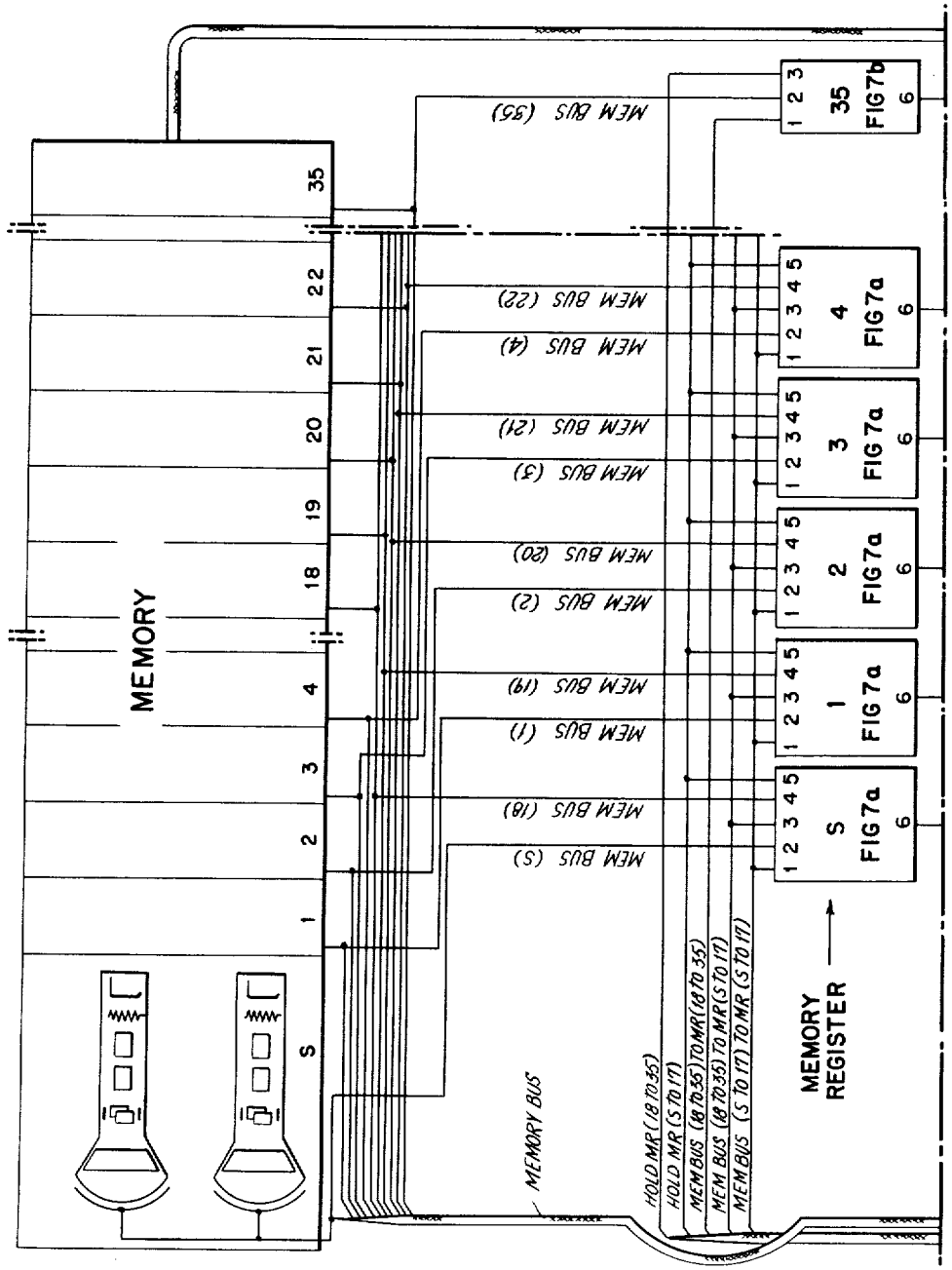

Referring to the blocks of FIG. 1c representing the Memory Register, a signal on the line HOLD MR (18 to 35) feeds to terminal 3 of the block representing Memory Register order 35 and this line also feeds to the respective terminals 3 of orders 18 through 34. The line HOLD MR (S to 17) feeds to terminals 5 of the blocks representing Memory Register orders S, and 1 through 17, as represented, for example, by the blocks illustrated for orders S, and 1 through 4. The line MEM BUS (18 to 35) TO MR (18 to 35) feeds to terminal 1 of the block representing Memory Register order 35, and also to the terminal 1 of Memory Register orders 18 through 34. The line MEM BUS (18 to 35) TO MR (S to 17) feeds to terminal 3 of Memory Register orders S, and 1 through 17. The line MEM BUS (S to 17) TO MR (S to 17) feeds to terminal 1 of each of the Memory Register orders, and 1 through 17.

It should be noted that the Memory Bus line MEM BUS (35) feeds to terminal 2 of the block representing the Memory Register order 35 and similarly, orders 18 through 34, which are similar to order 35, receives inputs from "corresponding" Memory Buses, respectively. It should also be noted that the line MEM BUS (S) feeds to terminal 2 of the Memory Register S order, the line MEM BUS (1) feeds to terminal 2 of the Memory Register 1 order, the line MEM BUS (2) feeds to terminal 2 of the Memory Register 2 order and "corresponding" Memory Register Buses feed to Memory Register orders 3 through 17.

The line MEM BUS (18) feeds to terminal 4 of the S order of the Memory Register, as well as to the "18" order, the line MEM BUS (19) feeds to terminal 4 of the Memory Register order 1, as well as to the "19" order, etc., so that Memory Register orders S through 17 receive inputs from both "corresponding" Memory Bus orders and also from Bus orders, which are 18 orders removed from the corresponding orders of the Memory Register. If a full word is addressed, the Sign bit and bits 1 through 35 of the full word are read out of Memory to the Memory Buses, S and 1 through 35, as described in said above identified application of Fox et al. At the same time, the Control Circuits apply positive signals to line MEM BUS (S to 17) TO MR (S to 17) of FIG. 1c, and to line MEM BUS (18 to 35) TO MR (18 to 35) while negative signals are applied, as described above, to the lines HOLD MR (S to 17) and HOLD MR (18 to 35). By the combination of these signals, just described, the respective holding of each Memory Bus S, and 1 through 35, is gated to the Memory Register orders S, and 1 through 35. If an odd half word is addressed, the line MEM BUS (18 to 35) TO MR (S to 17) is plus (FIG. 1a) and produces a negative signal on the line HOLD MR (S to 17) of FIGS. 1a and 1c, as described above, and at the same time, a signal, CLEAR MR (18 to 35) is generated (FIG. 1a), as described above, to produce a negative signal on the line HOLD MR (18 to 35) (FIGS. 1a and 1c). By means of these signals, information is gated from the Memory Buses 18 to 35 to the Memory Register orders 18 to 35, which are in effect reset to zeros, by reason of the negative signal on line HOLD MR (18 to 35). If an even half word is called for, from Memory, then a positive signal occurs on the line MEM BUS (S to 17) as described above (FIG. 1a) to produce a negative signal on the line HOLD MR (S to 17) which is fed to FIG. 1c, and a positive signal, produced on the line CLEAR MR (18 to 35) of FIG. 1a, will produce a negative signal on the line HOLD MR (18 to 35) which is fed to FIG. 1c to produce a gating of information from the Memory Buses S, and 1 through 17, to the Memory Register orders S, and 1 through 17, while Memory Register orders 18 through 35 are effectively reset to zeros by the negative potential of the line HOLD MR (18 to 35).

Referring to FIG. 7a, there is illustrated therein, a circuit exemplary of the respective Memory Register orders S, and 1 through 17. The storage device, per se, of this circuit is a Delay Unit 706a, of the type described in detail in the above identified Haddad et al. application. This Delay Unit 706a may receive inputs via AND circuits 701a, 702a or 703a. The outputs of these AND circuits 701a, 702a or 703a, pass via an OR circuit 704a and a cathode follower 705a to this Delay Unit. Thus, if the output of any one of these AND circuits 701a or 703a is positive, a positive signal is fed to this Delay Unit.

The signal applied to terminal 5 of FIG. 7a, is in turn fed via a line HOLD MR (S to 17) to one input of the AND circuit 701a, whose other input may be conditioned by the output from the Delay Unit 706a, so that when this output is positive to so condition this other input of AND circuit 701a, the output of the Delay Unit 706a passes through and via OR circuit 704a and the cathode follower 705a, back to the Delay Unit, to thus complete the recirculation loop which, as described above, maintains a manifestation of a binary 1 bit stored in the Delay Unit until the recirculation loop is broken by making line HOLD MR (S to 17) negative.

Whenever a full or an even half word is called for, the line MEM BUS (S to 17) TO MR (S to 17) is fed, via terminal 1, to condition one input of the AND circuit 703a, which receives a second input via terminal 2, to a "corresponding" Memory Bus "N," that is, a particular bus "corresponding" in number to the particular Memory Register order. If the signal on the line MEM BUS (N) is positive, it feeds through the now conditioned AND circuit 703a and via the OR circuit 704a and the cathode follower 705a, to the Delay Unit 706a. At the same time that the signal to terminal 1 goes positive, the signal on terminal 5 goes negative to break the recirculation loop, to thus effectively erase the former holding of the Delay Unit, while the new information is Read-In. The signals on the line MEM BUS (S to 17) TO MR (S to 17) normally goes positive, for one microsecond, when the transfer of information is to take place.

A third source of input to the Delay Unit 706a, is via the AND circuit 702a which receives information from that Memory Bus order, which is 18 orders removed to the right, of the "corresponding" order of the Memory Register, that is, $N+18$ orders. This occurs, when an odd half word is addressed. The line connected to terminal 4 is MEM BUS ($N+18$) which corresponds to a Memory Bus order, 18 bits to the right of the Memory Register order under consideration. This line, when positive, conditions one input of this AND circuit 702a, so that a one microsecond signal on the line MEM BUS (18 to 35) TO MR (S to 17) from terminal 3, passes via this now conditioned AND circuit 702a, the OR circuit 704a, and the cathode follower 705a to the Delay Unit 706a. At the same time, the line HOLD MR (S to 17)

from terminal 5 goes negative, to break the recirculation loop, so that during the one microsecond period, the former holding of the Delay Unit 706a is erased, and a new bit of information is stored via the AND circuit 702a. The output of the Delay Unit 706a is applied via a line MR (N) OUTPUT to terminal 6 to thus manifest the bit stored in the Delay Unit of the particular (N) order of the Memory Register.

By reference to the Timing Diagram of FIGS. 6ad and 6ae, it is seen that during an Instruction cycle, the signals MEM BUS (S to 17) TO MR (S to 17), MEM BUS (18 to 35) TO MR (18 to 35), MEM BUS (18 to 35) TO MR (S to 17) and CLEAR MR (18 to 35) are one microsecond signals, occurring at I9 time of each such Instruction cycle.

Referring to FIG. 7b, there is illustrated a Memory Register order exemplary of any one of the orders 18 to 35. A Delay Unit 711a is provided with two input sources. The output of the Delay Unit 711a feeds back to one input of an AND circuit 707a, whose other input, via terminal 3 and line HOLD MR (18 to 35) when positive, permits recirculation of the Delay Unit output, when positive, as described above in connection with FIG. 7a. The other input to Delay Unit 711a is via an AND circuit 708a which receives information on one of its inputs from Memory Bus order (N) "corresponding" to the Memory Register order under consideration. This AND circuit 708a is gated by a positive signal on its other input, received via terminal 1 and line MEM BUS (18 to 35) TO MR (18 to 35), to pass the information on this "corresponding" Memory Bus (18 to 35) to the Delay Unit 711a. As is seen from the Timing Diagram of FIG. 6ad, this signal MEM BUS (18 to 35) TO MR (18 to 35) occurs at I9 (D1) time. Simultaneously (FIG. 1a), this signal produces a negative signal on line HOLD MR (18 to 35) which negative signal is applied via terminal 3 (FIG. 7b) via line HOLD MR (18 to 35) to one input of the AND circuit 707a to break the recirculation path and thus erase the former holding of the Delay Unit 711a. Both AND circuits 707a and 708a feed via an OR circuit 709a and a cathode follower 710a to the Delay Unit 711a. The output of this Delay Unit is via a line MR (N) OUTPUT which is thus representative of the binary 1 or binary 0 manifestation, stored in the Delay Unit in the respective order of the Memory Register. The outputs of the Memory Register orders S, and 1 through 35 (with the exception of the S order, which is described below) feed to corresponding orders of the Adder (FIGS. 1c and 1d) and MR orders S, and 1 through 35, all feed via the wires and cables, as shown in FIGS. 1c, 1d and 1g to "corresponding" orders of the MQ. Further, orders S, and 1 through 17 of the MR feed, via the wires and cable as shown in FIGS. 1c, 1d, 1e and 1f to the Instruction Register (FIG. 1f) as stated above.

Referring to the Timing Diagram, FIG. 6ad, it is seen that this transfer from MR to the Instruction Register takes place at I10 (D1) time, which is subsequent to I9 (D1) time, when as described above, a full or a half word is gated from the Memory Buses to MR. Further, it is noted from the Timing Diagram of FIG. 6ad (under Execute) that the lines MEM BUS (S to 17) TO MR (S to 17), MEM Bus (18 to 35) TO MR (18 to 35), MEM BUS (18 to 35) TO MR (S to 17) and CLEAR MR (18 to 35) may receive positive one microsecond signals at E9 time. These signals, occurring during Execute cycles, are effective, when a word is being read out of Memory, to the Memory Register, preparatory to being operated on during a particular Instruction called for. Thus it is seen that either full or half words may be read out of Memory, during an Execute cycle, while during an Instruction cycle, a half word only is read out of Memory, since each Instruction comprises a half word only.

*(2) Adder and True/Complement Control*

Referring to FIGS. 1d, 7c and 7d, it is seen that the Adder True/Complement control sections of orders Q, P and 1 through 35, receive inputs from "corresponding" Accumulator Register orders, via the respective input terminals 3, while orders 1 through 35, of the Adder also receive inputs, from "corresponding" Memory P and 1 through 34 receive Carry inputs, via the respective input terminals 2 from the order to the right, the order 35 input terminal 2 receiving a Carry from the Q order, developed as described above, which may be an "artificially injected" Carry. Each of the Adder orders, Q, P and 1 through 35 has an output, via a respective output terminal 8, which is connected to an input terminal 2 of a "corresponding" order of the Accumulator Register, and each Adder order feeds a Carry from its terminal 7 to an input terminal 2 of the Adder order to the left with the exception of the Q order, which feeds to the 35 order, as described below.

There are four control signals feeding to the Adder. One is an E/R1 (D4) signal on the line MR to ADDER (see FIG. 6ae) for getting the holding of the MR to the Adder (see also FIGS. 1d and 7c) the second is an E/R1 (D4) on line ACC TRUE to ADDER (see FIG. 6ae) for gating the holding of the Accumulator Register, in True form, to the Adder (see also FIGS. 1d and 7c) the third control signal is an E/R1 (D4) signal, or, on occasion, an E/R7 (D2) signal on line ACC COMP TO ADDER (for both see FIG. 6ae) for transferring the holding of the Accumulator Register, in complement form, to the Adder (see also FIGS. 1d and 7c) while the fourth control signal E/R1 (D4) on line CARRY ADDER (35) (see FIG. 6ae), which is effective, to insert a Carry, into the Adder order 35 (see FIG. 1d and the "equivalent" Carry In signal of FIG. 7c). This latter Carry, as stated above, may be an "artificial" Carry or may be the Carry output of the Q order, of the Adder. The Carry output from terminal 7 of the Q order (FIGS. 1d and 7d) feeds to a line labeled ADDER Q CARRY in FIG. 1d, but it is to be recalled that, as described above, this Carry passes through additional switching circuits, before feeding to the Adder order 35 input terminal 2, as the signal on line CARRY ADDER (35) of FIG. 1d.

Referring to FIG. 7c, there is illustrated an exemplary order, representative of any one of the Adder orders 1 through 35, respectively, including the True/Complement controls, associated with the respective order. The input to the Adder, per se, is via lines X, Y and Z, representing, respectively, the Accumulator Register output to the Adder, the Memory Register output to the Adder, and a Carry input from the next lower order stage. The corresponding Sum and Carry outputs are represented, respectively, on the lines SUM OUT and CARRY OUT.

The output, from the corresponding order of the Memory Register, is fed to terminal 5, and thus to line MR (N) to thereby condition and AND circuit 721a. This output from the Memory Register, therefore, if positive, represents a binary 1, to thus gate a four microsecond signal, applied via terminal 6 to the line MR TO ADDER (see FIG. 6ae) at E/R1 (D4) time, to the AND circuit 721a, so that it passes via a noninverting amplifier 722a of the type described in the above identified application to Haddad et al. and a cathode follower 723a, to the line Y. If this output from the Memory Register is a binary 0, then the line MR (N) is negative, which prevents passage of the four microsecond signal, so that line Y remains negative.

The output from the corresponding order of the Accumulator Register feeds to terminal 3, and thus to line ACC (N). The signal on this line is positive when a binary 1 is stored in the corresponding order of the Accumulator Register, but is negative when a binary 0 is stored therein, and feeds to an AND circuit 711a and also to an interview 712a. Assuming that a binary 1 is stored in the corresponding Accumulator Register order, and AND circuit 711a is conditioned, so that, as a four microsecond signal is fed to the terminal 4 and line ACC TRUE TO ADDER at E/R1 (D4) time (FIG. 6ae) this signal passes via the now conditioned AND circuit 711a, an OR circuit 715a, a non-inverting amplifier 716a, and a cathode follower 718a to the line X. Thus, if the output of the corresponding Accumulator Register order is a binary 1, and the line ACC TRUE TO ADDER is conditioned, there will be a binary 1 positive output, from the cathode follower 718a to the line X. If a binary 0, however, were present, in the corresponding Accumulator Register order, then the 4 microsecond signal E/R1 (D4) is not gated to the AND circuit 711a, since the latter would not be conditioned.

Assuming a positive signal on line ACC (N), representing a binary 1, also feeds through the above mentioned inverter 712a, and a cathode follower 713a, to one input of an AND circuit 714a. Under the conditions assumed, this AND circuit 714a would not be conditioned, since the positive output, from the Accumulator Register has been inverted by inverter 712a. However, if a binary 0 were present in the corresponding Accumulator Register order, the signal on the line ACC (N) would be negative, and by inversion in inverter 712a, would condition the AND circuit 714a. The other input to this AND circuit 714a is via line ACC COMP TO ADDER, connected to terminal 1, to which an E/R1 (D4) signal is applied (FIG. 6ae) and, with a binary 0 output assumed, as next above, will pass through the conditioned AND circuit 714a, the OR circuit 715a, the non-inverting amplifier 716a, and the cathode follower 717a to the line X.

Thus, it is possible to have either a true or a complement representation of the holding of the corresponding Accumulator Register order, applied to the line X, which feeds to an OR circuit 718a, and also to one input of a three input AND circuit 724a, and to one input, of the two input AND circuits, 728a and 729a of the Adder, per se.

These are occasions when an E/R7 (D2) signal occurs on the line ACC COMP TO ADDER (FIG. 6ae) and in such instances, the complementing of the Accumulator Register output takes place at "7" time, it being noted that the positive signal, if there be one, reaching the line X from the cathode follower 717a, is a 2 microsecond signal instead of a 4.

The input to terminal 2 feeds the line CARRY IN which is a Carry output from the succeeding lower order and is substantially coincident with the signals, present on the lines X and Y, since there is relatively no time delay in the passage of information, through the Adder, for the forming of the Sum and Carry outputs.

In brief summary, there are three possible inputs to the Adder per se, one via line X, which is the true or complement representation of the corresponding binary 1 or binary 0 value stored in the Accumulator Register, secondly an input via line Y, which is the binary 1 or binary 0 manifestation of the value, stored in the corresponding order of the Memory Register, and thirdly, a signal on line Z, which is the Carry from the next lower order of the Adder. The outputs of certain blocks of the Adder, may be tabulated as follows:

The output of the OR circuit 718a is positive, if there is a binary 1 present, on at least one of the inputs X, Y or Z. The output of the AND circuit 724a, is positive, if, and only if, there are binary 1's present on all three outputs X, Y and Z. The output from the AND circuit 728a is positive, if there are binary 1's present on input lines X and Y. The AND circuit 729a has a positive output, if there are binary 1's present on input lines X and Z. The output of the AND circuit 730a is positive, if binary 1 inputs are present on input lines Y and Z. The outputs of the AND circuits 728a, 729a or 730a, when positive, signify a Carry, since a sum of at least 1+1 is represented. The outputs of all these three AND circuits feed to an OR circuit 731a, so that its output is positive if a Carry has occurred. This output feeds, via a non-inverting amplifier 732a and a cathode follower 733a to the line CARRY OUT, which feeds, via a terminal 7, to the Carry input, of the next higher order. The signals on this line CARRY OUT also feed, via an inverter 726a and a cathode follower 727a, to an OR circuit 725a. Thus, the input to the OR circuit 725a via the cathode follower 727a, is positive, only if there has been no carry. Therefore, if no carry output has occurred, a positive signal is passed, through this OR circuit 725a, to condition an AND circuit 719a. The second input to this AND circuit 719a is via the OR circuit 718a, whose output is positive, as stated above, if at least one input X, Y or Z contains a binary 1. Therefore, the output of the AND circuit 719a, is positive, provided there is no carry and there is at least one input to the OR circuit 718a. This output of the AND circuit 719a passes via a cathode follower 720a to the line SUM OUT and thus to terminal 8.

Thus, it is seen that if there are two binary 1 inputs to the adder, via lines X, Y and Z, a carry output occurs. However, if there is only one binary 1 input to the Adder, there is no carry output so that plus is applied via the OR circuit 725a, whose output comprises one input to the AND circuit 719a which, with one input thus positive to the OR circuit 718a, this AND circuit 719a passes a signal, via the cathode follower 720a to provide a Sum output.

There still remains to be considered the condition, wherein binary 1's are present on all three lines X, Y and Z which provide not only a Carry output but also a Sum output. Thus, if all three lines X, Y and Z are positive, representing binary 1's, the output of the AND circuit 724a is positive, and feeds, via the OR circuit 725a to condition the AND circuit 719a. The AND circuit 719a will then pass a positive signal, applied to it via the OR circuit 718a, which has a positive output since all three of its inputs are positive (only one being necessary to develop a positive output) and the output of AND circuit 719a is applied via the cathode follower 720a to the line SUM OUT and thus to terminal 8. At the same time, a Carry output will be developed since AND circuits 728a, 729a and 730a all emit positive signals which pass via the OR circuit 731a, the non-inverting amplifier 732a and the cathode follower 733a to the line CARRY OUT and to terminal 7.

Referring now to FIG. 7d, which illustrates an exemplary circuit representative of the Adder orders P and Q, the input from the "corresponding" order of the Accumulator Register passes through True-Complement control circuits, identical to those described above for the Adder orders 1 through 35, blocks 741a through 747a of FIG. 7d, corresponding to the blocks 711a through 717a of FIG. 7c. Thus, it is seen that signals on line "A" of the Adder per se, in FIG. 7d, represent either True or Complement, binary 0 or binary 1 value manifestations, from corresponding orders of the Accumulator Register. Likewise, when input terminal 2 (FIG. 7d) is positive, to represent a binary 1 Carry, it is fed via the line CARRY IN to line B of the Adder, per se. The operation of the remaining circuitry of FIG. 7d, is that of a half Adder, having two inputs. If there are binary 1 inputs, that is positive signals, on both lines A and B, simultaneously, the resulting sum is zero, with a Carry of a binary 1. If there is a binary 1 present on line A, but a binary 0 on line B, the result is a binary 1 sum and a binary 0 Carry. Likewise, if there is a binary 0 on line A, but a binary 1 on line B, the result is a sum of binary 1 and no Carry. The final condition, if there are binary 0's on both lines A and B, produces a sum of binary 0, and a Carry of binary 0. The output of the AND circuit 748a is positive, only when it receives two positive inputs, so that if both lines, A and B, have binary 1's, the output of the AND circuit 748a goes positive, and via a cathode follower 749a, drives the line CARRY OUT positive, which is applied to terminal 7. When a binary 1 is present, on either line A or B, or both, the output of the OR circuit 752a, goes positive, and conditions the AND circuit 753a. If a Carry output, did occur, which signifies that both lines A and B contain binary 1's, the positive output of a cathode follower 749a, signifying a binary 1, is inverted by an inverter 750a and passed via a cathode follower 751a to an AND circuit 753a. Thus, if both lines A and B contain binary 1's, the result is a Carry output, but the Sum output is blocked from passing through the AND circuit 753a. However, if a binary 1 is present on line A or B, there still is a positive output, from the OR circuit 752a, and, since there is no Carry, the inverter 750a cannot invert a plus input, since there is none, so that the AND circuit 753a is conditioned, and a positive output from the OR circuit 752a passes through this conditioned AND circuit 753a, and the cathode follower 754a, to the line SUM OUT and thus to terminal 8.

Thus, it is seen that if binary 1's are present on both lines A and B, a binary 1 Carry output is developed, but the sum output is a binary 0. If a binary 1 is present, on line A or B, a binary 0 Carry output is developed, but the sum output is a binary 1. If binary 0's are present on both lines A and B, then both output lines, the SUM OUT and CARRY OUT, remain negative to signify binary 0's.

(3) Accumulator Register

Referring again, to FIG. 1d, a block diagram of the Accumulator Register is illustrated therein. It is to be noted that the Sign order (see also FIG. 7e) is different from all the other orders of the Accumulator Register (see FIG. 7f).

The Q, P and 1 through 35 orders, are alike and an exemplary order is illustrated in FIG. 7f.

Each order of the Accumulator Register comprises a Delay Unit of the type as described above and as indicated (FIGS. 7e and 7f, respectively), there are two sources of hold voltage namely, the line HOLD ACC (S) (FIG. 7e) and the line HOLD ACC (FIG. 7f).

The line HOLD ACC (S) for the Sign order is connected to terminal 2, (FIG. 7e) while the line HOLD ACC (FIG. 7f) is connected to terminal 7 and feeds to all the Accumulator Register orders Q, P and 1 through 35. These orders, Q P and 1 through 35 each receive said input, from "corresponding" orders of the Adder and these same orders have outputs, which feed to respective terminals 3 (FIG. 1d) of the True/Complement controls, described above, of corresponding orders of the Adder.

Order 35 of the Accumulator Register (FIG. 1d) receives an input via its terminal 4, from the MQ order 1 (FIG. 1g) which is effective, when the control line MQ (1) TO ACC (35) feeding to terminal 3 of this 35th order (FIG. 1d) goes positive (see also FIG. 7f) to permit the contents of MQ order 1 to be introduced into the Accumulator Register 35. On a Long Shift Left Instruction or a Divide Instruction, as described below, this signal MQ (1) TO ACC (35) is applied to terminal 3 of the 35th order, instead of SHIFT ACC LEFT (FIG. 7f). The outputs of "corresponding" orders of the Adder are gated to the Accumulator Register as the line ADDER TO ACC connected to the respective terminals 1 (FIGS. 1d and 7f) goes positive. A signal on this line (FIG. 1a) also causes the line HOLD ACC, to go negative at the same time as described above in connection with FIG. 1a. The holding of the Accumulator Register may also be shifted to the right, or to the left, by positive signals on the respective lines SHIFT ACC RIGHT connected to the respective terminals 5, or line SHIFT ACC LEFT connected to the respective terminals 3 (FIGS. 1d and 7f), this shifting occurring, at the rate of one order, for each microsecond that the respective lines are positive. The signals on the lines SHIFT ACC RIGHT and SHIFT ACC LEFT (FIG. 1a) also respectively cause the line HOLD ACC to go negative (see also FIG. 7f).

It should be noted that the outputs at respective terminals 8 of the Accumulator Register orders feed to an input terminal 4, of the next higher order (FIG. 1d) and also to an input terminal 6, of the next lower order. It is these output signals, which are gated to the respective Delay Units, during a Shift Accumulator Left or a Shift Accumulator Right operation, as the case may be, or during a Long Shift Left or a Long Shift Right operation. The output of the Q order shifts to the right only, so that in FIG. 7f, the line SHIFT ACC LEFT is not used in the Q order.

The output of Accumulator Register order 35, besides feeding to order 34, also feeds to terminal 2 of the MQ 1 order (FIGS. 1d, 1g and 7g). The orders S and 1 through 35 of the Accumulator Register also have outputs (FIGS. 1d and 1e) which feed to "corresponding" orders of the Memory Bus Switches, described below. As the Accumulator Register is shifted left, the output of the 1 order is connected to the Mixing Circuits (FIGS. 1d, 1e and 1b) and thence to the overflow Trigger, (FIG. 1b) as described above. Therefore, if a binary 1 is stored in the Accumulator Register 1 order, and the Accumulator Register is shifted to the left, one order, an Overflow automatically results.

Referring now to FIG. 7e, which illustrates the Accumulator Register sign order, again the basic storage element is a Delay Unit designated as 764a. The condition of the Delay Unit is dependent upon the binary 1 or binary 0 character of the inputs, from either one of two sources. One is the recirculating feed back, feeding from the output of the Delay Unit and passing through the AND circuit 761a, provided the line HOLD ACC (S) connected to the terminal 2 is positive, to thereby condition this AND circuit 761a whose output then passes, via an OR circuit 762a and a cathode follower 763a, to the input of the Delay Unit 764a.

On occasions, when it is necessary to put a positive sign indication into the Delay Unit, that is, a holding of a binary 0, the HOLD ACC (S) voltage only is made negative (see inverter 116 and cathode follower 177 of FIG. 1a) so that the line HOLD ACC (S) of FIG. 7e is rendered negative, and thus, regardless of what was formerly stored in the Delay Unit, the Delay Unit output then goes negative, which need not be recirculated, since a negative output is produced by the Delay Unit unless it is forced to produce a positive output, which positive output must be recirculated to be sustained, as all described in the above identified application to Haddad et al.

However, when it is necessary to enter a negative sign into the Accumulator Sign order (a binary 1) a positive signal is fed directly into the OR circuit 762a (FIG. 7e) via input terminal 1, to line (—) TO ACC (S) implying Minus Sign TO ACC (S) Order. The effect of this positive input to this OR circuit 762a, which passes directly via the cathode follower 763a, to the Delay Unit 764a, even though the AND circuit 761a is operative for feed back, is to inject a binary 1, that is a positive signal, into the Delay Unit, regardless of what was there previously. The recirculating loop of the Delay Unit is not broken at this time. Thus, if a binary 1 was formerly stored in the Delay Unit, it is recirculated in an attempt to again store a binary 1, which merely results in a binary 1 being stored (if a binary 0 is stored, no recirculation is produced, since none is required). The output of the sign position, via line ACC (S) to terminal 3, is positive to indicate the storage of a "negative" Sign and conversely if negative to indicate a "positive" Sign. The output terminal 3, as indicated in FIGS. 1d and 1e, is connected to terminal 2 of the Memory Bus Switches, order S, described below and also is connected, as shown in FIGS. 1e and 1a, to the Sign Mixer circuits, described above in connection with FIG. 5c.

Referring to FIG. 7f, there is illustrated an exemplary circuit representative of the Accumulator Register orders Q, P, and 1 through 35. It may be noted (see FIG. 1d) that input terminals 5 and 6, of the Q position, are not used, so that consequently, the AND circuit 773a (FIG. 7f) and its corresponding output to the OR circuit 775a are not employed in this Q order. The circuitry of these orders is somewhat similar to the circuitry of the orders of the Memory Register, described above, in that a Delay Unit 777a (FIG. 7f) comprises the storage element, per se, of the respective orders. As illustrated in FIG. 7f, this Delay Unit 777a may receive an input, via one of four AND circuits. This Delay Unit may receive an input, as its output is recirculated, via an AND circuit 774a, provided line HOLD ACC, which is connected to terminal 7, remains positive, thus conditioning this AND circuit, whose output passes via an OR circuit 775a, and a cathode follower 776a to this Delay Unit 777a. The signal on the line HOLD ACC, is of course, driven negative, as described above, whenever any Shift Left or Shift Right signal is given, and also when the holding of the Adder is being gated to the Accumulator Register. The effect of the interruption of this hold signal is effectively to erase whatever is already stored in the Delay Unit, since only a binary zero can exist with this AND circuit 774a deconditioned.

Referring to the AND circuit 773a of FIG. 7f, this receives input signals via line SHIFT ACC RIGHT connected to terminal 5, and via line ACC (N+1) OUTPUT connected to terminal 6, this line comprising the output from the next higher order of the Accumulator Register. Upon a coincidence of two such positive inputs, the output of the AND circuit 773a goes positive, and via the OR circuit 775a and the cathode follower 776a applies a positive signal to the Delay Unit 777a. Thus, whenever a signal of 1 microsecond duration is given, calling for a SHIFT ACC RIGHT operation, the output of the next higher order of the Accumulator Register is gated via this AND circuit 773a to the Delay Unit 777a. At the time that the line SHIFT ACC RIGHT goes positive, the line HOLD ACC is negative and is thus effective to erase the former holding of the Delay Unit. At the end of the 1 microsecond period, the line HOLD ACC again becomes positive to hold the newly stored bit of information, which was received from the next higher order of the Accumulator Register. If the signal on the line SHIFT ACC RIGHT is of a sufficient duration, say several microseconds, a shift from the next higher order of the Accumulator Register occurs, during each microsecond, the line HOLD ACC remaining negative during that period. Thus, for each microsecond that the line SHIFT ACC RIGHT is positive, a bit of information, is sucessively shifted, one order, for each such microsecond, to succeeding lower orders of the Accumulator Register. It is an inherent characteristic of a Delay Unit such as Delay Unit 777a, as described above, which allows an input signal to arrive at the Delay Unit input at the same time an output sign is being emitted, by this Delay Unit indicative of what was formerly stored in that Unit.

The AND circuit 772a serves a function, similar to that of AND circuit 773a, except that it is for Shift Left. Here, an input signal on terminal 3 is applied to line SHIFT ACC LEFT to condition this AND circuit 77a, while the output of the next lower order of the Accumulator Register is applied via terminal 4 to line ACC (N−1) OUTPUT and this output, from the next lower order is passed via this AND circuit 772a, the OR circuit 775a, and the cathode follower 776a, to the Delay Unit 777a. Again, a shifting of a bit of information to a successive order of the Accumulator Register (shifting to the left) occurs, for each microsecond that the line SHIFT ACC LEFT is positive, line HOLD ACC remaining negative during that time.

The AND circuit 771a receives inputs from "corresponding" Adder order sum outputs, via the terminal 2, feeding to the line SUM OUTPUT. If this AND circuit 771a is conditioned by a positive voltage on line ADDER TO ACC connected to terminal 1, which may be either an E/R4 (D1) or an E/R8 (D1) signal (see Timing Diagram, FIG. 6ae) then the sum output is gated through this AND circuit 771a.

Thus, upon coincidence of two positive inputs, the output of this AND circuit 771a goes positive, and via the OR circuit 775a and the cathode follower 776a feeds a positive signal to the Delay Unit 777a. If the sum output of the "correesponding" Adder order is a binary 0, this signal on the line SUM OUTPUT, is negative, and the signal input to the Delay Unit 777a is negative to thereby store a binary 0. The output of the Delay unit 777a, feeds via line ACC (N) which thus is representative of any of the outputs for orders Q, P and 1 through 35, respectively, each of which feeds to a respective output terminal 8. Thus, it is seen that the output of the Adder may be gated to the Accumulator Register, and that the holding of the Accumulator Register may be shifted left or right, a shift occurring at a rate of one order per microsecond.

It should also be noted, as stated above, that the signal MQ (1) TO ACC (35) which feeds to terminal 3 of the Accumulator Register order 35 (FIG. 1d) on occasions, as described above, when the Accumulator Register and the MQ are being shifted jointly to the left as one register, the signal on the line ACC (N−1) OUTPUT connected to terminal 4 (FIG.7f) is actually coming from the MQ (1) output (FIG. 1d), while the signal to terminal 3 of the Accumulator Register 34 order is actually the signal MQ (1) TO ACC (35) (FIGS. 1g and 1d).

There has also been described above, how signals on lines (+) TO ACC (S) and (−) TO ACC (S) will cause a direct insertion of a positive or negative Sign, respectively, in the Accumulator Register sign order. Whenever a regular SHIFT ACC LEFT signal is given for a shift operation that does not include the MQ, as described below, then the line HOLD ACC, connected to terminal 7 of the Accumulator Register 35 order, is driven negative, as usual, and as the information is shifted left, since no binary 1 is shifted into the Accumulator Register order 35 from the MQ; then in effect, a binary 0 is stored in this Accumulator Register 35 order. In other words, if a signal called for a shift of 6 orders, and a binary 1 was present initially in all Accumulator Register orders, then as the information is shifted left binary 0's are effectively stored in the Accumulator Register 35 order and these binary 0's are shifted left, so that at the end of the 6 step shift operation, the last 6 orders of the Accumulator Register, namely, orders 30 through 35, all contain binary 0's.

The outputs of the Accumulator Register, via terminals 8, of the respective orders (FIG. 7f) are positive to represent storage of binary 1's and negative to represent storage of binary 0's. These signals are fed (except for orders P and Q) mainly to the Memory Bus Switches, as illustrated in FIGS. 1d and 1e.

*(4) Multiplier Quotient Register*

Referring now to FIG. 1g it is seen that each order of the MQ is, for the purpose of this application, identical in detail, a representative circuit for these orders being illustrated in FIG. 7g. The Sign order, for example, of the MQ may receive inputs from any one of three sources. One is a signal fed via line (−) TO MQ (S) of FIG. 1g to terminal 1 for the insertion of a binary 1, to store a negative Sign in the MQ Sign order. A second input is to the terminal 7, via the line MEM REG (S) and the signal on this line is gated by a control signal on the line MR TO MQ (see also FIG. 7g) for gating the holding of the Memory Register "S" order to the MQ "S" order. A third input line HOLD MQ (S) feeds to terminal 8 of the S order of the MQ (FIG. 1g) and is used during gating of information, from the Memory Register to the MQ and is also used to insert a positive Sign indication, by breaking the recirculation loop of the Delay Unit, as described above, to thereby store a binary 0, which is the indication of a positive sign. This HOLD MQ (S) line also goes negative when a positive signal occurs on the line CLEAR MQ, as described above, which negative hold signal is effective to erase the holdof the MQ register, that is, to set each order to zero.

The MQ 1 order via its input terminal 7 receives inputs from the Memory Register 1 order, via its input terminal 3 from the Accumulator Register 35 order, and via its input terminal 5 from the next lower MQ order 2. The MQ orders 2 through 34 have inputs to their respective terminals 7, from "corresponding" outputs of the Memory Register, inputs from the succeeding higher order of the MQ, to terminal 3, and inputs from the succeeding lower order, of the MQ, to terminal 5. The MQ 35 order receives inputs from the Memory Register 35 order via its terminal 7. MQ order 35 also receives an input from the next higher order of the MQ in this case, the MQ 34 order, via its terminal 3 and also receives a signal from the line (1) TO MQ (35) via its terminal 1, which last line signal is used for the insertion of a binary 1 in the MQ 35 order. Control signals applied to the MQ are as follows:

There is a signal via the line MR TO MQ for "dumping" the holding of the Memory Register into the MQ, in corresponding bit orders. There is a signal via the line SHIFT MQ RIGHT, for shifting the holding of the MQ, to the right, and it should be noted that a signal on this last line is also effective to shift the holding of the Accumulator Register 35 order to the MQ 1 order. A signal via the line SHIFT MQ LEFT shifts the holding of the MQ, to the left, and a signal via the line CLEAR MQ acts, via the circuits described above, to cause the lines HOLD MQ (1–35) to go negative, respectively, and thereby erase the holding of all orders of the MQ.

Referring to FIG. 7g, there is illustrated, in detail, a representative MQ order. The circuitry illustrated is somewhat similar to the circuitry of the Accumulator Register orders, in that a Delay Unit, which in FIG. 7g is Delay Unit 787a, is the storage element per se of the circuit. This Delay Unit 787a may receive an input via one of four AND circuits or via its terminal 1, feeding a line SET TO (1), which means that a binary 1 can thus be set directly into the particular order of the MQ. As long as the line HOLD MQ, connected to terminal 8, is positive the AND circuit 781a is conditioned, and positive outputs of the Delay Unit 787a are allowed to pass via this conditioned AND circuit 781a, and OR circuit 785a and a cathode follower 786a back to the Delay Unit, to thus provide the recirculation path for a stored binary 1 bit. If a binary 1 is stored, a positive signal appears at the output of the Delay Unit and is thus recirculated. However, if a binary 0 is stored, the output of the Delay Unit, is negative, so that it cannot pass via the AND circuit 781a, such binary 0's being reproduced in the Delay Unit, as described above. The line HOLD MQ is driven negative to thus break the recirculation path and effectively, erase the holding of the Delay Unit, whenever a signal is emitted via a line CLEAR MQ (FIG. 1g) which produces a negative signal on the line HOLD MQ (FIGS. 1g and 7g) to thus erase the holding of the MQ storage element.

When a positive signal appears on line MR TO MQ this signal (FIG. 1g) in addition to producing a negative signal on the line HOLD MQ, to break the recirculation path (FIG. 7g), also is fed via terminal 6 to the line MR TO MQ (FIG. 7g) to condition an AND circuit 782a so that a positive signal from the "corresponding" Memory Register order applied to terminal 7 and thus to line MR (N) is fed to the OR circuit 785a, and thence via the cathode follower 786a to the Delay Unit.

When a positive signal is applied via terminal 4 to the line SHIFT MQ LEFT, the holding of the succeeding lower order of the MQ, fed to terminal 5 and applied to line MQ (N–1), passes via an AND circuit 783a and via the OR circuit 785a and the cathode follower 786a to the Delay Unit 787a, whereby the holding of the next lower order of the MQ is shifted left to the instant order. This shift is effective, as in the case of the Accumulator Register to shift the bits one position, for each microsecond that the line SHIFT MQ LEFT is positive, the line HOLD MQ being simultaneously negative, to break the recirculation of the stored bit in the instant MQ order.

A positive input to terminal 2 is applied to line SHIFT MQ RIGHT to similarly shift bits to the right, in orders 2 through 35 of the MQ or, in the case of the MQ 1 order the input to terminal 3 is applied to line ACC (35), whereby the holding of the Accumulator Register order 35 is transferred to the Delay Unit 787a of MQ order 1 on a SHIFT MQ RIGHT.

With regard to the Sign order of the MQ, an input is made via input terminal 1 and line (−) TO MQ (S) of FIG. 1g instead of SET TO (1) of FIG. 7g, thus feeding a binary 0 which is an indication of a negative Sign into the MQ Sign order. At this time, the HOLD MQ voltage remains positive, and the positive signal is fed directly to the OR circuit 785a, so that a binary 1, representative of a negative Sign, is injected directly into the Delay Unit 787a. When it is necessary to store a positive Sign in the MQ Sign order, the line (+) TO MQ (S) (FIG. 1g), as described above, drives the line HOLD MQ (S) negative (FIG. 1g and labeled HOLD MQ in FIG. 7g) to erase the holding of the Delay Unit, and thereby effectively store a binary 0, which is representative of a positive Sign.

Likewise, a binary 1 may be stored in the MQ 35 order by a positive signal applied to the input terminal 1, to render line (1) TO MQ (35) positive (FIG. 1g and labeled SET TO (1) in FIG. 7g), which applies positive directly to the OR circuit 785a (FIG. 7g) to directly inject a binary 1 into the MQ 35 order, regardless of what was formerly stored in that order, the line HOLD MQ remaining positive.

Thus, it is seen that the holding of the MQ can be erased, the holding of the Memory Register may be "dumped" into the MQ, the holding of the MQ may be shifted left or right, jointly with the holding of the Accumulator Register, the MQ Sign order may be set to represent a positive or a negative Sign, and the MQ 35 order, may be set to represent a holding of a binary 1. The output of any Delay Unit is positive to represent a binary 1, or negative to represent a binary 0. Respective outputs of the various MQ orders feed via the respective output terminals 9 (FIGS. 1g and 1e) to the Memory Bus Switches (FIG. 1e) to be described presently.

(5) Memory Bus Switches

Referring to Memory Bus Switches, as represented in FIG. 1e, these are mere switching circuits, in that, they do not contain any storage elements. The inputs to these switches are from the Accumulator Register, as indicated in FIGS. 1d and 1e, from the MQ, as indicated by the lines and cable in FIGS. 1g and 1e, from the Mask Register, as indicated by the lines and cable in FIGS. 1h and 1e, from the Indicator Register as indicated by the lines and cable in FIGS. 1h and 1e, from the Base Register as indicated by the lines and cable in FIGS. 1h and 1e, from the Leftmost One Counter orders 12 through 17 as indicated by the lines and cable in FIGS. 1h and 1e, and also the Instruction Counter in orders 6 through 17 only.

If an instruction Store is given with a full word Address the Accumulator Register orders S, and 1 through 35 are fed via orders S, and 1 through 35 of the Memory Switches, to thereby place information on the Memory Buses S and 1 through 35. If an even half word is addressed, during a Store operation, the same action takes place, that is, the outputs of orders S and 1 through 35, of the Accumulator Register are gated, via the Memory Bus Switches, to the Memory Buses S and 1 through 35. However, those cathode ray tubes which store the information received from Buses S and 1 through 7 only are unblanked, as described in said above-identified application of Fox et al., at this even half word Address or, in other words, the information on the Memory Buses 18 through 35 is not delivered to cathode ray tube storage. However, if an odd half address is given, with a Store instruction, information from the Accumulator Register orders 18 through 35 only are gated by the Memory Bus Switches, to the Memory Buses 18 through 35, this switching being accomplished, as described presently, by the Memory Bus Switch orders 18 through 35. No information is gated to the Memory Buses S and 1 through 17 with an Odd half word Address. The same type of operation takes place on Store MQ operations, depending upon whether a full word is addressed or a half word at an even or odd Address.

A similar operation takes place for the instructions Store Mask and Store Ind except that full words are always addressed, thus orders S and 1 through 35 of the respective registers are gated to the Memory Buses S and 1 through 35 and cathode ray tubes which store the information received from Buses S and 1 through 35 are unblanked.

A similar operation takes place for the Store Base operation. However, for this operation, only half word locations can be addressed and only cathode ray tubes 6 through 17 or 24 through 35 of these half word locations, depending on whether their locations are even or odd, are unblanked. It is, therefore, necessary to have Memory Bus Switches on only positions 6 through 17 and 24 through 35 for gating the Base Register to the Memory Buses.

A similar operation takes place for the Store Loc operation. However, for this operation, only half word locations can be addressed and only cathode ray tubes 6 through 17 and 24 through 35 of these half word locations, depending on whether the Address of the location is even or odd, are unblanked. Furthermore, it is to be noted that only positions 12 through 17 of the Leftmost One Counter exist, and therefore, the Loc has inputs on only Memory Bus Switch orders 12 through 17 and 30 through 35 which sets up zeros on all other Switch Order outputs in the Store Loc operation. A Transfer and Store Counter operation requires that the Memory Bus Switches orders 6 through 17 have gate inputs from the Instruction Counter. This instruction always stores into a half word even Address.

Thus, the Switch orders S and 1 through 5 require four inputs only, (neglecting control inputs) namely, one each from corresponding orders of the Mask Register, Indicator Register, and Accumulator Register. Orders 6 through 11 have 6 inputs, namely, one each from corresponding orders of the Mask Register, Indicator Register, MQ Register, Accumulator Register, Base Register and Instruction Counter. Orders 12 through 17 have 7 inputs, namely, one each from corresponding orders of the Mask Register, Indicator Register, MQ Register, Accumulator Register, Base Register, Instruction Counter, and Leftmost One Counter.

Switch orders 18 through 23 require 6 inputs, on each from corresponding orders of the Mask Register, Indicator Register, Accumulator Register, MQ Register, one from Accumulator Register N–18, where N is the Memory Bus Switch number, and one from MQ order N–18. Orders 24 through 29 require 7 inputs, one each from corresponding orders of the Mask Register, Indicator Register, Base Register, Accumulator Register, MQ Register, Accumulator Register N–18, and MQ Register N–18. Orders 30 through 35 require 8 inputs, one each from corresponding orders of the Mask Register, Indicator Register, Base Register, Leftmost One Counter, Accumulator Register, MQ Register, Accumulator Register N–18, and MQ Register N–18.

The eight control signals which accomplish the switching are present as needed on the following lines: Line MASK (S to 35) to MEM BUS (S to 35) which feeds to terminal 2 of Memory Bus Switch Orders S and 1 through 35 is effective to gate the holding of Mask Register Orders S and 1 through 35 to Memory Buses S and 1 through 35 to Memory Buses. Line IND (S to 35) TO MEM BUS (S to 35) which feeds terminal 4 of Memory Bus Switch orders S and 1 through 35 is effective to gate the holding of the Indicator Register Orders S and 1 through 35 to the Memory Buses S and 1 through 35. Line BASE TO MEM BUS (6 to 17) which feeds terminal 6 of Memory Bus Switches orders 6 through 17 is effective to gate the holdings of the Base Register to Memory Buses 6 through 17. Line BASE TO MEM BUS (24 to 35) which feeds terminal 6 of Memory Bus Switches orders 24 through 35 is effective to gate the holdings of the Base Register to Mem Buses 24 through 35. Line LOC TO MEM BUS (6 to 17) which feeds to terminal 8 of Memory Switch orders 12 through 17 is effective to gate the outputs of the LOC TO MEM BUS 12 through 17 with Mem Bus orders 6 through 11 taking on the value of zero. Line LOC TO MEM BUS (24 to 35) which feeds to terminal 8 of Memory Bus Switch orders 30 through 35 is effective to gate the outputs of the LOC TO MEM BUS 30 through 35 with Mem Bus Orders 24 through 29 taking on the value of zero. Line INST CTR TO MEM BUS (6 to 17) which feeds terminal 10 of Mem Bus Switches 6 through 17 is effective to gate the holdings of the Instruction Counter to Mem Bus orders 6 through 17. Line MQ (S to 17) TO MEM BUS (18 to 35) which feeds to terminal 10 of Memory Bus Switch orders 18 to 35 is effective to gate the holding of the MQ orders S and 1 through 17 to the respective Memory Buses 18 through 35. Line MQ (S to 35) TO MEM BUS (S to 35) applied to terminal 12 of Each Memory Bus Switch order S, and 1 through 35 and is effective, where a full word Address is selected and information is being transferred, from the MQ orders S and 1 through 35 to the Memory Bus orders S and 1 through 35. Line ACC (S to 35) TO MEM BUS (S to 35) which feeds to terminal 14 of each Memory Bus Switch order S and 1 through 35 is effective, when a full word Address is selected. Line ACC (S to 17) TO MEM BUS (18 to 35) which feeds to terminal 16, respectively, of each Memory Switch Bus order 18 to 35 shown in FIG. 1e. This control signal, as described below, controls the transposition of bits from orders S and 1 to 17 inclusive of the Accumulator Register to the respective Memory Buses 18 to 35 inclusive, when a half word odd Address is selected.

Referring to FIG. 7h, which illustrates a representative one of the Memory Bus Switches for orders 18 through 35, the eight inputs, previously mentioned, are present. The output of the "corresponding" Accumulator Register order represented by input terminal 13 and line ACC (N) OUTPUT comprises one input to the AND circuit 705b, whose other input is via terminal 14 and line ACC (S to 35) TO MEM BUS (S to 35) which passes bits from all orders of the Accumulator Register to all orders of the Memory Buses. As stated above, and as described in said above-mentioned application of Fox et al., with a half word at an even Address, the cathode ray tube orders 18 through 35 are not unblanked. Thus, during a full or an even half word Address, a positive signal on the line ACC (S to 35) TO MEM BUS (S to 35) gates information from each order of the Accumulator Register to the corresponding Memory Bus order. The output of the AND circuit 705b passes via an OR circuit 709b and a power cathode follower 710b to the line MEM BUS (N)

representing a "corresponding" Memory Bus connected to the output terminal 17.

An AND circuit 706b is conditioned via terminal 16 and the line ACC (S to 17) TO MEM BUS (18 to 35) whereby the output of the Accumulator Register order N–18 (where N represents the particular Memory Bus Switch order) is fed through this conditioned AND circuit 706b when an odd half word is addressed, at which time, as described above, the line ACC (S to 17) TO MEM BUS (18 to 35) goes positive. The output of this AND circuit 706b passes via the OR circuit 709b and the power cathode follower 710b to the corresponding Memory Bus. Thus, when a half word at an odd Address is called for, the Accumulator Register order outputs S and 1 through 17 are gated to the respective Memory Buses 18 to 35. It is to be noted particularly that the bit stored in the S order of the Accumulator Register appears on Memory Bus 18.

The AND circuit 707b is conditioned via terminal 12 and line MQ (S to 35) TO MEM BUS (S to 35) whereby the output from the "corresponding" MQ order, as represented by the terminal 11 and line MQ (N) OUTPUT, passes via this conditioned AND circuit 707b and via the cathode follower 709b and the power cathode follower 710b, to the corresponding Memory Bus orders, whether a full or a half word is addressed, the operation being identical to that described in connection with the AND circuit 705b when the instruction is Store, with either a full or a half word Address. When an even half word is addressed, again, the cathode ray tubes for orders 18 to 35 are not unblanked.

The AND circuit 708b is conditioned via terminal 10 and line MQ (S to 17) TO MEMORY BUS (18 to 35) when an odd half word is addressed to thus permit bits, applied to terminal 9, and line MQ (N–18) output from these so designated orders of the MQ to pass via the conditioned AND circuit 708b, the OR circuit 709b and the power cathode follower 710b, to a MEM BUS (N) output and to terminal 17, whereby data in the respective MQ orders S, and 1 through 17, with an odd half word Address is passed, respectively, to Memory Bus orders 18 to 35, inclusive.

Similarly, the remaining AND circuits when conditioned by their particular register or counter inputs will pass the particular switch signal to cause the corresponding Memory Bus Order outputs to assume the value of the gated input and supply this signal to Memory to be stored in those unblanked positions as described by Fox et al. in the above-identified application.

Referring to FIG. 7i, there is illustrated a representative Memory Bus Switch for orders S and 1 through 17. The AND circuit 701b, via input terminal 13, and line ACC (N) OUTPUT, receives a signal from a "corresponding" order of the Accumulator Register which, when the terminal 14 and line ACC (S to 35) TO MEM BUS (S to 35) is positive, is passed through the AND circuit and via an OR circuit 703b and a power cathode follower 704b to Memory Bus (N) and to terminal 15, this terminal being, of course, connected to a "corresponding" Memory Bus order.

The AND circuit 702b is conditioned via the terminal 12 and line MQ (S to 35) TO MEM BUS (S to 35) whereby an input to terminal 11 and line MQ (N) OUTPUT is passed to the OR circuit 703b and the power cathode follower 704b to line MEM BUS (N) and to terminal 15, which as stated above, is connected to a "corresponding" Memory Bus order.

Similarly, the remaining AND circuits when conditioned by their particular register or counter inputs will pass the particular switch signal to cause the corresponding Memory Bus order outputs to assume the value of the gated input and supply this signal to memory to be stored in those unblanked positions as described by Fox et al. in the above-identified application.

INTERRUPT UNIT

The Interrupt Unit includes the following devices which will later be separately described:

(1) Indicator Register.
(2) Mask Register.
(3) Interrupt Indicator.
(4) Leftmost One Counter.
(5) Base Register.
(6) Interrupt Adder.

The relative locations of each of these devices is illustrated by the composite diagram formed of FIGS. 1h and 1i.

Briefly, the Indicator Register contains 36 orders, namely, S and 1 through 35; the individual orders S, 1 to 4 and 35 being illustrated in block form in FIG. 1h with the dash-dot lines representing the omitted orders 5 through 34. The details of orders S, 1 and 35 are illustrated in FIG. 8a.

The Mask Register contains 36 orders, namely, S and 1 through 35; the individual orders S, 1 to 4 and 35 being illustrated in block form in FIG. 1h with the dash-dot lines representing the omitted orders 5 through 34. The details of orders S, 1 and 35 are illustrated in FIG. 8b.

The Interruption Indicator consists of 36 orders of logical circuitry, namely, S and 1 through 35; the individual orders S, 1 to 4 and 35 being illustrated in block form in FIG. 1h with the dash-dot lines representing the omitted orders 5 through 34. The details of orders S, 1, 2 and 35 are illustrated in FIG. 8c.

The Leftmost One Counter consists of a matrix shown in block form in FIG. 1i comprised of logical circuitry which codes the outputs of the Interruption Indicator into a 6-bit code, the details of which are illustrated in FIG. 8d.

The Base Register contains 12 orders, namely, 6 through 17; the individual orders 6—7, 11—12 and 16—17 being illustrated in block form in FIG. 1i with dash-dot lines representing the omitted orders 8–10 and 13–15. The details of orders 6, 7 and 17 are illustrated in FIG. 8e.

The Interrupt Adder contains 12 orders, namely, 6 through 17; the individual orders 6—7, 11—12 and 16—17 being illustrated in block form in FIG. 1i with dash-dot lines representing the omitted orders 8–10 and 13–15. The details of orders 6, 7, 12 and 17 are illustrated in FIG. 8f.

Indicator Register

Referring to FIG. 8a, the Indicator Register is shown consisting of 36 orders, namely, S and 1 through 35. The details of orders S, 1 and 35 are illustrated with the dash-dot lines representing the omitted orders 2 through 34.

It will be remembered that a Load Ind Instruction causes a new Indicator full word to be read out of Memory and transfer via the Memory Register to the Indicator Register. Consequently, at the "4" index point of Execute time of a Load Ind Instruction, a positive signal is generated in the control circuit, as described above, and applied to the RESET IND line. The positive signal on the RESET IND line is applied to terminal 5 of all of the stages of the Indicator Register to cause the associated triggers to be turned off. For example, in stage 1, the positive signal on the RESET IND line is applied via the OR circuit 908a to turn off the trigger 912a which, in being turned off, applies a negative signal from its right hand output via the cathode follower 913a and the IND REG 1 line to the output terminal 8 indicating a binary 0. At the "9" index point of Execute time of the Load Ind instruction, the new Indicator full word is read out of Memory and transferred to the Memory Register, as described above. At the "11" index point of Execute time of the Load Ind Instruction, a positive signal is generated in the control circuits, as described above, and applied to the MR TO IND line. The positive signal on the MR TO IND line is applied to terminal 4 of all of the stages of the Indicator Register to cause the holding of the Memory Register to be transferred to the Indicator Register. For example, referring to stage 1 of the Indicator Register, if the corresponding stage of the Memory Register contained a 1, a positive signal is applied to the MEM REG 1 line and via terminal 3 to condition the AND circuit 902a which, while conditioned, passes the positive signal on MR TO IND line and via the OR circuit 903a and the cathode follower 904a to turn on the trigger 912a which, in being turned on, applies a positive signal from its right hand output via the cathode follower 913a and the IND REG 1 line to the output terminal 8 indicating that a binary 1 is stored in that stage. However, if the corresponding stage of the Memory Register contained a 0, then, the AND circuit 902a would be deconditioned to block the positive signal on the MR TO IND line from passing therethrough to turn on the trigger 912a, with the consequent result being that a negative signal is applied via the IND REG 1 line to the output terminal 8 indicating that a binary 0 is stored in that stage of the Indicator Register.

During any machine cycle an asynchronous external condition or a condition generated by the program itself may occur to cause a trigger of a particular stage of the Indicator Register to be turned on to represent a binary 1 indicative of the condition which occurred. For example, referring to stage 1 of the Indicator Register, when the overflow trigger is turned on, a positive signal is applied to the OV TRIG ON line. The positive signal on the OV TRIG ON line is applied to terminal 1 of stage 1 of the Indicator Register to condition the AND circuit 901a which, while conditioned, passes the next positive signal occurring on A3 (D1) line and via the OR circuit 903a and the cathode follower 904a to turn on the trigger 912a which, in being turned on, applies a positive signal from its right hand output via the cathode follower 913a and the IND REG 1 line to the output terminal 8 providing an indication of the condition which occurred.

As shown in FIG. 1h, the S stage of the Indicator Register detects a Div Check condition, the 1 stage of the Indicator Register detects an Ov Trig on condition, the 2 stage of the Indicator Register detects an Acc (S) condition and the remaining stages may detect other internal or external conditions. Thus, the trigger of the S stage of the Indicator Register is turned on following an attempted division whose results would be 1 or greater. Similarly, the trigger of the 1 stage is turned on whenever an Accumulator overflow occurs and the trigger of the 2 stage is turned on whenever an operation produces a negative result in the Accumulator. These 3 conditions are merely illustrative of some of the conditions which may cause a program interrupt. Some other internal or external type of conditions which may cause a program interrupt are as follows:

Arithmetic operations:
  Exponent Overflow
  Exponent Underflow
  Complete Figure Loss (floating point)
  Accumulator Overflow (fixed point)
  Divide Overflow
Control Operations:
  Address Overflow or Underflow during Automatic Indexing Operations
  Address Accumulator Overflow
Input-Output Operations:
  End of Record
  End of File
Error Conditions:
  Data Errors
  Machine State Errors
  Machine Errors
Interlock Conditions:
  Busy Signals The following Table A lists 33 illustrative interrupt conditions together with corresponding orders of the 36-bit Indicator Register. The particular conditions and their positions in the Indicator Register of FIG. 1b, are chosen for the purpose of illustration only and are not intended to limit the scope of the disclosed invention.

TABLE A

| Position | Interrupt condition | Position | Interrupt condition |
| --- | --- | --- | --- |
| S | Divide Check. | 20 | Channel D Redundancy Check. |
| 1 | Overflow Trigger On. | 21 | Channel D End of File. |
| 2 | Q Carry. | 22 | Channel E in Operation. |
| 3 | No Q Carry. | 23 | Channel E Redundancy Check. |
| 4 | Accumulator (+). | 24 | Channel E End of File. |
| 5 | Accumulator (−). | 25 | Channel F in Operation. |
| 6 | MQ Register (+). | 26 | Channel F Redundancy Check. |
| 7 | MQ Register (−). | 27 | Channel F End of File. |
| 8 | Accumulator Zero. | 28 | Channel G in Operation. |
| 9 | Accumulator Not Zero. | 29 | Channel G Redundancy Check. |
| 10 | Channel A in Operation. | 30 | Channel G End of File. |
| 11 | Channel A Redundancy Check. | 31 | Channel H in Operation. |
| 12 | Channel A End of File. | 32 | Channel H Redundancy Check. |
| 13 | Channel B in Operation. | 33 | Channel H End of File. |
| 14 | Channel B Redundancy Check. | 34 | Not used. |
| 15 | Channel B End of File. | 35 | Do. |
| 16 | Channel C in Operation. | | |
| 17 | Channel C Redundancy Check. | | |
| 18 | Channel C End of File. | | |
| 19 | Channel D In Operation. | | |

Complementary interrupt conditions, such as "Accumulator (+)" and "Accumulator (−)," are usually masked so that only one of the two conditions is effective. There is a possibility that any combination of the eight input/output channels (A through G) may signal a condition simultaneously. For instance, Channel A Redundancy Check, Channel A End of File, and Channel H End of File signals may occur at approximately the same time. As between the two Channel A signals, it is advisable to process the Redundancy Check before the End of File because the error, which occurred in the present file, should be investigated before going to the next file. As between the two signals from Channel A and the one signal from Channel H (the fastest input/output unit usually being attached to Channel A), it is most economical to service both Channel A signals first before going to the Channel H signal.

The priority order of the Divide Check (S) and Overflow Trigger On (1) positions is chosen for reasons of program execution economy. For example, a computer operation may require addition of a number to the Accumulator contents followed by a division of the sum by another number. It is possible that the sum will be so large that the Accumulator contents will both overflow and be larger than the divisor. Then, the Divide Check (S) and Overflow Trigger On (1) positions of the Indicator Register will be set. The process of adjusting the dividend, initiated by the Divide Check condition, will probably eliminate the overflow condition so that it is preferable to act on the Divide Check condition first. In the rare case when adjustment of the dividend to end the Divide Check condition does not eliminate the overflow condition, additional action may be taken. Otherwise, if the priority were reversed, two separate corrective operations would almost always occur since correction of the overflow conditions would undoubtedly be insufficient to correct the divide check condition.

After an interruption has occurred it becomes necessary to reset the trigger of the Indicator Register that was turned ON to indicate the condition so that if a similar condition occurs it may be subsequently detected or to permit subsequent interruptions. For example, referring to stage 1 of the Indicator Register, let it be assumed that trigger 912a is ON and that the trigger 918a of stage 1 of the Mask Register, in FIG. 8b, is ON permitting the condition to allow an interruption, as explained below.

Consequently, a corresponding stage of the Interruption Indicator, of FIG. 8c, produces a positive signal on the IRPT IND 1 line, as described below. The positive signal on the IRPT IND 1 line is applied to terminal 7 of stage 1 of the Indicator Register to condition the AND circuit 907a. Following this, at the "11" index point of the extra instruction time of an Interrupt Mode, a positive signal is generated in the Interruption Timer of FIG. 3f, as described above, and applied to the RESET ON IRPT line. A positive signal on the RESET ON IRPT line is applied to terminal 6 of all of the stages of the Indicator Register. The AND circuit 907 in all of the stages of the Indicator Register except stage 1 is deconditioned because a negative signal is maintained on the IRPT IND line to block passage of the positive signal at terminal 6. However, the positive signal at terminal 6 passes via the now conditioned AND circuit 907a, the OR circuit 908a and the cathode follower 909a to turn off the trigger 912a which, in being turned off applies a negative signal from its right hand output via the cathode follower 913a and the IND REG 1 line to the output terminal 8 to represent a binary 0.

*Mask Register*

Referring to FIG. 8b, the Mask Register is shown consisting of 36 orders, namely, S and 1 through 35. The details of orders S, 1 and 35 are illustrated with the dash-dot lines representing the omitted orders 2 through 34.

It will be remembered that a Load Mask Instruction causes a new Mask full word to be read out of Memory and transferred via the Memory Register to the Mask Register. Any instruction, in the main program or in a sub-routine, may specify a new Mask word. If the same set of conditions is to be permitted to interrupt the main program and all sub-routines, then only one separate and distinct Mask word is used in any given program. If one set of conditions is permitted to interrupt the main program and other sets of conditions are permitted to interrupt the sub-routines, then a few "standard" Mask words will suffice for a given program. In summary, any given program, made up of a main program and a number of sub-routines, may utilize any number of Mask words. Naturally, different programs may utilize the same Mask words, if the same sets of conditions are to be permitted to interrupt the different programs.

Consequently, at the "4" index point of Execute time of a Load Mask Instruction, a positive signal is generated, in the control circuits, as described above, and applied to the RESET MASK line. The positive signal on the RESET MASK line is applied to terminal 3 of all of the stages of the Mask Register to cause the associated triggers to be turned off. For example, in stage 1, the positive signal on the RESET MASK line is applied to turn off the trigger 918a which, in being turned off, applies a negative signal from its right hand output via the cathode follower 921a and the MASK REG 1 line to the output terminal 4, indicating a binary 0. At the "9" index point of Execute time of the Load Mask Instruction, the new Mask full word is read out of Memory and transferred to the Memory Register, as described above. At the "11" index point of Execute time of the Load Mask Instruction, a positive signal is generated in the control circuits, as described above, and applied to the MR TO MASK line. The positive signal on the MR TO MASK line is applied to terminal 2 of all of the stages of the Mask Register to cause the holding of the Memory Register to be transferred to the Mask Register. For example, referring to stage 1 of the Mask Register, if the corresponding stage of the Memory Register contained binary 1, a positive signal is applied to the MEM REG 1 line and via terminal 1 to condition the AND circuit 914a which, while conditioned, passes the positive signal on the MR TO MASK line and via the cathode follower 915a to turn on the trigger 918a which, in being turned on, applies a positive signal from its right hand output via the cathode follower 921a and the MASK REG 1 line to the output terminal 4 indicating that a binary one is stored in that stage. However, if the corresponding stage of the Memory Register contained a binary 0, then, the AND circuit 914a would be deconditioned to block the positive signal on the MR TO MASK line from passing therethrough to turn on the trigger 918a, with the consequent result being that a negative signal is applied via the MASK REG 1 line to the output terminal 4 indicating that a binary 0 is stored in that stage of the Mask Register.

*Interruption Indicator*

Referring to FIG. 8c, the Interruption Indicator is shown consisting of 36 orders, namely, S and 1 through 35. The details of orders S, 1, 2 and 35 are illustrated, with the dash-dot lines representing the omitted orders 3 through 34.

The Interruption Indicator consists of a series of logical circuits which compare the outputs of corresponding orders of the Indicator Register and the Mask Register and detect the coincidence of binary one representations in the two registers to produce an interruption indication. The position of the leftmost such coincidence (that of the lowest order register numerically) is indicated by a positive signal on the corresponding one of the 36 IRPT IND output lines. In the stable state, the remaining IRPT IND outputs have negative signal outputs. Two additional output lines, namely, the IRPT SIGN line and the NO IRPT SIG line, are controlled by the Interruption Indicator. The IRPT SIG line is maintained positive if any of the 36 previously mentioned output lines is positive while the NO IRPT SIG line is positive if none of the 36 previously mentioned output lines is positive.

As soon as a Mask word is loaded into the Mask Register, a series of binary 1 and binary 0 signal representations are applied to the MASK REG lines. For example, assume that a binary 0 representation is stored in the Mask Register position S, causing a negative signal to be applied to the MASK REG S line. The negative signal on the MASK REG S line is applied to terminal 2 of stage S of the Mask Register to decondition the AND circuit 957a, causing a negative signal to be applied via line 958a, the cathode follower 959a and the IRPT IND S line to the output terminal 4.

Now, if a Divide Check condition is detected by stage S of the Indicator Register, a positive signal is applied to the IND REG S line. The positive signal on the IND REG S line is applied via terminal 1 of stage S of the Interruption Indicator to the AND circuit 957a which, however, is deconditioned, as described above, to block this positive signal. Consequently, a negative signal is maintained, via the IRPT IND S line, at the output terminal 4. Note, however, if a binary 1 representation had been loaded into the corresponding order of the Mask Register, then, a positive signal would be applied via the MASK REG S line to condition the AND circuit 957a so that when the DIVIDE CHECK condition was detected, a positive signal on the IND REG S line would pass therethrough and via line 958a, the cathode follower 959a and the IRPT IND S line to the output terminal 4. Thus, it should be apparent, that this arrangement provides a flexible system which permits an interruption to occur only when desired, that is, if the Mask bit is a binary 0 representation, then no interruption will be permitted to occur even if a condition is detected by the Indicator Register whereas if the Mask bit is a binary 1 representation, then an interruption may be permitted to occur when a condition is detected by the Indicator Register or, in other words, when there is a coincidence of binary 1 representations in corresponding stages of the Indicator Register and the Mask Register.

Now, let it be assumed that no coincidence of binary 1 representations in corresponding stages S and 1 of the Indicator and Mask Registers has occurred. Consequently, the AND circuit 957a and 962a of stages S and 1, respectively, of the Interruption Indicator are deconditioned causing negative signals to be applied via lines 958a and 963a, respectively, the cathode followers 959a and 964a, respectively, and the IRPT IND S line and IRPT IND 1 line, respectively, to the output terminal 4 of the respective stages indicating the absence of an Interruption indication in both stages. The negative signal on line 958a is also applied to the inverter 960a where it is inverted to a positive signal and applied via the cathode follower 961a to the output terminal 5. The output terminal of stage S is connected to the input terminal 3 of stage 1 which, in turn, is connected to one input of the AND circuits 962a and 967a. Consequently, the positive signal applied to the output terminal 5 of stage S is applied via terminal 3 of stage 1 to one input of the AND circuit 962a and to condition the AND circuit 967a. Likewise, the negative signal on line 963a is applied to the inverter 965a where it is inverted to a positive signal and applied via the cathode follower 966a, the now conditioned AND circuit 967a and the cathode follower 968a to the output terminal 5 which, in turn, causes a positive signal to be applied to the input terminal 3 of stage 2. Thus, it should be apparent that when a positive signal appears at the input terminal 3 of a stage, it indicates that no Interruption indication occurred in any of the previous stages to the left of that stage. Hence, in the example above, the positive signal appearing at the input terminal 3 of stage 2 indicates that no Interruption indication occurred in the stages S and 1.

Now, let it be assumed that a binary 0 and 1 representation has been stored in stage S and stage 1, respectively, of the Mask Register. Consequently, a negative signal is maintained on the MASK REG 1 line. The negative signal on the MASK REG S line is applied via terminal 2 of stage S to decondition the AND circuit 957a causing a negative signal to be applied via line 958a to the inverter 960a where it is inverted to a positive signal and applied via the cathode follower 961a to the output terminal 5. The positive signal at the output terminal 5 of stage S is applied to terminal 3 of stage 1 which, as explained above, indicates that no Interruption indication appeared in stage S. The positive signal at the input terminal 3 is applied to one input of the AND circuit 962a and to condition the AND circuit 962a. The positive signal on the MASK REG 1 line is applied via terminal 2 of stage 1 to condition the AND circuit 962a. Now, if an OV TRIG ON condition is detected by stage 1 of the Indicator Register, a positive signal is applied to the IND REG 1 line which signal passes via terminal 1 of stage 1 of the Interruption indicator and the now conditioned AND circuit 962a, line 963a, the cathode follower 964a and the IRPT IND 1 line to the output terminal 4 providing an Interruption indication. The positive signal on line 963a is also applied to the inverter 965a where it is inverted to a negative signal and then passed via cathode follower 966a to decondition the AND circuit 967a. The AND circuit 967a in being deconditioned applies a negative signal via the cathode follower 968a to the output terminal 5. The negative signal at the output terminal 5 of stage 1 is applied via the input terminal 3 of stage 2 to decondition the AND circuits of stage 2 which, in turn, cause a negative signal to be applied to the output terminal 5 of stage 2 and, in a similar manner, a negative signal is propagated from stage to stage of the Interruption Indicator deconditioning the AND circuits in each stage. Consequently, even though there may be a coincidence of binary 1 representations in subsequent corresponding orders of the Indicator Register and Mask Register, which would normally produce an Interruption indication, no Interruption indication is produced except in the position of the Leftmost such coincidence. Also it should be apparent, that when a negative signal appears at the input terminal 3 of a stage it indicates that an Interruption indication occurred in one of the previous stages to the left of that stage. Hence, in the example above, a negative signal appearing at the input terminal 3 of stage 2 indicates that an Interruption indication occurred in either stages S or 1.

Referring now to stage 35 of the Interruption indicator, let it be assumed that there is no coincidence of binary 1 representations in the corresponding orders of the Indicator Register and the Mask Register and that a positive signal is applied to the input terminal 3 indicating that no Interruption indication occurred in any of the previous stages to the left of stage 35 as explained above. Consequently, since there is no coincidence of binary 1 representations in the corresponding order of the Indicator Register and the Mask Register, the AND circuit 969a is deconditioned causing a negative signal to be applied via line 977a, the cathode follower 970a and the IRPT IND 35 line to the output terminal 4 indicating no Interruption indication. The negative signal on line 977a is also applied to the inverter 971a where it is inverted to a positive signal and applied via the cathode follower 972a to one input of the AND circuit 973a. The positive signal at the input terminal 3 is applied to the remaining input of the AND circuit 973a. Positive signals at both inputs of the AND circuit 973a indicates that no Interruption indication occurred in any of the stages of the Interruption indicator and, consequently, a positive signal is applied via the cathode follower 974a and the NO IRPT SIG line to the output terminal 5 thereby providing an indication that no Interruption indication has occurred in any of the stages of the Interruption Indicator.

Let it be assumed, that instead of a positive signal, a negative signal appeared at the input terminal 3 of stage 35 of the Interruption Indicator, indicating that an Interruption indication occurred in one of the previous stages to the left of stage 35. Consequently, the negative signal at the input terminal 3 is applied to decondition the AND circuit 973a which causes a negative signal to be applied to the inverter 975a where it is inverted to a positive signal and applied via the cathode follower 976a and the IRPT SIG line to the output terminal 6 thereby producing an indication that an Interruption indication occurred in one of the stages of the Interruption Indicator.

Now, let it be assumed that a binary 1 representation has been stored in stages 1 and 35 of the Mask Register. Consequently, a positive signal is maintained on the MASK REG 1 and 35 lines. The positive signal on the MASK REG 1 and 35 lines is applied via terminal 2 of stages 1 and 35, respectively, to one input of the AND circuits 962a and 969a, respectively. Now, let it further be assumed that an OV TRIG ON condition and an EXT SIG condition are simultaneously detected by stages 1 and 35, respectively, of the Indicator Register causing a positive signal to be applied to the IND REG 1 and 35 lines, respectively, which pass via terminal 1 of stages 1 and 35, respectively, of the Interruption Indicator to a second input of the AND circuits 962a and 969a, respectively. Since no Interruption indication occurred in stage S of the Interruption Indicator a positive signal is applied to terminal 3 of stage 1, as described above, which passes via the AND circuit 962a since the other inputs are positively conditioned and the line 963a, the cathode follower 964a and the IRPT IND 1 line to the output terminal 4 producing an Interruption indication. The positive signal on line 963a is also applied to the inverter 965a where it is inverted to a negative signal and applied via the cathode follower 966a to decondition the AND circuit 967a which, when deconditioned, applies a negative signal via the cathode follower 968a to the output terminal 5. This negative signal on the output terminal 5 is propagated from stage to stage, as described above, of the Interruption Indicator deconditioning the AND circuits in each stage, and, consequently, the negative signal is applied to the input terminal 3 of stage 35 causing the AND circuit 969a to be deconditioned thereby blocking the coincidence of binary 1 representations in the corresponding order of the Indicator Register and Mask Register from passing via the AND circuit 969a, the line 977a, the cathode follower 970a and the IRPT IND 35 line to the output terminal 4 thereby preventing the production of an Interruption indication from stage 35. The negative signal on line 977a is applied to the inverter 971a where it is inverted to a positive signal and applied via the cathode follower 972a to condition the AND circuit 973a. However, since a negative signal appears at the input terminal 3, the AND circuit 973a is deconditioned causing a negative signal to be applied to the inverter 975a where it is inverted to a positive signal and applied via the cathode follower 976a and the IRPT SIG line to the output terminal 6 producing an output indicating that an Interruption indication occurred, namely, that in stage 1.

The signal on the IRPT SIG line is used by the Interruption Timer of FIG. 3f to cause a special Instruction to be executed, as described above. During the Instruction time of the special Instruction, the trigger of the Indicator Register, which was turned on to indicate the occurrence of the condition, is turned off so that the coincidence of binary 1 representations in the corresponding order of the Indicator Register and the Mask Register no longer exists thereby deconditioning the AND circuit 962a which, in turn, causes a negative signal to be applied to the inverter 965a where it is inverted to a positive signal and applied via the cathode follower 966a to one input of the AND circuit 967a. Since the input terminal 3 of stage 1 has a positive signal maintained thereon, due to the fact that no Interruption indication appeared in stage S, the AND circuit 967a is conditioned permitting the positive signal from the cathode follower 966a to pass therethrough and via the cathode follower 968a to the output terminal 5. The positive signal on the output terminal 5 is then propagated from stage to stage of the Interruption Indicator as described above, so that a positive signal is applied to the input terminal 3 of stage 35. A positive signal at the input terminal 3 of stage 35 is applied to the AND circuit 969a, which is conditioned by the coincidence of positive signals on the IND REG 35 and MASK REG 35 lines, thereby permitting the positive signal to pass there-through and via line 977a, the cathode follower 970a and the IRPT IND 35 line to the output terminal 4 thereby producing an Interruption indication from stage 35. Thus, it should be apparent, that with the combination of the Indicator Register, the Mask Register and the Interruption Indicator, priorities are established among interrupting conditions and provision is made for multiple interruptions, that is, the leftmost one of the Interrupting conditions is permitted to be effective first.

*Leftmost One Counter*

Refer now to FIG. 8d, which illustrates the Leftmost One Counter. The Leftmost One Counter (LOC) develops a 6-bit coded representation which identifies the leftmost order of the Indicator Register which holds an interrupting condition. Its output serves as one of the inputs to the Interrupt Adder and may also be sent, via the Memory Bus Switches, to Memory during the execution of a Store Loc Instruction, as described above.

A positive signal occurring on any one of the IRPT IND lines is passed through selected ones of the OR circuits 980a through 985a and the corresponding cathode followers 986a through 991a to cause positive signals on certain of the lines LOC (12) through LOC (17), the signals on these lines thereby providing an indication of which of the IRPT IND lines is positive. Due to the interlock provision in the Interruption Indicator described above, only one of the IRPT IND lines can be positive in the steady-state case.

For example, suppose that IRPT IND (11) line is positive. This positive signal will pass through OR circuits 980a, 981a and 983a and cathode followers 986a, 987a and 989a, to make lines LOC (14), LOC (16), and LOC (17) positive. All the inputs to OR circuits 982a, 984a and 985a, 983a are negative, hence these negative signals will pass via cathode followers 988a, 990a and 991a to make lines LOC (12), LOC (13), and LOC (15) negative. The six lines LOC (12) through LOC (17) thus, by their positive and negative states, indicate the binary number 001011, which is equivalent to the decimal number 11, indicating that IRPT IND (11) is the line which is positive.

It is deemed evident that the remaining output lines from the Interruption Indicator act in the same manner to cause proper signals on the lines LOC (12) through LOC (17). Since the line IRPT IND S is connected to the inputs of none of the OR circuits, none of the LOC lines are positive when the IRPT IND S line is positive, thus indicating the binary number 000000. If none of the IRPT IND lines is positive, the NO IRPT SIG line will be positive, which being connected to all of the OR circuits 980a through 985a, causes positive signals on all six of the lines LOC (12) through LOC (17), thus indicating the binary number 111111, which has the decimal equivalent 63.

*Base Register*

Referring to FIG. 8e, the Base Register is shown consisting of 12 orders, namely, 6 through 17. The details of orders 6, 7 and 17 are illustrated, with the dash-dot lines representing the omitted orders 8 through 16, inclusive.

It will be remembered that a Store Base Instruction permits the Address portion of a Base half word, which is located in Memory at the Address designated by the Store Base Instruction, to be changed to the Base Address which is presently stored in the Base Register. Also, it will be remembered that the Load Base Instruction permits the Base Address, which is presently stored in the Base Register, to be changed to the Address portion of Base half word which is located at the Address designated by the Load Base Instruction. Consequently, at the "4" index point of Execute time of a Load Base Instruction, a positive signal is generated in the control circuits, as described above, and applied to the RESET BASE line. The positive signal on the RESET BASE line is applied to terminal 3 of all of the stages of the Base Register to cause the associated triggers to be turned off thereby clearing the Base Register of the Base Address presently stored therein. For example, in stage 7, the positive signal on the RESET BASE line is applied to turn off the trigger 928a which, in being turned off, applies a negative signal from its right hand output via the cathode follower 929a and the BASE REG 7 line to the output terminal 4 thereby providing a binary 0 representation. At the "9" index point of Execute time of the Load Base Instruction, the new Base half word is read out of Memory and transferred to the Memory Register, as described above. At the "11" index point of Execute time of the Load Base Instruction, a positive signal is generated, in the control circuits, as described above, and applied to the MR TO BASE line. The positive signal on the MR TO BASE line is applied to terminal 2 of all of the stages of the Base Register to cause the Address portion holding of the Memory Register to be transferred to the Base Register. For example, referring to stage 7 of the Base Register, if the corresponding stage of the Memory Register contained a binary 1 representation, a positive signal is applied to the MEM REG 7 line and, via terminal 1, to condition the AND circuit 922a which, while conditioned, passes the positive signal on the MR TO BASE line and via the cathode folower 923a to turn on the trigger 928a which, in being turned on, applies a positive signal from its right hand output via the cathode follower 929a and the BASE REG 7 line to the output terminal 4 thereby providing a binary 1 representation. However, if the corresponding stage in the Memory Register contained a binary 0 representation, then, the AND circuit 922a would be deconditioned to block the positive signal on the MR TO BASE line from passing therethrough to turn on the trigger 928a, with the consequent result being that a negative signal is applied via the BASE REG 7 line to the output terminal 4 thereby providing a binary 0 representation.

The Base Address is the beginning Address of a table of condition sub-routines, while the output of the Leftmost One Counter develops a six bit coded Address representation which identifies an Interrupting condition. Thus, the output of the Base Register forms the augend, or base, which, when added, by the Interrupt Adder, described below, to the addend or Leftmost One Count, forms a sum which is used to control the Deflection Register, during the extra Instruction Cycle of an Interrupt mode, to designate the Address of the first instruction of the condition sub-routine.

*Interrupt Adder*

Referring to FIG. 8f, the Interrupt Adder is shown consisting of 12 orders, namely, 6 through 17. The details of orders 6, 7, 12 and 17 are illustrated, with the dash-dot lines representing the omtted orders 8 to 11 and 13 to 16, inclusive.

It can be seen that stages 6 through 12 of the Interrupt Adder receive inputs from stages 6 through 12, respectively, of the Base Register, via input terminal 1, and that stages 12 through 17 of the Interrupt Adder receive inputs from stages 12 through 17, respectively, of the Leftmost One Counter, via input terminals 2. Stages 6 through 16 of the Interrupt Adder receive carry inputs via input terminals 3 from the carry output terminals 4 of the next succeeding stages 7 through 17, respectively. For example, the carry output terminal 4 of stage 7 is connected to the carry input terminal 3 of stage 6. Each stage of the Interrupt Adder also has a sum output terminal 5 which is connected to a corresponding stage of the Deflection Register.

The function of the Interrupt Adder is to increase the contents of the Base Register by the quantity specified by the output of the Leftmost One Counter and thereby form the Address of an Instruction to be performed in the event of an Interrupt condition.

Referring now to stage 17 of the Interrupt Adder, the input from the corresponding order of the Base Register, representing either a binary 0 or a binary 1 value, is applied via the BASE REG 17 line to the input terminal 1. Likewise, input from the corresponding order of the Leftmost One Counter, representing either a binary 0 or a binary 1 value, is applied via the LOC 17 line to line to the input terminal 2. The operation of the cir circuitry in stage 17 is that of a half Adder having two inputs.

If there are binary 1 inputs, that is, positive signals on both the BASE REG 17 and LOC 17 lines, simultaneously, the result is a binary 0 sum with a binary 1 carry. If there is a binary 1 present on the BASE REG 17 line but a binary 0 on the LOC 17 line, the result is a binary 1 sum with a binary 0 carry. Likewise, if there is a binary 0 on the BASE REG 17 line but a binary 1 on the LOC 17 line, the result is a binary 1 sum with a binary 0 carry. The final condition, that is binary 0's on both the BASE REG 17 and LOC 17 lines, the result is a binary 0 sum with a binary 0 carry.

In the first condition where binary 1 inputs are applied to terminals 1 and 2 of stage 17, positive signals are applied via the BASE REG 17 and LOC 17 lines, coincidently, to the AND circuit 930a causing a positive signal to be applied via the cathode follower 932a to the carry output terminal 4 and to the inverter 933a. The positive signal at the carry output terminal 4, indicative of a binary 1 carry, is correct for the assumed condition. The inverter 933a inverts the positive signal to a negative signal and applies at via the cathode follower 934a to decondition the AND circuit 935a causing a negative signal to be applied via the cathode follower 936a and the SUM (17) line to the sum output terminal 5. The negative signal at the sum output terminal 5, indicative of a binary 0 sum, is correct for the assumed condition. In the second and third conditions, where a binary 1 and binary 0 are applied to the input terminals 1 and 2, respectively, or 2 and 1, respectively, of stage 17, no coincidence of positive signals appear on the BASE REG (17) and the LOC 17 lines causing the AND circuit 930a to be deconditioned thereby applying a negative signal via the cathode follower 932a to the carry output terminal 4 and to the inverter 933a. The negative signal at the carry output terminal 4, indicative of a binary 0 carry, is correct for the assumed conditions. The inverter 933a inverts the negative signal to a positive signal and applies it via the cathode follower 934a to condition the AND circuit 935a. The positive signal on the BASE REG (17) line or the LOC 17 line is applied via the OR circuit 931a and the now conditioned AND circuit 935a, the cathode follower 936a and the SUM (17) line to the sum output terminal 5. The positive signal at the sum output terminal 5, indicative of a binary 1 sum, is correct for the assumed condition.

In the fourth condition where binary 0 inputs are applied to the input terminals 1 and 2 of stage 17, negative signals are applied via the BASE REG (17) and the LOC 17 lines to decondition the AND circuit 930a which, when deconditioned, applies a negative signal via the cathode follower 932a to the carry output terminal 4. The negative signal at the carry output terminal 4, indicative of a binary 0 carry, is correct for the assumed conditioned. The negative signal on the BASE REG (17) and the LOC 17 lines are applied via the OR circuit 931a to decondition the AND circuit 935a which, when deconditioned, applies a negative signal via the cathode follower 936a and the SUM (17) line to the sum output terminal 5. The negative signal at the sum output terminal 5, indicative of a binary 0 sum, is correct for the assumed condition.

Refer now to stage 12 of the Interrupt Adder which is representative of stages 12 through 16. There are three possible inputs to this stage of the Interrupt Adder, namely, one, via the BASE REG (12) line, from the corresponding order of the Base Register, representing a binary 1 or binary 0 value stored in that order of the Base Register, a second, via the LOC 12 line, from the corresponding order of the Leftmost One Counter, representing a binary 1 or binary 0 value stored in the corresponding order of the Leftmost One Counter and, a third, via the input terminal 3, which is the carry from the next succeeding stage of the Interrupt Adder. The Base Register input, the Leftmost One Counter Input and the Carry Input at the input terminals 1, 2 and 3, respectively, and the Carry Output and Sum output at the output terminals 4 and 5 of this stage, representative of stages 12 through 16, may be tabulated as follows:

| Condition | Base Register | Leftmost One Counter | Carry Input | Carry Output | Sum Output |
|---|---|---|---|---|---|
| 1 | 0 | 0 | 0 | 0 | 0 |
| 2 | 1 | 0 | 0 | 0 | 1 |
| 3 | 0 | 1 | 0 | 0 | 1 |
| 4 | 0 | 0 | 1 | 0 | 1 |
| 5 | 1 | 1 | 0 | 1 | 0 |
| 6 | 1 | 0 | 1 | 1 | 0 |
| 7 | 0 | 1 | 1 | 1 | 0 |
| 8 | 1 | 1 | 1 | 1 | 1 |

In the first condition, binary 0 inputs are applied to terminals 1, 2 and 3 of stage 12. Consequently, the output of the OR circuit 937a since there is no binary 1 representation present at any of the input terminals 1, 2 or 3. Also, the output of the AND circuits 939a, 940a and 941a are negative since there is no coincidence of binary 1 representations present at the input terminals 1 and 2, 1 and 3 or 2 and 3, respectively. The negative signal outputs of the AND circuits 939a, 940a and 941a are applied via the OR circuit 942a as a single negative signal and via the amplifier 943a and the cathode follower 944a to the carry output terminal 4. The negative signal output of the OR circuit 937a is applied to decondition the AND circuit 948a causing a negative signal to be applied via the cathode follower 949a and the SUM (12) line to the sum output terminal 5. Thus, the negative signal at the carry output terminal 4, indicative of a binary 0 carry, and the negative signal at the sum output terminal 5, indicative of a binary 0 sum, is correct for the first condition.

In the second, third and fourth conditions, a binary 1 input is applied to one of the input terminals 1, 2 or 3 of stage 12. Consequently, the output of the OR circuit 937a is positive since there is a binary 1 representation present on at least one of the input terminals 1, 2 or 3. Also, the output of the AND circuits 939a, 940a and 941a are negative since there is no coincidence of binary 1 representations present at the input terminals 1 and 2, 1 and 3 or 2 and 3, respectively. The positive signal output of the OR circuit 937a is applied to condition the AND circuit 948a. However, the negative signal outputs of the AND circuits 939a, 940a and 941a are applied via the OR circuit 942a as a single negative signal and via the amplifier 943a and the cathode follower 944a to the inverter 945a where it is inverted to a positive signal and applied via the cathode follower 946a and the OR circuit 947a, the now conditioned AND circuit 948a, the cathode follower 949a and the SUM (12) line to the sum output terminal 5. The negative signal output of the cathode follower 944a is also applied to the carry output terminal 4. Thus, the negative signal at the carry output terminal 4, indicative of a binary 0 carry, and the positive signal at the sum output terminal 5, indicative of a binary 1 sum, is correct for the second, third and fourth conditions.

In the fifth, sixth and seventh conditions binary 1 representations are applied to two of the input terminals 1, 2 and 3 of stage 12. Consequently, the output of the OR circuit 937a is positive since there is a binary 1 representation present on at least one of the input terminals 1, 2 or 3. Also, the output of the AND circuit 938a is negative since there is no coincidence of binary 1 representations present at all three of the input terminals 1, 2 and 3. Furthermore, the output of the AND circuit 939a is positive if the binary 1 representations are present at the input terminals 1 and 2. Or, the output of the AND circuit 940a is positive if the binary 1 representations are present at the input terminals 1 and 3. Or, the output of the AND circuit 941a is positive if the binary 1 representations are present at the input terminals 2 and 3. The positive signal output of the OR circuit 937a is applied to condition the AND circuit 948a. The negative signal output of the AND circuit 938a is applied to one input of the OR circuit 947a. Also the positive signal output of either the AND circuit 939a, the AND circuit 940a or the AND circuit 941a is applied via the OR circuit 942a as a single positive signal and via the amplifier 943a and the cathode follower 944a to the inverter 945a where it is inverted to a negative signal and applied via the cathode follower 946a to the remaining input of the OR circuit 947a. Since the inputs to the OR circuit 947a are negative, a negative signal is applied to decondition the AND circuit 948a causing the negative signal to be applied via the cathode follower 949a and the SUM (12) line to the sum output terminal 5. The positive signal output of the cathode follower 944a is also applied to the carry output terminal 4. Thus, the positive signal at the carry output terminal 4, indicative of a binary 1 carry, and the negative signal at the sum output terminal 5, indicative of a binary 0 sum, is correct for the fifth, sixth, and seventh conditions.

In the eighth condition, binary 1 representations are applied to all three of the input terminals 1, 2 and 3 of stage 12. Consequently, the output of the OR circuit 937a is positive since there is a binary 1 representation present on at least one of the input terminals 1, 2 or 3. Also, the output of the AND circuit 938a is positive since there is a coincidence of binary 1 representations present at all three of the input terminals 1, 2 and 3. The output of the AND circuits 939a, 940a and 941a are positive since there is a coincidence of binary 1 representations present at the input terminals 1 and 2, 1 and 3 and 2 and 3, respectively. The positive output of the OR circuit 937a is applied to condition the AND circuit 948a. The positive output of the AND circuit 938a is applied via the OR circuit 947a, the now conditioned AND circuit 948a, the cathode follower 949a and the SUM (12) line to the sum output terminal 5. The positive signal output of either one of the AND circuits 939a, 940a or 941a is applied via the OR circuit 942a as a single positive signal which is applied via the amplifier 943a and the cathode follower 944a to the carry output terminal 4. Thus, the positive signal at the carry output terminal 4, indicative of a binary 1 carry, and a positive signal at the sum output terminal 5, indicative of a binary 1 sum, is correct for the eighth condition.

Refer now to stage 7 of the Interrupt Adder which is representative of stages 6 through 11 except that in stage 6 there is no carry output as shown. There are two possible inputs to these stages of the Interrupt Adder, namely, one, via the BASE REG line, from the corresponding order of the Base Register, representing a binary 1 or binary 0 value stored in that order of the Base Register and a second, via the carry input terminal 3 which is connected to the carry output terminal of the next succeeding stage of the Interrupt Adder. The operation of the circuitry in stage 7, representative of stages 6 through 11, is that of a half Adder having two inputs.

If there are binary 1 inputs, that is, positive signals at the input terminals 1 and 3, the result is a binary 0 sum with a binary 1 carry. If there is a binary 1 present at the input terminal 3, or if there is a binary 0 present at the input terminal 1 but a binary 1 present at the input terminal 3, the result is a binary 1 sum with a binary 0 carry. If there is a binary 0 present at both the input terminals 1 and 3, the result is a binary 0 sum with a binary 0 carry.

In the first condition where binary 1 inputs are applied to the input terminals 1 and 3 of stage 7, positive signals are applied coincidently to the AND circuit 950a causing a positive signal output which is applied via the cathode follower 932a to the carry output terminal 4 and to the inverter 952a. The inverter 952a inverts the positive signal to a negative signal and applies it via the cathode follower 953a to condition the AND circuit 955a causing the negative signal to be applied via the cathode follower 956a and the SUM (7) line to the sum output terminal 5. Thus, the positive signal at the carry output terminal 4, indicative of a binary 1 carry and the negative signal at the sum output terminal 5, indicative of a binary 0 sum, is correct for the first condition.

In the second and third conditions, where a binary 1 and binary 0 representation is applied to the input terminals 1 and 3, respectively, or to the input terminals 2 and 1, respectively, since there is no coincidence positive signals at the input of the AND circuit 950a, a negative signal output is produced therefrom which is applied via the cathode follower 951a to the carry output terminal 4 and to the inverter 952a. The inverter 952a inverts the negative signal to a positive signal and applied it via the cathode follower 953a to condition the AND circuit 955a. The positive signal at the input terminal 1 or the input terminal 3 is applied via the OR circuit 954a and the now conditioned AND circuit 955a, the cathode follower 956a and the SUM (7) line to the sum output terminal 5. Thus, the negative signal at the carry output terminal 4, indicative of a binary 0 carry, and the positive signal at the sum output terminal 5, indicative of a binary 1 sum, is correct for the third condition.

In the fourth condition, where binary 0 inputs are applied to the input terminals 1 and 2 of stage 7, negative signals are applied to decondition the AND circuit 950a which, when deconditioned, applies a negative signal via the cathode follower 951a to the carry output terminal 4. The negative signals at the input terminal 1 and 3 are also applied via the OR circuit 954a as a single negative signal to decondition the AND circuit 955a which, when deconditioned, applies a negative signal via the cathode follower 956a and the SUM (7) line to the sum output terminal 5. Thus, the negative signal at the carry output terminal 4, indicative of a binary 0 carry, and the negative signal at the sum output terminal 5, indicative of a binary 0 sum, is correct for the fourth condition.

INTERRUPT MODE A

When the Calculator is performing a program and a condition occurs, as indicated by the production of a binary 1 signal representation from a particular stage of the Indicator Register, and it is desired to permit this condition to interrupt the program, as indicated by a binary 1 signal representation from the corresponding stage of the Mask Register, due to the occurrence of the condition, then, an Interrupt indication is produced by the Interruption Indicator, due to the occurrence of the leftmost coincidence of the binary 1 signal representations in the corresponding stages of the Indicator Register and the Mask Register, identifying the condition which occurred. The Interruption indication is coded, by the Leftmost One Counter, into a number, corresponding to the stage of the Indicator Register which detected the condition. The Base Register is loaded with a Base number, identifying the beginning Address of a Table of Instructions related to the interrupted program, to which is added, by the Interrupt Adder, the number produced by the Leftmost One Counter to form an Address number designating one of the instructions in the table as the next instruction to be executed by the Calculator instead of the next sequential instruction of the program.

In the Interrupt Mode A, as described in the example below, a single instruction is performed, after which, control is returned to the main program.

In the Interrupt Mode B, as described below, the instruction designated by the Interrupt Adder is a Transfer and Store Counter instruction, the execution of which causes the Address for the next sequential instruction of the main program to be stored in Memory and a transfer to be made to a sub-routine consisting of a series of instructions, at the end of which control is returned to the main program.

As an example of an Interrupt Mode A, let it be assumed that the following computation is to be performed, namely, $A+B+C$ and, since the machine deals with fractions, let it further be assumed that it is known that the result of the addition of $A+B$ should be very close to but not equal to the value of 1.0. Therefore, if the overflow trigger is turned on as a result of computing $A+B$, the program is interrupted and a RESET ADD instruction is performed, wherein, the Accumulator Register is cleared of the sum value $(A+B)$ and a new value consisting of binary 1's stored therein equivalent to .11111 . . . 11 which is a value close to but not equal to the value 1.0, after which, control is returned to the main program to complete the computation.

Thus, referring to FIG. 6k, which is the Timing Diagram for the Add operation, it will be noted that an overflow condition, if it occurs, occurs starting at the "1" index point of Execute/Regenerate time of the Add operation.

The Interrupt Mode A operation will now be described and reference should be made to the Timing Diagram of FIG. 9a. Referring now to FIG. 8a, the overflow trigger in being turned on applies a positive signal via the OV TGR ON line to the input terminal 1 of stage 1 of the Indicator Register where it is passed to condition the AND circuit 901a.

At the "3" index point of the Execute/Regenerate time of the Add operation, a positive signal on the A3 (D1) line is applied to the input terminal 2 of stage 1 where it passes via the now conditioned AND circuit 901a, the OR circuit 903a and the cathode follower 904a to turn on the trigger 912a which, in being turned on, applies a positive signal from its right hand output via the cathode follower 913a and the IND REG 1 line to the output terminal 8 signalling that the overflow trigger on condition has been detected.

Referring to the Interruption Indicator of FIG. 8c, let it be assumed that the corresponding stage of the Mask Register has a binary 1 representation stored therein causing a positive signal to be applied via the MASK REG 1 line to the input terminal 2 of stage 1 of the Interruption Indicator where it passes to one input of the AND circuit 962a. Also, since no Interruption indication has occurred to the left of stage 1, a positive signal is maintained at the input terminal 3 of stage 1 where it passes via a second input to condition the AND circuit 962a. Now, the positive signal on the IND REG 1 line is applied to the input terminal 1 of stage 1 of the Interruption Indicator where it passes via the now conditioned AND circuit 962a, line 963a, the cathode follower 964a and the IRPT IND 1 line to the output terminal 4 signalling an Interruption indication. The positive signal on line 963a is also applied to the inverter 965a where it is inverted to a negative signal and applied via the cathode follower 966a to decondition the AND circuit 967a which, when deconditioned, applies a negative signal via the cathode follower 968a to the output terminal 5 which is connected to the input terminal 3 of stage 2 and, as described above, a negative signal at the input terminal 3 of a stage indicates that an Interruption indication is present in one of the preceding stages. This negative signal is propagated from stage to stage, as described above, deconditioning the AND circuits in each stage to produce negative signals and in the last stage, namely stage 35, the negative signal output of the AND 973a is applied to the inverter 975a where it is inverted to a positive signal and applied via the cathode follower 976a and the IRPT SIG line to the output terminal 6.

Now, let it be assumed that the machine steps to Instruction time for the next sequential instruction of the program. Since an instruction comprises only a half word, then, referring to the Deflection Register of FIG. 4f to 4h, at the "0" index point of Instruction time, the sign trigger of the Deflection Register is conditioned to be turned off so that the sign bit representation will indicate that only a half word in Memory is to be addressed while the remaining triggers of the Deflection Register are conditioned to receive the Address setting of the Instruction Counter, which is the Address in Memory in which the add half word instruction is stored. These operations are effected, at the "2" index point of Instruction time, by an A2 (D1) signal, as described above.

Referring to the Instruction Register in FIGS. 4a to 4c, at the "4" index point of Instruction time, an I4 (D3) signal is effective to reset the Instruction Register, as described above, in preparation for receiving the Add half word instruction.

Referring to the Interruption Timer of FIG. 3f, since the Allow No Interrupt trigger 312e is in the off state, a positive signal is applied from its left hand output via the cathode follower 314e to the ALLOW IRPT line where it is applied to one input of the AND circuit 301e. Also, since the overflow trigger on condition was detected by the Interrupt Unit, a positive signal is maintained on the IRPT SIG line to condition the AND circuit 301e which, while conditioned, at the "6" index point of Instruction time, passes the positive signal on the I6 (D1) line via the cathode follower 302e to turn on the EXT CYCLE trigger 303e and the IRPT CYCLE trigger 307e. The EXT CYCLE trigger 303e in being turned on, applies a positive signal from its right hand output via the cathode follower 304e to the EXT CYCLE line and applies a negative signal from its left hand output via the cathode follower 305e to the NO EXT CYCLE line. The IRPT CYCLE trigger 307e in being turned on applies a positive signal from its right hand output via the cathode follower 309e to the IRPT CYCLE line and applies a negative signal from its left hand output via the cathode follower 308e to the NO IRPT CYCLE line.

Referring now to the Leftmost One Counter of FIG. 8d, the positive signal on the IRPT IND 1 line is applied via the OR circuit 980a and the cathode follower 986a to the LOC (17) line. The LOC (16), LOC (15), LOC (14), LOC (13) and LOC (12) output lines are all negative since negative signals are maintained on the remaining IRPT IND lines and a negative signal is maintained on the NO IRPT SIGNAL line. Consequently, the output of the Leftmost One Counter is the binary number 000001 which designates that condition 1, namely, OV TRIG ON was detected by the Indicator Register. This binary number is added, by the Interrupt Adder of FIG. 8f, to the Base number, which was previously loaded (by a Load Base Instruction) into the Base Register of FIG. 8e to produce a sum number output designating an Address in Memory at which the Reset Add Instruction is stored.

Referring now to the Deflection Register of FIGS. 4f to 4h, the output of the Interrupt Adder is applied to condition the AND circuits, such as AND circuit 418e in stage 6 of the Deflection Register, in accordance with the Address designated by the Interrupt Adder. Now, the positive signal on the INST TIME line is applied via the OR circuit 433c and the cathode follower 434c to condition the AND circuit 438c in preparation for turning off the sign trigger 460c so that the sign representation will designate that only a half word in Memory is to be addressed. Also, the positive signal on the INST TIME and EXT CYC lines are applied to the AND circuit 416e causing a positive signal to be passed therethrough to the AND circuits in each stage, such as the AND circuit 418e of stage 6, permitting binary 1 signal representation from the Interrupt Adder to pass via such AND circuits and via the OR circuits, such as OR circuit 443c of stage 6, and the cathode followers, such as cathode follower 444c of stage 6, to condition the AND circuits, such as AND circuit 447c of stage 6, in preparation for storing the Address, designated by the Interrupt Adder, in the Deflection Register.

Referring to the Interruption Timer of FIG. 3f, the positive signal on the EXT CYCLE line is applied in combination with the positive signal on the IRPT SIG line to condition the AND circuit 311e which, when conditioned, at the "7" index point of Instruction time passes a positive signal on the I7 (D1) line to turn on the ALLOW NO IRPT trigger 312e. The ALLOW NO IRPT trigger 312e in being turned on applies a positive signal from its right hand output via the cathode follower 313e to the ALLOW NO IRPT line and applies a negative signal from its left hand output via the cathode follower 314e and the ALLOW IRPT line to decondition the AND circuit 301e. Hence, so long as the ALLOW NO IRPT trigger 312 remains on the AND circuit 301e is blocked to allow no further Interruption signal from passing therethrough.

Referring to FIGS. 5c and 5z, at the "9" index point of Instruction time, the sign bit representation and the 17th bit representation in the Deflection Register in combination with an I9 (D1) gates the half word Add Instruction, as described above, from Memory via the Memory Buses S to 17, if the half word instruction is from an even Address, or, via the Memory Buses 18 to 35, if the half word instruction is from an odd Address, to the Memory Register unit S to 17.

Referring again to the Instruction Register of FIGS. 4a to 4c, at the "10" index point of instruction, an I10 (D1) signal gates the Add half word instruction from the Memory Register to the Instruction Register. The Operation Decoder of FIG. 4i then decodes the operation part of the instruction and produces a positive signal on the Add line.

Referring to FIG. 5ar, the negative signal on the NO EXT CYC line deconditions the AND circuit 525e and, consequently, at the "11" index point of Instruction time, the positive signal on the I11 (D1) line is blocked from passing therethrough and a negative signal is maintained at the input of the amplifier 526e causing a negative signal to be applied via the cathode follower 527e to the GO TO EX line. Consequently, since a negative signal is maintained on the GO TO EX line at the end of Instruction time, the Cycle Timer of FIGS. 3c and 3d does not step to Execute time but rather remains in Instruction time. Consequently, the machine proceeds to an extra Instruction time.

Referring to FIGS. 4f to 4h, at the "2" index point of Extra Instruction time, an A2 (D1) signal is effective, via the cathode follower 426c, line 427c and the now conditioned AND circuit 438c, to turn off the sign trigger 460c of the Deflection Register so that the sign representation will indicate that only a half word in Memory is to be addressed. The positive A2 (D1) signal on line 427c is also applied to the AND circuits, such as AND circuit 447c, to cause the binary 1 signal representations from the Interrupt Adder to be applied therethrough to turn on corresponding ones of the triggers, such as the 6 bit trigger 461c, thereby causing the Address designated by the Interrupt Adder to be stored in the Deflection Register.

Referring now to the Interruption Timer of FIG. 3f, at the "3" index point of Extra Instruction time, a positive signal on the A3 (D1) line is applied to turn off the Extra Cycle trigger 303e which, in being turned off, applies a negative signal from its right hand output via the cathode follower 304e to the EXT CYCLE line and applies a positive signal from its left hand output via the cathode follower 305e to the NO EXT CYCLE line.

Referring to the Instruction Register in FIGS. 4a to 4c, at the "4" index point of Extra Instruction time, an I4 (D3) signal is effective to reset the Instruction Register, as described above, in preparation for receiving the R Add half word instruction, the Address of which was designated by the Interrupt Adder and is now stored in the Deflection Register. The Operation Decoder of FIG. 4i detects that the Instruction Register was reset and causes the positive signal on the ADD line to be terminated.

Referring to FIGS. 5c and 5z, at the "9" index point of Extra Instruction time, the sign bit representation and the 17th bit representation in the Deflection Register, in combination with an I9 (D1) signal, gates the half word instruction, as described above, from Memory via the Memory Buses S to 17, if the half word instruction is from an even Address, or, via the Memory Buses 18 to 35, if the half word instruction is from an odd Address, to the Memory Register units S to 17.

Referring to the Instruction Register in FIGS. 4a to 4c, at the "10" index point of Extra Instruction time, an I10 (D1) signal gates the R Add half word instruction from the Memory Register to the Instruction Register. The Operation Decoder of FIG. 4i then decodes the operation part of the Instruction and produces a positive signal on the R ADD line.

Referring to the Interruption Timer of FIG. 3f, at the "11" index point of Extra Instruction time, the positive signals on the IRPT CYCLE and the NO EXT CYCLE lines are applied to condition the AND circuit 321e which, while conditioned, passes a positive signal on the I11 (D1) line and via the amplifier 322e and the cathode follower 323e to the RESET ON IRPT line. Referring to the Indicator Register of FIGS. 8a, the positive signal on the IRPT IND 1 line is applied to input terminal 7 of stage 1 of the Indicator Register where it passes to condition the AND circuit 907a. Now, the positive signal on the RESET ON IRPT line is applied to the input terminal 6 connected to all of the stages of the Indicator Register where it passes via the now conditioned AND circuit 907a, the OR circuit 908a and the cathode follower 909a to turn off the trigger 912a which, in being turned off, applies a negative signal from its right hand output via the cathode follower 913a and the IND REG 1 line to the output terminal 8 thereby turning off the Indication of the condition that was previously detected.

Referring now to the Interruption Indicator of FIG. 8c, the negative signal on the IND REG 1 line is applied to the input terminal 1 of stage 1 of the Interruption Indicator where it passes to decondition the AND circuit 962a causing a negative signal to be applied via line 963a, the cathode follower 964a and the IRPT IND 1 line to the output terminal 4 thereby ending the Interruption Indication. The negative signal on the line 963a is also applied to the inverter 965a where it is inverted to a positive signal and applied via the cathode follower 966a to the AND circuit 967a which is conditioned by the positive signal at the input terminal 3, due to the fact that there is no Interruption indication from any stage to the left of stage 1, as described above, causing a positive signal to be applied via the cathode follower 968a to the output terminal 5 which is connected to the input terminal 3 of stage 2. Assuming that there is no other coincidence of binary 1 signal representations from corresponding orders of the Indicator Register and the Mask Register, a positive signal at the input terminal 3 of stage 2 is propagated from stage to stage of the Interruption Indicator until it reaches stage 35 where it passes via the AND circuit 973a, the cathode follower 974a and the NO IRPT SIG line to the output terminal 5 signalling that there is no Interruption indication from any of the stages of the Interruption indicator. The positive signal from the AND circuit 973a is also applied to the inverter 975a where it is inverted to a negative signal and applied via the cathode follower 976a and the IRPT SIG line to the output terminal 6.

Referring to FIG. 5ar, the positive signal on the R ADD line is applied via an OR circuit 523e and line 524e to one input of the AND circuit 525e and the positive signal on the NO EXT CYC line is applied to condition the AND circuit 525e which, while conditioned, passes the positive signal on the I11 (D1) line and via amplifier 526e and cathode follower 527e to the GO TO EX line. The positive signal on the GO TO EX line is applied to the Cycle Timer of FIGS. 3c and 3d, where it is mixed with various clock pulses as described above, so that at the next "0" index point, the Cycle Timer steps to Execute time. The events which occur during Execute and Execute/Regenerate time of a R ADD operation are described in detail above in the section entitled RESET ADD. However, a short summary of these events will now be given.

Thus, at the "2" index point of Execute time, the Deflection Register receives the sign and Address portion of the R Add half word instruction from the Instruction Register to thereby address the Memory position in which the value to be stored in the Accumulator is stored. At the "9" index point of Execute time the full word stored in Memory at the Address designated by the Deflection Register is read out of Memory and transferred via the Memory Bus to the Memory Register. At the "11" index point of Execute time, an E11 (D1) signal is effective, in combination with the R ADD signal, in the control circuits, to generate a GO TO EX/RGN signal which is applied to the Cycle Timer where it is mixed with various clock pulses so that, at the next "0" index point, the Cycle Timer steps to Execute/Regenerate time.

At the "1" index point of Execute/Regenerate time, an E/R1 signal is effective, in combination with the R ADD signal, in the control circuits, to generate a MR TO ADDER signal which causes the valve in the Memory Register should be transferred to the Adder. At the "2" index point of Execute/Regenerate time, an A2 (D1) signal is effective to cause the contents of the Regeneration Counter to be transferred to the Deflection Register so that the word at the Address designated by the Deflection Register will be regenerated. At the "4" index point of Execute/Regenerate time, an A4 (D1) signal is effective to step the Regeneration Counter by 1 so that the word at the next sequential Address will be regenerated at the proper time. It should be noted that during this operation the holding of the Accumulator Register is not gated to the Adder. This, in effect, is as though the Accumulator Register had been reset to zero since, at the "4" index point of Execute/Regenerate time, an E/R4 (D1) signal is effective, in combination with the R ADD signal, in the control circuits, to generate an ADDER TO ACC signal which causes the holding of the Adder, which is merely the word originally held in the Memory Register, to be transferred to the Accumulator Register, replacing the value formerly stored therein. At the "10" index point of Execute/Regenerate time, the Accumulator Register sign is set to correspond to the Memory Register sign, as described above.

At the same time, referring to FIG. 5af, the positive signal on the R ADD line is applied via an OR circuit 520d and line 521d to condition the AND circuit 522d which, while conditioned, passes a positive signal on the E/R10 (D2) line and via line 523d, the OR circuit 528d, the amplifier 529d and the cathode follower 530d to the END OP line.

Referring now to FIG. 5aj, the output of the OR circuit 564d is maintained negative since all of the inputs thereto are negative. This negative output of the OR circuit 564d is applied to the inverter 565d where it is inverted to a positive signal and applied via the cathode follower 566d and the line 567d to condition the AND circuit 568d which, while conditioned, passes a positive signal on the END OP line and via the amplifier 569d and the cathode follower 570d to the STEP INST CTR line.

Referring to the Instruction Counter in FIG. 4d, the positive signal on the STEP INST CTR line is applied to the AND circuit 462b. However, the AND circuit 462b is deconditioned by the negative signal on the NO IRPT CYC line to block the combination of positive signals on the STEP INST CTR, A11 (D1) and L103 lines from passing a positive signal to step the Instruction Counter. It should be noted that the Instruction Counter still holds the Address for the next sequential Instruction of the main program and in view of the fact that it is not stepped at the end of the Interruption Instruction, the next instruction addressed will be the next sequential instruction of the main program.

Referring to the Interruption Timer in FIG. 3f, the positive signal on the IRPT CYCLE line is applied to one input of the AND circuit 320e. Since a Transfer and Store Counter operation is not being performed, a negative signal is maintained on the TR STO C line which is applied to the inverter 318e where it is inverted to a positive signal and applied via the cathode follower 319e to a second input of the AND circuit 320e thereby conditioning the AND circuit 320e which, while conditioned, passes the positive signal on the END OP line and via the OR circuit 316e and the cathode follower 317e to turn off the Allow No Interrupt trigger 312e. The Allow No Interrupt trigger 312e in being turned off applies a negative signal from its right hand output via the cathode follower 313e to the ALLOW NO IRPT line and applies a positive signal from its left output via the cathode follower 314e to the ALLOW IRPT line. The positive signal on the ALLOW IRPT line is applied to condition the AND circuit 301e to permit a subsequent occurring Interruption signal to initiate operation of the Interruption Timer during Instruction time of the instruction following the interruption.

The positive signal on the END OP line is also applied to condition the Cycle Timer of FIGS. 3c and 3d so that, at the next "0" index point, the Cycle Timer proceeds to either Instruction time, for the next sequential instruction of the main program located at the Address designated by the Instruction Counter, or, to Regenerate time as described above.

Let it be assumed that the Cycle Timer proceeds to Instruction time. Consequently, referring to the Interruption Timer of FIG. 3f, at the "1" index point of Instruction time, the positive signal on the NO EXT CYCLE line is applied to condition the AND circuit 306e which, while conditioned, passes a positive signal on the I1 (D1) line to turn off the Interrupt Cycle trigger 307e which, when turned off, applies a negative signal from its right hand output via the cathode follower 309e to the IRPT CYCLE line and applies a positive signal from its left hand output via the cathode follower 308e to the NO IRPT CYCLE line.

Referring now to the Deflection Register of FIGS. 4f to 4h, at the "2" index point of Instruction time, an A2 (D1) signal is effective to cause the sign trigger of the Deflection Register to be turned off, so that the sign bit representation will indicate that only a half word in Memory is to be addressed while the remaining triggers of the Deflection Register receive the Address setting of the Instruction Counter, which is the Address in Memory in which the next sequential instruction of the main program is stored, which, for the example given above, is the Address for the Add half word instruction.

Referring to the Instruction Register in FIGS. 4a to 4c, at the "4" index point of Instruction time, an I4 (D3) signal is effective to reset the Instruction Register, as described above, in preparation for receiving the Add half word instruction. The Operation Decoder of FIG. 4i detects that the Instruction Register was reset and causes the positive signal on the R ADD line to be terminated.

Referring to FIGS. 5c and 5z, at the "9" index point of Instruction time, the sign bit representation and the 17th bit representation in the Deflection Register, in combination with a I9 (D1) signal, gates the half word instruction, as described above, from Memory via the proper Memory Buses to the Memory Register units S to 17.

Referring to the Instruction Register in FIGS. 4a to 4c, at the "10" index point of Instruction time, an I10 (D1) signal gates the Add half word instruction from the Memory Register to the Instruction Register. The Operation Decoder of FIG. 4i then decodes the operation part of the instruction and produces a positive signal on the ADD line.

Referring to FIG. 5ar, at the "11" index point of Instruction time, an I11 (D1) signal is effective, in combination with the ADD signal and the NO EXT CYC signal, in the control circuits, to generate a GO TO EX signal, which is applied to the Cycle Timer where it is mixed with various clock pulses so that, at the next "0" index point, the Cycle Timer steps to Execute time.

At this point, the next sequential instruction of the main program is executed and the main program continues unless interrupted by another condition which occurs during the program. Thus, in summary, in an Interrupt Mode A operation, a main program of operation being performed by the Calculator is interrupted, due to the occurrence of a condition for which it is desired to interrupt the program, and suitable action is taken, in accordance with an instruction located at an Address related to the interruption causing condition, after which control is returned to the main program.

INTERRUPT MODE B

When the Calculator is performing a main program of operation and a condition occurs for which it is desired to interrupt the main program, then, an Interruption indication is produced identifying the condition which occurred. The Interruption indication is coded into a number which is added to a Base number to produce an Address number designating a Transfer and Store Counter instruction in the Table of Interruption Instruction related to the interrupted main program, which instruction is executed by the Calculator instead of the next sequential instruction of the main program. During the execution of this Transfer and Store Counter instruction, the Address for the next sequential instruction of the main program is stored in Memory and the transfer is then made to a sub-routine consisting of a series of instructions, at the end of which, control is returned to the main program.

As an example of an Interrupt Mode B operation, let it be assumed that the following computation is to be performed, namely, $A+B=C$ where A, B and C are integers expressed as a fraction times a base, such as 10, raised to an exponent N. The fractional part of the number A is binary coded and stored as a fraction at Address (Memory position) A1. The exponent part of the number A is also binary coded but is stored as an integer at Address A2. Likewise, the fractional part of the numbers B and C are stored as fractions at Addresses B1 and C1, respectively, while the exponent part of the numbers B and C are stored as integers at Addresses B2 and C2, respectively. For example, A and B may have the following values:

P    1  2  3  4  5  6  7  8  9 10 11 12 13 14 15 16 17

$A = 0 \cdot 0\ 1\ 0\ 0\ 1\ 0\ 1\ 1\ 1\ 0\ 1\ 0\ 1\ 0\ 0\ 0\ 1 \times 10^2$
$B = 0 \cdot 1\ 1\ 1\ 0\ 1\ 1\ 1\ 0\ 0\ 0\ 0\ 1\ 1\ 0\ 0\ 0\ 0 \times 10^2$ which, when added together produce the result, $C = 1 \cdot 0\ 0\ 1\ 1\ 1\ 1\ 0\ 1\ 1\ 1\ 0\ 0\ 1\ 0\ 0\ 0\ 1 \times 10^2$ Thus, initially, these values would be stored at the following Address in Memory:

| Address | Value | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| A1 | 0 | 1 | 0 | 0 | 1 | 0 | 1 | 1 | 1 | 0 | 1 | 0 | 1 | 0 | 0 | 0 | 1 |
| A2 | 0 | 0 | 0 | 0 | 0 | 0 | 0 | 0 | 0 | 0 | 0 | 0 | 0 | 0 | 0 | 1 | 0 |
| B1 | 1 | 1 | 1 | 0 | 1 | 1 | 1 | 0 | 0 | 0 | 0 | 1 | 1 | 0 | 0 | 0 | 0 |
| B2 | 0 | 0 | 0 | 0 | 0 | 0 | 0 | 0 | 0 | 0 | 0 | 0 | 0 | 0 | 0 | 1 | 0 |
| C1 | 0 | 0 | 0 | 0 | 0 | 0 | 0 | 0 | 0 | 0 | 0 | 0 | 0 | 0 | 0 | 0 | 0 |
| C2 | 0 | 0 | 0 | 0 | 0 | 0 | 0 | 0 | 0 | 0 | 0 | 0 | 0 | 0 | 0 | 1 | 0 |

If the computation performed by the Calculator results in a value which is an integer, as in the example above, then, since the machine operates with fractional values, the main program must be interrupted to permit a series of operations to be performed to change the integer value to a fractional value before proceeding with the main program. This is accomplished by shifting the number one position to the right and raising the exponent value by one which requires the following operations: (1) performing an Accumulator Right Shift operation which causes the contents of the Accumulator Register including the overflow positions to shift right one place, (2) by performing a Store operation which causes the contents of the Accumulator Register excluding the overflow positions to be stored in Memory at Address C1, (3) by performing a Reset Add operation which causes the Accumulator Register to be effectively reset and the contents at Address C2, namely, the exponent part of the number C which has a value 2, to be stored in the Accumulator Register, (4) by performing an Add operation whereby a binary coded 1 (00000000000000001) is added to the binary code exponent value 2 (00000000000000010) to produce a new binary coded exponent value 3

(00000000000000011)

105

(5) by performing a Store operation which causes the new binary coded exponent integer value to be stored at Address C2 and (6) by performing a Reset Add operation which causes the Accumulator Register to be effectively reset and the contents at Address C1, namely, the fractional part of the number C, to be stored in the Accumulator Register. Now, control may be returned to the main program.

Thus, in the above example as soon as the overflow condition is detected by stage 1 of the Indicator Register, a binary 1 signal representation is produced thereby. Since it is desired to interrupt the main program, when this condition is detected, as indicated by a binary 1 signal representation from the corresponding stage of the Mask Register, then, an Interruption Indication is produced by the Interruption Indicator, due to the occurrence of the coincidence of the binary 1 signal representations in the corresponding stages of the Indicator Register and the Mask Register, identifying condition 1 as the condition which occurred. Also let it be assumed that an external signal condition, for example EXT SIG 35, is detected simultaneously with overflow condition, the external signal condition being detected by stage 35 of the Indicator Register causing a binary 1 signal representation to be produced thereby, and that it is desired to also interrupt the main program when this condition is detected, as indicated by a binary 1 signal representation from the corresponding stage of the Mask Register. However, since an overflow condition has higher priority than an external signal condition, that is, the leftmost coincidence of binary 1 signal representations in corresponding stages of the Indicator Register and the Mask Register occur in stage 1 of the Interruption Indicator, then no Interruption Indication is produced due to the external signal condition. The Interruption Indication, due to the overflow condition, is then coded, by the Leftmost One Counter, into the 6 bit binary number 000001, corresponding to the number of the condition which occurred. This binary number is added, by the Interrupt Adder, to the Base number stored in the Base Register to form an Address number designating the Address in Memory wherein the Transfer and Store Counter instruction is stored which Instruction is next executed instead of the next sequential instruction of the main program (which may be a Store instruction to store the result of the previous computation, now in the Accumulator Register, in the Memory position designated by the Address part of the Store instruction).

As soon as the Interruption signal is generated, it initiates action which allows no further Interruption to be effective until the condition sub-routine, to which control is given, is completed. Thus, during the execution of the Transfer and Store instruction, the Address for the next sequential instruction of the main program is stored in the Address portion of the Instruction located at the Address designated by the Transfer and Store Counter Instruction. The Instruction at the Address designated by the Transfer and Store Counter Instruction will be a Transfer and Enable Instruction, the purpose of which will be described below. At this point, stage 1 of the Indicator Register is reset causing a binary 0 signal representation to be produced thereby. Consequently, since there is no longer a coincidence of binary 1 signal representations in the corresponding stages 1 of the Indicator Register and the Mask Register, the Interruption Indication due to the overflow condition is terminated. Therefore, the coincidence of binary 1 signal representations in the corresponding stages 35 of the Indicator Register and the Mask Register, due to the external signal condition being previously detected causes a new Interruption Indication to be produced, provided no condition having higher priority has been detected in the interim, identifying condition 35 as the condition which occurred. However, this new Interruption will not become effective

106 until the condition sub-routine to be performed is completed and control is returned to the main program.

Following this, the next operation to be performed is that designated at the Address next following that in which is designated the Transfer and Enable operation, which next operation is the first operation of the subroutine described above, namely, the Accumulator Right Shift operation. After the sub-routine, described above, is completed a Transfer operation is performed causing a transfer to the Transfer and Enable operation which designates the Address in which is designated the next sequential operation to be performed by the main program and also enables the Interrupt unit so that if another Interruption occurred, during the performance of the condition sub-routine or simultaneously with the first condition, as in the example above, it may further Interrupt the main program.

A detailed description of an Interrupt Mode B operation will now be given using the example illustrated above and reference should be made to the Timing Diagram of FIGS. 9b through 9e.

Referring now to FIG. 8a, the overflow trigger in being turned on applies a positive signal via the OV TGR ON line to the input terminal 1 of stage 1 of the Indicator Register where it is passed to condition the AND circuit 901a. At the same instant of time, the external signal condition causes a positive signal to be applied via the EXT SIG line to the input terminal 1 of stage 35 of the Indicator Register where it is passed to condition an AND circuit corresponding to the AND circuit 901a in stage 1. At the "3" index point of the Execute/Regenerate time of the Add operation, a positive signal on the A3 (D1) line is applied to the input terminal 2 of stages 1 and 35 where it passes via the now conditioned AND circuits, such as AND circuit 901a, the OR circuits, such as OR circuit 903a, and the cathode followers, such as cathode follower 909a, to turn on the triggers, such as trigger 912a, which, in being turned on, apply a positive signal from their right hand output via the cathode followers, such as cathode follower 913a, and the IND REG 1 and the IND REG 35 lines to the respective output terminals 8 signalling that an overflow trigger on condition and an external signal condition has been detected.

Referring to the Interruption Indicator in FIG. 8c, let it be assumed that the corresponding stages of the Mask Register, namely, stages 1 and 35, have a binary 1 signal representation stored therein causing positive signals to be applied via the MASK REG 1 and MASK REG 35 lines to the input terminals 2 of stages 1 and 35 of the Interruption Indicator where it passes to one input of the AND circuits 962a and 969a, respectively. Since no Interruption indication has occurred to the left of stage 1, a positive signal is maintained on the input terminal 3 of stage 1 where it passes via a second input to condition the AND circuit 962a. Now, the positive signal on the IND REG 1 line is applied to the input terminal 1 of stage 1 of the Interruption Indicator where it passes via the now conditioned AND circuit 962a, line 963a, the cathode follower 964a and the IRPT IND 1 line to the output terminal 4 signalling an Interruption indication. A positive signal on line 963a is also applied to the inverter 965a where it is inverted to a negative signal and applied via the cathode follower 966a to decondition the AND circuit 967a which, when deconditioned, applies a negative signal via the cathode follower 968a to the output terminal 5 which is connected to the input terminal 3 of stage 2 and, as described above, a negative signal at the input terminal 3 of a stage indicates that an Interruption Indication is present in one of the preceding stages. This negative signal is propagated from stage to stage, as described above, deconditioning the AND circuits in each stage to produce a negative signal and in the last stage, namely stage 35, the negative signal at the input terminal 3 is applied to decondition the AND circuit 969a, even though there is a coincidence of binary 1 signal representations on the IND REG 35 and MASK REG 35 lines, which, when deconditioned, applies a negative signal via the cathode follower 970a and the IRPT IND 35 line to the output terminal 4. The negative signal at the input terminal 3 is also applied to decondition the AND circuit 973a which, when deconditioned, applies a negative signal to the inverter 975a where it is inverted to a positive signal and applied via the cathode follower 976a the IRPT SIG line to the output terminals 6 signalling that an Interruption Indication has occurred in one of the stages of the Interruption Indicator, namely, in stage 1.

Now, let it be assumed that the machine steps to Instruction time for the next sequential instruction of the program, which may be a Store instruction to store the result of the previous computation. Since an instruction comprises only a half word, then, referring to the Deflection Register of FIGS. 4f to 4h, at the "0" index point of Instruction time, the sign trigger of the Deflection Register is conditioned to be turned off so that the sign bit representation will indicate that only a half word in Memory is to be addressed while the remaining triggers of the Deflection Register are conditioned to receive the Address setting of the Instruction Counter, which is the Address in Memory in which the Store half word instruction is stored. These operations are effected, at the "2" index point of Instruction time, by an A2 (D1) signal, as described above.

Referring to the Instruction Register in FIGS. 4a to 4c, at the "4" index point of Instruction time, an I4 (D3) signal is effective to reset the Instruction Register as described above, in preparation for receiving the Store half word instruction.

Referring to the Interruption Timer in FIG. 3f, since the ALLOW NO INTERRUPT trigger 312e is in the off state, a positive signal is applied from its left hand output via the cathode follower 314e to the ALLOW IRPT line where is is applied to one input of the AND circuit 301e. Also, since the overflow trigger on condition was detected by the Interrupt unit, a positive signal is maintained on the IRPT SIG line to condition the AND circuit 301e which, while conditioned, at the "6" index point of Instruction time, passes the positive signal on the I6 (D1) line via the cathode follower 302e to turn on the Extra Cycle trigger 303e and the Interrupt Cycle trigger 307e. The Extra Cycle trigger 303e in being turned on, applies a positive signal from its right hand output via the cathode follower 305e to the EXT CYCLE line and applies a negative signal from its left hand output via the cathode follower 305e to the NO EXT CYCLE line. The Interrupt Cycle trigger 307e in being turned on applies a positive signal from its right hand output via the cathode follower 309e to the IRPT CYCLE line and applies a negative signal from its left hand output via the cathode follower 308e to the NO IRPT CYCLE line.

Referring now to the Leftmost One Counter in FIG. 8d, the positive signal on the IRPT IND 1 line is applied via the OR circuit 980a and the cathode follower 986a to the LOC (17) line. The LOC (16), LOC (15), LOC (14), LOC (13) and the LOC (12) output lines are all negative, since negative signals are maintained on the remaining IRPT IND lines and a negative signal is maintained on the NO IRPT SIGNAL line. Consequently, the output of the Leftmost One Counter is the binary coded number 000001 which designates that condition 1, namely, OV TRIG ON, are detected by the Indicator Register. This binary number is added, by the Interrupt Adder in FIG. 8f, to the Base number, which was previously loaded (by a Load Base instruction) into the Base Register in FIG. 8e, to produce a sum number output designating an Address in Memory at which the Transfer and Store Counter instruction is stored.

Referring to the Deflection Register of FIGS. 4f to 4h, the output of the Interrupt Adder is applied to condition the AND circuits, such as AND circuit 418e in stage 6 of the Deflection Register, in accordance with the Address designated by the Interrupt Adder. Now, the positive signal on the INST TIME line is applied via the OR circuit 433c and the cathode follower 434c to condition the AND circuit 438c in preparation for turning off the sign trigger 460c so that the sign representation will designate that only a half word in Memory is to be addressed. Also, the positive signal on the INST TIME and EXT CYC lines are applied to the AND circuit 416e causing a positive signal to be passed therethrough to the AND circuit in each stage, such as AND circuit 418e of stage 6, permitting binary 1 signal representations from the Interrupt Adder to pass via such AND circuits and via the OR circuits, such as OR circuit 443c of stage 6, and the cathode followers, such as cathode follower 444c of stage 6, to condition the AND circuits, such as AND circuit 447c of stage 6, in preparation for storing the Address, designated by the Interrupt Adder, in the Deflection Register.

Referring to the Interruption Timer in FIG. 3f, the positive signal on the EXT CYCLE line is applied in combination with the positive signal on the IRPT SIG line to condition the AND circuit 311e which, when conditioned, at the "7" index point of Instruction time passes a positive signal on the 17 (D1) line to turn on the ALLOW NO IRPT trigger 312e. The ALLOW NO IRPT trigger 312e in being turned on applies a positive signal from its right hand output via the cathode follower 313e to the ALLOW NO IRPT line and applies a negative from its left hand output via the cathode follower 314e and the ALLOW IRPT line to decondition the AND circuit 301e. Hence, so long as the ALLOW NO IRPT trigger 312e remains on, the AND circuit 301e is blocked to allow no further Interruption signal from passing therethrough.

Referring to FIGS. 5c and 5z, at the "9" index point of Instruction time, the sign bit representation and the 17th bit representation in the Deflection Register, in combination with an I9 (D1) gates the half word Store Instruction, as described above, from Memory via the Memory Buses S to 17, if the half word instruction is from an even Address, or, via the Memory Buses 18 to 35, if the half word instruction is from an odd Address, to the Memory Register unit S to 17.

Referring again to the Instruction Register of FIGS. 4a to 4c, at the "10" index point of instruction, an I10 (D1) signal gates the Store half word instruction from the memory Register to the Instruction Register. The Operation Decoder of FIG. 4i then decodes the operation part of the instruction and produces a positive signal on the STORE line.

Referring to FIG. 5ar, the negative signal on the NO EXT CYC line deconditions the AND circuit 525e and, consequently, at the "11" index point of Instruction time, the positive signal on the I11 (D1) line is blocked from passing therethrough and a negative signal is maintained at the input of the amplifier 526e causing a negative signal to be applied via the cathode follower 527e to the GO TO EX line. Consequently, since a negative signal is maintained on the GO TO EX line at the end of Instruction time, the Cycle Timer of FIGS. 3c and 3d does not step to Execute time but rather remains in Instruction time. Consequently, the machine proceeds to an extra Instruction time.

Referring to FIGS. 4f to 4h, at the "2" index point of Extra Instruction time, an A2 (D1) signal is effective, via the cathode follower 426c, line 427c and the now conditioned AND circuit 438c, to turn off the sign trigger 460c of the Deflection Register so that the sign representation will indicate that only a half word in Memory is to be addressed. The positive A2 (D1) signal on line 427c is also applied to the AND circuits, such as AND circuit 447c, to cause the binary 1 signal representations from the Interrupt Adder to be applied therethrough to turn on corresponding ones of the triggers, such as the 6 bit trigger 461c, thereby causing the Address designated by the Interrupt Adder to be stored in the deflection Register.

Referring now to the Interruption Timer of FIG. 3f, at the "3" index point of Extra Instruction time, a positive signal on the A3 (D1) line is applied to turn off the Extra Cycle trigger 303e which, in being turned off, applies a negative signal from its right hand output via the cathode follower 304e to the EXT CYCLE line and applies a positive signal from its left hand output via the cathode follower 305e to the NO EXT CYCLE line.

Referring to the Instruction Register in FIGS. 4a to 4c, at the "4" index point of Extra Instruction time, an I4 (D3) signal is effective to reset the Instruction Register, as described above, in preparation for receiving the Transfer and Store Counter half word instruction, the Address of which was designated by the Interrupt Adder and is now stored in the Deflection Register. The Operation Decoder of FIG. 4i detects that the Instruction Register was reset and causes the positive signal on the STORE line to be terminated.

Referring to FIGS. 5c and 5z, at the "9" index point of Extra Instruction time, the sign bit representation and the 17th bit representation in the Deflection Register, in combination with an I9 (D1) signal, gates the half word instruction, as described above, from Memory via the Memory Buses S to 17, if the half word instruction is from an even Address, or, via the Memory Buses 18 to 35, if the half word instruction is from an odd Address, to the Memory Register units S to 17.

Referring to the Instruction Register in FIGS. 4a to 4c, at the "10" index point of Extra Instruction time, an I10 (D1) signal gates the TR STO C half word instruction from the Memory Register to the Instruction Register. The Operation Decoder of FIG. 4i then decodes the sign and operation part of the Instruction and produces a positive signal on the TR STO C line.

Referring to FIG. 5am, the positive signal on the TR STO C line passes via an OR circuit 586d, an amplifier 587d and a cathode follower 588d to the PREP MEM RI line. As described in the application of Fox et al., the signal on the latter line prepares the Memory for read in. Referring to FIG. 5bs, the positive signal on the TR STO C line also passes via an OR circuit 522g and a cathode follower 523g to the STORE ADR TO MEM line. A positive signal on this line is effective to cause the unblanking of only Memory positions 6 to 17 or 24 to 35 for even or odd half word Addresses, respectively, as explained in the application of Fox et al.

Referring to FIG. 5ar, at the "11" index point of Instruction time, the positive signal on the TR STO C line is applied via an OR circuit 523e and line 524e to one input of the AND circuit 525e and a positive signal on the NO EXT CYC line, since no interruption has occurred, is applied to condition the AND circuit 525e which, when conditioned, passes the positive signal on the I11 (D1) line and via amplifier 526e and cathode follower 527e to the GO TO EX line. A positive signal on the GO TO EX line is applied to the Cycle Timer, where it is mixed with various clock pulses, in a manner as described above, so that at the next "0" index point, the Cycle Timer steps to Execute time.

Referring to the Interruption Timer of FIG. 3f, at the "11" index point of Extra Instruction time, the positive signals on the IRPT CYCLE and the NO EXT CYCLE lines are applied to condition the AND circuit 321e which, while conditioned, passes a positive signal on the I11 (D1) line and via the amplifier 322e and the cathode follower 323e to the RESET ON IRPT line. Referring to the Indicator Register of FIGS. 8a, the positive signal on the IRPT IND 1 line is applied to input terminal 7 of stage 1 of the Indicator Register where it passes to condition the AND circuit 907a. Now, the positive signal on the RESET ON IRPT line is applied to the input terminal 6 connected to all of the stages of the Indicator Register where it passes via the now conditioned AND circuit 907a, the OR circuit 908a and the cathode follower 909a to turn off the trigger 912a which, in being turned OFF, applies a negative signal from its right hand output via the cathode follower 913a and the IND REG 1 line to the output terminal 8 thereby turning off the Indication of the condition that was previously detected.

Referring now to the Interruption Indicator of FIG. 8c, the negative signal on the IND REG 1 line is applied to the Input terminal 1 of stage 1 of the Interruption Indicator where it passes to decondition the AND circuit 962a causing a negative signal to be applied via line 963a, cathode follower 964a and the IRPT IND 1 line to the output terminal 4 thereby ending the Interruption Indication. The negative signal on the line 963a is also applied to the inverter 965a where it is inverted to a positive signal and applied via the cathode follower 966a to the AND circuit 967a which is conditioned by the positive signal at the input terminal 3, due to the fact that there is no Interruption indication from any stage to the left of stage 1, as described above, causing a positive signal to be applied via the cathode follower 968a to the output terminal 5 which is connected to the input terminal 3 of stage 2. The positive signal at the input terminal 3 of stage 2 is propagated from stage to stage of the Interruption Indicator until it reaches stage 35 where it is applied to the AND circuit 969a which is conditioned 973a by the coincidence of positive signals on the IND REG 35 and MASK REG 35 lines. Consequently, the positive signal passes therethrough and via line 977a, the cathode follower 970a and the IRPT IND 35 line to the output terminal 4 signalling an Interruption due to the detection of the external signal condition. The positive signal on the line 977a is also applied to the inverter 971a where it is inverted to a negative signal and applied via the cathode follower 976a and the IRPT SIG line to the output terminal 6 signalling that an Interruption indication occurred in one of the stages of the Interruption Indicator, namely, in this case, from stage 35. This Interruption signal is applied, in FIG. 3f, to the AND circuit 301e of the Interruption time which is blocked by the negative signal on the ALLOW IRPT line. Consequently, the Interruption desired due to the detection of the external signal condition must await the resetting of the ALLOW NO IRPT trigger 312e at the end of the condition sub-routine, described below.

Referring to FIG. 5ar, the positive signal on the TR STO C line is applied via an OR circuit 525e and line 524e to one input of the AND circuit 525e and the positive signal on the NO EXT CYC line is applied to condition the AND circuit 525e which, while conditioned, passes the positive signal on the I11 (D1) line and via amplifier 526e and cathode follower 527e to the GO TO EX line. The positive signal on the GO TO EX line is applied to the Cycle Timer of FIGS. 3c and 3d, where it is mixed with various clock pulses as described above, so that the next "0" index point, the Cycle Timer steps to Execute time.

Referring again to FIGS. 4f to 4h, at the "0" index point of Execute time, a positive signal on the TR STO C line is applied to condition the AND circuit 419e which, while conditioned, passes a positive signal on the EX TIME line and via the OR circuit 433c and the cathode follower 434c to condition the AND circuit 438c so that, at the "2" index point of Execute Time, the positive signal on the A2 (D1) line passes via the cathode follower 426c and the now conditioned AND circuit 438c to turn off the sign trigger 460c of the Deflection Register so that the sign bit representation will indicate that a half word in Memory is to be addressed. At the same time, namely, the "0" index point of Execute time, the remaining triggers of the Deflection Register are conditioned to receive the Address setting of the Instruction Register, which is the Address portion of the TR STO C half word Instruction, and designates the Address of the half word in Memory in which the Address portion is to be changed. This operation is effective, at the "2" index point of Execute time, by the A2 (D1) signal, in a manner as previously described above in connection with Deflection Register.

Referring to the Instruction Counter in FIG. 4d, the negative signal on the NO IRPT CYC line is applied to decondition the AND circuit 403e which now blocks the positive signal on the TR STO C line from passing therethrough, as in a regular transfer and Store Counter operation, described above, to condition the Instruction Counter to be stepped by one at the "2" index point of Execute time by the combination of positive signals on the E2 (D1) and L103 lines. Consequently, the Address for the next sequential Instruction of the main program remains stored in the Instruction Counter.

The Address portion of a TR STO C Instruction always designates a half word at an even Address. Consequently, referring to FIG. 5br, at the "8" index point of Execute time, a positive signal on the TR STO C line is applied to condition an AND circuit 519g which, while conditioned, passes a positive signal on the E8 (D2) line and via the amplifier 520g and the cathode follower 521g to the INST CTR (6 to 17) TO MEM BUS (6 to 17) line. This signal is effective to connect the outputs of the Instruction Counter via the Memory Bus Switches to the Memory Bus positions 6 to 17 causing the Address portion of the half word at the even Address designated by the setting of the Deflection Register, which is the even Address, to be changed to the Address setting of the Instruction Counter.

Referring to FIG. 5ak, at the "11" index point of Execute time, a positive signal on the TR STO C line is applied via an OR circuit 579d and line 580d to condition the AND circuit 581d which, while conditioned, passes a positive signal on the E11 (D1) line and via OR circuit 583d, amplifier 584d and the cathode follower 585d to the GO TO EX/RGN line. The positive signal on the GO TO EX/RGN line is applied to the Cycle Timer, where it is mixed with various clock pulses, in a manner as described above, so that, at the next "0" index point, the Cycle Timer is stepped to Execute/Regenerate time.

Referring to FIGS. 4f to 4h, at the "0" index point of Execute/Regenerate time, the 6 to 15 position triggers of the Deflection Register are conditioned to receive the Address setting of the Regeneration Counter, which is the Address in Memory of a word to be regenerated. This operation is effective, at the "2" index point of Execute/Regenerate time, by an A2 (D1) signal, as described above. The holding of the sign trigger 460c of the Deflection Register is immaterial since only full words are addressed to be regenerated, as described in said above identified application of Fox et al.

Referring to FIG. 4e, at the "4" index point of Execute/Regenerate time, an A4 (D1) signal is effective to step the Regeneration Counter in a manner as described above in connection with the Regeneration Counter, in preparation for regenerating the next sequential word.

Referring to FIG. 5ba, at the "7" index point of Execute/Regenerate time, a positive signal on the TR STO C line is applied via OR circuit 582e and line 583e to condition the AND circuit 584e. At the same time, a positive signal on the EX/RGN TIME line is applied to condition the AND circuit 502g which, while conditioned, passes a series of signals on the A7 (D1), A8 (D1) and A9 (D1) lines and via the OR circuit 501g and the now conditioned AND circuit 502g, line E/R7 (D3) and the now conditioned AND circuit 584e, the amplifier 586e and the cathode follower 588e to the R INST CTR line. Referring to FIG. 4d, the positive signal on the R INST CTR line is effective to reset the Instruction Counter, in a manner as described above, in preparation for receiving the Address from which the next instruction is to be taken.

Referring again to FIG. 5ba, at the "10" index point of Execute/Regenerate time, the positive signal on line 583e conditions the AND circuit 585e which, while conditioned, passes a positive signal on the E/R10 (D1) line and via amplifier 587e and cathode follower 589e to the SET INST CTR TO INST REG line. Referring to FIGS. 4d, the positive signal on the SET INST CTR TO INST REG line causes the Address portion of the TR STO C Instruction to be transferred from the Instruction Register to the Instruction Counter. Since the Address portion of a TR STO C Instruction is always an even number, the least significant bit of the Address, which is in bit position 17, maintains a negative signal on the ADR CTR 17 line to decondition the AND circuit 461b so that when a positive signal is applied to the SET INST CTR TO INST REG line it is blocked from passing therethrough to turn on the 17th bit trigger 476b. However, a positive signal on the TR STO C line is applied to condition the AND circuit 491b so that when the positive signal is applied to the SET INST CTR TO INST REG line it passes therethrough and via the OR circuit 492b to turn the trigger 476b on thereby effectively stepping the count by one. It should be noted that a carry ripple occurs in the Instruction Counter only when a particular trigger is turned off. However, since the trigger 476b is turned on to advance the count by one, no ripple occurs and no delay is necessary to take into account carry ripple time. Thus, the Address of the next instruction read from Memory, designated by the Instruction Counter, is effectively the Address portion of the TR STO C Instruction plus one.

Referring now to FIG. 5aj, at the "10" index point Execute/Regenerate time, a positive signal on the TR STO C line is applied via an OR circuit 520d and line 521d to condition the AND circuit 522d which, while conditioned, passes a positive signal on the E/R10 (D2) line and via line 523d, the OR circuit 528d, the amplifier 529d and the cathode followed 530d to the END OP line. Referring to FIG. 5aj, a positive signal on the TR STO C line is applied via the OR circuit 564d to the inverter 565d where it is inverted to a negative signal and applied via the cathode follower 566d and line 567d to decondition the AND circuit 568d so that the positive signal on the END OP line is blocked from passing there through to the STEP INST CTR line to initiate the stepping of the Instruction Counter, inasmuch as the Address for the next Instruction is already in the Instruction Counter. The positive signal on the END OP line is applied to condition the Cycle Timer of FIGS. 3c and 3d so that, at the next "0" index point, the Cycle Timer proceeds to Instruction time for the next sequential Instruction located at the Address designated by the Instruction Counter.

Referring to the Interruption Timer in FIG. 3f, at the "1" index point of Instruction Time, the positive signal on the NO EXT CYCLE line is applied to condition the AND circuit 306e which, while conditioned, passes the positive signal on the I1 (D1) line to turn off the Interrupt Cycle trigger 307e which, when turned off, applies a negative signal from its right hand output via the cathode follower 309e to the IRPT CYCLE line and applies a positive signal from its left hand output via the cathode follower 308e to the NO IRPT CYCLE line. The negative signal on the IRPT CYCLE line is applied to decondition the AND circuits 320e and 321e.

Referring now to the Deflection Register in FIGS. 4f to 4h, at the "2" index point of Instruction time, an A2 (D1) signal is effective to cause the sign trigger of the Deflection Register to be turned off, so that the sign bit representation will indicate that only a half word in memory is to be addressed, while the remaining triggers of the Deflection Register receive the Address holding of the Instruction counter, which is the Address in memory in which the next sequential instruction of the sub-routine is stored, namely, for the example above, the Accumulator Right Shift half word instruction.

Referring to the Instruction Register in FIGS. 4a to 4c, at the "4" index point of Instruction time, an I4 (D3)

signal is effective to reset the Instruction Register, as described above, in preparation for receiving the Accumulator Right Shift half word instruction. The operation decoder of FIG. 4i detects that the Instruction Register was reset and causes the positive signal of the TR STO C line to be terminated. The positive signal on the TR STO C line in being terminated causes the positive signals on the PREP MEM RI and STORE ADR TO MEM lines to be terminated.

Referring to FIGS. 5c and 5z, at the "9" index point of Instruction time, the sign bit representation and the 17th bit representation in the Deflection Register, in combination with an I9 (D1) signal, gates the half word instruction, as described above, from memory via the proper memory buses to the Memory Register units S to 17.

Referring to the Instruction register in FIGS. 4a to 4c, at the "10" index point of Instruction time, an I10 (D1) signal gates the Accumulator Right Shift half word instruction from the Memory Register to the Instruction Register. The operation decoder of FIG. 4i then decodes the operation part of the instruction and produces a positive signal on the ACC R line.

The Accumulator Right Shift operation is now executed causing the contents of the Accumulator Register including the overflow positions to be shifted right one place. Following this, a Store operation is performed, as described above, causing the contents of the Accumulator Register excluding the overflow positions to be stored in memory. Next, a Reset Add operation is performed, as described above, causing the Accumulator Register to be effectively reset and the exponent part of the result number to be stored therein. After this, an Add operation is performed, as described above, whereby a binary coded one is added to the binary coded exponent value to produce a new binary coded exponent value (in view of the fact that the fractional part of the result number was shifted right one place). Following this, another Store operation is performed, as described above, causing the new binary coded exponent value to be stored in memory. Next, another Reset Add operation is performed, as described above, causing the Accumulator Register to be effectively reset and the fractional part of the result number to be stored therein. Next, a Transfer operation is performed, as described above, causing the Address for the Transfer and Enable Instruction to be stored in the Instruction Counter.

Continuing the detailed description from this point, let it be assumed that the Cycle Timer now steps to Instruction time for the Transfer and Enable instruction.

Referring now to the Deflection Register in FIGS. 4f to 4h, at the "2" index point of Instruction time, an A2 (D1) signal is effective to cause the sign trigger of the Deflection Register to be turned off, so that the sign bit representation will indicate that only a half word in memory is to be addressed while the remaining triggers of the Deflection Register receive the Address holding of the Instruction Counter, which is the Address in memory in which is designated the Transfer and Enable operation.

Referring to the Instruction Register in FIGS. 4a to 4c, at the "4" index point of the Instruction time, an I4 (D3) signal is effective to reset the Instruction Register, as described above, in preparation for receiving the Transfer and Enable half word instruction. The Operation Decoder of FIG. 4i detects that the Instruction Register was reset and causes the positive signal on the TR line to be terminated.

Referring to FIGS. 5c and 5z, at the "9" index point of Instruction time, the sign bit representation and the 17th bit representation in the Deflection Register, in combination with an I9 (D1) signal, gates the half word instruction, as described above, from memory via the proper memory buses to the Memory Register units S to 17.

Referring to the Instruction Register in FIGS. 4a to 4c, at the "10" index point of instruction time, an I10 (D1) signal gates the TR EN half word instruction from the Memory Register to the Instruction Register. The Operation Decoder of the FIG. 4j then decodes the sign and operation part of the instruction and produces a positive signal on the TR EN line.

Referring to FIG. 5ak, at the "11" index point of Instruction time, the positive signal on the TR EN line passes via the OR circuit 575d, line 576d and in combination with the positive signal on the NO EXT CYC line conditions the AND circuit 577d which, while conditioned, passes a positive signal on the I11 (D1) line and via the line 578d, the OR circuit 583d, the amplifier 584d and the cathode follower 585d to the GO TO EX/RGN line. The positive signal on the GO TO EX/RGN line is applied to the Cycle Timer, where it is mixed with various clock pulses, so that, at the next "0" index point, the Cycle Timer steps to EX/RGN time.

Referring to the Deflection Register in FIGS. 4f to 4h, at the "0" index point of EX/RGN time, the 6 through 15 position triggers of the Deflection Register are conditioned to received the Address holding of the Regeneration Counter, which is the Address in memory of a word to be regenerated. This operation is effective, at the "2" index point of EX/RGN time, by an A2 (D1) signal, as described above.

Referring to the Regeneration Counter in FIG. 4e, at the "4" index point of EX/RGN time, an A4 (D1) signal is effective to step the Regeneration Counter, as described above, in preparation for regenerating the next sequential word.

Referring to FIG. 5ba, at the "7" index point of EX/RGN time, a positive signal on the TR EN line is applied via OR circuit 582e and line 583e to condition the AND circuit 584e. At the same time, a positive signal on the EX/RGN TIME line is applied to condition the AND circuit 502g which, while conditioned, passes a series of positive signals on the A7 (D1), A8 (D1) and A9 (D1) lines and via the OR circuit 501g and the now conditioned AND circuit 502g, line E/R7 (D3) and the now condition AND circuit 584e, the amplifier 586e and the cathode follower 588e to the R INST CTR line.

Referring to the Instruction Counter in FIG. 4d, the positive signal on the R INST CTR line is effective to reset the Instruction Counter, as described above, in preparation for receiving the Address part of the Transfer and Enable instruction designating the Address in which the next instruction of the main program is stored.

Referring to FIG. 5ba, at the "10" index point of EX/RGN time, the positive signal on line 583e conditions the AND circuit 585e which, while conditioned, passes a positive signal on the E/R10 (D1) line and via amplifier 587e and cathode follower 589e to the SET INST CTR TO INST REG line. Referring to the Instruction Counter in FIG. 4d, the positive signal on the SET INST CTR TO INST REG line causes the Address portion of the TR EN instruction to be transferred from the Instruction Register to the Instruction Counter. Hence, at this point, the Address of the next sequential instruction of the main program is now stored in the Instruction counter and control reverts to the main program.

Referring now to FIG. 5af, at the "10" index point of EX/RGN time, a positive signal on the TR EN line is applied via an OR circuit 520d and line 521d to condition the AND circuit 522d which, while conditioned, passes a positive signal on the E/R10 (D2) line and via line 523d, the OR circuit 528d, the amplifier 529d, and the cathode follower 530d to the END OP line.

Referring now to FIG. 5aj, the positive signal on the TR EN line is applied via the OR circuit 564d to the inverter 565d where it is inverted to a negative signal and applied via the cathode follower 566d and line 567d to decondition the AND circuit 568d so that the positive signal on the END OP line is blocked for passing therethrough to the STEP INST CTR line to initiate the stepping of the Instruction Counter inasmuch as the Address for the next sequential instruction of the main program is already in the Instruction Counter.

Referring now to the Interruption Timer in FIG. 3f, the positive signal on the TR EN line is applied to condition the AND circuit 315e which, while conditioned, passes the positive signal on the END OPN line and via the OR circuit 315e and the cathode follower 317e to turn off the Allow No Interrupt trigger 312e which, in being turned off, applies a negative signal from its right hand output via the cathode follower 313e to the ALLOW NO IRPT line and applies a positive signal from its left hand output via the cathode follower 314e to the ALLOW IRPT line. The positive signal on the ALLOW IRPT line is applied to one input of the AND circuit 301e while a positive signal maintained on the IRPT SIGNAL line, due to the previous detection of the external signal condition, is applied to a second input of the AND circuit 301e thereby conditioning the AND circuit 301e to permit the next Interruption to Interrupt the main program during the next Instruction time.

The positive signal on the END OP line is also applied to condition the Cycle Timer in FIGS. 3c and 3d so that, at the next "0" index point, the Cycle Timer proceeds to Instruction time for the next sequential instruction of the main program located at the Address designated by the Instruction Counter.

Referring to the Deflection Register in FIGS. 4f to 4h, at the "2" index point of Instruction time, an A2 (D1) signal is effective to cause the sign trigger of the Deflection Register to be turned off so that the sign bit representation will indicate that only a half word in memory is to be addressed while the remaining triggers of the Deflection Register receive the Address setting of the Instruction Counter, which is the Address in memory in which the next sequential instruction of the main program is stored, which, for the above example, is the Address for the Store half word instruction which would cause the result number now in the Accumulator Register to be stored in memory.

Referring to the instruction register in FIGS. 4a to 4c, at the "4" index point of Instruction time, an I4 (D3) signal is effective to reset the Instruction Register, as described above, in preparation for receiving the Store half word instruction. The Operation Decoder of FIG. 4j detects that the Instruction Register was reset and causes the positive signal on the TR EN line to be terminated.

Referring to the Interruption Timer in FIG. 3f, since the Allow No Interrupt trigger 312e is in the off state, a positive signal is applied from its left hand output via the cathode follower 314e to the ALLOW NO IRPT line where it is applied to one input of the AND circuit 301e. Also, as explained above, since the external signal condition was previously detected by the Interrupt Unit, a positive signal is maintained on the IRPT SIG line to condition the AND circuit 301e which, while conditioned, at the "6" index point of Instruction time, passes the positive signal on the I6 (D1) line and via the cathode follower 302e to turn on the Extra Cycle trigger 303e and the Interrupt Cycle trigger 307e. This initiates another Interrupt operation which may be of the Interrupt Mode A or Interrupt Mode B type, as described above.

Thus, in summary, in the Interrupt Mode B type of operation, when a program is being performed by the data processing machine and a condition occurs for which it is desired to interrupt the program, then, the Address for the next sequential operation of the program is stored in memory, the Interrupt Unit is disabled to prohibit further Interruptions and a transfer is made to a sub-routine related to the detected condition. At the end of the condition sub-routine, the Interrupt Unit is re-enabled to permit further Interruptions and a Transfer is made to the Address, in which, is designated, the next sequential operation of the program.

Another variation of the Interrupt Mode B type of operation is one in which after an Interruption occurs, a series of operations is performed including a computation which will permit a return to the operation of the program which caused the condition to occur rather than to the next sequential operation of the program.

As an illustration of this variation of the Interrupt Mode B type operation, it should be noted that in the above identified patent to Haddad et al., when a Divide operation is to be performed, a check is made to insure that the divisor is greater than the dividend, this being due to the fact that the machine operates with fractional values. Thus, if the divisor is less than the dividend, which would cause a quotient greater than one to be obtained, exceeding the capacity of the machine, then, the machine stops completely and the Divide operation is not performed. However, with the flexibility of the present system, it is not necessary to stop the machine when a Divide Check condition is detected, but rather the Divide Check condition when detected can cause the program to be interrupted and a Transfer made to a series of operations which causes the dividend value to be reduced and the Divide operation to be re-initiated to determine whether the divisor is now greater than the dividend, before proceeding with the next sequential operation of the program. This is accomplished by shifting the dividend value in the accumulator one position to the right and computing the Address in which is designated the divide operation.

Thus, when the Divide Check condition occurs and it is desired to interrupt the program, then, the Address for the next sequential operation of the program is stored in memory, the Interrupt Unit is disabled to prohibit further Interruptions and a Transfer is made to a sub-routine which designates the following operations, (1) perform a Store operation, as described above, which causes the dividend value in the Accumulator Register to be stored in memory, (2) perform a Reset Add operation, as described above, which causes the Accumulator Register to be effectively reset and the Address for the next sequential operation of the program be read out of memory and transferred to the Accumulator Register, (3) perform a Subtract operation, as described above, whereby a value 1 is subtracted from the address value to produce a new address value which designates the preceding operation of the program, namely, the divide operation, (4) perform a Store operation, as described above, which causes the Address value in the Accumulator Register to be stored in memory in the Address portion of a Transfer and Enable operation, (5) perform a Reset Add operations, as described above, which causes the Accumulator Register to be effectively reset and the dividend value previously stored in memory to be read out thereof and transferred to the Accumulator Register, and (6) perform a Long Right Shift operation, as described above, which causes the dividend value in the Accumulator and MQ registers to shift right one place.

Now, a Transfer is made to the Address in which designated the divide operation and the Interrupt unit is re-enabled to permit further Interruptions. Consequently, another divide check may be made to insure that the divisor is greater than the dividend and if it is, the divide operation is executed after which the next sequential operation of the program is performed. However, if the divisor is less than the dividend than a divide check condition is again detected and the program may be interrupted once more to perform the series of operations as described above.

In the Interrupt Unit, as soon as the Divide Check condition is detected by stage S of the Indicator Register, a binary 1 signal representation is produced thereby. Since it is desired to Interrupt the main program when this condition is detected, as indicated by a binary 1 signal representation from the corresponding stage of the Mask Register, then, an Interruption indication is produced by the Interruption Indicator, due to the occurrence of the coincidence of the binary 1 signal representations in the corresponding stages of the Indicator Register and the Mask Register, identifying condition S, namely, the Divide Check condition as the condition which occurred. The Interruption indication, due to the divide check condition, is then coded, by the Leftmost One Counter into the 6 bit binary number 000000, corresponding to the number of the condition which occurred. This binary number is added, by the Interrupt Adder, to the Base number stored in the Base Register to form an Address number designating the Address in memory in which is designated the Transfer and Store Counter operation, which operation is next performed instead of the next sequential operation of the main program (which may be a Store operation to store the result of the previous divide computation).

As soon as the Interruption signal is generated, it initiates action which allows no further interruptions to be effective until the condition sub-routine to which control is given, is completed. Thus, during the performance of the Transfer and Store Counter operation, the Address in which is designated the next sequential operation of the program is stored at Address A (designated by the Transfer and Store Counter operation) and Transfer is made to the operation which is designated in Address A plus one.

At this point, stage S of the Indicator Register is reset causing a binary 0 signal representation to be produced thereby. Consequently, since there is no longer a coincidence of binary 1 signal representations of the corresponding stages S of the Indicator Register and the Mask Register, the Interruption indication due to the divide check condition is terminated. Therefore, the coincidence of binary 1 signal representations in any of the succeeding corresponding stages of the Indicator Register and the Mask Register, due to the detection of a condition having lower priority being previously detected, causes a new Interruption indication to be produced. However, this new Interruption will not become effective until the condition sub-routine to be performed is completed and control is returned to the main program.

Following this, the operation which is designated at address $A+1$, namely, to store the dividend value in memory is performed, after which, the succeeding operations of the sub-routines, described above, are performed. At the end of the sub-routine, a Transfer and Enable operation is performed which causes a transfer back to the divide operation and also enables the Interrupt Unit so that if another Interruption occurred, during the performance of the condition sub-routine or simultaneously with the first condition, it may further Interrupt the main program.

In the above examples, the Interrupt Unit was disabled at the beginning of the condition sub-routine and re-enabled at the end of the condition sub-routine. However, this is not a requirement but is rather optional, in that, once a transfer is made to the condition sub-routine, the Interrupt Unit may be re-enabled at the beginning of the routine so that Interruptions of the condition sub-routine may occur in much the same manner as the Interruptions of the main program thereby permitting Interruptions of Interruptions to be performed.

If the same set of conditions is to be permitted to Interrupt the condition sub-routine, that is, the same Mask word is to be used, then, a Transfer and Enable operation will follow the Transfer and Store Counter operation so that the Interrupt Unit will be re-enabled at the beginning of the sub-routine. However, if a different set of conditions is to be permitted to interrupt the condition sub-routine, that is, a different Mask word is to be used, then, before the Interrupt Unit is re-enabled the old Mask word is stored in memory by a Store Mask operation and a new Mask word is loaded into the Mask Register by a Load Mask operation, after which, the Transfer and Enable operation is performed, to re-enable the Interrupt Unit so that the condition sub-routine may be interrupted by those classes of conditions for which Interruption is desired. At the end of the condition sub-routine, the new Mask word is stored in memory by a Store Mask operation and the old Mask word related to the original program which was interrupted is loaded back into the Mask Register by a Load Mask operation and control is returned to the main program. This procedure is clearly suitable for any number of levels of interruptions upon interruptions, each of which may have a different set of causing conditions.

Furthermore, the data processing machine is readily multi-programmed, in that, several programs may be stored in memory with one running until it finds some need to be interrupted and then transferring to a second program. Hence, since the Indicator word, Mask word and Base number are programmable, the Indicator word related to the first program may be stored in memory by a Store Indicator operation and a new Indicator word related to the second program may be loaded into the Indicator Register by a Load Indicator operation. Also, the Mask word related to one program may be stored in memory by a Store Mask operation while a new Mask word related to a second program may be loaded into the Mask Register by a Load Mask operation. Additionally, the Base number which identifies the first Address of a Table of operations related to one program may be stored in memory by a Store Base operation and a new Base number identifying the first address of a different Table of operations may be loaded in the Base Register by a Load Base operation.

Additionally, a problem arises as to the preservation of the contents of arithmetic registers which may contain intermediate results that are of importance and which must be saved and restored before the Interrupted program is resumed. However, this problem is solved by the sub-routine programmer in that if the condition sub-routine requires the use of these registers then the contents thereof must be stored in memory at the beginning of the sub-routine and then returned to the registers at the end of the sub-routine. If the condition sub-routine does not require the use of these registers then their contents need not be stored and retrieved. Thus, full flexibility is provided, in that, information need only be stored and retrieved when necessary.

Thus, the novel program interrupt system of the present invention provides a selective monitoring of a program being performed by a data processing machine which permits the program to be interrupted upon the occurrence of a predetermined condition, selection of suitable action to be taken as a result of detecting the occurrence of the predetermined condition, with priorities established between interrupting conditions and between simultaneously occurring multiple conditions, and provision for resuming operation of interrupted program at the end of the interruption.

While there has been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a program controlled data processing machine controlled by a program comprising a series of instruction steps, means for detecting the occurrence of a plurality of conditions during the operation of the machine under control of an instruction step, means for producing indications of predetermined ones of said plurality of conditions, and means operative during said instruction step for producing selectively ordered monitoring of said indications to permit an automatic interruption of the program under control of a condition selected by said selective monitoring means.

2. In a data processing machine, means for sequencing the machine through a program of instruction steps, means for detecting the occurrence of a plurality of conditions during an instruction step, masking means for producing indications of specified ones among said conditions, and priority means for producing under control of a condition selected by said selective monitoring said indication to permit an automatic interruption of the program.

3. In a data processing machine, means for sequencing the machine through a program of instruction steps, means for detecting the occurrence of a plurality of conditions during an instruction step, means for producing indications of pre-selected ones of said plurality of conditions, means for producing during said step selectively ordered monitoring of said indications to permit automatic interruptions of the program, and means responsive to said monitoring means under control of a condition selected by said selective monitoring for controlling said sequencing means to sequence the machine through a different program of operations.

4. In a data processing machine, means for sequencing the machine through a program of instruction steps, means for detecting the occurrence of a plurality of conditions during an instruction step, mask means for producing indications of specified ones of said conditions, priority means for producing during said step selectively ordered monitoring of said indications to permit an automatic interruption of the program under control of a selected one of said indications, means responsive to the indication selected by said priority means for controlling said sequencing means to sequence the machine through a different program of operations, and means effective at the end of said different program of operations for controlling said sequencing means to continue the first mentioned program of operations starting from the point where the interruption occurred.

5. In a data processing machine controlled by a program comprising a series of instruction steps, means for detecting the occurrence of a plurality of conditions during the operation of the machine under control of an instruction step, masking means for producing indications of selected ones of said plurality of conditions, and priority and means for producing during said step selectively ordered monitoring of said indications to permit a selected one of said indications to cause an interruption of the program.

6. In a data processing machine controlled by a program comprising a series of instruction steps, means for detecting the occurrence of predetermined ones of a plurality of conditions during the operation of the machine under control of an instruction step and producing indications thereof, means for producing during said step selectively ordered monitoring of said indications to permit a selected one of said indications to cause an interruption of the program, and means responsive to said monitoring means for controlling said machine to perform a different program of operations.

7. In a data processing machine controlled by a program comprising a series of instruction steps, indicator triggers responsive to the occurrence of predetermined ones of a plurality of conditions during the operation of the machine under control of an instruction step for producing signal indications thereof, and means for producing during said instruction step selectively ordered monitoring of said signal indications to permit an automatic interruption of the program under control of a selected signal indication.

8. In a program controlled data processing machine wherein a plurality of conditions may occur during the operation of the machine, an indicator register having a plurality of stages corresponding to said plurality of conditions with each stage producing a signal representation indicating the occurrence of the condition, and means for selectively monitoring said signal representations according to a predetermined priority to permit a one of said signal representations to cause an interruption of the program.

9. In a program controlled data processing machine, indicator means for detecting the occurrence of a condition during the operation of the machine, said indicator means producing a first signal representation indicating the occurrence of the condition and a second signal representation indicating the non-occurrence of the condition, a mask means corresponding to said indicator means for producing a first signal representation indicating that the program is to be interrupted if the occurrence of the condition is signalled by said indicator means and a second signal representation indicating that the program is not to be interrupted even if the occurrence of the condition is signalled by said indicator means, and means for comparing the signal representations from said indicator means and said mask means to automatically interrupt the program when a coincidence of said first signal representations is detected.

10. In a program controlled data processing machine, wherein a plurality of conditions may occur during the operation of the machine, an indicator register having a plurality of stages corresponding to said plurality of conditions with each stage producing a first signal representation indicating the occurrence of the condition and a second signal representation indicating the non-occurrence of the condition, a mask register having a plurality of stages corresponding to that of said indicator register with each stage thereof producing a first signal representation indicating that the program is to be interrupted if the occurrence of the condition is signalled by the corresponding stage of said indicator register and a second signal representation indicating that the program is not to be interrupted even if the occurrence of the condition is signalled by the corresponding stage of said indicator register, and means for comparing the signal representations from corresponding stages of said indicator register and said mask register to automatically interrupt the program when a predetermined coincidence of said first signal representations is detected in accordance with a predetermined order of priority.

11. In a program controlled data processing machine having a memory for storing a program of instructions, means for normally selecting the instructions of said program from sequentially numbered addresses, means for detecting the occurrence of predetermined ones of a plurality of conditions during the operation of the machine under control of one instruction and producing first indications thereof, means for producing during said one instruction selectively ordered monitoring of said first indications to produce an interruption indication identifying a selected one of said first indications, and means for controlling said instruction selecting means to interrupt the normal sequence of instruction selection and selecting an interruption instruction in accordance with said interruption indication.

12. In a program controlled data processing machine having a memory for storing a program of instructions, means for normally selecting the instructions of said program for sequentially numbered addresses, means for detecting the occurrence of predetermined ones of a plurality of conditions during the operation of the machine under control of one instruction and producing first indications thereof, means for selectively producing during said instruction selectively ordered monitoring of said first indications to produce an interruption indication identifying a selected one of said first indications, means for controlling said instruction selecting means to interrupt the normal sequence of instruction selection and selecting an interruption instruction in accordance with said interruption indication, and means effective after the execution of said interruption instruction for controlling said instruction selecting means to resume the normal sequence of instruction selection from the point of interruption.

13. In a program controlled data processing machine having a memory for storing instructions, means for detecting the occurrence of predetermined ones of a plurality of conditions during the operation of the machine under control of one instruction and producing first indications thereof, means for producing during said instructions selectively ordered monitoring of said first indications to produce an interruption indication identifying a selected one of said first indications, means responsive to said interruption indication for producing an address representation, and means responsive to said address representation for addressing memory to select an interruption instruction corresponding to the predetermined one of said plurality of conditions.

14. In a program controlled data processing machine having a memory for storing a program of instructions, at different addresses, means for detecting the occurrence of predetermined ones of a plurality of conditions during the operation of the machine under control of one instruction and producing first indications thereof, means for producing during said instruction selectively ordered monitoring of said first indications to produce several interruption indications corresponding to said first indications, and means responsive to said respective several interruption indications for producing a plurality of corresponding address representations each of which designates the location in memory of an interruption instruction thereby providing for a table of interruption routines.

15. In a program controlled data processing machine having a memory for storing different programs of instructions, means for detecting the occurrence of a plurality of conditions during the operation of the machine in performing a predetermined one of said programs and producing indications thereof, means for selectively monitoring said indications to produce an interruption indication identifying a predetermined one of said plurality of conditions, means responsive to said interruption indication for producing a first address representation corresponding to the predetermined one of said plurality of conditions, means for producing a second address representation designating the beginning address for a table of interruption instructions associated with said predetermined one of said programs, and means for adding said first address representation to said second address representation to produce a third address representation designating the location of an interruption instruction in said table of interruption instructions.

16. In a data processing machine operating under control of a program, means for selectively monitoring a plurality of conditions which may occur concurrently during the operation of the machine in performing said program to provide interruption indications in a predetermined order of priority identifying the plurality of conditions, and program interrupt means for permitting a predetermined one of said interruption indications to cause an interruption of said program and preventing other interruption indications from causing further interruptions.

17. In a program controlled data processing machine, means for selectively monitoring a plurality of conditions which may occur during the operation of the machine in performing said program to provide interruption indications in a predetermined order of priority identifying the plurality of conditions, program interrupt means for permitting a predetermined one of said interruption indications to cause an interruption of said program and preventing other interruption indications from causing further interruptions, means operative under control of said program interrupt means for controlling said machine to perform a different program of operations, and means effective during said different program of operations for controlling said program interrupt means to permit a succeeding interruption indication to cause an interruption of said different program of operations.

18. In a data processing machine operating under control of a main program, means for selectively monitoring a plurality of conditions which may occur during the operation of the machine in performing said main program to provide interruption indications in a predetermined order of priority identifying the plurality of conditions, program interrupt means for permitting a predetermined one of said interruption indications to cause an interruption of said main program and preventing other interruption indications from causing further interruptions, means operative under control of said program interrupt means for controlling said machine to perform a different program of operations, and means effective at the end of said different program of operations for transferring control back to said main program at the point of interruption and enabling said program interrupt means to permit a succeeding interruption indication to cause further interruption of said main program.

19. In a program controlled data processing machine as claimed in claim 18 having an addressable memory, said means for performing a transfer and enable operation including means for producing an address manifestation designating the location of a transfer and enable instruction in memory, an instruction register for storing instruction manifestations each of which includes an operation part and an address part, means responsive to said address manifestation for transferring a manifestation of said transfer and enable instruction from said memory to said instruction register, means for decoding the manifestation of the operation part of said transfer and enable instruction to produce an instruction identifying signal, means responsive to said instruction identifying signal for transferring the manifestation of the address part of said transfer and enable instruction from said instruction register to said address producing means to designate the location of the next instruction of the program, and means responsive to said instruction identifying signal at the end of the operation to enable said program interrupt means to permit a succeeding interruption indication to cause a further interruption of the program.

20. In a program controlled data processing machine having an addressable memory, means for producing an address manifestation designating the location of a transfer and store instruction in memory, an instruction register for storing instruction manifestations each of which includes an operation part and an address part, means responsive to said address manifestation for transferring a manifestation of said transfer and store instruction from said memory to said instruction register, means for decoding the manifestation of the operation part of said transfer and store instruction to produce an instruction identifying signal, means responsive to said instruction identifying signal for preparing said memory for storing data therein, means for incrementing the contents of said address producing means to cause a new address manifestation to be produced designating the location in said memory of the next sequential instruction of the program, means responsive to the manifestation of the address part of said transfer and store instruction for causing said new address manifestation to be stored in said memory at the address designated by the address part of said transfer and store instruction, means for transferring the manifestation of the address part of the transfer and store instruction from said instruction register to said address producing means, and means responsive to said instruction identifying signal for incrementing the contents of said address producing means to cause another new address manifestation to be produced designating the location in said memory of the next instruction to be performed by said machine.

21. In a program controlled data processing machine having an addressable memory, first address producing means for producing an address manifestation designating the location in said memory of a transfer and store instruction, an instruction register for storing instruction manifestations each of which includes an operation part and an address part, means responsive to said address manifestation for transferring a manifestation of said transfer and store instruction from the designated location in said memory to said instruction register, means for decoding the manifestation of the operation part of said transfer and store instruction to produce an instruction identifying signal, means responsive to said instruction identifying signal for preparing said memory for storing data therein, second address producing means for producing an address manifestation designating the location in said memory of the next sequential instruction of the program means responsive to the manifestation of the address part of said transfer and store instruction for causing said address manifestation produced by said second address producing means to be stored in said memory at the address designated by the address part of said transfer and store instruction, means for transferring the manifestation of the address part of the transfer and store instruction from said instruction register to said second address producing means, and means responsive to said instruction identifying signal for incrementing the contents of said second address producing means to cause another new address manifestation to be produced designating the location in said memory of the next instruction to be performed by said machine.

22. In a data processing machine having an addressable memory for storing a program of instructions at selectable addresses therein, a first address producing means for producing an address manifestation designating the location of an instruction of the program stored in said memory, means responsive to said address manifestation for selectively controlling said memory to read out an instruction manifestation, means responsive to said instruction manifestation for executing an operation designated by said instruction, means effective after the execution of said instruction for incrementing the contents of said first address producing means by one to cause a new address manifestation to be produced designating the location in said memory of the next sequential instruction of the program whereby the instructions of the program are normally selected from sequentially numbered addresses in said memory, means for selectively monitoring a plurality of conditions which may occur during the operation of the machine in performing the program to provide interruption indications in a predetermined order of priority identifying the plurality of conditions, a second address producing means responsive to a predetermined one of said interruption indications for producing an address manifestation designating the location of an interruption instruction in said memory, and program interrupt means for interrupting the normal sequence of instruction selection by causing the next instruction to be taken in accordance with the address manifestation of said second address producing means rather than that of said first address producing means.

23. In a program controlled data processing machine as in claim 22 including means for rendering said incrementing means ineffective for incrementing the contents of said first address producing means after execution of said interruption instruction so that the next instruction is taken in accordance with the address manifestation of said first address producing means thereby permitting the normal sequence of instruction selection to be resumed.

24. In a program controlled data processing machine, an indicator means consisting of a bistable device for detecting the occurrence of a predetermined condition during the operation of the machine, said device when in a first state of stability producing a first signal indicating the occurrence of the condition and when in a second state of stability producing a second signal indicating the non-occurrence of the condition, a mask means consisting of a bistable device corresponding to that of said indicator means, said device when in a first state of stability producing a first signal indicating that the program is to be interrupted and when in a second state of stability producing a second signal indicating that the program is not to be interrupted, an interruption indicator connected to the bistable devices of said indicator means and said mask means for comparing the signals produced thereby and providing an interruption indication whenever a coincidence of said first signals is detected according to a predetermined priority scheme and means responsive to said interruption indication to automatically cause an interruption of the program.

25. In a program controlled data processing machine wherein a plurality of conditions may occur during the operation of the machine, an indicator register consisting of a plurality of bistable devices corresponding to said plurality of conditions, each device when in a first state of stability producing a first signal indicating the occurrence of the condition and when in a second state of stability producing a second signal indicating the non-occurrence of the condition, means for concurrently setting a plurality of the bistable devices of said indicator register to said first state in response to a corresponding concurrently occurring plurality of conditions, a mask register consisting of a plurality of bistable devices corresponding to those of said indicator register, each device when in a first state of stability producing a first signal indicating that the program is to be interrupted and when in a second state of stability producing a second signal indicating that the program is not to be interrupted, an interruption indicator having a plurality of stages each of which is connected to corresponding stages of said indicator register and said mask register for comparing the signals produced thereby to provide interruption indications that the program is to be interrupted and means for controlling said interruption indicator to provide said interruption indications in a predetermined order of priority.

26. In a program controlled data processing machine as in claim 25 including means responsive to said interruption indication for controlling said data processing machine to cause interruptions of the program.

27. In a program controlled data processing machine as in claim 26 including means responsive to said interruption indication for preventing a subsequent occurring interruption indication from controlling said data processing machine to cause an interruption of the program until the first such interruption is completed.

28. In a program controlled data processing machine having a memory for storing a program of instructions, means for normally selecting the instructions of said program from sequentially numbered addresses, means for controlling said instruction selecting means to interrupt the normal sequence of instruction selection and selecting a single instruction at a non-sequentially numbered address, means responsive to said single instruction for executing the operation designated thereby, means effective after the execution of said instruction at said non-sequentially numbered address for controlling said instruction selecting means to resume normal instruction selection at the point of interruption.

29. In a program controlled data processing machine having a memory for storing a program of instructions including means for normally selecting the instructions of said program from sequentially numbered addresses in said memory and utilizing said instrutcions, one by one, to control said machine, continuously operating means independent of a current instruction for detecting the occurrence of each of a plurality of conditions, during the operation of the machine under control of one of said instructions, and producing indications thereof, means for monitoring said indications during said one instruction and means controlled by said monitoring means for producing an automatic interruption of the normal sequence of said program under control of one condition selected by said monitoring means.

30. A machine as in claim 29, and including a plurality of curative programs stored in said memory and means rendered effective by said monitoring means to render effective the particular curative program associated with the selected condition.

31. A device as in claim 30, and including means establishing a priority among said conditions whereupon occurrence of a condition of higher priority establishes its curative routine in preference to that of the conditions with lower priority.

32. A device as in claim 30, and including means rendering said monitoring means inoperative to produce an automatic interruption even upon the occurrence of certain of said conditions, but at least one of said occurring conditions remaining effective to select its curative program.

33. A device as in claim 29, and including means for storing the produced indications of said conditions in said memory for future reference.

34. A device as in claim 29, and including means for replacing said produced indications, by indications stored in memory.

35. A device as in claim 30, and including means for setting up an address number corresponding to each particular condition, said address number, identifying a particular curative routine.

36. A device as in claim 35, and including means for establishing a base number, and means for combining said base number and said address number to indicate the address, in memory, of the particular curative routine.

37. A device as in claim 36, and means for replacing said base number by another base number stored in memory.

38. A device as in claim 30, and including means for preventing other than said selected condition from causing an interrupt.

39. A device as in claim 30, and including means for interrupting a first curative routine and replacing said first curative routine by a second routine identified by another condition.

40. A device as in claim 39, and including means for restoring said first curative routine, upon completion of said second routine.

41. In a program controlled data processing machine having a memory for storing a program of instructions including means for normally selecting the instructions of said program from sequentially numbered addresses in said memory and utilizing said instructions, one by one, to control said machine, means for detecting the occurrence of each of a plurality of conditions, during the operation of the machine under control of one of said instructions, and producing indications thereof, means for monitoring said indications during said one instruction, means controlled by said monitoring means for producing an automatic interruption of the normal sequence of said program under control of one condition selected by said monitoring means, a plurality of curative programs stored in said memory, means rendered effective by said monitoring means to render effective the particular curative program associated with the selected condition, means rendering said monitoring means inoperative to produce an automatic interruption even upon the occurrence of certain of said conditions, but at least one of said occurring conditions remaining effective to select its curative program, said indication producing means comprising a number of two-state devices, one for each such condition and said monitoring means including an equal number of two-state devices, means for setting said monitoring two-state devices into a pattern, means effective upon similarity of condition between the two-state devices of said pattern and of said indication producing means, for causing an interrupt upon the occurrence of each such condition, and means for setting chosen ones of said monitoring, two-state devices into a condition, contrary to corresponding ones of the two-state devices of said indicating means whereby said respective conditions, corresponding to said contrary set two-state devices, are ineffective to produce interrupt even upon occurrence of said conditions, respectively.

References Cited in the file of this patent

UNITED STATES PATENTS

| 2,615,127 | Edwards | Oct. 21, 1952 |
| 2,636,672 | Hamilton et al. | Apr. 28, 1953 |
| 2,641,696 | Woolard | June 9, 1953 |
| 2,789,759 | Thomas | Apr. 23, 1957 |
| 2,800,277 | Williams | July 23, 1957 |
| 2,927,732 | Rinder et al. | Mar. 8, 1960 |
| 2,939,634 | Beek et al. | June 7, 1960 |
| 2,954,166 | Eckdahl et al. | Sept. 27, 1960 |

FOREIGN PATENTS

| 167,102 | Australia | Feb. 27, 1956 |

OTHER REFERENCES

ORDVAC Manual; University of Illinois, 1951. Pages 141–152 and drawings Nos. 288–290 and 301 relied on.

Publication I; Elecom 100 Digital Computer Instruction Manual, by Underwood Corporation, 1953. Contains 110 pages. Pages 8, 11, 24–29 and 78–80 relied on.

UNITED STATES PATENT OFFICE
CERTIFICATE OF CORRECTION

Patent No. 3,048,332                                                    August 7, 1962

Frederick P. Brooks, Jr., et al.

It is hereby certified that error appears in the above numbered patent requiring correction and that the said Letters Patent should read as corrected below.

Column 12, line 46, for "Instruciton" read -- Instruction --; line 71, for "than" read -- that --; column 13, line 65, for "bineary" read -- binary --; column 15, line 63, for "+.00.000" read -- +00.000 --; line 74, for "Insturction" read -- Instruction --; column 16, line 65, for "-00.100" read -- -00.110 --; column 17, line 73, for "of" read -- or --; column 18, line 69, for "+00.01 111" read -- +00.11 111 --; column 20, in the second table, third column, line 3 thereof, for "-010010 read -- --,010010 --; column 21, in the table, second column, line 1 thereof, for "-00.010110" read ---00.001011 --; line 47, for "if" read -- is --; column 23, line 10, for "327" read -- 347 --; line 52, for "it", first occurrence, read -- is --; column 24, line 9, for "374b" read -- 347b --; column 25, line 6, after "on" insert a comma; line 12, for "lies" read -- lines --; column 28, line 62, for "time" read -- timer --; column 31, line 73, for "circuit" read -- circuits --; column 35, line 52, after "now" insert -- stored --; column 39, line 64, for "execute read -- Execute --; column 49, line 26, for "regenerate" read -- Regenerate --; column 52, line 59, for "CHT" read -- CTR --; column 56, lines 21 and 22, for "Executive", each occurrence, read -- Execute --; line 32, after "the" insert -- line --; line 54, for "Roun" read -- Round --; same column 56, lines 59 and 61, for "Executive", each occurrence, read -- Execute --; column 57, line 22, for "QM" read -- MQ --; column 58, line 29, for "no" read -- No --; line 30, for "accumulator" read -- Accumulator --; column 60, line 24, for "adder" read -- Adder --; column 67, lines 16 and 50, for "condition", each occurrence, read -- conditioned --; same column 67, line 66, for "methematical" read -- mathematical --; column 68, lines 10 and 20, for "condition", each occurrence, read -- conditioned --; column 71, line 15, strike out "circuit", second occurrence; line 54, for "Registery" read -- Register --; column 74, line 47, for "the" read -- this --; column 75, lines 11 and 17, for "Decorder" read -- Decoder --; column 76, line 10, for "bus" read -- Bus --; column 77, line 6, for "and", second occurrence, read -- an --; column 82, line 6, for "E/R-O" read -- E/R10 --; column 88, line 74, for "(D-)" read -- (D1) --; column 89, line 32, for "inverted' read -- inverter --; column 90, line 5, after "531a" insert a comma; line 46, for "Executive" read -- Execute --; column 91, line 29, for "on" read -- ON --; column 92, line 21, for "576" read -- 576c --; line 37, for "in to" read -- into --; column 3,048,332

93, line 21, for "cricuit" read -- circuit --; column 94, line 72, for "steps" read -- step --; column 100, line 23, after "in" insert -- complement --; column 103, line 30, after "Buses" strike out the comma; column 104, line 10, for "Address" read -- address --; line 21, for "address" read -- Address --; column 115, line 60, for "singal" read -- signal --; column 121, line 5, for "pulse" read -- pulses --; column 124, line 32, for "an" read -- a --; column 129, line 37, after "orders," insert -- S, --; column 132, line 55, for "and" read -- an --; column 134, line 21, for "adder" read -- Adder --; column 135, line 46, after "Q" insert a comma; column 137, line 65, for "77a" read -- 772a --; column 141, line 7, after "S" insert a comma; line 68, for "on" read -- one --; column 153, line 53, strike out "line to"; column 155, line 3, for "output sof" read -- outputs of --; column 156, line 57, for "the" read -- a --; column 158, line 53, for "FIG." read -- FIGS. --; column 162, line 2, for "valve" read -- value --; column 164, line 8, for "Instruction" read -- Instructions --; column 170, line 45, for "525e" read -- 523e --; line 48, for "conditioned." read -- conditioned, --; column 175, line 47, for "operations" read -- operation --; line 54, after "which" insert -- is --; column 179, lines 3 to 5, for "under control of a condition selected by said selective monitoring said indication to permit an automatic interruption of the program" read -- during said step, selectively ordered monitoring of said indication to permit an automatic interruption of the program under control of a condition selected by said selective monitoring --; column 179, line 40, strike out "and"; column 180, line 59, strike out "selectively".

Signed and sealed this 31st day of December 1963.

(SEAL)
Attest:
ERNEST W. SWIDER

Attesting Officer

EDWIN L. REYNOLDS
Acting Commissioner of
Patents